US010572541B2

(12) United States Patent
Fletcher et al.

(10) Patent No.: US 10,572,541 B2
(45) **Date of Patent: *Feb. 25, 2020**

(54) ADJUSTING WEIGHTS FOR AGGREGATED KEY PERFORMANCE INDICATORS THAT INCLUDE A GRAPHICAL CONTROL ELEMENT OF A GRAPHICAL USER INTERFACE

(71) Applicant: Splunk Inc., San Francisco, CA (US)

(72) Inventors: Tristan Antonio Fletcher, Pacifica, CA (US); Hemendra Singh Choudhary, Sunnyvale, CA (US); Clint Sharp, Oakland, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/955,990

(22) Filed: Apr. 18, 2018

(65) Prior Publication Data

US 2018/0241660 A1 Aug. 23, 2018

Related U.S. Application Data

(63) Continuation of application No. 14/800,672, filed on Jul. 15, 2015, now Pat. No. 9,985,863, which is a (Continued)

(51) Int. Cl.
*G06F 15/173* (2006.01)
*G06F 16/903* (2019.01)
(Continued)

(52) U.S. Cl.
CPC .......... *G06F 16/903* (2019.01); *G06F 3/0481* (2013.01); *G06F 3/0482* (2013.01);
(Continued)

(58) Field of Classification Search
CPC ............ G06F 16/903; G06F 16/90335; G06F 16/9535; G06F 16/9038; G06F 16/9024;
(Continued)

(56) References Cited

U.S. PATENT DOCUMENTS 7,299,358 B2 11/2007 Chateau et al.
7,711,670 B2 5/2010 Roediger
(Continued)

OTHER PUBLICATIONS

USPTO, Office Action for U.S. Appl. No. 14/700,110, dated Jun. 20, 2017.

(Continued)

*Primary Examiner* — Krisna Lim
(74) *Attorney, Agent, or Firm* — Lowenstein Sandler LLP

(57) ABSTRACT

Techniques are disclosed for providing an aggregate key performance indicator (KPI) that spans multiple services and for providing adjustment to KPI factors via a GUI that enables an aggregate KPI to be configured with feedback that better characterizes the performance of the services. The GUI may enable selection of KPIs and adjustment to weights (e.g., importance) associated with the KPIs. The weight of a KPI may affect the influence a value of the KPI has on the calculation of an aggregate KPI value (e.g., score). The GUI may provide near real-time feedback concerning the effect the weights have on the aggregate KPI value by displaying the aggregate KPI value (e.g., score) and updating the aggregate KPI value as the weights are adjusted.

30 Claims, 222 Drawing Sheets

Related U.S. Application Data continuation-in-part of application No. 14/700,110, filed on Apr. 29, 2015, now Pat. No. 9,864,797, which is a continuation-in-part of application No. 14/611,200, filed on Jan. 31, 2015, now Pat. No. 9,294,361, which is a continuation-in-part of application No. 14/528,858, filed on Oct. 30, 2014, now Pat. No. 9,130,860.

(60) Provisional application No. 62/062,104, filed on Oct. 9, 2014.

(51) Int. Cl.

| | |
|---|---|
| ***G06Q 10/06*** | (2012.01) |
| ***H04L 29/08*** | (2006.01) |
| ***G06F 16/26*** | (2019.01) |
| ***G06F 16/248*** | (2019.01) |
| ***G06F 16/25*** | (2019.01) |
| ***G06F 16/33*** | (2019.01) |
| ***G06F 16/951*** | (2019.01) |
| ***G06F 16/2455*** | (2019.01) |
| ***G06F 16/901*** | (2019.01) |
| ***G06F 16/9038*** | (2019.01) |
| ***G06F 16/9535*** | (2019.01) |
| ***G06F 16/2453*** | (2019.01) |
| ***H04L 12/24*** | (2006.01) |
| ***G06F 11/34*** | (2006.01) |
| ***G06F 11/32*** | (2006.01) |
| ***G06F 17/30*** | (2006.01) |
| ***H04L 12/26*** | (2006.01) |
| ***G06F 3/0484*** | (2013.01) |
| ***G06F 9/54*** | (2006.01) |
| ***G06F 3/0481*** | (2013.01) |
| ***G06F 3/0482*** | (2013.01) |
| *G06T 11/20* | (2006.01) |

(52) U.S. Cl.

CPC ........ *G06F 3/0484* (2013.01); *G06F 3/04817* (2013.01); *G06F 3/04842* (2013.01); *G06F 3/04847* (2013.01); *G06F 9/542* (2013.01); *G06F 11/321* (2013.01); *G06F 11/34* (2013.01); *G06F 16/248* (2019.01); *G06F 16/2455* (2019.01); *G06F 16/24542* (2019.01); *G06F 16/252* (2019.01); *G06F 16/26* (2019.01); *G06F 16/334* (2019.01); *G06F 16/9024* (2019.01); *G06F 16/9038* (2019.01); *G06F 16/90335* (2019.01); *G06F 16/951* (2019.01); *G06F 16/9535* (2019.01); *G06F 17/30424* (2013.01); *G06Q 10/0637* (2013.01); *G06Q 10/0639* (2013.01); *G06Q 10/06393* (2013.01); *H04L 29/08072* (2013.01); *H04L 41/0213* (2013.01); *H04L 41/0806* (2013.01); *H04L 41/22* (2013.01); *H04L 41/5009* (2013.01); *H04L 41/5032* (2013.01); *H04L 41/5035* (2013.01); *H04L 41/5038* (2013.01); *H04L 43/04* (2013.01); *H04L 43/045* (2013.01); *H04L 43/16* (2013.01); *H04L 67/10* (2013.01); *H04L 67/16* (2013.01); *G06T 11/206* (2013.01); *G06T 2200/24* (2013.01)

(58) Field of Classification Search

CPC .. G06F 16/2455; G06F 16/951; G06F 16/334; G06F 16/252; G06F 16/248; G06F 16/26; G06F 16/24542; G06F 11/321; G06F 11/34; G06F 3/04847; G06F 3/0481; G06Q 10/0639; G06Q 10/0637; H04L 43/16; H04L 41/5038; H04L 41/5035; H04L 43/04; H04L 41/0806

USPC .......................................................... 709/224

See application file for complete search history.

(56) References Cited

U.S. PATENT DOCUMENTS

| | | | | |
|---|---|---|---|---|
| 8,050,921 | B2 | 11/2011 | Vlark et al. | |
| 8,095,417 | B2 | 1/2012 | Handy et al. | |
| 8,266,148 | B2 | 9/2012 | Guha et al. | |
| 8,364,460 | B2 | 1/2013 | Ostermeyer et al. | |
| 8,412,696 | B2 | 4/2013 | Zhang et al. | |
| 8,538,787 | B2 | 9/2013 | Braun et al. | |
| 8,543,527 | B2 | 9/2013 | Bates et al. | |
| 8,589,403 | B2 | 11/2013 | Marquardt et al. | |
| 8,682,925 | B1 | 3/2014 | Marquardt et al. | |
| 8,712,953 | B2 | 4/2014 | Beringer et al. | |
| 8,738,414 | B1 | 5/2014 | Nagar et al. | |
| 8,762,313 | B2 | 6/2014 | Lahav et al. | |
| 8,806,361 | B1 | 8/2014 | Noel et al. | |
| 8,825,752 | B1 | 9/2014 | Madhavan | |
| 8,948,369 | B2 | 2/2015 | Shaffer et al. | |
| 9,130,860 | B1 * | 9/2015 | Boe | G06F 16/903 |
| 9,210,056 | B1 * | 12/2015 | Choudhary | G06F 16/284 |
| 9,294,361 | B1 * | 3/2016 | Choudhary | G06F 16/903 |
| 9,762,455 | B2 | 9/2017 | Bingham et al. | |
| 9,864,797 | B2 * | 1/2018 | Fletcher | G06F 16/334 |
| 9,985,863 | B2 * | 5/2018 | Fletcher | G06F 16/903 |
| 2001/0049682 | A1 | 12/2001 | Vincent et al. | |
| 2003/0174173 | A1 | 9/2003 | Nishiyama et al. | |
| 2003/0182310 | A1 | 9/2003 | Charnock et al. | |
| 2004/0030668 | A1 | 2/2004 | Pawlowski et al. | |
| 2005/0060048 | A1 | 3/2005 | Pierre et al. | |
| 2005/0181835 | A1 | 8/2005 | Lau et al. | |
| 2005/0289138 | A1 | 12/2005 | Cheng et al. | |
| 2006/0156250 | A1 | 7/2006 | Chaudhri et al. | |
| 2007/0005388 | A1 | 1/2007 | Busch et al. | |
| 2007/0150480 | A1 | 6/2007 | Hwang et al. | |
| 2007/0192150 | A1 | 8/2007 | Belkin et al. | |
| 2007/0208601 | A1 | 9/2007 | Pulianda | |
| 2008/0081632 | A1 | 4/2008 | Malik | |
| 2008/0097807 | A1 | 4/2008 | Chang et al. | |
| 2008/0120129 | A1 | 5/2008 | Seubert et al. | |
| 2008/0126147 | A1 | 5/2008 | Ang et al. | |
| 2008/0140514 | A1 | 6/2008 | Stenger | |
| 2008/0163015 | A1 | 7/2008 | Kagan et al. | |
| 2008/0177595 | A1 | 7/2008 | Wu et al. | |
| 2008/0201397 | A1 | 8/2008 | Peng et al. | |
| 2008/0256516 | A1 | 10/2008 | Chaar et al. | |
| 2009/0112932 | A1 | 4/2009 | Skierkowski et al. | |
| 2009/0265637 | A1 | 10/2009 | Lee et al. | |
| 2009/0313503 | A1 | 12/2009 | Atluri et al. | |
| 2010/0023362 | A1 | 1/2010 | Nguyen et al. | |
| 2010/0031234 | A1 | 2/2010 | Chaar et al. | |
| 2010/0042680 | A1 | 2/2010 | Czyzewicz et al. | |
| 2010/0324927 | A1 | 12/2010 | Tinsley | |
| 2010/0324962 | A1 | 12/2010 | Nesler et al. | |
| 2010/0332466 | A1 | 12/2010 | White et al. | |
| 2011/0178977 | A1 | 7/2011 | Drees | |
| 2011/0261055 | A1 | 10/2011 | Wong et al. | |
| 2011/0313817 | A1 | 12/2011 | Wang | |
| 2012/0005593 | A1 | 1/2012 | Redpath | |
| 2012/0158521 | A1 | 6/2012 | McCullen | |
| 2012/0162265 | A1 | 6/2012 | Heinrich et al. | |
| 2012/0259583 | A1 | 10/2012 | Noboa et al. | |
| 2013/0142322 | A1 | 6/2013 | Grasso et al. | |
| 2013/0182700 | A1 | 7/2013 | Figura et al. | |
| 2013/0185693 | A1 | 7/2013 | Chaar et al. | |
| 2013/0318236 | A1 | 11/2013 | Coates et al. | |
| 2013/0318589 | A1 | 11/2013 | Ford et al. | |
| 2013/0318603 | A1 | 11/2013 | Merza | |
| 2013/0325147 | A1 | 12/2013 | Karnouskos | |
| 2013/0326620 | A1 | 12/2013 | Merza et al. | |
| 2014/0040306 | A1 | 2/2014 | Gluzman Peregrine et al. | |
| 2014/0072115 | A1 | 3/2014 | Makagon et al. | |

(56) References Cited

U.S. PATENT DOCUMENTS

| | | | |
|---|---|---|---|
| 2014/0117819 | A1 | 5/2014 | Kim |
| 2014/0129298 | A1 | 5/2014 | Hulen et al. |
| 2014/0146648 | A1 | 5/2014 | Alber et al. |
| 2014/0157142 | A1 | 6/2014 | Heinrich et al. |
| 2014/0160238 | A1 | 6/2014 | Yim et al. |
| 2014/0181087 | A1 | 6/2014 | Wu |
| 2014/0236889 | A1 | 8/2014 | Vasan et al. |
| 2014/0236890 | A1 | 8/2014 | Vasan et al. |
| 2014/0324448 | A1 | 10/2014 | Lacy et al. |
| 2014/0337871 | A1 | 11/2014 | Garcia De Blas et al. |
| 2014/0376710 | A1 | 12/2014 | Shaffer et al. |
| 2016/0103888 | A1 | 4/2016 | Fletcher et al. |

OTHER PUBLICATIONS

USPTO, Notice of Allowance for U.S. Appl. No. 14/700,110, dated Aug. 16, 2017.

USPTO, Office Action for U.S. Appl. No. 14/611,200, dated Jun. 29, 2015.

USPTO, Notice of Allowance for U.S. Appl. No. 14/611,200, dated Nov. 20, 2015.

Bitincka, Ledion, et al., "Optimizing Data Analysis with a Semi-Structured Time Series Database", Splunk Inc., 2010, pp. 1-9.

Carasso, David, "Exploring Splunk Search Processing Language (SPL) Primer and Cookbook", Splunk Inc., 2012 CITO Research, New York, 154 Pages.

http://docs.splunk.com/Documentation/PCI/2.1.1/[000119] User/IncidentReviewdashboard, 2 Pages (Last accessed Aug. 5, 2014).

vSphere Monitoring and Performance, VMware, Inc., Update 1, vSphere 5.5, EN-001357-02, 2010-2014, pp. 1-174, http://pubs.vmware.com/vsphere-55/topic/com.vmware.ICbase/PDF/vsphere-esxi-vcenter-server-551-monitoring-performance-guide.pdf.

Jack Coates, Cognitive Splunking, Sep 17, 2012; Splunk-blogs, Blogs-Security, 1-3.

U.S. Appl. No. 14/167,316, filed Jan. 29, 2014.

U.S. Appl. No. 14/448,995, filed Jul. 31, 2014.

U.S. Appl. No. 14/326,459, filed Jul. 8, 2014.

U.S. Appl. No. 14/611,200, filed Oct. 30, 2014.

U.S. Appl. No. 14/528,858, filed Oct. 30, 2014.

USPTO, Office Action for U.S. Appl. No. 14/528,858, dated Apr. 2, 2015.

USPTO, Notice of Allowance for U.S. Appl. No. 14/528,858, dated Jul. 8, 2015.

USPTO, Office Action for U.S. Appl. No. 14/800,672, dated Oct. 12, 2017.

USPTO, Notice of Allowance for U.S. Appl. No. 14/800,672, dated Jan. 31, 2018.

* cited by examiner

FIG. 34U
Actions
Include in RSS feed
Send email
Run a script
Create ServiceNow Ticket
Ticket Type *
Incident
Event
Category *
Inquiry
Contact Type *
Email
Urgency *
High
State *
Awaiting User Info
Description *
Cancel
34700
34701
34702
34703
34704
34705
34706

34550

34577

34718

34570

FIG. 43A
4300
4302
4304
5 minute window
View
Edit
Clear
Undo Changes
Presets
Real-time
30 second window
1 minute window
5 minute window
30 minute window
24 hour window
All time (real-time)
Relative
Today
Week to date
Business week to date
Month to date
Year to date
Yesterday
Previous week
Previous business week
Previous month
Previous year
Last 15 minutes
Last 60 minutes
Last 4 hours
Last 24 hours
Last 7 days
Last 30 days
Last 90 days
Last year
Other
All time
Relative
Real-time
Date Range
Date & Time Range
Advanced

4650

4651

```
Original Search: 7501
search "error | stats count BY host

Sent to peers: 7502
search "error | prestats count BY host (map)

Executed by search head: 7503
Merge prestats results received from peers (reduce)
```

FIG. 80

ADJUSTING WEIGHTS FOR AGGREGATED KEY PERFORMANCE INDICATORS THAT INCLUDE A GRAPHICAL CONTROL ELEMENT OF A GRAPHICAL USER INTERFACE

RELATED APPLICATION

This application is a continuation of U.S. Nonprovisional application Ser. No. 14/800,672, filed Jul. 15, 2015, entitled "Graphical User Interface For Adjusting Weights Of Key Performance Indicators," which is a continuation-in-part of U.S. Nonprovisional application Ser. No. 14/700,110, filed Apr. 29, 2015, entitled "Defining a New Search Based on Displayed Graph Lanes" and issued as U.S. Pat. No. 9,864,797 on Jan. 9, 2018, which is a continuation-in-part of U.S. Nonprovisional application Ser. No. 14/611,200, filed Jan. 31, 2015, entitled "Monitoring Service-Level Performance Using Key Performance Indicator (KPI) Correlation Search" and issued as U.S. Pat. No. 9,294,361 on Mar. 22, 2016, which is a continuation-in-part of U.S. Nonprovisional application Ser. No. 14/528,858, filed Oct. 30, 2014, entitled "Monitoring Service-Level Performance Using Key Performance Indicators Derived from Machine Data" and issued as U.S. Pat. No. 9,130,860 on Sep. 8, 2015, and also claims the benefit of U.S. Provisional Patent Application No. 62/062,104 filed Oct. 9, 2014, entitled "Monitoring Service-Level Performance Using Key Performance Indicators Derived from Machine Data," all of which are incorporated herein by reference herein.

TECHNICAL FIELD

The present disclosure relates to monitoring services and, more particularly, to monitoring service-level performance using key performance indicators derived from machine data.

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority.

BRIEF DESCRIPTION OF THE DRAWINGS

The present disclosure will be understood more fully from the detailed description given below and from the accompanying drawings of various implementations of the disclosure.

FIG. 10AA is a flow diagram of an implementation of a method for creating an informational field and adding the informational field to an entity definition, in accordance with one or more implementations of the present disclosure.

FIG. 10AB illustrates an example of a GUI facilitating user input for creating an informational field and adding the informational field to an entity definition, in accordance with one or more implementations of the present disclosure.

FIG. 10AC is a flow diagram of an implementation of a method for filtering entity definitions using informational field-value data, in accordance with one or more implementations of the present disclosure.

FIG. 10AD-10AE illustrate examples of GUIs facilitating user input for filtering entity definitions using informational field-value data, in accordance with one or more implementations of the present disclosure.

FIG. 34AB is a flow diagram of an implementation of a method for automatically defining one or more thresholds for a KPI, in accordance with one or more implementations of the present disclosure.

FIG. 34AC-AO illustrate example GUIs for configuring automatic thresholds for a KPI, in accordance with one or more implementations of the present disclosure.

FIG. 34AP is a flow diagram of an exemplary method for defining multiple sets of KPI thresholds that apply to different time frames, in accordance with one or more implementations of the present disclosure.

FIG. 34AQ is a flow diagram of an exemplary method for determining KPI states based on multiple sets of KPI thresholds that correspond to different times frames, in accordance with one or more implementations of the present disclosure.

FIG. 34AR is an exemplary GUI for defining threshold settings that apply to different time frames, in accordance with one or more implementations of the present disclosure.

FIG. 34AS is an exemplary GUI for displaying multiple KPI states according to sets of KPI thresholds with different time frames, in accordance with one or more implementations of the present disclosure.

FIG. 34NC presents a flow diagram of an exemplary method for displaying a graphical user interface that enables a user to adjust KPI weights for an aggregate KPI that spans one or more IT services, in accordance with one or more implementations of the present disclosure FIG. 34ND presents a flow diagram of an exemplary method for creating an aggregate KPI that characterizes the performance of multiple services, in accordance with one or more implementations of the present disclosure.

FIG. 34PB illustrates an example of a GUI for filtering the presentation of notable events produced as a result of correlation searches, in accordance with one or more implementations of the present disclosure.

FIG. 41 illustrates an example single value widget, in accordance with one or more implementations of the present disclosure.

FIG. 42 illustrates an example GUI illustrating a search query and a search result for a Noel gauge widget, a single value widget, and a trend indicator widget, in accordance with one or more implementations of the present disclosure.

FIG. 43A illustrates an example GUI portion of a service-monitoring dashboard for facilitating user input specifying a time range to use when executing a search query defining a KPI, in accordance with one or more implementations of the present disclosure.

FIG. 43B illustrates an example GUI for facilitating user input specifying an end date and time for a time range to use when executing a search query defining a KPI, in accordance with one or more implementations of the present disclosure.

FIG. 44 illustrates spark line widget, in accordance with one or more implementations of the present disclosure.

FIG. 45A illustrates an example GUI illustrating a search query and search results for a spark line widget, in accordance with one or more implementations of the present disclosure.

FIG. 45B illustrates spark line widget, in accordance with one or more implementations of the present disclosure.

FIG. 46A illustrates a trend indicator widget, in accordance with one or more implementations of the present disclosure.

FIG. 46B illustrates an example GUI for creating and/or editing a service-monitoring dashboard, in accordance with one or more implementations of the present disclosure.

Figure 46A:
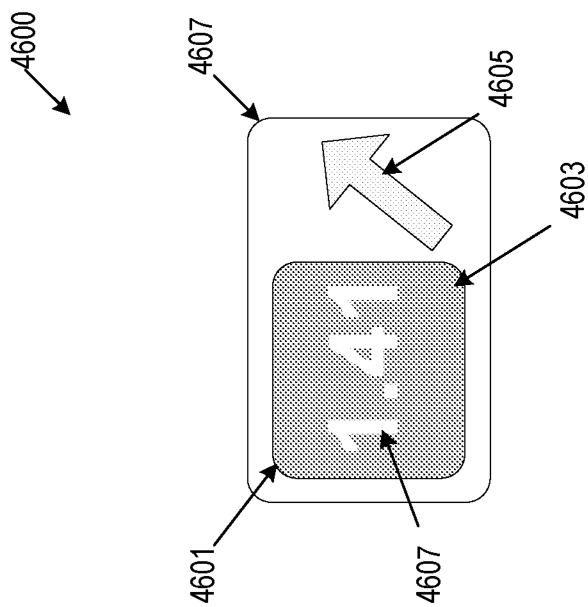
Figure 46B:
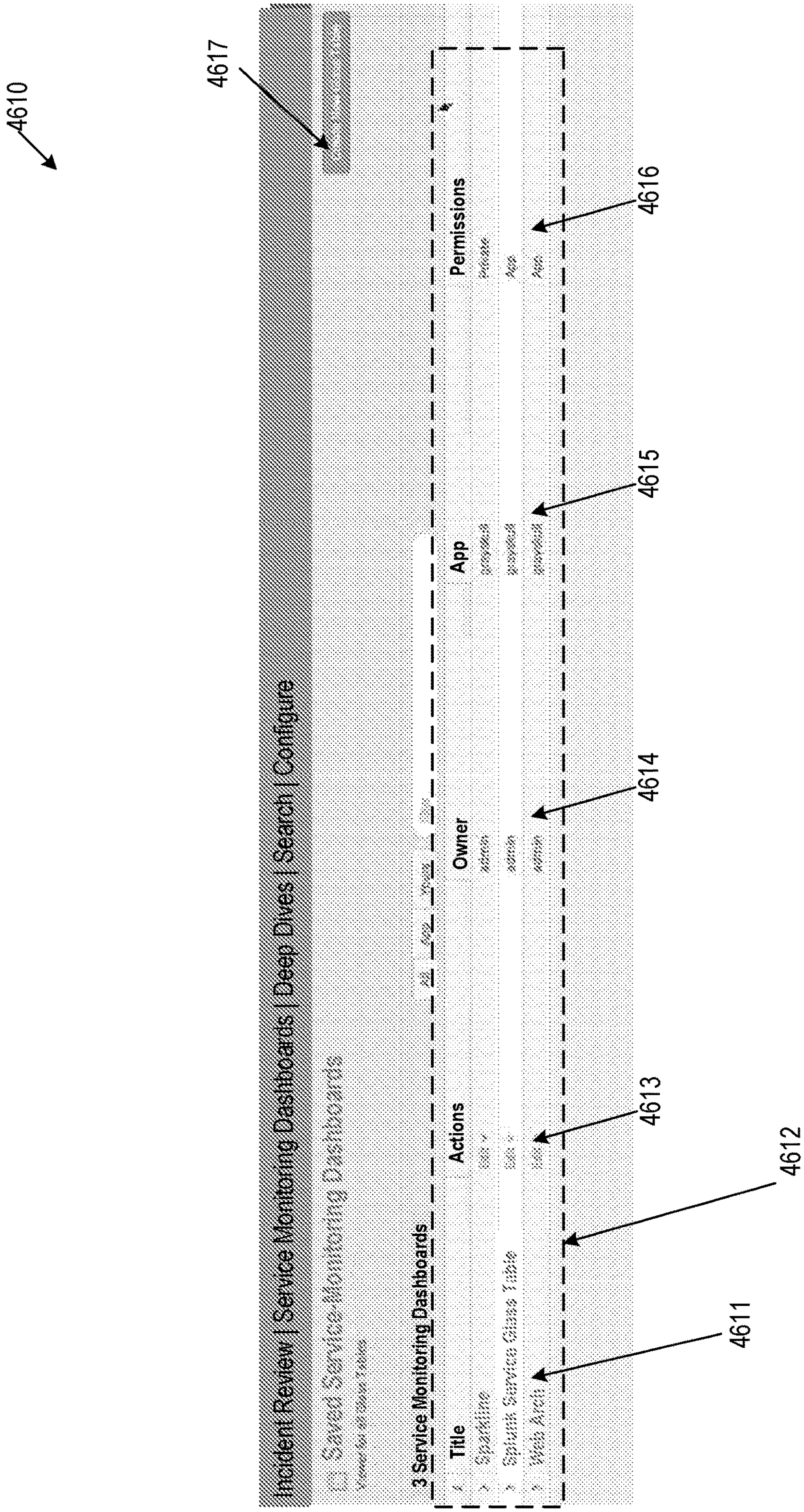
Figure 46B:
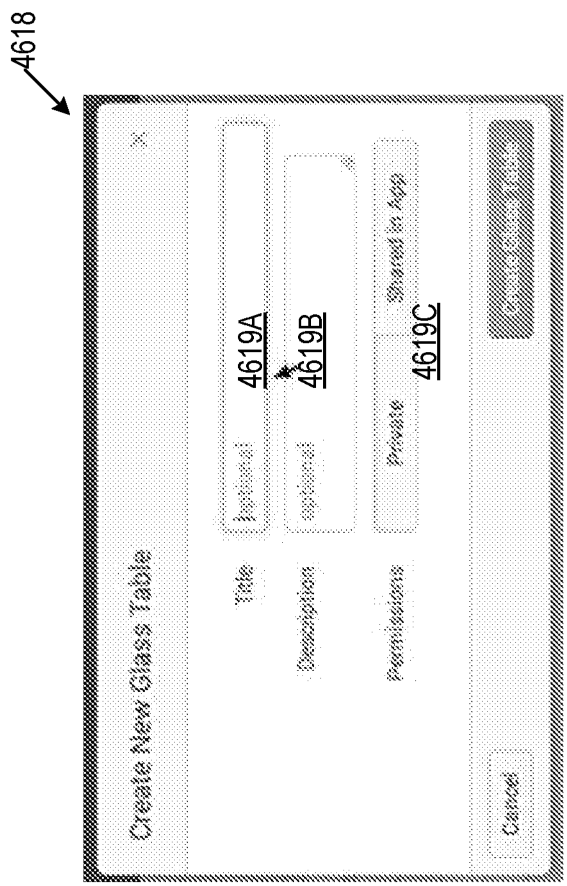

FIG. 46BA illustrates an example GUI for specifying information for a new service-monitoring dashboard, in accordance with one or more implementations of the present disclosure.

Figure 46C:
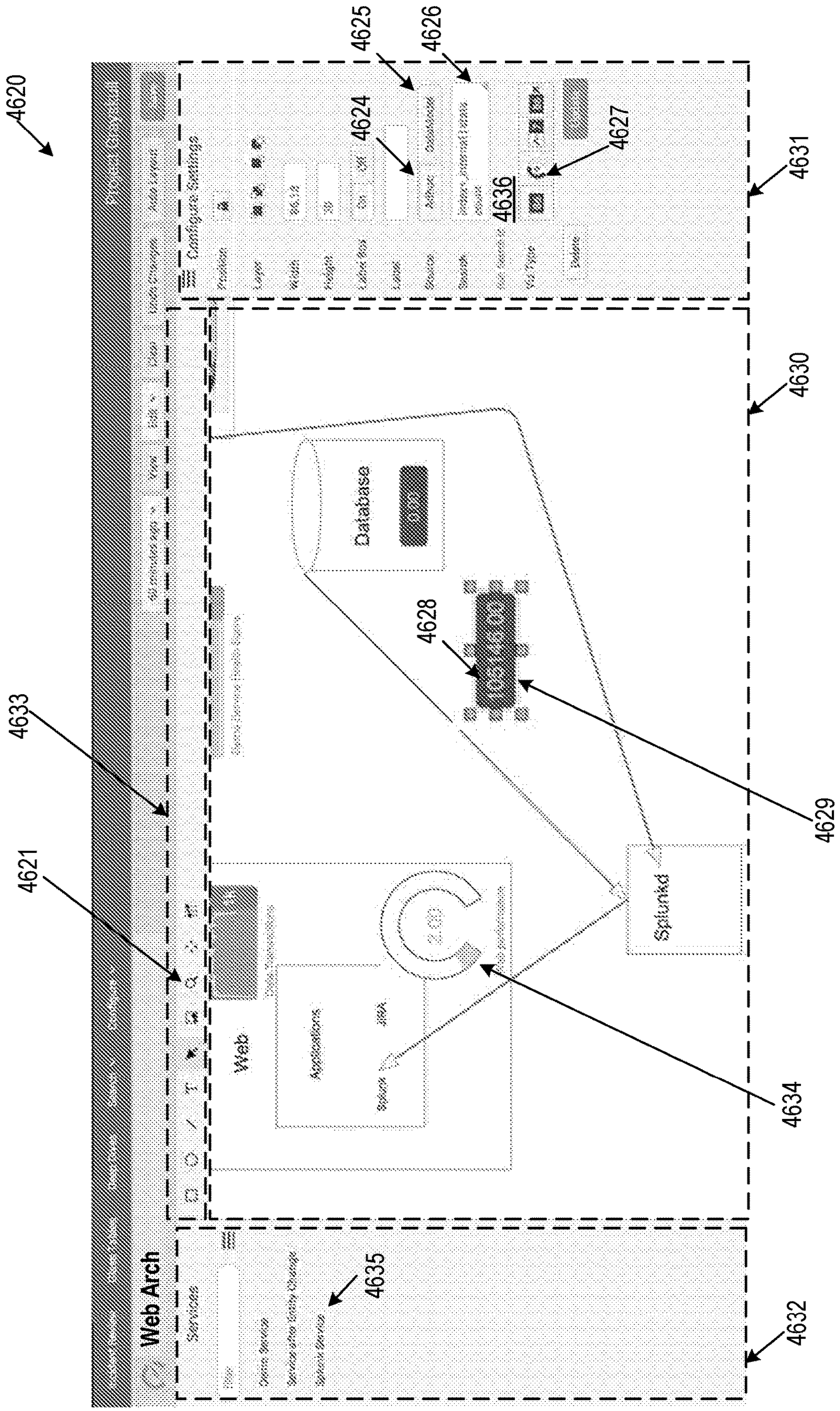

FIG. 46C illustrates an example GUI for editing a service-monitoring dashboard, in accordance with one or more implementations of the present disclosure.

Figure 46D:
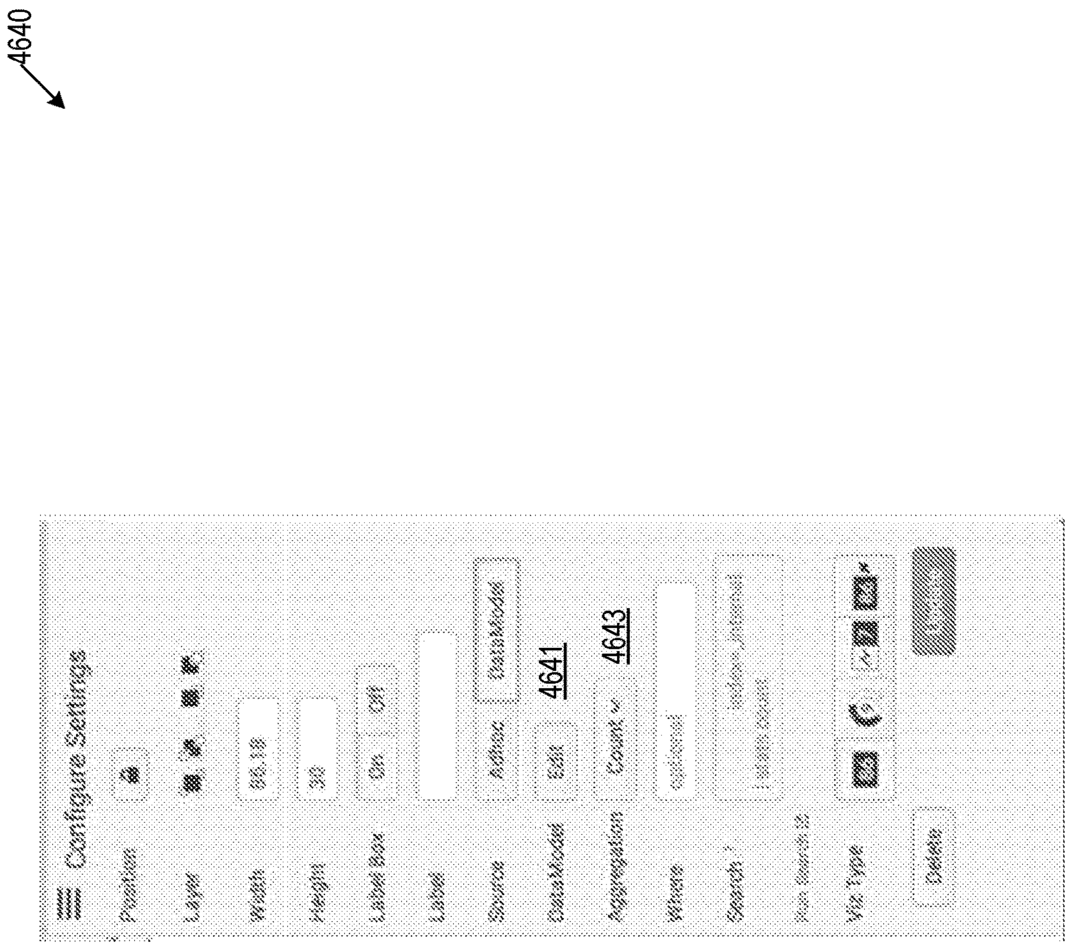

FIG. 46D illustrates an example interface for using a data model to define an adhoc KPI, in accordance with one or more implementations of the present disclosure.

Figure 46E:
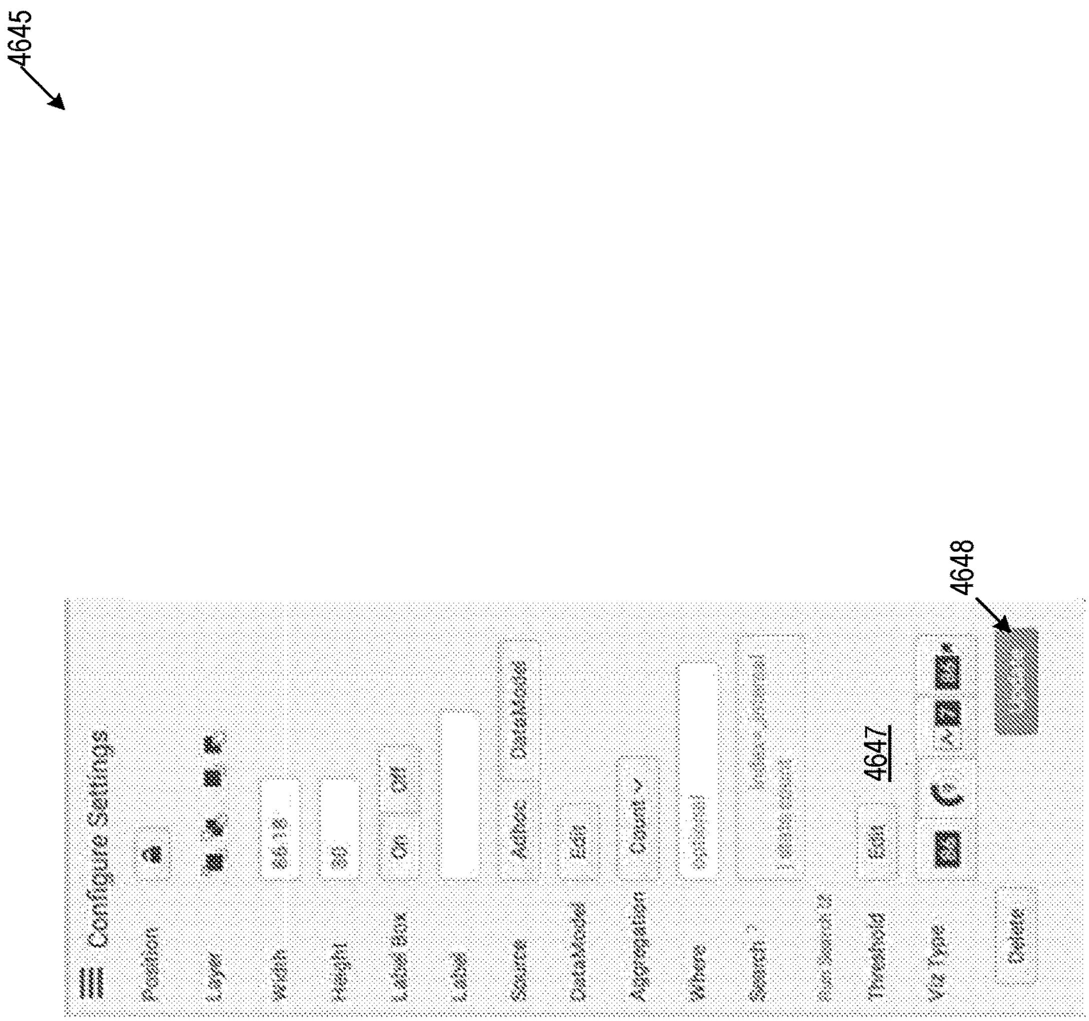

FIG. 46E illustrates an example interface for setting one or more thresholds for the adhoc KPI, in accordance with one or more implementations of the present disclosure.

Figure 46F:
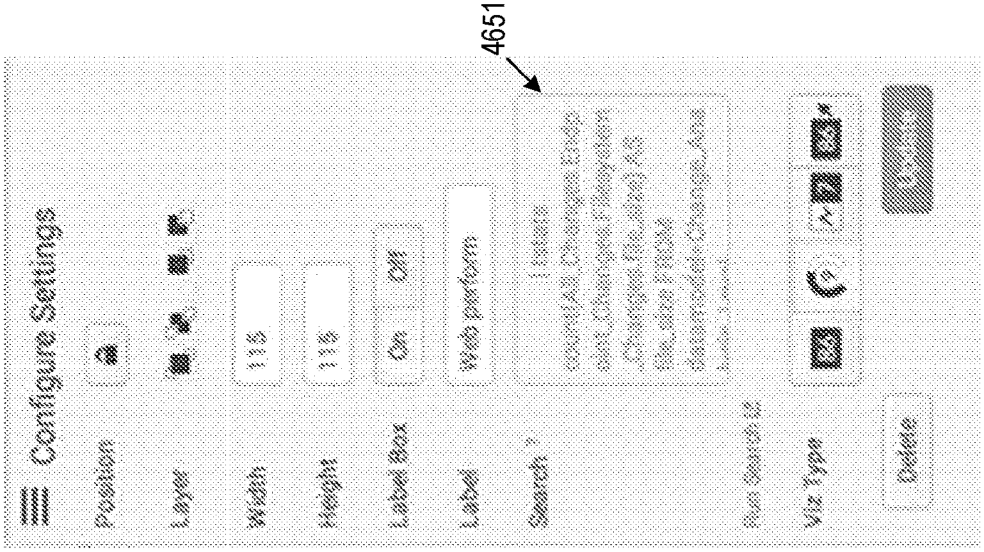

FIG. 46F illustrates an example interface for a service-related KPI, in accordance with one or more implementations of the present disclosure.

Figure 46G:
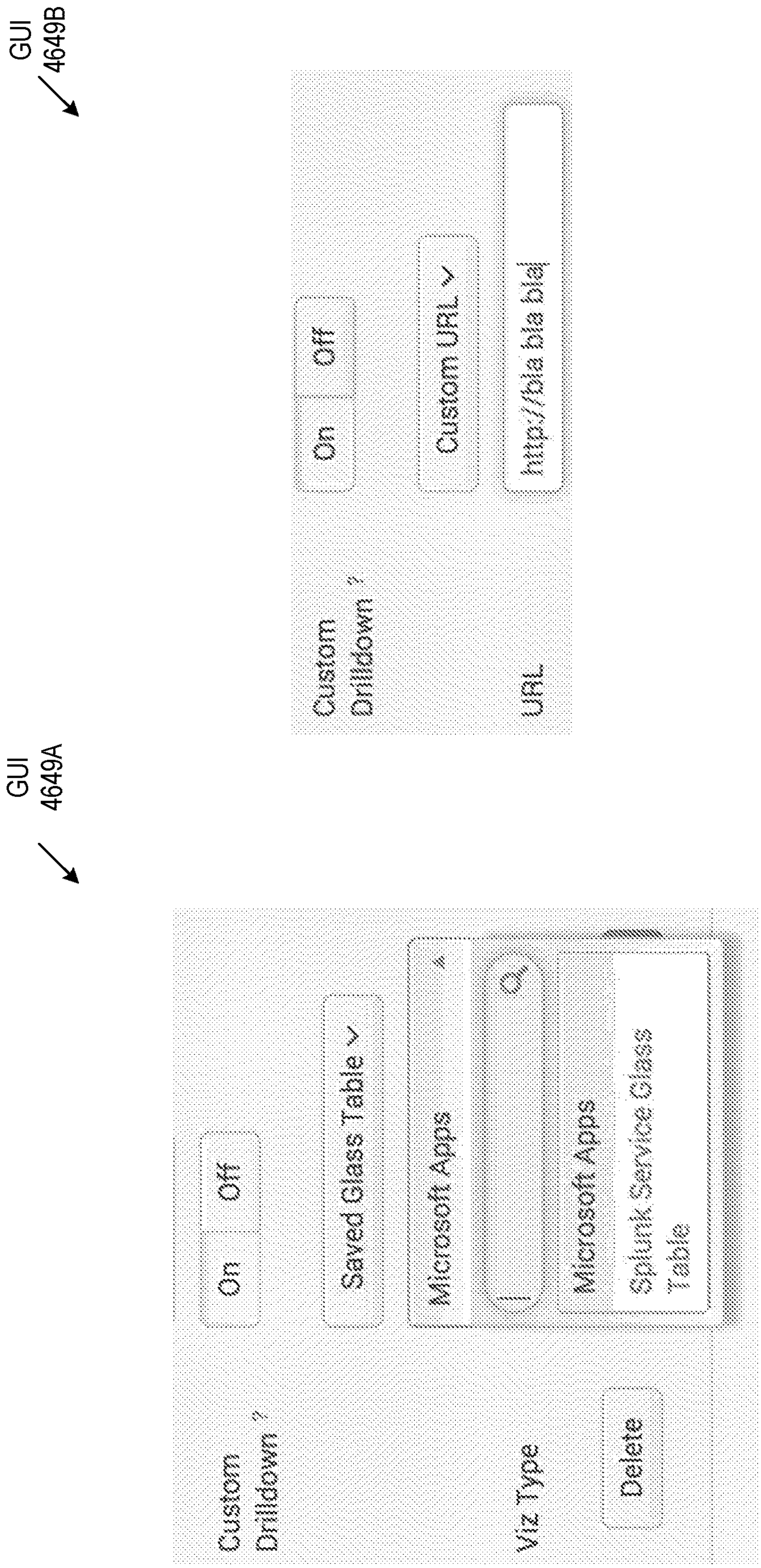
Figure 46G:
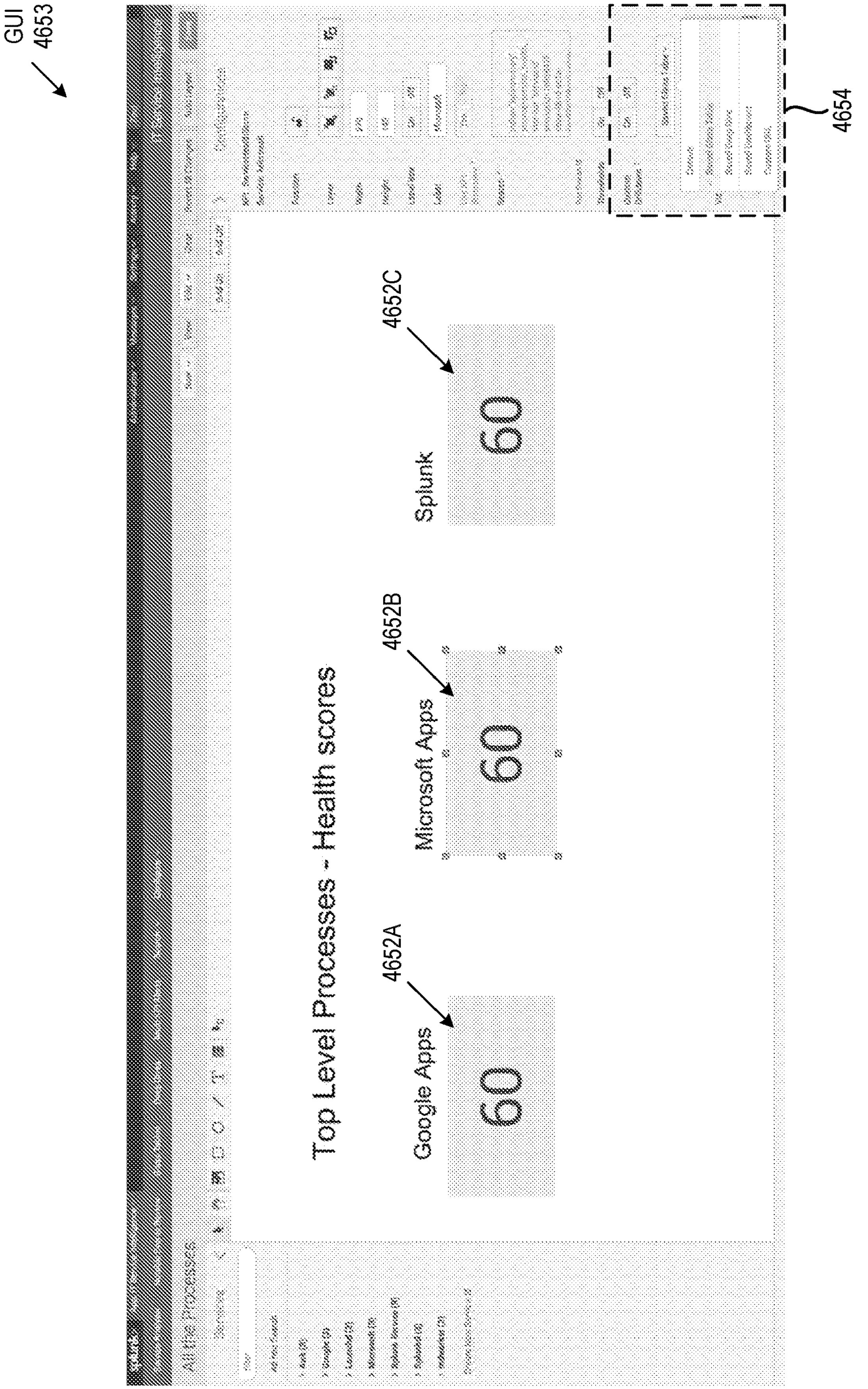

FIG. 46GA illustrates exemplary interfaces for configuring the selection behavior (e.g., click-in behavior) of the service-monitoring dashboard, in accordance with one or more implementations of the present disclosure.

FIG. 46GB illustrates an exemplary GUI for editing a service-monitoring dashboard to include customized selection behavior (e.g., click-in behavior), in accordance with one or more implementations of the present disclosure.

Figure 46H:
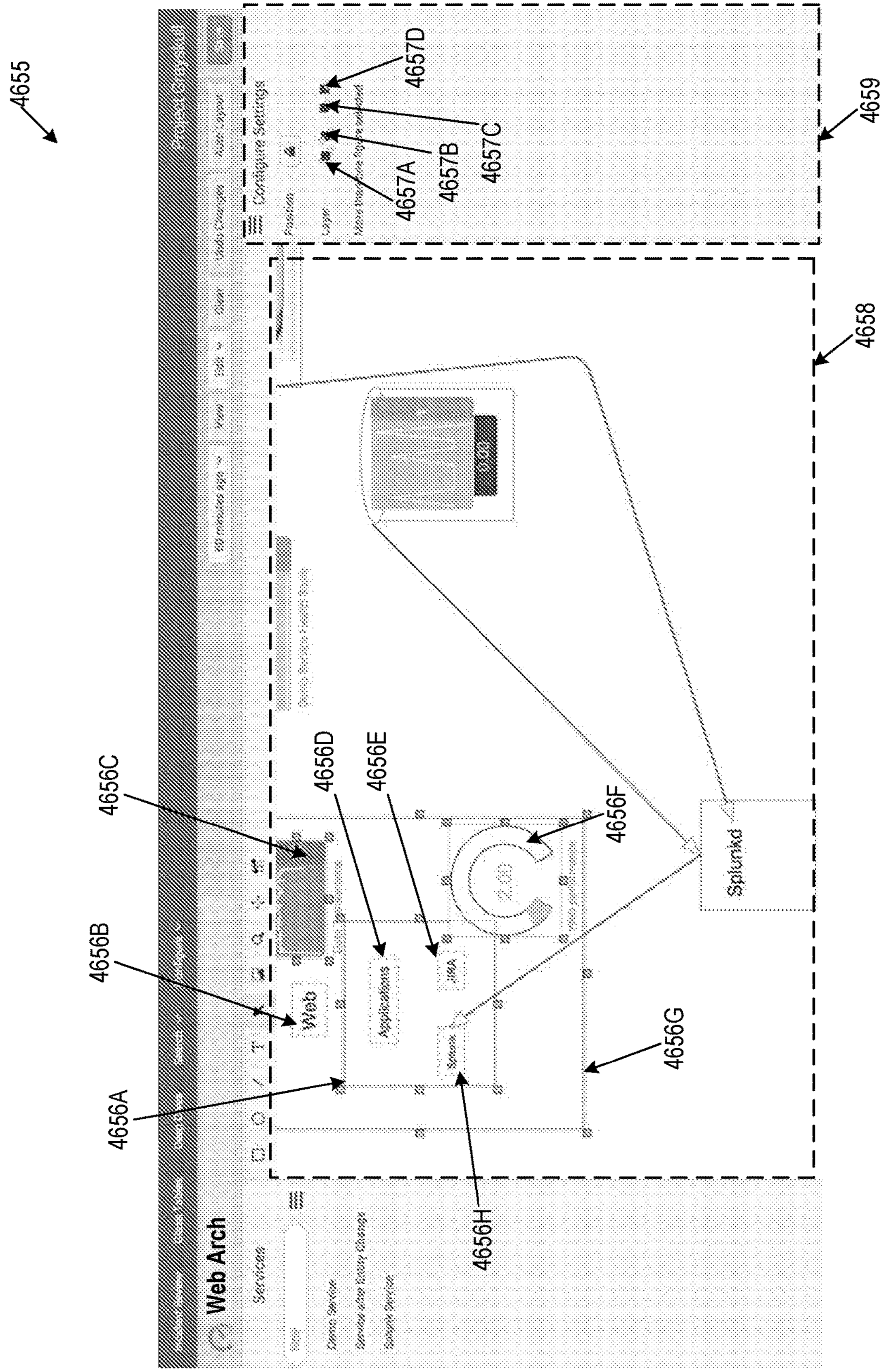
Figure 46H:
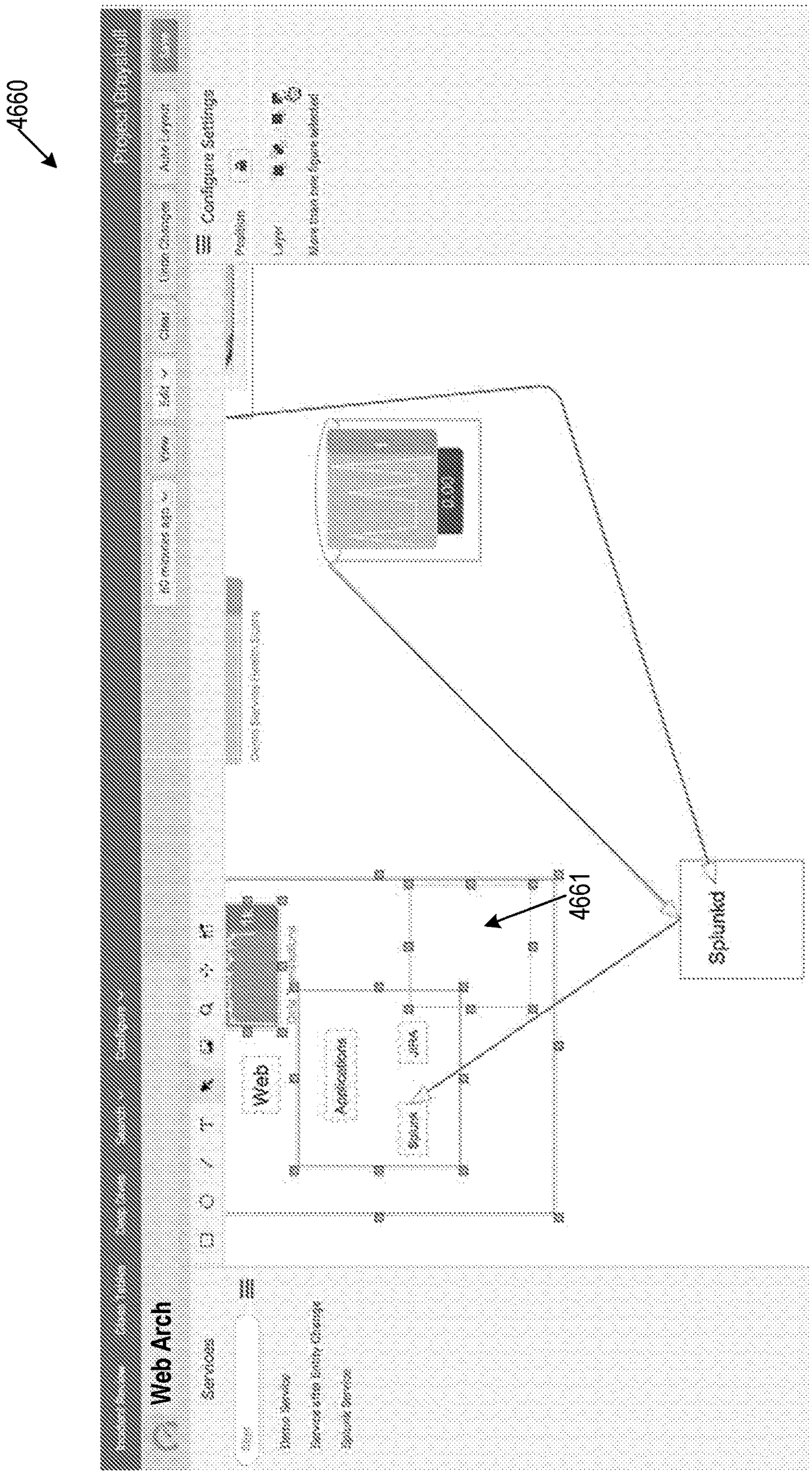

FIG. 46HA illustrates an example GUI for editing layers for items, in accordance with one or more implementations of the present disclosure.

FIG. 46HB illustrates an example GUI for editing layers for items, in accordance with one or more implementations of the present disclosure.

Figure 46I:
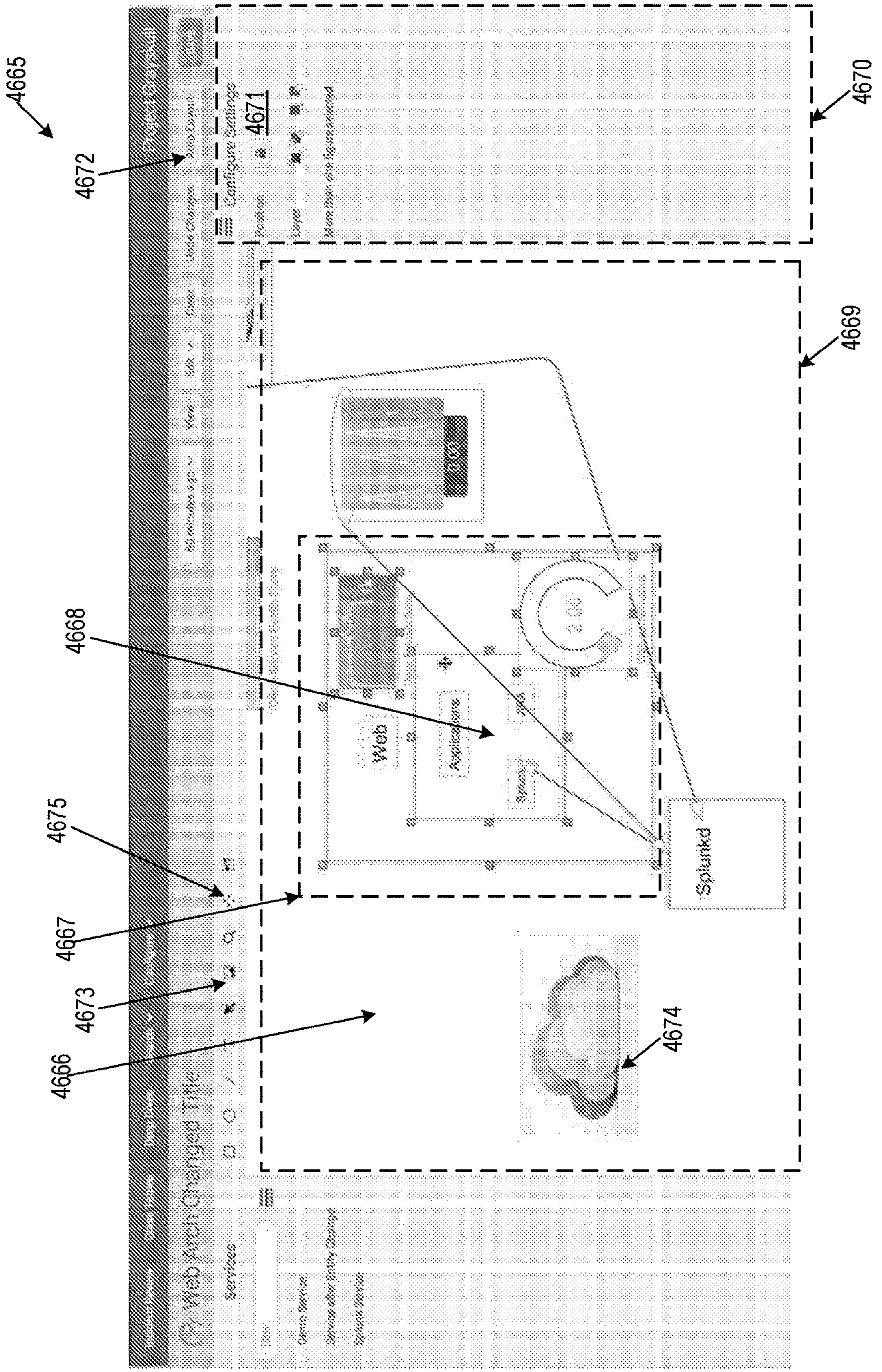

FIG. 46I illustrates an example GUI for moving a group of items, in accordance with one or more implementations of the present disclosure.

Figure 46J:
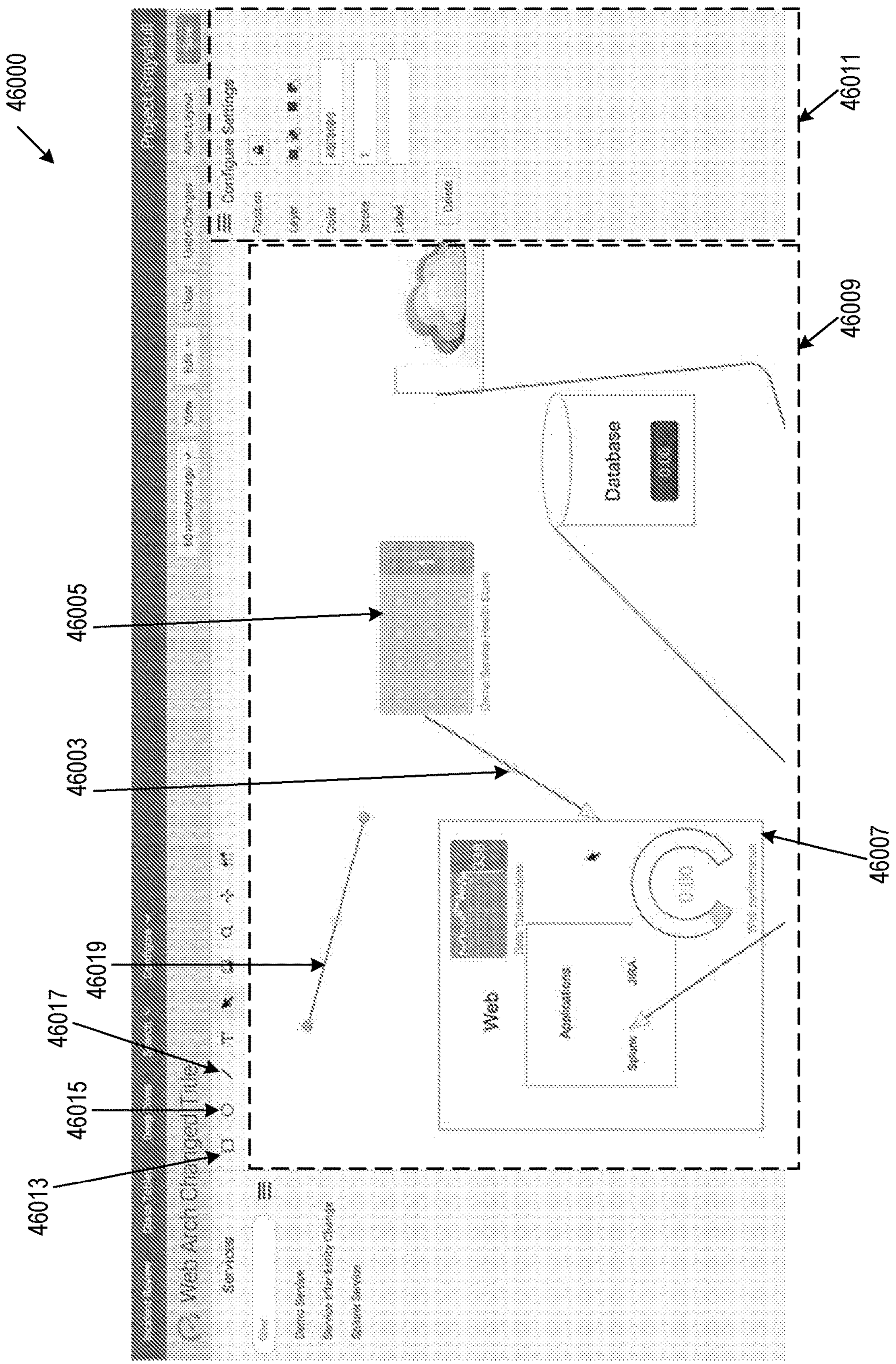

FIG. 46J illustrates an example GUI for connecting items, in accordance with one or more implementations of the present disclosure.

Figure 46K:
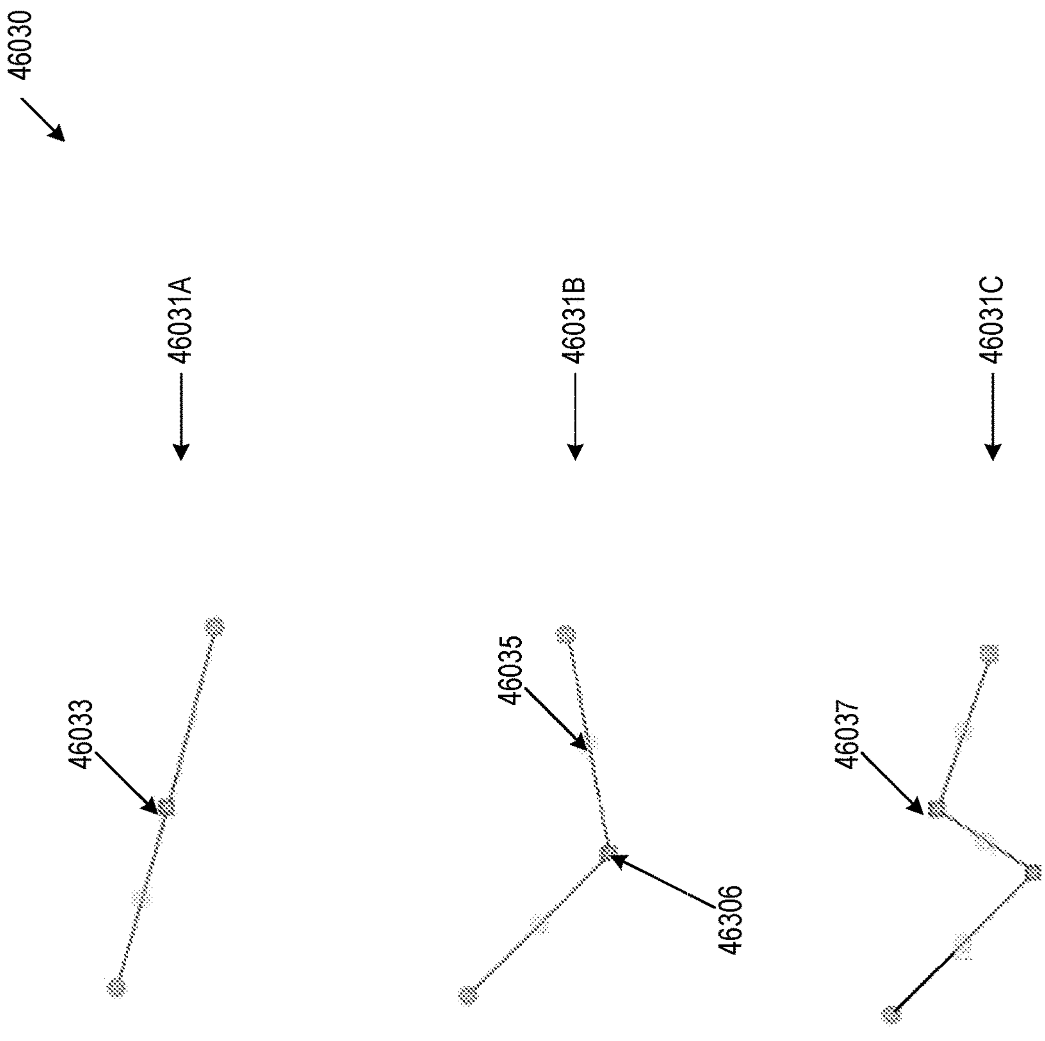

FIG. 46K illustrates a block diagram of an example for editing a line using the modifiable dashboard template, in accordance with one or more implementations of the present disclosure.

Figure 47A:
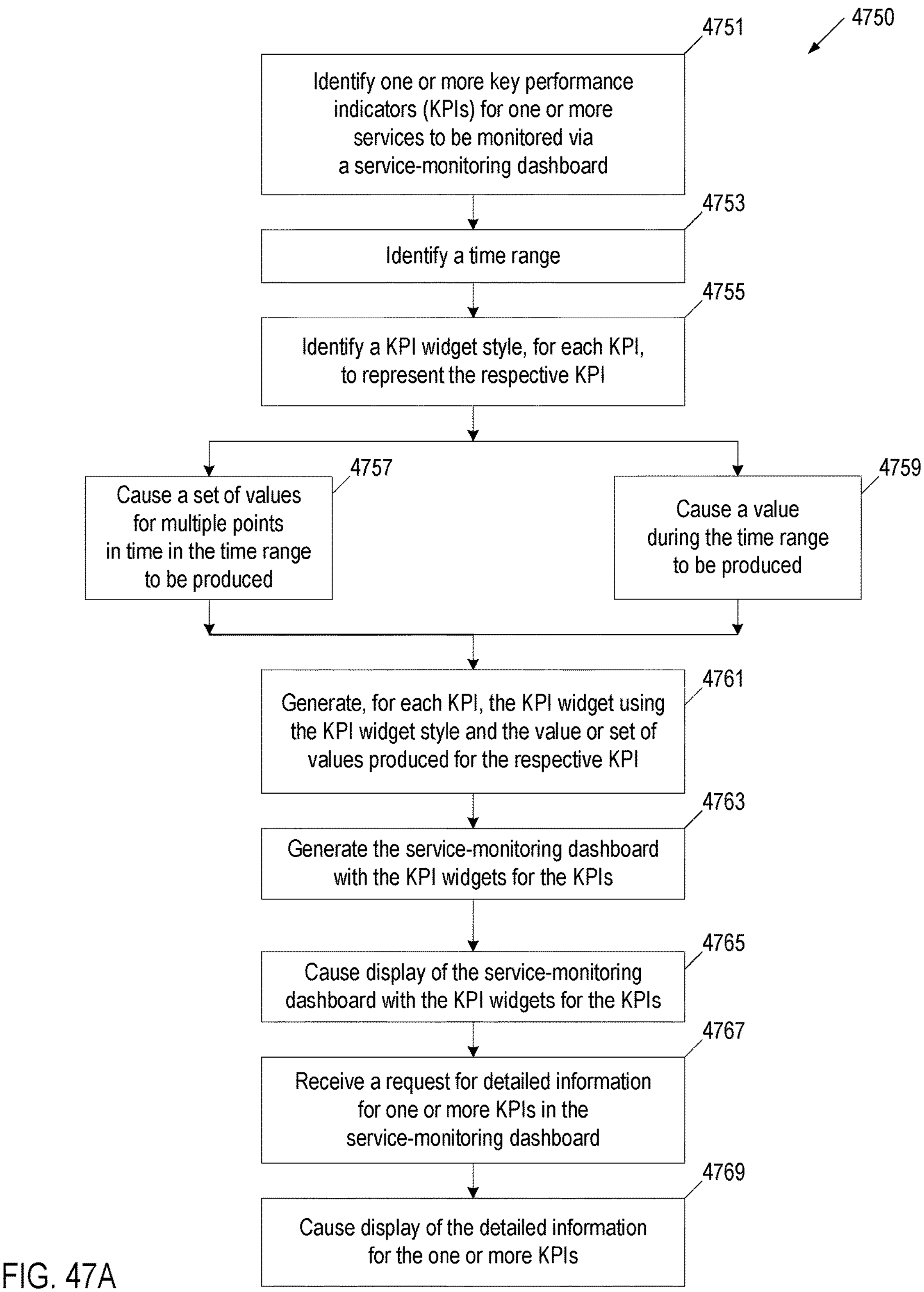

FIG. 47A is a flow diagram of an implementation of a method for creating and causing for display a service-monitoring dashboard, in accordance with one or more implementations of the present disclosure.

Figure 47B:
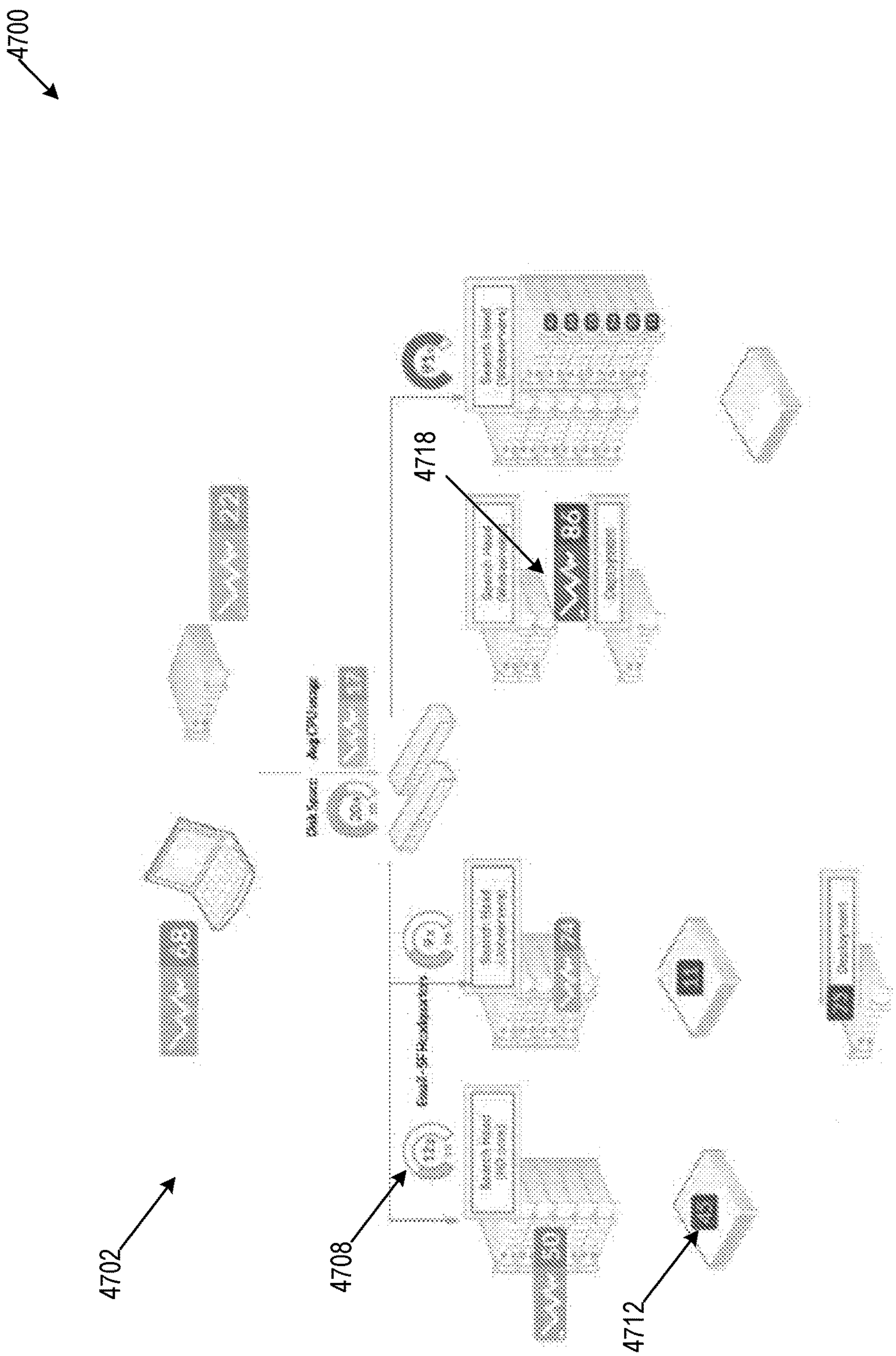

FIG. 47B describes an example service-monitoring dashboard GUI, in accordance with one or more implementations of the present disclosure.

Figure 47C:
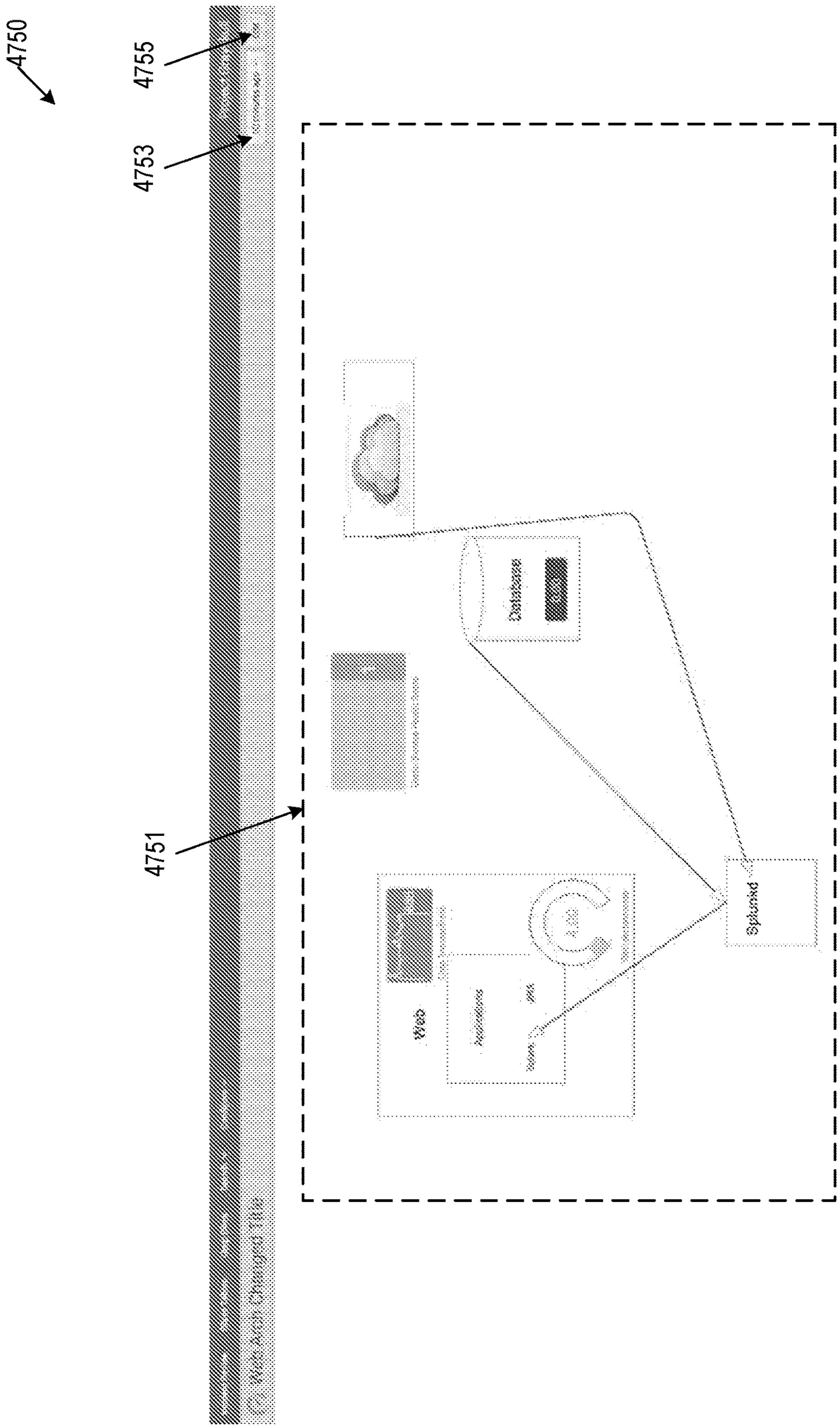

FIG. 47C illustrates an example service-monitoring dashboard GUI that is displayed in view mode based on the dashboard template, in accordance with one or more implementations of the present disclosure.

Figure 48:
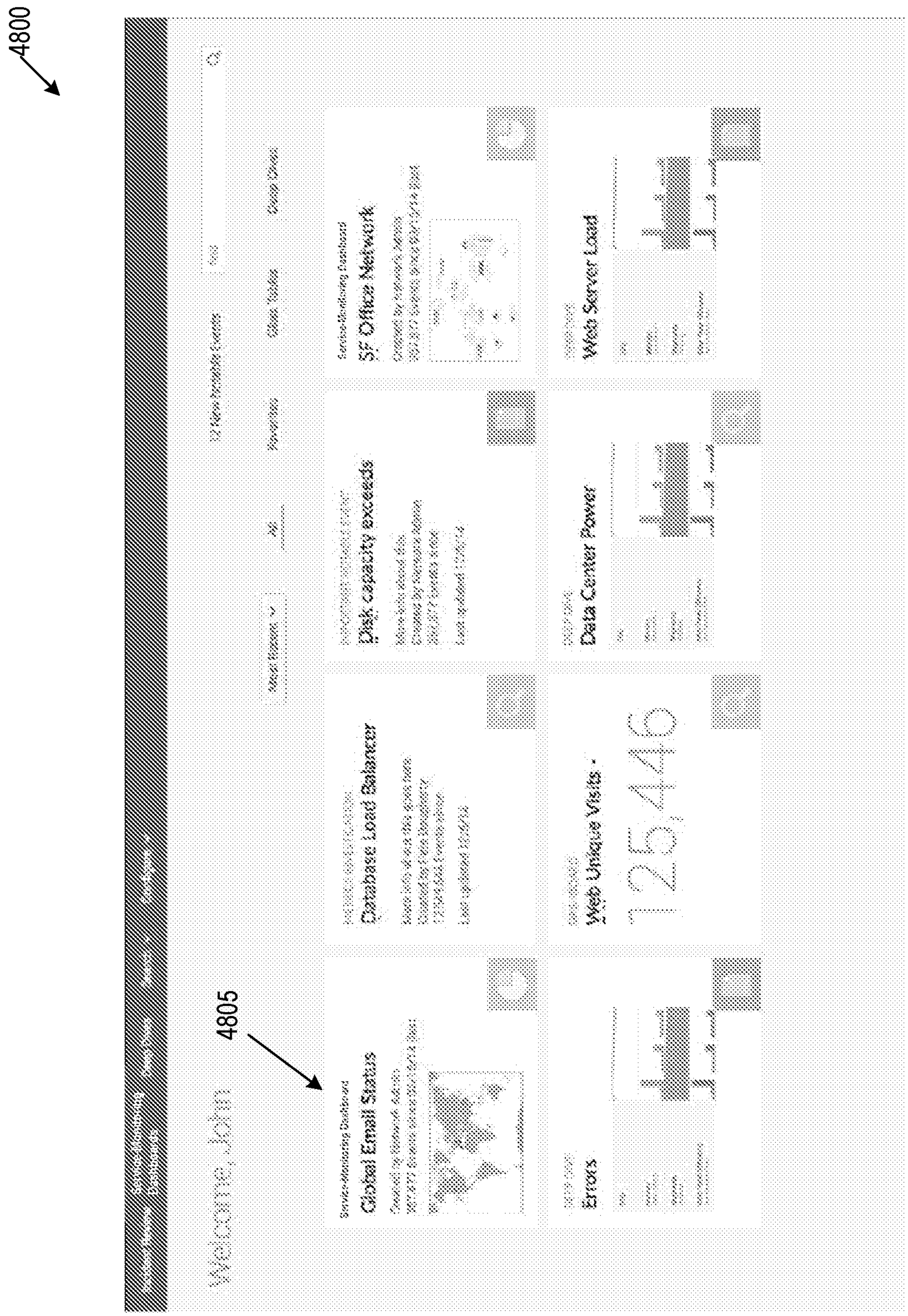

FIG. 48 describes an example home page GUI for service-level monitoring, in accordance with one or more implementations of the present disclosure.

Figure 49A:
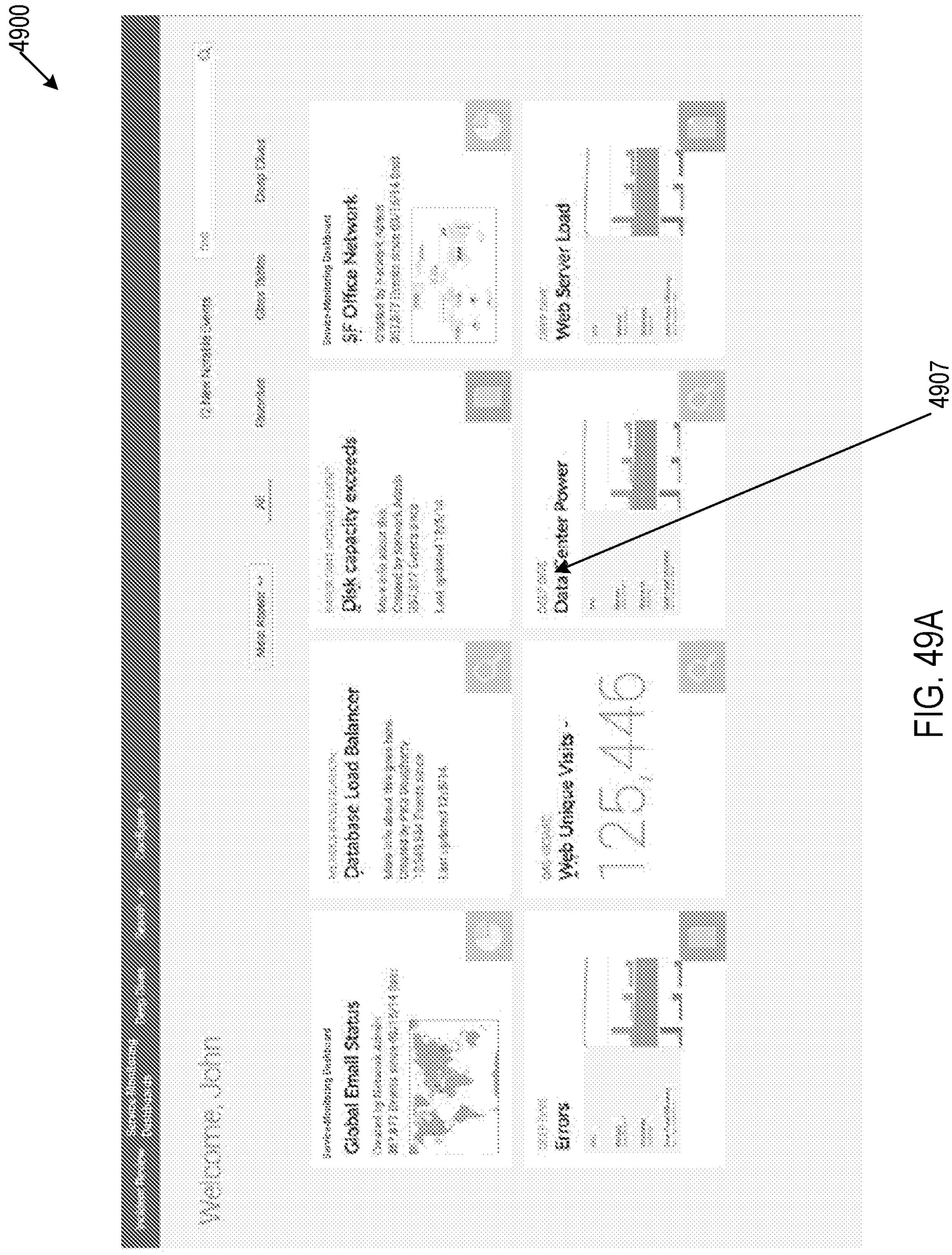

FIG. 49A describes an example home page GUI for service-level monitoring, in accordance with one or more implementations of the present disclosure.

Figure 49B:
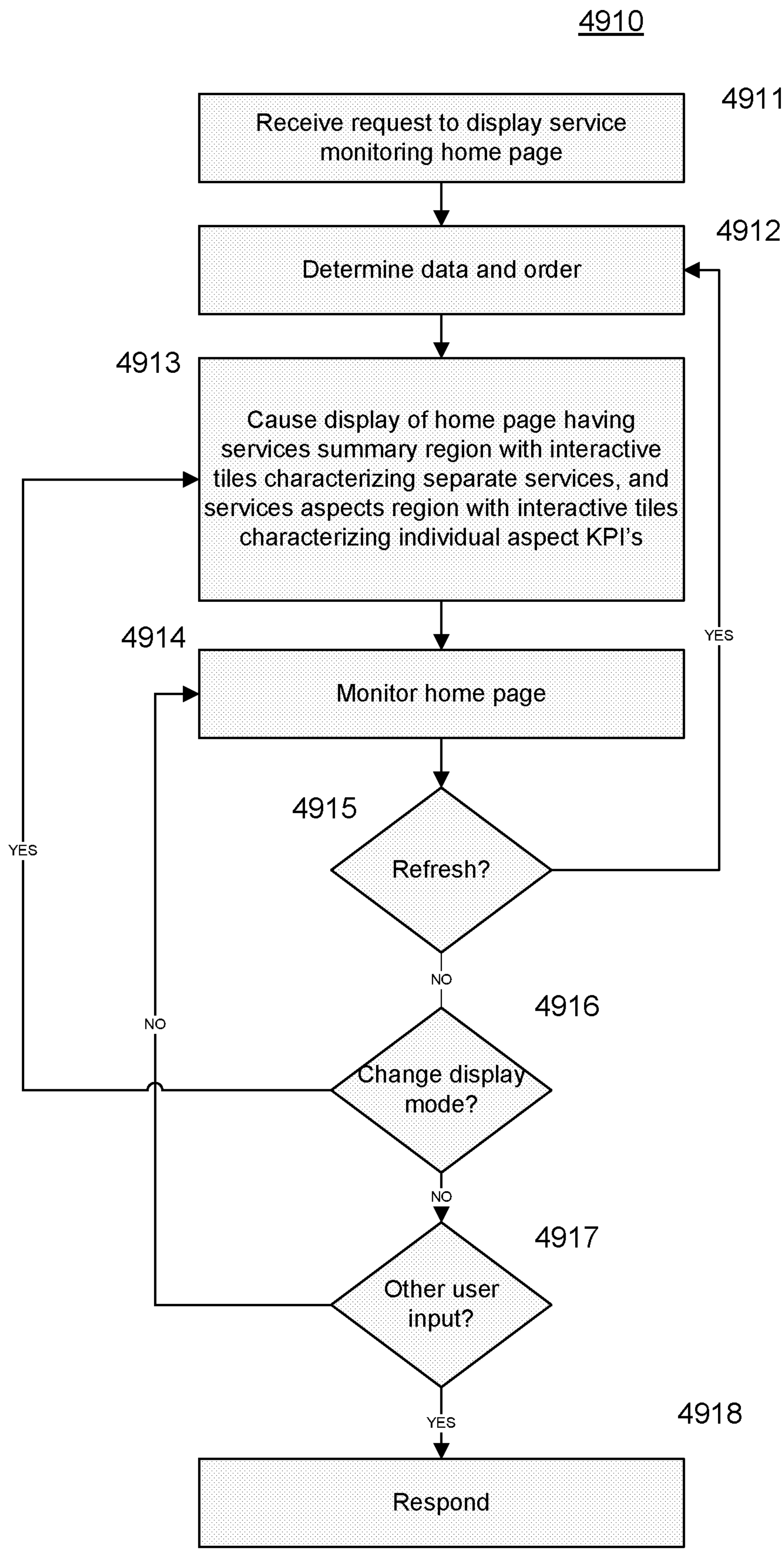

FIG. 49B is a flow diagram of an implementation of a method for creating a home page GUI for service-level and KPI-level monitoring, in accordance with one or more implementations of the present disclosure.

Figure 49C:
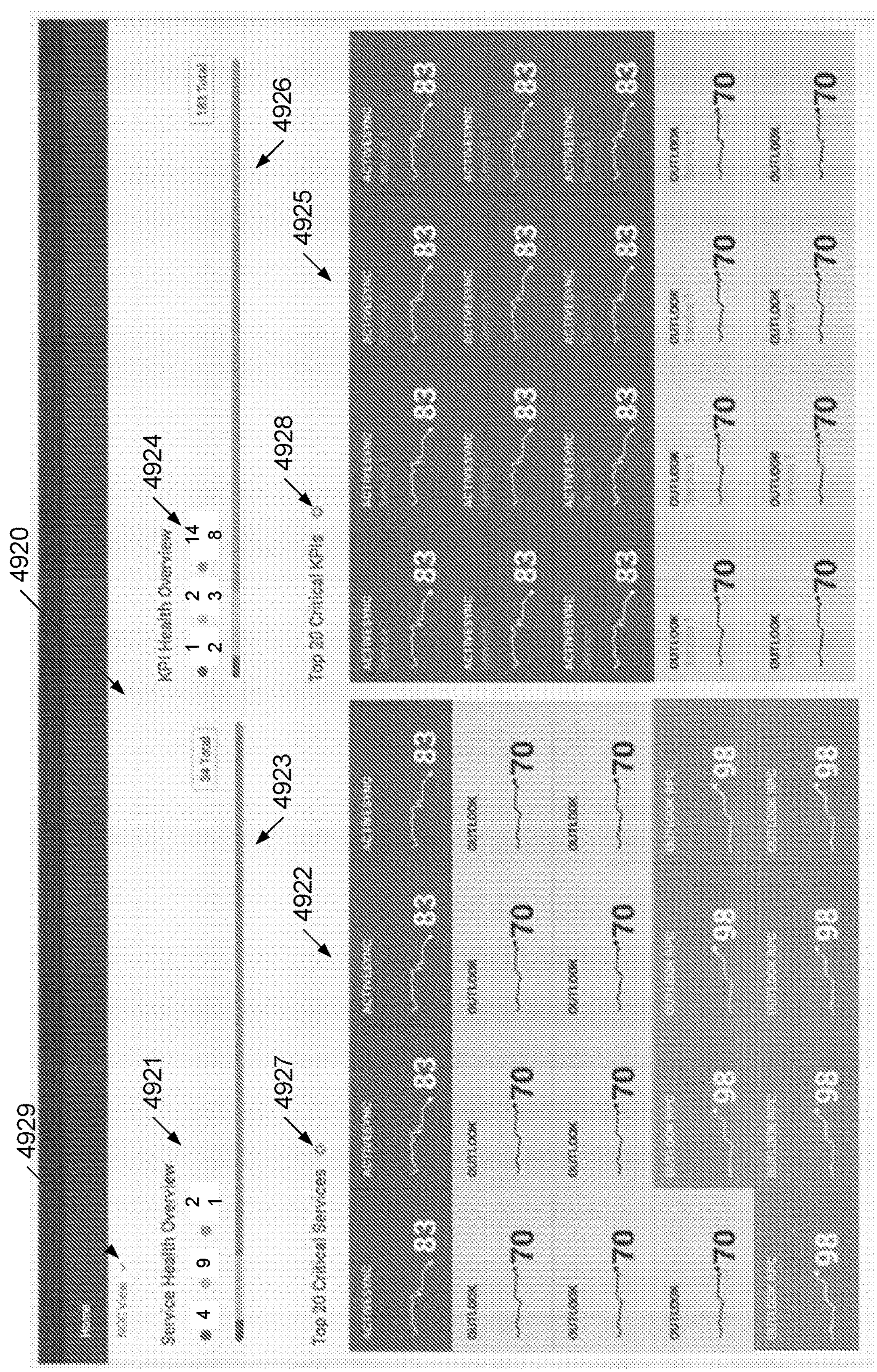

FIG. 49C illustrates an example of a service-monitoring page 4920, in accordance with one or more implementations of the present disclosure.

Figure 49D:
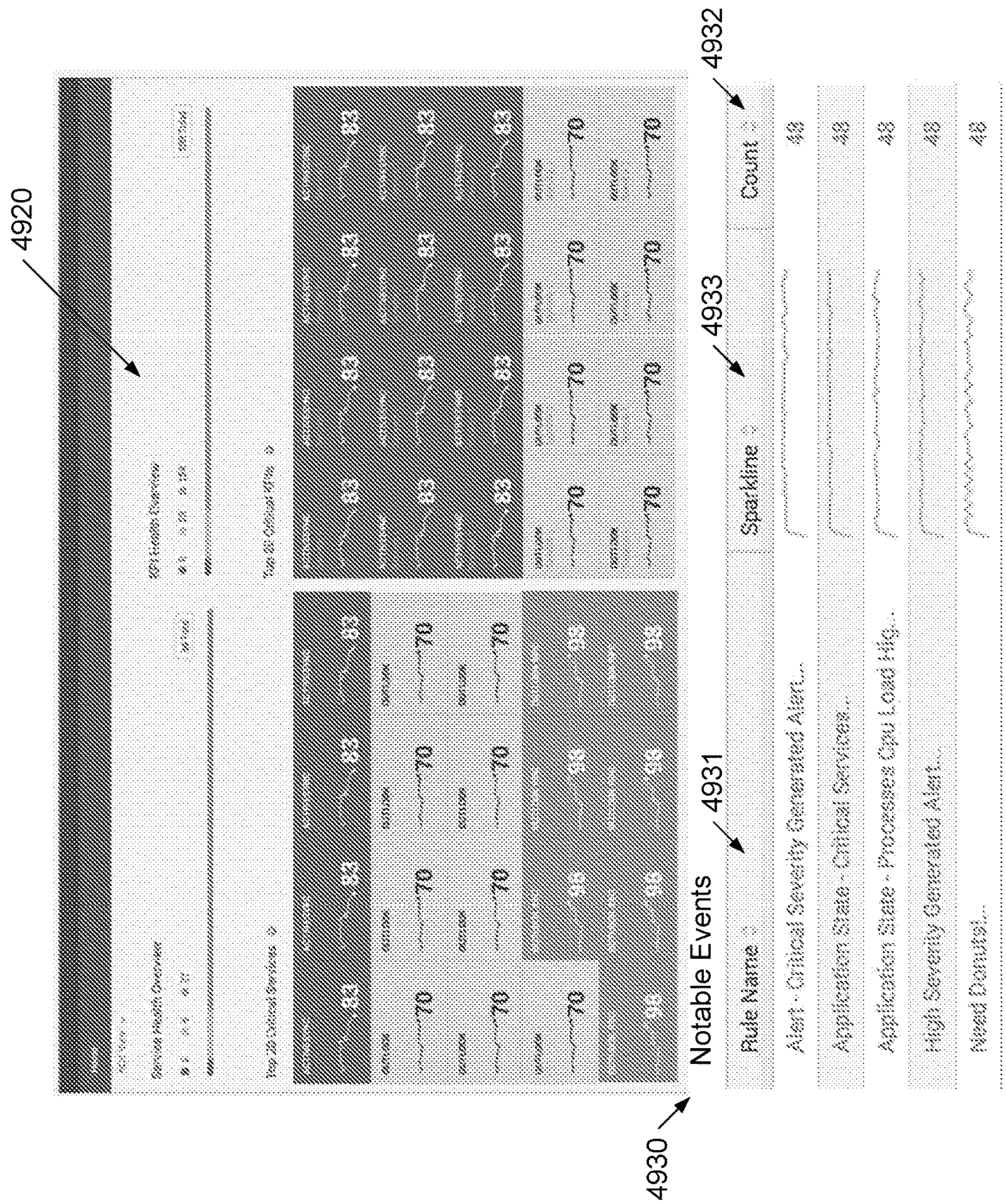

FIG. 49D illustrates an example of a service-monitoring page 4920 including a notable events region, in accordance with one or more implementations of the present disclosure.

Figure 49E:
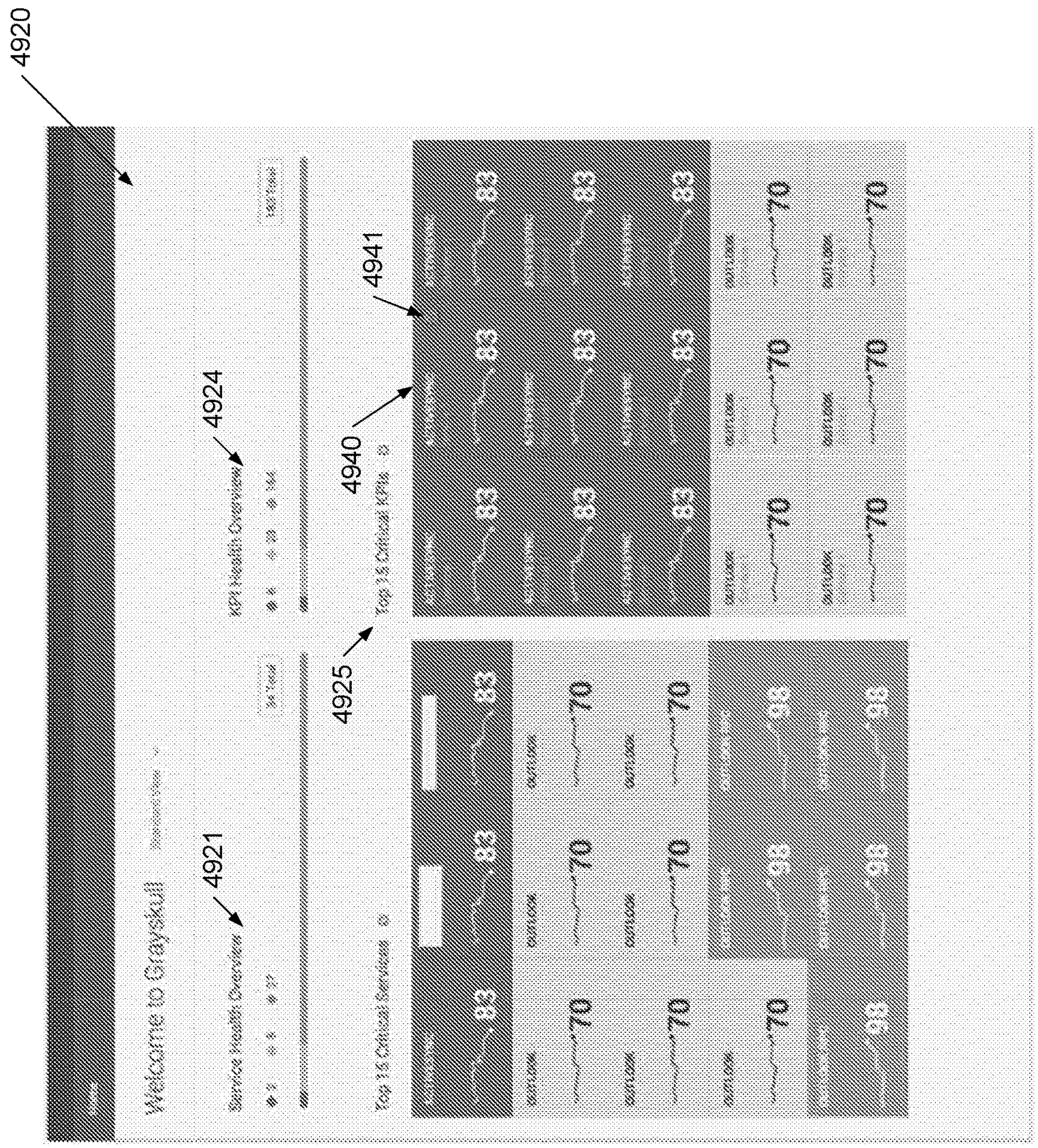
Figure 49F:
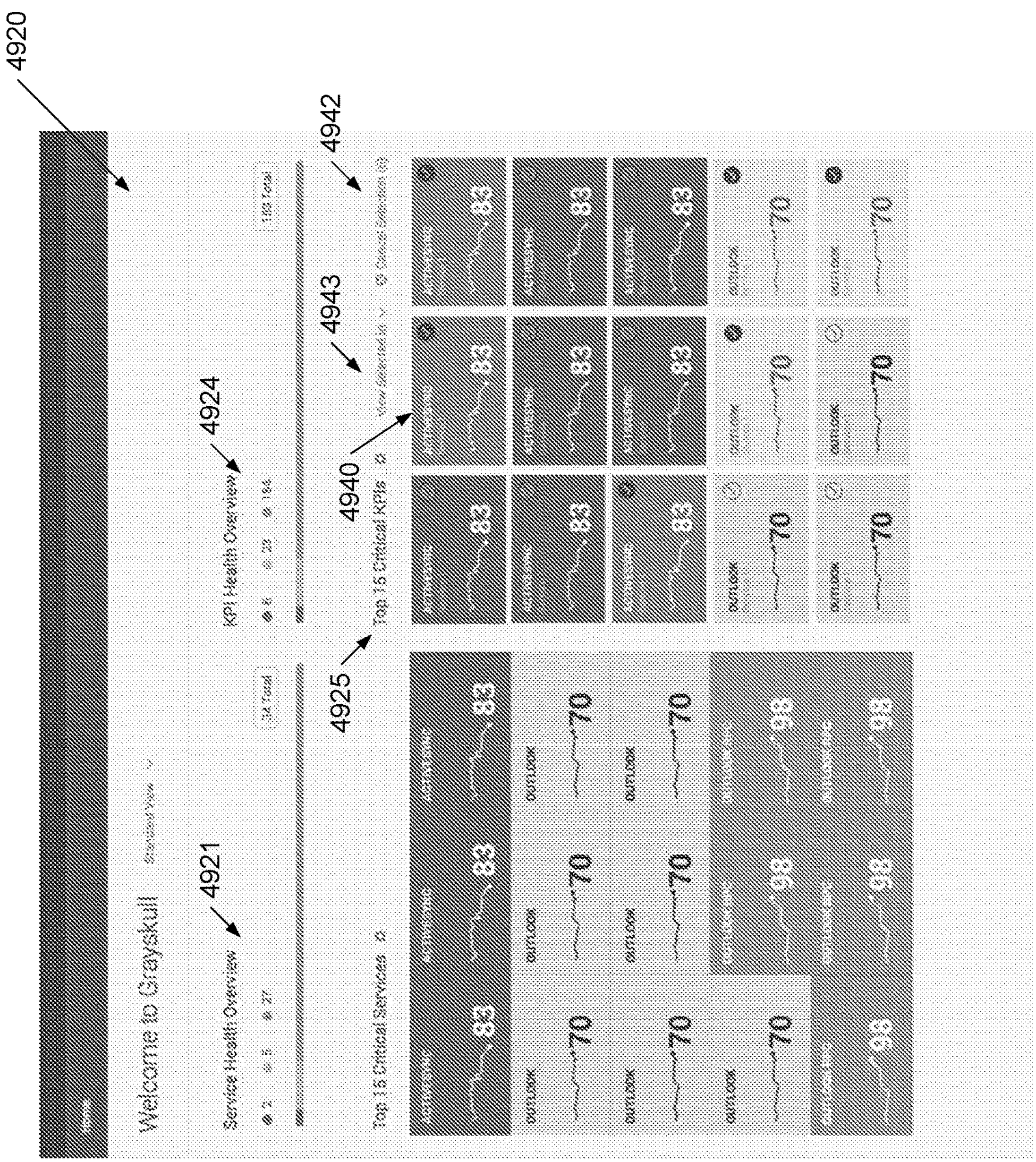

FIGS. 49E-F illustrate an example of a service-monitoring page, in accordance with one or more implementations of the present disclosure.

Figure 50A:
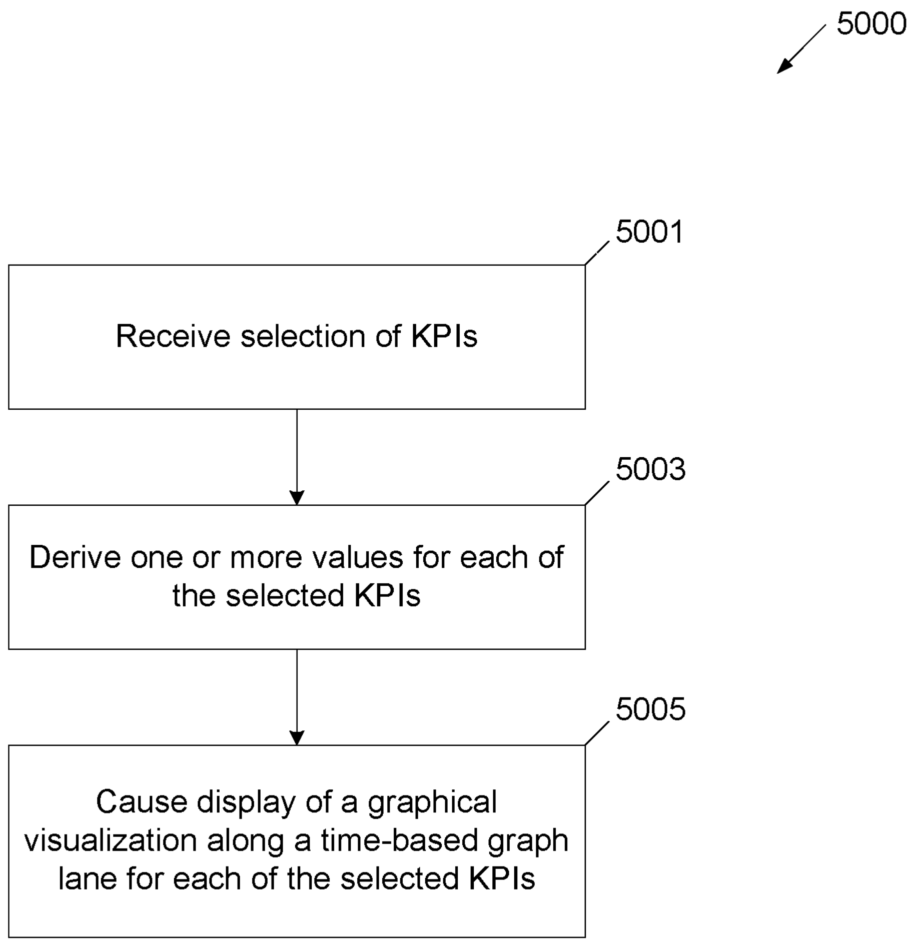

FIG. 50A is a flow diagram of an implementation of a method for creating a visual interface displaying graphical visualizations of KPI values along time-based graph lanes, in accordance with one or more implementations of the present disclosure.

Figure 50B:
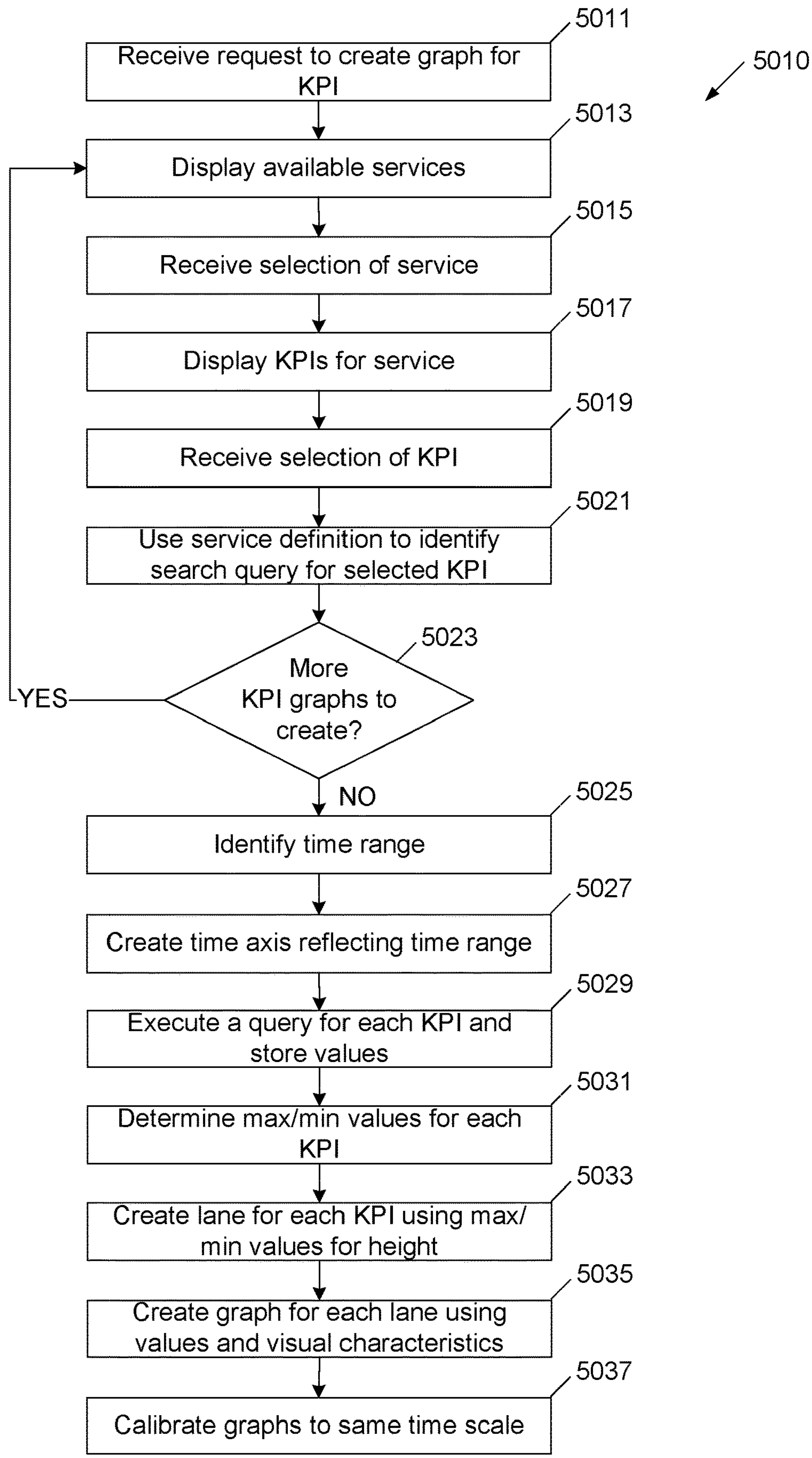

FIG. 50B is a flow diagram of an implementation of a method for generating a graphical visualization of KPI values along a time-based graph lane, in accordance with one or more implementations of the present disclosure.

Figure 51:
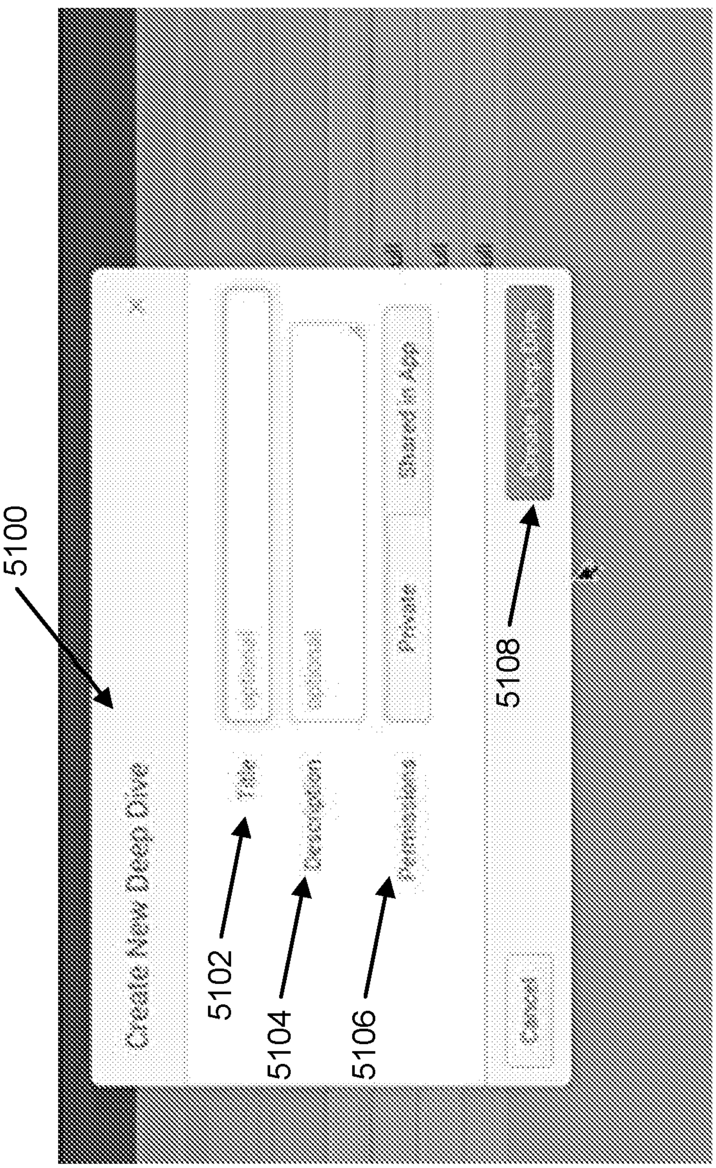

FIG. 51 illustrates an example of a graphical user interface (GUI) for creating a visual interface displaying graphical visualizations of KPI values along time-based graph lanes, in accordance with one or more implementations of the present disclosure.

Figure 52:
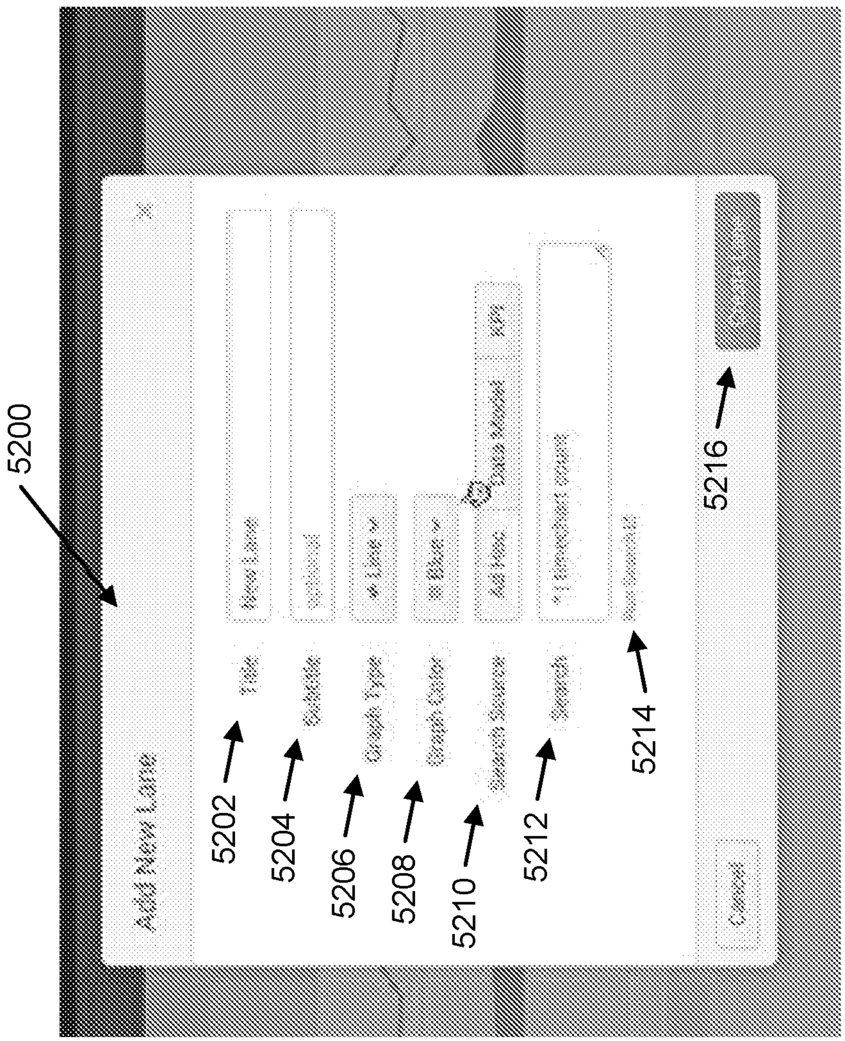

FIG. 52 illustrates an example of a GUI for adding a graphical visualization of KPI values along a time-based graph lane to a visual interface, in accordance with one or more implementations of the present disclosure.

Figure 53:
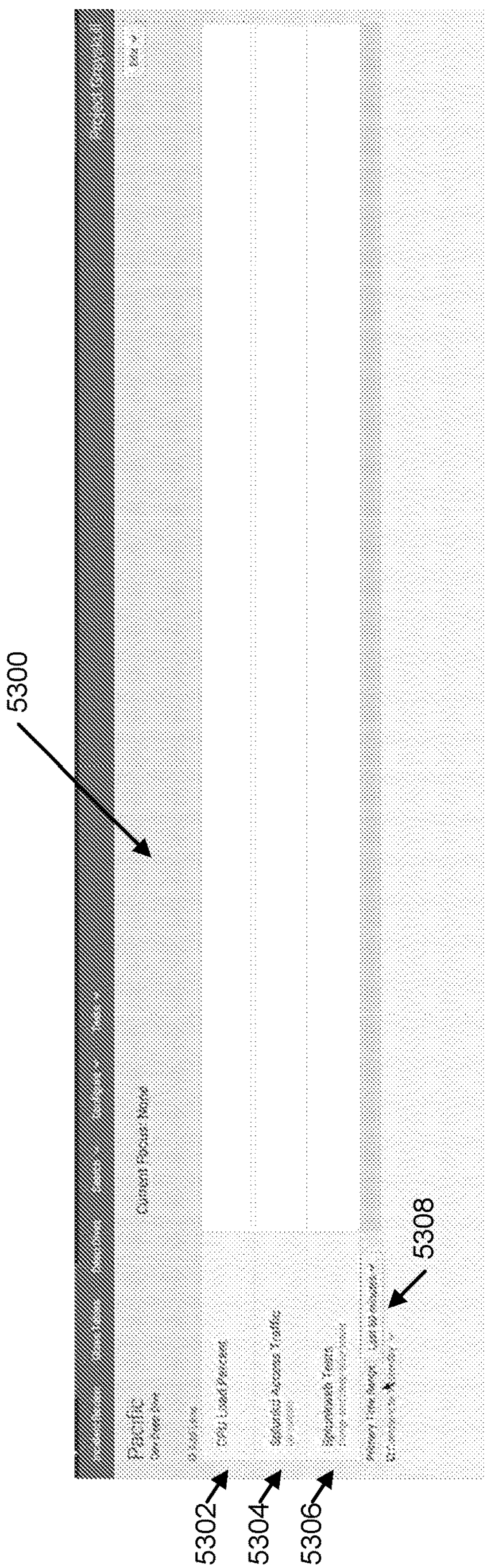

FIG. 53 illustrates an example of a visual interface with time-based graph lanes for displaying graphical visualizations, in accordance with one or more implementations of the present disclosure.

Figure 54:
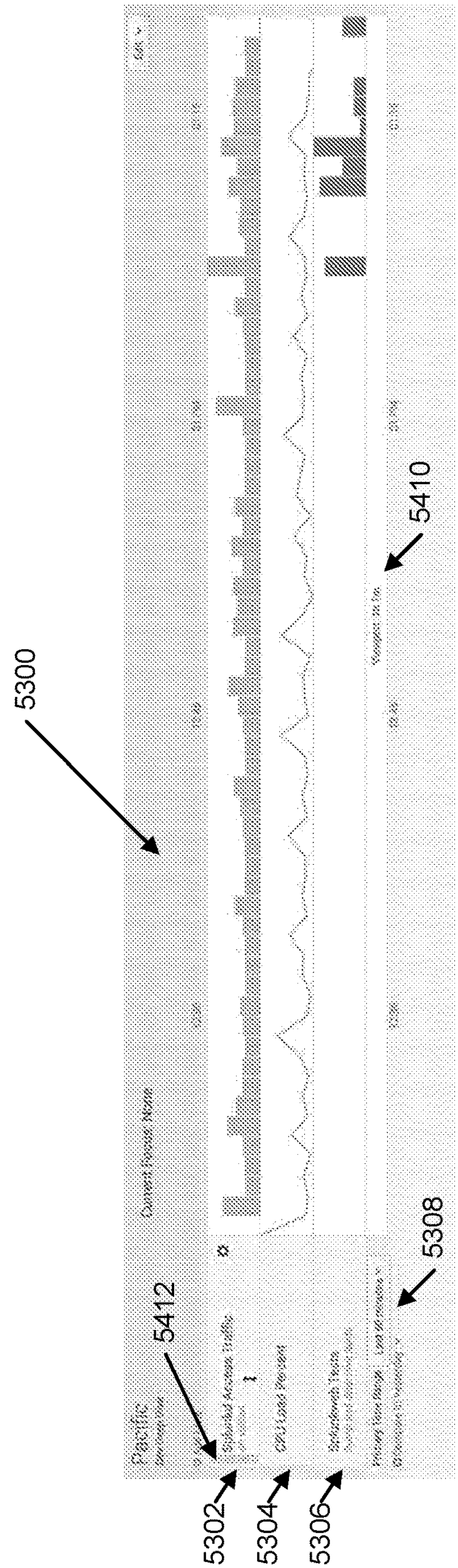

FIG. 54 illustrates an example of a visual interface displaying graphical visualizations of KPI values along time-based graph lanes, in accordance with one or more implementations of the present disclosure.

Figure 55A:
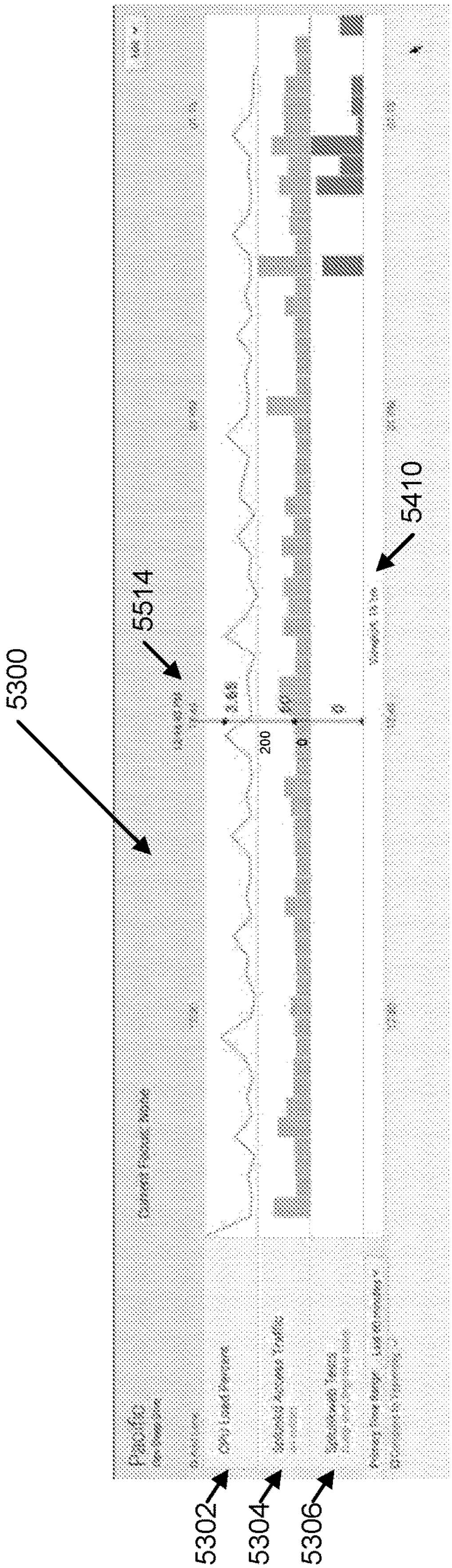

FIG. 55A illustrates an example of a visual interface with a user manipulable visual indicator spanning across the time-based graph lanes, in accordance with one or more implementations of the present disclosure.

Figure 55B:
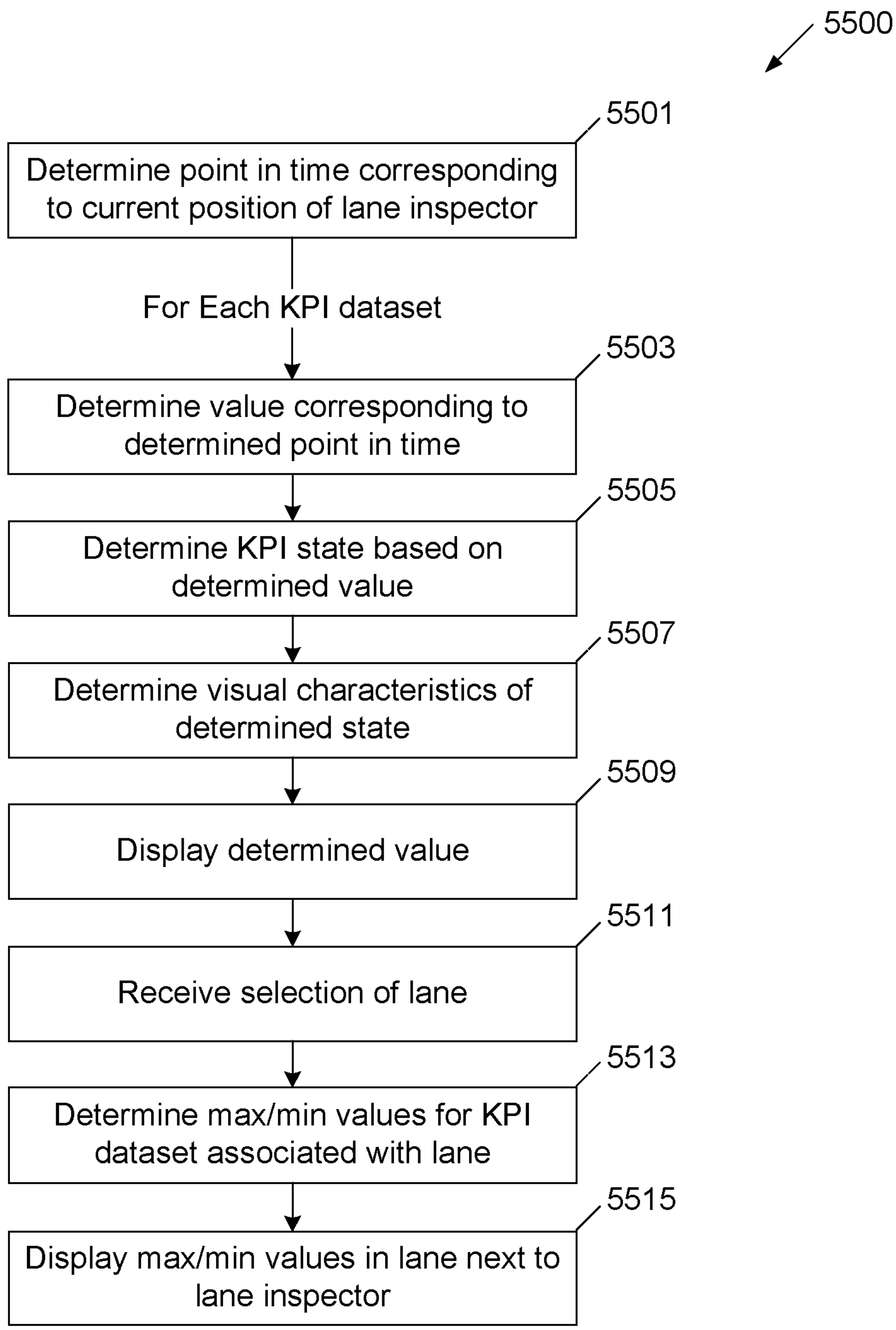

FIG. 55B is a flow diagram of an implementation of a method for inspecting graphical visualizations of KPI values along a time-based graph lane, in accordance with one or more implementations of the present disclosure.

Figure 55C:
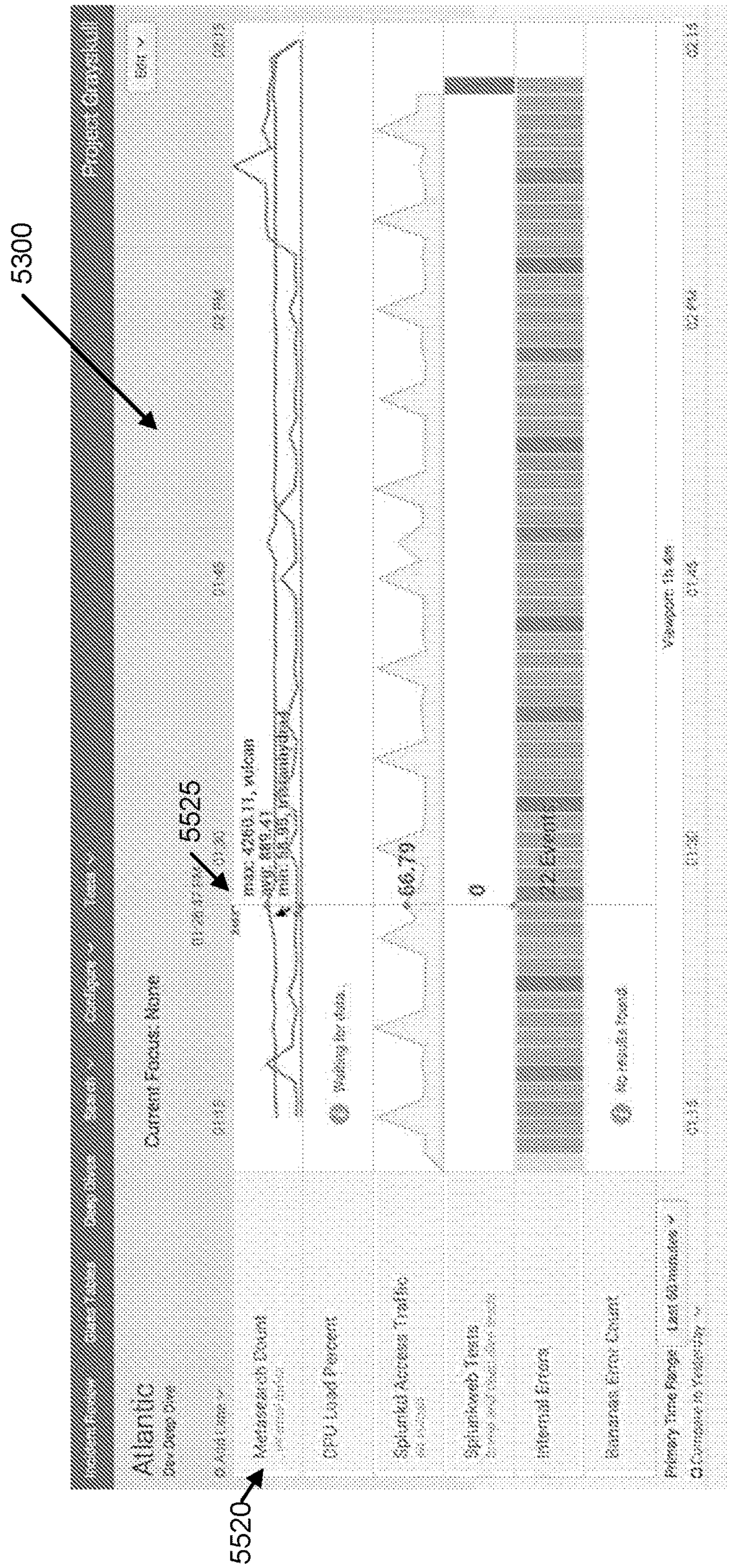

FIG. 55C illustrates an example of a visual interface with a user manipulable visual indicator spanning across multi-series time-based graph lanes, in accordance with one or more implementations of the present disclosure.

Figure 56:
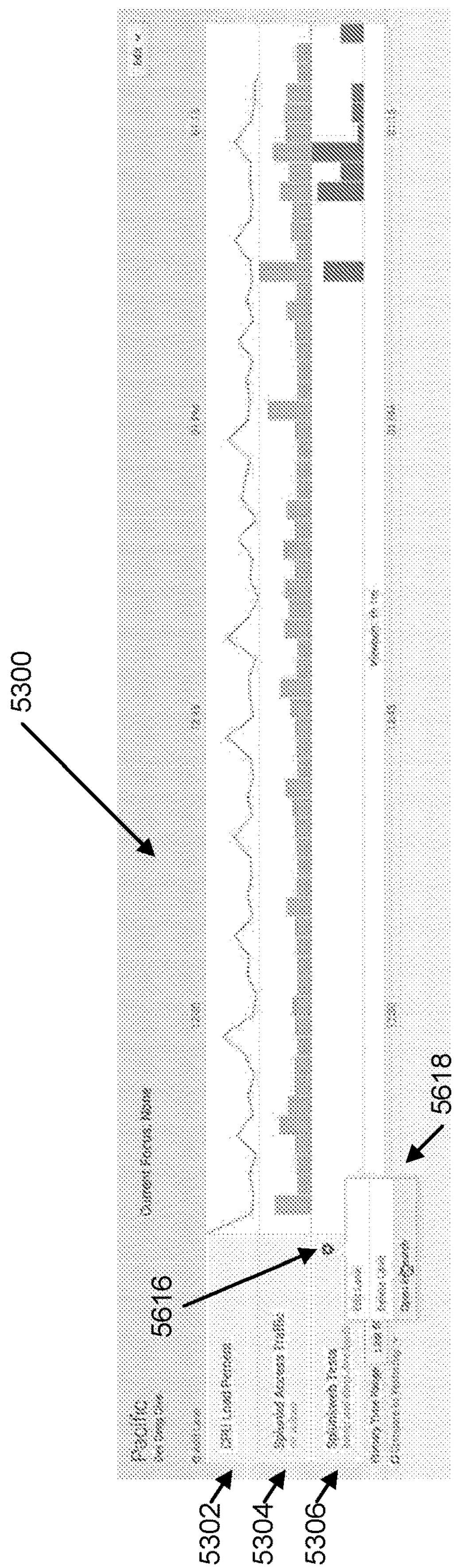

FIG. 56 illustrates an example of a visual interface displaying graphical visualizations of KPI values along time-based graph lanes with options for editing the graphical visualizations, in accordance with one or more implementations of the present disclosure.

Figure 57:
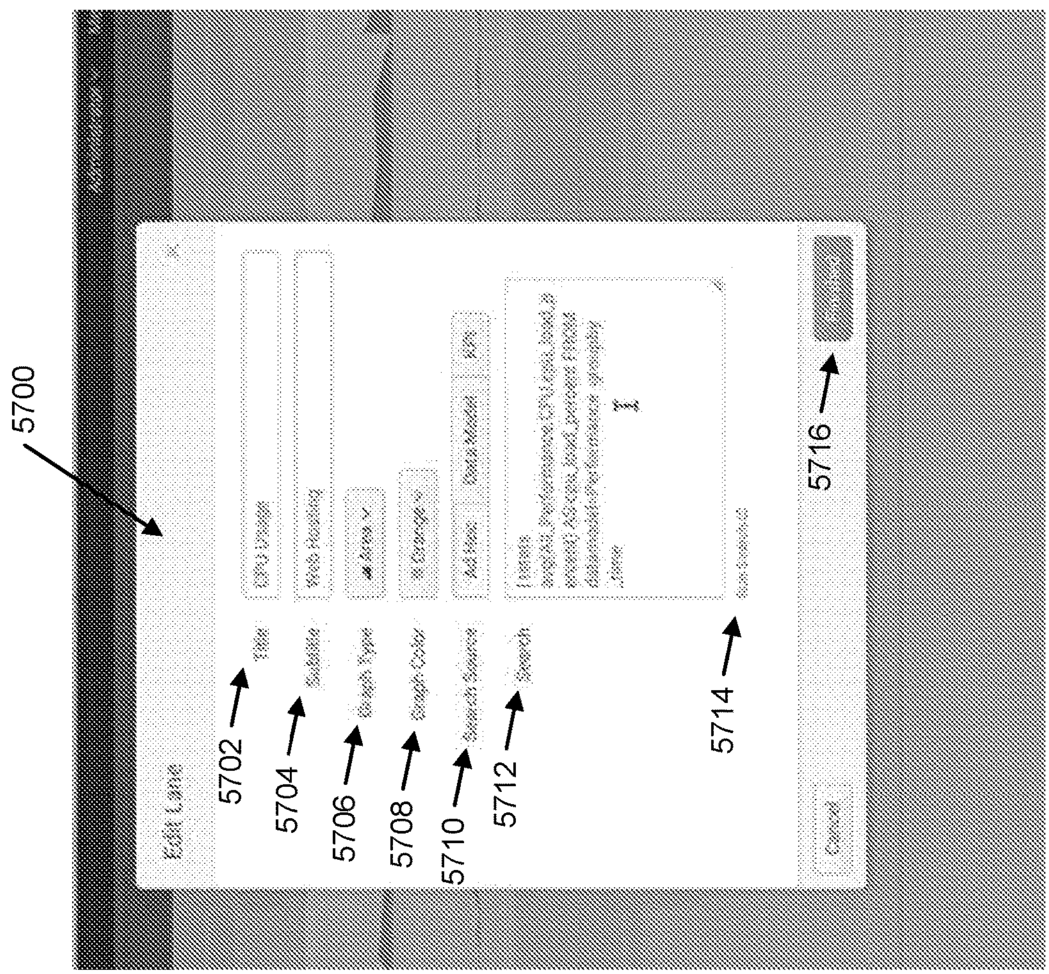

FIG. 57 illustrates an example of a GUI for editing a graphical visualization of KPI values along a time-based graph lane in a visual interface, in accordance with one or more implementations of the present disclosure.

Figure 58:
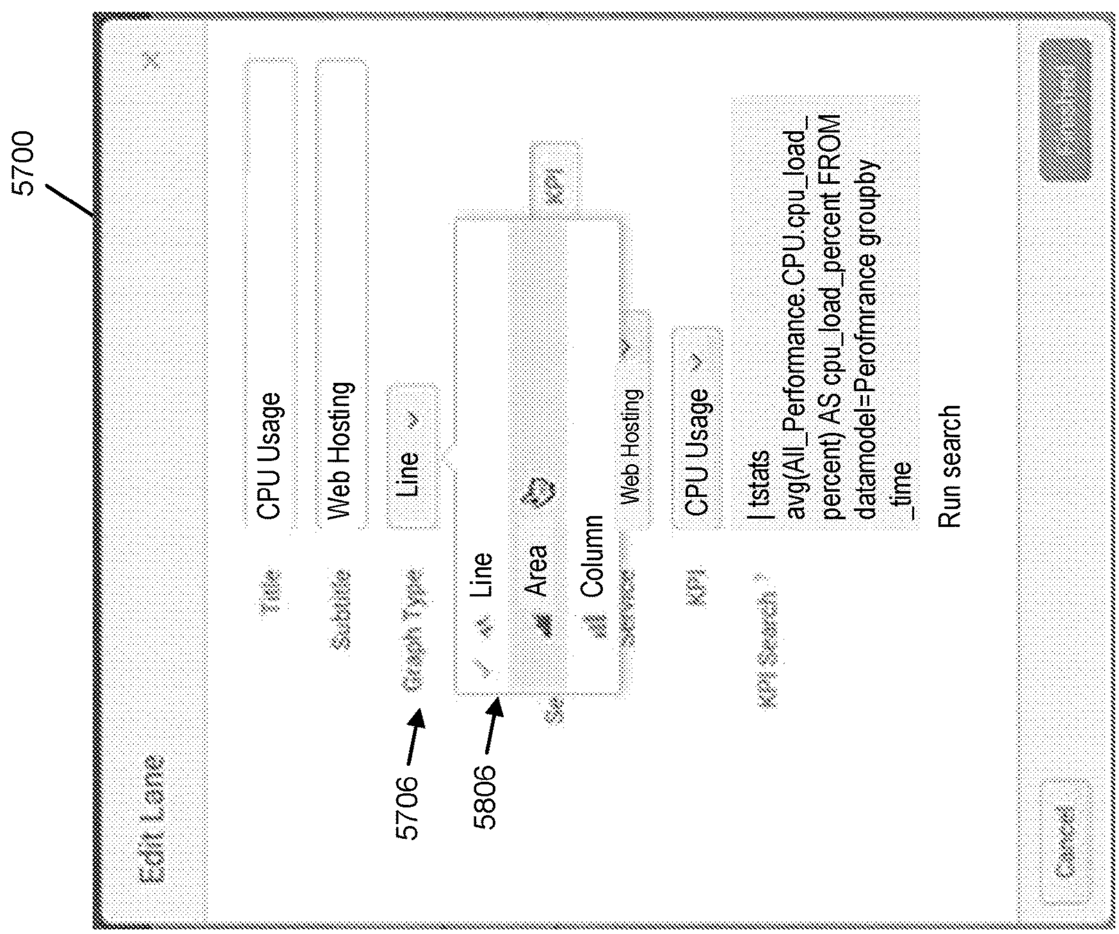

FIG. 58 illustrates an example of a GUI for editing a graph style of a graphical visualization of KPI values along a time-based graph lane in a visual interface, in accordance with one or more implementations of the present disclosure.

Figure 59:
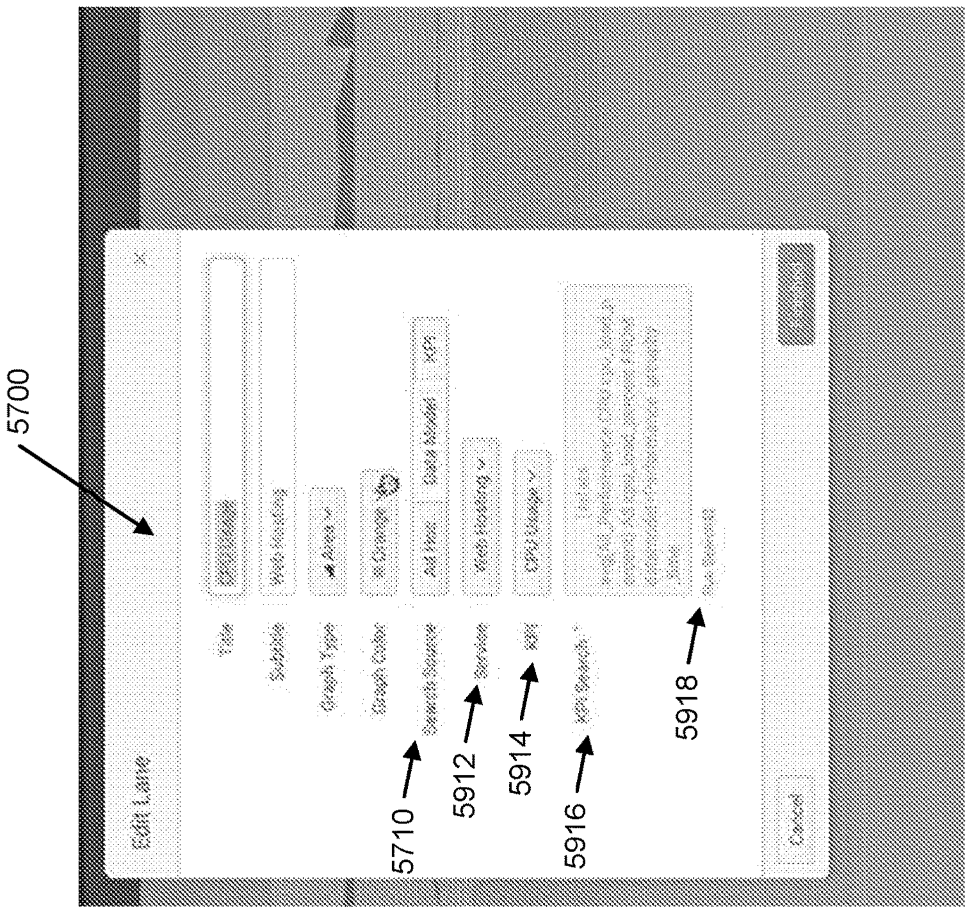

FIG. 59 illustrates an example of a GUI for selecting the KPI corresponding to a graphical visualization along a time-based graph lane in a visual interface, in accordance with one or more implementations of the present disclosure.

Figure 60:
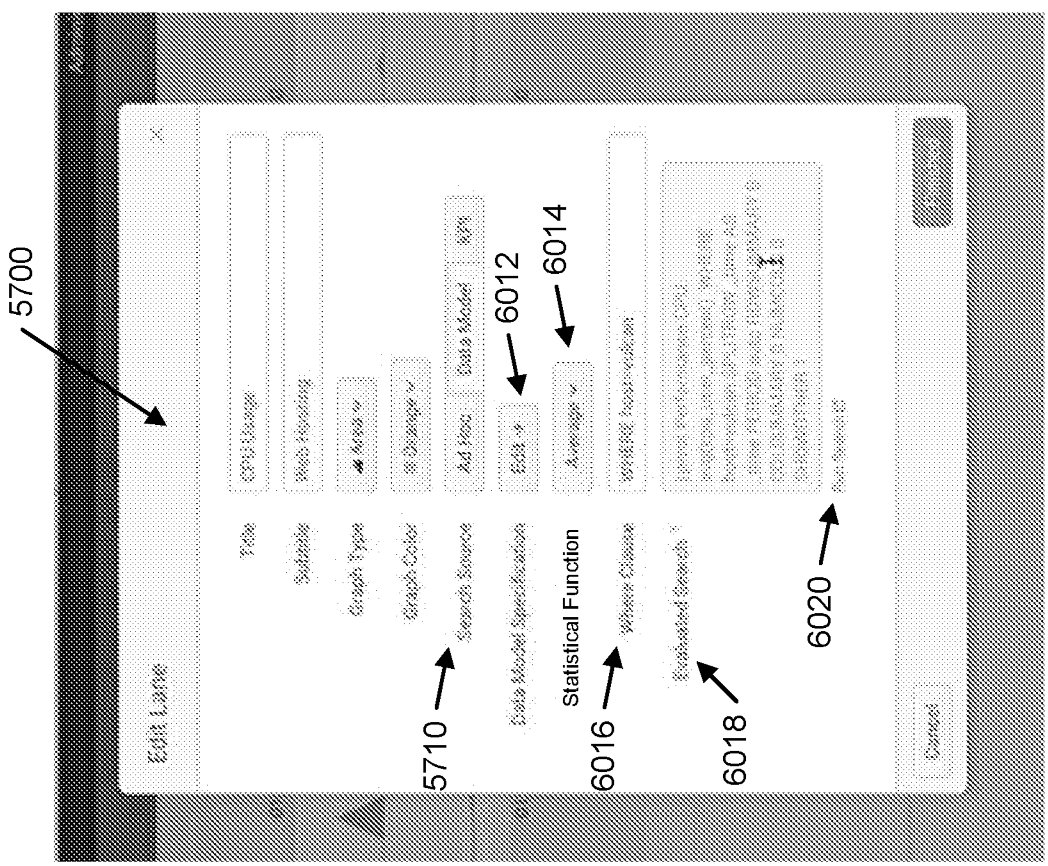

FIG. 60 illustrates an example of a GUI for selecting a data model corresponding to a graphical visualization along a time-based graph lane in a visual interface, in accordance with one or more implementations of the present disclosure.

Figure 61:
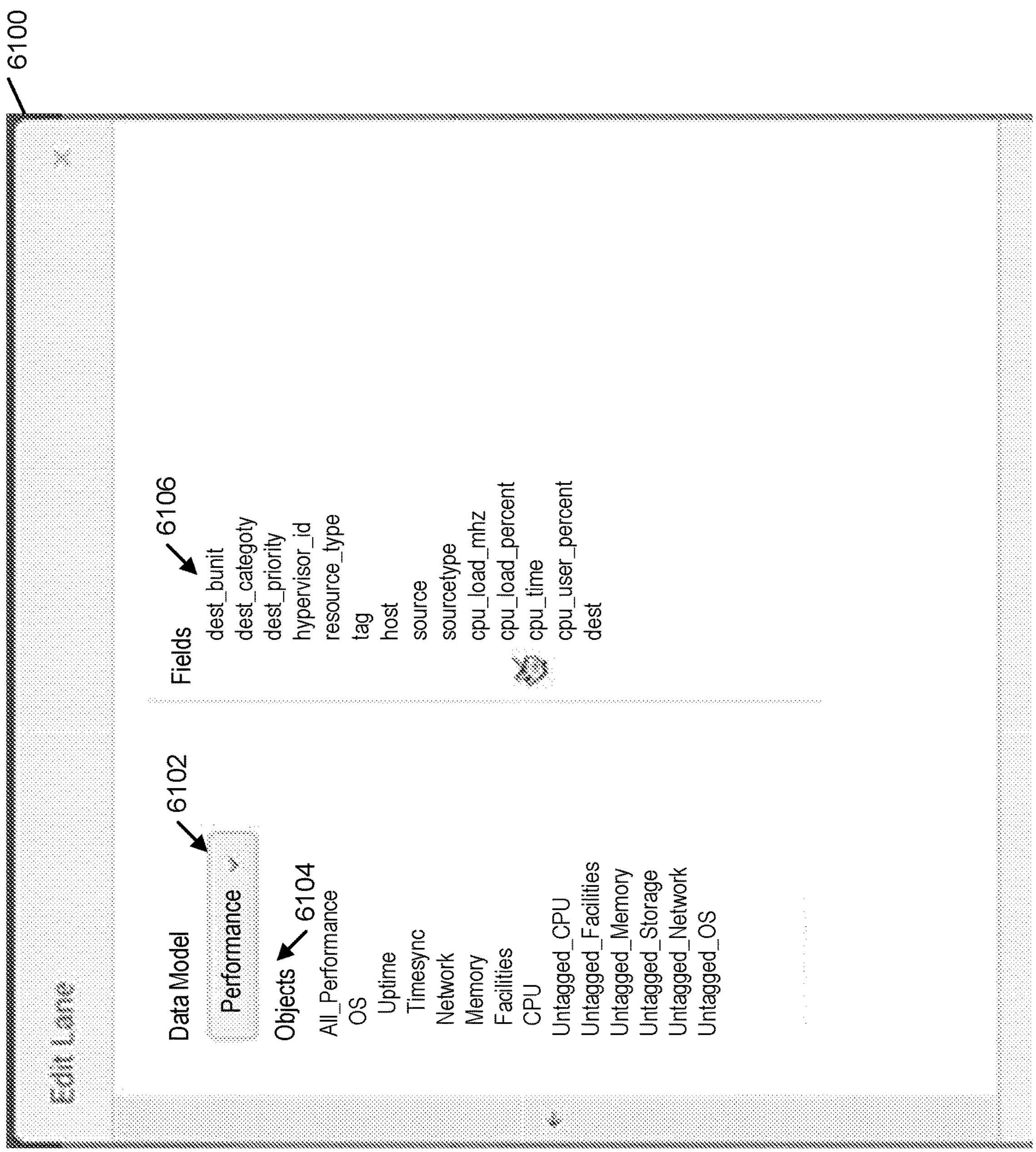

FIG. 61 illustrates an example of a GUI for selecting a data model corresponding to a graphical visualization along a time-based graph lane in a visual interface, in accordance with one or more implementations of the present disclosure.

Figure 62A:
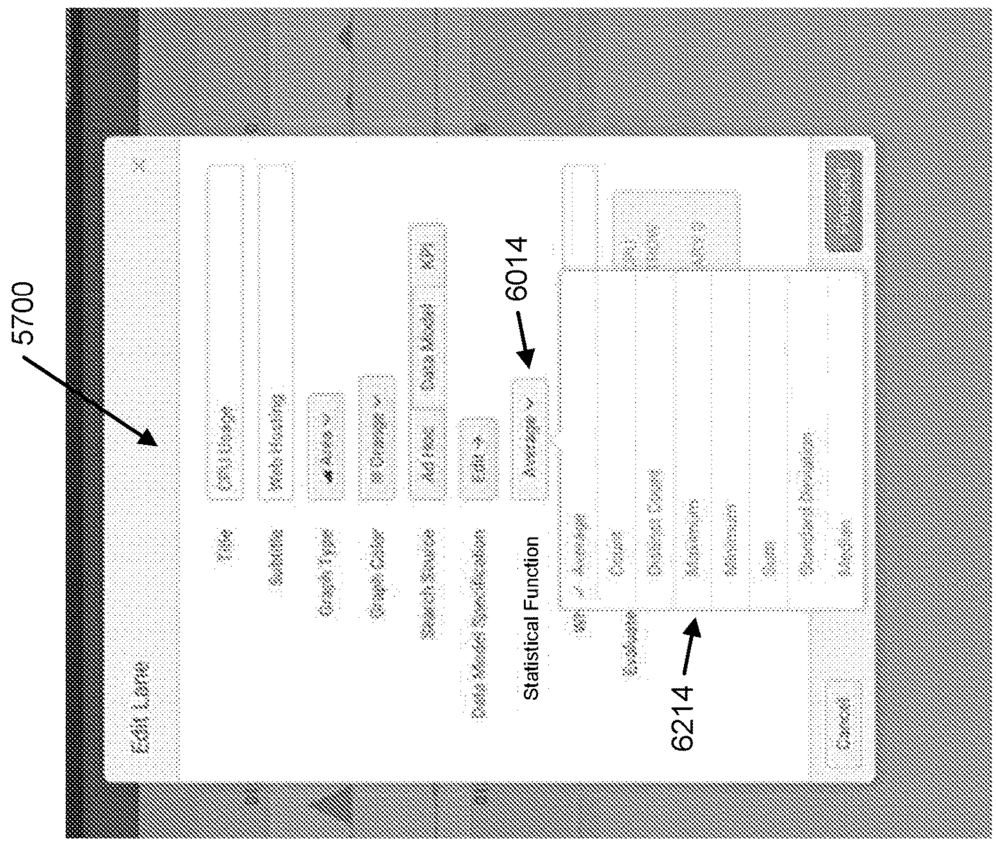

FIG. 62A illustrates an example of a GUI for editing an aggregation operation for a data model corresponding to a graphical visualization along a time-based graph lane in a visual interface, in accordance with one or more implementations of the present disclosure.

Figure 62B:
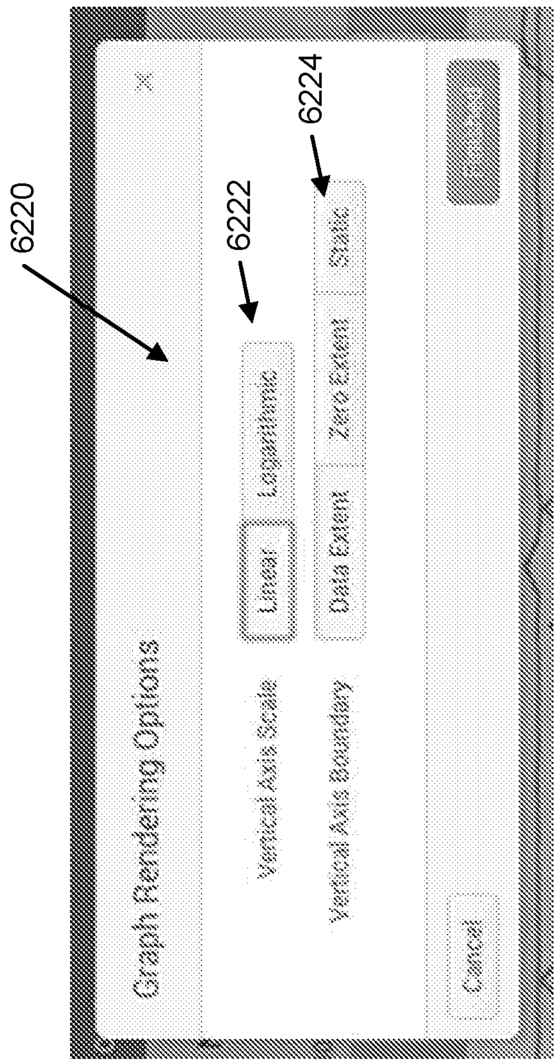

FIG. 62B illustrates an example of a GUI for editing a graphical visualization of KPI values along a time-based graph lane in a visual interface, in accordance with one or more implementations of the present disclosure.

Figure 63:
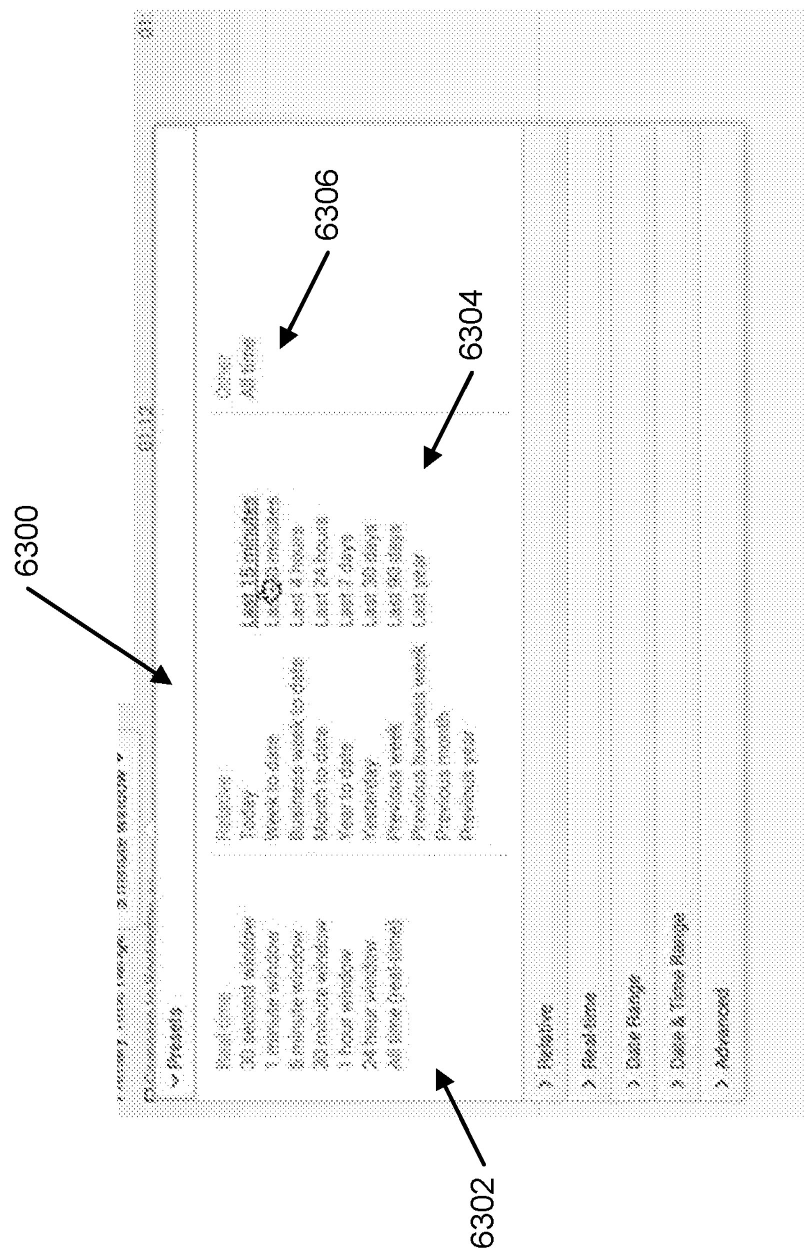

FIG. 63 illustrates an example of a GUI for selecting a time range that graphical visualizations along a time-based graph lane in a visual interface should cover, in accordance with one or more implementations of the present disclosure.

Figure 64A:
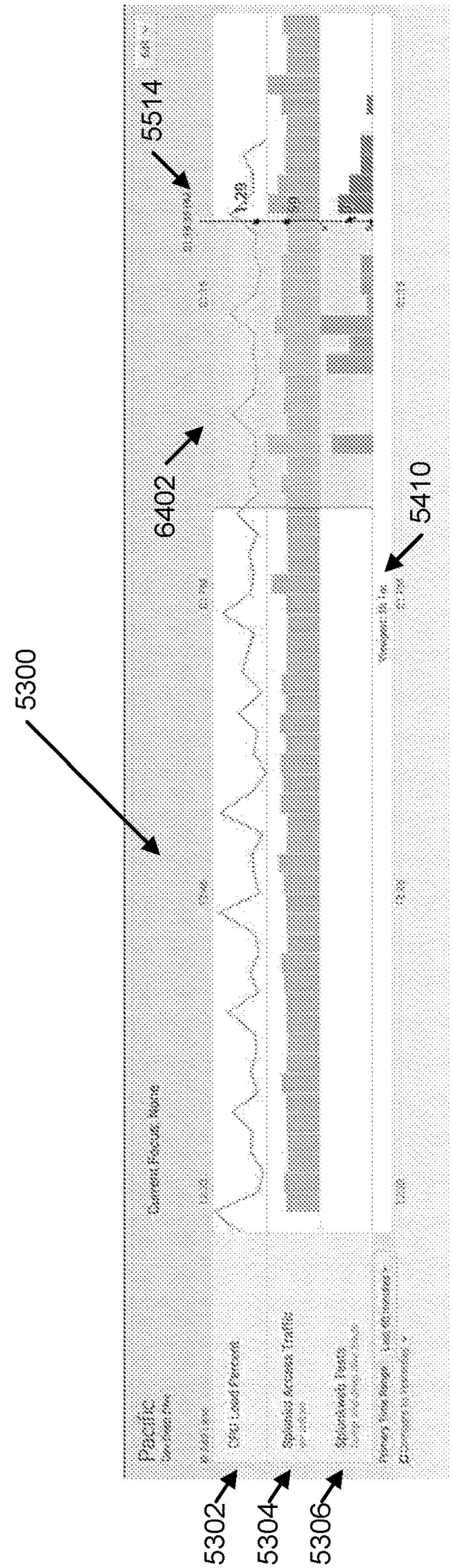

FIG. 64A illustrates an example of a visual interface for selecting a subset of a time range that graphical visualizations along a time-based graph lane in a visual interface cover, in accordance with one or more implementations of the present disclosure.

Figure 64B:
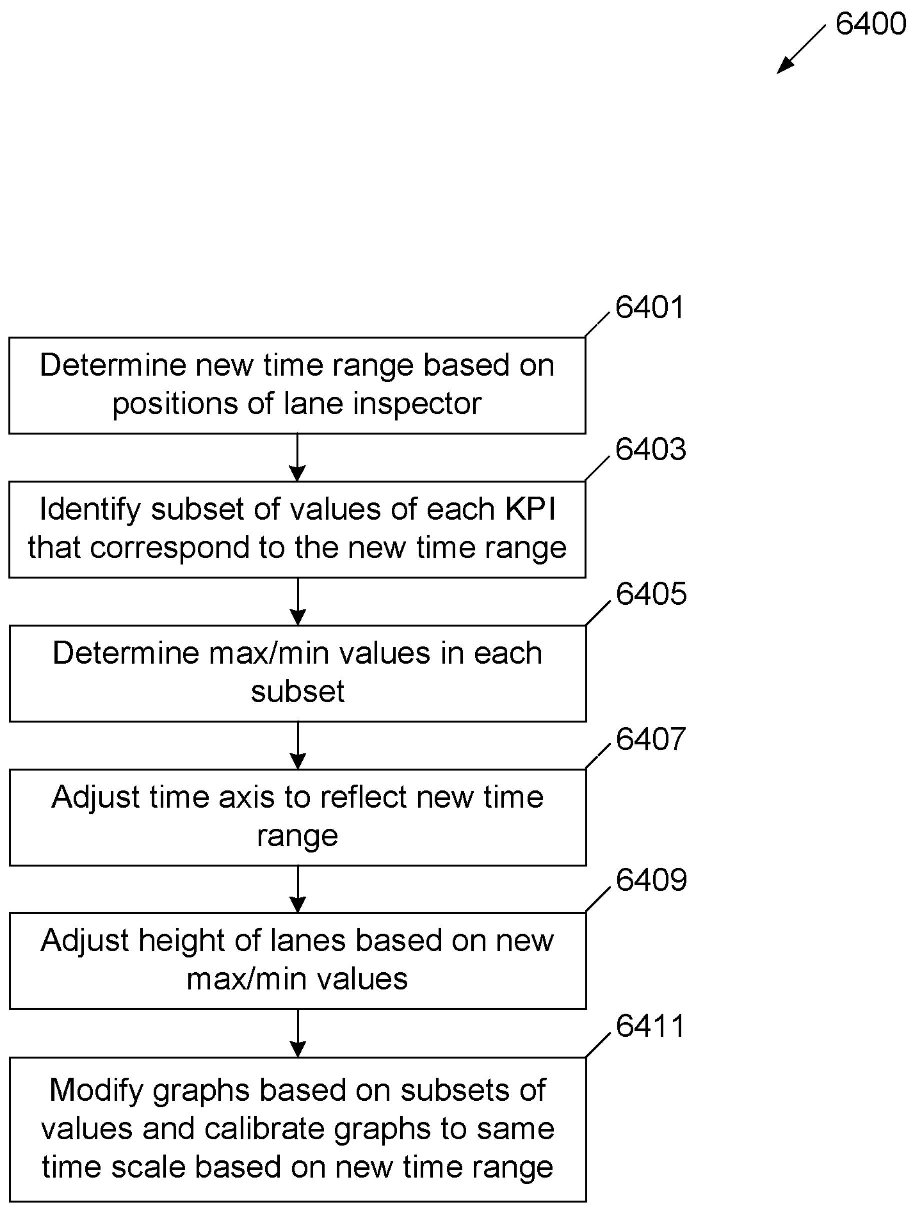

FIG. 64B is a flow diagram of an implementation of a method for enhancing a view of a subset a subset of a time range for a time-based graph lane, in accordance with one or more implementations of the present disclosure.

Figure 65:
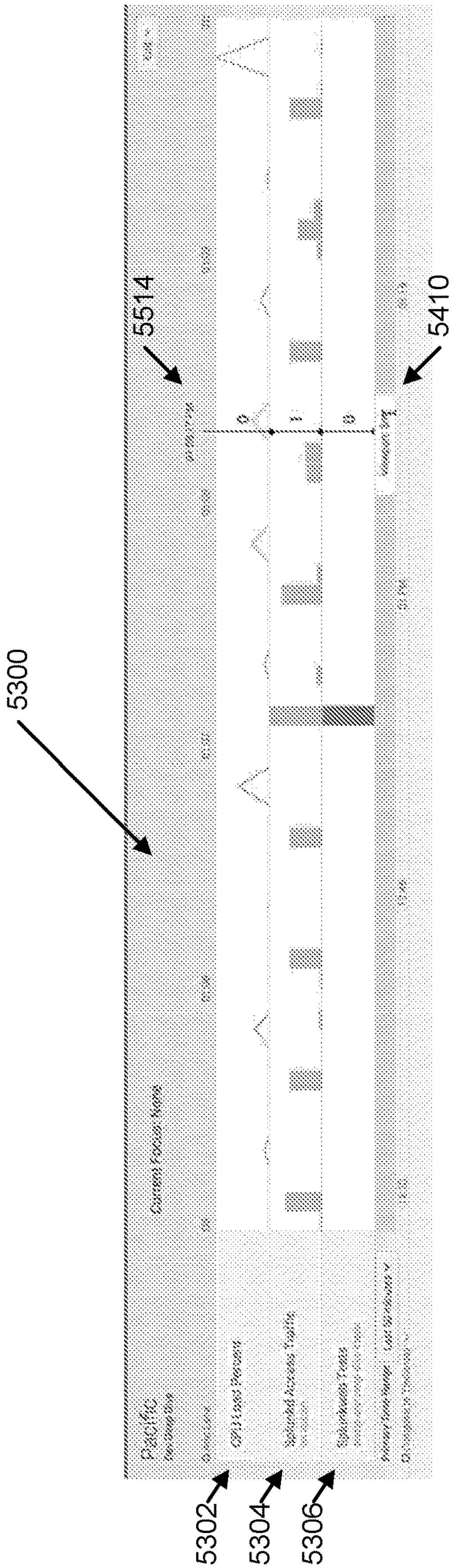

FIG. 65 illustrates an example of a visual interface displaying graphical visualizations of KPI values along time-based graph lanes for a selected subset of a time range, in accordance with one or more implementations of the present disclosure.

Figure 66:
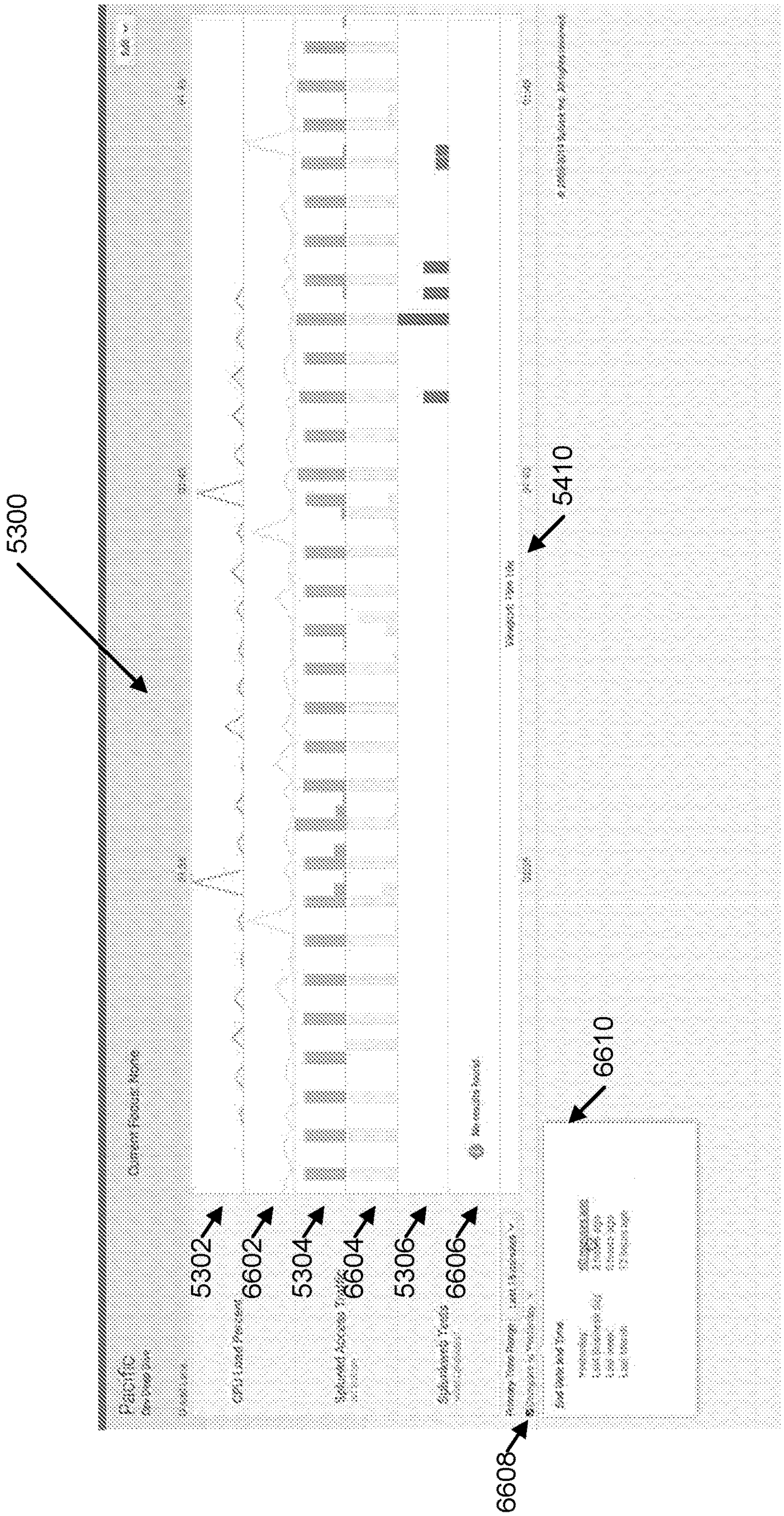

FIG. 66 illustrates an example of a visual interface displaying twin graphical visualizations of KPI values along time-based graph lanes for different periods of time, in accordance with one or more implementations of the present disclosure.

Figure 67:
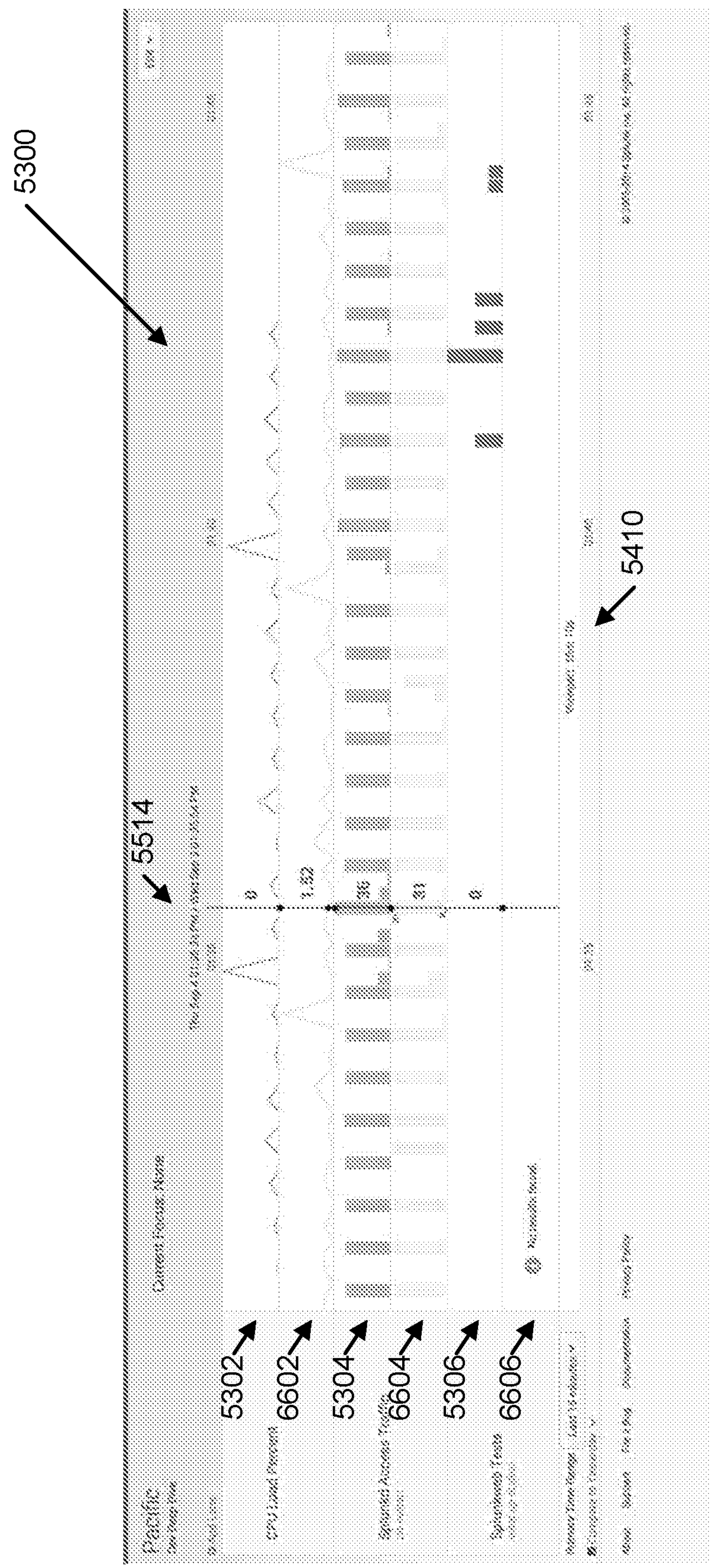

FIG. 67 illustrates an example of a visual interface with a user manipulable visual indicator spanning across twin graphical visualizations of KPI values along time-based graph lanes for different periods of time, in accordance with one or more implementations of the present disclosure.

Figure 68A:
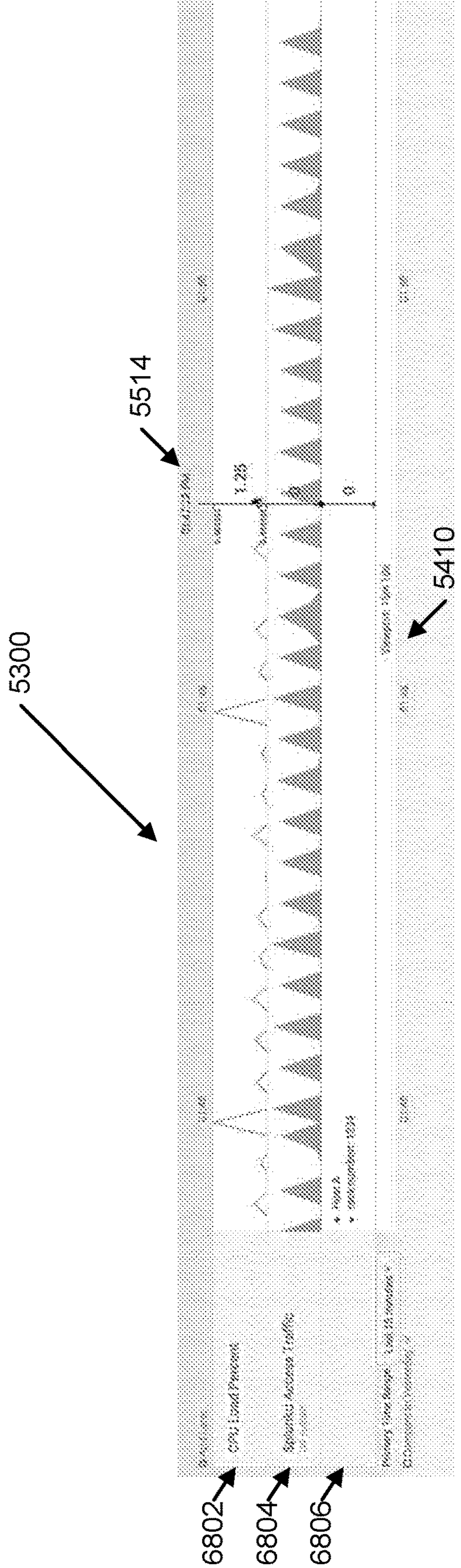

FIG. 68A illustrates an example of a visual interface displaying a graph lane with inventory information for a service or entities reflected by KPI values, in accordance with one or more implementations of the present disclosure.

Figure 68B:
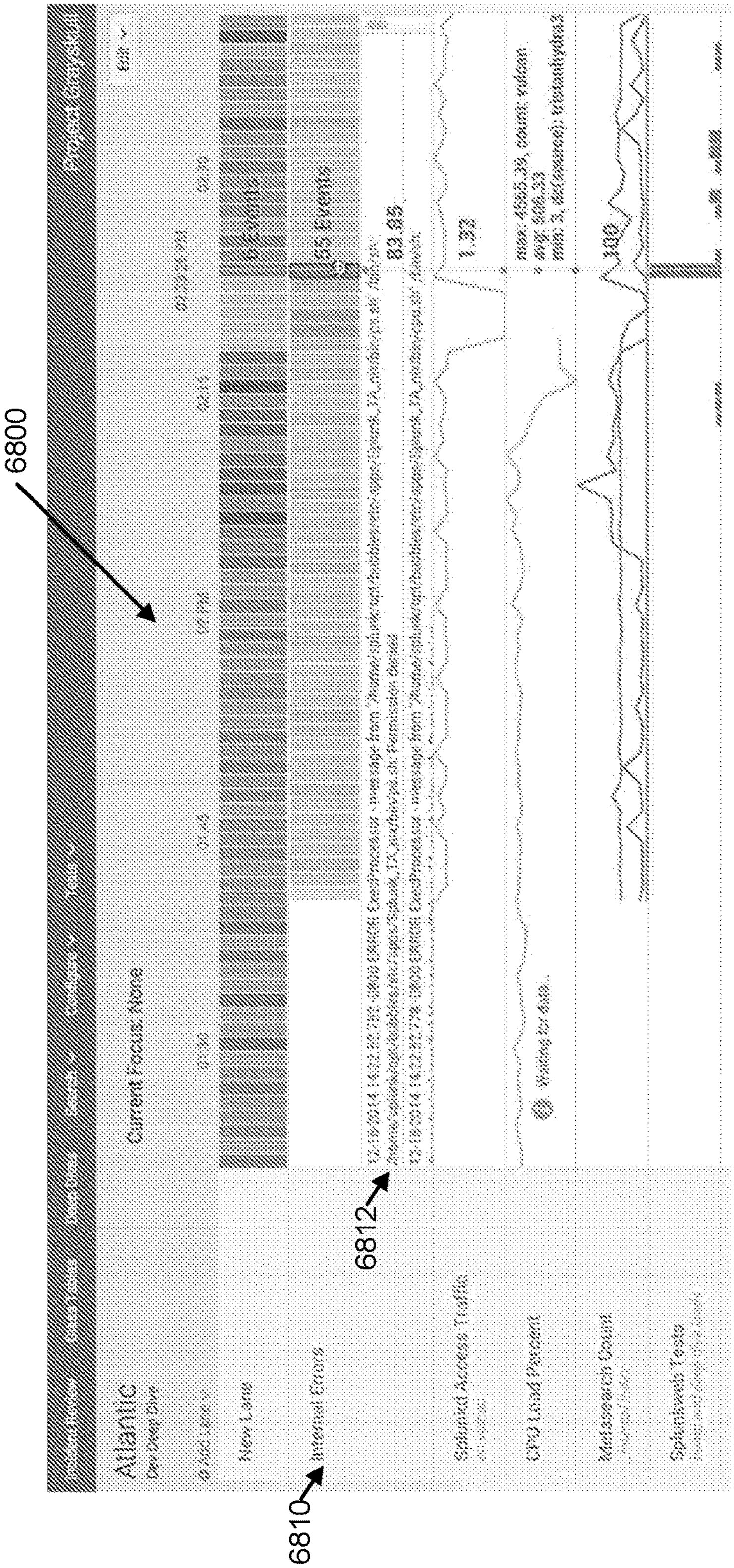

FIG. 68B illustrates an example of a visual interface displaying an event graph lane with event information in an additional lane, in accordance with one or more implementations of the present disclosure.

Figure 69:
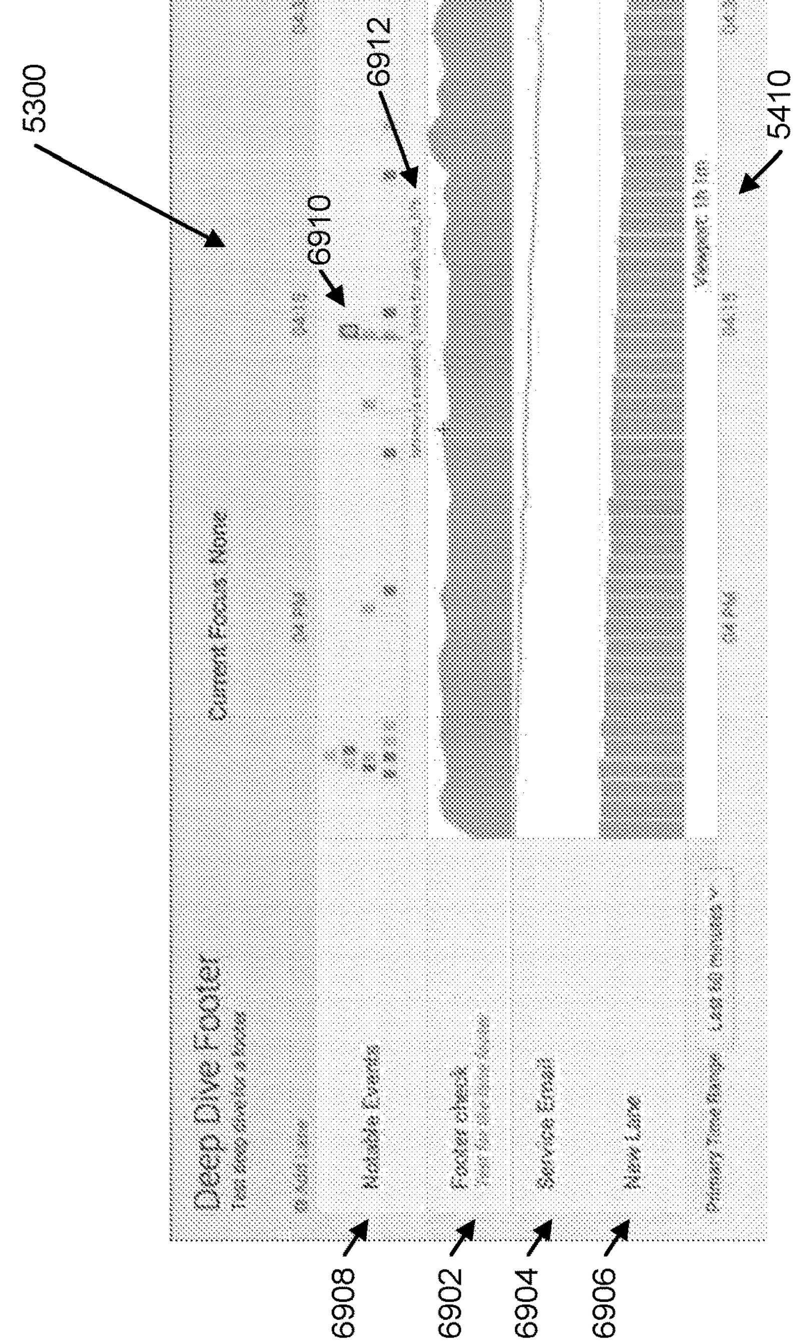

FIG. 69 illustrates an example of a visual interface displaying a graph lane with notable events occurring during a timer period covered by graphical visualization of KPI values, in accordance with one or more implementations of the present disclosure.

Figure 70:
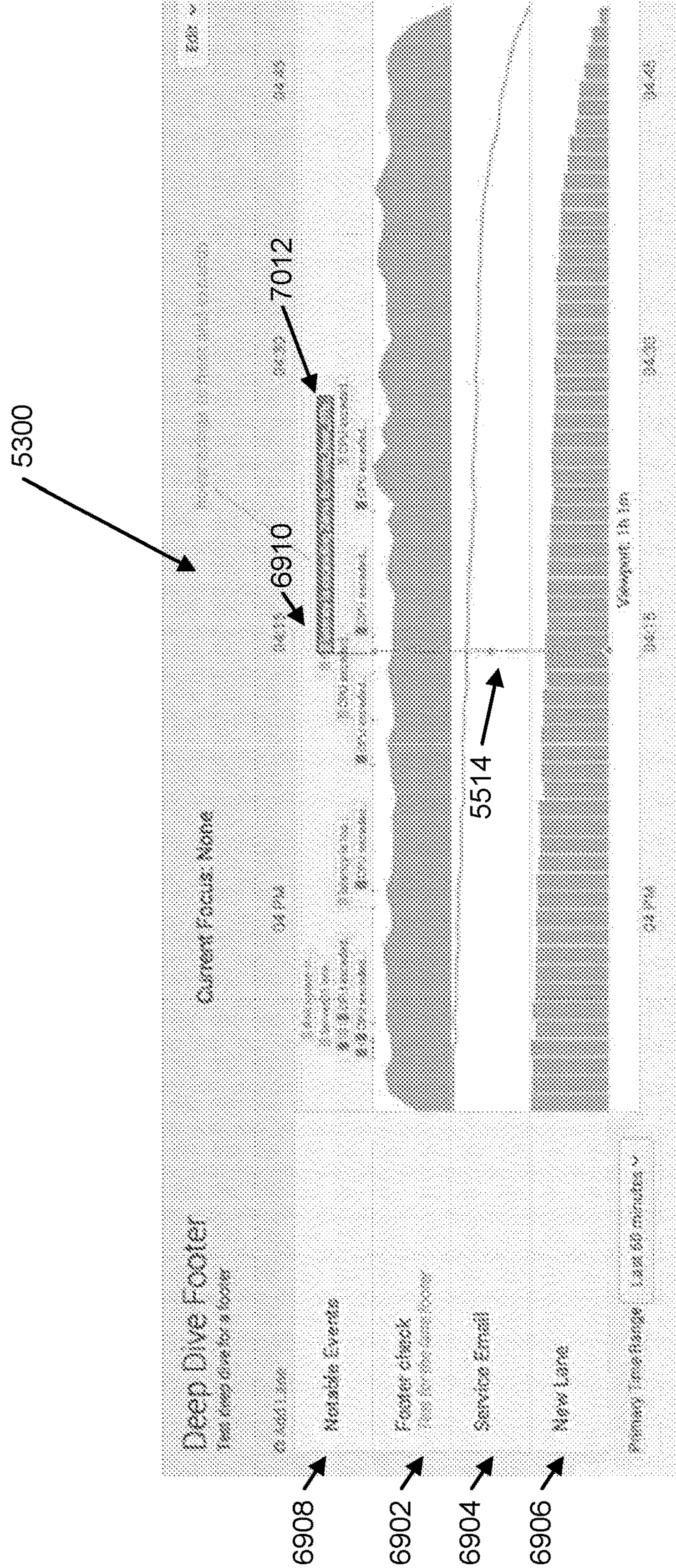

FIG. 70 illustrates an example of a visual interface displaying a graph lane with notable events occurring during a timer period covered by graphical visualization of KPI values, in accordance with one or more implementations of the present disclosure.

Figure 71:
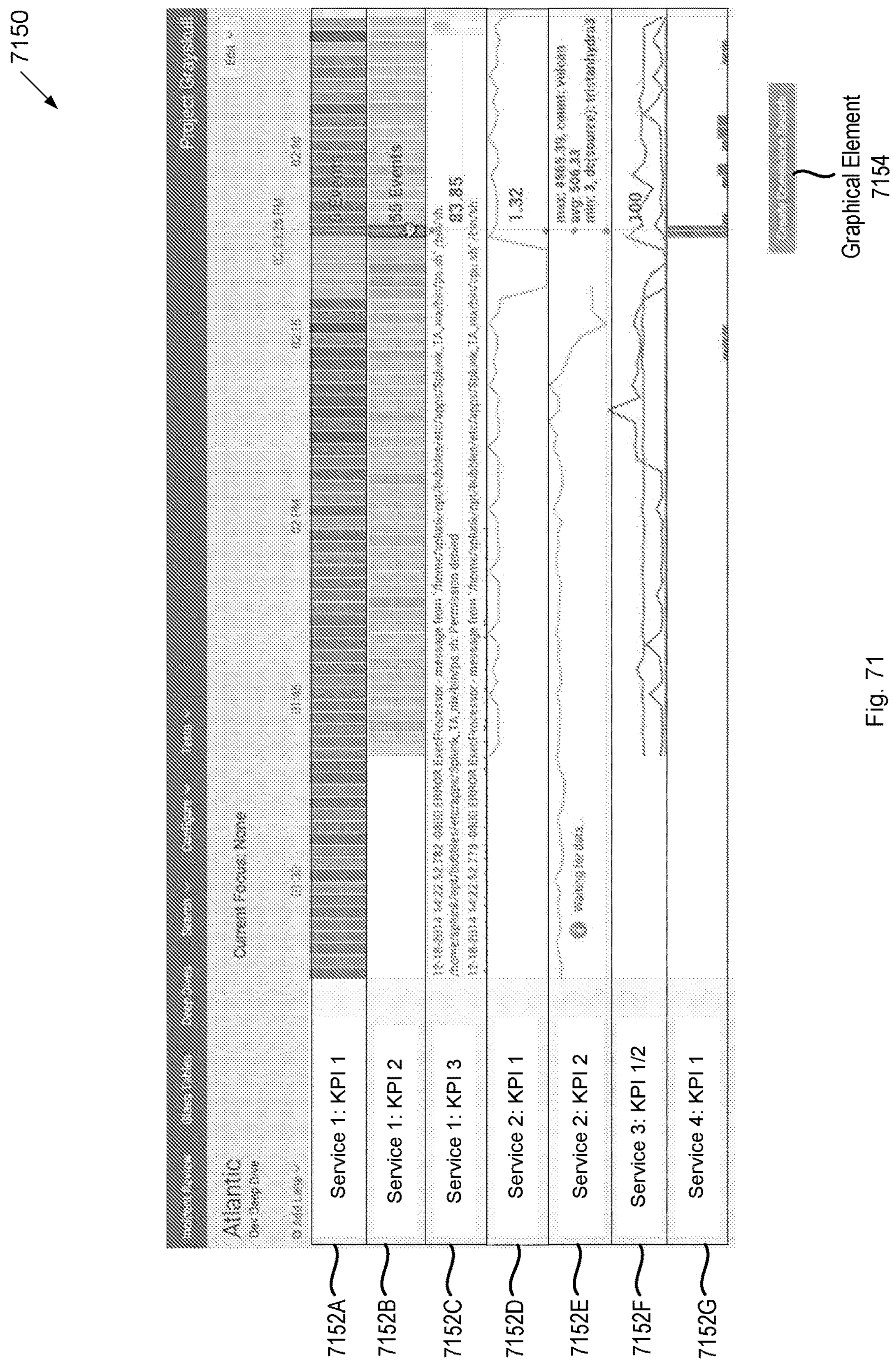

FIG. 71 illustrates an exemplary GUI facilitating the creation of a correlation search based on a displayed set of graph lanes, in accordance with one or more implementations of the present disclosure.

Figure 72A:
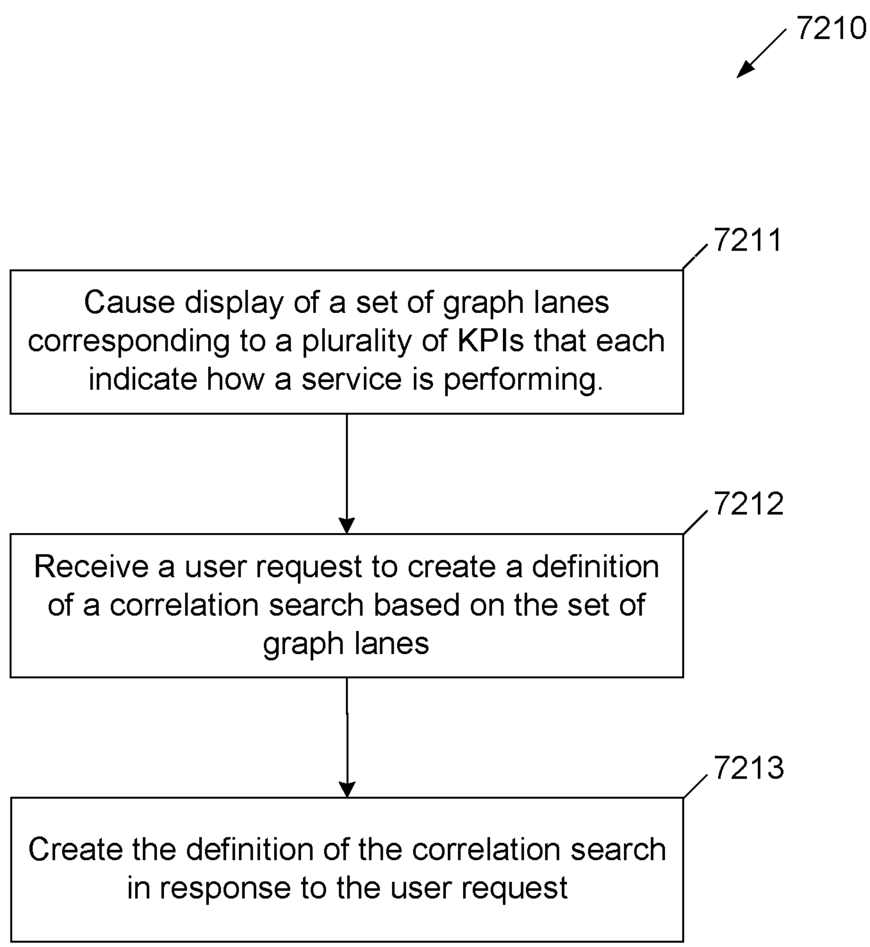

FIG. 72A presents a flow diagram of a method for assisting a user in initiating a creation of a new correlation search, in accordance with one or more implementations of the present disclosure.

Figure 72B:
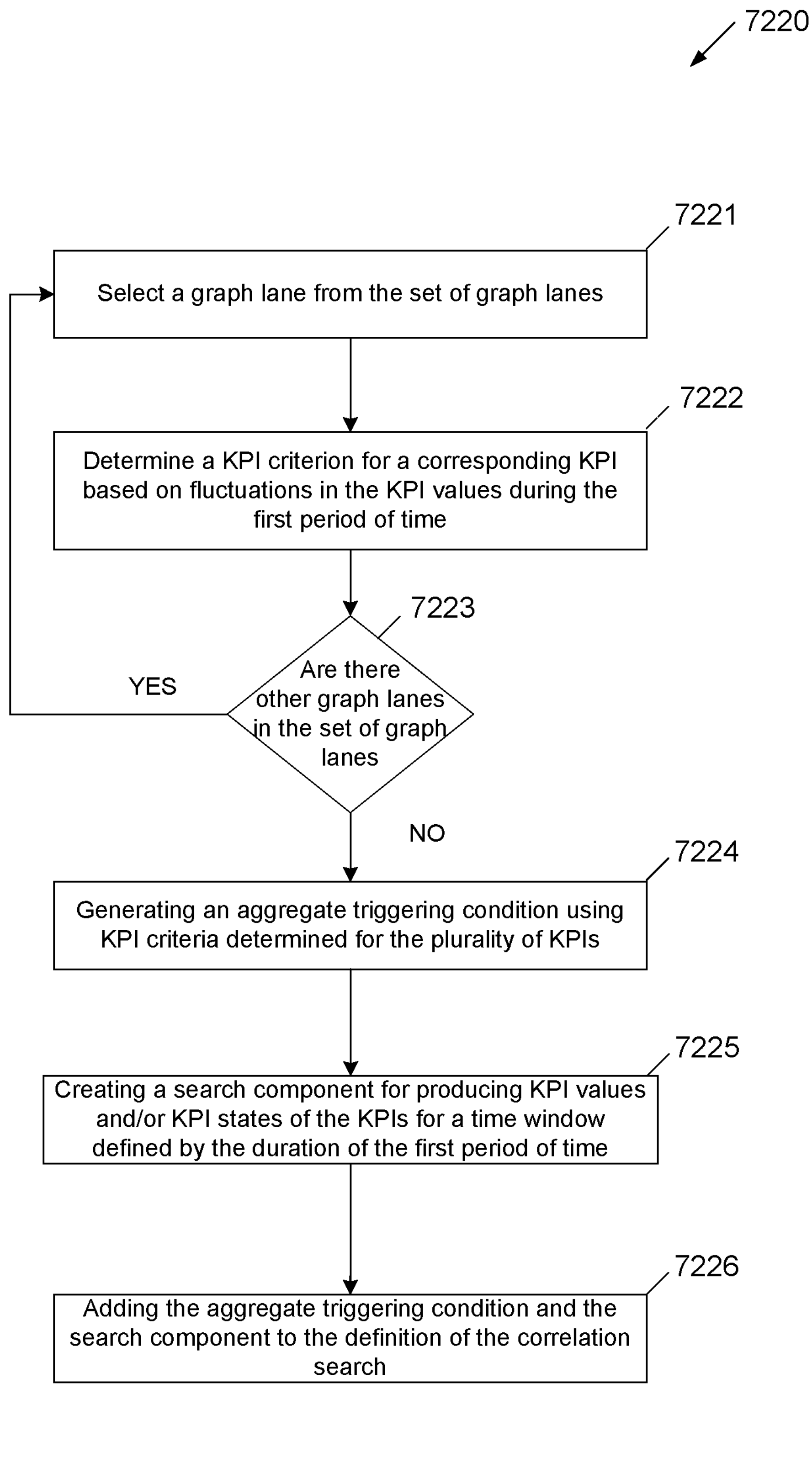

FIG. 72B presents a flow diagram of a method for creating a new correlations search definition based on a set of displayed graph lanes, in accordance with one or more implementations of the present disclosure.

Figure 72C:
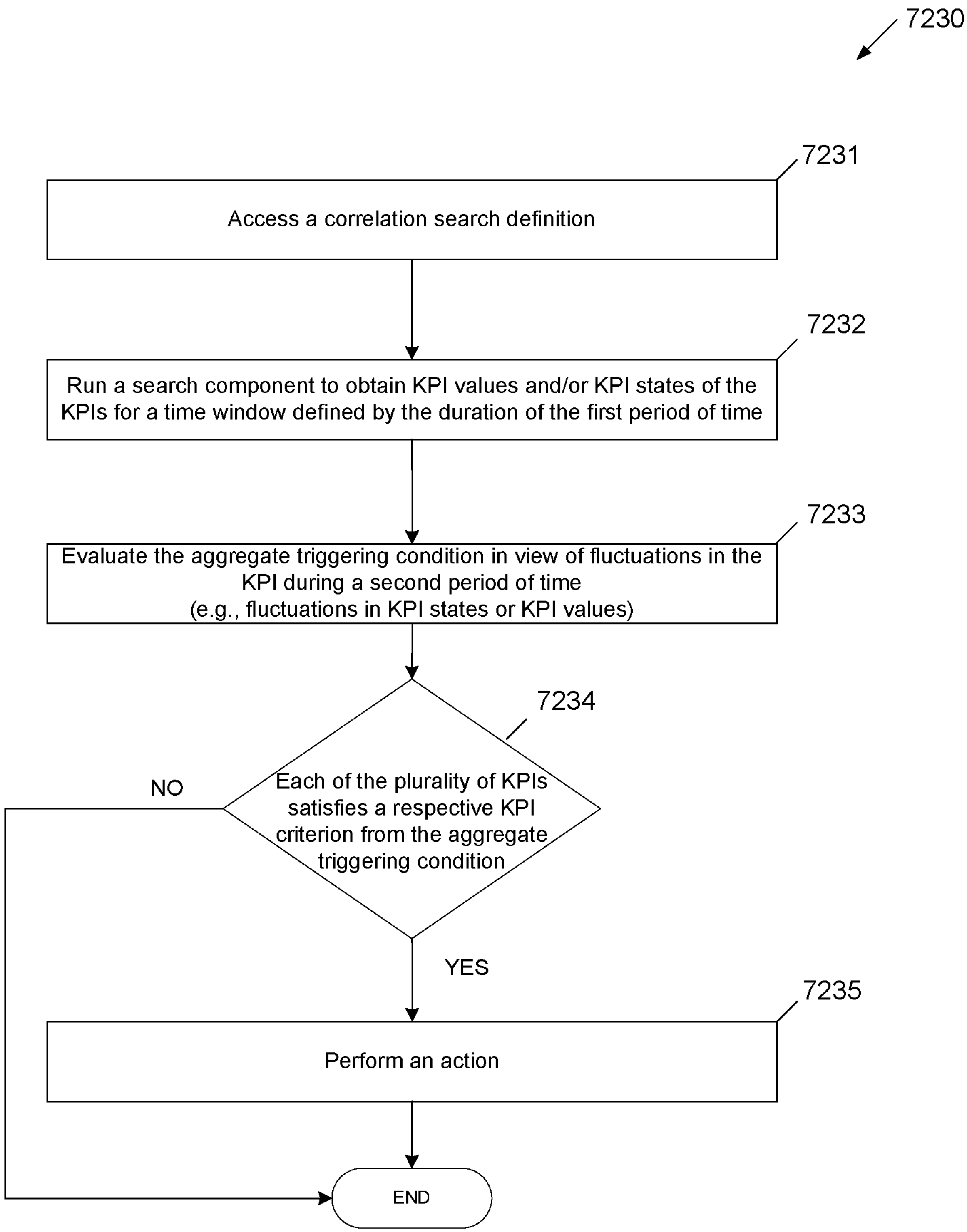

FIG. 72C presents a flow diagram of a method for executing a new correlations search to identify a subsequent occurrence of a pattern of interest in the performance of one or more services, in accordance with one or more implementations of the present disclosure.

FIG. 73A-F illustrate exemplary GUIs for facilitating the creation of a new correlation search to monitor the performance of a web service, an application service and a database service, in accordance with one or more implementations of the present disclosure.

Figure 74:
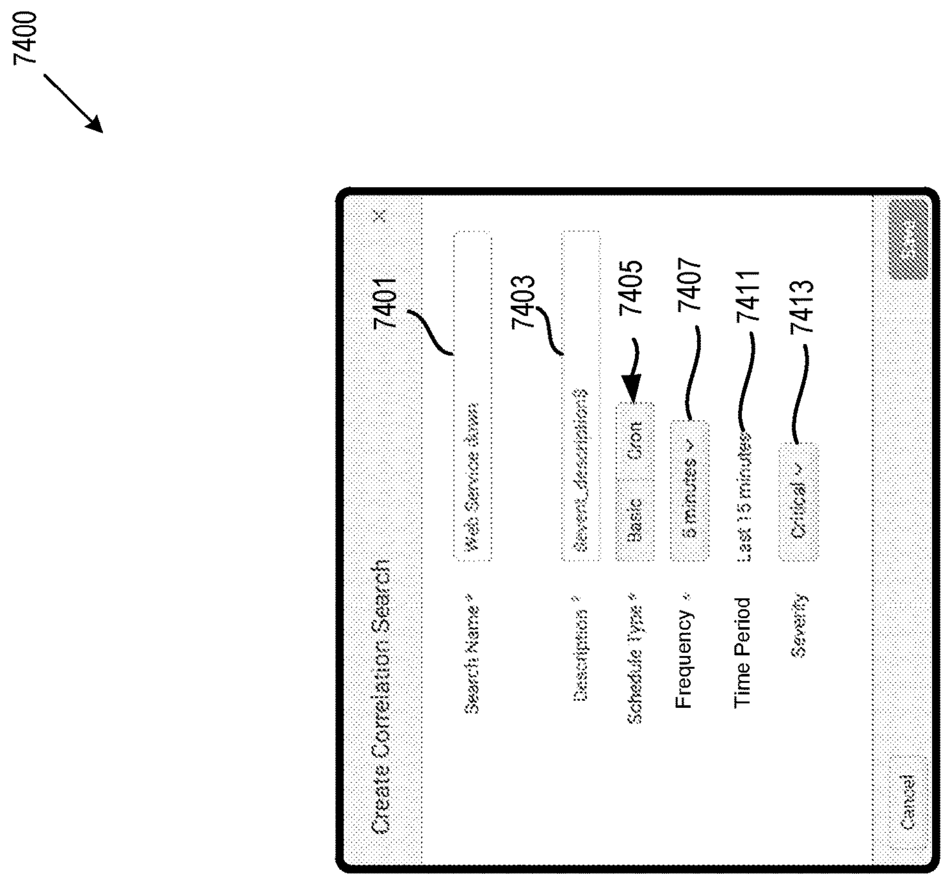

FIG. 74 illustrates an exemplary GUI for receiving identification information and configuration information for a new correlation search, in accordance with one or more implementations of the present disclosure.

Figure 75B:
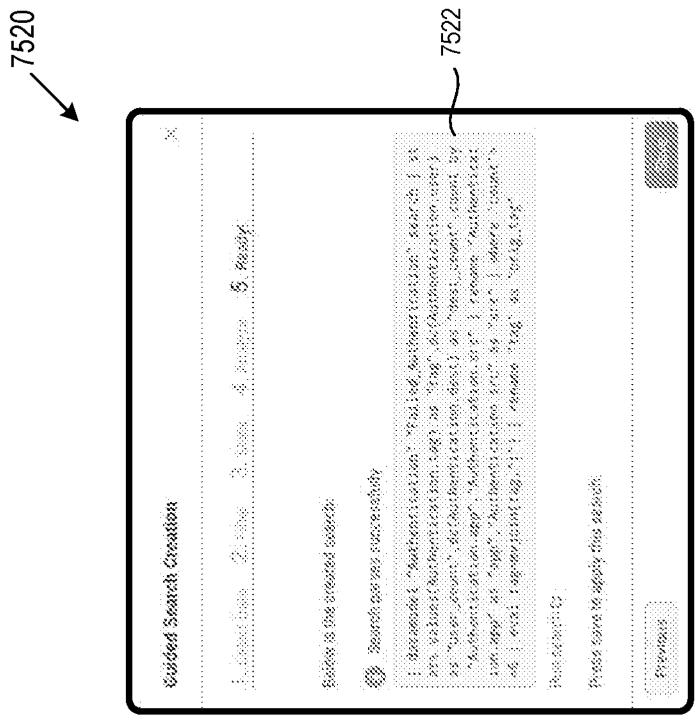
Figure 75A:
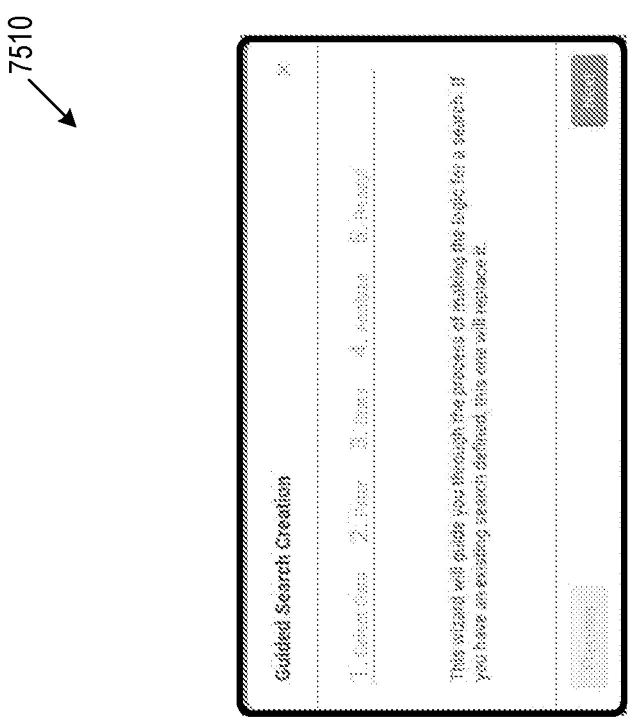

FIGS. 75A and 75B illustrates exemplary GUIs providing a correlation search wizard that may be pre-populated with information from the new correlation search definition, in accordance with one or more implementations of the present disclosure.

Figure 75C:
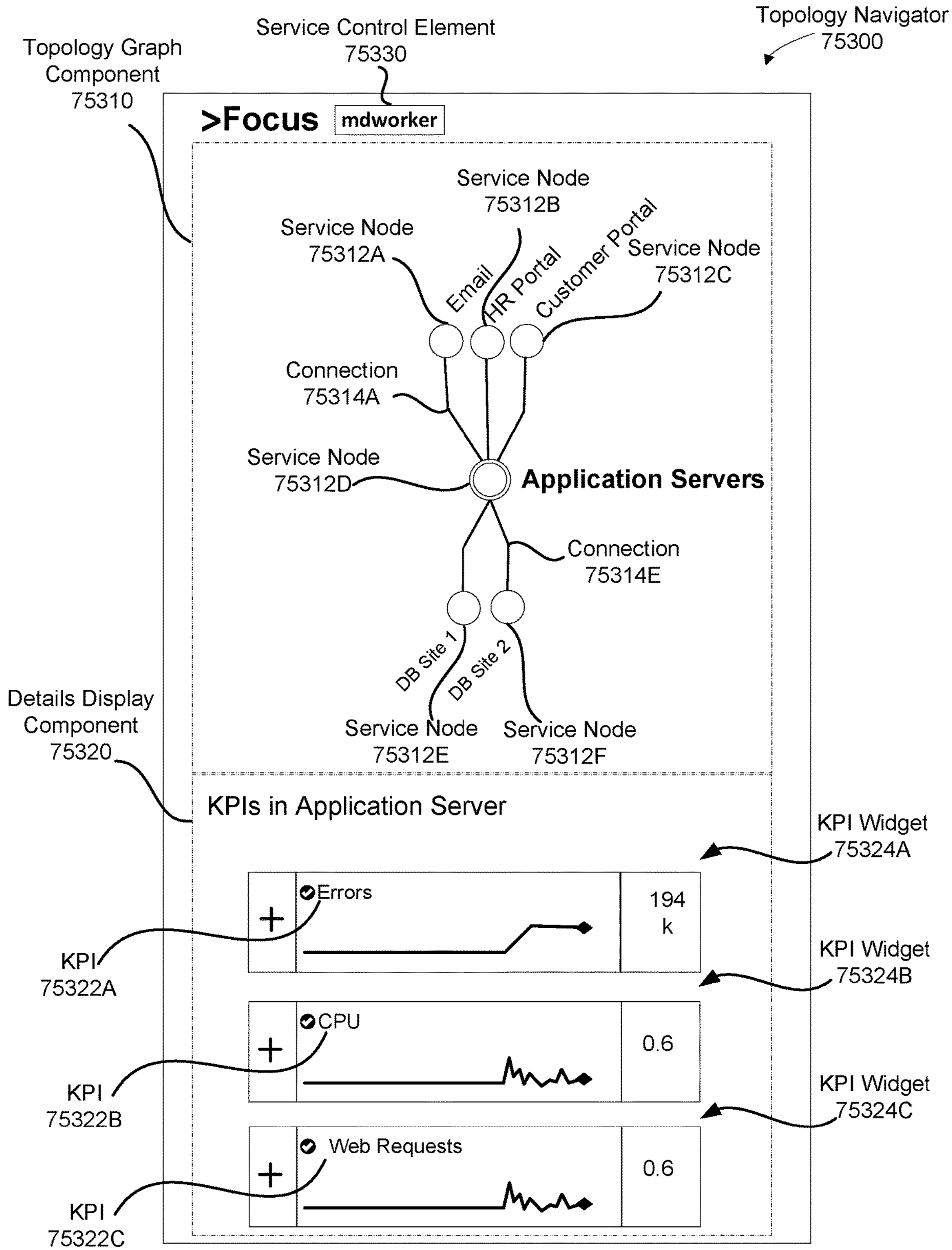

FIG. 75C illustrates an example of a graphical user interface for a topology navigator that displays multiple services and information related to the services, in accordance with one or more implementations of the present disclosure.

Figure 75D:
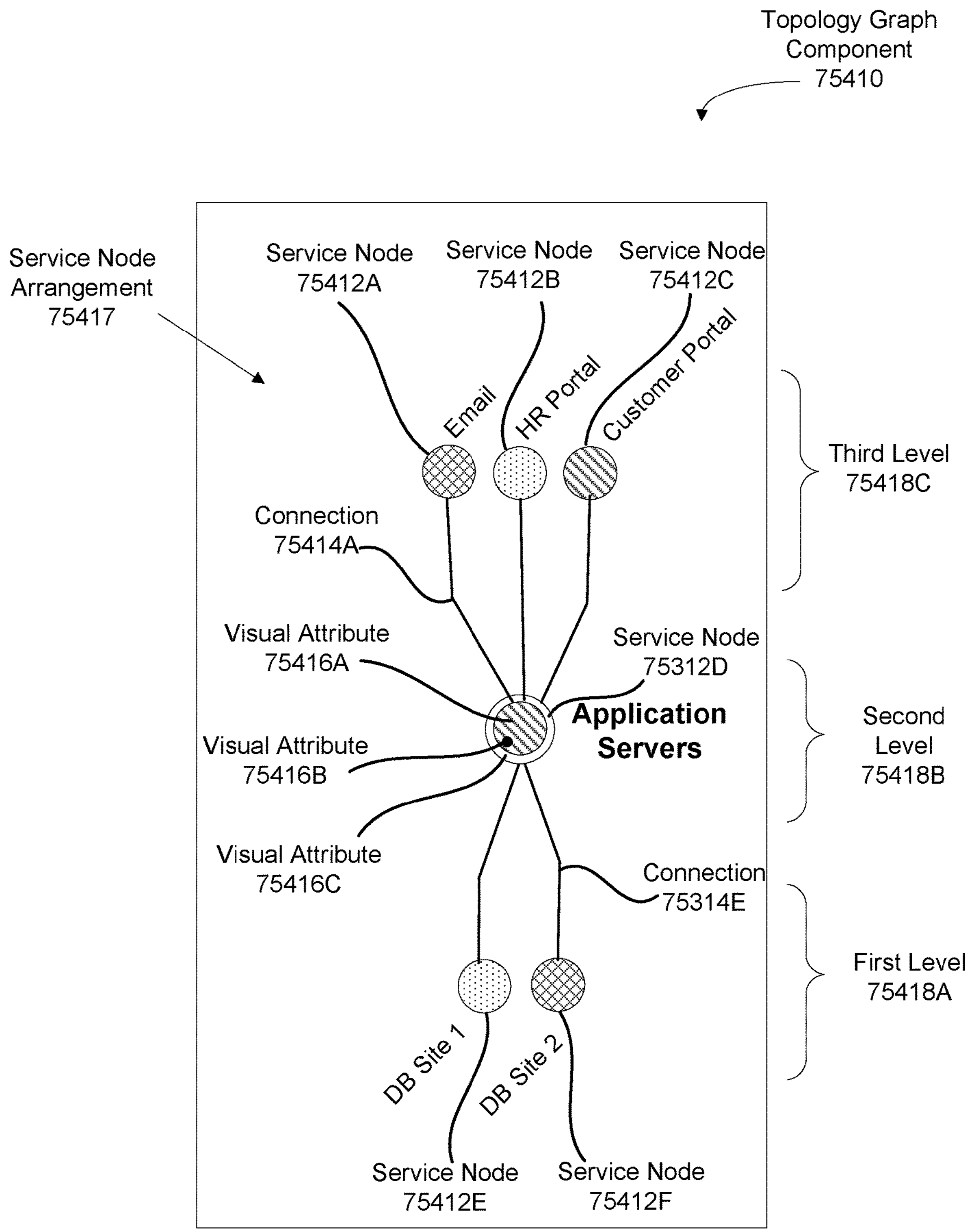

FIG. 75D illustrates an exemplary topology graph component of the topology navigator that includes visual attributes to illustrate the aggregate KPI values (e.g., health scores) of the service nodes, in accordance with one or more implementations of the present disclosure.

Figure 75E:
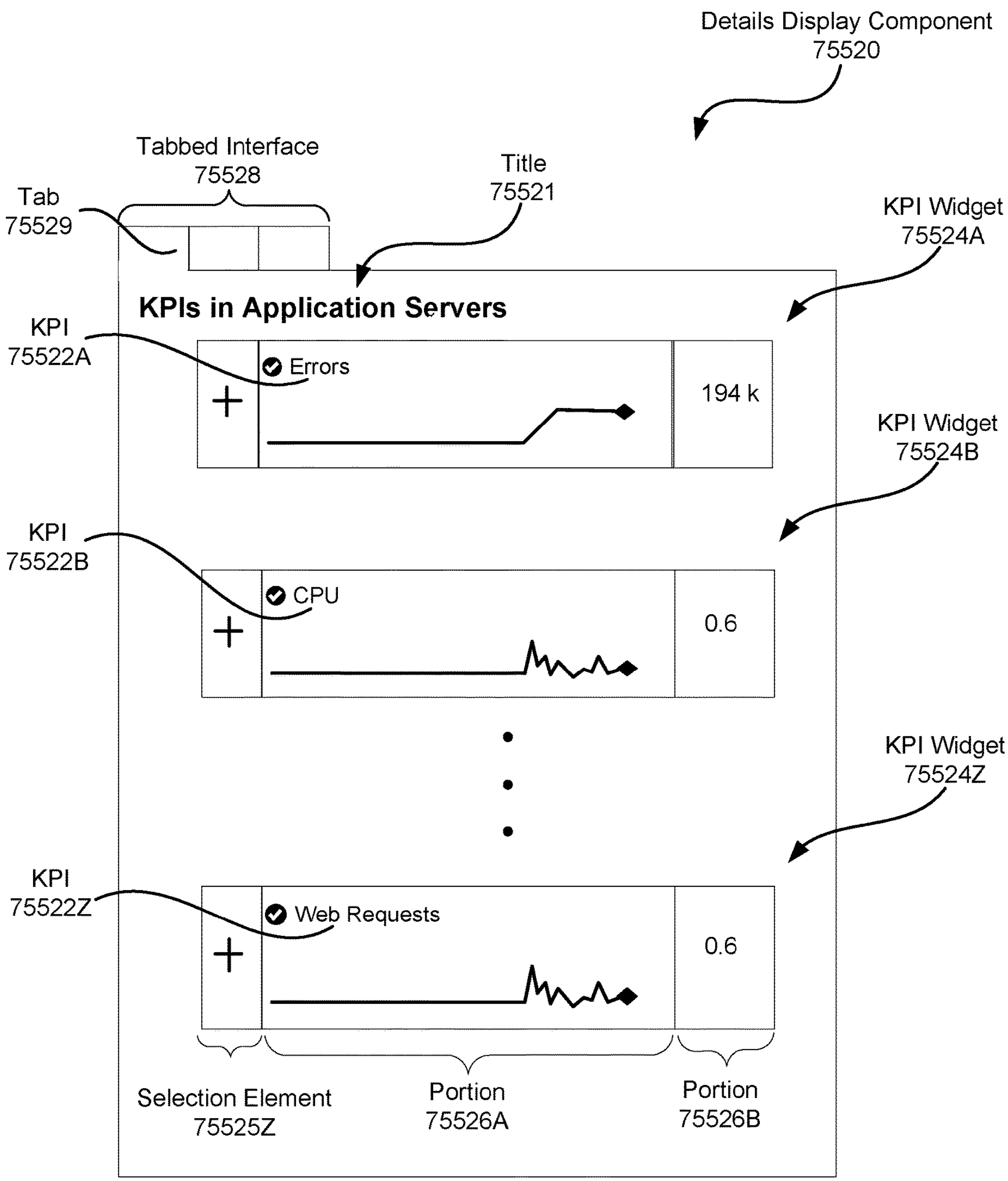

FIG. 75E illustrates an exemplary details display component of the topology navigator, in accordance with one or more implementations of the present disclosure.

Figure 75F:
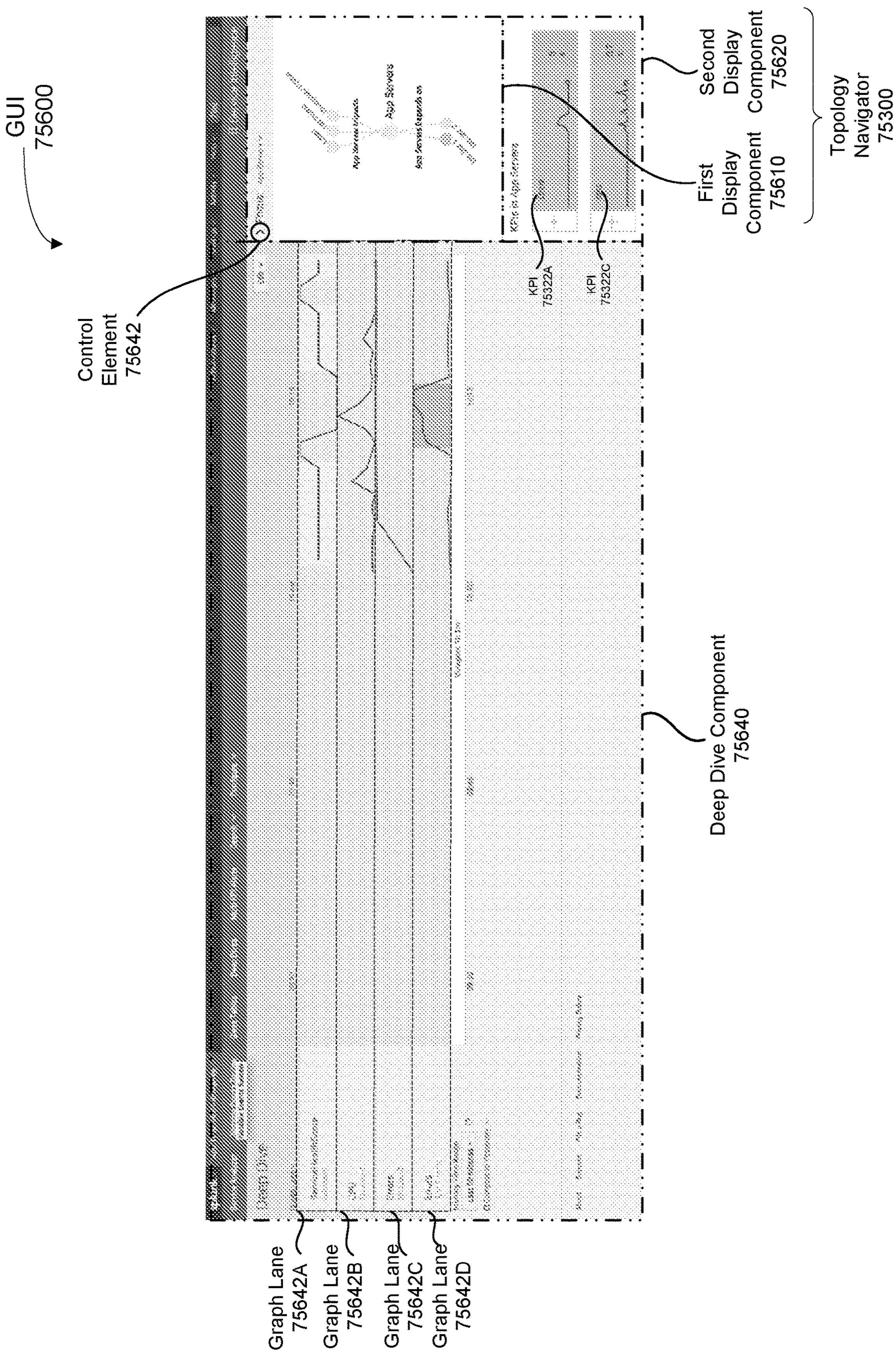

FIG. 75F illustrates an example of a graphical user interface with a topology navigator and multiple time-based graph lanes, in accordance with one or more implementations of the present disclosure.

Figure 75G:
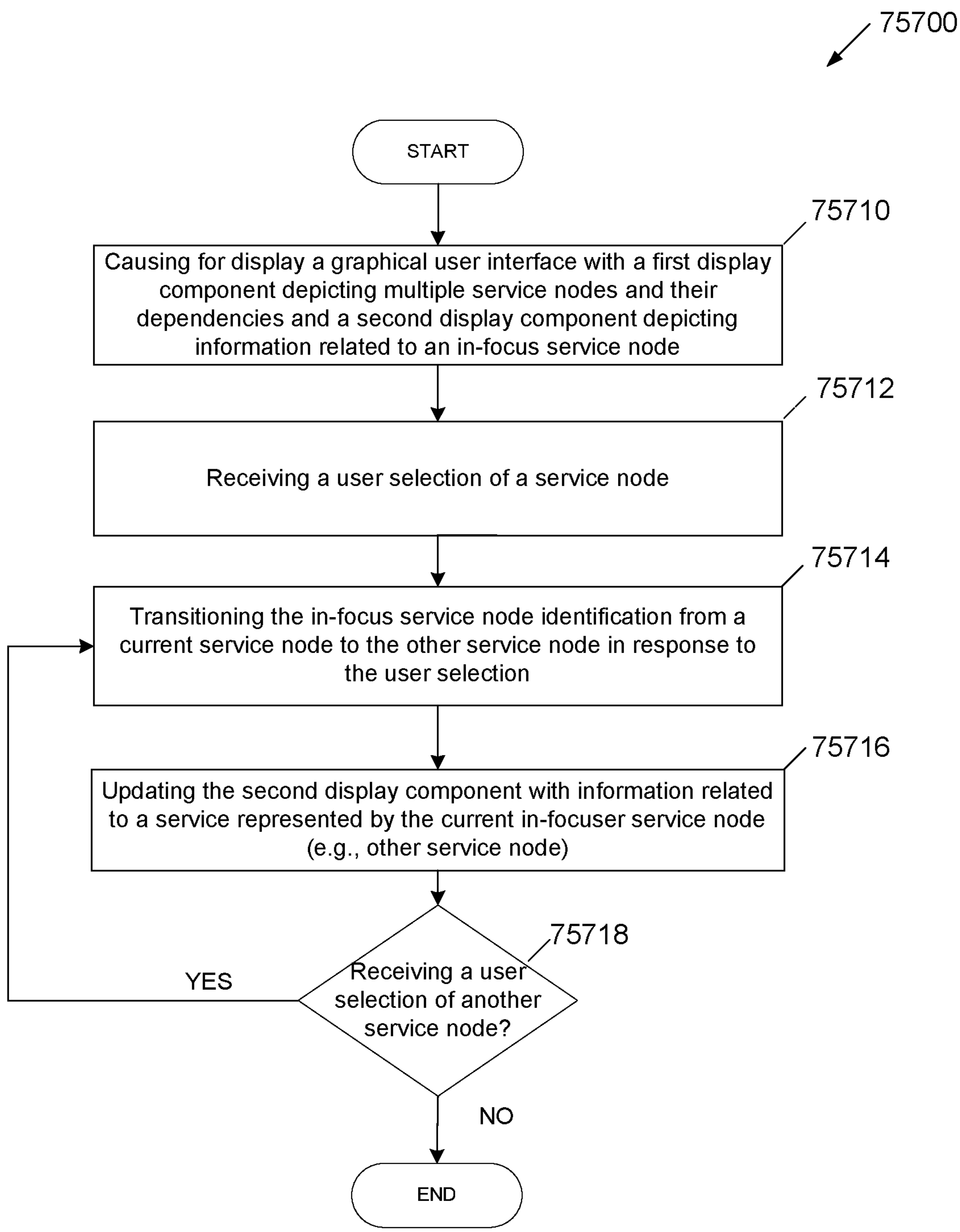
Figure 75H:
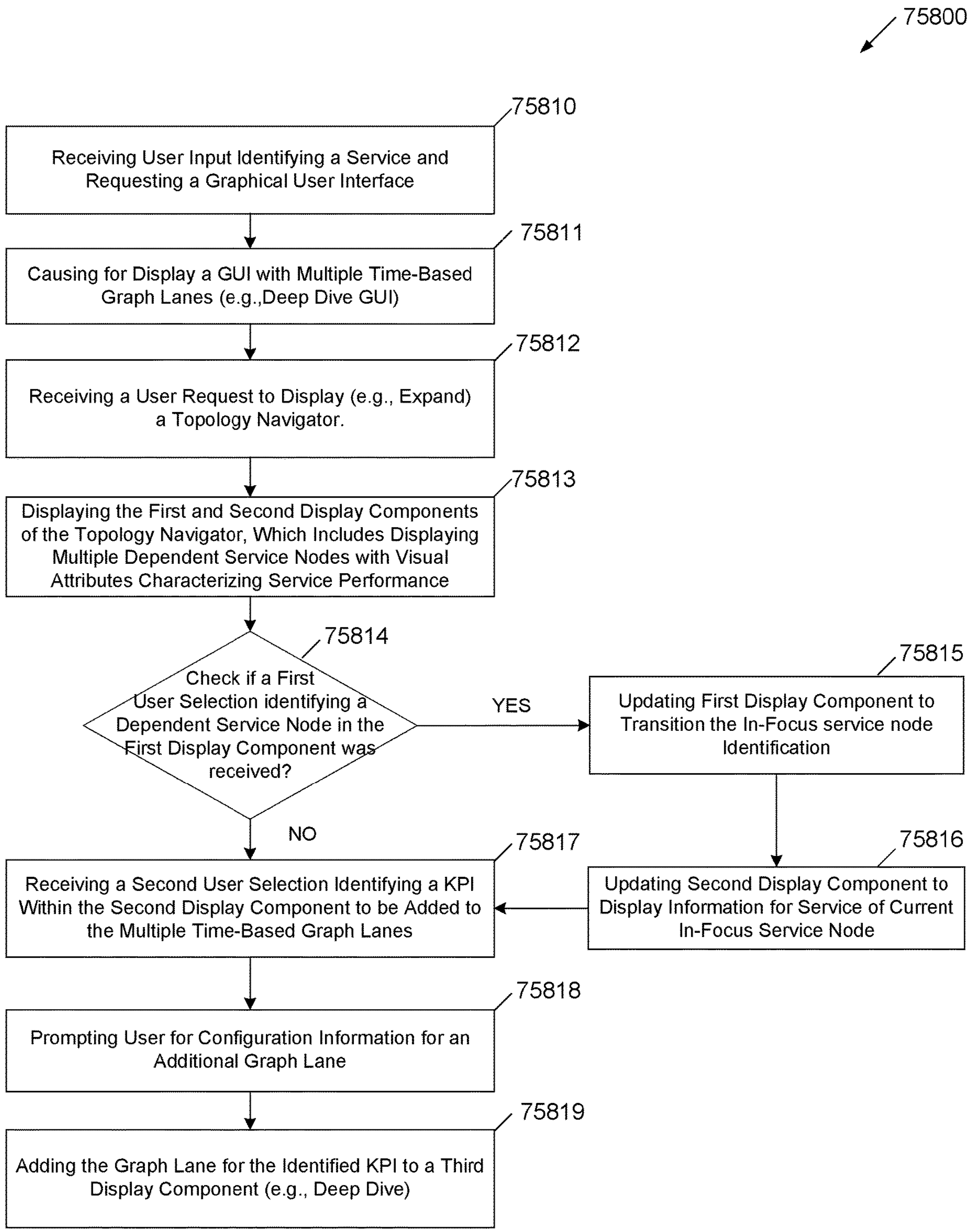

FIG. 75G presents a flow diagram of an exemplary method for creating and updating a topology navigator, in accordance with one or more implementations of the present disclosure FIG. 75H presents a flow diagram of another exemplary method for using the topology navigator to investigate abnormal activity of a service and identify a KPI of a dependent service to be added to a list of time-based graph lanes, in accordance with one or more implementations of the present disclosure.

Figure 75I:
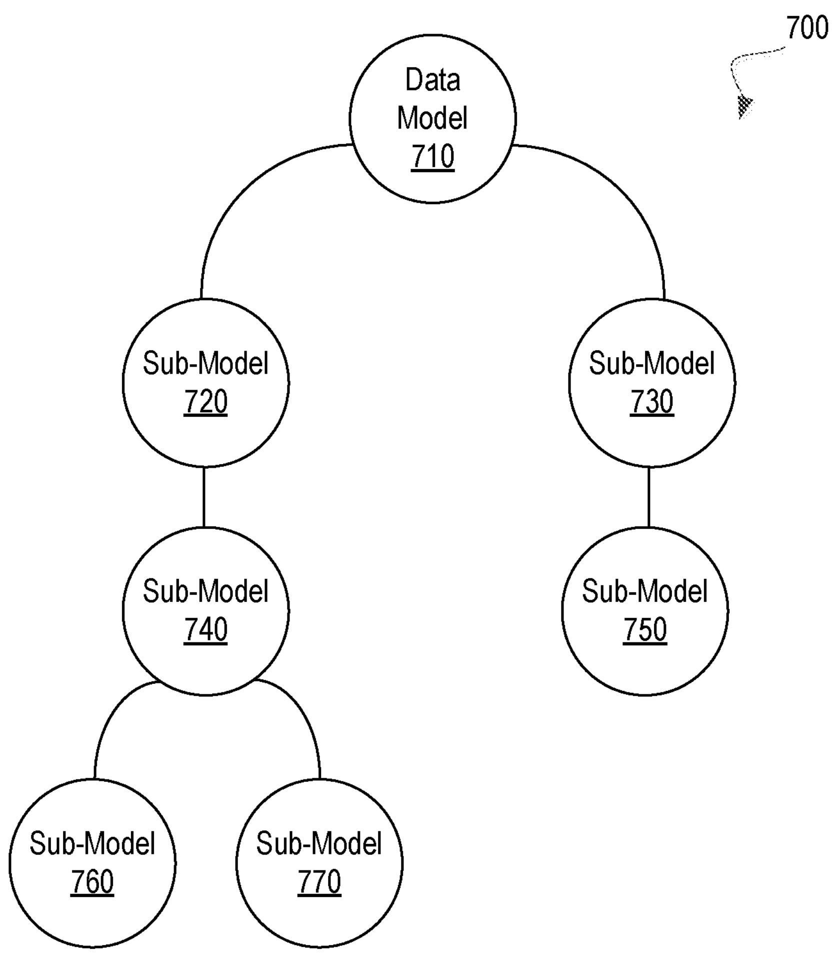

FIG. 75I illustrates an example of a data model in accordance with one or more implementations of the present disclosure.

Figure 75J:
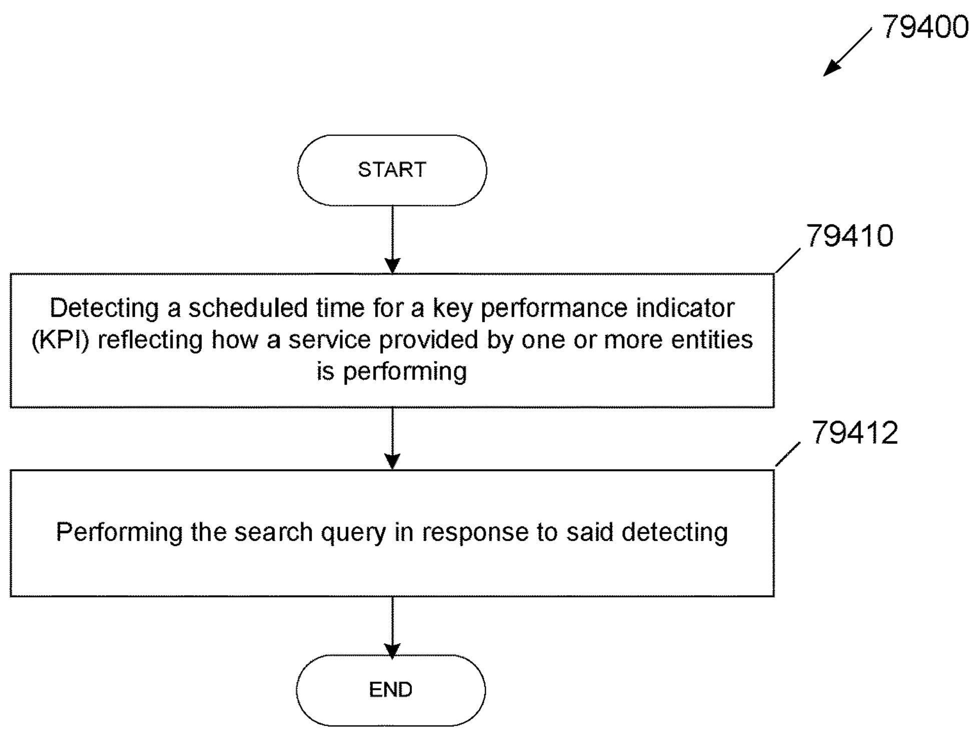

FIG. 75J presents a flow diagram of an exemplary method for performing a search query in response to detecting a scheduled time for a KPI, in accordance with one or more implementations of the present disclosure.

Figure 75K:
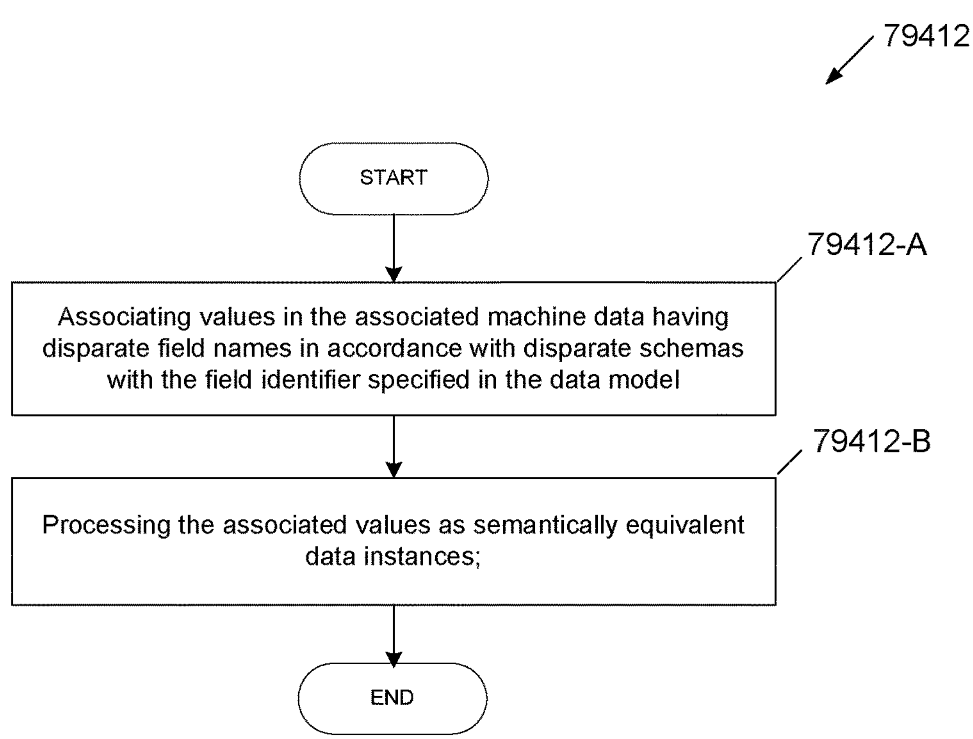

FIG. 75K presents a flow diagram of an exemplary method for performing a search query in response to detecting a scheduled time for a KPI, in accordance with one or more implementations of the present disclosure.

Figure 76:
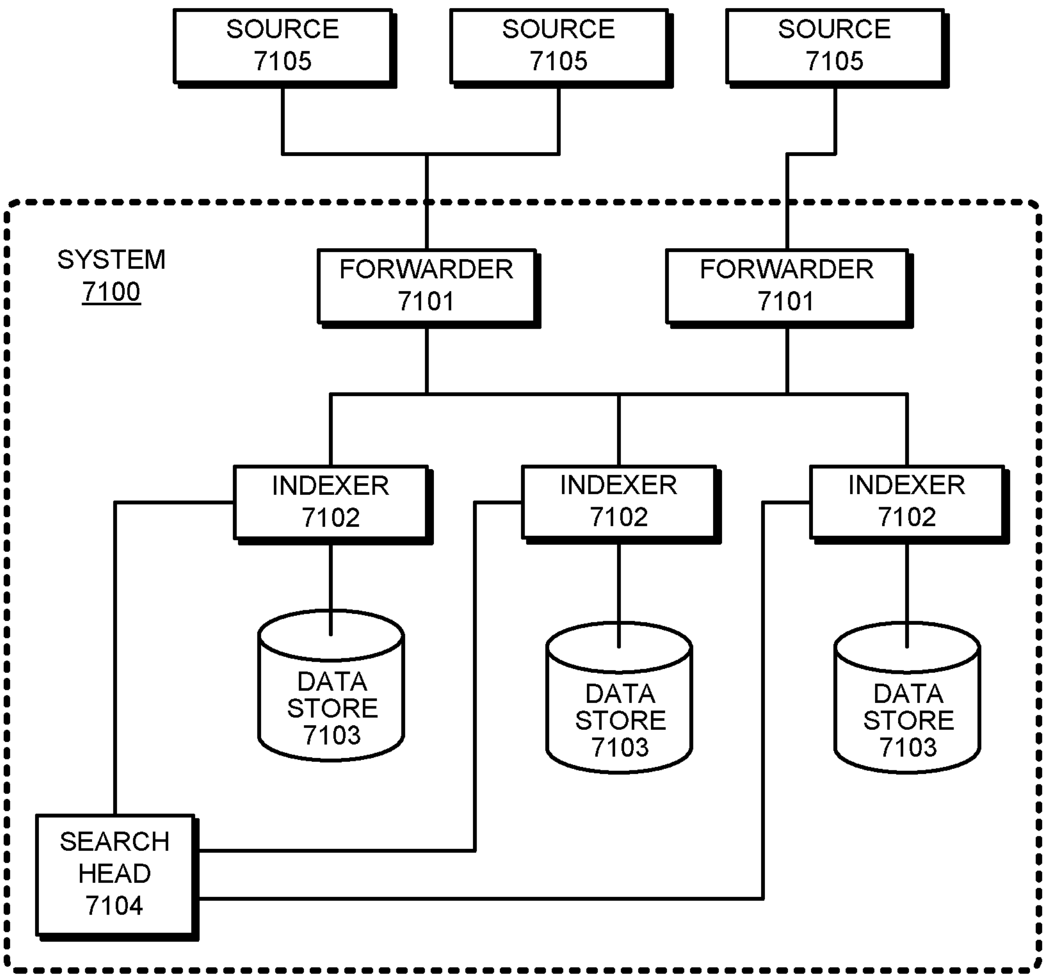

FIG. 76 presents a block diagram of an event-processing system in accordance with one or more implementations of the present disclosure.

Figure 77:
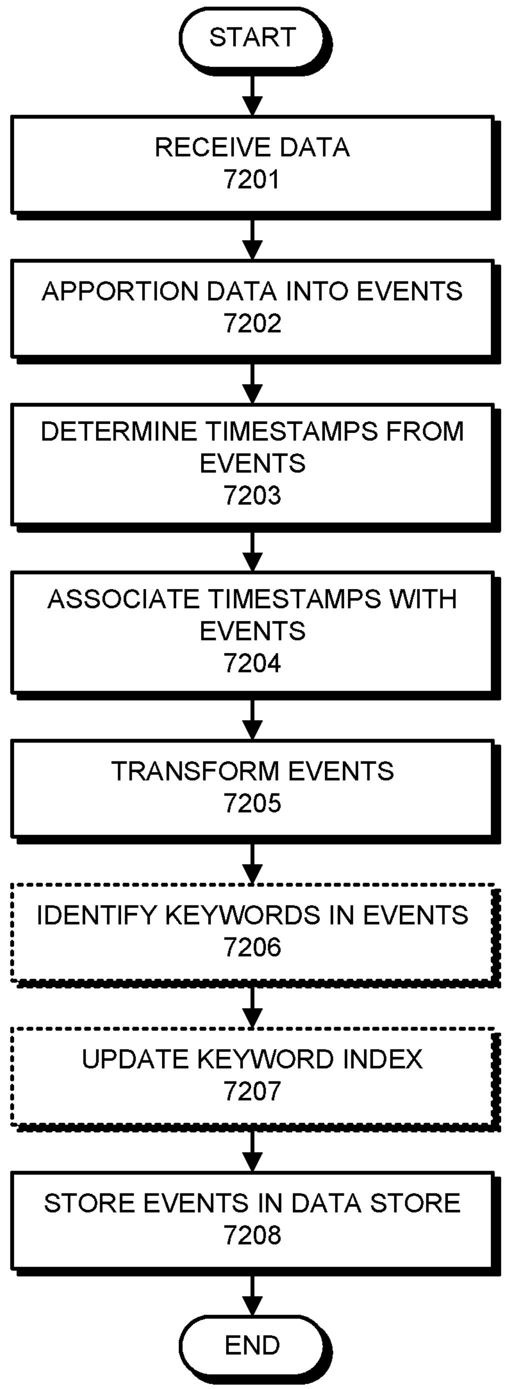

FIG. 77 presents a flowchart illustrating how indexers process, index, and store data received from forwarders in accordance with one or more implementations of the present disclosure.

Figure 78:
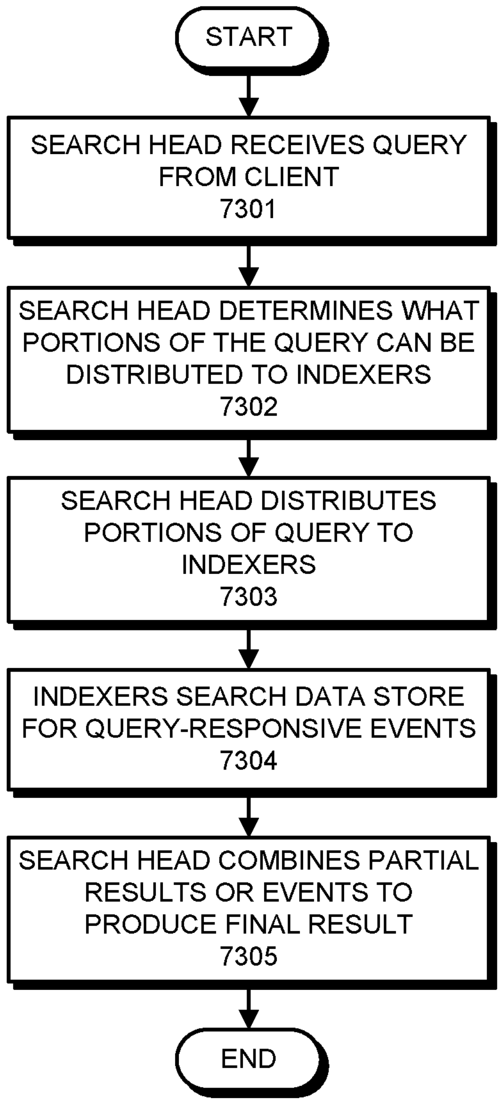

FIG. 78 presents a flowchart illustrating how a search head and indexers perform a search query in accordance with one or more implementations of the present disclosure.

Figure 79A:
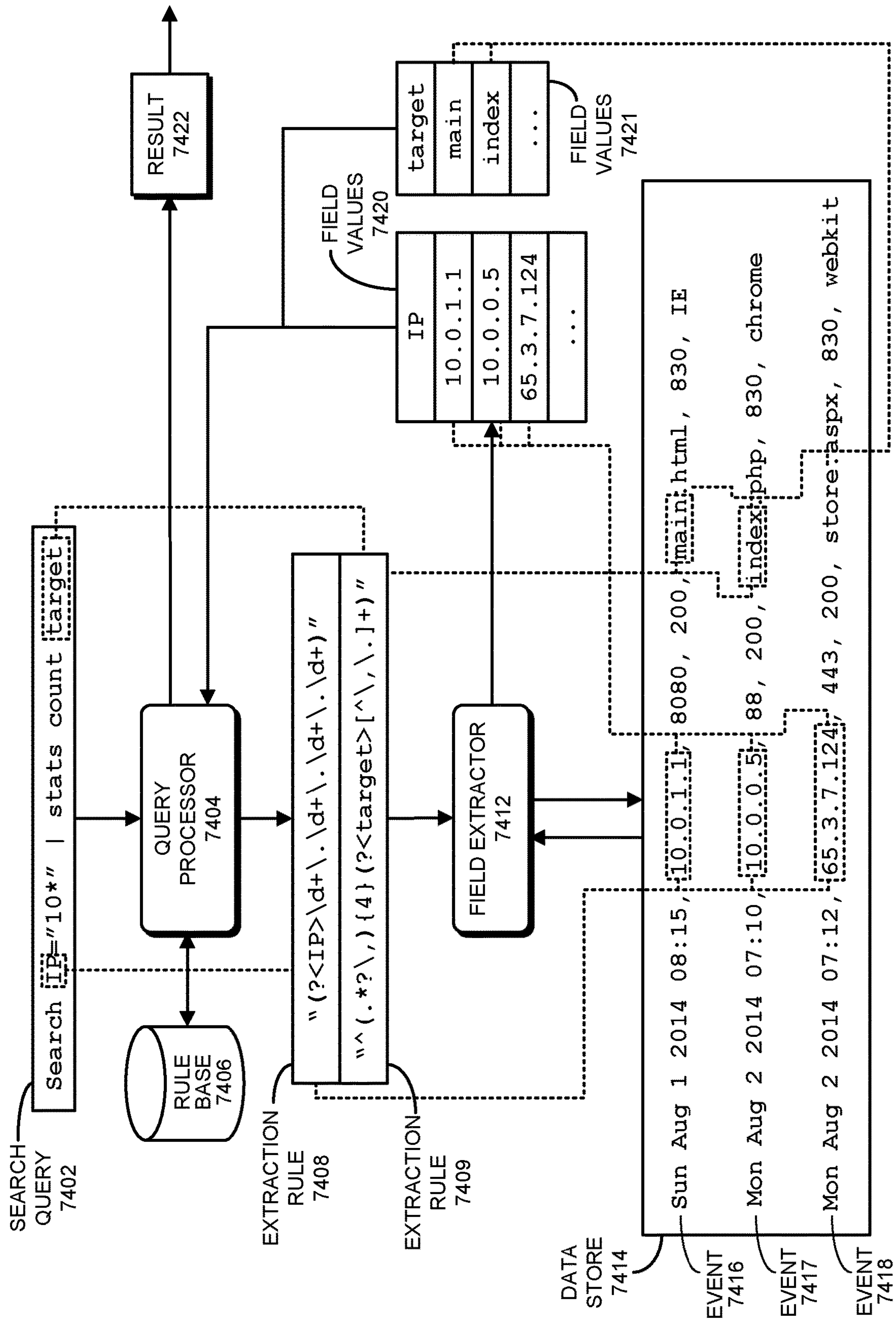

FIG. 79A presents a block diagram of a system for processing search requests that uses extraction rules for field values in accordance with one or more implementations of the present disclosure.

Figure 79B:
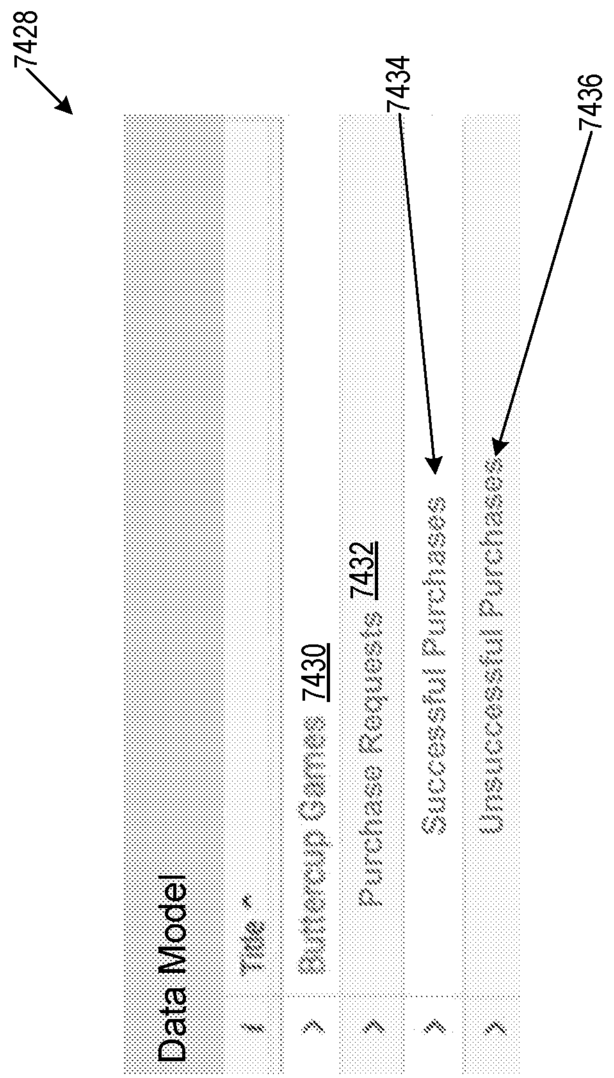

FIG. 79B illustrates an example data model structure, in accordance with some implementations of the present disclosure.

Figure 79C:
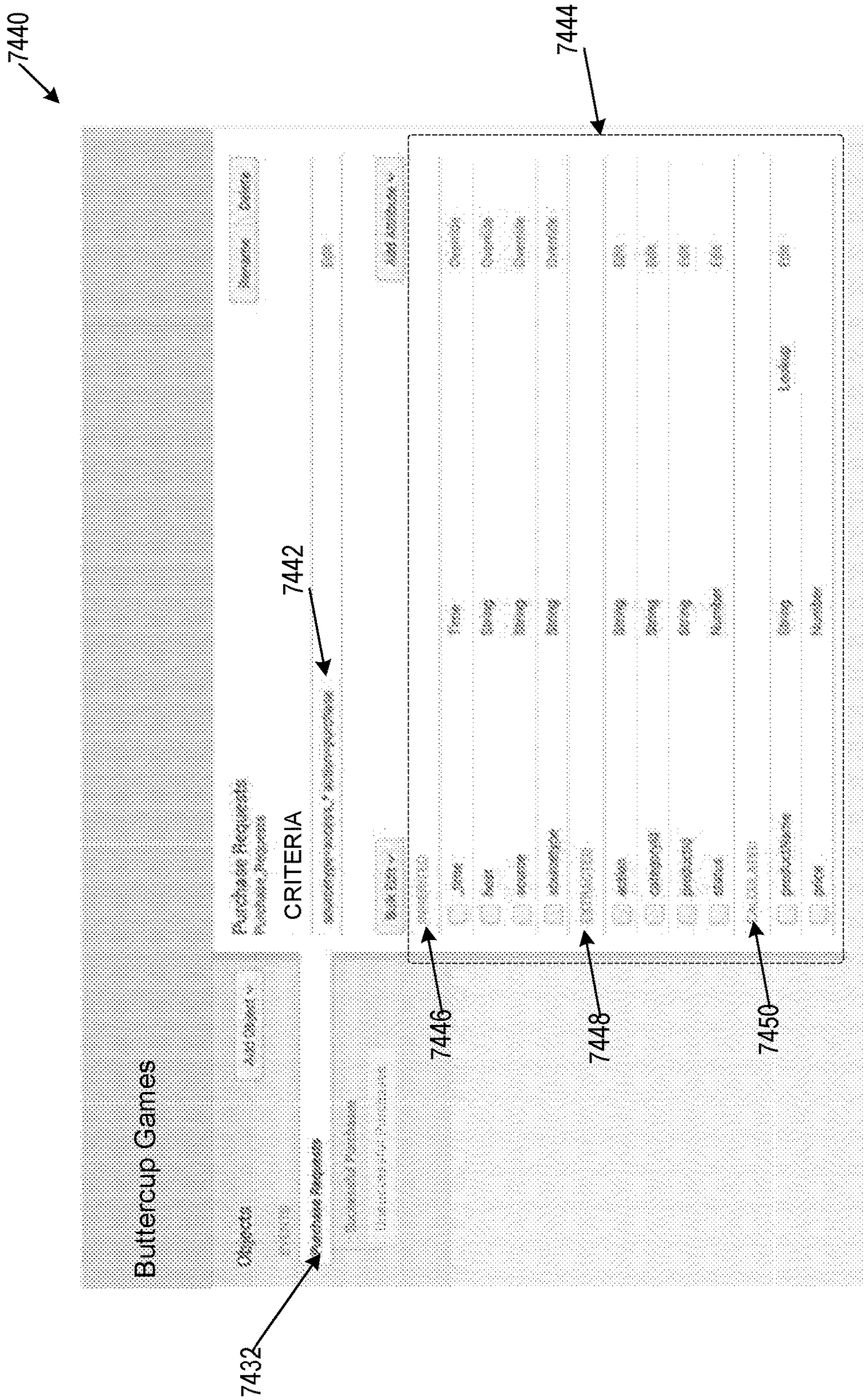

FIG. 79C illustrates an example definition of a root object of a data model, in accordance with some implementations.

Figure 79D:
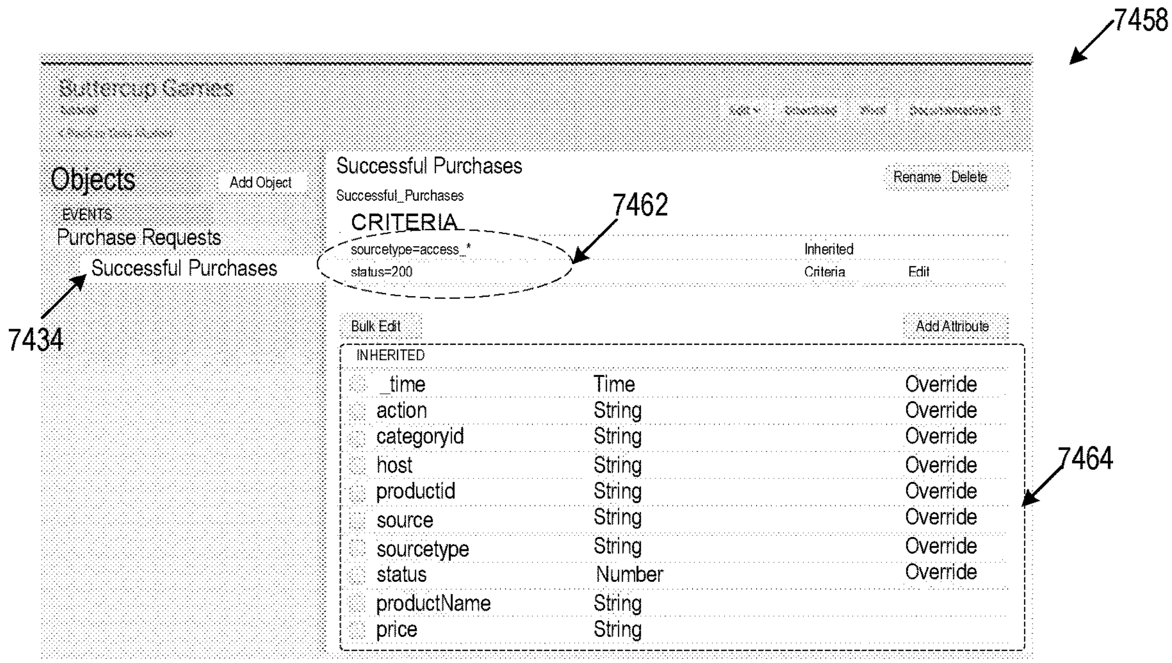
Figure 79D:
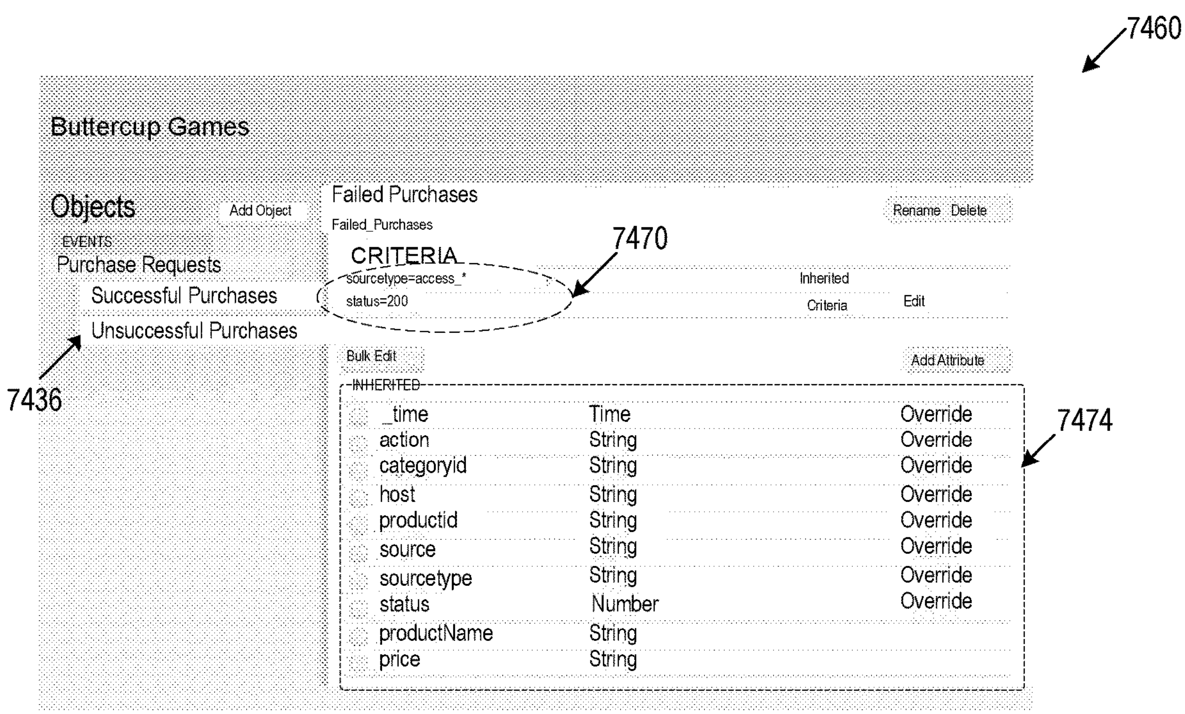

FIG. 79D illustrates example definitions and of child objects, in accordance with some implementations.

FIG. 80 illustrates an exemplary search query received from a client and executed by search peers in accordance with one or more implementations of the present disclosure.

Figure 81A:
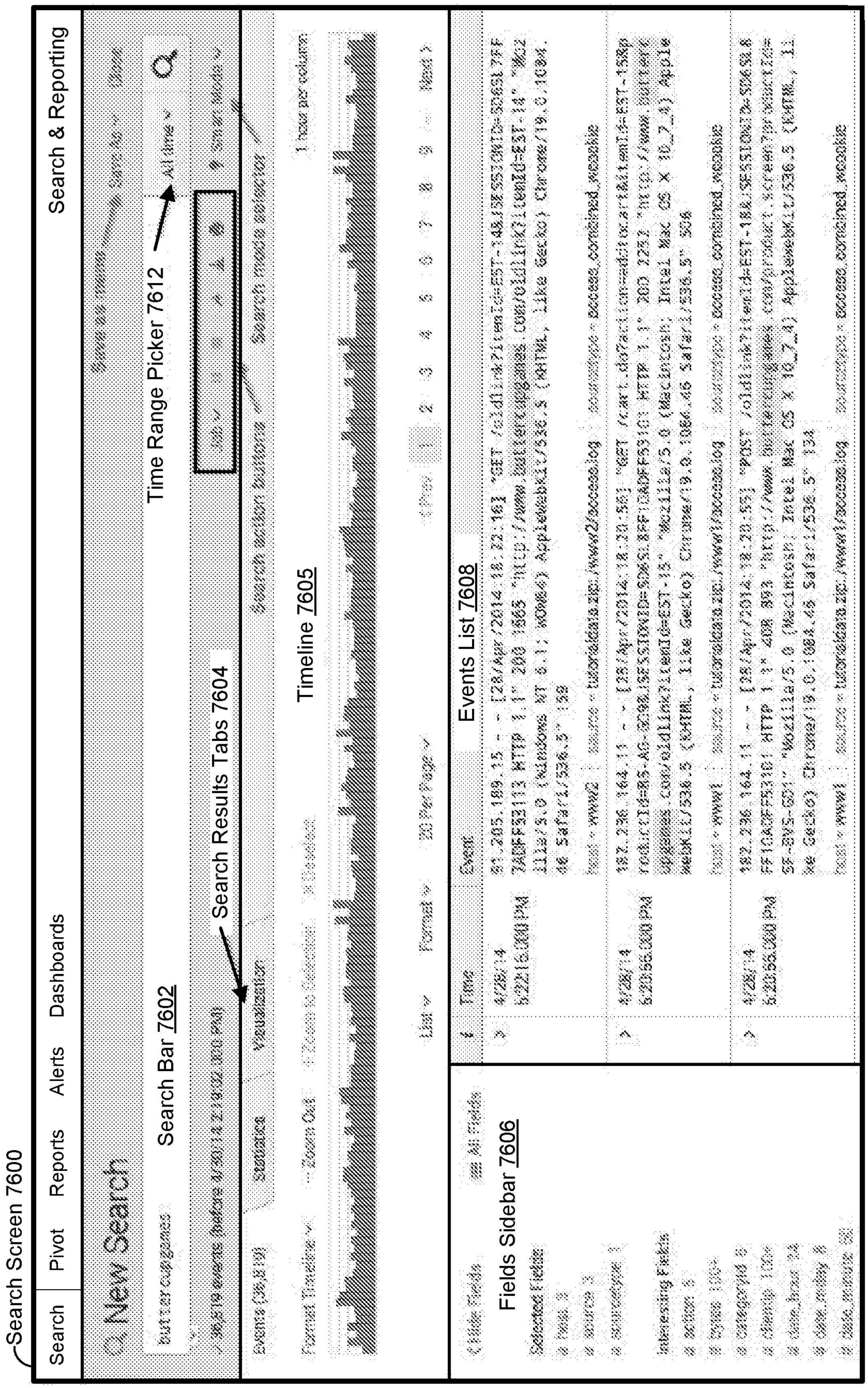

FIG. 81A illustrates a search screen in accordance with one or more implementations of the present disclosure.

Figure 81B:
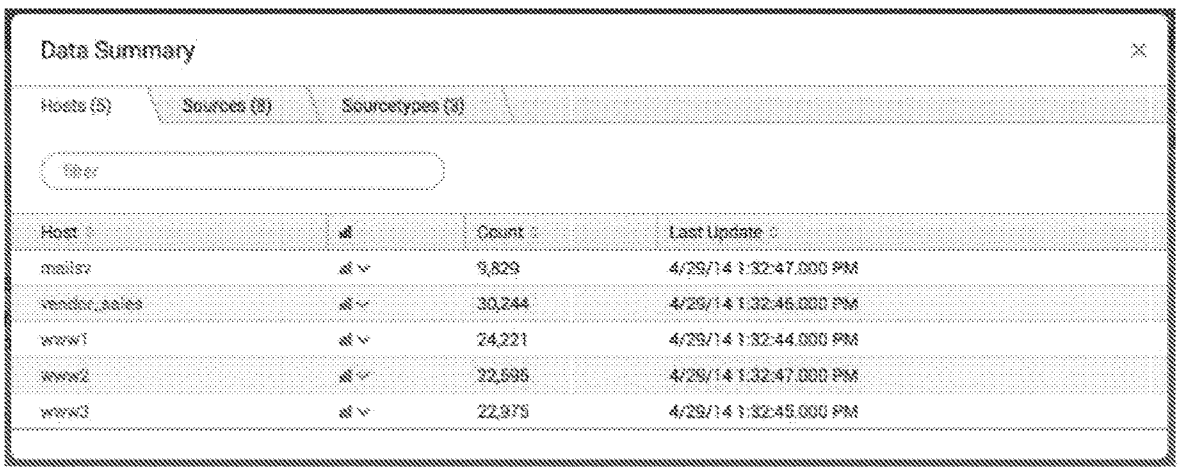

FIG. 81B illustrates a data summary dialog that enables a user to select various data sources in accordance with one or more implementations of the present disclosure.

Figure 82A:
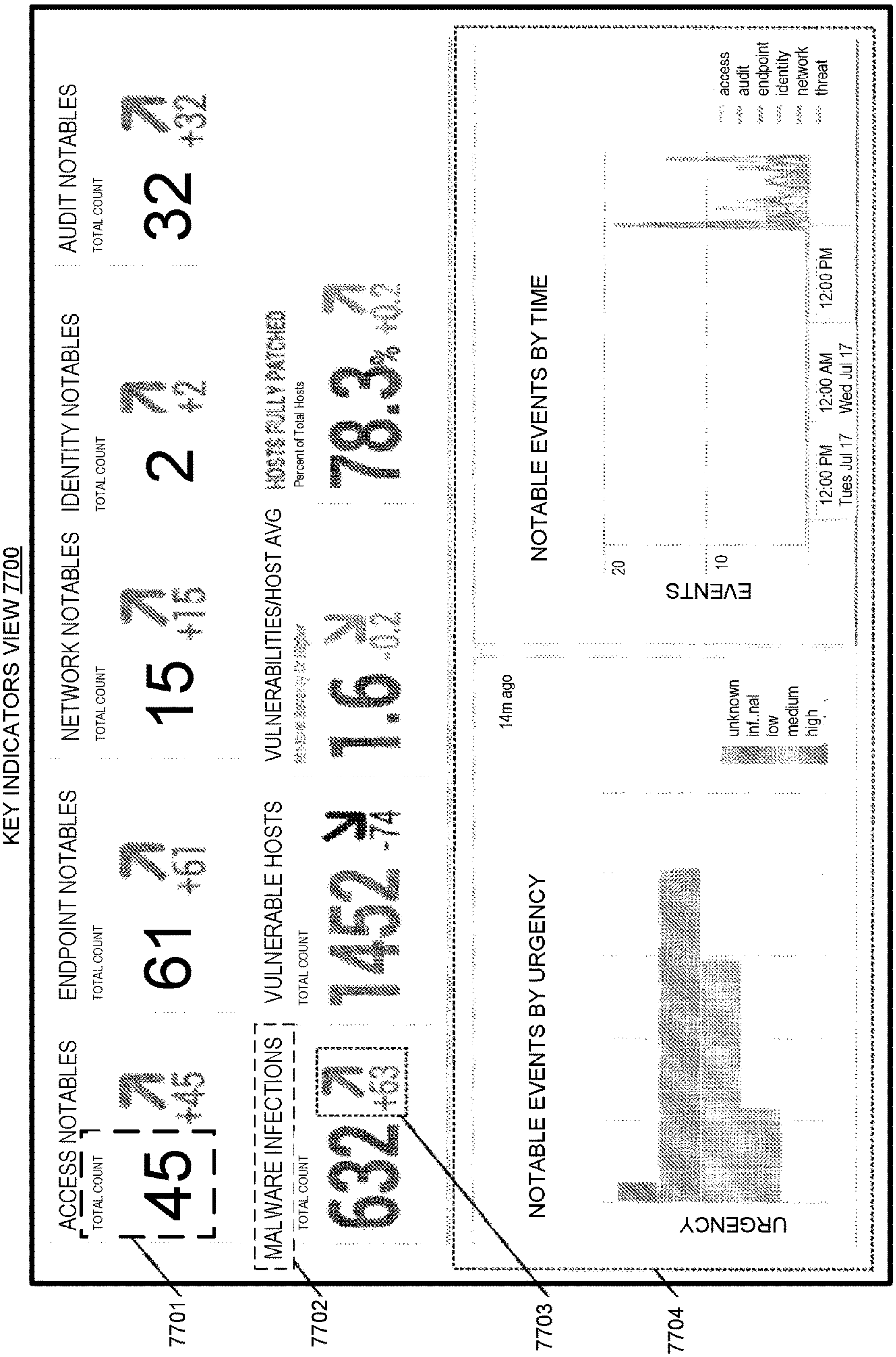

FIG. 82A illustrates a key indicators view in accordance with one or more implementations of the present disclosure.

Figure 82B:
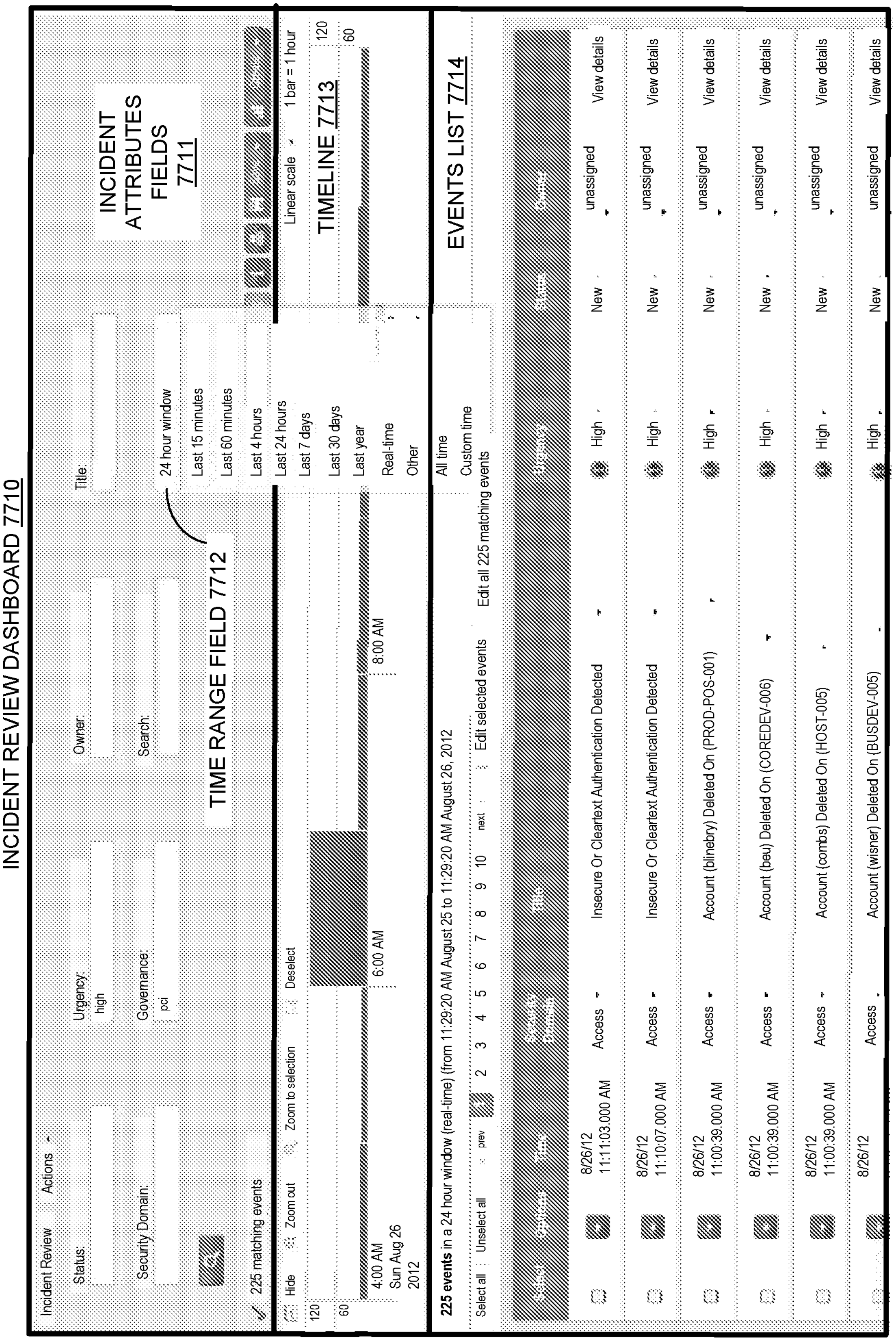

FIG. 82B illustrates an incident review dashboard in accordance with one or more implementations of the present disclosure.

Figure 82C:
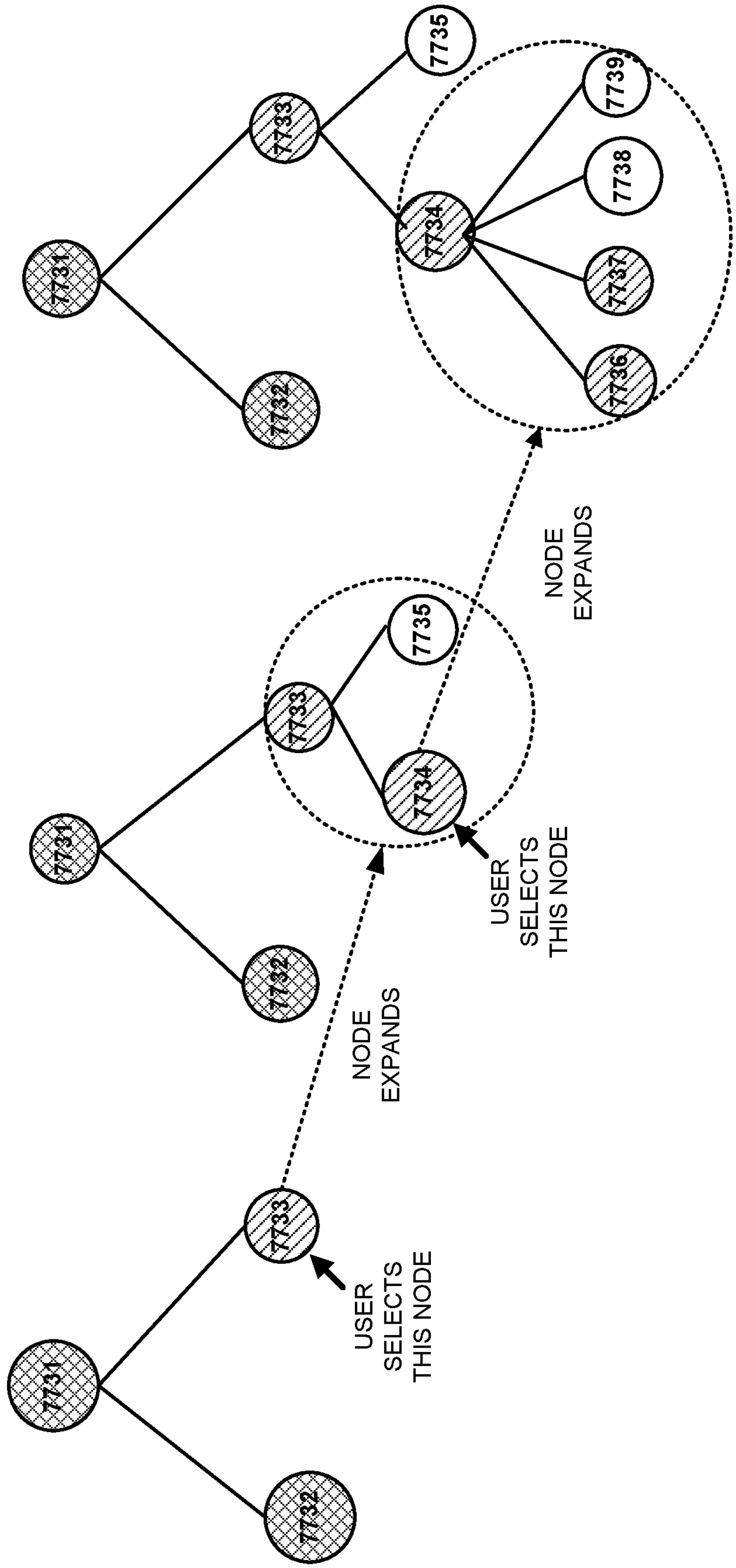

FIG. 82C illustrates a proactive monitoring tree in accordance with one or more implementations of the present disclosure.

Figure 82D:
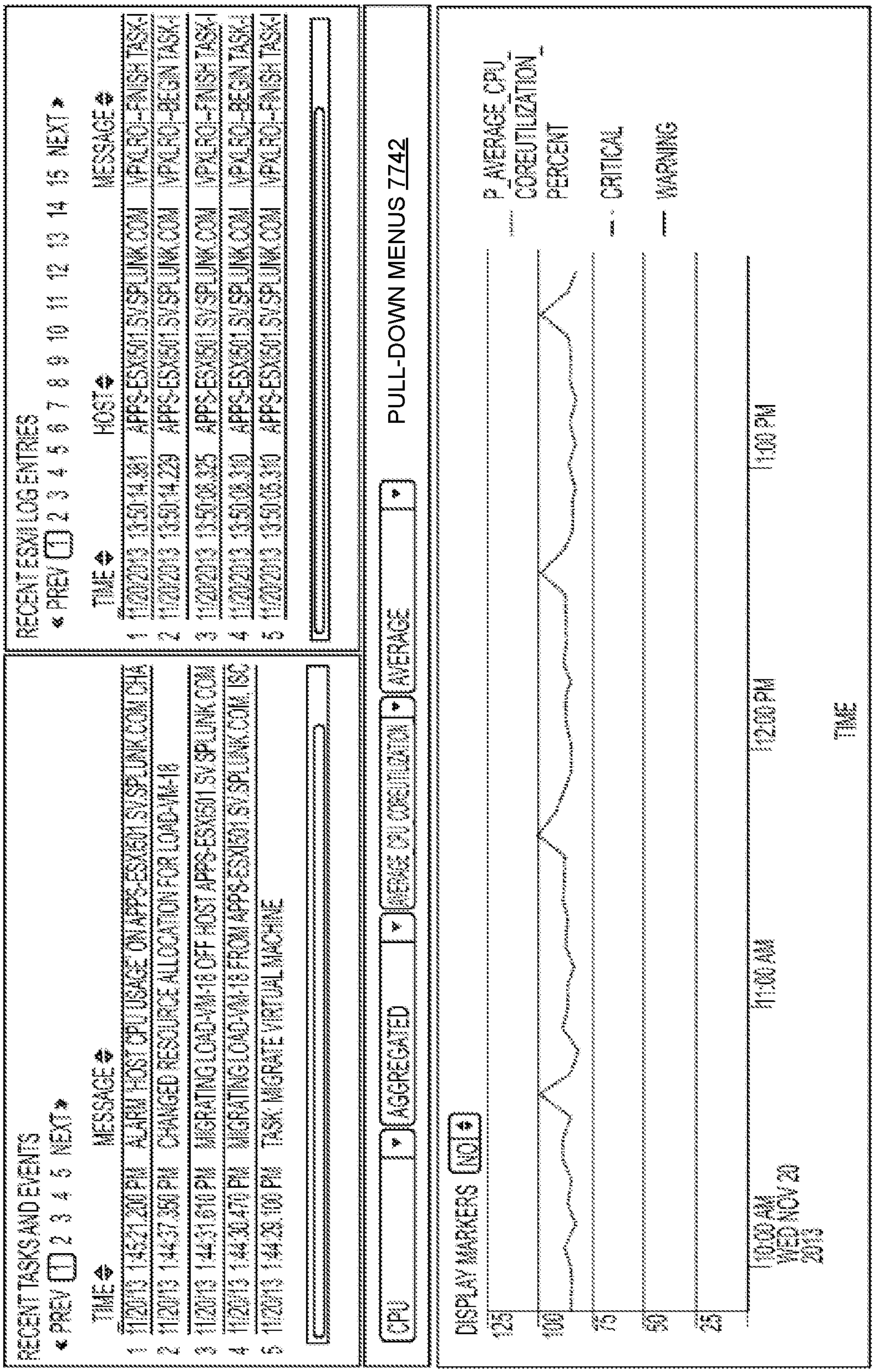

FIG. 82D illustrates a screen displaying both log data and performance data in accordance with one or more implementations of the present disclosure.

Figure 83:
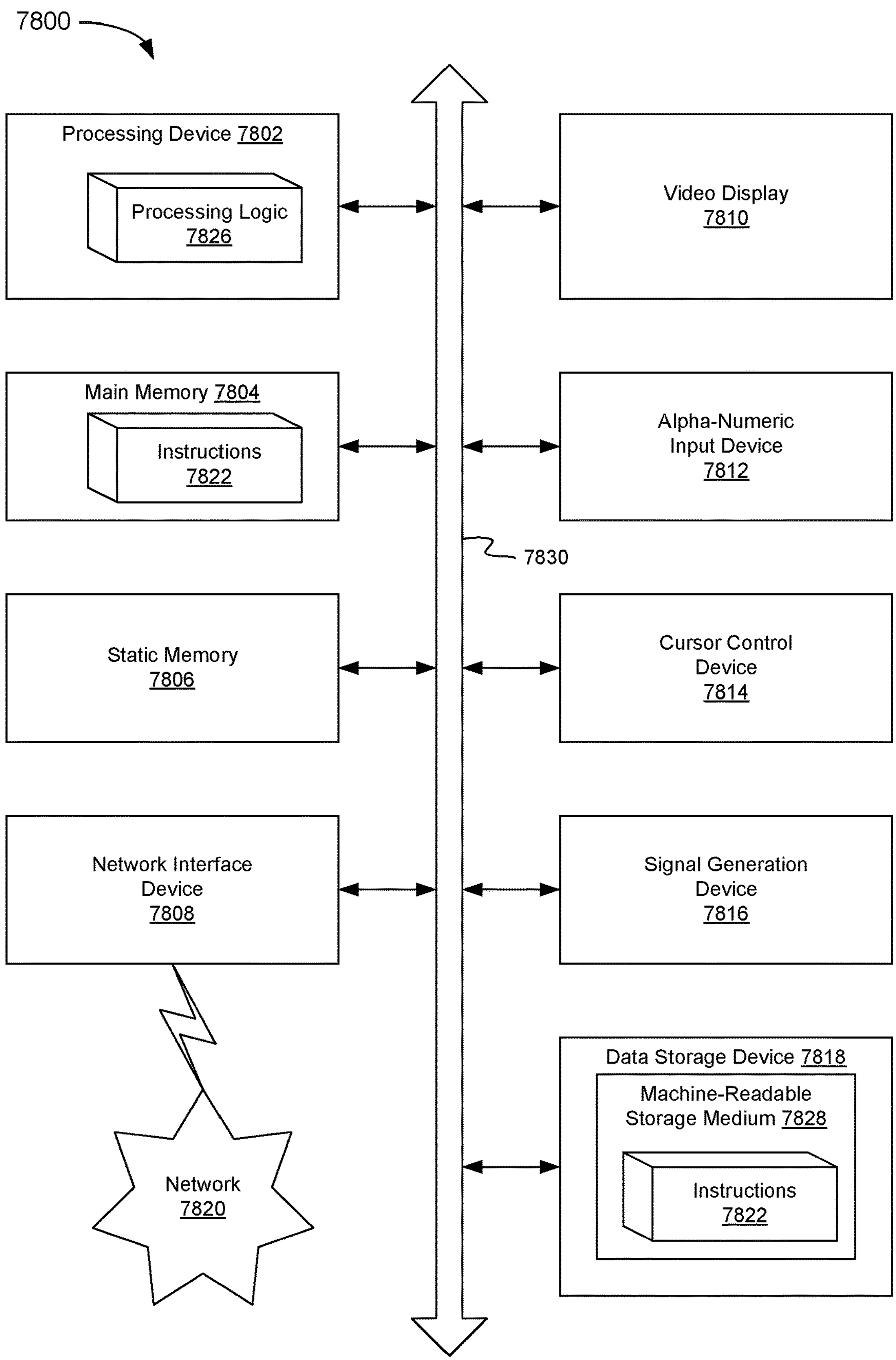

FIG. 83 depicts a block diagram of an example computing device operating in accordance with one or more implementations of the present disclosure.

DETAILED DESCRIPTION

Overview

The present disclosure is directed to monitoring performance of a system at a service level using key performance indicators derived from machine data. Implementations of the present disclosure provide users with insight to the performance of monitored services, such as, services pertaining to an information technology (IT) environment. For example, one or more users may wish to monitor the performance of a web hosting service, which provides hosted web content to end users via network.

A service can be provided by one or more entities. An entity that provides a service can be associated with machine data. As described in greater detail below, the machine data pertaining to a particular entity may use different formats and/or different aliases for the entity.

Implementations of the present disclosure are described for normalizing the different aliases and/or formats of machine data pertaining to the same entity. In particular, an entity definition can be created for a respective entity. The entity definition can normalize various machine data pertaining to a particular entity, thus simplifying the use of heterogeneous machine data for monitoring a service.

Implementations of the present disclosure are described for specifying which entities, and thus, which heterogeneous machine data, to use for monitoring a service. In one implementation, a service definition is created for a service that is to be monitored. The service definition specifies one or more entity definitions, where each entity definition corresponds to a respective entity providing the service. The service definition provides users with flexibility in associating entities with services. The service definition further provides users with the ability to define relationships between entities and services at the machine data level. Implementations of the present disclosure enable end-users to monitor services from a top-down perspective and can provide rich visualization to troubleshoot any service-related issues. Implementations of the present disclosure enable end-users to understand an environment (e.g., IT environment) and the services in the environment. For example, end-users can understand and monitor services at a business service level, application tier level, etc.

Implementations of the present disclosure provide users (e.g., business analysts) a tool for dynamically associating entities with a service. One or more entities can provide a service and/or be associated with a service. Implementations of the present disclosure provide a service monitoring system that captures the relationships between entities and services via entity definitions and/or service definitions. IT environments typically undergo changes. For example, new equipment may be added, configurations may change, systems may be upgraded and/or undergo maintenance, etc. The changes that are made to the entities in an IT environment may affect the monitoring of the services in the environment. Implementations of the present disclosure provide a tool that enable users to configure flexible relationships between entities and services to ensure that changes that are made to the entities in the IT environment are accurately captured in the entity definitions and/or service definitions. Implementations of the present disclosure can determine the relationships between the entities and services based on changes that are made to an environment without any user interaction, and can update, also without user interaction, the entity definitions and/or service definitions to reflect any adjustments made to the entities in the environment, as described below in conjunction with FIGS. 17B-17I.

Implementations of the present disclosure provide users (e.g., business analysts) an efficient tool for creating entity definitions in a timely manner. Data that describes an IT environment may exist, for example, for inventory purposes. For example, an inventory system can generate a file that contains information relating to physical machines, virtual machines, application interfaces, processes, etc. in an IT environment. Entity definitions for various components of the IT environment may be created. At times, hundreds of entity definitions are generated and maintained. Implementations of the present disclosure provide a GUI that utilizes existing data (e.g., inventory data) for creating entity definitions to reduce the amount of time and resources needed for creating the entity definitions.

Implementations of the present disclosure provide users (e.g., business analysts) an efficient tool for creating entity definitions in a timely manner. Data that describes an IT environment may be obtained, for example, by executing a search query. A user may run a search query that produces a search result set including information relating to physical machines, virtual machines, application interfaces, users, owners, and/or processes in an IT environment. The information in the search result set may be useful for creating entity definitions. Implementations of the present disclosure provide a GUI that utilizes existing data (e.g., search results sets) for creating entity definitions to reduce the amount of time and resources needed for creating the entity definitions.

In one implementation, one or more entity definitions are created from user input received via an entity definition creation GUI, as described in conjunction with FIGS. 6-10. In another implementation, one or more entity definitions are created from data in a file and user input received via a GUI, as described in conjunction with FIGS. 10B-10P. In yet another implementation, one or more entity definitions are created from data in a search result set and user input received via a GUI, as described in conjunction with FIGS. 10Q-10Z.

Implementations of the present disclosure are described for creating informational fields and including the informational fields to corresponding entity definitions. An informational field is an entity definition component for storing user-defined metadata for a corresponding entity, which includes information about the entity that may not be reliably present in, or may be absent altogether from, the machine data events. Informational fields are described in more detail below with respect to FIGS. 10AA-10AE.

Implementations of the present disclosure are described for monitoring a service at a granular level. For example, one or more aspects of a service can be monitored using one or more key performance indicators for the service. A performance indicator or key performance indicator (KPI) is a type of performance measurement. For example, users may wish to monitor the CPU (central processing unit) usage of a web hosting service, the memory usage of the web hosting service, and the request response time for the web hosting service. In one implementation, a separate KPI can be created for each of these aspects of the service that indicates how the corresponding aspect is performing.

Implementations of the present disclosure give users freedom to decide which aspects to monitor for a service and which heterogeneous machine data to use for a particular KPI. In particular, one or more KPIs can be created for a service. Each KPI can be defined by a search query that produces a value derived from the machine data identified in the entity definitions specified in the service definition. Each value can be indicative of how a particular aspect of the service is performing at a point in time or during a period of time. Implementations of the present disclosure enable users to decide what value should be produced by the search query defining the KPI. For example, a user may wish that the request response time be monitored as the average response time over a period of time.

Implementations of the present disclosure are described for customizing various states that a KPI can be in. For example, a user may define a Normal state, a Warning state, and a Critical state for a KPI, and the value produced by the search query of the KPI can indicate the current state of the KPI. In one implementation, one or more thresholds are created for each KPI. Each threshold defines an end of a range of values that represent a particular state of the KPI. A graphical interface can be provided to facilitate user input for creating one or more thresholds for each KPI, naming the states for the KPI, and associating a visual indicator (e.g., color, pattern) to represent a respective state.

Implementations of the present disclosure are described for defining multiple time varying static thresholds using sets of KPI thresholds that correspond to different time frames. For example, a user may define a first set of KPI thresholds to apply during weekdays and a different set of KPI thresholds to apply on weekends. Each set of KPI thresholds may include, for example, thresholds that correspond to a Normal state, a Warning state, and a Critical state, however the values of these thresholds may vary across different sets of KPI thresholds depending on the time frame.

Implementations of the present disclosure are described for monitoring a service at a more abstract level, as well. In particular, an aggregate KPI can be configured and calculated for a service to represent the overall health of a service. For example, a service may have 10 KPIs, each monitoring a various aspect of the service. The service may have 7 KPIs in a Normal state, 2 KPIs in a Warning state, and 1 KPI in a Critical state. The aggregate KPI can be a value representative of the overall performance of the service based on the values for the individual KPIs. Implementations of the present disclosure allow individual KPIs of a service to be weighted in terms of how important a particular KPI is to the service relative to the other KPIs in the service, thus giving users control of how to represent the overall performance of a service and control in providing a more accurate representation of the performance of the service. In addition, specific actions can be defined that are to be taken when the aggregate KPI indicating the overall health of a service, for example, exceeds a particular threshold.

Implementations of the present disclosure are described for creating notable events and/or alarms via distribution thresholding. In one implementation, a correlation search is created and used to generate notable event(s) and/or alarm(s). A correlation search can be created to determine the status of a set of KPIs for a service over a defined window of time. A correlation search represents a search query that has a triggering condition and one or more actions that correspond to the trigger condition. Thresholds can be set on the distribution of the state of each individual KPI and if the distribution thresholds are exceeded then an alert/alarm can be generated.

Implementations of the present disclosure are described for monitoring one or more services using a key performance indicator (KPI) correlation search. The performance of a service can be vital to the function of an IT environment. Certain services may be more essential than others. For example, one or more other services may be dependent on a particular service. The performance of the more crucial services may need to be monitored more aggressively. One or more states of one or more KPIs for one or more services can be proactively monitored periodically using a KPI correlation search. A defined action (e.g., creating an alarm, sending a notification, displaying information in an interface, etc.) can be taken on conditions specified by the KPI correlation search. Implementations of the present disclosure provide users (e.g., business analysts) a graphical user interface (GUI) for defining a KPI correlation search. Implementations of the present disclosure provide visualizations of current KPI state performance that can be used for specifying search information and information for a trigger determination for a KPI correlation search.

Implementations of the present disclosure are described for providing a GUI that presents notable events pertaining to one or more KPIs of one or more services. Such a notable event can be generated by a correlation search associated with a particular service. A correlation search associated with a service can include a search query, a triggering determination or triggering condition, and one or more actions to be performed based on the triggering determination (a determination as to whether the triggering condition is satisfied). In particular, a search query may include search criteria pertaining to one or more KIPs of the service, and may produce data using the search criteria. For example, a search query may produce KPI data for each occurrence of a KPI reaching a certain threshold over a specified period of time. A triggering condition can be applied to the data produced by the search query to determine whether the produced data satisfies the triggering condition. Using the above example, the triggering condition can be applied to the produced KPI data to determine whether the number of occurrences of a KPI reaching a certain threshold over a specified period of time exceeds a value in the triggering condition. If the produced data satisfies the triggering condition, a particular action can be performed. Specifically, if the data produced by the search query satisfies the triggering condition, a notable event can be generated. Additional details with respect to this "Incident Review" interface are provided below with respect to FIGS. 34O-34T.

Implementations of the present disclosure are described for providing a service-monitoring dashboard that displays one or more KPI widgets. Each KPI widget can provide a numerical or graphical representation of one or more values for a corresponding KPI or service health score (aggregate KPI for a service) indicating how a service or an aspect of a service is performing at one or more points in time. Users can be provided with the ability to design and draw the service-monitoring dashboard and to customize each of the KPI widgets. A dashboard-creation graphical interface can be provided to define a service-monitoring dashboard based on user input allowing different users to each create a customized service-monitoring dashboard. Users can select an image for the service-monitoring dashboard (e.g., image for the background of a service-monitoring dashboard, image for an entity and/or service for service-monitoring dashboard), draw a flow chart or a representation of an environment (e.g., IT environment), specify which KPIs to include in the service-monitoring dashboard, configure a KPI widget for each specified KPI, and add one or more ad hoc KPI searches to the service-monitoring dashboard. Implementations of the present disclosure provide users with service monitoring information that can be continuously and/or periodically updated. Each service-monitoring dashboard can provide a service-level perspective of how one or more services are performing to help users make operating decisions and/or further evaluate the performance of one or more services.

Implementations are described for a visual interface that displays time-based graphical visualizations that each corresponds to a different KPI reflecting how a service provided by one or more entities is performing. This visual interface may be referred to as a "deep dive." As described herein, machine data pertaining to one or more entities that provide a given service can be presented and viewed in a number of ways. The deep dive visual interface allows an in-depth look at KPI data that reflects how a service or entity is performing over a certain period of time. By having multiple graphical visualizations, each representing a different service or a different aspect of the same service, the deep dive visual interface allows a user to visually correlate the respective KPIs over a defined period of time. In one implementation, the graphical visualizations are all calibrated to the same time scale, so that the values of different KPIs can be compared at any given point in time. In one implementation, the graphical visualizations are all calibrated to different time scales. Although each graphical visualization is displayed in the same visual interface, one or more of the graphical visualizations may have a different time scale than the other graphical visualizations. The different time scale may be more appropriate for the underlying KPI data associated with the one or more graphical visualizations. In one implementation, the graphical visualizations are displayed in parallel lanes, which simplifies visual correlation and allows a user to relate the performance of one service or one aspect of the service (as represented by the KPI values) to the performance of one or more additional services or one or more additional aspects of the same service.

Implementations are described for a visual interface that enables a user to create a new correlation search based on a set of displayed graph lanes. The set of graph lanes may assist a user in identifying a situation (e.g., problem or a pattern of interest) in the performance of one or more services by providing graphical visualizations that illustrate the performance of the one or more services. Once the user has identified the situation, the user may submit a request to create a new correlation search that can result in detecting a re-occurrence of the identified problem. The new correlation search may include a definition that is derived from the set of graph lanes. For example, the definition of the new correlation search may include an aggregate triggering condition with KPI criteria determined by iterating through the multiple graph lanes. As the system iterates through the multiple graph lanes, it may analyze the fluctuations in a corresponding KPI, such as for example, fluctuations in the state of the KPI or fluctuations of the values of the KPI to determine a KPI criterion associated with the corresponding KPI. For example, the fluctuation analysis may result in determining that a CPU utilization KPI was in a critical state for 25% of a four hour time period, and this determined condition may be included in the KPI criterion for the CPU utilization KPI. After creating the new correlation's search definition, the system may run the correlation search to monitor the services and when the correlation search identifies a re-occurrence of the problem, the correlation search may generate a notable event or alarm to notify the user who created the correlation search or some other users.

Figure 1:
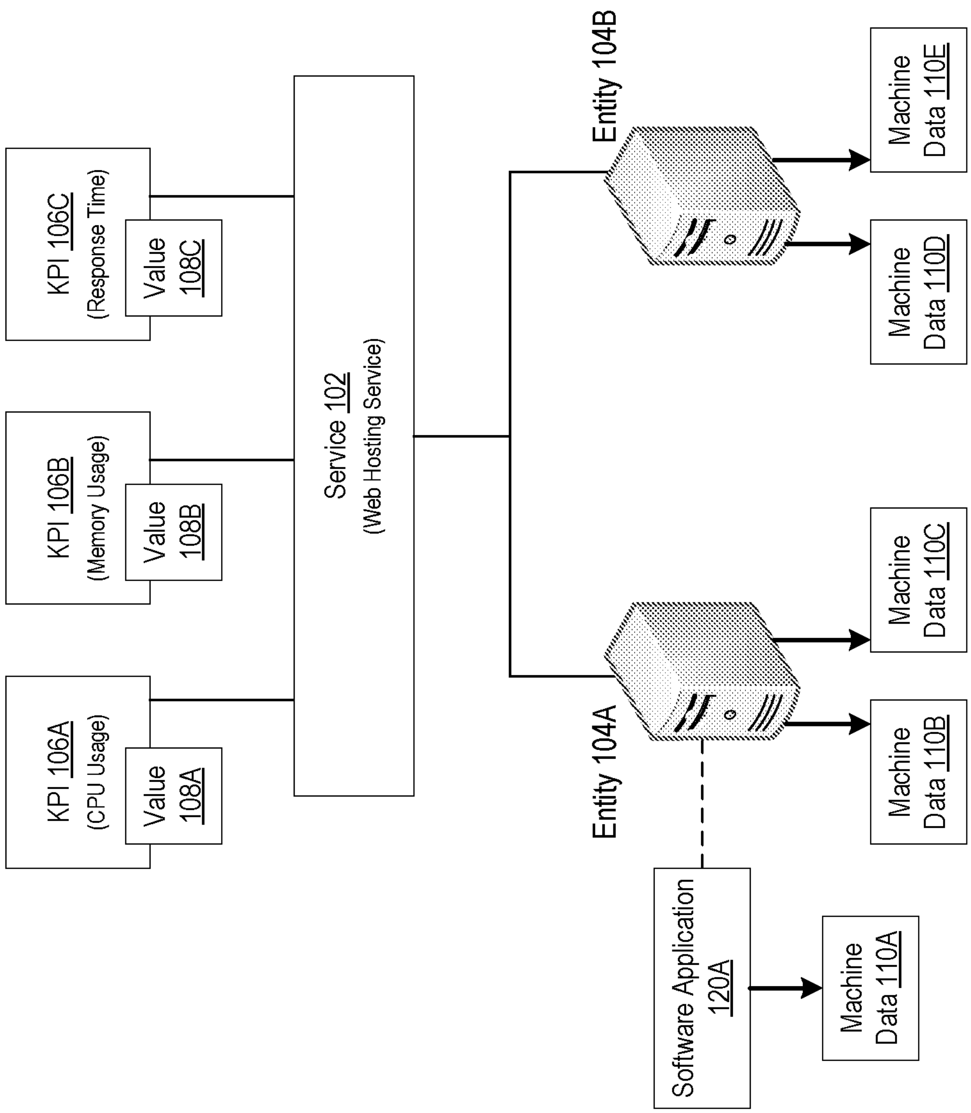
FIG. 1 illustrates a block diagram of an example of entities providing a service, in accordance with one or more implementations of the present disclosure.

FIG. 1 illustrates a block diagram of an example service provided by entities, in accordance with one or more implementations of the present disclosure. One or more entities 104A, 104B provide service 102. An entity 104A, 104B can be a component in an IT environment. Examples of an entity can include, and are not limited to a host machine, a virtual machine, a switch, a firewall, a router, a sensor, etc. For example, the service 102 may be a web hosting service, and the entities 104A, 104B may be web servers running on one or more host machines to provide the web hosting service. In another example, an entity could represent a single process on different (physical or virtual) machines. In another example, an entity could represent communication between two different machines.

The service 102 can be monitored using one or more KPIs 106 for the service. A KPI is a type of performance measurement. One or more KPIs can be defined for a service. In the illustrated example, three KPIs 106A-C are defined for service 102. KPI 106A may be a measurement of CPU (central processing unit) usage for the service 102. KPI 106B may be a measurement of memory usage for the service 102. KPI 106C may be a measurement of request response time for the service 102.

In one implementation, KPI 106A-C is derived based on machine data pertaining to entities 104A and 104B that provide the service 102 that is associated with the KPI 106A-C. In another implementation, KPI 106A-C is derived based on machine data pertaining to entities other than and/or in addition to entities 104A and 104B. In another implementation, input (e.g., user input) may be received that defines a custom query, which does not use entity filtering, and is treated as a KPI. Machine data pertaining to a specific entity can be machine data produced by that entity or machine data about that entity, which is produced by another entity. For example, machine data pertaining to entity 104A can be derived from different sources that may be hosted by entity 104A and/or some other entity or entities.

A source of machine data can include, for example, a software application, a module, an operating system, a script, an application programming interface, etc. For example, machine data 110B may be log data that is produced by the operating system of entity 104A. In another example, machine data 110C may be produced by a script that is executing on entity 104A. In yet another example, machine data 110A may be about an entity 104A and produced by a software application 120A that is hosted by another entity to monitor the performance of the entity 104A through an application programming interface (API).

For example, entity 104A may be a virtual machine and software application 120A may be executing outside of the virtual machine (e.g., on a hypervisor or a host operating system) to monitor the performance of the virtual machine via an API. The API can generate network packet data including performance measurements for the virtual machine, such as, memory utilization, CPU usage, etc.

Similarly, machine data pertaining to entity 104B may include, for example, machine data 110D, such as log data produced by the operating system of entity 104B, and machine data 110E, such as network packets including http responses generated by a web server hosted by entity 104B.

Implementations of the present disclosure provide for an association between an entity (e.g., a physical machine) and machine data pertaining to that entity (e.g., machine data produced by different sources hosted by the entity or machine data about the entity that may be produced by sources hosted by some other entity or entities). The association may be provided via an entity definition that identifies machine data from different sources and links the identified machine data with the actual entity to which the machine data pertains, as will be discussed in more detail below in conjunction with FIG. 3 and FIGS. 6-10. Entities that are part of a particular service can be further grouped via a service definition that specifies entity definitions of the entities providing the service, as will be discussed in more detail below in conjunction with FIGS. 11-31.

In the illustrated example, an entity definition for entity 104A can associate machine data 110A, 110B and 110C with entity 104A, an entity definition for entity 104B can associate machine data 110D and 110E with entity 104B, and a service definition for service 102 can group entities 104A and 104B together, thereby defining a pool of machine data that can be operated on to produce KPIs 106A, 106B and 106C for the service 102. In particular, each KPI 106A, 106B, 106C of the service 102 can be defined by a search query that produces a value 108A, 108B, 108C derived from the machine data 110A-E. As will be discussed in more detail below, according to one implementation, the machine data 110A-E is identified in entity definitions of entities 104A and 104B, and the entity definitions are specified in a service definition of service 102 for which values 108A-C are produced to indicate how the service 102 is performing at a point in time or during a period of time. For example, KPI 106A can be defined by a search query that produces value 108A indicating how the service 102 is performing with respect to CPU usage. KPI 106B can be defined by a different search query that produces value 108B indicating how the service 102 is performing with respect to memory usage. KPI 106C can be defined by yet another search query that produces value 108C indicating how the service 102 is performing with respect to request response time.

The values 108A-C for the KPIs can be produced by executing the search query of the respective KPI. In one example, the search query defining a KPI 106A-C can be executed upon receiving a request (e.g., user request). For example, a service-monitoring dashboard, which is described in greater detail below in conjunction with FIG. 35, can display KPI widgets providing a numerical or graphical representation of the value 108 for a respective KPI 106. A user may request the service-monitoring dashboard to be displayed at a point in time, and the search queries for the KPIs 106 can be executed in response to the request to produce the value 108 for the respective KPI 106. The produced values 108 can be displayed in the service-monitoring dashboard.

In another example, the search query defining a KPI 106A-C can be executed in real-time (continuous execution until interrupted). For example, a user may request the service-monitoring dashboard to be displayed, and the search queries for the KPIs 106 can be executed in response to the request to produce the value 108 for the respective KPI 106. The produced values 108 can be displayed in the service-monitoring dashboard. The search queries for the KPIs 106 can be continuously executed until interrupted and the values for the search queries can be refreshed in the service-monitoring dashboard with each execution. Examples of interruption can include changing graphical interfaces, stopping execution of a program, etc.

In another example, the search query defining a KPI 106 can be executed based on a schedule. For example, the search query for a KPI (e.g., KPI 106A) can be executed at one or more particular times (e.g., 6:00 am, 12:00 pm, 6:00 pm, etc.) and/or based on a period of time (e.g., every 5 minutes). In one example, the values (e.g., values 108A) produced by a search query for a KPI (e.g., KPI 106A) by executing the search query on a schedule are stored in a data store, and are used to calculate an aggregate KPI score for a service (e.g., service 102), as described in greater detail below in conjunction with FIGS. 32-33. An aggregate KPI score for the service 102 is indicative of an overall performance of the KPIs 106 of the service.

In one implementation, the machine data (e.g., machine data 110A-E) used by a search query defining a KPI (e.g., KPI 106A) to produce a value can be based on a time range. The time range can be a user-defined time range or a default time range. For example, in the service-monitoring dashboard example above, a user can select, via the service-monitoring dashboard, a time range to use to further specify, for example, based on time-stamps, which machine data should be used by a search query defining a KPI. For example, the time range can be defined as "Last 15 minutes," which would represent an aggregation period for producing the value. In other words, if the query is executed periodically (e.g., every 5 minutes), the value resulting from each execution can be based on the last 15 minutes on a rolling basis, and the value resulting from each execution can be, for example, the maximum value during a corresponding 15-minute time range, the minimum value during the corresponding 15-minute time range, an average value for the corresponding 15-minute time range, etc.

In another implementation, the time range is a selected (e.g., user-selected) point in time and the definition of an individual KPI can specify the aggregation period for the respective KPI. By including the aggregation period for an individual KPI as part of the definition of the respective KPI, multiple KPIs can run on different aggregation periods, which can more accurately represent certain types of aggregations, such as, distinct counts and sums, improving the utility of defined thresholds. In this manner, the value of each KPI can be displayed at a given point in time. In one example, a user may also select "real time" as the point in time to produce the most up to date value for each KPI using its respective individually defined aggregation period.

An event-processing system can process a search query that defines a KPI of a service. An event-processing system can aggregate heterogeneous machine-generated data (machine data) received from various sources (e.g., servers, databases, applications, networks, etc.) and optionally provide filtering such that data is only represented where it pertains to the entities providing the service. In one example, a KPI may be defined by a user-defined custom query that does not use entity filtering. The aggregated machine data can be processed and represented as events. An event can be represented by a data structure that is associated with a certain point in time and comprises a portion of raw machine data (i.e., machine data). Events are described in greater detail below in conjunction with FIG. 72. The event-processing system can be configured to perform real-time indexing of the machine data and to execute real-time, scheduled, or historic searches on the source data. An exemplary event-processing system is described in greater detail below in conjunction with FIG. 71.

Example Service Monitoring System

Figure 2:
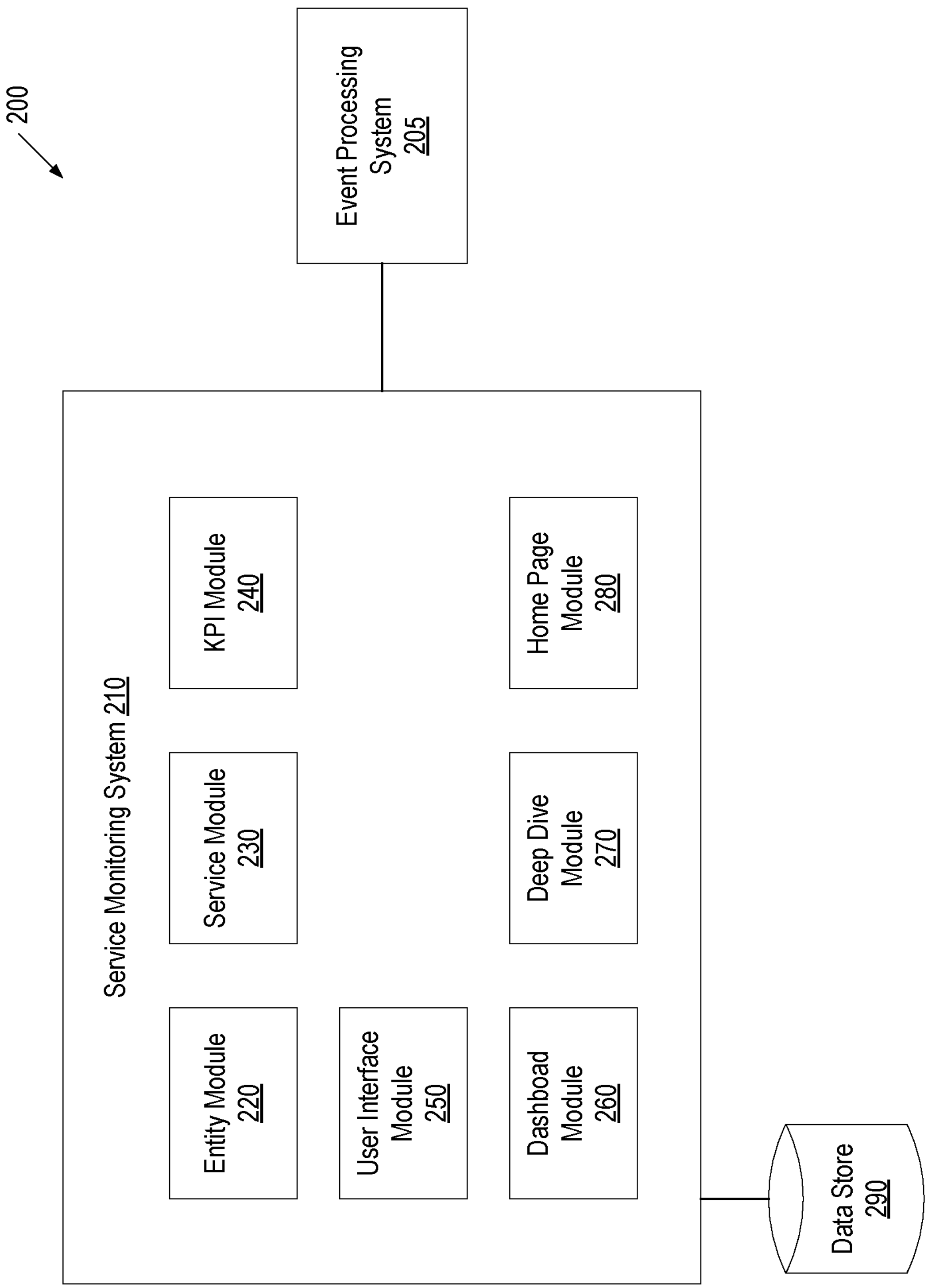
FIG. 2 is a block diagram of one implementation of a service monitoring system, in accordance with one or more implementations of the present disclosure.

FIG. 2 is a block diagram 200 of one implementation of a service monitoring system 210 for monitoring performance of one or more services using key performance indicators derived from machine data, in accordance with one or more implementations of the present disclosure. The service monitoring system 210 can be hosted by one or more computing machines and can include components for monitoring performance of one or more services. The components can include, for example, an entity module 220, a service module 230, a key performance indicator module 240, a user interface (UI) module 250, a dashboard module 260, a deep dive module 270, and a home page module 280. The components can be combined together or separated in further components, according to a particular embodiment. The components and/or combinations of components can be hosted on a single computing machine and/or multiple computing machines. The components and/or combinations of components can be hosted on one or more client computing machines and/or server computing machines.

The entity module 220 can create entity definitions. "Create" hereinafter includes "edit" throughout this document. An entity definition is a data structure that associates an entity (e.g., entity 104A in FIG. 1) with machine data (e.g., machine data 110A-C in FIG. 1). The entity module 220 can determine associations between machine data and entities, and can create an entity definition that associates an individual entity with machine data produced by different sources hosted by that entity and/or other entity(ies). In one implementation, the entity module 220 automatically identifies the entities in an environment (e.g., IT environment), automatically determines, for each entity, which machine data is associated with that particular entity, and automatically generates an entity definition for each entity. In another implementation, the entity module 220 receives input (e.g., user input) for creating an entity definition for an entity, as will be discussed in greater detail below in conjunction with FIGS. 5-10.

Figure 3:
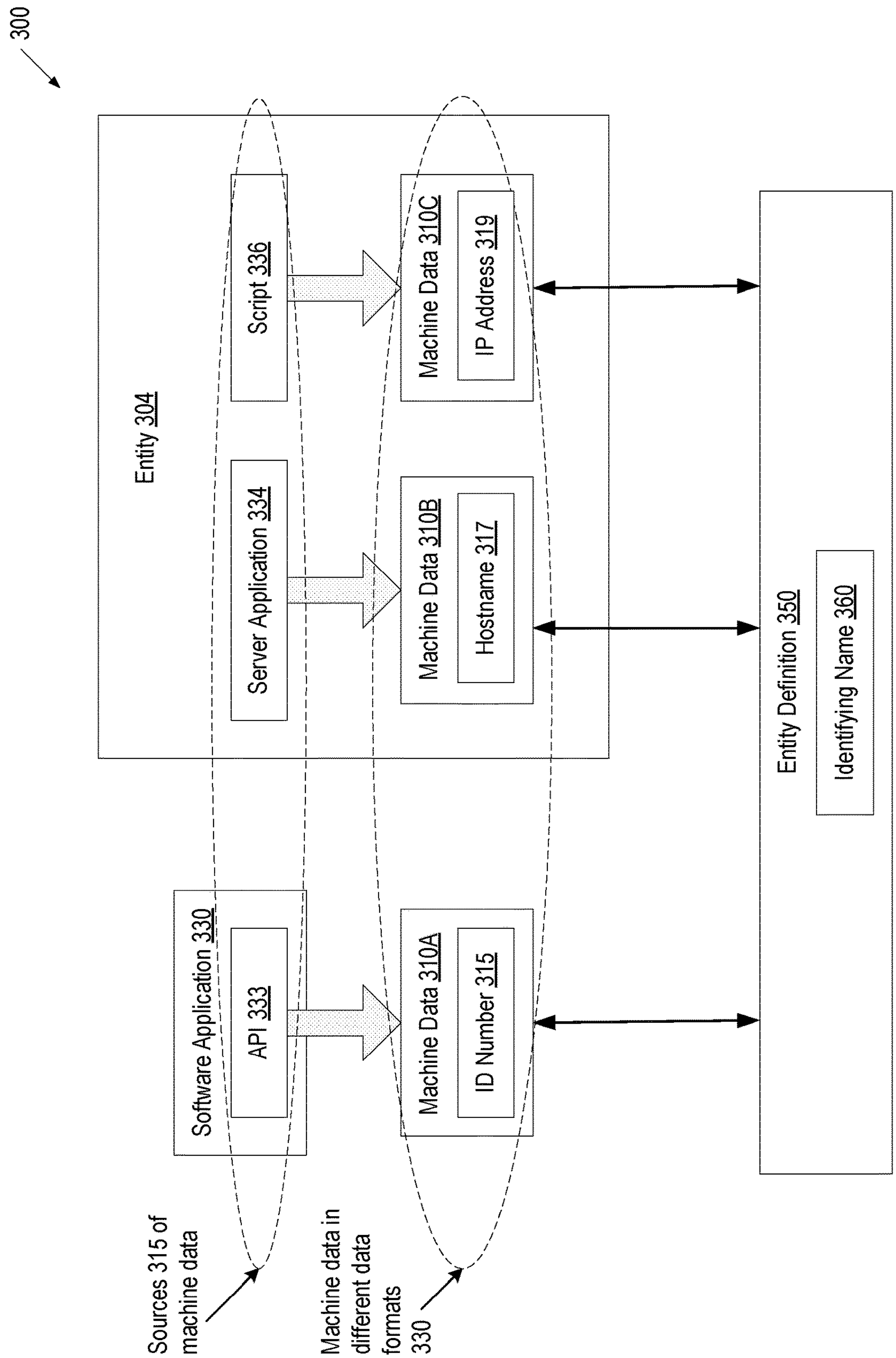
FIG. 3 is a block diagram illustrating an entity definition for an entity, in accordance with one or more implementations of the present disclosure.

FIG. 3 is a block diagram 300 illustrating an entity definition for an entity, in accordance with one or more implementations of the present disclosure. The entity module 220 can create entity definition 350 that associates an entity 304 with machine data (e.g., machine data 310A, machine data 310B, machine data 310C) pertaining to that entity 304. Machine data that pertains to a particular entity can be produced by different sources 315 and may be produced in different data formats 330. For example, the entity 304 may be a host machine that is executing a server application 334 that produces machine data 310B (e.g., log data). The entity 304 may also host a script 336, which when executed, produces machine data 310C. A software application 330, which is hosted by a different entity (not shown), can monitor the entity 304 and use an API 333 to produce machine data 310A about the entity 304.

Each of the machine data 310A-C can include an alias that references the entity 304. At least some of the aliases for the particular entity 304 may be different from each other. For example, the alias for entity 304 in machine data 310A may be an identifier (ID) number 315, the alias for entity 304 in machine data 310B may be a hostname 317, and the alias for entity 304 in machine data 310C may be an IP (internet protocol) address 319.

The entity module 220 can receive input for an identifying name 360 for the entity 304 and can include the identifying name 360 in the entity definition 350. The identifying name 360 can be defined from input (e.g., user input). For example, the entity 304 may be a web server and the entity module 220 may receive input specifying webserver01.splunk.com as the identifying name 360. The identifying name 360 can be used to normalize the different aliases of the entity 304 from the machine data 310A-C to a single identifier.

Figure 4:
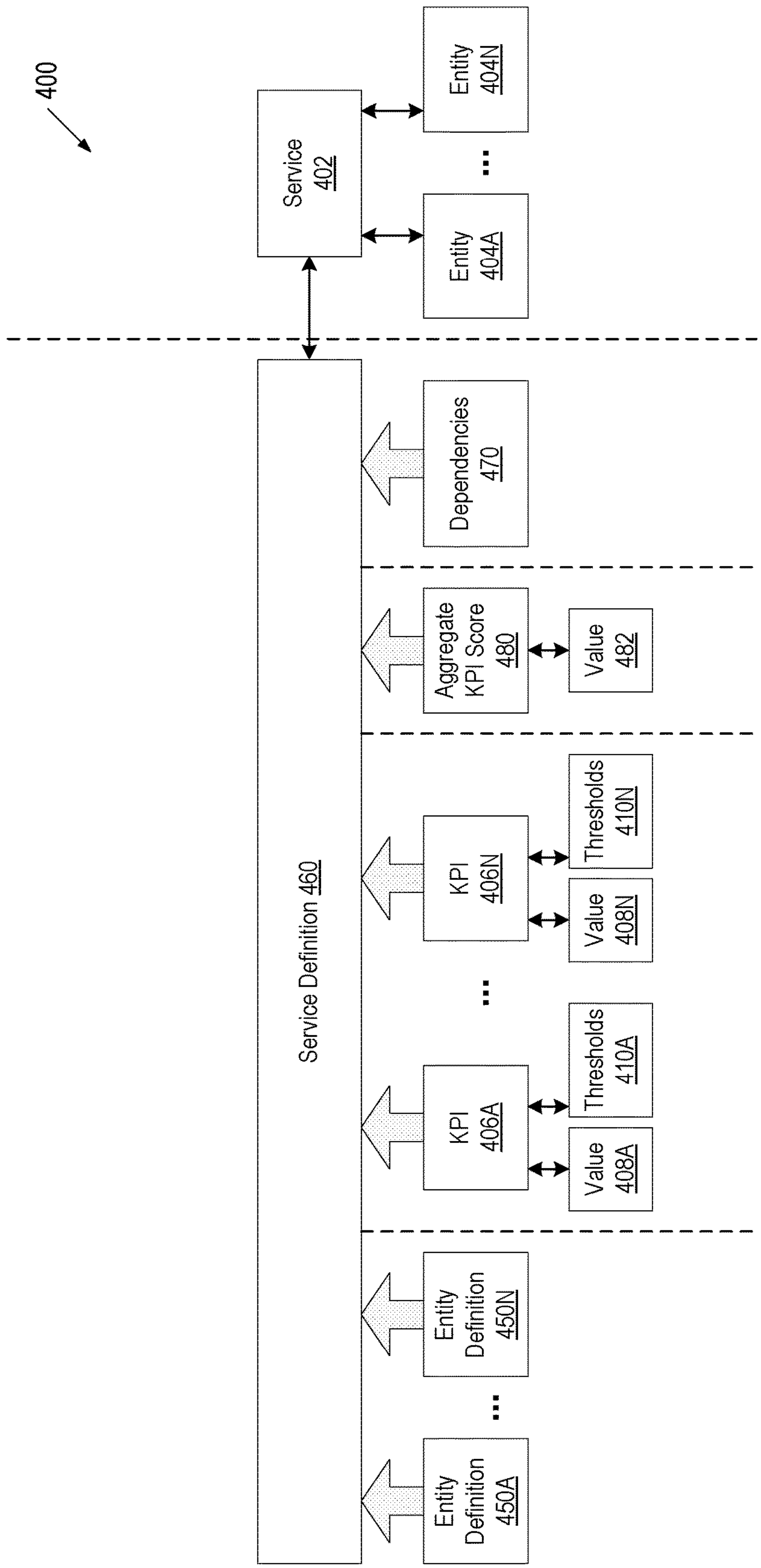
FIG. 4 is a block diagram illustrating a service definition that relates one or more entities with a service, in accordance with one or more implementations of the present disclosure.

A KPI, for example, for monitoring CPU usage for a service provided by the entity 304, can be defined by a search query directed to search machine data 310A-C based a service definition, which is described in greater detail below in conjunction with FIG. 4, associating the entity definition 350 with the KPI, the entity definition 350 associating the entity 304 with the identifying name 360, and associating the identifying name 360 (e.g., webserver01.splunk.com) with the various aliases (e.g., ID number 315, hostname 317, and IP address 319).

Referring to FIG. 2, the service module 230 can create service definitions for services. A service definition is a data structure that associates one or more entities with a service. The service module 230 can receive input (e.g., user input) of a title and/or description for a service definition. FIG. 4 is a block diagram illustrating a service definition that associates one or more entities with a service, in accordance with one or more implementations of the present disclosure. In another implementation, a service definition specifies one or more other services which a service depends upon and does not associate any entities with the service, as described in greater detail below in conjunction with FIG. 18. In another implementation, a service definition specifies a service as a collection of one or more other services and one or more entities.

In one example, a service 402 is provided by one or more entities 404A-N. For example, entities 404A-N may be web servers that provide the service 402 (e.g., web hosting service). In another example, a service 402 may be a database service that provides database data to other services (e.g., analytical services). The entities 404A-N, which provides the database service, may be database servers.

The service module 230 can include an entity definition 450A-450N, for a corresponding entity 404A-N that provides the service 402, in the service definition 460 for the service 402. The service module 230 can receive input (e.g., user input) identifying one or more entity definitions to include in a service definition.

The service module 230 can include dependencies 470 in the service definition 460. The dependencies 470 indicate one or more other services for which the service 402 is dependent upon. For example, another set of entities (e.g., host machines) may define a testing environment that provides a sandbox service for isolating and testing untested programming code changes. In another example, a specific set of entities (e.g., host machines) may define a revision control system that provides a revision control service to a development organization. In yet another example, a set of entities (e.g., switches, firewall systems, and routers) may define a network that provides a networking service. The sandbox service can depend on the revision control service and the networking service. The revision control service can depend on the networking service. If the service 402 is the sandbox service and the service definition 460 is for the sandbox service 402, the dependencies 470 can include the revision control service and the networking service. The service module 230 can receive input specifying the other service(s) for which the service 402 is dependent on and can include the dependencies 470 between the services in the service definition 460. In one implementation, the service associated defined by the service definition 460 may be designated as a dependency for another service, and the service definition 460 can include information indicating the other services which depend on the service described by the service definition 460.

Referring to FIG. 2, the KPI module 240 can create one or more KPIs for a service and include the KPIs in the service definition. For example, in FIG. 4, various aspects (e.g., CPU usage, memory usage, response time, etc.) of the service 402 can be monitored using respective KPIs. The KPI module 240 can receive input (e.g., user input) defining a KPI for each aspect of the service 402 to be monitored and include the KPIs (e.g., KPIs 406A-406N) in the service definition 460 for the service 402. Each KPI can be defined by a search query that can produce a value. For example, the KPI 406A can be defined by a search query that produces value 408A, and the KPI 406N can be defined by a search query that produces value 408N.

The KPI module 240 can receive input specifying the search processing language for the search query defining the KPI. The input can include a search string defining the search query and/or selection of a data model to define the search query. Data models are described in greater detail below in conjunction with FIGS. 74B-D. The search query can produce, for a corresponding KPI, value 408A-N derived from machine data that is identified in the entity definitions 450A-N that are identified in the service definition 460.

The KPI module 240 can receive input to define one or more thresholds for one or more KPIs. For example, the KPI module 240 can receive input defining one or more thresholds 410A for KPI 406A and input defining one or more thresholds 410N for KPI 406N. Each threshold defines an end of a range of values representing a certain state for the KPI. Multiple states can be defined for the KPI (e.g., unknown state, trivial state, informational state, normal state, warning state, error state, and critical state), and the current state of the KPI depends on which range the value, which is produced by the search query defining the KPI, falls into. The KPI module 240 can include the threshold definition(s) in the KPI definitions. The service module 230 can include the defined KPIs in the service definition for the service.

The KPI module 240 can calculate an aggregate KPI score 480 for the service for continuous monitoring of the service. The score 480 can be a calculated value 482 for the aggregate of the KPIs for the service to indicate an overall performance of the service. For example, if the service has 10 KPIs and if the values produced by the search queries for 9 of the 10 KPIs indicate that the corresponding KPI is in a normal state, then the value 482 for an aggregate KPI may indicate that the overall performance of the service is satisfactory. Some implementations of calculating a value for an aggregate KPI for the service are discussed in greater detail below in conjunction with FIGS. 32-33.

Referring to FIG. 2, the service monitoring system 210 can be coupled to one or more data stores 290. The entity definitions, the service definitions, and the KPI definitions can be stored in the data store(s) 290 that are coupled to the service monitoring system 210. The entity definitions, the service definitions, and the KPI definitions can be stored in a data store 290 in a key-value store, a configuration file, a lookup file, a database, or in metadata fields associated with events representing the machine data. A data store 290 can be a persistent storage that is capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

The user interface (UI) module 250 can generate graphical interfaces for creating and/or editing entity definitions for entities, creating and/or editing service definitions for services, defining key performance indicators (KPIs) for services, setting thresholds for the KPIs, and defining aggregate KPI scores for services. The graphical interfaces can be user interfaces and/or graphical user interfaces (GUIs).

The UI module 250 can cause the display of the graphical interfaces and can receive input via the graphical interfaces. The entity module 220, service module 230, KPI module 240, dashboard module 260, deep dive module 270, and home page module 280 can receive input via the graphical interfaces generated by the UI module 250. The entity module 220, service module 230, KPI module 240, dashboard module 260, deep dive module 270, and home page module 280 can provide data to be displayed in the graphical interfaces to the UI module 250, and the UI module 250 can cause the display of the data in the graphical interfaces.

The dashboard module 260 can create a service-monitoring dashboard. In one implementation, dashboard module 260 works in connection with UI module 250 to present a dashboard-creation graphical interface that includes a modifiable dashboard template, an interface containing drawing tools to customize a service-monitoring dashboard to define flow charts, text and connections between different elements on the service-monitoring dashboard, a KPI-selection interface and/or service selection interface, and a configuration interface for creating service-monitoring dashboard. The service-monitoring dashboard displays one or more KPI widgets. Each KPI widget can provide a numerical or graphical representation of one or more values for a corresponding KPI indicating how an aspect of a service is performing at one or more points in time. Dashboard module 260 can work in connection with UI module 250 to define the service-monitoring dashboard in response to user input, and to cause display of the service-monitoring dashboard including the one or more KPI widgets. The input can be used to customize the service-monitoring dashboard. The input can include for example, selection of one or more images for the service-monitoring dashboard (e.g., a background image for the service-monitoring dashboard, an image to represent an entity and/or service), creation and representation of adhoc search in the form of KPI widgets, selection of one or more KPIs to represent in the service-monitoring dashboard, selection of a KPI widget for each selected KPI. The input can be stored in the one or more data stores 290 that are coupled to the dashboard module 260. In other implementations, some other software or hardware module may perform the actions associated with generating and displaying the service-monitoring dashboard, although the general functionality and features of the service-monitoring dashboard should remain as described herein. Some implementations of creating the service-monitoring dashboard and causing display of the service-monitoring dashboard are discussed in greater detail below in conjunction with FIGS. 35-47.

In one implementation, deep dive module 270 works in connection with UI module 250 to present a wizard for creation and editing of the deep dive visual interface, to generate the deep dive visual interface in response to user input, and to cause display of the deep dive visual interface including the one or more graphical visualizations. The input can be stored in the one or more data stores 290 that are coupled to the deep dive module 270. In other implementations, some other software or hardware module may perform the actions associated with generating and displaying the deep dive visual interface, although the general functionality and features of deep dive should remain as described herein. Some implementations of creating the deep dive visual interface and causing display of the deep dive visual interface are discussed in greater detail below in conjunction with FIGS. 49-70.

The home page module 280 can create a home page graphical interface. The home page graphical interface can include one or more tiles, where each tile represents a service-related alarm, service-monitoring dashboard, a deep dive visual interface, or the value of a particular KPI. In one implementation home page module 280 works in connection with UI module 250. The UI module 250 can cause the display of the home page graphical interface. The home page module 280 can receive input (e.g., user input) to request a service-monitoring dashboard or a deep dive to be displayed. The input can include for example, selection of a tile representing a service-monitoring dashboard or a deep dive. In other implementations, some other software or hardware module may perform the actions associated with generating and displaying the home page graphical interface, although the general functionality and features of the home page graphical interface should remain as described herein. An example home page graphical interface is discussed in greater detail below in conjunction with FIG. 48.

Referring to FIG. 2, the service monitoring system 210 can be coupled to an event processing system 205 via one or more networks. The event processing system 205 can receive a request from the service monitoring system 210 to process a search query. For example, the dashboard module 260 may receive input request to display a service-monitoring dashboard with one or more KPI widgets. The dashboard module 260 can request the event processing system 205 to process a search query for each KPI represented by a KPI widget in the service-monitoring dashboard. Some implementations of an event processing system 205 are discussed in greater detail below in conjunction with FIG. 71.

The one or more networks can include one or more public networks (e.g., the Internet), one or more private networks (e.g., a local area network (LAN) or one or more wide area networks (WAN)), one or more wired networks (e.g., Ethernet network), one or more wireless networks (e.g., an 802.11 network or a Wi-Fi network), one or more cellular networks (e.g., a Long Term Evolution (LTE) network), routers, hubs, switches, server computers, and/or a combination thereof.

Key Performance Indicators

Figure 5:
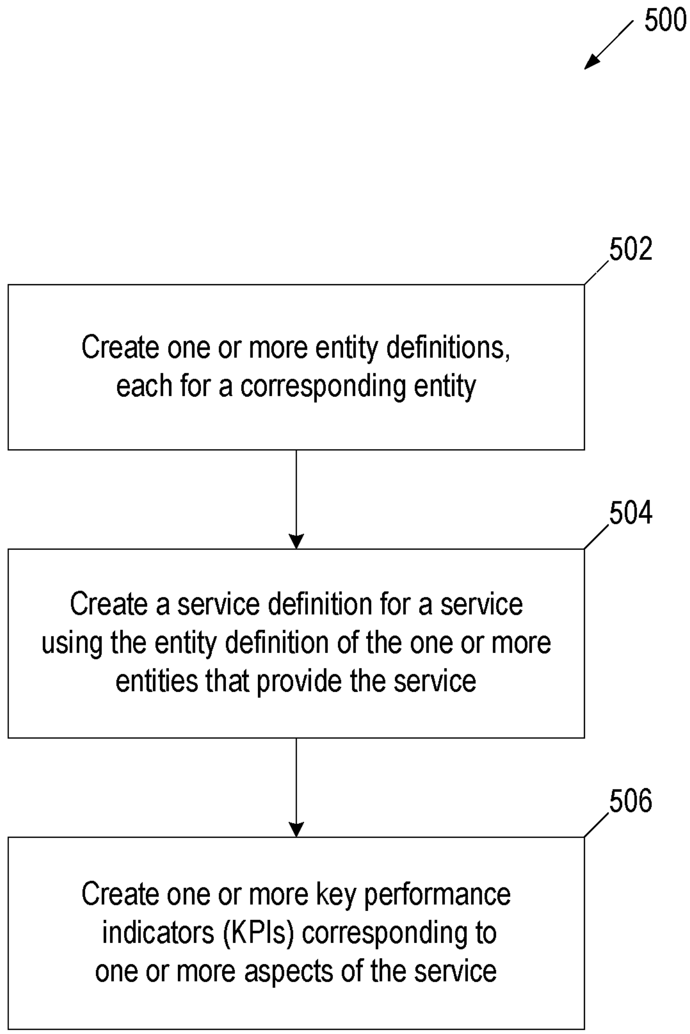
FIG. 5 is a flow diagram of an implementation of a method for creating one or more key performance indicators for a service, in accordance with one or more implementations of the present disclosure.

FIG. 5 is a flow diagram of an implementation of a method 500 for creating one or more key performance indicators for a service, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, at least a portion of method is performed by a client computing machine. In another implementation, at least a portion of method is performed by a server computing machine.

At block 502, the computing machine creates one or more entity definitions, each for a corresponding entity. Each entity definition associates an entity with machine data that pertains to that entity. As described above, various machine data may be associated with a particular entity, but may use different aliases for identifying the same entity. The entity definition for an entity normalizes the different aliases of that entity. In one implementation, the computing machine receives input for creating the entity definition. The input can be user input. Some implementations of creating an entity definition for an entity from input received via a graphical user interface are discussed in greater detail below in conjunction with FIGS. 6-10.

In another implementation, the computing machine imports a data file (e.g., CSV (comma-separated values) data file) that includes information identifying entities in an environment and uses the data file to automatically create entity definitions for the entities described in the data file. The data file may be stored in a data store (e.g., data store 290 in FIG. 2) that is coupled to the computing machine.

In another implementation, the computing machine automatically (without any user input) identifies one or more aliases for an entity in machine data, and automatically creates an entity definition in response to automatically identifying the aliases of the entity in the machine data. For example, the computing machine can execute a search query from a saved search to extract data to identify an alias for an entity in machine data from one or more sources, and automatically create an entity definition for the entity based on the identified aliases. Some implementations of creating an entity definition from importing a data file and/or from a saved search are discussed in greater detail below in conjunction with FIG. 16.

At block 504, the computing machine creates a service definition for a service using the entity definitions of the one or more entities that provide the service, according to one implementation. A service definition can relate one or more entities to a service. For example, the service definition can include an entity definition for each of the entities that provide the service. In one implementation, the computing machine receives input (e.g., user input) for creating the service definition. Some implementations of creating a service definition from input received via a graphical interface are discussed in more detail below in conjunction with FIGS. 11-18. In one implementation, the computing machine automatically creates a service definition for a service. In another example, a service may not directly be provided by one or more entities, and the service definition for the service may not directly relate one or more entities to the service. For example, a service definition for a service may not contain any entity definitions and may contain information indicating that the service is dependent on one or more other services. A service that is dependent on one or more other services is described in greater detail below in conjunction with FIG. 18. For example, a business service may not be directly provided by one or more entities and may be dependent on one or more other services. For example, an online store service may depend on an e-commerce service provided by an e-commerce system, a database service, and a network service. The online store service can be monitored via the entities of the other services (e.g., e-commerce service, database service, and network service) upon which the service depends on.

At block 506, the computing machine creates one or more key performance indicators (KPIs) corresponding to one or more aspects of the service. An aspect of a service may refer to a certain characteristic of the service that can be measured at various points in time during the operation of the service. For example, aspects of a web hosting service may include request response time, CPU usage, and memory usage. Each KPI for the service can be defined by a search query that produces a value derived from the machine data that is identified in the entity definitions included in the service definition for the service. Each value is indicative of how an aspect of the service is performing at a point in time or during a period of time. In one implementation, the computing machine receives input (e.g., user input) for creating the KPI(s) for the service. Some implementations of creating KPI(s) for a service from input received via a graphical interface will be discussed in greater detail below in conjunction with FIGS. 19-31. In one implementation, the computing machine automatically creates one or more key performance indicators (KPIs) corresponding to one or more aspects of the service.

Figure 6:
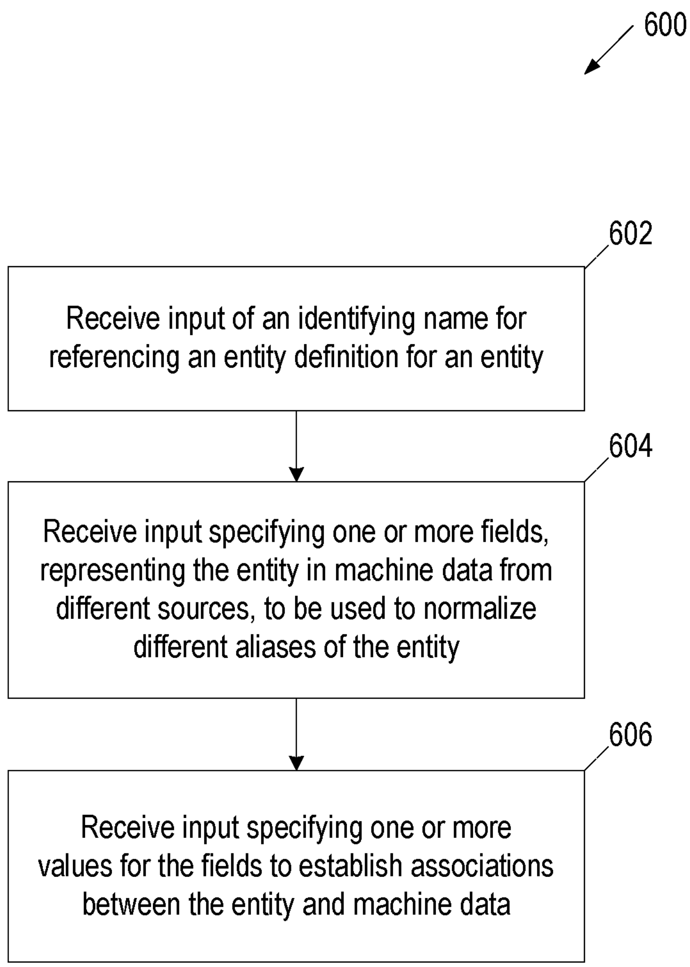
FIG. 6 is a flow diagram of an implementation of a method for creating an entity definition for an entity, in accordance with one or more implementations of the present disclosure.

FIG. 6 is a flow diagram of an implementation of a method 600 for creating an entity definition for an entity, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, at least a portion of method is performed by a client computing machine. In another implementation, at least a portion of method is performed by a server computing machine.

At block 602, the computing machine receives input of an identifying name for referencing the entity definition for an entity. The input can be user input. The user input can be received via a graphical interface. Some implementations of creating an entity definition via input received from a graphical interface are discussed in greater detail below in conjunction with FIGS. 7-10. The identifying name can be a unique name.

At block 604, the computing machine receives input (e.g., user input) specifying one or more search fields ("fields") representing the entity in machine data from different sources, to be used to normalize different aliases of the entity. Machine data can be represented as events. As described above, the computing machine can be coupled to an event processing system (e.g., event processing system 205 in FIG. 2). The event processing system can process machine data to represent the machine data as events. Each of the events is raw data, and when a late-binding schema is applied to the events, values for fields defined by the schema are extracted from the events. A number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored. Each event has metadata associated with the respective event. Implementations of the event processing system processing the machine data to be represented as events are discussed in greater detail below in conjunction with FIG. 71.

At block 606, the computing machine receives input (e.g., user input) specifying one or more search values ("values") for the fields to establish associations between the entity and machine data. The values can be used to search for the events that have matching values for the above fields. The entity can be associated with the machine data that is represented by the events that have fields that store values that match the received input.

The computing machine can optionally also receive input (e.g., user input) specifying a type of entity to which the entity definition applies. The computing machine can optionally also receive input (e.g., user input) associating the entity of the entity definition with one or more services. Some implementations of receiving input for an entity type for an entity definition and associating the entity with one or more services are discussed in greater detail below in conjunction with FIGS. 9A-B.

Figure 7:
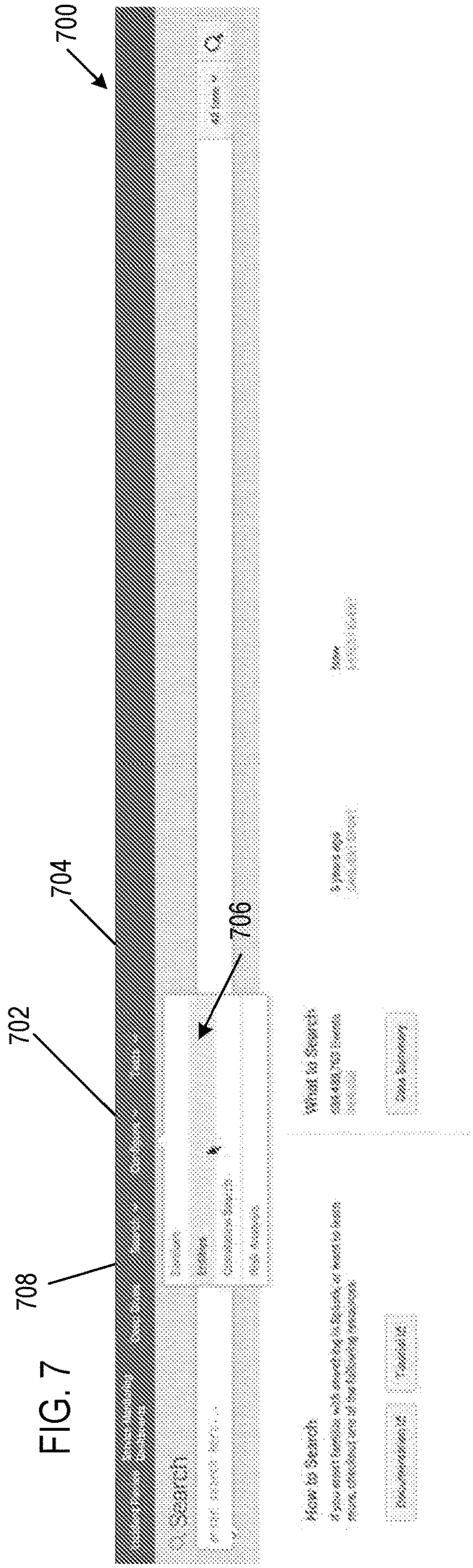
FIG. 7 illustrates an example of a graphical user interface (GUI) for creating and/or editing entity definition(s) and/or service definition(s), in accordance with one or more implementations of the present disclosure.

FIG. 7 illustrates an example of a GUI 700 of a service monitoring system for creating and/or editing entity definition(s) and/or service definition(s), in accordance with one or more implementations of the present disclosure. One or more GUIs of the service monitoring system can include GUI elements to receive input and to display data. The GUI elements can include, for example, and are not limited to, a text box, a button, a link, a selection button, a drop down menu, a sliding bar, a selection button, an input field, etc. In one implementation, GUI 700 includes a menu item, such as Configure 702, to facilitate the creation of entity definitions and service definitions.

Upon the selection of the Configure 702 menu item, a drop-down menu 704 listing configuration options can be displayed. If the user selects the entities option 706 from the drop-down menu 704, a GUI for creating an entity definition can be displayed, as discussed in more detail below in conjunction with FIG. 8. If the user selects the services option 708 from the drop-down menu 704, a GUI for creating a service definition can be displayed, as discussed in more detail below in conjunction with FIG. 11.

Figure 8:
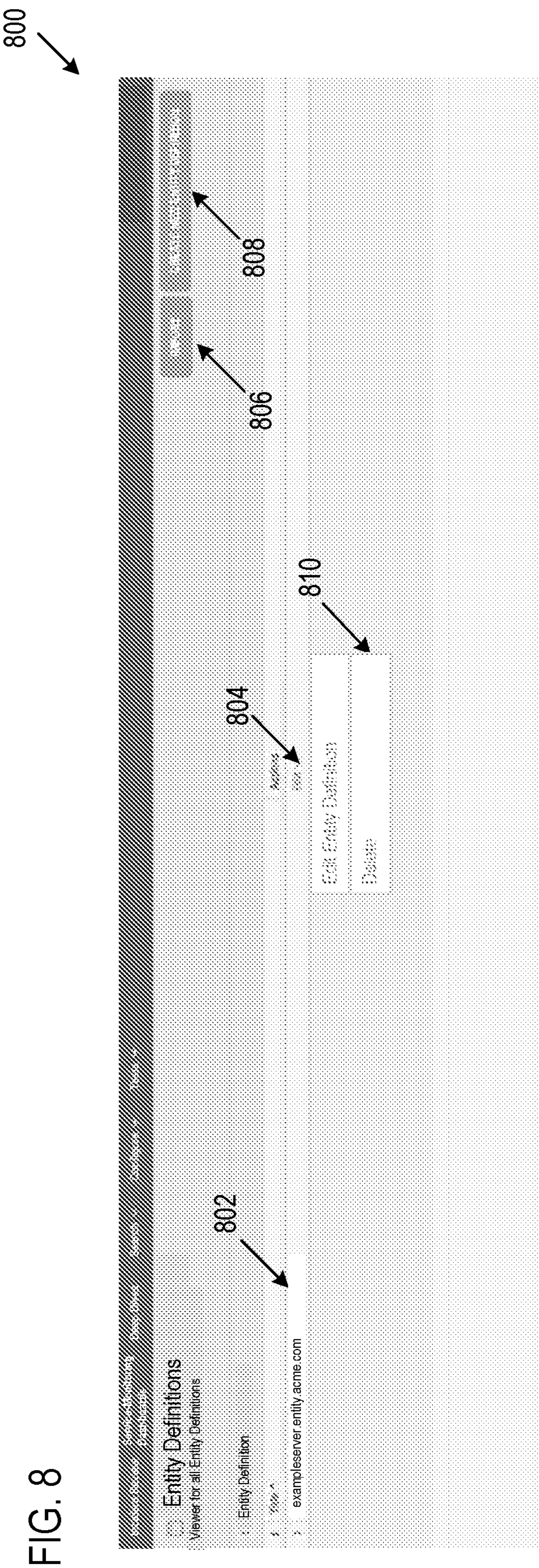
FIG. 8 illustrates an example of a GUI for creating and/or editing entity definitions, in accordance with one or more implementations of the present disclosure.

FIG. 8 illustrates an example of a GUI 800 of a service monitoring system for creating and/or editing entity definitions, in accordance with one or more implementations of the present disclosure. GUI 800 can display a list 802 of entity definitions that have already been created. Each entity definition in the list 802 can include a button 804 for requesting a drop-down menu 810 listing editing options to edit the corresponding entity definition. Editing can include editing the entity definition and/or deleting the entity definition. When an editing option is selected from the drop-down menu 810, one or more additional GUIs can be displayed for editing the entity definition. GUI 800 can include an import button 806 for importing a data file (e.g., CSV file) for auto-discovery of entities and automatic generation of entity definitions for the discovered entities. The data file can include a list of entities that exist in an environment (e.g., IT environment). The service monitoring system can use the data file to automatically create an entity definition for an entity in the list. In one implementation, the service monitoring system uses the data file to automatically create an entity definition for each entity in the list. GUI 800 can include a button 808 that a user can activate to proceed to the creation of an entity definition, which leads to GUI 900 of FIG. 9A. The automatic generation of entity definitions for entities is described in greater detail below in conjunction with FIG. 16.

Figure 9A:
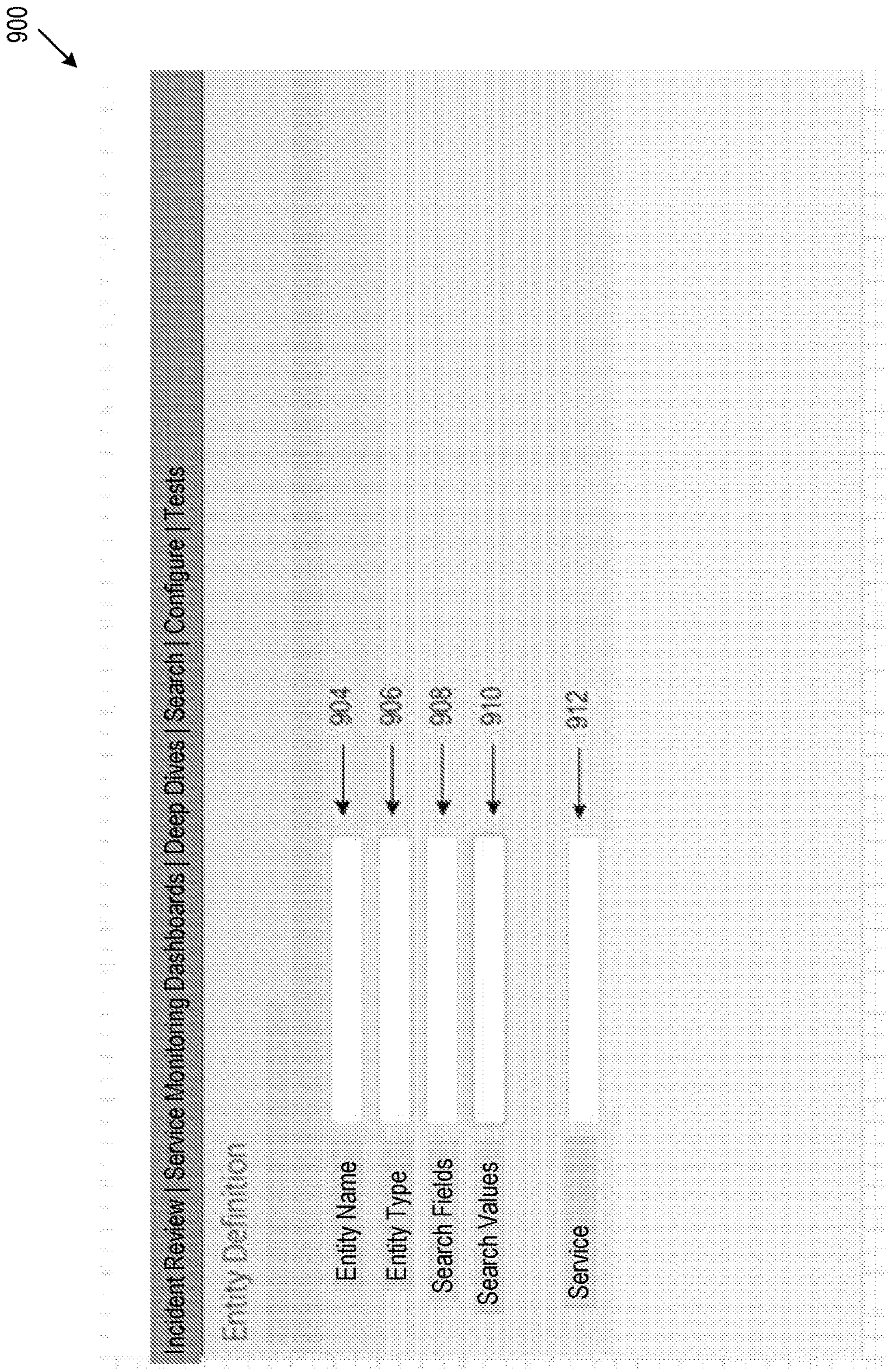
FIG. 9A illustrates an example of a GUI for creating an entity definition, in accordance with one or more implementations of the present disclosure.
Figure 9B:
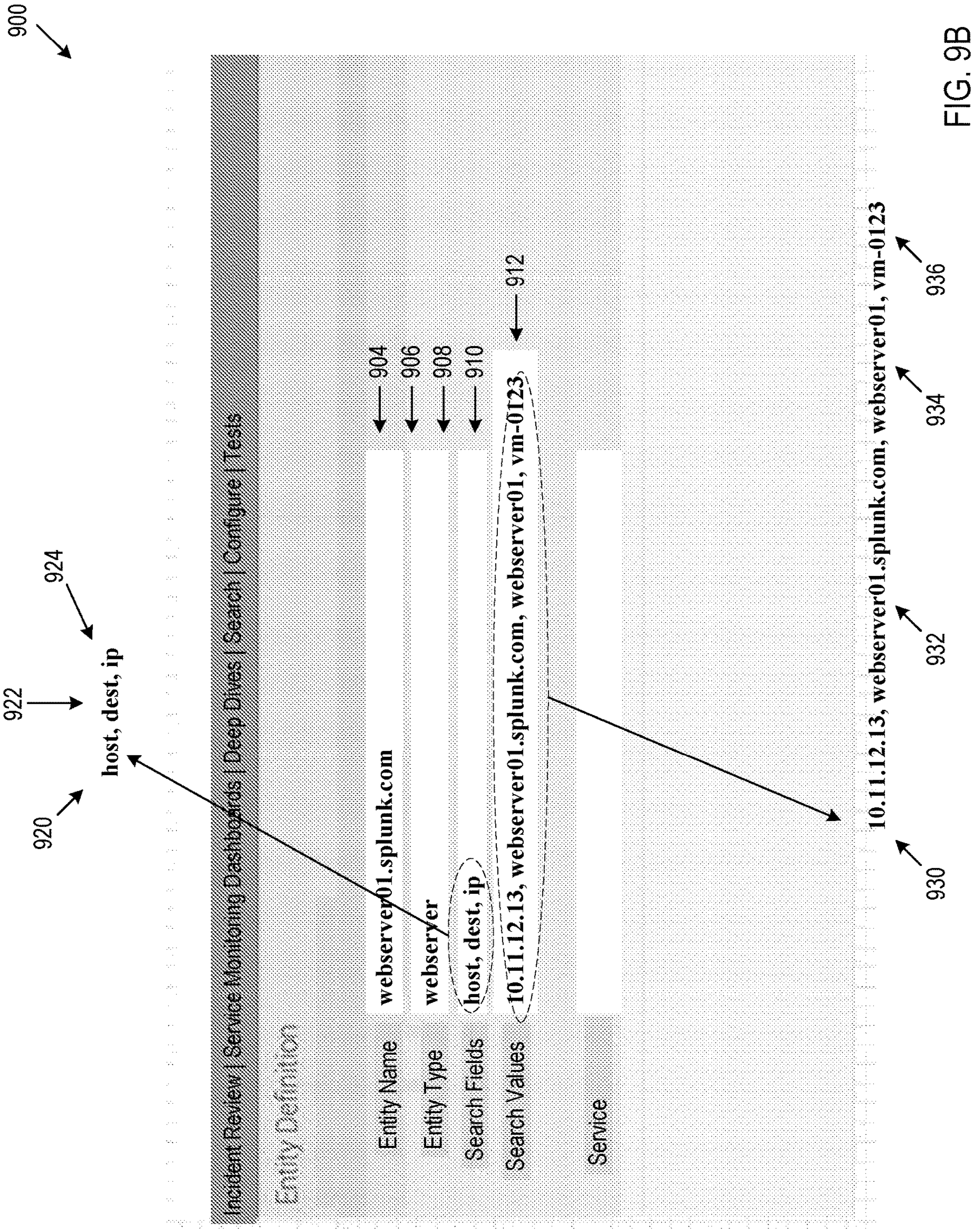
FIG. 9B illustrates an example of input received via GUI for creating an entity definition, in accordance with one or more implementations of the present disclosure.

FIG. 9A illustrates an example of a GUI 900 of a service monitoring system for creating an entity definition, in accordance with one or more implementations of the present disclosure. GUI 900 can facilitate user input specifying an identifying name 904 for the entity, an entity type 906 for the entity, field(s) 908 and value(s) 910 for the fields 908 to use during the search to find events pertaining to the entity, and any services 912 that the entity provides. The entity type 906 can describe the particular entity. For example, the entity may be a host machine that is executing a webserver application that produces machine data. FIG. 9B illustrates an example of input received via GUI 900 for creating an entity definition, in accordance with one or more implementations of the present disclosure.

For example, the identifying name 904 is webserver01.splunk.com and the entity type 906 is web server. Examples of entity type can include, and are not limited to, host machine, virtual machine, type of server (e.g., web server, email server, database server, etc.) switch, firewall, router, sensor, etc. The fields 908 that are part of the entity definition can be used to normalize the various aliases for the entity. For example, the entity definition specifies three fields 920,922,924 and four values 910 (e.g., values 930,932,934,936) to associate the entity with the events that include any of the four values in any of the three fields.

For example, the event processing system (e.g., event processing system 205 in FIG. 2) can apply a late-binding schema to the events to extract values for fields (e.g., host field, ip field, and dest field) defined by the schema and determine which events have values that are extracted for a host field that includes 10.11.12.13, webserver01.splunk.com, webserver01, or vm-0123, determine which events have values that are extracted for an ip field that includes 10.11.12.13, webserver01.splunk.com, webserver01, or vm-0123, or a dest field that includes 10.11.12.13, webserver01.splunk.com, webserver01, or vm-0123. The machine data that relates to the events that are produced from the search is the machine data that is associated with the entity webserver01.splunk.com.

In another implementation, the entity definition can specify one or more values 910 to use for a specific field 908. For example, the value 930 (10.11.12.13) may be used for extracting values for the ip field and determine which values match the value 930, and the value 932 (webserver01.splunk.com) and the value 936 (vm-0123) may be used for extracting values for the host 920 field and determining which values match the value 932 or value 936.

In another implementation, GUI 900 includes a list of identifying field/value pairs. A search term that is modeled after these entities can constructed, such that, when a late-binding schema is applied to events, values that match the identifiers associated with the fields defined by the schema will be extracted. For example, if identifier.fields="X,Y" then the entity definition should include input specifying fields labeled "X" and "Y". The entity definition should also include input mapping the fields. For example, the entity definition can include the mapping of the fields as "X":"1","Y":["2","3"]. The event processing system (e.g., event processing system 205 in FIG. 2) can apply a late-binding schema to the events to extract values for fields (e.g., X and Y) defined by the schema and determine which events have values extracted for an X field that include "1", or which events have values extracted for a Y field that include "2", or which events have values extracted for a Y field that include "3".

GUI 900 can facilitate user input specifying any services 912 that the entity provides. The input can specify one or more services that have corresponding service definitions. For example, if there is a service definition for a service named web hosting service that is provided by the entity corresponding to the entity definition, then a user can specify the web hosting service as a service 912 in the entity definition.

The save button 916 can be selected to save the entity definition in a data store (e.g., data store 290 in FIG. 2). The saved entity definition can be edited.

Figure 9C:
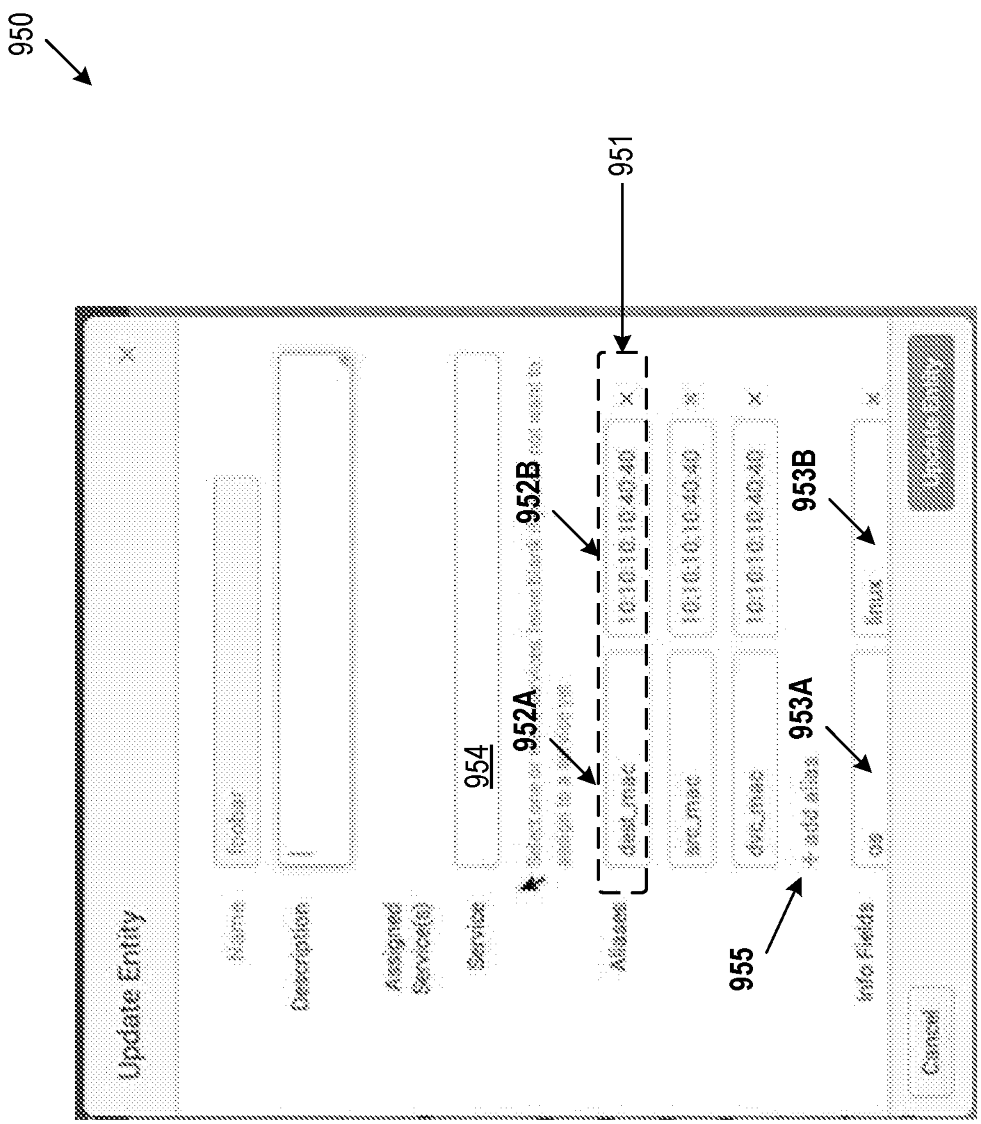
FIG. 9C illustrates an example of a GUI of a service monitoring system for creating an entity definition, in accordance with one or more implementations of the present disclosure.

FIG. 9C illustrates an example of a GUI 950 of a service monitoring system for creating an entity definition, in accordance with one or more implementations of the present disclosure. GUI 950 can include text boxes 952A-B that enables a user to specify a field name-field value pair 951 to use during the search to find events pertaining to the entity. User input can be received via GUI 950 for specify one or more field name-field value pairs 951. In one implementation, the text boxes 952A-B are automatically populated with field name-field value pair 951 information that was previous specified for the entity definition. GUI 950 can include a button 955, which when selected, display additional text boxes 952A-B for specifying a field name-field value pair 951.

GUI 950 can include text boxes 953A-B that enables a user to specify a name-value pair for informational fields. Informational fields are described in greater detail below in conjunction with FIG. 10AA. GUI 950 can include a button, which when selected, display additional text boxes 953A-B for specifying a name-value pair for an informational field.

GUI 950 can include a text box 954 that enables a user to associate the entity being represented by the entity definition with one or more services. In one implementation, user input of one or more strings that identify the one or more service is received via text box 954. In one implementation, when text box 954 is selected (e.g., clicked) a list of service definition is displayed which a user can select from. The list can be populated using service definitions that are stored in a service monitoring data store, as described in greater detail below.

Figure 10A:
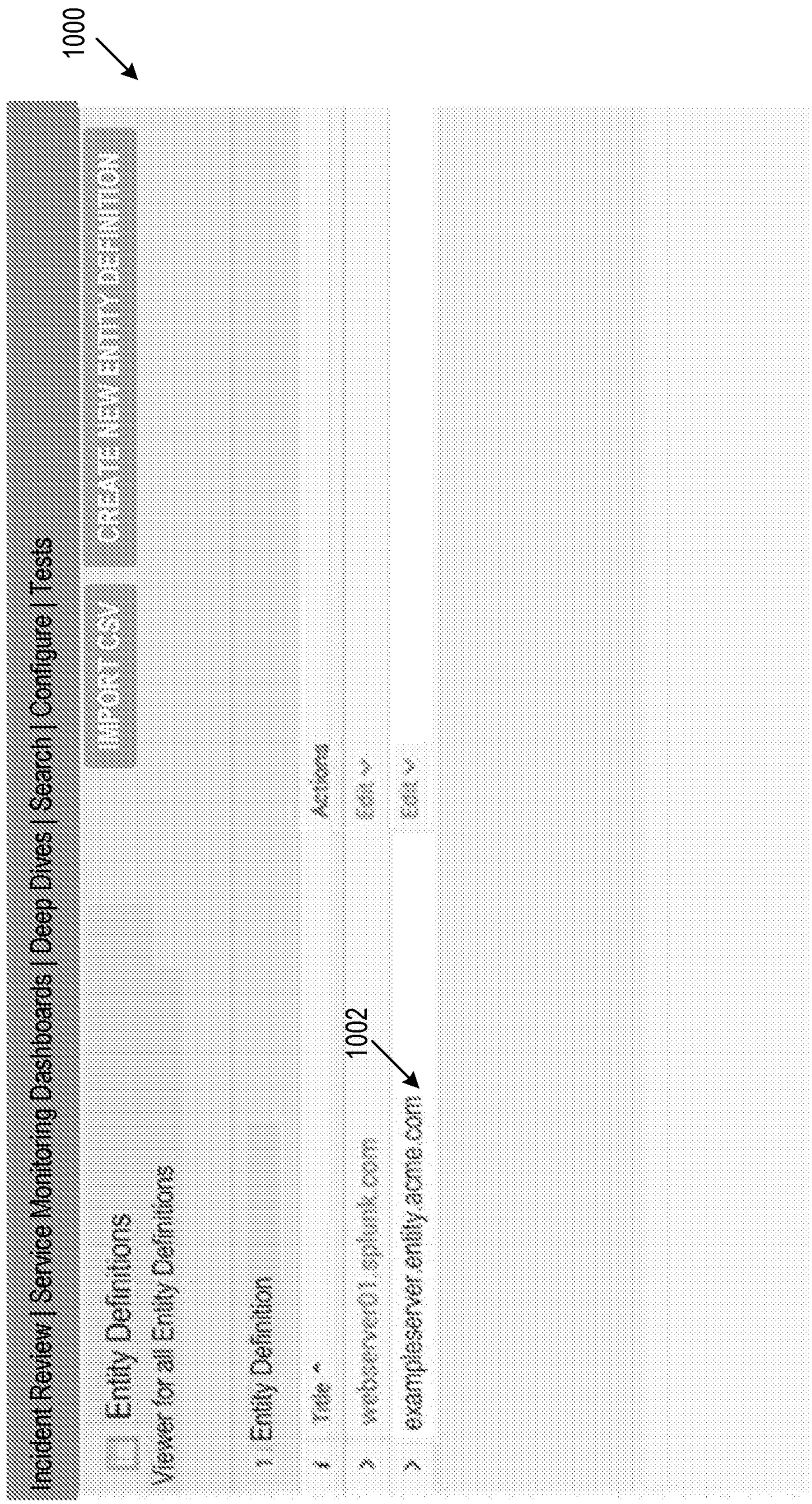
FIG. 10A illustrates an example of a GUI for creating and/or editing entity definitions, in accordance with one or more implementations of the present disclosure.

FIG. 10A illustrates an example of a GUI 1000 of a service monitoring system for creating and/or editing entity definitions, in accordance with one or more implementations of the present disclosure. GUI 1000 can display a list 1002 of entity definitions that have already been created. For example, list 1002 includes the entity definition webserver01.splunk.com that can be selected for editing.

Creating Entity Definition from a File

Figure 10B:
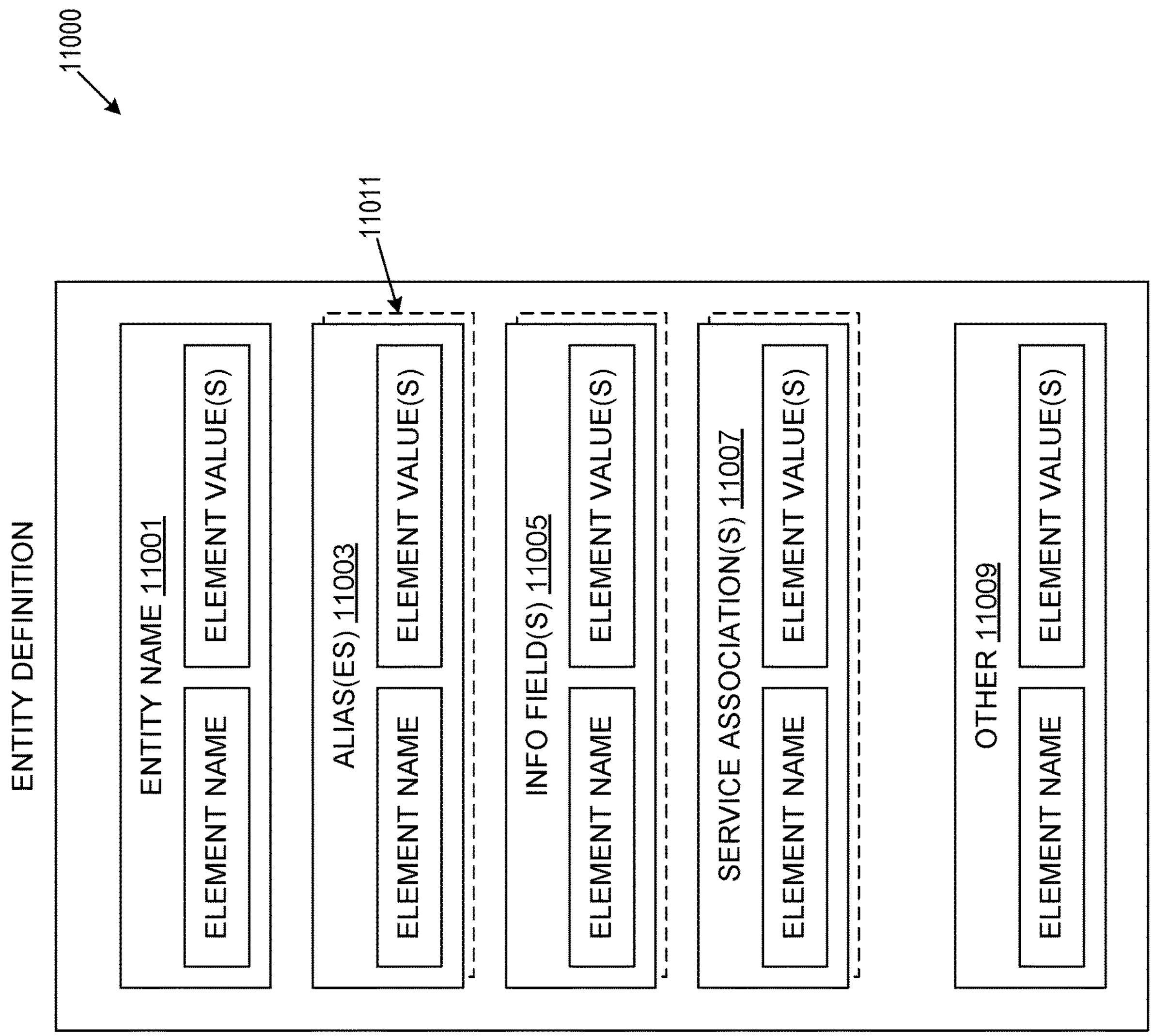
FIG. 10B illustrates an example of the structure of an entity definition, in accordance with one or more implementations of the present disclosure.

FIG. 10B illustrates an example of the structure 11000 for storing an entity definition, in accordance with one or more implementations of the present disclosure. Structure 11000 represents one logical structure or data organization that illustrates associations among various data items and groups to aid in understanding of the subject matter and is not intended to limit the variety of possible logical and physical representations for entity definition information. An entity definition can be stored in an entity definition data store as a record that contains information about one or more characteristics of an entity. Various characteristics of an entity include, for example, a name of the entity, one or more aliases for the entity, one or more informational fields for the entity, one or more services associated with the entity, and other information pertaining to the entity. Informational fields can be associated with an entity. An informational field is a field for storing user-defined metadata for a corresponding entity, which includes information about the entity that may not be reliably present in, or may be absent altogether from, the raw machine data. Implementations of informational fields are described in greater detail below in conjunction with FIGS. 10AA-10AE.

The entity definition structure 11000 includes one or more components. Each entity definition component relates to a characteristic of the entity. For example, there is an entity name 11001 component, one or more alias 11003 components, one or more informational (info) field 11005 components, one or more service association 11007 components, and one or more components for other information 11009. The characteristic of the entity being represented by a particular component is the particular entity definition component's type. For example, if a particular component represents an alias characteristic of the entity, the component is an alias-type component.

Each entity definition component stores information for an element. The information can include an element name and one or more element values for the element. In one implementation, the element name-value pair(s) within an entity definition component serves as a field name-field value pair for a search query. The search query can be directed to search machine data. As described above, the computing machine can be coupled to an event processing system (e.g., event processing system 205 in FIG. 2). Machine data can be represented as events. Each of the events includes raw data. The event processing system can apply a late-binding schema to the events to extract values for fields defined by the schema, and determine which events have values that are extracted for a field. A component in the entity definition includes (a) an element name that can be, in one implementation, a name of a field defined by the schema, and (b) one or more element values that can be, in one implementation, one or more extracted values for the field identified by the element name.

The element names for the entity definition components (e.g., name component 11051, the alias components 11053A-B, and the informational (info) field components 11055A-B) can be based on user input. In one implementation, the elements names correspond to data items that are imported from a file, as described in greater detail below in conjunction with FIGS. 10D, 10E and 10H. In another implementation, the element names correspond to data items that are imported from a search result set, as described in greater detail below in conjunction with FIGS. 10Q-10Z. In one implementation, element names for any additional service information that can be associated with the entities are received via user input.

The elements values for the entity definition components (e.g., name component 11051, the alias components 11053A-B, and the informational field components 11055A-B) can be based on user input. In one implementation, the values correspond to data items that are imported from a file, as described in greater detail below in conjunction with FIG. 10E and FIG. 10H. In another implementation, the values correspond to data items that are imported from a search result set, as described in greater detail below in conjunction with FIGS. 10Q-10Z.

In one implementation, an entity definition includes one entity component for each entity characteristic represented in the definition. Each entity component may have as many elements as required to adequately express the associated characteristic of the entity. Each element may be represented as a name-value pair (i.e., (element-name)-(element-value)) where the value of that name-value pair may be scalar or compound. Each component is a logical data collection.

In another implementation, an entity definition includes one or more entity components for each entity characteristic represented in the definition. Each entity component has a single element that may be represented as a name-value pair (i.e., (element-name)-(element-value)). The value of that name-value pair may be scalar or compound. The number of entity components of a particular type within the entity definition may be determined by the number needed to adequately express the associated characteristic of the entity. Each component is a logical data collection.

In another implementation, an entity definition includes one or more entity components for each entity characteristic represented in the definition. Each entity component may have one or more elements that may each be represented as a name-value pair (i.e., (element-name)-(element-value)). The value of that name-value pair may be scalar or compound. The number of elements for a particular entity component may be determined by some meaningful grouping factor, such as the day and time of entry into the entity definition. The number of entity components of a particular type within the entity definition may be determined by the number needed to adequately express the associated characteristic of the entity. Each component is a logical data collection. These and other implementations are possible including representations in RDBMS's and the like.

Figure 10C:
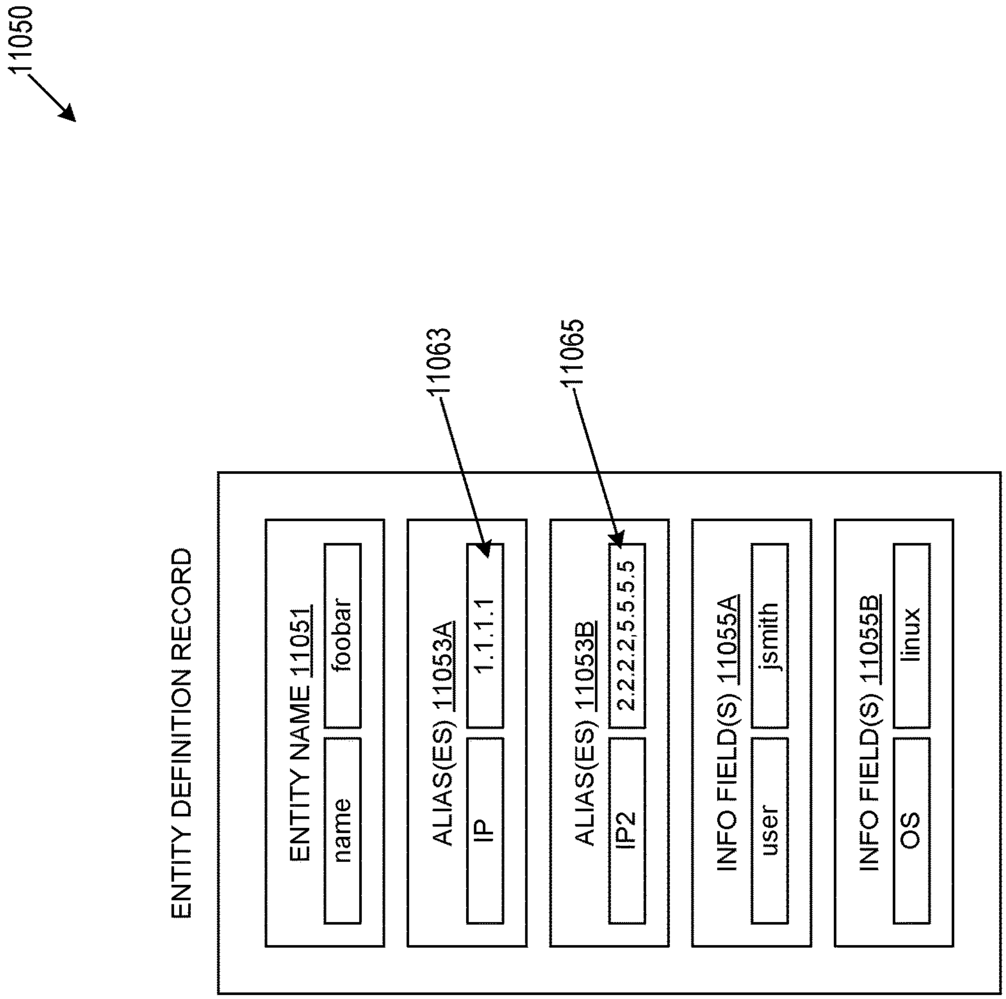
FIG. 10C illustrates an example of an instance of an entity definition record for an entity, in accordance with one or more implementations of the present disclosure.

FIG. 10C illustrates an example of an instance of an entity definition record 11050 for an entity, in accordance with one or more implementations of the present disclosure. An entity definition component (e.g., alias component, informational field component, service association component, other component) can specify all, or only a part, of a characteristic of the entity. For example, in one implementation, an entity definition record includes a single entity name component that contains all of the identifying information (e.g., name, title, and/or identifier) for the entity. The value for the name component type in an entity definition record can be used as the entity identifier for the entity being represented by the record. For example, the entity definition record 11050 includes a single entity name component 11051 that has an element name of "name" and an element value of "foobar". The value "foobar" becomes the entity identifier for the entity that is being represented by record 11050.

There can be one or multiple components having a particular entity definition component type. For example, the entity definition record 11050 has two components (e.g., informational field component 11055A and informational field component 11055B) having the informational field component type. In another example, the entity definition record 11050 has two components (e.g., alias component 11053A and alias component 11053B) having the alias component type. In one implementation, some combination of a single and multiple components of the same type are used to store information pertaining to a characteristic of an entity.

An entity definition component can store a single value for an element or multiple values for the element. For example, alias component 11053A stores an element name of "IP" and a single element value 11063 of "1.1.1.1". Alias component 11053B stores an element name of "IP2" and multiple element values 11065 of "2.2.2.2" and "5.5.5.5". In one implementation, when an entity definition component stores multiple values for the same element, and when the element name-element value pair is used for a search query, the search query uses the values disjunctively. For example, a search query may search for fields named "IP2" and having either a "2.2.2.2" value or a "5.5.5.5" value.

As described above, the element name-element value pair in an entity definition record can be used as a field-value pair for a search query. Various machine data may be associated with a particular entity, but may use different aliases for identifying the same entity. Record 11050 has an alias component 11053A that stores information for one alias, and has another alias component 11053B that stores another alias element (having two alias element values) for the entity. The alias components 11053A,B of the entity definition can be used to aggregate event data associated with different aliases for the entity represented by the entity definition. The element name-element value pairs for the alias components can be used as field-value pairs to search for the events that have matching values for fields specified by the elements' names. The entity can be associated with the machine data represented by the events having associated fields whose values match the element values in the alias components. For example, a search query may search for events with a "1.1.1.1" value in a field named "IP" and events with either a "2.2.2.2" value or a "5.5.5.5" value in a field named "IP2".

Various implementations may use a variety of data representation and/or organization for the component information in an entity definition record based on such factors as performance, data density, site conventions, and available application infrastructure, for example. The structure (e.g., structure 11000 in FIG. 10B) of an entity definition can include rows, entries, or tuples to depict components of an entity definition. An entity definition component can be a normalized, tabular representation for the component, as can be used in an implementation, such as an implementation storing the entity definition within an RDBMS. Different implementations may use different representations for component information; for example, representations that are not normalized and/or not tabular. Different implementations may use various data storage and retrieval frameworks, a JSON-based database as one example, to facilitate storing entity definitions (entity definition records). Further, within an implementation, some information may be implied by, for example, the position within a defined data structure or schema where a value, such as "1.1.1.1" 11063 in FIG. 10C, is stored—rather than being stored explicitly. For example, in an implementation having a defined data structure for an entity definition where the first data item is defined to be the value of the name element for the name component of the entity, only the value need be explicitly stored as the entity component and the element name (name) are known from the data structure definition.

Figure 10D:
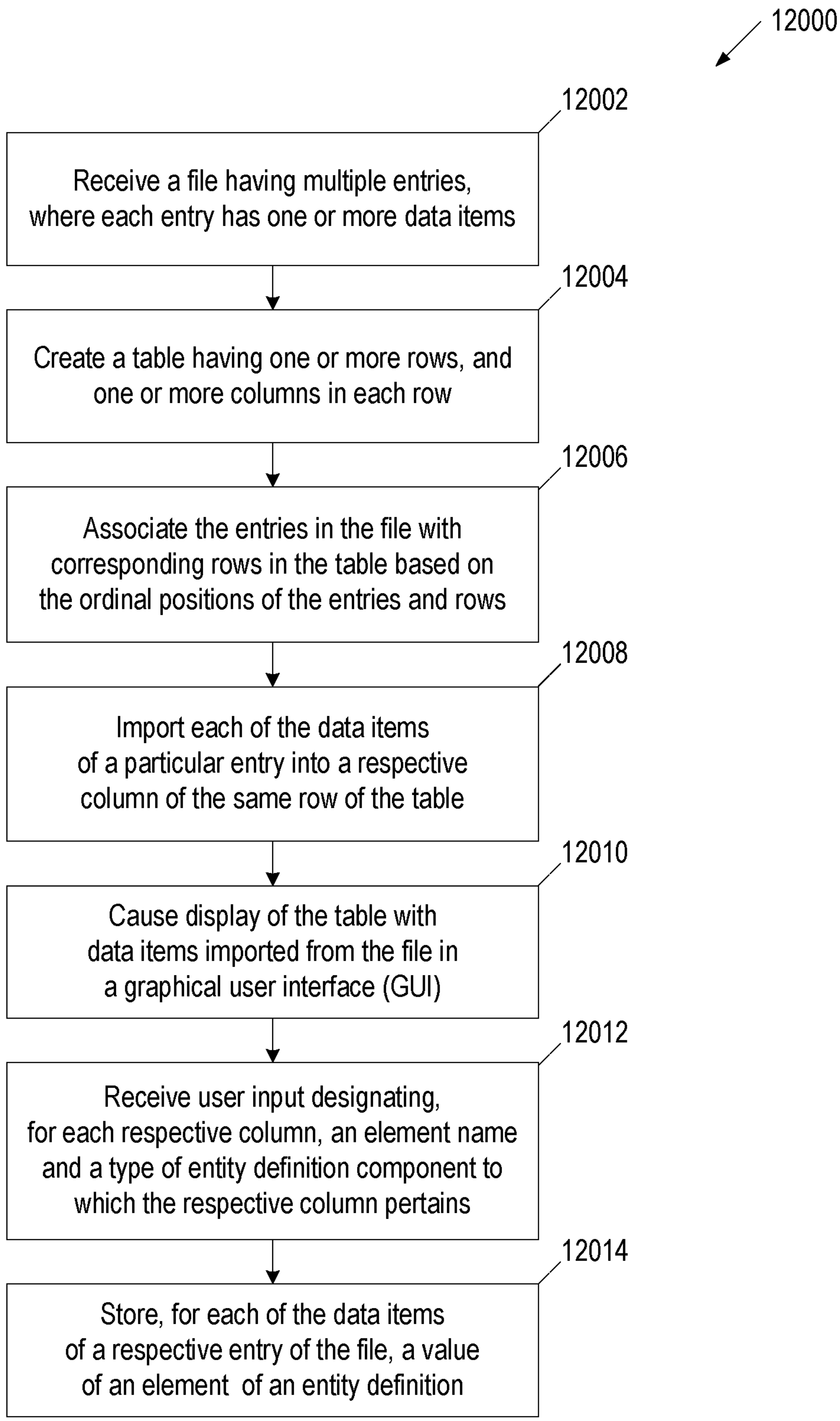
FIG. 10D is a flow diagram of an implementation of a method for creating entity definition(s) using a file, in accordance with one or more implementations of the present disclosure.

FIG. 10D is a flow diagram of an implementation of a method 12000 for creating entity definition(s) using a file, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, at least a portion of method is performed by a client computing machine. In another implementation, at least a portion of method is performed by a server computing machine.

At block 12002, the computing machine receives a file having multiple entries. The computing machine may receive the entire file or something less. The file can be stored in a data store. User input can be received, via a graphical user interface (GUI), requesting access to the file. One implementation of receiving the file via a GUI is described in greater detail below in conjunction with FIGS. 10F-10G. The file can be a file that is generated by a tool (e.g., inventory system) and includes information pertaining to an IT environment. For example, the file may include a list of entities (e.g., physical machines, virtual machines, APIs, processes, etc.) in an IT environment and various characteristics (e.g., name, aliases, user, role, operating system, etc.) for each entity. One or more entries in the file can correspond to a particular entity. Each entry can include one or more data items. Each data item can correspond to a characteristic of the particular entity. The file can be a delimited file, where multiple entries in the file are separated using entry delimiters, and the data items within a particular entry in the file are separated using data item delimiters.

A delimiter is a sequence of one or more characters (printable, or not) used to specify a boundary between separate, independent regions in plain text or other data streams. An entry delimiter is a sequence of one or more characters to separate entries in the file. An example of an entry delimiter is an end-of-line indicator. An end-of-line indicator can be a special character or a sequence of characters. Examples of an end-of-line indicator include, and are not limited to a line feed (LF) and a carriage return (CR). A data item delimiter is a sequence of one or more characters to separate data items in an entry. Examples of a data item delimiter can include, and are not limited to a comma character, a space character, a semicolon, quote(s), brace(s), pipe, slash(es), and a tab.

An example of a delimited file includes, and is not limited to a comma-separated values (CSV) file. Such a CSV file can have entries for different entities separated by line feeds or carriage returns, and an entry for each entity can include data items (e.g., entity name, entity alias, entity user, entity operating system, etc.), in proper sequence, separated by comma characters. Null data items can be represented by having nothing between sequential delimiters, i.e., one comma immediately followed by another. An example of a CSV file is described in greater detail below in conjunction with FIG. 10E.

Each entry in the delimited file has an ordinal position within the file, and each data item has an ordinal position within the corresponding entry in the file. An ordinal position is a specified position in a numbered series. Each entry in the file can have the same number of data items. Alternatively, the number of data items per entry can vary.

At block 12004, the computing machine creates a table having one or more rows, and one or more columns in each row. The number of rows in the table can be based on the number of entries in the file, and the number of columns in the table can be based on the number of data items in an entry of the file (e.g., the number of data items in an entry having the most data items). Each row has an ordinal position within the table, and each column has an ordinal position within the table. At block 12006, the computing machine associates the entries in the file with corresponding rows in the table based on the ordinal positions of the entries within the file and the ordinal positions of the rows within the table. For each entry, the computing machine matches the ordinal position of the entry with the ordinal position of one of the rows. The matched ordinal positions need not be equal in an implementation, and one may be calculated from the other using, for example, an offset value.

At block 12008, for each entry in the file, the computing machine imports each of the data items of the particular entry in the file into a respective column of the same row of the table. An example of importing the data items of a particular entry to populate a respective column of a same row of a table is described in greater detail below in conjunction with FIG. 10E.

At block 12010, the computing system causes display in a GUI of one or more rows of the table populated with data items imported from the file. An example GUI presenting a table with data items imported from a delimited file is described in greater detail below in conjunction with FIG. 10E and FIG. 10H.

At block 12012, the computing machine receives user input designating, for each of one or more respective columns, an element name and a type of entity definition component to which the respective column pertains. As discussed above, an entity definition component type represents a particular characteristic type (e.g., name, alias, information, service association, etc.) of an entity. An element name represents a name of an element associated with a corresponding characteristic of an entity. For example, the entity definition component type may be an alias component type, and an element associated with an alias of an entity may be an element name "IP".

The user input designating, for each respective column, an element name and a type (e.g., name, alias, informational field, service association, and other) of entity definition component to which the respective column pertains can be received via the GUI. One implementation of user input designating, for each respective column, an element name and a type of entity definition component to which the respective column pertains is discussed in greater detail below in conjunction with FIGS. 10H-10I.

At block 12014, the computing machine stores, for each of one or more of the data items of the particular entry of the file, a value of an element of an entity definition. A data item will be stored if it appeared in a column for which a proper element name and entity definition component type were specified. An entity definition includes one or more components. Each component stores information pertaining to an element. The element of the entity definition has the element name designated for the respective column in which the data item appeared. The element of the entity definition is associated with an entity definition component having the type designated for the respective column in which the data item appeared. The element names and the values for the elements can be stored in an entity definition data store, which may be a relational database (e.g., SQL server) or a document-oriented database (e.g., MongoDB), for example.

Figure 10E:
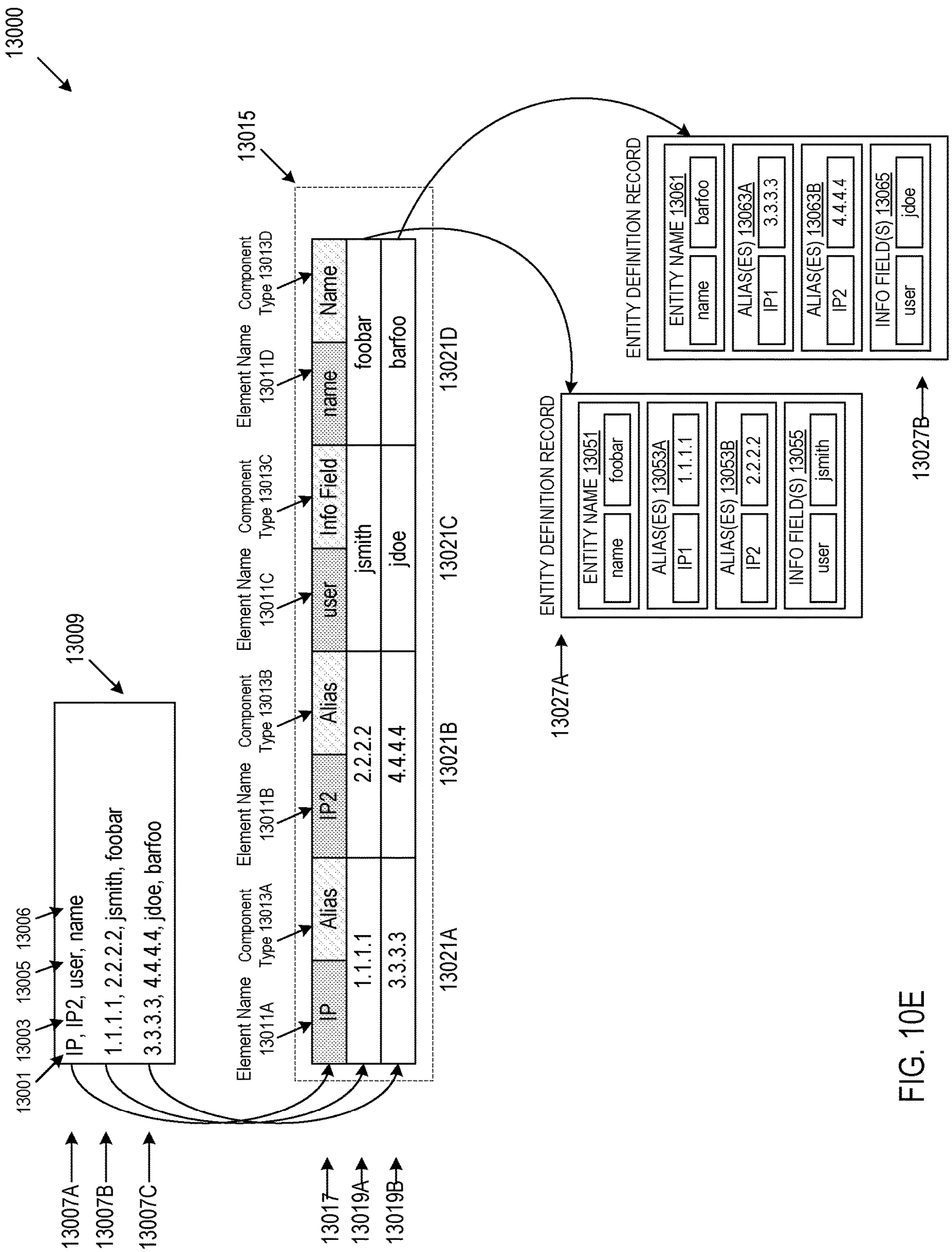
FIG. 10E is a block diagram of an example of creating entity definition(s) using a file, in accordance with one or more implementations of the present disclosure.

FIG. 10E is a block diagram 13000 of an example of creating entity definition(s) using a file, in accordance with one or more implementations of the present disclosure. A file 13009 can be stored in a data store. The file 13009 can have a delimited data format that has one or more sequentially ordered data items (each corresponding to a tabular column) in one or more lines or entries (each corresponding to a tabular row). The file 13009 is a CSV file called "test.csv" and includes multiple entries 13007A-C. Each entry 13007A-C includes one or more data items. A CSV file stores tabular data in plain-text form and consists of any number of entries (e.g., entries 13007A-C).

The rows in the file 13009 can be defined by the delimiters that separate the entries 13007A-C. The entry delimiters can include, for example, line breaks, such as a line feed (not shown) or carriage return (not shown). In one implementation, one type of entry delimiter is used to separate the entries in the same file.

The nominal columns in the file 13009 can be defined by delimiters that separate the data items in the entries 13007A-C. The data item delimiter may be, for example, a comma character. For example, for entry 13007A, "IP" 13001 and "IP2" 13003 are separated by a comma character, "IP2" 13003 and "user" 13005 are also separated by a comma character, and "user" 13005 and "name" 13006 are also separated by a comma character. In one implementation, the same type of delimiter is used to separate the data items in the same file.

The first entry 13007A in the file 1309 may be a "header" entry. The data items (e.g. IP 13001, IP2 13003, user 13005, name 13006) in the "header" entry 13007A can be names defining the types of data items in the file 13009.

A table 13015 can be displayed in a GUI. The table 13015 can include one or more rows. In one implementation, a top row in the table 13015 is a column identifier row 13017, and each subsequent row 13019A,B is a data row. A column identifier row 13017 contains column identifiers, such as an element name 13011A-D and an entity definition component type 13013A-D, for each column 13021A-D in the table 13015. User input can be received via the GUI for designating the element names 13011A-D and component types 13013A-D for each column 13021A-D.

In one implementation, the data items of the first entry (e.g., entry 13007A) in the file 13009 are automatically imported as the element names 13011A-D into the column identifier row 13017 in the table 13015, and user input is received via the GUI that indicates acceptance of using the data items of the first entry 13007A in the file 13009 as the element names 13011A-D in the table 13015. In one implementation, user input designating the component types is also received via the GUI. For example, a user selection of a save button or a next button in a GUI can indicate acceptance. One implementation of a GUI facilitating user input for designating the element names and component types for each column is described in greater detail below in conjunction with FIG. 10H.

The determination of how to import a data item from the file 13009 to a particular location in the table 13015 is based on ordinal positions of the data items within a respective entry in the file 13009 and ordinal positions of columns within the table 13015. In one implementation, ordinal positions of the entries 13007A-D within the file 13009 and ordinal positions of the rows (e.g., rows 13017,13019A-B) within the table 13015 are used to determine how to import a data item from the file 13009 into the table 13015.

Each of the entries and data items in the file 13009 has an ordinal position. Each of the rows and columns in the table 13015 has an ordinal position. In one implementation, the first position in a numbered series is zero. In another implementation, the first position in a numbered series is one.

For example, each entry 13007A-C in the file 13009 has an ordinal position within the file 13009. In one implementation, the top entry in the file 13009 has a first position in a numbered series, and each subsequent entry has a corresponding position in the number series relative to the entry having the first position. For example, for file 13009, entry 13007A has an ordinal position of one, entry 13007B has an ordinal position of two, and entry 13007C has an ordinal position of three.

Each data item in an entry 13007A-C has an ordinal position within the respective entry. In one implementation, the left most data item in an entry has a first position in a numbered series, and each subsequent data item has a corresponding position in the number series relative to the data item having the first position. For example, for entry 13007A, "IP" 13001 has an ordinal position of one, "IP2" 13003 has an ordinal position of two, "user" 13005 has an ordinal position of three, and "name" 13006 has an ordinal position of four.

Each row in the table 13015 has an ordinal position within the table 13015. In one implementation, the top row in the table 13015 has a first position in a numbered series, and each subsequent row has a corresponding position in the number series relative to the row having the first position. For example, for table 13015, row 13017 has an ordinal position of one, row 13019A has an ordinal position of two, and row 13019B has an ordinal position of three.

Each column in the table 13015 has an ordinal position within the table 13015. In one implementation, the left most column in the table 13015 has a first position in a numbered series, and each subsequent column has a corresponding position in the number series relative to the column having the first position. For example, for table 13015, column 13021A has an ordinal position of one, column 13021B has an ordinal position of two, column 13021C has an ordinal position of three, and column 13021D has an ordinal position of four.

Each element name 13011A-C in the table 13015 has an ordinal position within the table 13015. In one implementation, the left most element name in the table 13015 has a first position in a numbered series, and each subsequent element name has a corresponding position in the numbered series relative to the element name having the first position. For example, for table 13015, element name 13011A has an ordinal position of one, element name 13011B has an ordinal position of two, element name 13011C has an ordinal position of three, and element name 13011D has an ordinal position of four.

The ordinal positions of the rows in the table 13015 and the ordinal positions of the entries 13007A-C in the file 13009A can correspond to each other. The ordinal positions of the columns in the table 1315 and the ordinal positions of the data items in the file 13009 can correspond to each other. The ordinal positions of the element names in the table 13015 and the ordinal positions of the data items in the file 13009 can correspond to each other.

The determination of an entity name 13011A-D in which to place a data item can be based on the ordinal position of the entity name 13011A-D that corresponds to the ordinal position of the data item. For example, "IP" 13001 has an ordinal position of one within entry 13007A in the file 13009. Element name 13011A has an ordinal position that matches the ordinal position of "IP" 13001. "IP" 13001 can be imported from the file 13009 and placed in row 13017 and in element name 13011A.

The data items for a particular entry in the file 13009 can appear in the same row in the table 13015. The determination of a row in which to place the data items for the particular entry can be based on the ordinal position of the row that corresponds to the ordinal position of the entry. For example, entry 13007B has an ordinal position of two. Row 13019A has an ordinal position that matches the ordinal position of entry 13007B. "1.1.1.1", "2.2.2.2", "jsmith", and "foobar" can be imported from the file 13009 and placed in row 13019A in the table 13015.

The determination of a column in which to place a particular data item can be based on the ordinal position of the column within the table 13015 that corresponds to the ordinal position of the data items within a particular entry in the file 13009. For example, "1.1.1.1" in entry 13007B has an ordinal position of one. Column 13021A has an ordinal position that matches the ordinal position of "1.1.1.1". "1.1.1.1" can be imported from the file 13009 and placed in row 13019A and in column 13021A.

Corresponding ordinal positions need not be equal in an implementation, and one may be calculated from the other using, for example, an offset value.

User input designating the component types 13013A-D in the table 13015 is received via the GUI. For example, a selection of "Alias" is received for component type 13013A, a selection of "Alias" is received for component type 13013B, a selection of "Informational Field" is received for component type 13013C, and a selection of "Name" is received for component type 13013D. One implementation of a GUI facilitating user input for designating the component types for each column is described in greater detail below in conjunction with FIGS. 10H-10I.

User input can be received via the GUI for creating entity definitions records 13027A,B using the element names 13011A-D, component types 13013A-D, and data items displayed in the table 13015 and importing the entity definitions records 13027A,B in a data store, as described in greater detail below in conjunction with FIGS. 10H-10L.

When user input designating the entity definition component types 13013A-D for the table 13015 is received, and user input indicating acceptance of the display of the data items from file 13009 into the table 13015 is received, the entity definition records can be created and stored. For example, two entity definition records 13027A,B are created.

As described above, in one implementation, an entity definition stores no more than one component having a name component type. The entity definition can store zero or more components having an alias component type, and can store zero or more components having an informational field component type. In one implementation, user input is received via a GUI (e.g., entity definition editing GUI, service definition GUI) to add one or more service association components and/or one or more other information components to an entity definition record. While not explicitly shown in the illustrative example of FIG. 10E, the teachings regarding the importation of component information into entity definition records from file data can understandably be applied to service association component information, after the fashion illustrated for alias and informational field component information, for example.

In one implementation, the entity definition records 13027A,B store the component having a name component type as a first component, followed by any component having an alias component type, followed by any component having an informational field component type, followed by any component having a service component type, and followed by any component having a component type for other information.

Figure 10F:
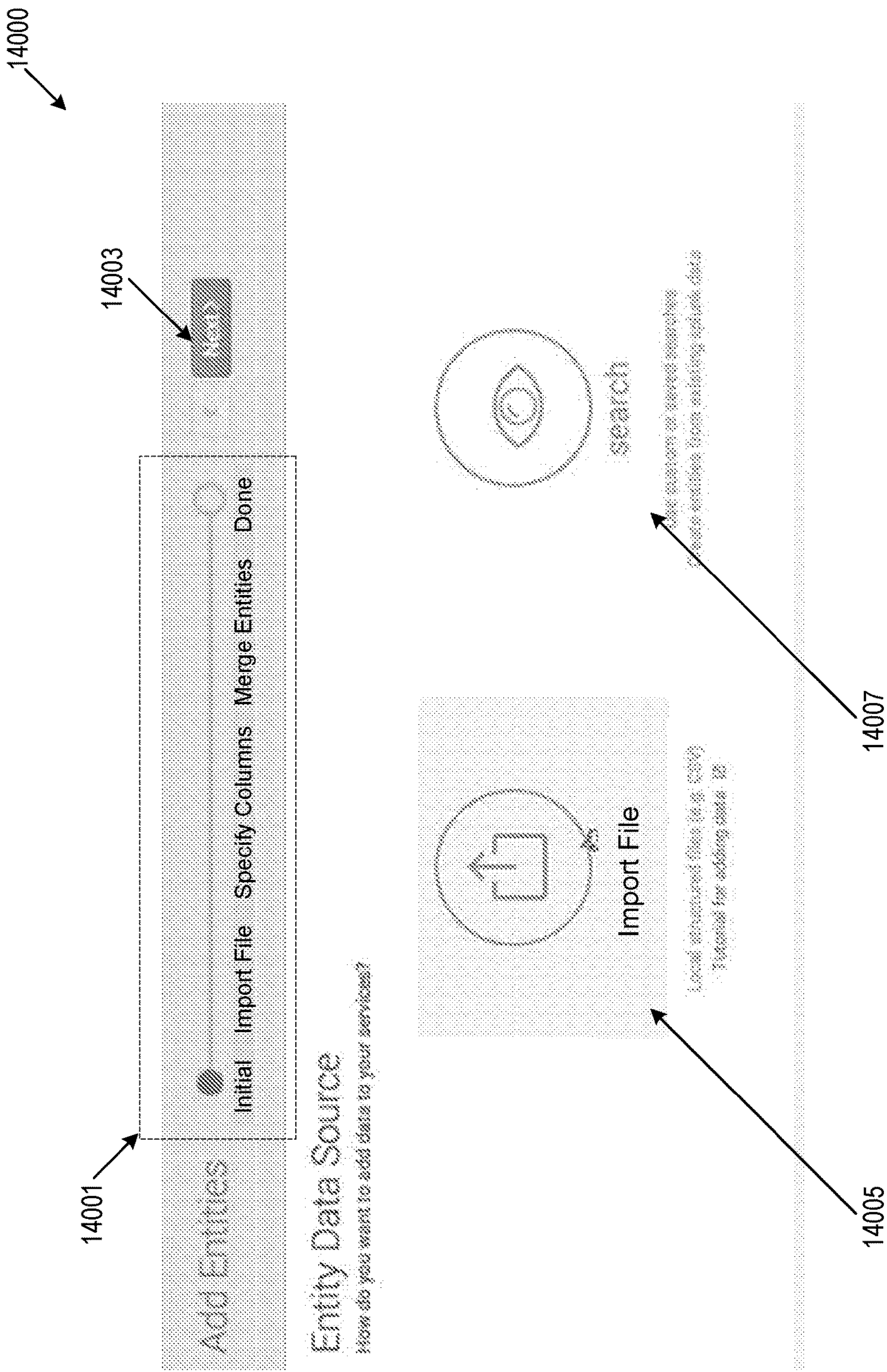
FIG. 10F illustrates an example of a GUI of a service monitoring system for creating entity definition(s) using a file or using a set of search results, in accordance with one or more implementations of the present disclosure.

FIG. 10F illustrates an example of a GUI 14000 of a service monitoring system for creating entity definition(s) using a file or using a set of search results, in accordance with one or more implementations of the present disclosure. GUI 14000 can include an import file icon 14005, which can be selected, for starting the creation of entity definition(s)

using a file. GUI 14000 can include a search icon 14007, which can be selected, for starting the creation of entity definition(s) using search results.

GUI 14000 can include a creation status bar 14001 that displays the various stages for creating entity definition(s) using the GUI. For example, when the import file icon 14005 is selected, the stages that pertain to creating entity definition(s) using a file are displayed in the status bar 14001. The stages can include, for example, and are not limited to, an initial stage, an import file stage, a specify columns stage, a merge entities stage, and a completion stage. The status bar 14001 can be updated to display an indicator (e.g., shaded circle) corresponding to a current stage. When the search icon 14007 is selected, the stages that pertain to creating entity definition(s) using search results are displayed in the status bar 14001, as described in greater detail below in conjunction with FIGS. 10Q-10Z.

GUI 14000 includes a next button 14003, which when selected, displays the next GUI for creating the entity definition(s). GUI 14000 includes a previous button 14002, which when selected, displays the previous GUI for creating the entity definition(s). In one implementation, if no icon (e.g., icon 14005, icon 14007) is selected, a default selection is used and if the next button 14003 is activated, the GUI corresponding to the default selection is displayed. In one implementation, the import file icon is the default selection. The default selection can be configurable.

Figure 10G:
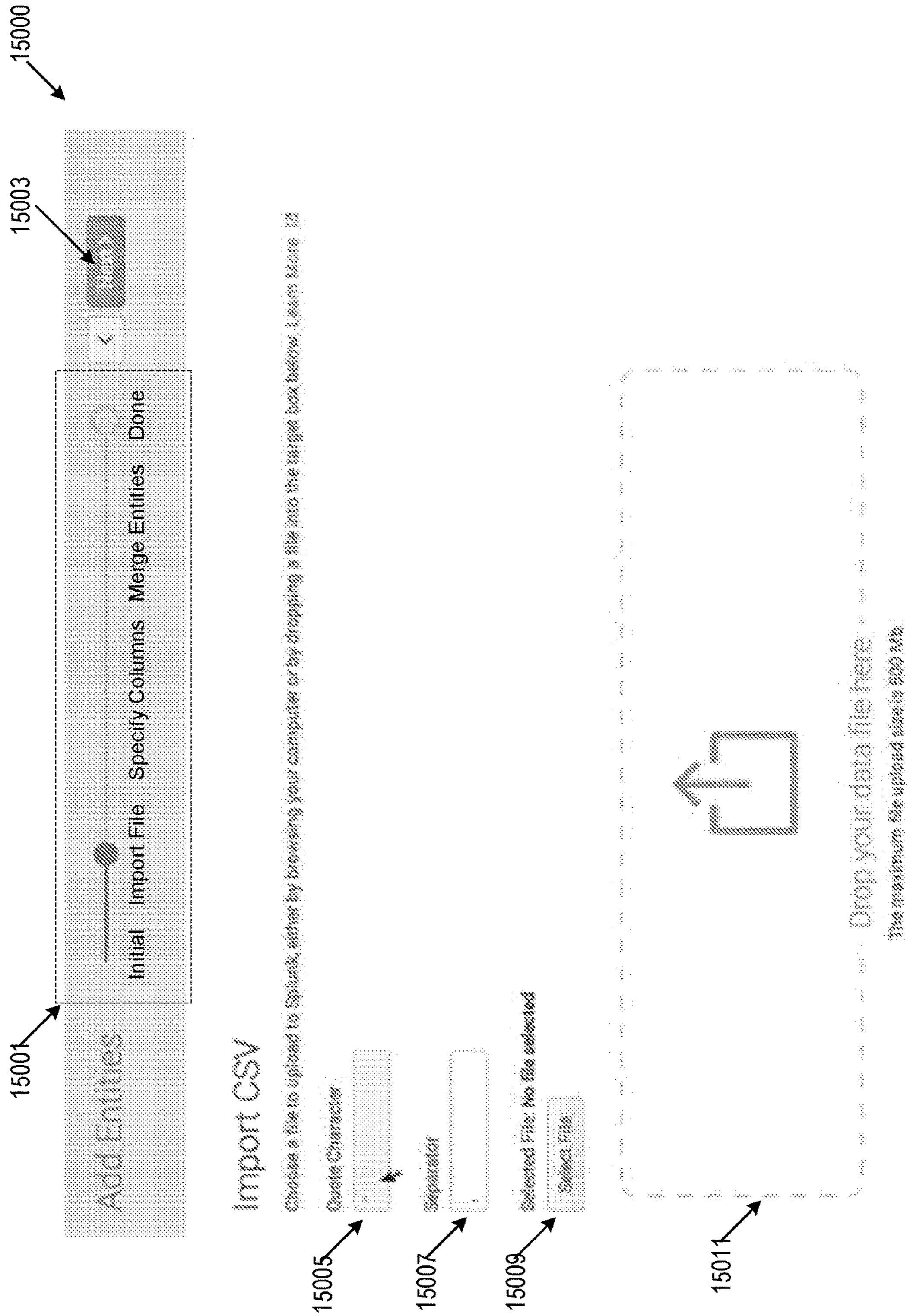
FIG. 10G illustrates an example of a GUI of a service monitoring system for selecting a file for creating entity definitions, in accordance with one or more implementations of the present disclosure.

FIG. 10G illustrates an example of a GUI 15000 of a service monitoring system for selecting a file for creating entity definitions, in accordance with one or more implementations of the present disclosure. The data items from the selected file can be imported into a table in the GUI, as described in greater detail below.

GUI 15000 can include a status bar 15001 that is updated to display an indicator (e.g., shaded circle) corresponding to the current stage (e.g., import file stage). User input can be received specifying the selected file. For example, if the select file button 15009 is activated, a GUI that allows a user to select a file is displayed. The GUI can display a list of directories and/or files. In another example, the user input may be a file being dragged to the drag and drop portion 15011 of the GUI 15000.

The selected file can be a delimited file. GUI 15000 can facilitate user input identifying a quote character 15005 and a separator character 15007 that is being used for the selected file. The separator character 15007 is the character that is being used as a data item delimiter to separate data items in the selected file. For example, user input can be received identifying a comma character as the separator character being used in the selected file.

At times, the separator character 15007 (e.g., comma character) may be part of a data item. For example, if the separator character is a comma character and the data item in the file may be "joe,machine". In such a case, the comma character in the "joe,machine" should not be treated as a separator character and should be treated as part of the data item itself. In the delimited file, such situations are addressed by using special characters (e.g., quotes around a data item that includes a comma character). Quote characters 15005 in GUI 15000 indicate that a separator character inside a data item surrounded by those quote characters 15005 should not be treated as a separator but rather part of the data item itself. Example quote characters 15005 can include, and are not limited to, single quote characters, double quote characters, slash characters, and asterisk characters. The quote characters 15005 to be used can be specified via user input. For example, user input may be received designating single quote characters to be used as quote characters 15005 in the delimited file. If a file has been selected, and if the next button 15003 has been activated, the data items from the selected file can be imported to a table. The table containing the imported data items can be displayed in a GUI, as described in greater detail below in conjunction with FIG. 10H.

Figure 10H:
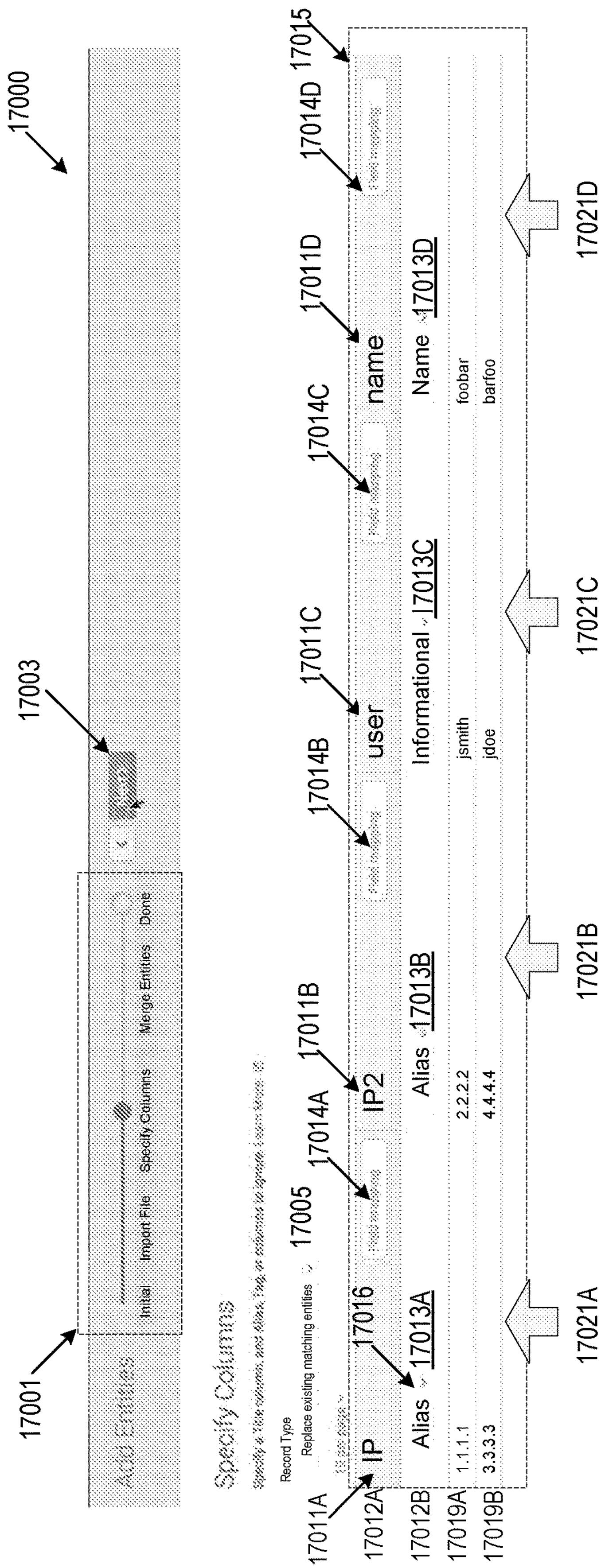
FIG. 10H illustrates an example of a GUI of a service monitoring system that displays a table for facilitating user input for creating entity definition(s) using a file, in accordance with one or more implementations of the present disclosure.

FIG. 10H illustrates an example of a GUI 17000 of a service monitoring system that displays a table 17015 for facilitating user input for creating entity definition(s) using a file, in accordance with one or more implementations of the present disclosure. GUI 17000 can include a status bar 17001 that is updated to display an indicator (e.g., shaded circle) corresponding to the current stage (e.g., specify column stage).

GUI 17000 can facilitate user input for creating one or more entity definition records using the data items from a file. Entity definition records are stored in a data store. The entity definition records that are created as a result of user input that is received via GUI 17000 can replace any existing entity definition records in the data store, can be added as new entity definition records to the data store, and/or can be combined with any existing entity definition records in the data store. The type of entity definition records that are to be created can be based on user input. GUI 17000 can include a button 17005, which when selected, can display a list of record type options, as described in greater detail below in conjunction with FIG. 10J.

Referring to FIG. 10H, GUI 17000 can display a table 17015 that has automatically been populated with data items that have been imported from a selected file (e.g., file 13009 in FIG. 10E). Table 170015 includes columns 17021A-D, a column identifier row 17012A containing element names 17011A-D for the columns 17021A-D, and another column identifier row 17012B containing component types 17013A-D for the columns 17021A-D.

The data items (e.g., "IP" 13001, "IP2" 13003, "user" 13005, and "name" 13006 in FIG. 10E), of the first entry (e.g., first entry 13007A in FIG. 10E) can automatically be imported as the element names 17011 A-D into the column identifier row 17012A in the table 17015. The placement of the data items (e.g., "IP", "IP2", "user", and "name") within the column identifier row 17012A is based on the matching of ordinal positions of the element names 17011A-D within the column identifier row 17012A to the ordinal positions of the data items within the first entry (e.g., entry 13007A of FIG. 10E) of the selected file.

GUI 17000 includes input text boxes 17014A-D to receive user input of user selected element names for the columns 17021A-D. In one implementation, user input of an element name that is received via a text box 17014A-D overrides the element names (e.g., "IP", "IP2", "user", and "name") that that are imported from the data items in the first header row in the file. As discussed above, an element name-element value pair that is defined for an entity definition component via GUI 17000 can be used as a field-value pair for a search query. An element name in the file may not correspond to an existing field name. A user (e.g., business analyst) can change the element name, via a text box 17014A-D, to a name that maps to an existing or desired field name. The mapping of an element name to an existing field name is not limited to a one-to-one mapping. For example, a user may rename "IP" to "dest" via text box 17014A and may also rename "IP2" to "dest" via text box 17014B.

The data items of the subsequent entries in the file can automatically be imported into the table 17015. The placement of the data items of the subsequent entries into a particular row in the table 17015 can be based on the matching of ordinal positions of the data rows 17019A,B within the table 17015 to the ordinal positions of the entries within the file. The placement of the data items into a particular column within the table 17015 can be based on the matching of the ordinal positions of the columns 17021A-D within the table 17015 to the ordinal positions of the data items within a particular entry in the file.

Figure 10I:
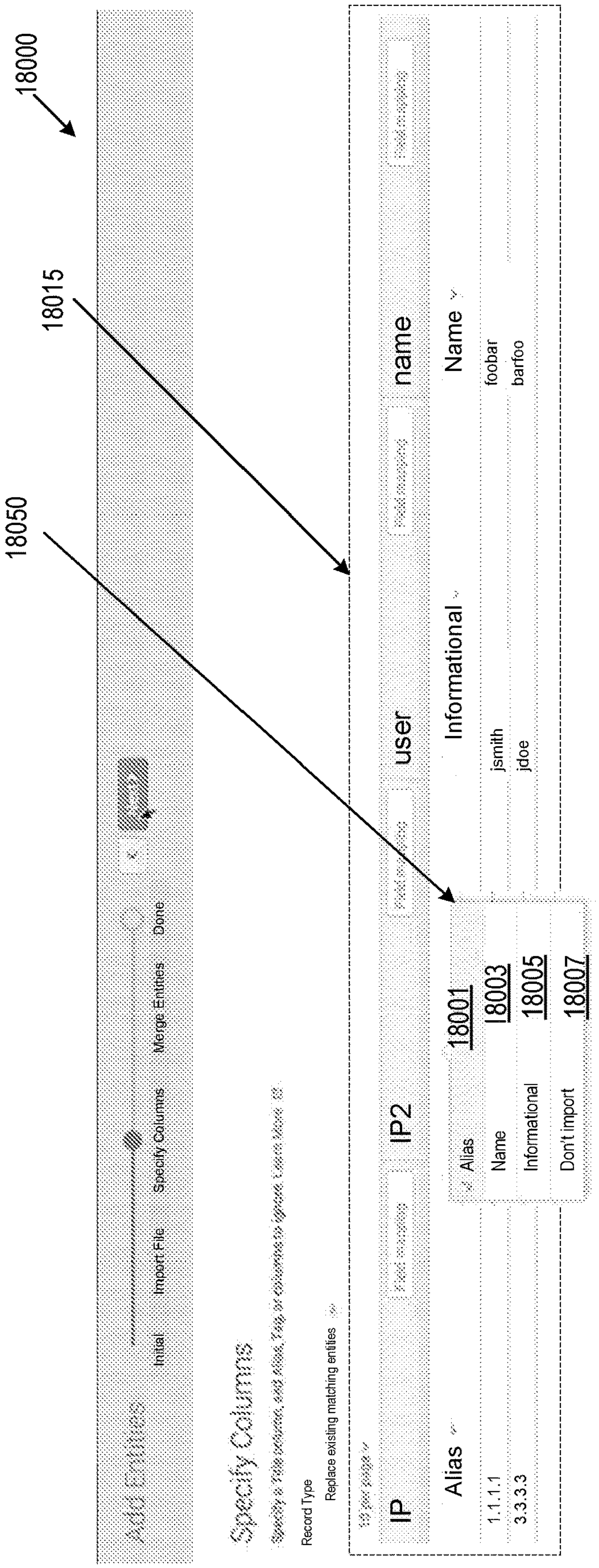
FIG. 10I illustrates an example of a GUI of a service monitoring system for displaying a list of entity definition component types, in accordance with one or more implementations of the present disclosure.

User input designating the entity definition component types 17013A-D in the table 17015 is received via the GUI. In one implementation, a button 17016 for each column 17021A-D can be selected to display a list of component types to select from. FIG. 10I illustrates an example of a GUI 18000 of a service monitoring system for displaying a list 18050 of entity definition component types, in accordance with one or more implementations of the present disclosure. List 18050 can include an alias component type 18001, a name component type 18003, an informational field component type 18005, and an import option 18007 indicating that the data items in a file that correspond to a particular column in the table 18015 should not be imported for creating an entity definition record. In one implementation, GUI 18000 includes buttons, which when selected, displays service and description drop down columns.

Figure 10J:
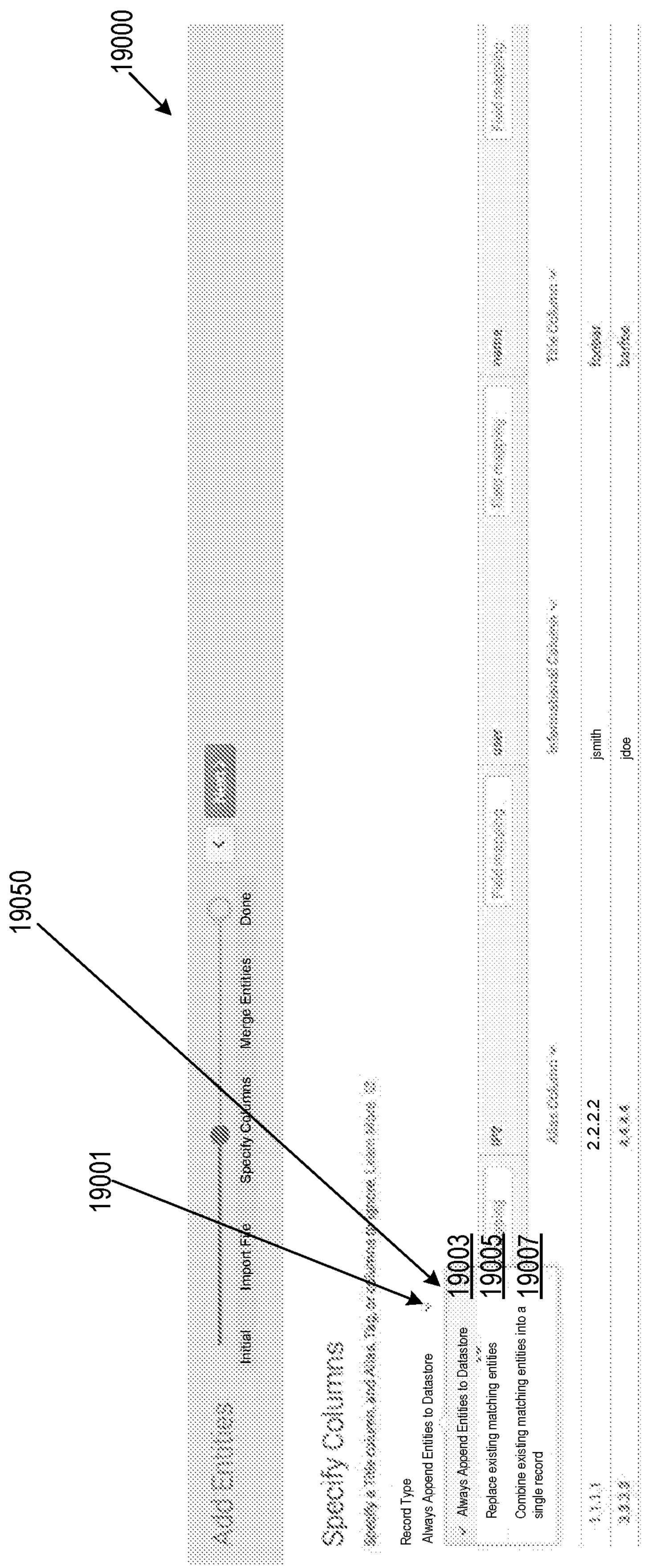
FIG. 10J illustrates an example of a GUI of a service monitoring system for specifying the type of entity definition records to create, in accordance with one or more implementations of the present disclosure.

FIG. 10J illustrates an example of a GUI 19000 of a service monitoring system for specifying the type of entity definition records to create, in accordance with one or more implementations of the present disclosure. GUI 19000 can include a button 19001, which when selected, can display a list 19050 of record type options from which a user may select.

As discussed above, entity definition records are stored in a data store. The entity definition records that are created as a result of user input that is received via GUI 19000 can be added as new entity definition records to the data store, can replace any existing entity definition records in the data store, and/or can be combined with any existing entity definition records in the data store. The list 19050 can include an option for to append 19003 the created entity definition records to the data store, to replace 19005 existing entity definition records in the data store with the created entity definition records, and to combine 19007 the created entity definition records with existing entity definition records in the data store. In one implementation, the record type is set to a default type. In one implementation, the default record type is set to the replacement type. The default record type is configurable.

When the append 19003 option is selected, the entity definition records (e.g., records 13027A,B in FIG. 10E) that are created as a result of using the GUI 19000 are added as new entity definition records to the data store.

When the replace 19005 option is selected, one or more of the entity definition records that are created as a result of using the GUI 19000 replace existing entity definition records in the data store that match one or more element values in the newly created records. In one implementation, an entire entity definition record that exists in the data store is replaced with a new entity definition record. In another implementation, one or more components of an entity definition record that exist in the data store are replaced with corresponding components of a new entity definition record.

In one implementation, the match is based on the element value for the name component in the entity definition records. A search of the data store can be executed to search for existing entity definition records that have an element value for a name component that matches the element value for the name component of a newly created entity definition record. For example, two entity definition records are created via GUI 19000. A first record has an element value of "foobar" for the name component of the record. The first record also includes an alias component having the element name "IP2" and element value of "2.2.2.2", and another alias component having the element name "IP" and element value of "1.1.1.1". There may be an existing entity definition record in the data store that has a matching element value of "foobar" for the name component. The existing entity definition record in the data store may have an alias component having the element name "IP2," but may have an element value of "5.5.5.5". The element value of "2.2.2.2" for the element name "IP2" in the new entity definition record can replace the element value of "5.5.5.5" in the existing entity definition record.

When the combine 19007 option is selected, one or more of the entity definition records that are created as a result of using the GUI 19000 can be combined with a corresponding entity definition record, which exists in the data store and has a matching element value for a name component. For example, a new entity definition record has an element value of "foobar" for the name component of the record. The first record also includes an alias component having the element name "IP2" and element value of "2.2.2.2", and another alias component having the element name "IP" and element value of "1.1.1.1". There may be an existing entity definition record in the data store that has a matching element value of "foobar" for the name component. The existing entity definition record in the data store may have an alias component having the element name "IP2," but may have an element value of "5.5.5.5". The element value of "2.2.2.2" for the element name "IP2" in the new entity definition record can be added as another element value in the existing entity definition record for the alias component having the element name "IP2," as described above in conjunction with alias component 12053B in FIG. 10C. In one implementation, if an alias component stores an element name of "IP2" and multiple element values "2.2.2.2" and "5.5.5.5," and when the element name-element value pair is used for a search query, the search query uses the values disjunctively. For example, a search query may search for fields named "IP2" and having either a "2.2.2.2" value or a "5.5.5.5" value.

If input of the selected file has been received, and if the next button 19003 has been selected, a GUI for merging entity definition records is displayed, as described in greater detail below in conjunction with FIG. 10K.

Figure 10K:
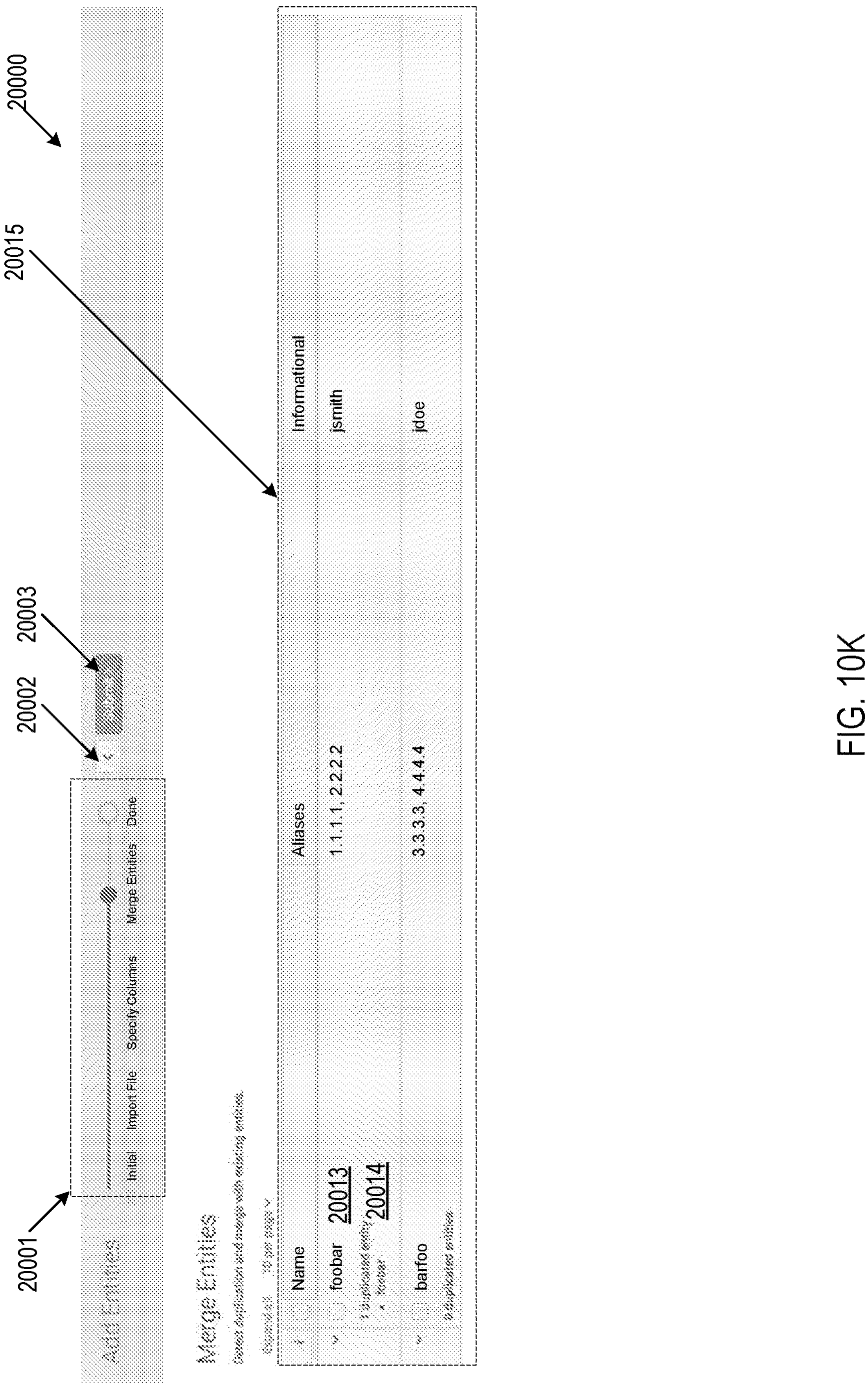
FIG. 10K illustrates an example of a GUI of a service monitoring system for merging entity definition records, in accordance with one or more implementations of the present disclosure.

FIG. 10K illustrates an example of a GUI 20000 of a service monitoring system for merging entity definition records, in accordance with one or more implementations of the present disclosure. GUI 20000 can include a status bar 20001 that is updated to display an indicator (e.g., shaded circle) corresponding to the current stage (e.g., merge entities stage). During the merge entity definition records stage, a determination of whether there would be duplicate entity definition records in the data store is made, and the results 20015 of the determination are displayed in the GUI 20000. For example, if the append option (e.g., append 19003 option if FIG. 10J) was selected to add any the newly created entity definition records to the data store, the results 20015 may be that multiple entity definition records that have the same element value for the name component would exists in the data store. For example, the results 20015 include an indicator 20014 indicating that there would be one duplicated entity definition record having the element name "foobar" as the name component in the records. A user (e.g., business analyst) can decide whether or not to allow the multiple entity definition records in the data store that have the same value (e.g., foobar) for the name component. If the user does not wish to allow the multiple records to have the same name in the data store, the previous 20002 button can be selected to display the previous GUI (e.g., GUI 19000 in FIG. 10J) and the user may select another record type (e.g., replace, combine). If the user wishes to allows the multiple records to have the same name, the submit 20003 button can be selected to create the new entity definition records and to add the new entity definition records to the data store. If the submit 20003 button is selected, GUI 21000 in FIG. 10L can be displayed.

Figure 10L:
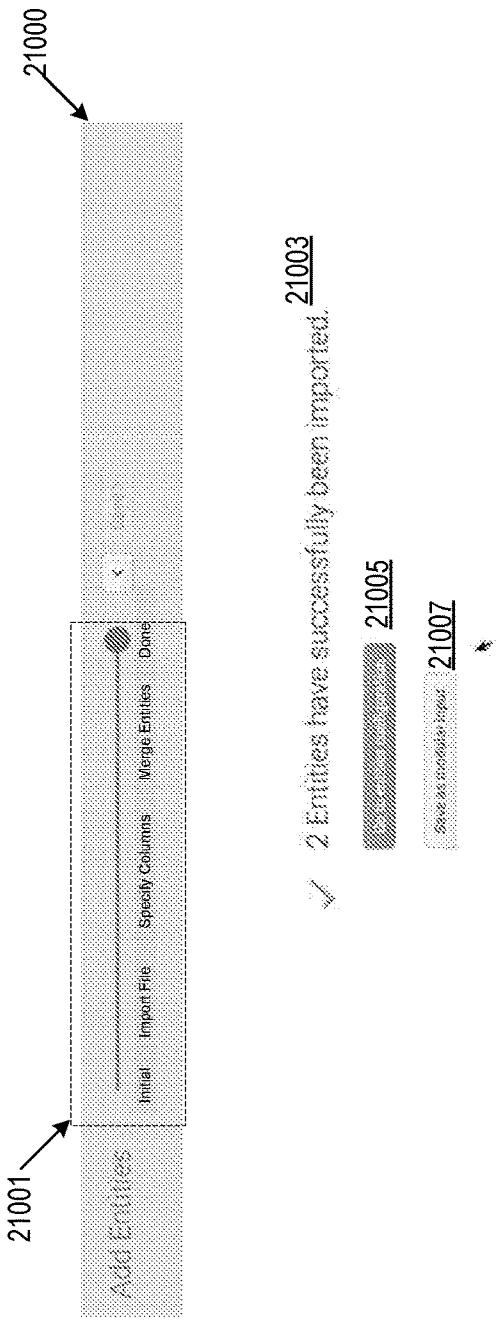
FIG. 10L illustrates an example of a GUI of a service monitoring system for providing information for newly created and/or updated entity definition records, in accordance with one or more implementations of the present disclosure.

FIG. 10L illustrates an example of a GUI 21000 of a service monitoring system for providing information for newly created and/or updated entity definition records, in accordance with one or more implementations of the present disclosure. GUI 21000 can include a status bar 21001 that is updated to display an indicator (e.g., shaded circle) corresponding to the current stage (e.g., completion stage).

GUI 21000 can include information 21003 pertaining to the entity definition records that have been imported into the data store. The information 21003 can include the number of records that have been imported. In one implementation, the information 21003 includes the type (e.g., replace, append, combine) of import that has been made. If button 21005 is selected, GUI 24000 for editing the entity definition records can be displayed. FIG. 10P illustrates an example of a GUI 24000 of a service monitoring system for creating and/or editing entity definition record(s), in accordance with one or more implementations of the present disclosure. GUI 24000 displays a portion 24001 of a list of the entity definition records that are stored in the data store. A button 24003 for an entity definition record in the list can be selected, and a GUI for editing the selected entity definition record can be displayed.

Referring to FIG. 10L, as described above, the selected file (e.g., file 13000 in FIG. 10E) that was used to import entity definition records in to the data store may be a file that is generated by a source (e.g., inventory system). The file may be periodically output by the source (e.g., inventory system), and a user (e.g., business analyst) may wish to execute another import using the newly outputted file from the source. The configuration (e.g., selected component types, selected type of import, etc.) of the current import that was executed using the file can be saved for future execution using an updated file.

Figure 10M:
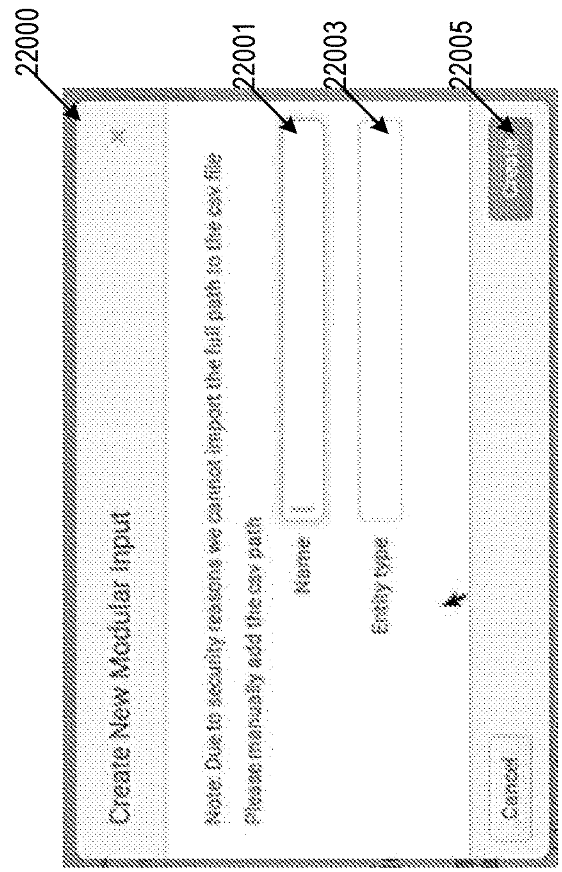
FIG. 10M illustrates an example of a GUI of a service monitoring system for saving configurations settings of an import, in accordance with one or more implementations of the present disclosure.

If button 21007 is selected, GUI 22000 in FIG. 10M can be displayed to save the configuration of the current import that was executed using the file as a new modular input that can be used for future imports using new versions of the file.

FIG. 10M illustrates an example of a GUI 22000 of a service monitoring system for saving configurations settings of an import, in accordance with one or more implementations of the present disclosure. The configuration of a current import that was executed using a file (e.g., file 13000 in FIG. 10E) can be saved as a new modular input that can be used for future imports using new versions of the file. When a new modular input is created for the file, the file (e.g., file 13000 in FIG. 10E) will be monitored for updates. If the file is updated, an import can be automatically executed using the configuration (e.g., selected component types, selected type of import, etc.) of the modular input that was saved for the file.

A user (e.g., business analyst) can provide a name 22001 for modular input and metadata information for the modular input, such as an entity type 22003 for the modular input. When the create 22005 button is selected, a modular input GUI is displayed for setting the parameters for monitoring the file.

Figure 10N:
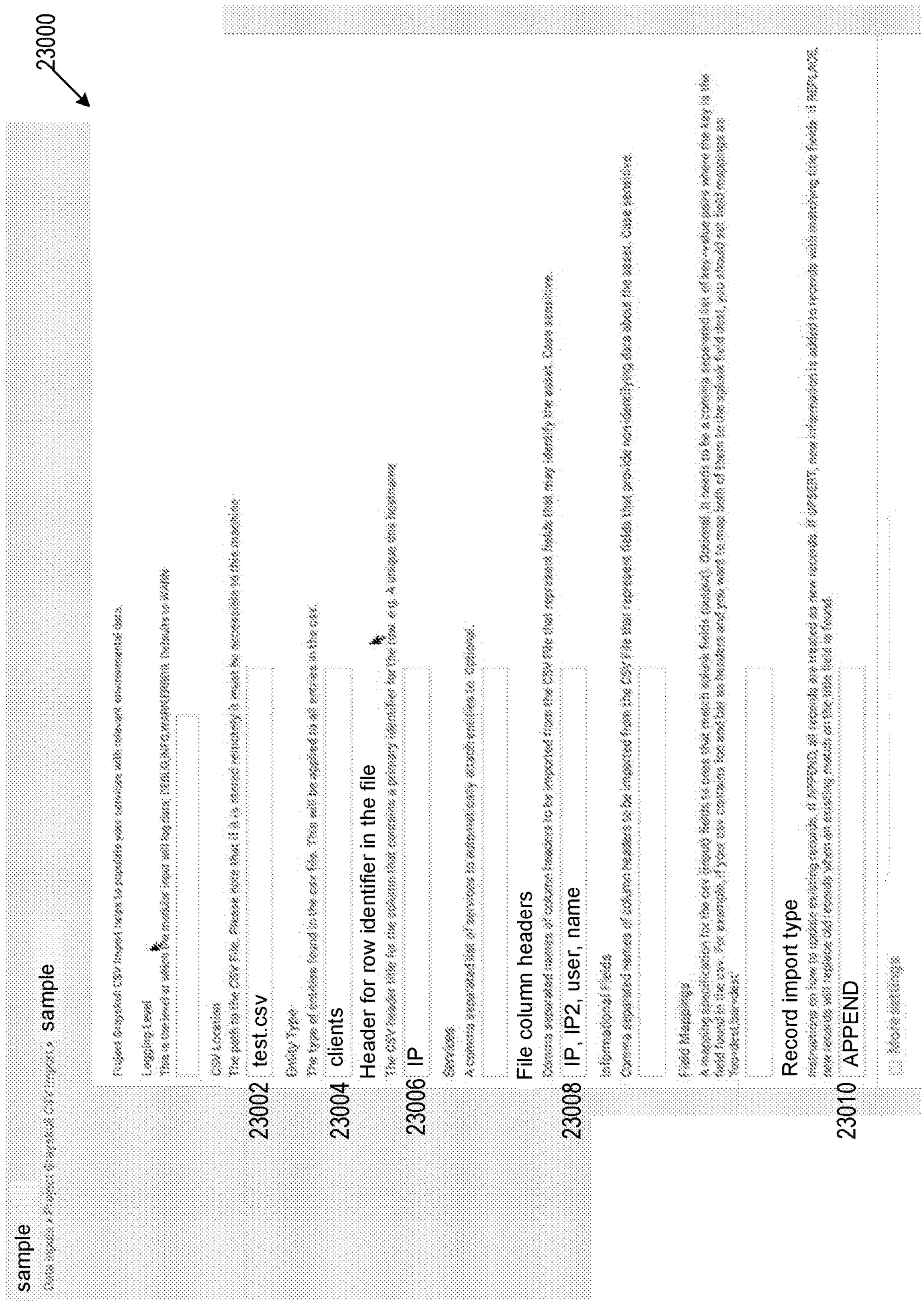
FIGS. 10N-10O illustrates an example of GUIs of a service monitoring system for setting the parameters for monitoring a file, in accordance with one or more implementations of the present disclosure.
Figure 10O:
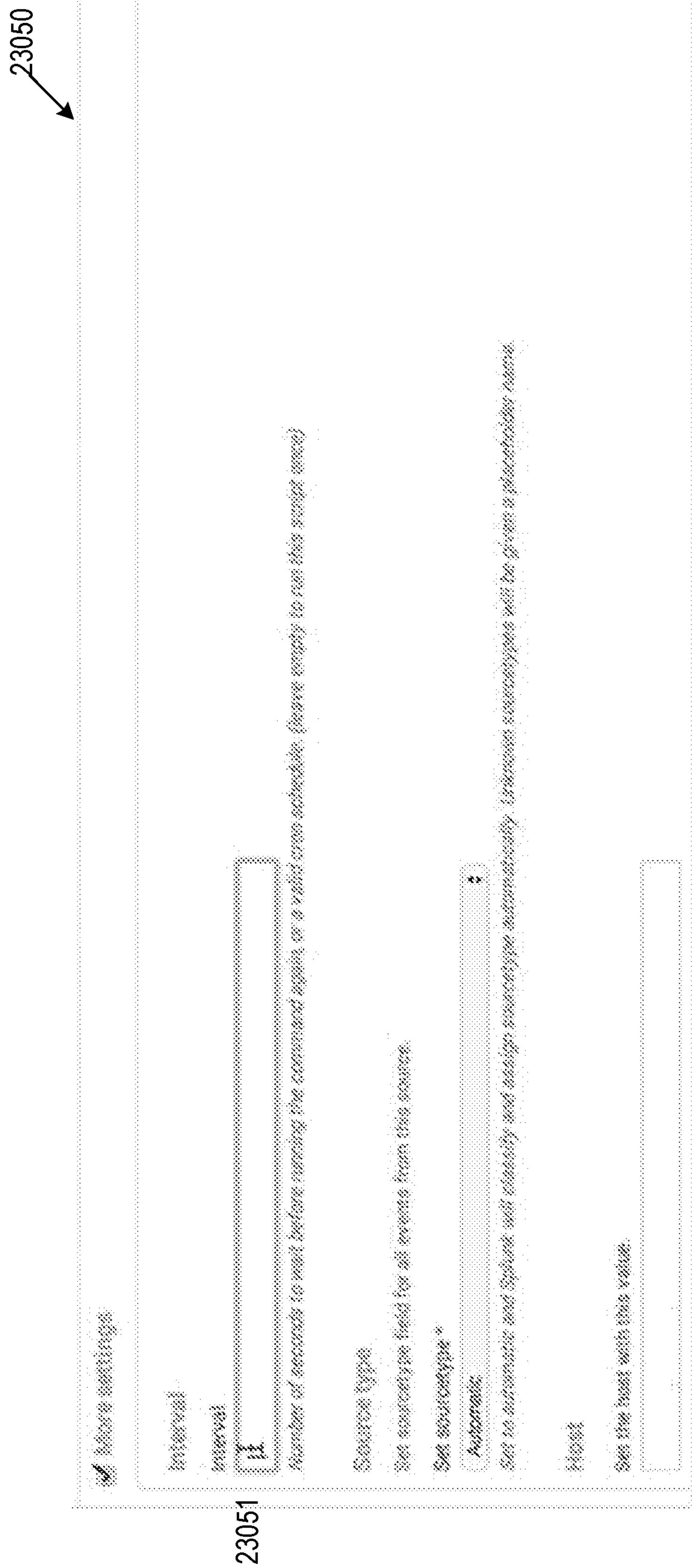
Figure 10P:
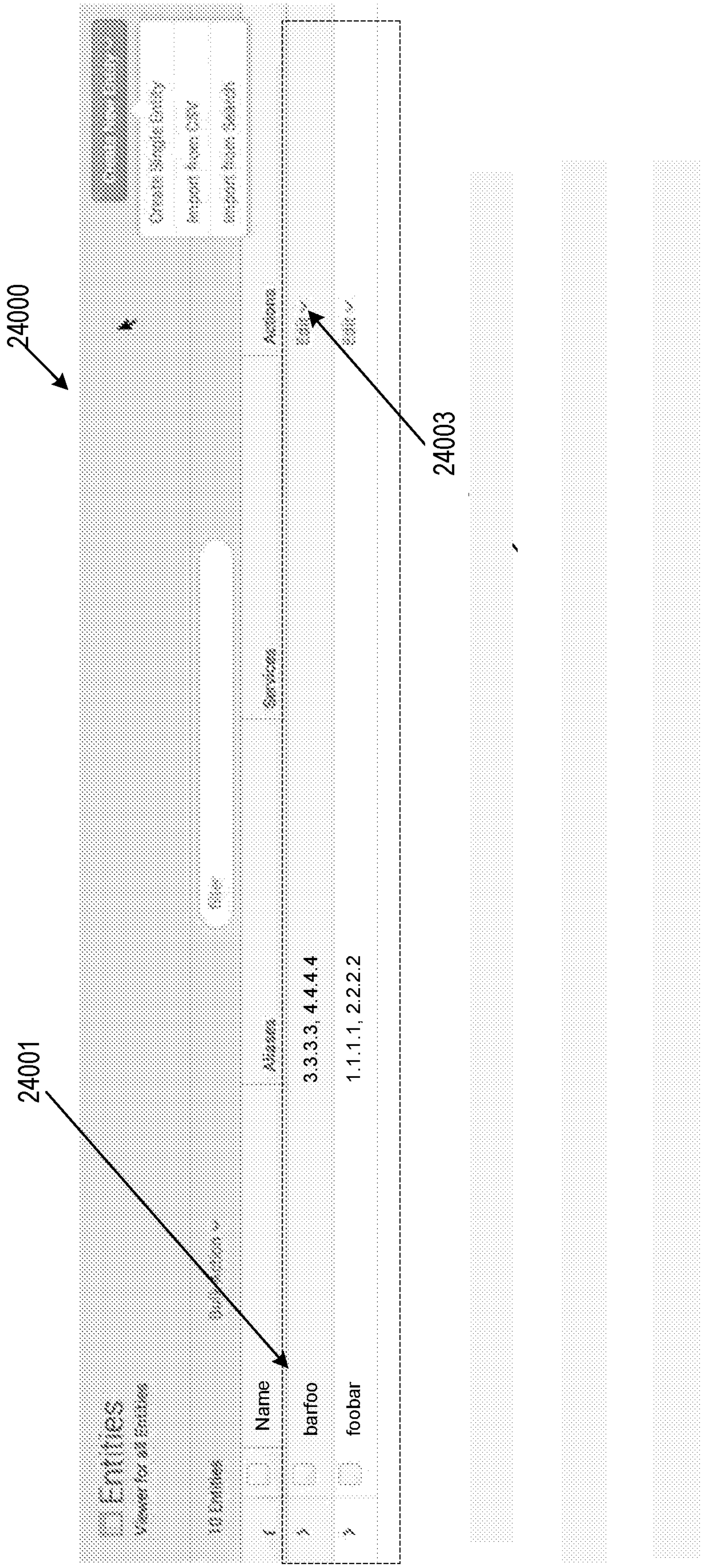
FIG. 10P illustrates an example of a GUI of a service monitoring system for creating and/or editing entity definition record(s), in accordance with one or more implementations of the present disclosure.

FIGS. 10N-10O illustrates an example of GUIs of a service monitoring system for setting the parameters for monitoring a file, in accordance with one or more implementations of the present disclosure. GUI 23000 can automatically be populated with the configuration of the current import that is to be saved. For example, GUI 23000 in FIG. 10N displays parameters from the current import, such as the file location 23002, the entity type 23004, the column identifier 23006 to be used to identify rows in the file, the file column headers 23008 in the file, and the record type 23010.

The monitoring of a file (e.g., file 13009 in FIG. 10E) to determine whether the file has changed can run at a particular interval. A user can provide input of the interval 23051 via GUI 23050 in FIG. 10O. In one implementation, a change is when new data is found in the file. In another implementation, a change is when data has been removed from the file. In one implementation, a change includes data being added to the file and data being removed from the file. In one implementation, when a change is identified in the file, new entity definition records that reflect the change can be imported into the data store. Depending on the import type that has been saved in the modular input, the new entity definition records can automatically replace, append, or be combined with existing entity definition records in the data store. For example, the append 23010 option has been saved in the modular input settings and will be used for imports that occur when the file has changed. When a change has been detected in the file, new entity definition records will automatically be appended (e.g., added) to the data store. In one implementation, when a change has been detected in the file that pertains to data being removed from the file, the import of the new entity definition records, which reflect the removed data, into the data store does not occur automatically.

Creating Entity Definition from a Search Result List

Figure 10Q:
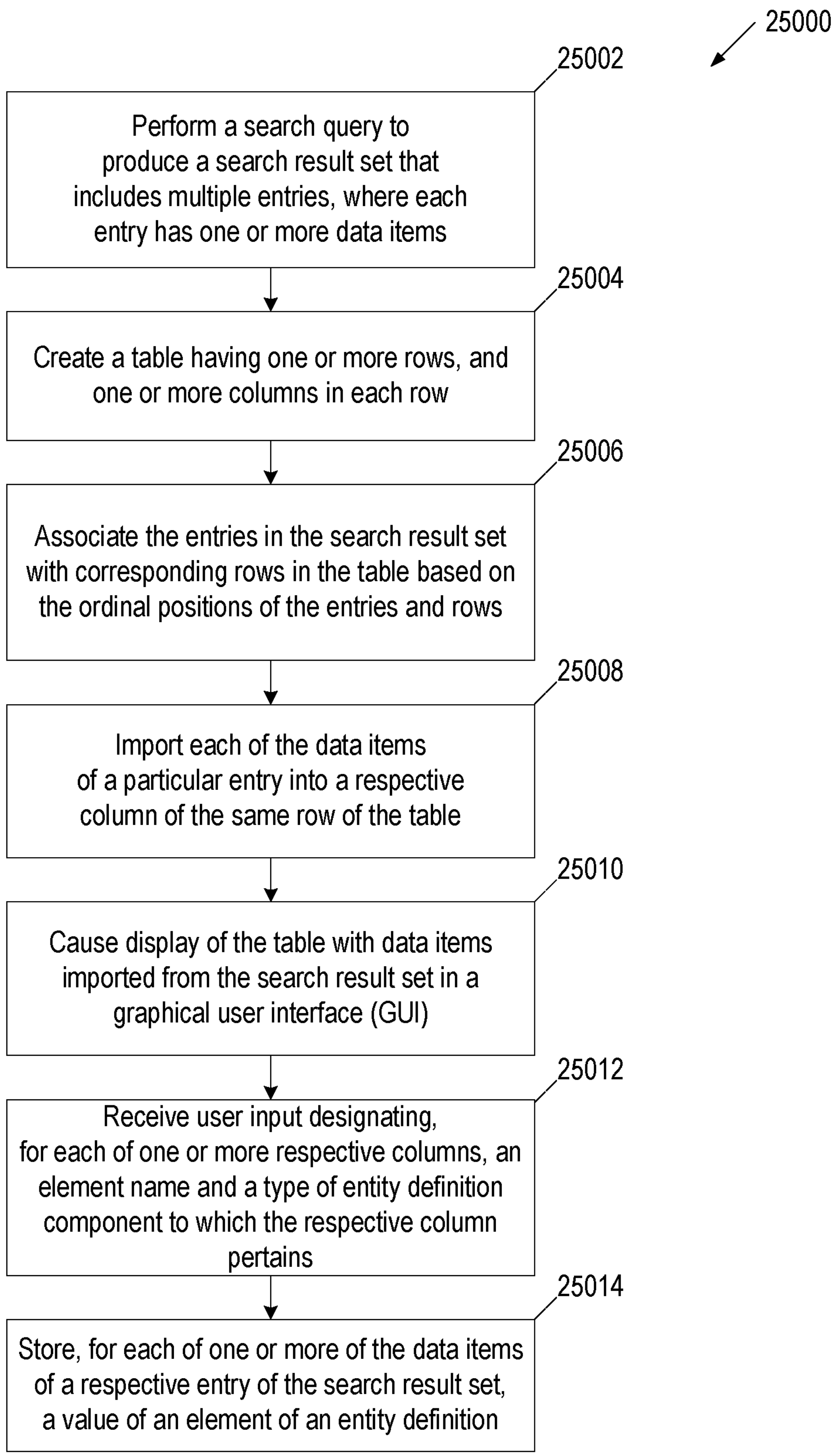
FIG. 10Q is a flow diagram of an implementation of a method for creating entity definition(s) using a search result set, in accordance with one or more implementations of the present disclosure.

FIG. 10Q is a flow diagram of an implementation of a method 25000 for creating entity definition(s) using a search result set, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, at least a portion of method is performed by a client computing machine. In another implementation, at least a portion of method is performed by a server computing machine.

At block 25002, the computing machine performs a search query to produce a search result set. The search query can be performed in response to user input. The user input can include a user selection of the type of search query to use for creating entity definitions. The search query can be an ad-hoc search or a saved search. A saved search is a search query that has search criteria, which has been previously defined and is stored in a data store. An ad-hoc search is a new search query, where the search criteria are specified from user input that is received via a graphical user interface (GUI). Implementations for receiving user input for the search query via a GUI are described in greater detail below in conjunction with FIGS. 10S-10T.

In one implementation, the search query is directed to searching machine data. As described above, the computing machine can be coupled to an event processing system (e.g., event processing system 205 in FIG. 2). Machine data can be represented as events. Each of the events can include raw data. The event processing system can apply a late-binding schema to the events to extract values for fields defined by the schema, and determine which events have values that are extracted for a field. The search criteria for the search query can specify a name of one or more fields defined by the schema and a corresponding value for the field name. The field-value pairs in the search query can be used to search the machine data for the events that have matching values for the fields named in search criteria. For example, the search criteria may include the field name "role" and the value "indexer." The computing machine can execute the search query and return a search result set that includes events with the value "indexer" in the associated field named "role."

In one implementation, the search query is directed to search a data store storing service monitoring data pertaining to the service monitoring system. The service monitoring data, can include, and is not limited to, entity definition records, service definition records, key performance indicator (KPI) specifications, and KPI thresholding information. The data in the data store can be based on one or more schemas, and the search criteria for the search query can include identifiers (e.g., field names, element names, etc.) for searching the data based on the one or more schemas. For example, the search criteria can include a name of one or more elements defined by the schema for entity definition records, and a corresponding value for the element name. The element name element value pair in the search query can be used to search the entity definition records for the records that have matching values for the elements named in search criteria.

The search result set can be in a tabular format, and can include one or more entries. Each entry includes one or more data items. The search query can search for information pertaining to an IT environment. For example, the search query may return a search result set that includes information for various entities (e.g., physical machines, virtual machines, APIs, processes, etc.) in an IT environment and various characteristics (e.g., name, aliases, user, role, owner, operating system, etc.) for each entity. One or more entries in the search result set can correspond to entities. Each entry can include one or more data items. As discussed above, an entity has one or more characteristics (e.g., name, alias, informational field, service association, and/or other information). Each data item in an entry in the search result set can correspond to a characteristic of a particular entity.

Each entry in the search result set has an ordinal position within the search result set, and each data item has an ordinal position within the corresponding entry in the search result set. An ordinal position is a specified position in a numbered series. Each entry in the search result set can have the same number of data items. Alternatively, the number of data items per entry can vary.

At block 25004, the computing machine creates a table having one or more rows, and one or more columns in each row. The number of rows in the table can be based on the number of entries in the search result set, and the number of columns in the table can be based on the number of data items within an entry in the search result set (e.g., the number of data items in an entry having the most data items). Each row has an ordinal position within the table, and each column has an ordinal position within the table.

At block 25006, the computing machine associates the entries in the search result set with corresponding rows in the table based on the ordinal positions of the entries within the search result set and the ordinal positions of the rows within the table. For each entry, the computing machine matches the ordinal position of the entry with the ordinal position of one of the rows. The matched ordinal positions need not be equal in an implementation, and one may be calculated from the other using, for example, an offset value.

At block 25008, for each entry in the search result set, the computing machine imports each of the data items of a particular entry in the search result set into a respective column of the same row of the table. An example of importing the data items of a particular entry to populate a respective column of a same row of a table is described in greater detail below in conjunction with FIG. 10R.

At block 25010, the computing system causes display in a GUI of one or more rows of the table populated with data items imported from the search result set. An example GUI presenting a table with data items imported from a search result set is described in greater detail below in conjunction with FIG. 10R and FIG. 10V.

At block 25012, the computing machine receives user input designating, for each of one or more respective columns, an element name and a type of entity definition component to which the respective column pertains. As discussed above, an entity definition component type represents a particular characteristic type (e.g., name, alias, information, service association, etc.) of an entity. An element name represents a name of an element associated with a corresponding characteristic of an entity. For example, the entity definition component type may be an alias component type, and an element associated with an alias of an entity may be an element name "role".

The user input designating, for each respective column, an element name and a type (e.g., name, alias, informational field, service association, and other) of entity definition component to which the respective column pertains can be received via the GUI. One implementation of user input designating, for each respective column, an element name and a type of entity definition component to which the respective column pertains is discussed in greater detail below in conjunction with FIG. 10V.

At block 25014, the computing machine stores, for each of one or more of the data items of the particular entry of the search result set, a value of an element of an entity definition. I data item will be stored if it appeared in a column for which a proper element name and entity definition component type were specified. As discussed above, an entity definition includes one or more components. Each component stores information pertaining to an element. The element of the entity definition has the element name designated for the respective column in which the data item appeared. The element of the entity definition is associated with an entity definition component having the type designated for the respective column in which the data item appeared. The element names and the values for the elements can be stored in an entity definition data store, which may be a relational database (e.g., SQL server) or a document-oriented database (e.g., MongoDB), for example.

Figure 10R:
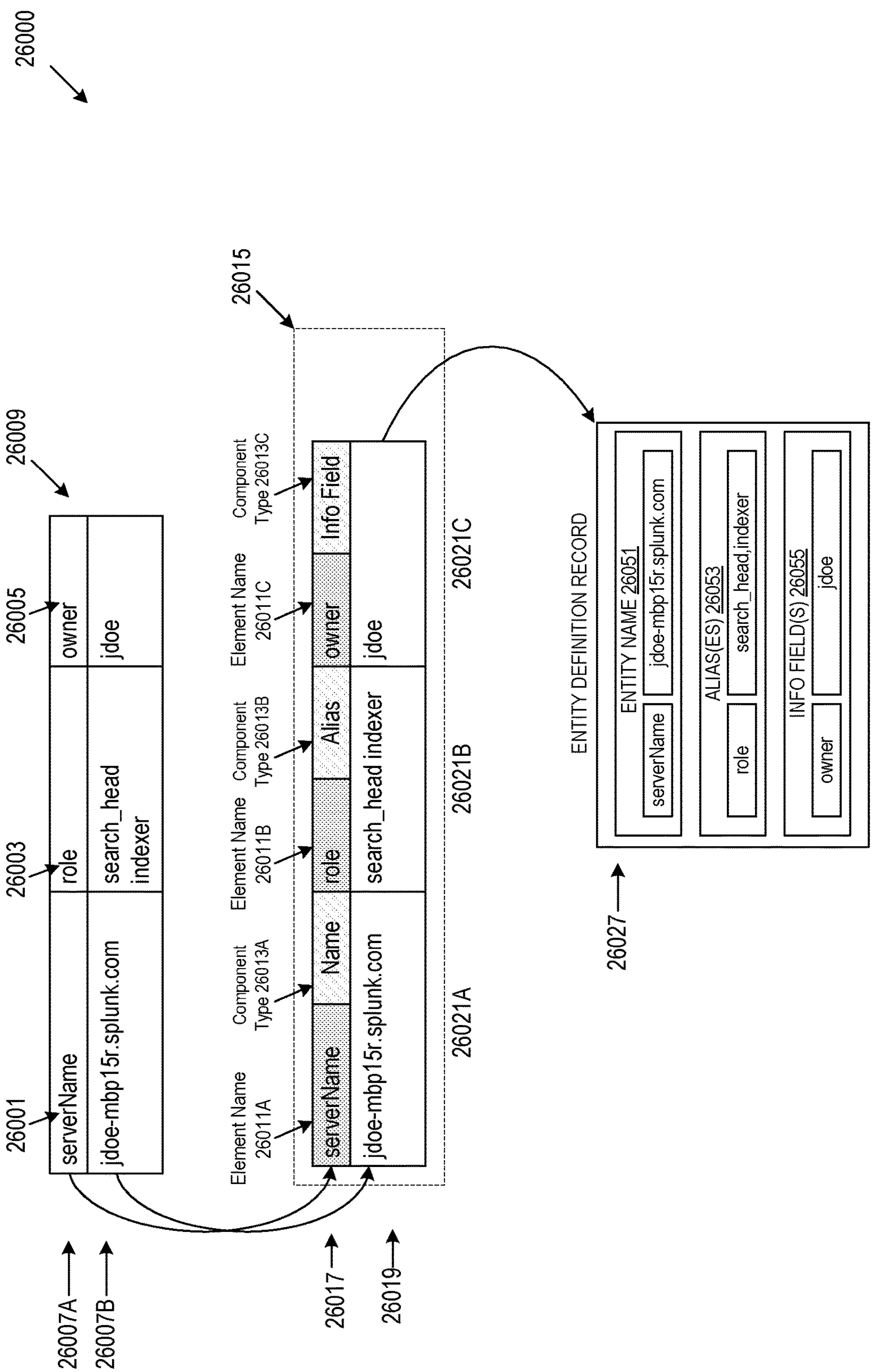
FIG. 10R is a block diagram of an example of creating entity definition(s) using a search result set, in accordance with one or more implementations of the present disclosure.

FIG. 10R is a block diagram 26000 of an example of creating entity definition(s) using a search result set, in accordance with one or more implementations of the present disclosure. A search result set 26009 can be produced from the execution of a search query. The search result set 26009 can have a tabular format that has one or more columns of data items and one or more rows of entries. The search result set 26009 includes multiple entries 26007A-B. Each entry 26007A-B includes one or more data items.

The first entry 26007A in the search result set 26009 may be a "header" entry. The data items (e.g. serverName 26001, role 26003, and owner 26005) in the "header" entry 26007A can be names defining the types of data items in the search result set 26009.

A table 26015 can be displayed in a GUI. The table 26015 can include one or more rows. In one implementation, a top row in the table 26015 is a column identifier row 26017, and each subsequent row 26019 is a data row. A column identifier row 26017 contains column identifiers, such as an element name 26011A-C and an entity definition component type 26013A-C, for each column 26021A-C in the table 26015. User input can be received via the GUI for designating the element names 26011A-C and component types 26013A-C for each column 26021A-C.

In one implementation, the data items of the first entry (e.g., entry 26007A) in the search result set 26009 are automatically imported as the element names 26011A-C into the column identifier row 26017 in the table 26015, and user input is received via the GUI that indicates acceptance of using the data items of the first entry 26007A in the search result set 26009 as the element names 26011A-C in the table 26015. For example, a user selection of a save button or a next button in a GUI can indicate acceptance. In one implementation, user input designating the component types is also received via the GUI. One implementation of a GUI facilitating user input for designating the element names and component types for each column is described in greater detail below in conjunction with FIG. 10V.

The determination of how to import a data item from the search result set 26009 to a particular location in the table 26015 is based on ordinal positions of the data items within a respective entry in the search result set 26009 and ordinal positions of columns within the table 26015. In one implementation, ordinal positions of the entries 26007A-B within the search result set 26009 and ordinal positions of the rows (e.g., row 26017, row 26019) within the table 26015 are used to determine how to import a data item from the search result set 26009 into the table 26015.

Each of the entries and data items in the search result set 26009 has an ordinal position. Each of the rows and columns in the table 26015 has an ordinal position. In one implementation, the first position in a numbered series is zero. In another implementation, the first position in a numbered series is one.

For example, each entry 26007A-B in the search result set 26009 has an ordinal position within the search result set 26009. In one implementation, the top entry in the search result set 26009 has a first position in a numbered series, and each subsequent entry has a corresponding position in the number series relative to the entry having the first position. For example, for search result set 26009, entry 26007A has an ordinal position of one, and entry 26007B has an ordinal position of two.

Each data item in an entry 26007A-B has an ordinal position within the respective entry. In one implementation, the left most data item in an entry has a first position in a numbered series, and each subsequent data item has a corresponding position in the number series relative to the data item having the first position. For example, for entry 26007A, "serverName" 26001 has an ordinal position of one, "role" 26003 has an ordinal position of two, and "owner" 26005 has an ordinal position of three.

Each row in the table 26015 has an ordinal position within the table 26015. In one implementation, the top row in the table 26015 has a first position in a numbered series, and each subsequent row has a corresponding position in the number series relative to the row having the first position. For example, for table 26015, row 26017 has an ordinal position of one, and row 26019 has an ordinal position of two.

Each column in the table 26015 has an ordinal position within the table 26015. In one implementation, the left most column in the table 26015 has a first position in a numbered series, and each subsequent column has a corresponding position in the number series relative to the column having the first position. For example, for table 26015, column 26021A has an ordinal position of one, column 26021B has an ordinal position of two, and column 26021C has an ordinal position of three.

Each element name 26011A-C in the table 26015 has an ordinal position within the table 26015. In one implementation, the left most element name in the table 26015 has a first position in a numbered series, and each subsequent element name has a corresponding position in the numbered series relative to the element name having the first position. For example, for table 26015, element name 26011A has an ordinal position of one, element name 26011B has an ordinal position of two, and element name 26011C has an ordinal position of three.

The ordinal positions of the rows in the table 26015 and the ordinal positions of the entries 26007A-B in the search result set 26009 can correspond to each other. The ordinal positions of the columns in the table 26015 and the ordinal positions of the data items in the search result set 26009 can correspond to each other. The ordinal positions of the element names in the table 26015 and the ordinal positions of the data items in the search result set 26009 can correspond to each other.

The determination of an element name GUI element 26011A-C in which to place a data item (when importing a search results entry that contains the element (column) names) can be based on the ordinal position of the entity name 26011A-C that corresponds to the ordinal position of the data item. For example, "serverName" 26001 has an ordinal position of one within entry 26007A in the search result set 26009. Element name 26011A has an ordinal position that matches the ordinal position of "serverName" 26001. "serverName" 26001 can be imported from the search result set 26009 and placed in element name 26011A in row 26017.

The data items for a particular entry in the search result set 26009 can appear in the same row in the table 26015. The determination of a row in which to place the data items for the particular entry can be based on the ordinal position of the row that corresponds to the ordinal position of the entry. For example, entry 26007B has an ordinal position of two. Row 26019 has an ordinal position that matches the ordinal position of entry 26007B. The data items "jdoe-mbp15r.splunk.com", "search_head, indexer", and "jdoe" can be imported from entry 26007B in the search result set 26009 and placed in row 26019 in the table 26015.

The determination of a column in which to place a particular data item can be based on the ordinal position of the column within the table 26015 that corresponds to the ordinal position of the data items within a particular entry in the search result set 26009. For example, the data item "jdoe-mbp15r.splunk.com" in entry 26007B has an ordinal position of one. Column 26021A has an ordinal position that matches the ordinal position of "jdoe-mbp15r.splunk.com". The data item "jdoe-mbp15r.splunk.com" can be imported from the search result set 26009 and placed in row 26019 and in column 26021A.

User input designating the component types 26013A-C in the table 26015 is received via the GUI. For example, a selection of "Name" is received for component type 26013A, a selection of "Alias" is received for component type 26013B, and a selection of "Informational Field" is received for component type 26013C. One implementation of a GUI facilitating user input for designating the component types for each column is described in greater detail below in conjunction with FIG. 10V.

Corresponding ordinal positions need not be equal in an implementation, and one may be calculated from the other using, for example, an offset value.

User input can be received via the GUI for creating entity definitions records, such as 26027, using the element names 26011A-C, component types 26013A-C, and data items displayed in the table 26015, and importing the entity definitions records, such as 26027, in a data store, as described in greater detail below in conjunction with FIGS. 10V-10X.

When user input designating the entity definition component types 26013A-C for the table 26015 is received, and user input indicating acceptance of the display of the data items from search result set 26009 into the table 26015 is received, the entity definition record(s) can be created and stored. For example, the entity definition record 26027 is created.

As described above, in one implementation, an entity definition stores no more than one component having a name component type. The entity definition can store zero or more components having an alias component type, and can store zero or more components having an informational field component type. In one implementation, user input is received via a GUI (e.g., entity definition editing GUI, service definition GUI) to add one or more service association components and/or one or more other information components to an entity definition record. While not explicitly shown in the illustrative example of FIG. 10R, the teachings regarding the importation of component information into entity definition records from search query results can understandably be applied to service association component information, after the fashion illustrated for alias and informational field component information, for example.

In one implementation, an entity definition record (e.g., entity definition record 26027) stores the component having a name component type as a first component, followed by any component having an alias component type, followed by any component having an informational field component type, followed by any component having a service component type, and followed by any component having a component type for other information.

Figure 10S:
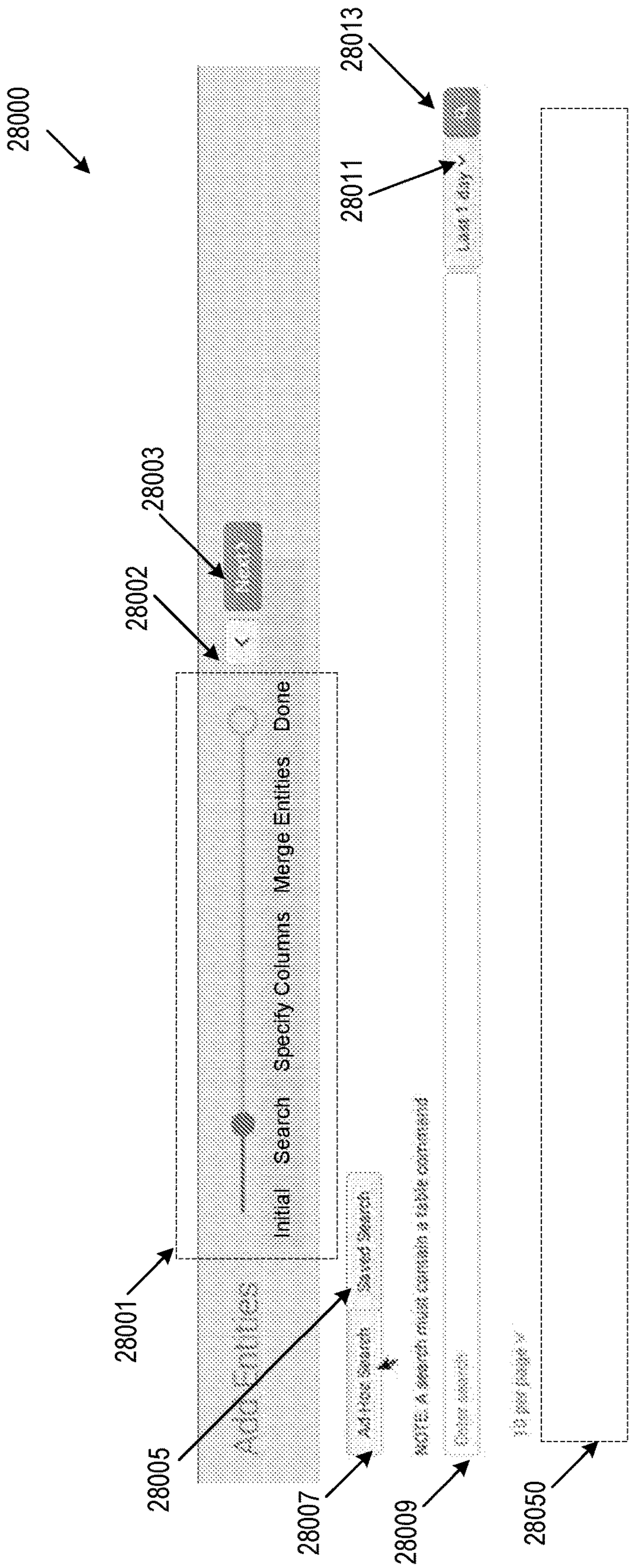
FIG. 10S illustrates an example of a GUI of a service monitoring system for defining search criteria for a search query for creating entity definition(s), in accordance with one or more implementations of the present disclosure.

FIG. 10S illustrates an example of a GUI 28000 of a service monitoring system for defining search criteria for a search query for creating entity definition(s), in accordance with one or more implementations of the present disclosure.

GUI 28000 can be displayed, for example, if search icon 14007 in FIG. 10F is selected, as described above. GUI 28000 can include a status bar 28001 that is updated to display an indicator (e.g., shaded circle) corresponding to the current stage (e.g., search stage). The stages can include, for example, and are not limited to, an initial stage, a search stage, a specify columns stage, a merge entities stage, and a completion stage. GUI 28000 includes a next button 28003, which when selected, displays the next GUI for creating the entity definition(s). GUI 28000 includes a previous button 28002, which when selected, displays the previous GUI for creating the entity definition(s).

The search query can be an ad-hoc search or a saved search. As described above, a saved search is a search query that has search criteria, which has been previously defined and is stored in a data store. An ad-hoc search is a new search query, where the search criteria are specified from user input that is received via a graphical user interface (GUI).

If the ad-hoc search button 2807 is selected, user input can be received via text box 28009 indicating search language that defines the search criteria for the ad-hoc search query. If the saved search button 28005 is selected, GUI 29000 in FIG. 10T is displayed.

Figure 10T:
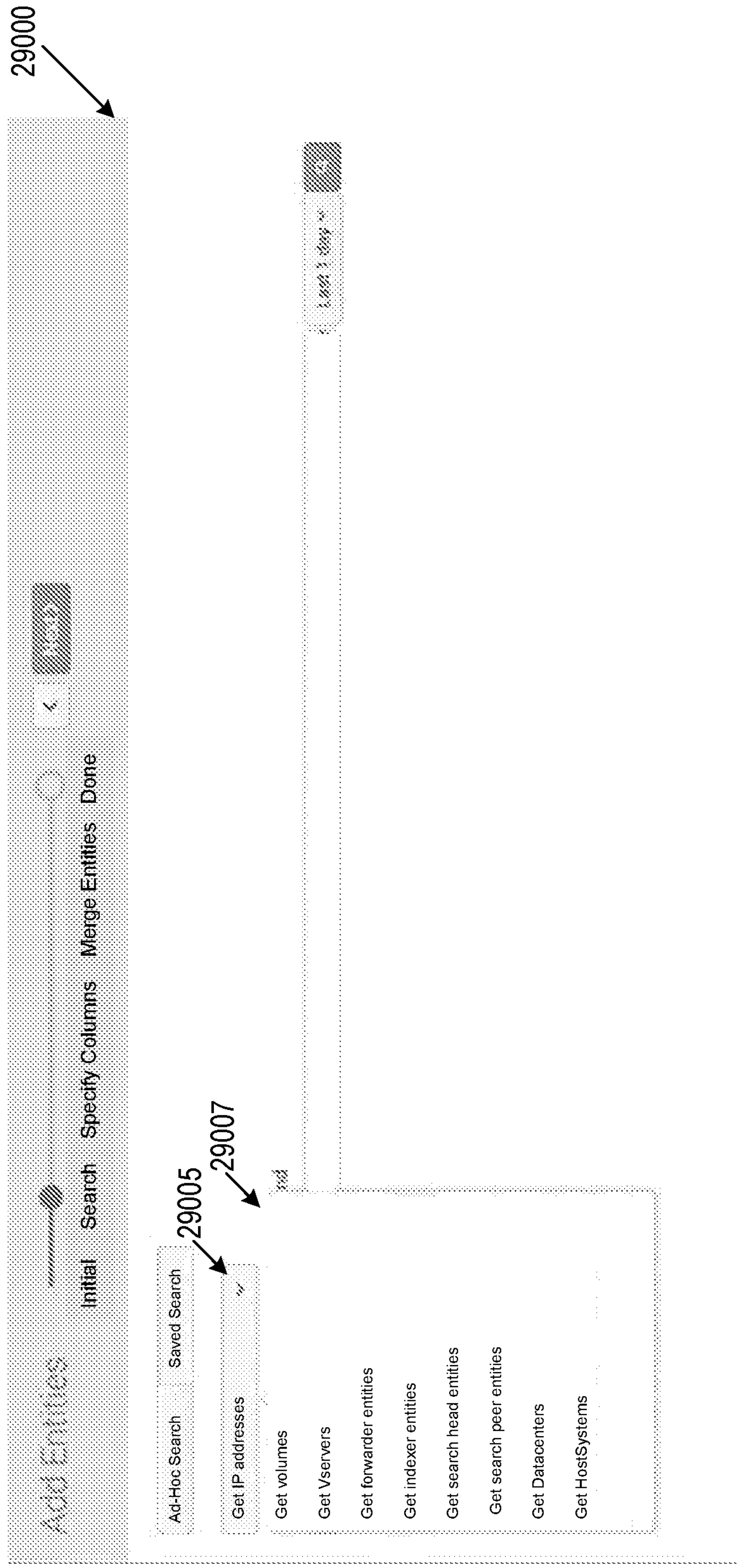
FIG. 10T illustrates an example of a GUI of a service monitoring system for defining a search query using a saved search, in accordance with one or more implementations of the present disclosure.

FIG. 10T illustrates an example of a GUI 29000 of a service monitoring system for defining a search query using a saved search, in accordance with one or more implementations of the present disclosure. GUI 29000 includes a GUI element (e.g., a button) 29005, which when selected, displays a list 29007 of saved searches to select from. The list 29007 of saved searches corresponds to searches that are stored in a data store. In one implementation, the list 29007 of saved searches includes default saved searches. In one implementation, when a new search is saved to the data store, the list 29007 is updated to include the newly saved search—that is to say, the content of list 29007 is populated dynamically, in whole or in part.

Referring to FIG. 10S, the search query can be directed to search machine data that is stored in a data store and/or service monitoring data (e.g., entity definition records, service definition records, etc.) that is stored in a data store. The data (e.g., machine data, service monitoring data) used by a search query to produce a search result set can be based on a time range. The time range can be a user-defined time range or a default time range. The default time range can be configurable. GUI 28000 can include a button 28011, which when selected, displays a list of time ranges to select from. For example, a user may select, via the button 28011, the time range "Last 1 day" and when the search query is executed, the search query will search data (e.g., machine data, service monitoring data) from the last one day.

When a search query has been defined, for example, as user input received for an ad-hoc search via text box 28009, or from a selection of a saved search, and when a time range has been selected, the search query can be executed in response to the activation of button 28013. The search result set produced by performing the search query can be displayed in a results portion 28050 of the GUI 2800, as described in greater detail below in conjunction with FIG. 10U.

Figure 10U:
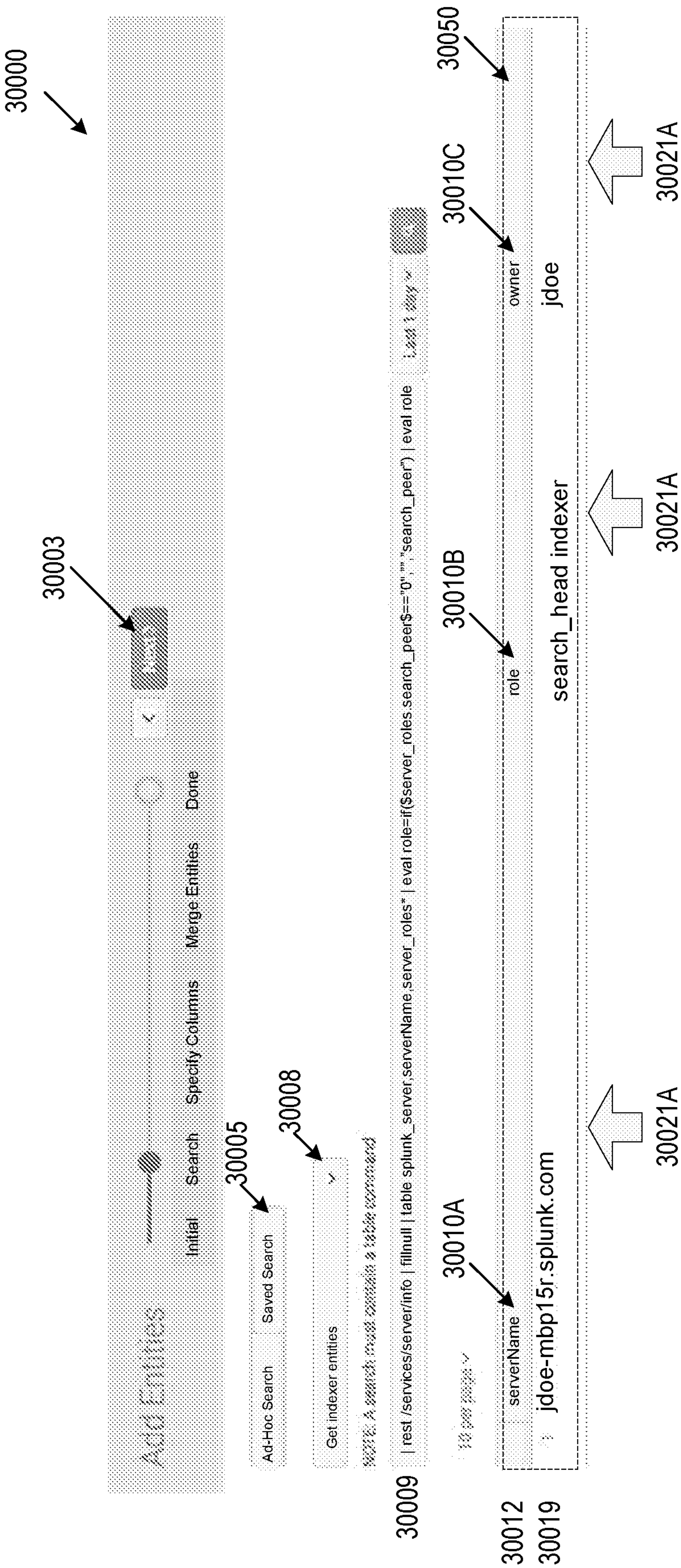
FIG. 10U illustrates an example of a GUI of a service monitoring system that displays a search result set for creating entity definition(s), in accordance with one or more implementations of the present disclosure.

FIG. 10U illustrates an example of a GUI 30000 of a service monitoring system that displays a search result set 30050 for creating entity definition(s), in accordance with one or more implementations of the present disclosure. The saved search button 30005 has been selected, and the saved search "Get indexer entities" has been selected from the list of 30008 (not shown).

In one implementation, when a saved search is selected from the list of 30008, the search language defining the search criteria for the selected save search is displayed in the text box 30009. For example, the search language that defines the "Get indexer entities" saved search is shown displayed in text box 30009. In one implementation, user input can be received via text box 30009 to edit the saved search.

The search language that defines the search query can include a command to output the search result set in a tabular format having one or more rows (row 30012, row 30019) and one or more columns (e.g., columns 30021A-C) for each row. The search language defining the "Get indexer entities" search query can include commands and values that specify the number of columns and the column identifiers for the search result set. For example, the search language in text box 30009 may include "table serverName,role,owner". In one implementation, if the search query definition does not output a table, an error message is displayed.

The "Get indexer entities" saved search searches for events that have the value "indexer" in the field named "role." For example, the search language in text box 30009 may include "search role=indexer". When the "Get indexer entities" search query is performed, GUI 30000 displays a search result set 30050 that is a table having a first entry as the column identifier row 30012, and a second entry as a data row 30019, which represents the one event that has the value "indexer" in the field named "role."

The second entry shown as a data row 30019 has data items "jdoe-mbp15r.sv.splulnk.com", "search_head indexer", and "jdoe" that correspond to the columns. As described above, the command in the search query definition may include "table serverName,role,owner" and the column identifier row 30012 can include serverName 30010A, role 30010B, and owner 30010C as column identifiers. The entries and data items in the search result set 30050 can be imported into a user-interactive table for creating entity definitions, as described below. GUI 3000 includes a next button 30003, which when selected, displays GUI 31000 in FIG. 10V that translates the entries and data items in the search result set 30050 into a table for creating entity definitions.

Figure 10V:
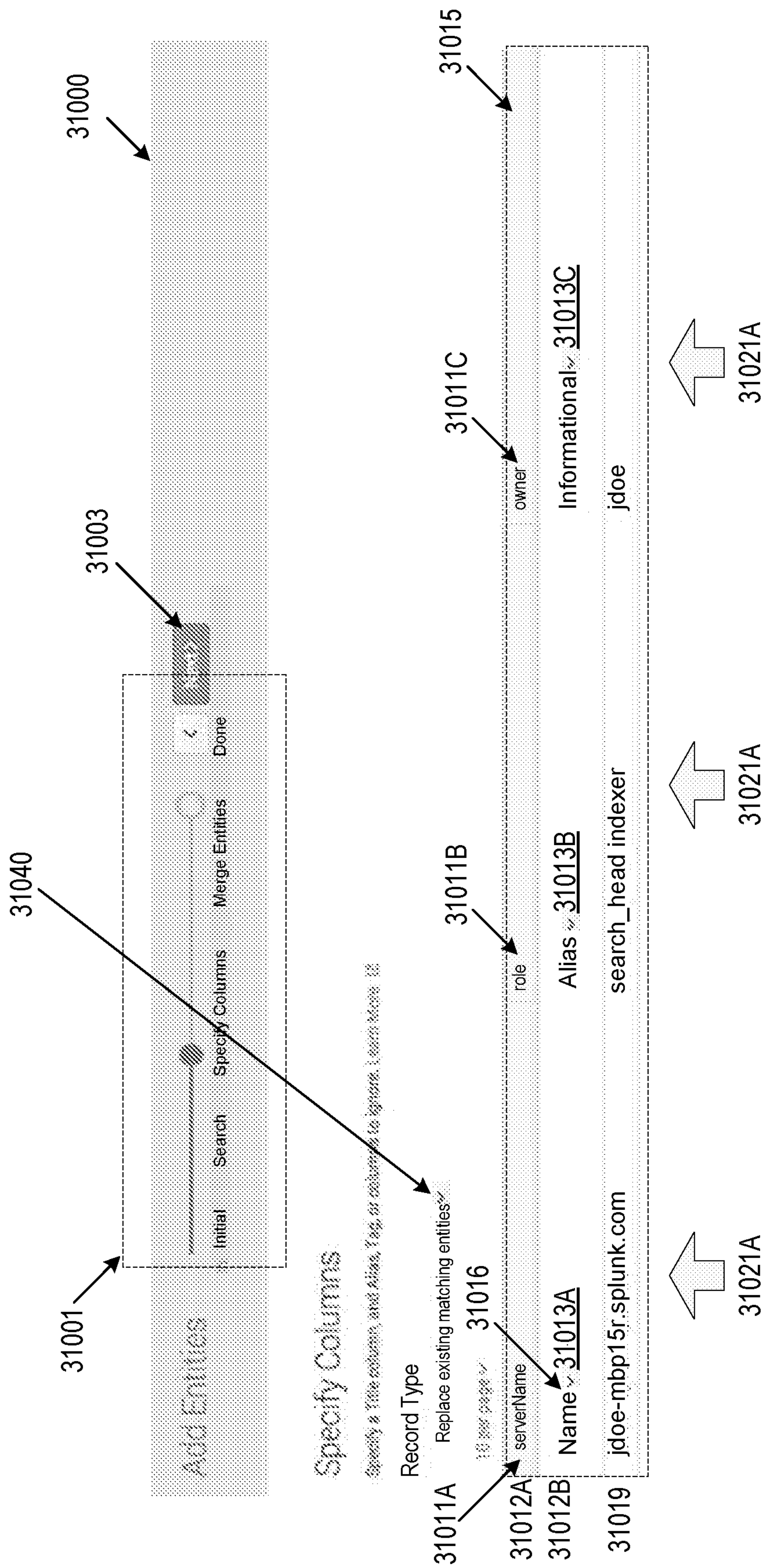
FIG. 10V illustrates an example of a of a service monitoring system that displays a table for facilitating user input for creating entity definition(s) using a search result set, in accordance with one or more implementations of the present disclosure.

FIG. 10V illustrates an example of a GUI 31000 of a service monitoring system that displays a table 31015 for facilitating user input for creating entity definition(s) using a search result set, in accordance with one or more implementations of the present disclosure. GUI 31000 can include a status bar 31001 that is updated to display an indicator (e.g., shaded circle) corresponding to the current stage (e.g., specify column stage).

GUI 31000 can facilitate user input for creating one or more entity definition records using the data items from a search result set (e.g., search result set 30050 in FIG. 10U). Entity definition records are stored in a data store. The entity definition records that are created as a result of user input that is received via GUI 31000 can replace any existing entity definition records in the data store, can be added as new entity definition records to the data store, and/or can be combined with any existing entity definition records in the data store. The type of entity definition records that are to be created can be based on user input. GUI 31000 can include a button 31040, which when selected, can display a list of record type options, as described above in conjunction with button 19001 in FIG. 10J.

Referring to FIG. 10V, GUI 31000 can display a table 31015 that has automatically been populated with data items that have been imported from a search result set (e.g., search result set 30050 in FIG. 10U). Table 310015 includes columns 31021A-C, a column identifier row 31012A containing element names 31011A-C for the columns 31021A-C, and another column identifier row 31012B containing component types 31013A-C for the columns 31021A-C.

The data items (e.g., "serverName" 30010A, "role" 30010B, "user" 26005, and "owner" 30010C in FIG. 10U) of the first entry (e.g., first entry in row 30012 in FIG. 10U) can automatically be imported as the element names 31011 A-C into the column identifier row 31012A in the table 31015. The placement of the data items (e.g., "serverName", "role", and "owner") within the column identifier row 31012A is based on the matching of ordinal positions of the element names 31011A-C within the column identifier row 31012A to the ordinal positions of the data items within the first entry (e.g., first entry in row 30012 in FIG. 10U) of the search result set.

The data items of the subsequent entries (e.g., second entry in row 30019 in FIG. 10U) in the search result set can automatically be imported into the table 31015. The placement of the data items of the subsequent entries into a particular row in the table 31015 can be based on the matching of ordinal positions of the data rows 31019 within the table 31015 to the ordinal positions of the entries within the search result set. The placement of the data items into a particular column within the table 31015 can be based on the matching of the ordinal positions of the columns 31021A-D within the table 31015 to the ordinal positions of the data items within a particular entry in the search result set.

User input designating the entity definition component types 31013A-C in the table 31015 is received via the GUI. In one implementation, a button 31016 for each column 31021A-C can be selected to display a list of component types to select from, as described above in conjunction with FIG. 10I. The list of component types can include an alias component type, a name component type, an informational field component type, and an import option indicating that the data items in a search result set that correspond to a particular column in the table 18015 should not be imported for creating an entity definition record.

If the next button 31003 has been selected, a GUI for merging entity definition records is displayed, as described in greater detail below in conjunction with FIG. 10W.

Figure 10W:
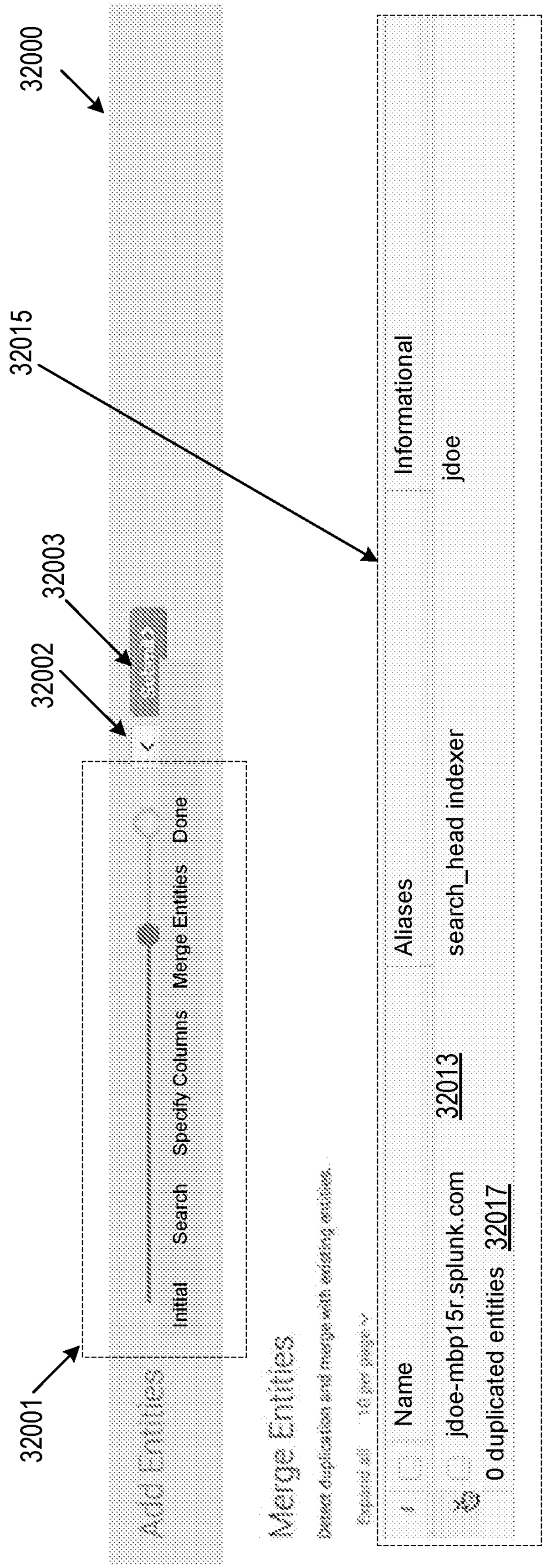
FIG. 10W illustrates an example of a GUI of a service monitoring system for merging entity definition records, in accordance with one or more implementations of the present disclosure.

FIG. 10W illustrates an example of a GUI 32000 of a service monitoring system for merging entity definition records, in accordance with one or more implementations of the present disclosure. GUI 32000 can include a status bar 32001 that is updated to display an indicator (e.g., shaded circle) corresponding to the current stage (e.g., merge entities stage). During the merge entity definition records stage, a determination of whether there would be duplicate entity definition records in the data store is made, and the information related to the determination 32015, including an indicator 32017 of the determination result, are displayed in the GUI 32000. For example, if the append option via a button (e.g., button 31040 in FIG. 10V) was selected to add any newly created entity definition records to the data store, the result of the prospective addition may or may not be that multiple entity definition records by the same name would exist in the data store (i.e., multiple entity definition records would have the same element value for the name component). For example, the displayed information related to the determination 32015 includes an indicator 32017 indicating that there would be no duplicated entity definition records having the element name "jdoe-mbp15r.splunk.com" 32013 as the name component in the records.

If a user does not wish to import the entity definition records into the data store, the previous 32002 button can be selected to display the previous GUI (e.g., GUI 31000 in FIG. 10V) and the user may edit the configuration (e.g., record type, component type, etc.) of the import. If a user wishes to import the entity definition records into the data store, the submit 32003 button can be selected to import the entity definition records into the data store. If the submit 32003 button is selected, GUI 33000 in FIG. 10X can be displayed.

Figure 10X:
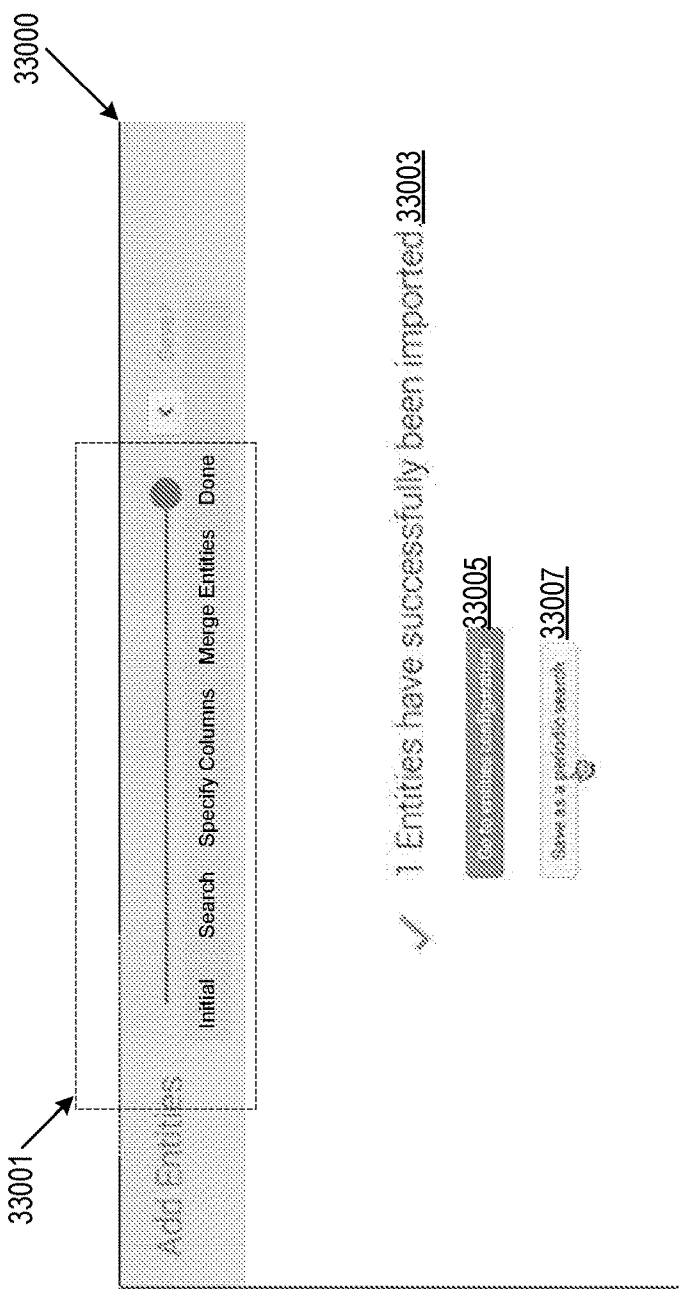
FIG. 10X illustrates an example of a GUI of a service monitoring system for providing information for newly created and/or updated entity definition records, in accordance with one or more implementations of the present disclosure.

FIG. 10X illustrates an example of a GUI 33000 of a service monitoring system for providing information for newly created and/or updated entity definition records, in accordance with one or more implementations of the present disclosure. GUI 33000 can include a status bar 33001 that is updated to display an indicator (e.g., shaded circle) corresponding to the current stage (e.g., completion stage).

GUI 33000 can include information 33003 pertaining to the entity definition records that have been imported into the data store. The information 33003 can include the number of records that have been imported. In one implementation, the information 33003 includes the type (e.g., replace, append, combine) of import that has been made. If button 33005 is selected, GUI 33000 for editing the entity definition records can be displayed, as described above in conjunction with FIG. 10P.

Referring to FIG. 10X, the search query (e.g., search query defined in GUI 30000 in FIG. 10U) that was used to produce the search result set for importing entity definition record(s) in to the data store may be executed periodically. The search result set may differ from when the search query was previously run. A user (e.g., business analyst) may wish to execute another import using the new search result set that is produced from another execution of the search query. The configuration (e.g., selected component types, selected type of import, etc.) of the current import that was executed using the search query can be saved for future execution.

Figure 10Y:
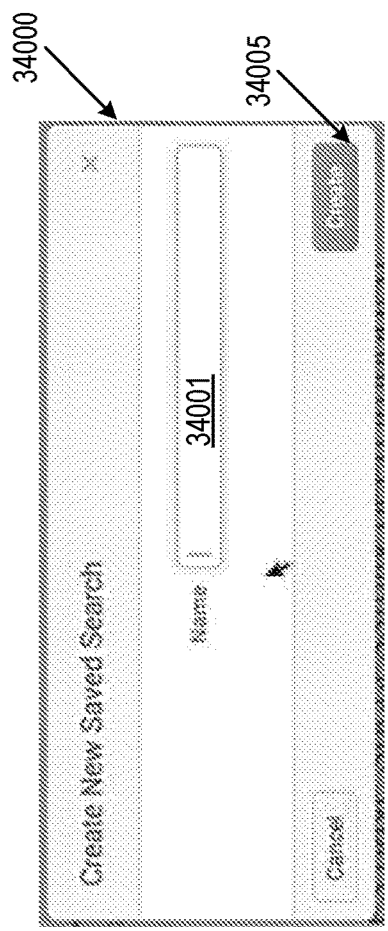
FIG. 10Y illustrates an example of a GUI of a service monitoring system for saving configurations settings of an import, in accordance with one or more implementations of the present disclosure.

If button 33007 is selected, GUI 34000 in FIG. 10Y can be displayed to save the configuration of the current import that was executed using a search query as a saved search. The saved search can be used for future imports using contemporaneous versions of the search result set that is produced by the saved search.

FIG. 10Y illustrates an example of a GUI 34000 of a service monitoring system for saving configurations settings of an import, in accordance with one or more implementations of the present disclosure. The configuration of a current import that was executed using a search query (e.g., search query defined in GUI 30000 in FIG. 10U) can be saved as a saved search that can be used for future imports using new versions of the search result set that may be produced by executing the saved search. When a saved search is created for a search query, the search query will be executed periodically and the search result set that is produced can be monitored for changes. If the search result set has changes, an import can be automatically executed using the configuration (e.g., selected component types, selected type of import, etc.) of the saved search that was saved for the search query.

A user (e.g., business analyst) can provide a name 34001 for the saved search. When the create 34005 button is selected, a saved search GUI is displayed for setting the parameters for the saved search, as described in greater detail below in conjunction with FIG. 10Z.

Figure 10Z:
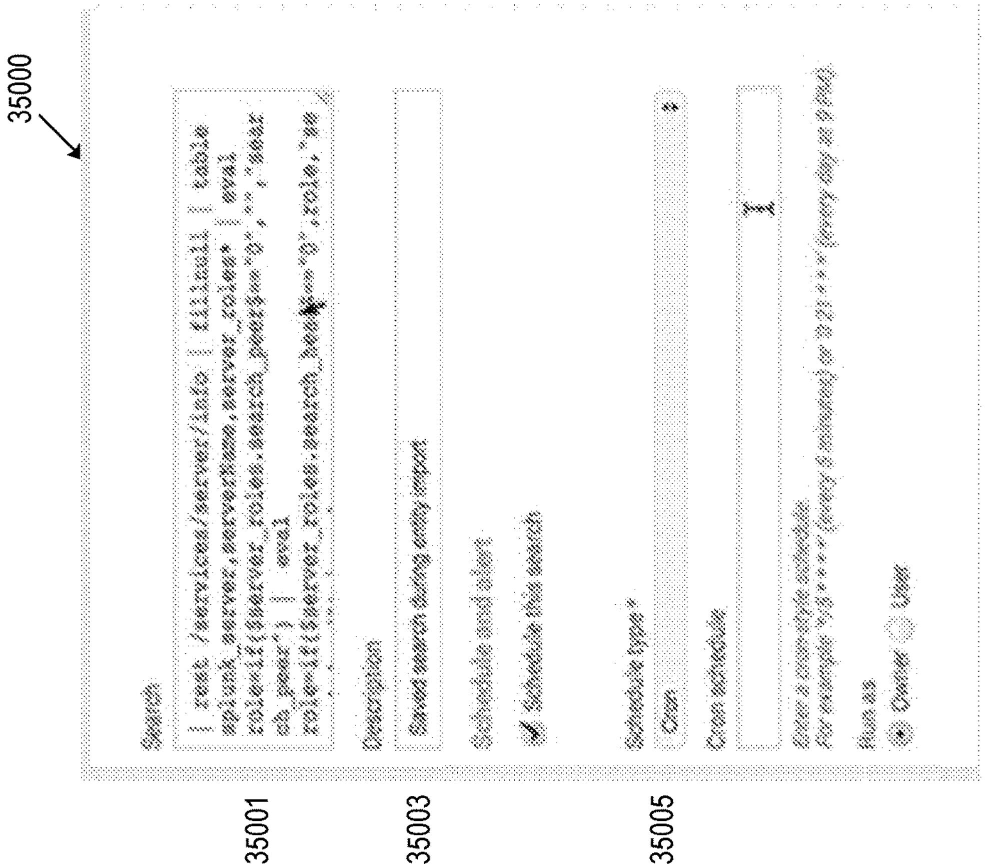
FIG. 10Z illustrates and example GUI of a service monitoring system for setting the parameters for a saved search, in accordance with one or more implementations of the present disclosure.
Figure 10A:
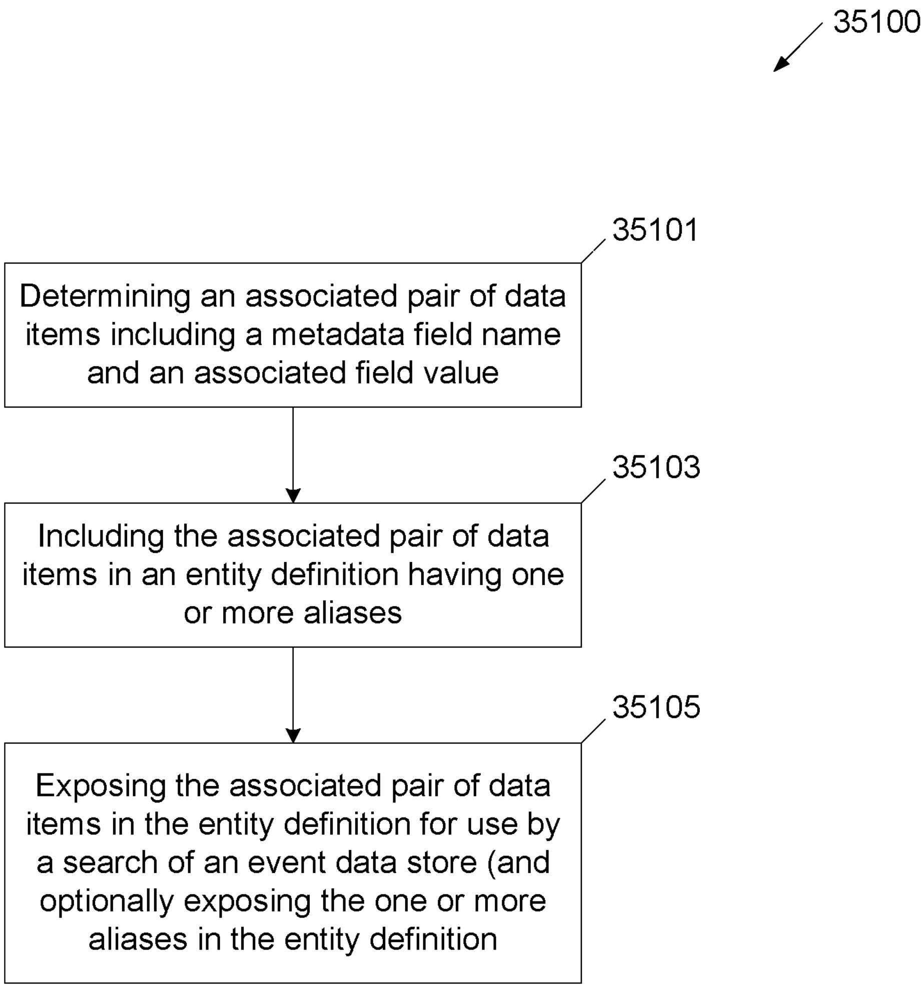
Figure 10A:
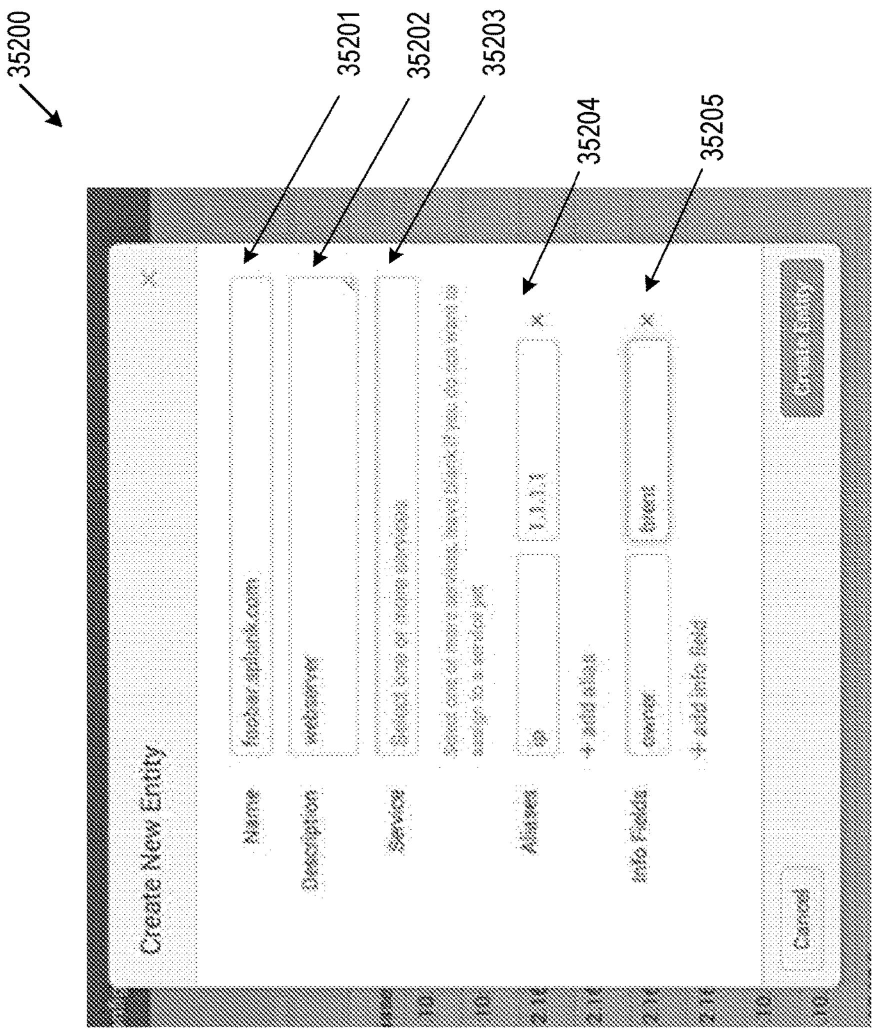
Figure 10A:
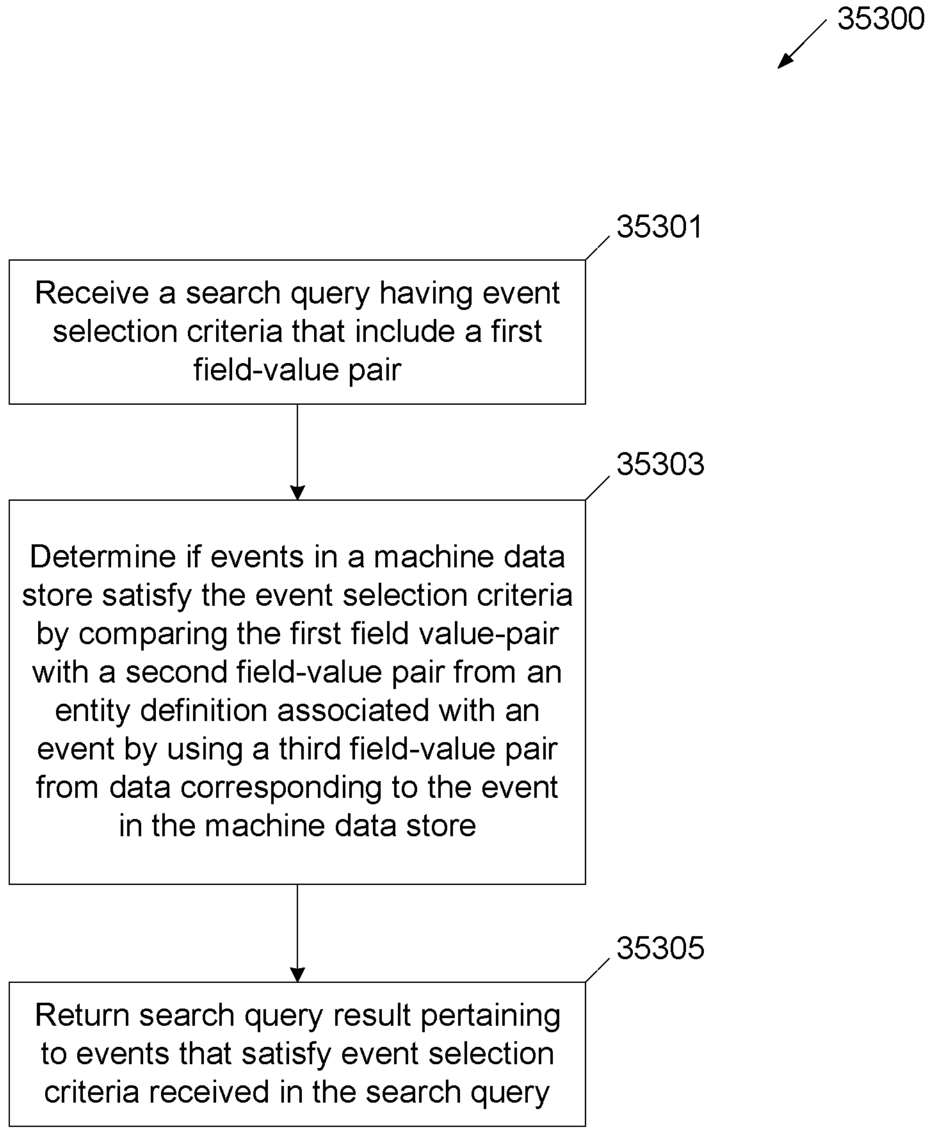
Figure 10A:
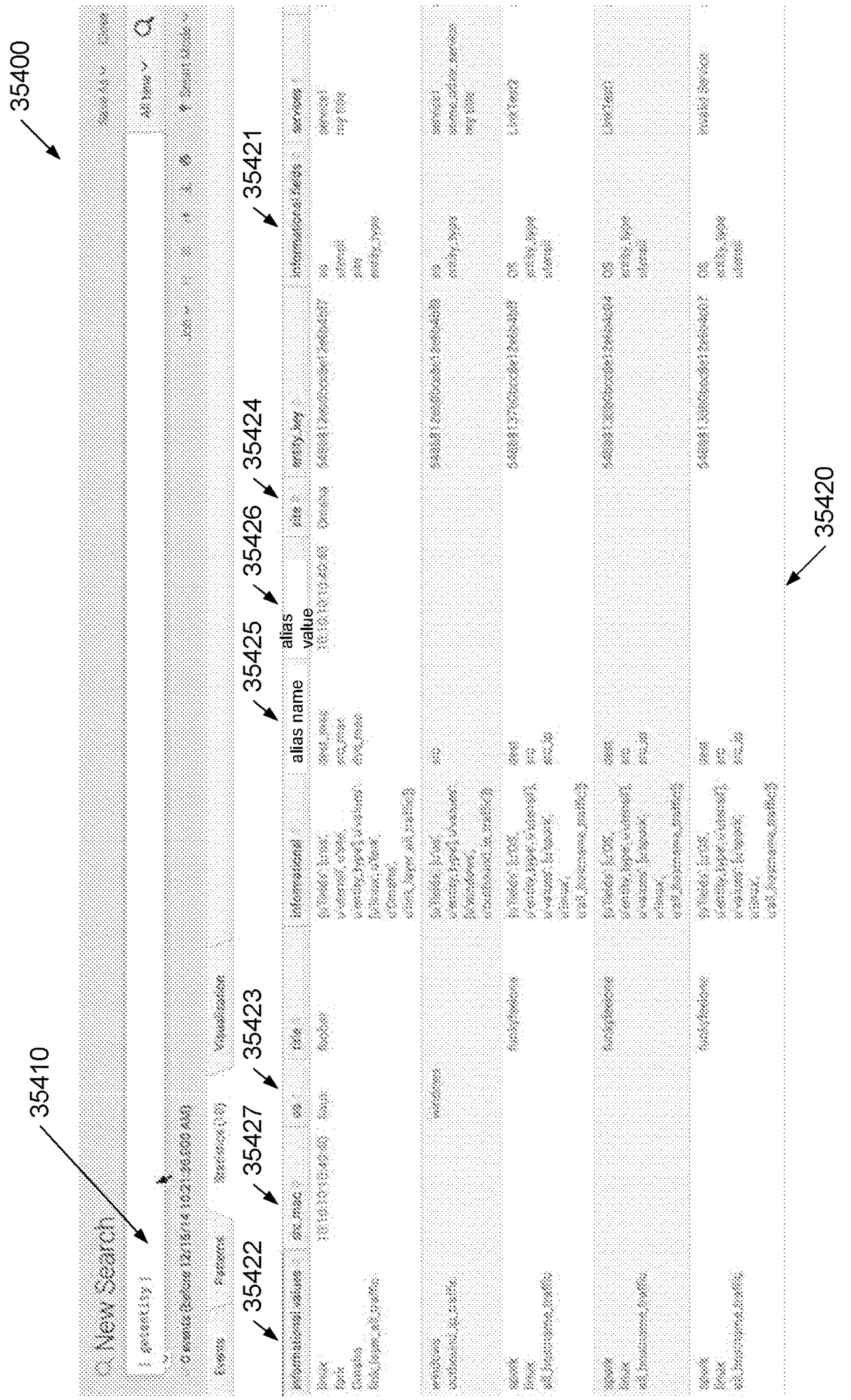
Figure 10A:
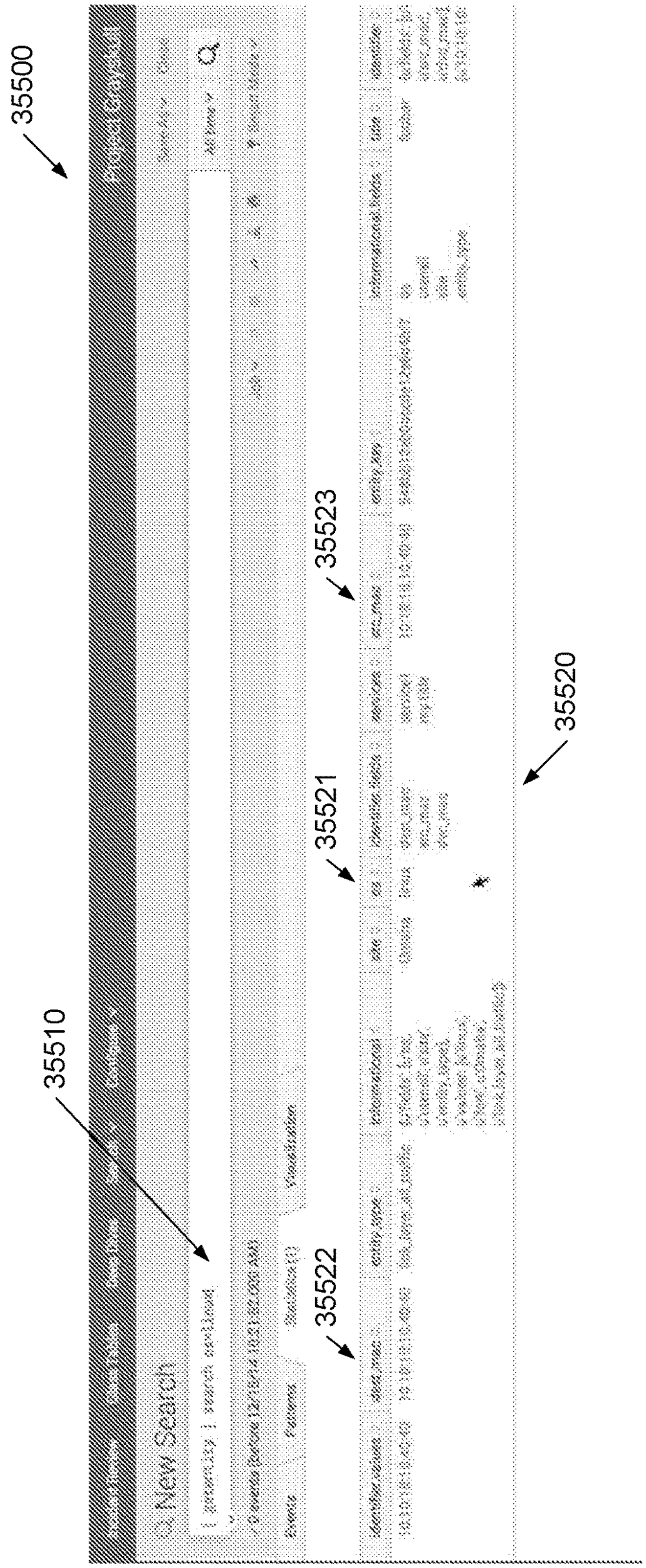

FIG. 10Z illustrates and example GUI 35000 of a service monitoring system for setting the parameters of a saved search, in accordance with one or more implementations of the present disclosure. GUI 35000 can automatically be populated with the configuration of the current import that is to be saved. For example, GUI 35000 displays parameters from the current import, such as the definition of the search query 35001. The search query definition 35001 can include the (1) search language for the search query (e.g., search language in text box 30009 in FIG. 10U) and (2) and commands for creating entity definition records and storing the entity definition records. The commands can automatically be generated based on the user input received via the GUIs in FIGS. 10S-10W and included in the search query definition 35001. In one implementation, the commands are appended to the search language for the search query. For example, the commands "store_entities title_field=serverName identifier_fields=serverName informational_fields=owner insertion_mode=APPEND" can be automatically generated based on the user input received via the GUIs in FIGS. 10S-10W and included in the search query definition 35001.

User input can be received via text box 35003 for a description of the saved search that is being created. User input can be received via a list 35005 for the type of schedule to use for executing the search query. The list 35005 can include a Cron schedule type and a basic schedule type. For example, if the basic schedule type is selected, user input may be received specifying that the search query should be performed every day, or, if the Cron schedule type is selected, user input may be received specifying scheduling information in a format compatible with an operating system job scheduler.

The search result set that is produced by executing the search query can be monitored for changes. In one implementation, a change is when new data is found in the search result set. In another implementation, a change is when data has been removed from the search result set. In one implementation, a change includes data being added to the search result set or data being removed from the search result set.

In one implementation, when a change is identified in the search result set, new entity definition records that reflect the change can be imported into the data store. Depending on the import type that has been saved in the search query definition 35001, the new entity definition records can automatically replace, append, or be combined with existing entity definition records in the data store. For example, the append option may have been saved in the search query definition 35001 and will be used for imports that occur when the search result set has changed. In one implementation, when a change has been detected in the search result set, new entity definition records will automatically be appended (e.g., added) to the data store. In one implementation, when a change has been detected in the search result set that pertains to data being removed from the search result set, the import of the new entity definition records, which reflect the removed data, into the data store does not occur automatically.

Informational Fields

As discussed above, an event processing system (e.g., event processing system 205 in FIG. 2) may include a machine data store that stores machine data represented as machine data events. An entity definition of an entity providing one or more services may include information for associating a subset of the machine data events in the machine data store with that entity. An entity definition of an entity specifies one or more characteristics of the entity such as a name, one or more aliases for the entity, one or more informational fields for the entity, one or more services associated with the entity, and other information pertaining to the entity. An informational field is an entity definition component for storing user-defined metadata for a corresponding entity, which includes information about the entity that may not be reliably present in, or may be absent altogether from, the machine data events.

FIG. 10AA is a flow diagram of an implementation of a method for creating an informational field and adding the informational field to an entity definition, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, the method 35100 is performed by a client computing machine. In another implementation, the method 35100 is performed by a server computing machine coupled to the client computing machine over one or more networks.

At block 35101, the computing machine creates an associated pair of data items. In one embodiment, the associated pair of data items may include a key representing a metadata field name and a value representing a metadata value for the metadata field. At block 35103, the computing machine adds the associated pair of data items to an entity definition for a corresponding entity. In one embodiment, the entity definition is stored in a service monitoring data store, separate from a machine data store. The associated pair of the metadata field name and value can be added to the entity definition as an entity definition component type "informational field." The metadata data field name can represent an element name of the informational field (also referred to as "info field"), and the metadata field value can represent an element value of the informational field. Some other components of the entity definition may include the entity name, one or more aliases of the entity, and one or more services provided by the entity, as shown in FIG. 10B. The metadata field and metadata value may be added to the informational field component of the entity definition based on user input to provide additional information about the entity that may be useful in searches of an event store including machine data events pertaining to the entity, in searches for entities or entity definitions, in information visualizations or other actions. For example, the entity definition may be created for a particular server machine, and the informational field may be added to specify an operating system of that server machine (e.g., the metadata field name of "operating system," and the metadata field value of "Linux"), which may not be part of machine data events pertaining to the entity represented by the entity definition.

At block 35105, the computing machine exposes the added informational field for use by a search query. In one embodiment, entity aliases may be exposed for use by a search query as part of the same process. S In one embodiment, exposing the added informational field (or alias) for use by a search query includes modifying an API to, for example, support a behavior for specifically retrieving the field name, the field value, or both of the information field (or alias). In one embodiment, exposing the added informational field (or alias) for use by a search query includes storing the informational field (or alias) information at a particular logical location within an entity definition, such as an information field (or alias) component. In such a case, certain processing of blocks 35103 and 35105 may be accomplished by a single action.

In one implementation, an alias can include a key-value pair comprised of an alias name and an alias value. Some examples of the alias name can include an identifier (ID) number, a hostname an IP (internet protocol) address, etc. A service definition of a service provided by the entity specifies an entity definition of the entity, and when a search of the machine data store is performed, for example, to obtain information pertaining to performance characteristics of the service, an exposed alias from the entity definition can be used by the search to arrive at those machine data events in the machine data store that are associated with the entity providing the service. Furthermore, storing the informational field in the entity definition together with the aliases can expose the pair of data items that make up the informational field for use by the search to attribute the metadata field and metadata value to each machine data event associated with the entity providing the service. In one example, a search for information pertaining to performance characteristics of a service provided by multiple entities (e.g., multiple virtual machines), may use the information field name and value to further filter the search result. For example, by including an additional criterion of "os=linux" (where "os" is the metadata field name and "linux" is the metadata value of the information field) in a search query, a search result may only include performance characteristics of those virtual machines of the service that run the Linux® guest operating system.

In one implementation, the informational field can be used to search for specific entities or entity definitions. For example, a user can submit a search query including a criterion of "os=linux" to find entity definitions of entities running the Linux operating system, as will be discussed in more detail below in conjunction with FIGS. 10AD and 10AE.

FIG. 10AB illustrates an example of a GUI 35200 facilitating user input for creating an informational field and adding the informational field to an entity definition, in accordance with one or more implementations of the present disclosure. For example, GUI 35200 can include multiple GUI fields 35201-35205 for creating an entity definition, as discussed above in conjunction with FIG. 6. In one implementation, name GUI field 35201 may receive user input of an identifying name for referencing the entity definition for an entity (e.g., "foobar.splunk.com"). Description GUI field 35202 may receive user input of information that describes the entity, such as what type of machine it is, what the purpose of the machine is, etc. In the illustrated example, the description of "webserver" has been entered into description GUI field 35202 to indicate that the entity named "foobar.splunk.com" is a webserver. Service GUI field 35203 may receive user input of one or more services of which the entity is a part. In one implementation, service GUI field 35203 is optional and may be left black if the user does not which to assign the entity to a service. Additional details related to the association of entities with services are provided below with respect to FIG. 11. Aliases GUI fields 35204 may receive user input of an alias name-value pair. Each machine data event pertaining to the entity can include one or more aliases that denote additional ways to reference the entity, aside from the entity name. In one implementation, the alias can include a key-value pair comprised of an alias name and an alias value. GUI 35200 may allow a user to provide multiple aliases for the entity.

Info Fields GUI fields 35205 may receive user input of an information field name-value pair. The informational field name-value pair may be added to the entity definition to store user-defined metadata for the entity, which includes information about the entity that may not be reliably not present in, or may be absent altogether from, the machine data events pertaining to that entity. The informational field name-value pair may include data about the entity that may be useful in searches of an event store including machine data events pertaining to the entity, in searches for entities or entity definitions, in information visualizations or other actions. GUI 35200 can allow a user to add multiple informational fields for the entity.

Upon entering the above characteristics of the entity, the user can request that the entity definition be created (e.g., by selecting the "Create Entity" button). In response, the entity definition is created using, for example, the structure described above in conjunction with FIG. 10B.

FIG. 10AC is a flow diagram of an implementation of a method for filtering events using informational field-value data, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, the method 35300 is performed by a client computing machine. In another implementation, the method 35300 is performed by a server computing machine coupled to the client computing machine over one or more networks.

At block 35301, the computing machine receives a search query for selecting events from the machine data store that satisfy one or more event selection criteria of the search query. The event selection criteria include a first field-value pair. The first field-value pair may include a name of a specific entity characteristic (e.g., "OS," "owner," etc.) and a value of a specific entity characteristic (e.g., "Linux," "Brent," etc.). In one implementation, the event selection criteria may be part of a search query entered by a user in a search field provided in a user interface.

At block 35303, the computing machine performs the search query to determine if events in a machine data store satisfy the event selection criteria in the search query including the first field-value pair. Determining whether one of the events satisfies the event selection criteria can involve comparing the first field-value pair of the event selection criteria with a second field-value pair from an entity definition associated with the event by using a third field-value pair from data corresponding to the event in the machine data store. In particular, in one implementation, an entity definition is located that has the second field-value pair matching the first field-value pair from the search criteria. The second field-value pair may include a metadata field name and metadata value that match the query field name and query value, respectively. In one implementation, the metadata field name and metadata value may be an informational field that was added to the entity definition as described above with respect to FIGS. 10AA-10AB. The identified entity definition may include a third field-value pair (e.g., an alias) that includes an alias name and alias value. This third field-value pair denotes an additional way to reference the entity, using data found in event records pertaining to the entity. Using this alias, the events in the machine data store that correspond to the entity definition can be identified, and the informational field (the second field-value pair) can be attributed to those events, indicating that those events satisfy at least a part of the event selection criteria that includes the first field-value pair. If the event selection criteria includes at least one other event selection criterion, a further determination can be made as to whether the above events satisfy the at least one other event selection criteria.

At block 35305, the computing machine returns a search query result pertaining to events that satisfy the event selection criteria received in the search query. For example, the search result can include at least portions of the events that satisfy the event selection, the number of the events that satisfy the event selection criteria (e.g., 0, 1, . . . 100, etc.), or any other pertinent data.

Referring again to FIG. 10AB, an entity definition includes an alias 35204 and info field 35205. Referring now again to FIG. 10AC, if a search query is submitted with an event selection criteria including "owner=brent" (a first field-value pair), a data store including various entity definitions is searched to find at least one entity definition having an information field (a second field-value pair) that matches the first field-value pair of "owner=brent." As a result, entity definition 35201 is located and alias 35204 (a third field-value pair) is obtained and used to arrive at events in the machine data store that include a value matching "1.1.1.1" in the field named "ip." Those events satisfy at least a part of the event selection criteria that includes the first field-value pair. Alternate orders for satisfying individual search criteria during a search are possible.

In some implementations, informational fields can also be used to filter entities or entity definitions. In particular, a service monitoring data store can be searched for entities or entity definitions having an informational field that matches one or more search criteria.

FIG. 10AD-10AE illustrate examples of GUIs facilitating user input for filtering entity definitions using informational field-value data, in accordance with one or more implementations of the present disclosure. In FIG. 10AD, GUI 35400 includes a search field 35410. Search field 35410 can receive user input including a search query command (e.g., "getentity" or "getentity generate"). In one implementation, execution of the command identifies one or more entity definitions. The specific "getentity" or "getentity generate" command may return all or a subset of all entity definitions that have been created, without using any specific filtering criteria. Additional filtering may be performed (e.g., using information fields), as shown in FIG. 10AE. A corresponding entry for each entity definition may be displayed in search results region 35420 of GUI 35400. In one implementation, various columns are displayed for each entry in search results region 35420, including for example, informational field names 35421, informational field values 35422, particular informational field names 35423 and 35424, alias names 35425, alias values 35426 and particular alias names 35427. The informational field names column 35421 may include a name or other identifier of the metadata field names associated with the corresponding entity definition (e.g., "os," "utensil," "site," "entity_type"). The informational field values column 35422 may include the metadata values that correspond to the metadata field names associated with the corresponding entity definition (e.g., "linux," "fork," "Omaha," "link_layer_all_traffic"). The particular informational field names columns 35423 and 35424 may include a name or other identifier of one of the metadata field names associated with the corresponding entity definition (e.g., "os" 35423 and "site" 35424). The values in these columns may include the corresponding metadata values (e.g., "linux" and "Omaha," respectively). The alias names column 35425 may include a name or other identifier of the alias field names associated with the corresponding entity definition (e.g., "dest_mac," "src_mac," "dvc_mac"). The alias values column 35426 may include the alias values that correspond to the alias field names associated with the corresponding entity definition (e.g., "10:10:10:10:40:40"). The particular alias name column 35427 may include a name or other identifier of one of the alias field names associated with the corresponding entity definition (e.g., "src_mac") and the values in this columns may include the corresponding alias values (e.g., "10:10:10:10:40:40").

Referring to FIG. 10AE, GUI 35500 also includes a search field 35510. Search field 35510 can receive user input including a search query command (e.g., "getentity" or "getentity generate") as well as selection criteria including a first-field value pair. As described above, execution of the "getentity" or "getentity generate" command" returns all or a subset of all entity definitions that have been created. The inclusion of the selection criteria (e.g., "search os=linux") further filters the results of the "getentity" or "getentity generate" command to limit the returned entity definitions to those having an informational field-value pair that matches the selection criteria. A corresponding entry for each filtered entity definition may be displayed in search results region 35520 of GUI 35500. In one implementation, various columns are displayed for each entry in search results region 35520, including for example, informational field column 35521 and alias columns 35522 and 35523. In the illustrated example, there is only one entry in search results region 35520 indicating that only one entity definition included an informational field-value pair that matched the selection criteria entered in search field 35510. As shown, the entry includes an information field column 25521 named "os" which includes the value of "linux." This metadata field name and metadata value match the query field name and query value (i.e., "os=linux") from the event selection criteria. In the illustrated example, the entry also includes at least two alias columns 35522 and 35523. These alias columns "dest_mac" 35522 and "src_mac" 35523 include alias values (e.g., "10:10:10:10:40:40") that can be used to locate events in a machine data store that satisfy the event selection criteria. By having the information field and aliases stored as part of the entity definition, the informational field values can be associated with the events that are determined to correspond to the entity using an alias. Upon having identified the entity definition, the computing machine can locate and return events from the machine data store that satisfy the event selection criteria. As such, the user can filter events using the information fields.

Embodiments are possible where the entity name (as represented in the entity name component of an entity definition) may be treated as a de facto entity alias. This is useful where the value of the entity name is likely to appear in event data and so, like an alias value, can be used to identify an event with the entity. Accordingly, one of skill recognizes that foregoing teachings about aliases can be sensibly expanded to include entity names.

Figure 11:
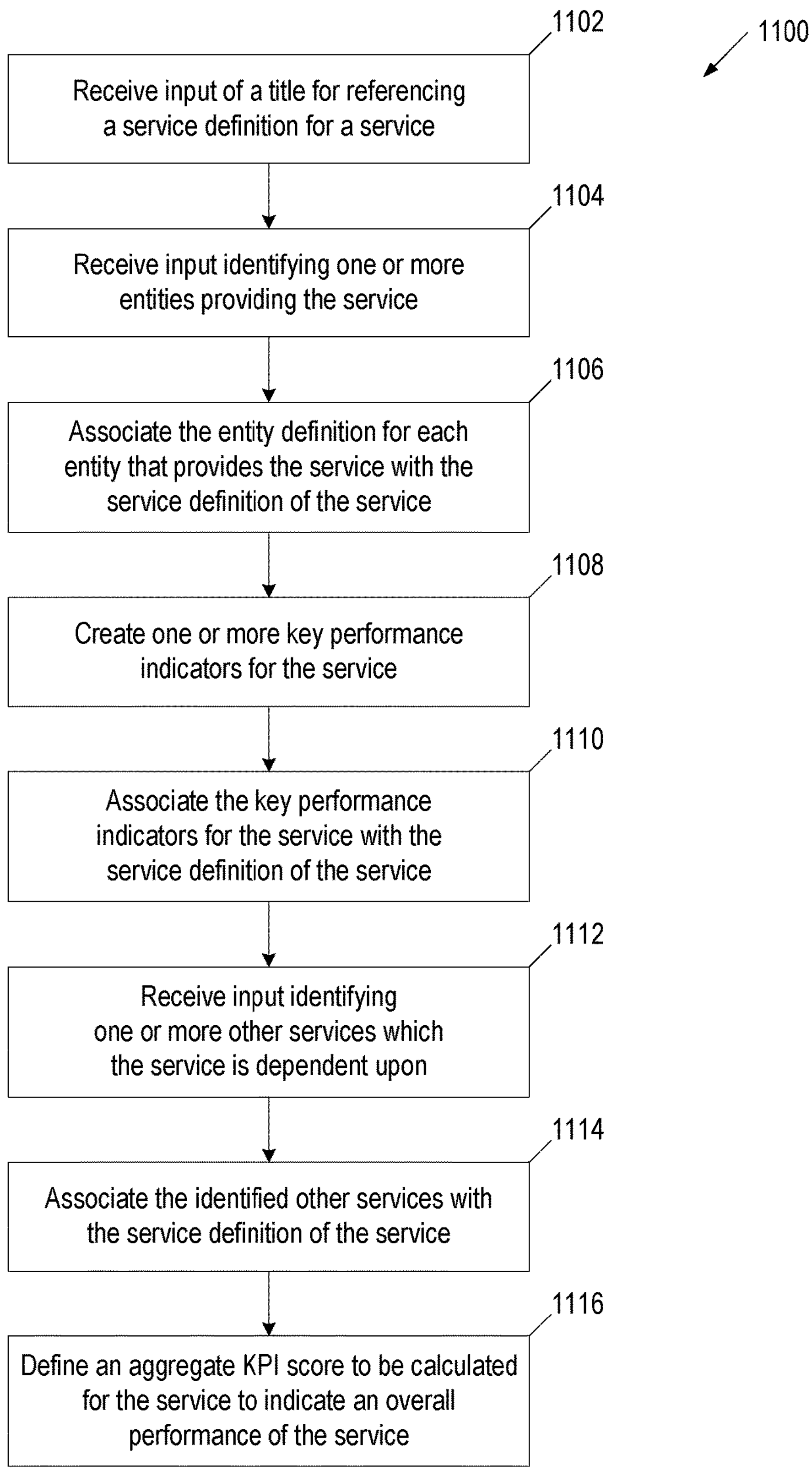
FIG. 11 is a flow diagram of an implementation of a method for creating a service definition for a service, in accordance with one or more implementations of the present disclosure.

FIG. 11 is a flow diagram of an implementation of a method 1100 for creating a service definition for a service, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, at least a portion of method is performed by a client computing machine. In another implementation, at least a portion of method is performed by a server computing machine.

At block 1102, the computing machine receives input of a title for referencing a service definition for a service. At block 1104, the computing machine receives input identifying one or more entities providing the service and associates the identified entities with the service definition of the service at block 1106.

At block 1108, the computing machine creates one or more key performance indicators for the service and associates the key performance indicators with the service definition of the service at block 1110. Some implementations of creating one or more key performance indicators are discussed in greater detail below in conjunction with FIGS. 19-31.

At block 1112, the computing machine receives input identifying one or more other services which the service is dependent upon and associates the identified other services with the service definition of the service at block 1114. The computing machine can include an indication in the service definition that the service is dependent on another service for which a service definition has been created.

At block 1116, the computing machine can optionally define an aggregate KPI score to be calculated for the service to indicate an overall performance of the service. The score can be a value for an aggregate of the KPIs for the service. The aggregate KPI score can be periodically calculated for continuous monitoring of the service. For example, the aggregate KPI score for a service can be updated in real-time (continuously updated until interrupted). In one implementation, the aggregate KPI score for a service is updated periodically (e.g., every second). Some implementations of determining an aggregate KPI score for the service are discussed in greater detail below in conjunction with FIGS. 32-34.

Figure 12:
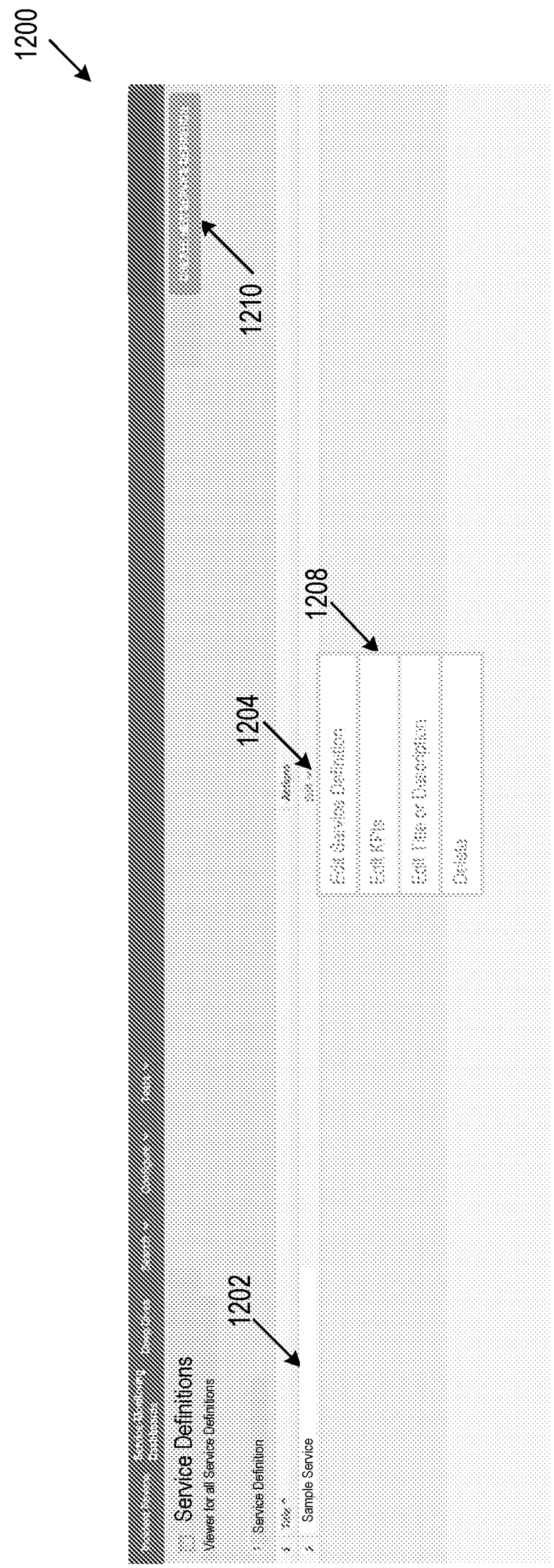
FIG. 12 illustrates an example of a GUI for creating and/or editing service definitions, in accordance with one or more implementations of the present disclosure.

FIG. 12 illustrates an example of a GUI 1200 of a service monitoring system for creating and/or editing service definitions, in accordance with one or more implementations of the present disclosure. GUI 1200 can display a list 1202 of service definitions that have already been created. Each service definition in the list 1202 can include a button 1204 to proceed to a drop-down menu 1208 listing editing options related to the corresponding service definition. Editing options can include editing the service definition, editing one or more KPIs for the service, editing a title and/or description of the service description, and/or deleting the service definition. When an editing option is selected from the drop-down menu 1208, one or more other GUIs can be displayed for editing the service definition. GUI 1200 can include a button 1210 to proceed to the creation of a new service definition.

Figure 13:
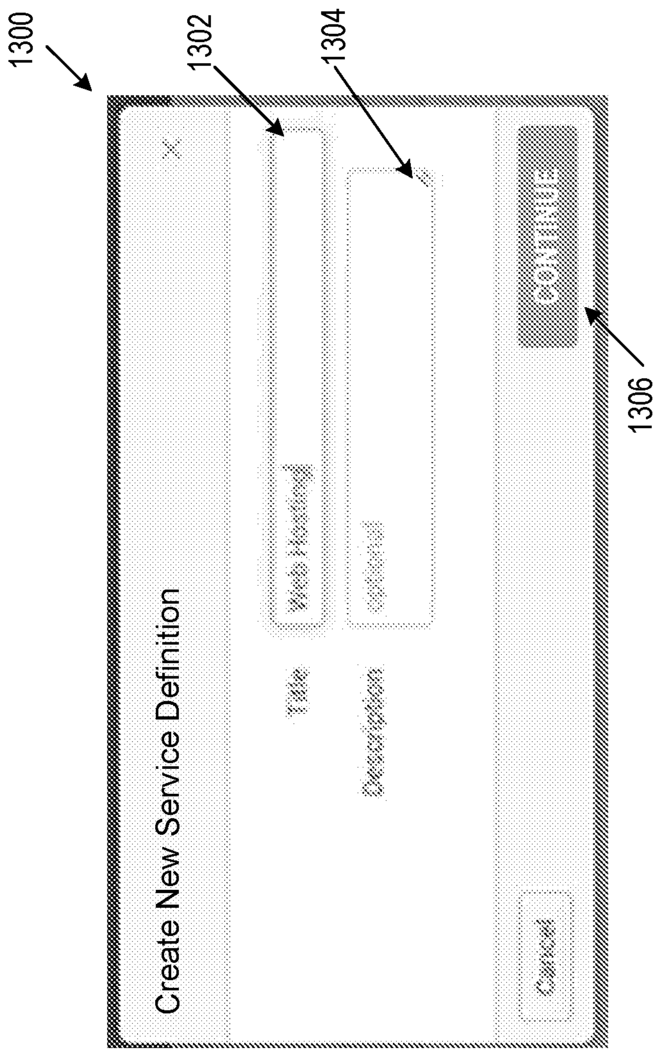
FIG. 13 illustrates an example of a GUI for identifying a service for a service definition, in accordance with one or more implementations of the present disclosure.

FIG. 13 illustrates an example of a GUI 1300 of a service monitoring system for creating a service definition, in accordance with one or more implementations of the present disclosure. GUI 1300 can facilitate user input specifying a title 1302 and optionally a description 1304 for the service definition for a service. GUI 1300 can include a button 1306 to proceed to GUI 1400 of FIG. 14, for associating entities with the service, creating KPIs for the service, and indicating dependencies for the service.

Figure 14:
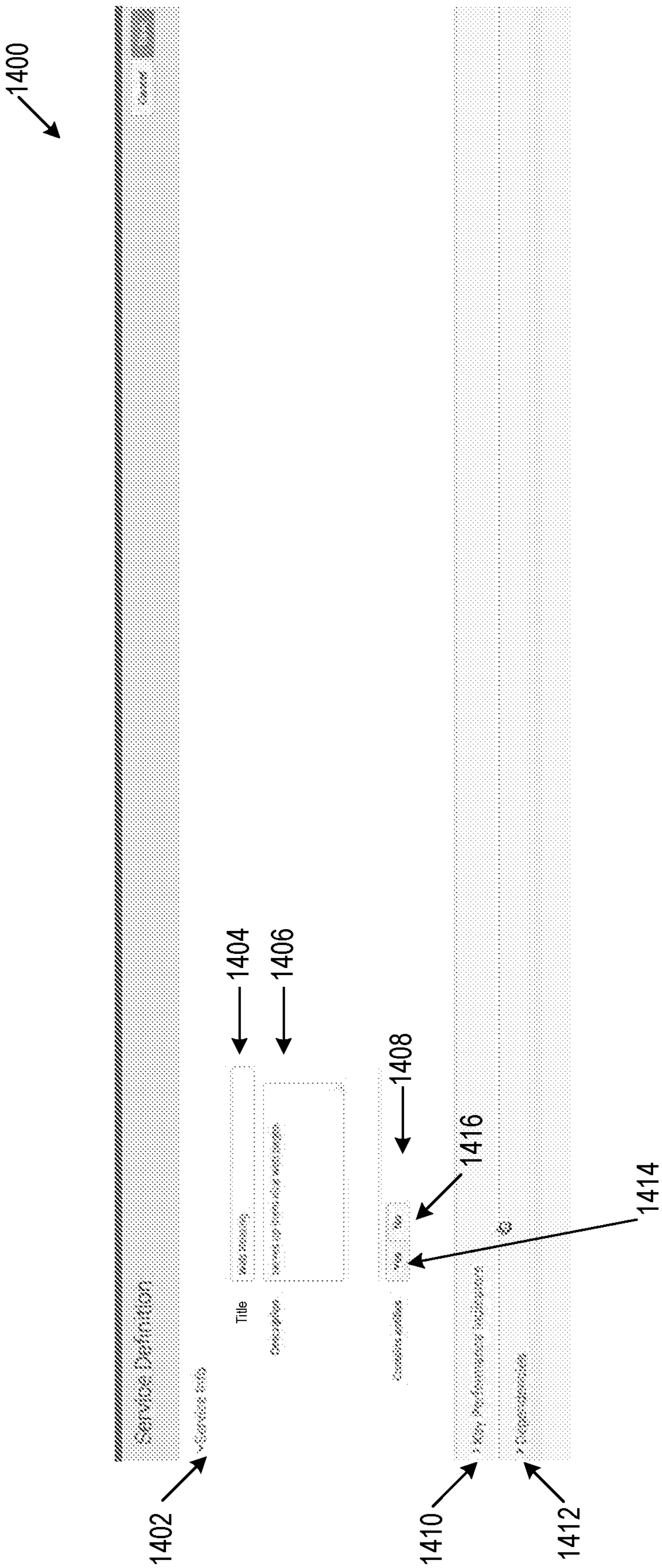
FIG. 14 illustrates an example of a GUI for creating a service definition, in accordance with one or more implementations of the present disclosure.

FIG. 14 illustrates an example of a GUI 1400 of a service monitoring system for defining elements of a service definition, in accordance with one or more implementations of the present disclosure. GUI 1400 can include an accordion pane (accordion section) 1402, which when selected, displays fields for facilitating input for creating and/or editing a title 1404 of a service definition, and input for a description 1406 of the service that corresponds to the service definition. If input for the title 1404 and/or description 1406 was previously received, for example, from GUI 1300 in FIG. 13, GUI 1400 can display the title 1404 and description 1406.

Figure 19:
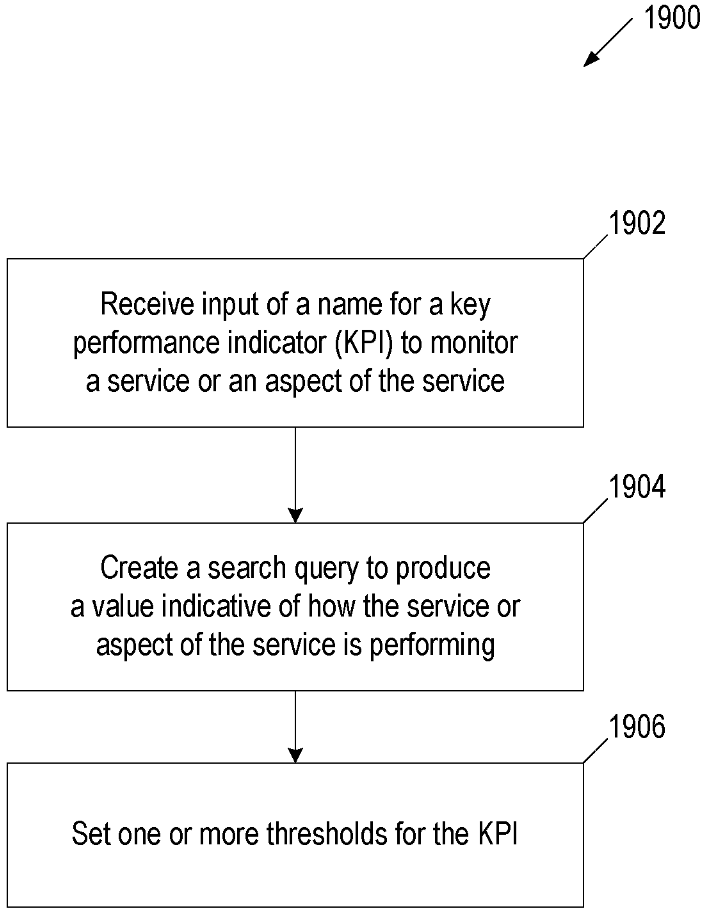
FIG. 19 is a flow diagram of an implementation of a method for creating one or more key performance indicators (KPIs) for a service, in accordance with one or more implementations of the present disclosure.

GUI 1400 can include a drop-down 1410 for receiving input for creating one or more KPIs for the service. If the drop-down 1410 is selected, GUI 1900 in FIG. 19 is displayed as described in greater detail below.

Figure 18:
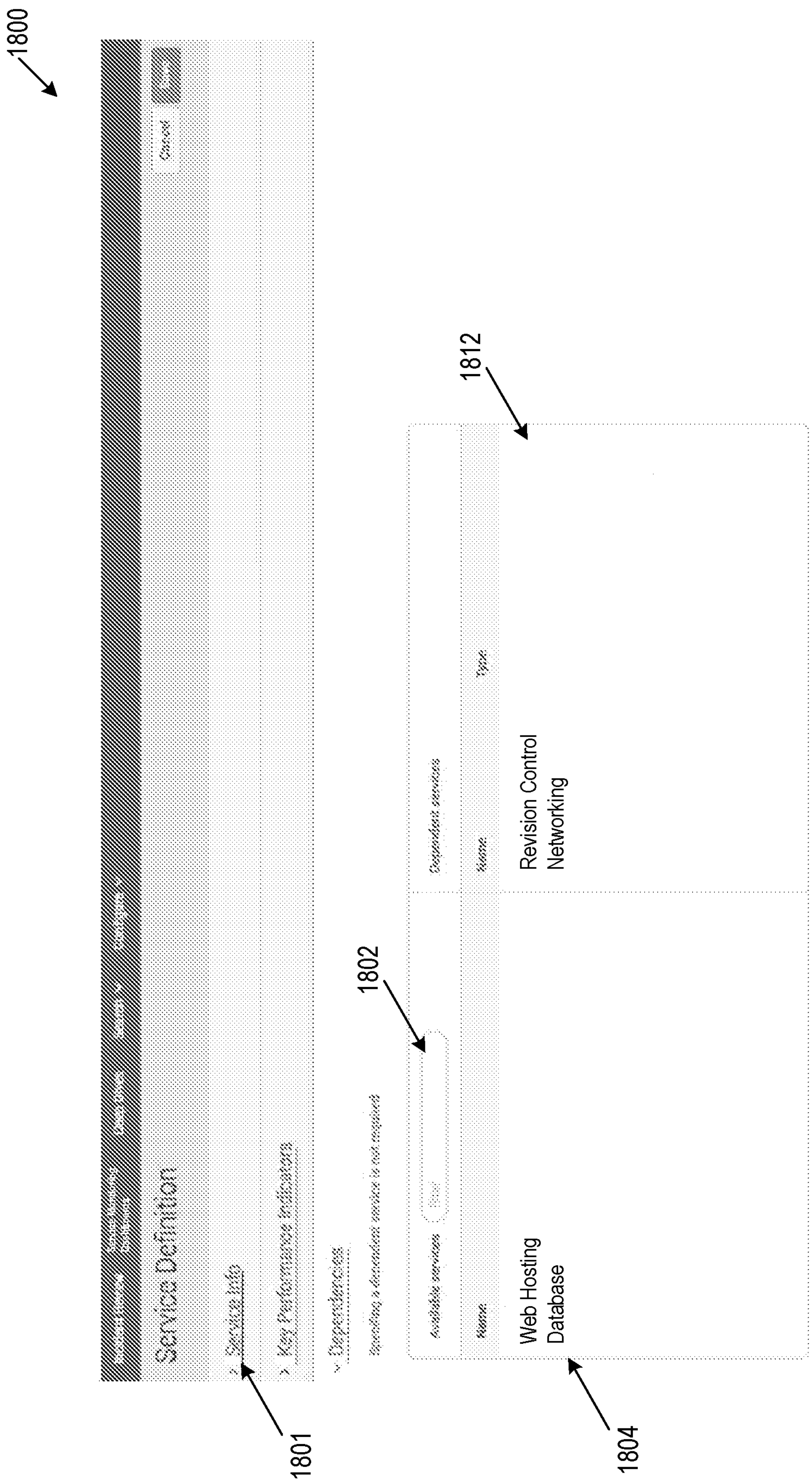
FIG. 18 illustrates an example of a GUI for specifying dependencies for the service, in accordance with one or more implementations of the present disclosure.

GUI 1400 can include a drop-down 1412 for receiving input for specifying dependencies for the service. If the drop-down 1412 is selected, GUI 1800 in FIG. 18 is displayed as described in greater detail below.

GUI 1400 can include one or more buttons 1408 to specify whether entities are associated with the service. A selection of "No" 1416 indicates that the service is not associated with any entities and the service definition is not associated with any entity definitions. For example, a service may not be associated with any entities if an end user intends to use the service and corresponding service definition for testing purposes and/or experimental purposes. In another example, a service may not be associated with any entities if the service is dependent one or more other services, and the service is being monitored via the entities of the one or more other services upon which the service depends upon.

For example, an end user may wish to use a service without entities as a way to track a business service based on the services which the business service depends upon. If "Yes" 1414 is selected, GUI 1500 in FIG. 15 is displayed as described in greater detail below.

Figure 15:
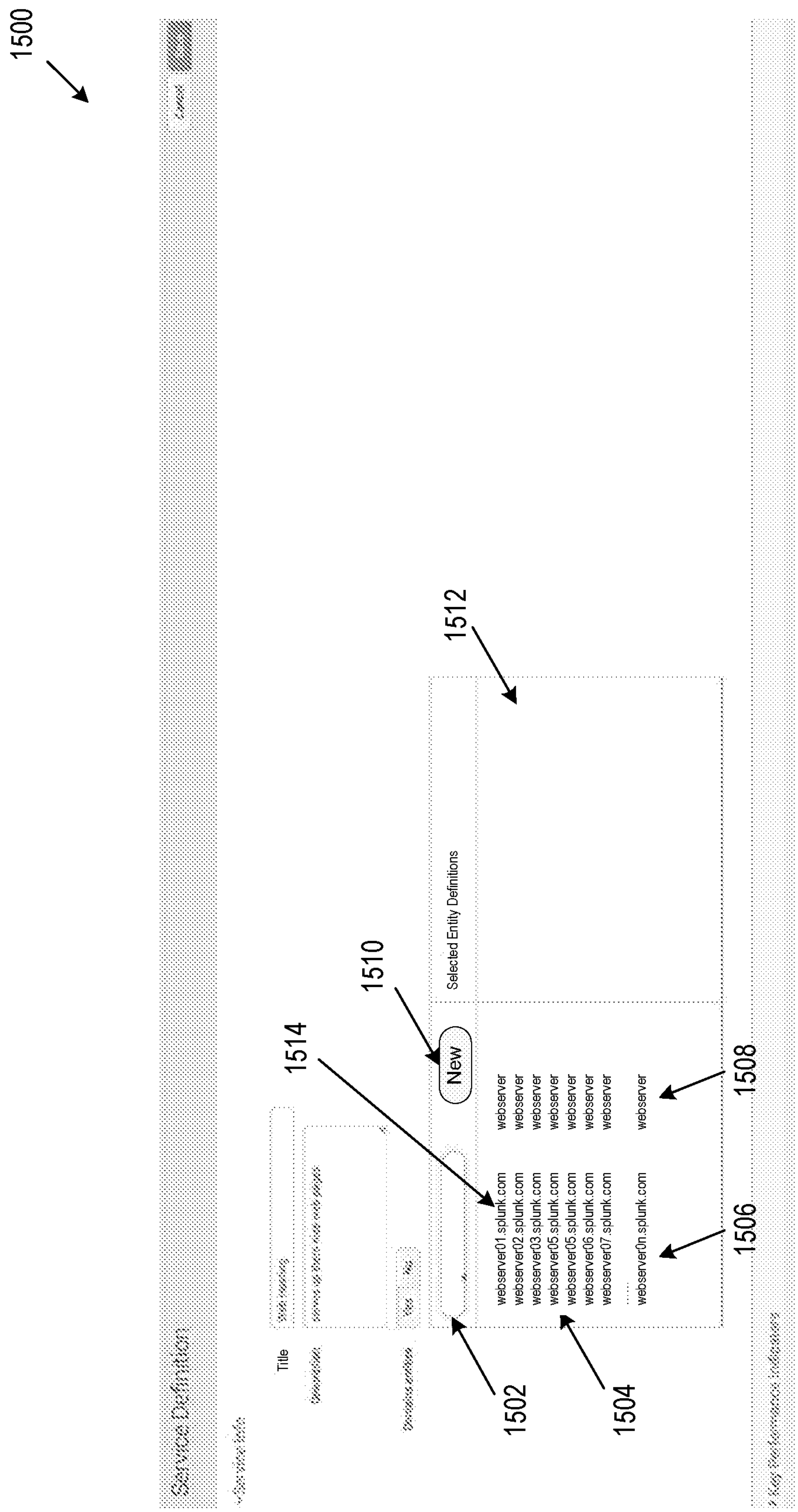
FIG. 15 illustrates an example of a GUI for associating one or more entities with a service by associating one or more entity definitions with a service definition, in accordance with one or more implementations of the present disclosure.

FIG. 15 illustrates an example of a GUI 1500 of a service monitoring system for associating one or more entities with a service by associating one or more entity definitions with a service definition, in accordance with one or more implementations of the present disclosure. GUI 1500 can include a button 1510 for creating a new entity definition. If button 1510 is selected, GUI 1600 in FIG. 16 is displayed facilitating user input for creating an entity definition.

Figure 16:
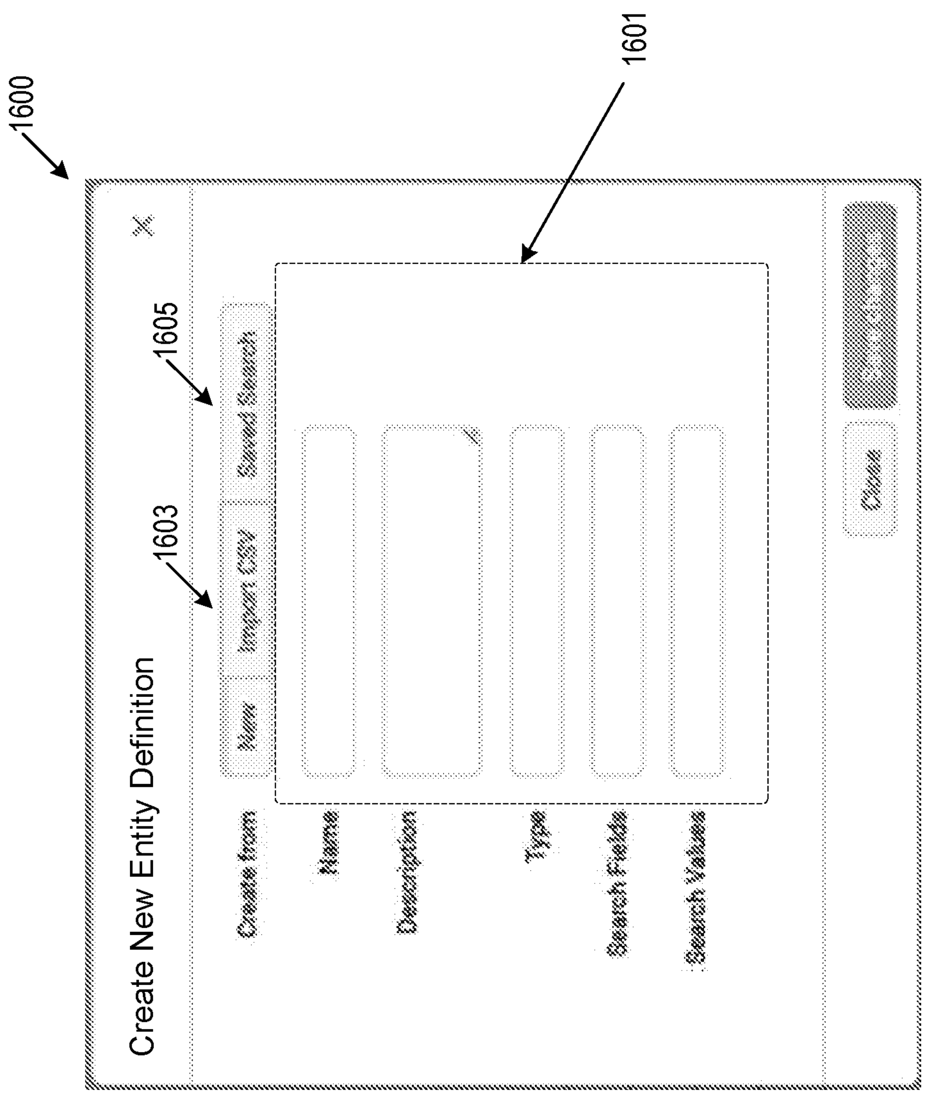
FIG. 16 illustrates an example of a GUI facilitating user input for creating an entity definition, in accordance with one or more implementations of the present disclosure.

FIG. 16 illustrates an example of a GUI 1600 facilitating user input for creating an entity definition, in accordance with one or more implementations of the present disclosure. For example, GUI 1600 can include multiple fields 1601 for creating an entity definition, as discussed above in conjunction with FIG. 6. GUI 1600 can include a button 1603, which when selected can display one or more UIs (e.g., GUIs or command line interface) for importing a data file for creating an entity definition. The data file can be a CSV (comma-separated values) data file that includes information identifying entities in an environment. The data file can be used to automatically create entity definitions for the entities described in the data file. GUI 1600 can include a button 1605, which when selected can display one or more UIs (e.g., GUIs or command line interface) for using a saved search for creating an entity definition. For example, the computing machine can execute a search query from a saved search to extract data to identify an alias for an entity in machine data from one or more sources, and automatically create an entity definition for the entity based on the identified aliases.

Referring to FIG. 15, GUI 1500 can include an availability list 1504 of entity definitions for entities, which can be selected to be associated with the service definition. The availability list 1504 can include one or more entity definitions. For example, the availability list 1504 may include thousands of entity definitions. GUI 1500 can include a filter box 1502 to receive input for filtering the availability list 1504 of entity definitions to display a portion of the entity definitions. Each entity definition in the availability list 1502 can include the entity definition name 1506 and the entity type 1508. GUI 1500 can facilitate user input for selecting an entity definition from the availability list 1504 and dragging the selected entity definition to a selected list 1512 to indicate that the entity for the selected entity definition is associated with service of the service definition. For example, entity definition 1514 (e.g., webserver01.splunk.com) can be selected and dragged to the selected list 1512.

Figure 17A:
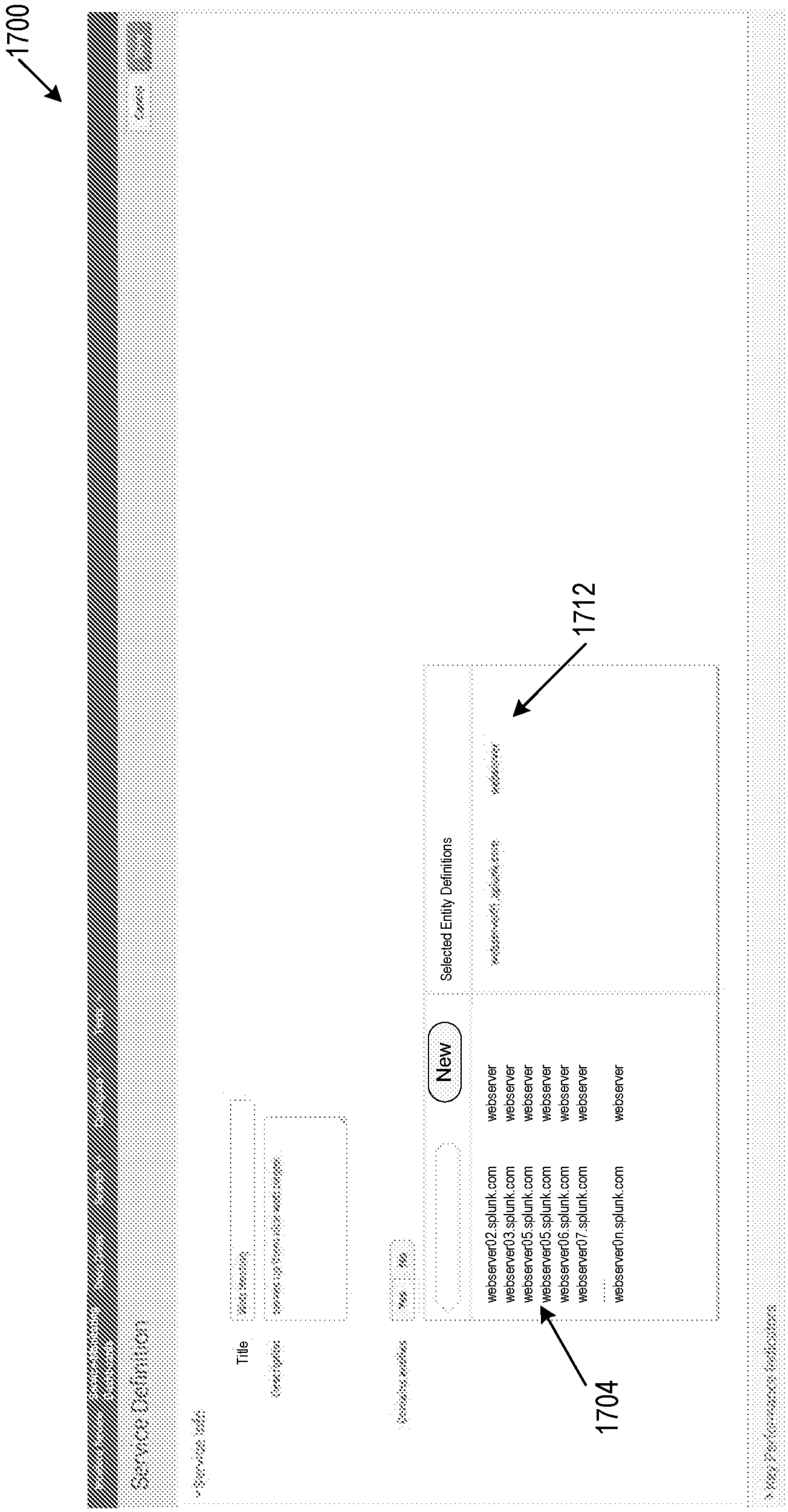
FIG. 17A illustrates an example of a GUI indicating one or more entities associated with a service based on input, in accordance with one or more implementations of the present disclosure.

FIG. 17A illustrates an example of a GUI 1700 indicating one or more entities associated with a service based on input, in accordance with one or more implementations of the present disclosure. The selected list 1712 can include the entity definition (e.g., webserver01.splunk.com) that was dragged from the availability list 1704. The availability list 1704 can remove any selected entity definitions (e.g., webserver01.splunk.com). The selected list 1712 indicates which entities are members of a service via the entity definitions of the entities and service definition for the service.

Figure 17B:
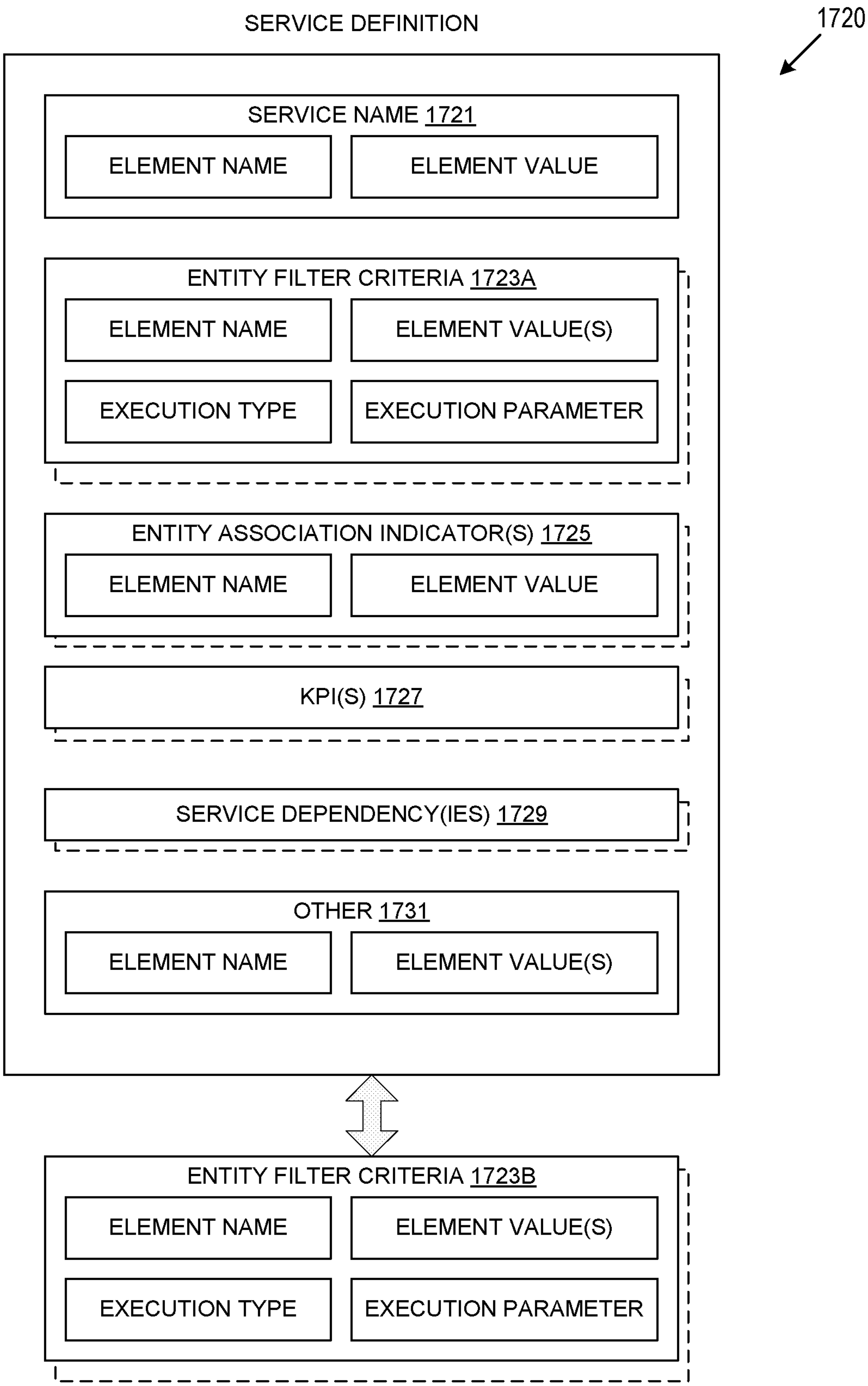
FIG. 17B illustrates an example of the structure for storing a service definition, in accordance with one or more implementations of the present disclosure.

FIG. 17B illustrates an example of the structure 1720 for storing a service definition, in accordance with one or more implementations of the present disclosure. A service definition can be stored in a service monitoring data store as a record that contains information about one or more characteristics of a service. Various characteristics of a service include, for example, a name of the service, the entities that are associated with the service, the key performance indicators (KPIs) for the service, one or more other services that depend upon the service, one or more other services which the service depends upon, and other information pertaining to the service.

The service definition structure 1720 includes one or more components. Each service definition component relates to a characteristic of the service. For example, there is a service name component 1721, one or more entity filter criteria components 1723A-B, one or more entity association indicator components 1725, one or more KPI components 1727, one or more service dependencies components 1729, and one or more components for other information 1731. The characteristic of the service being represented by a particular component is the particular service definition component's type. In one implementation, the entity filter criteria components 1723A are stored in a service definition. In another implementation, the entity filter criteria components 1723B are stored in association with a service definition (e.g., separately from the service definition but linked to the service definition using, for example, identifiers of the entity filter criteria components 1723B and/or an identifier of the service definition).

The entity definitions that are associated with a service definition can change. In one implementation, as described above in conjunction with FIG. 15, users can manually and explicitly select entity definitions from a list (e.g., list 1504 in GUI 1500 in FIG. 15) of pre-defined entities to include in a service definition to reflect the environment changes. In another implementation, the entity filter criteria component(s) 1723A-B can include filter criteria that can be used for automatically identifying one or more entity definitions to be associated with the service definition without user interaction. The filter criteria in the entity filter criteria components 1723A-B can be processed to search the entity definitions that are stored in a service monitoring data store for any entity definitions that satisfy the filter criteria. The entity definitions that satisfy the filter criteria can be associated with the service definition. The entity association indicator component(s) 1725 can include information that identifies the one or more entity definitions that satisfy the filter criteria and associates those entity definitions with the service definition, thereby creating an association between a service and one or more entities. One implementation for using filter criteria and entity association indicators to identify entity definition(s) and to associate the identified entity definition(s) with a service definition is described in greater detail below in conjunction with FIGS. 17C-17D.

The KPI component(s) 1727 can include information that describes one or more KPIs for monitoring the service. As described above, a KPI is a type of performance measurement. For example, various aspects (e.g., CPU usage, memory usage, response time, etc.) of the service can be monitored using respective KPIs.

The service dependencies component(s) 1729 can include information describing one or more other services for which the service is dependent upon, and/or one or more other services which depend on the service being represented by the service definition. In one implementation, a service definition specifies one or more other services which a service depends upon and does not associate any entities with the service, as described in greater detail below in conjunction with FIG. 18. In another implementation, a service definition specifies a service as a collection of one or more other services and one or more entities. Each service definition component stores information for an element. The information can include an element name and one or more element values for the element.

In one implementation, the element name-element value pair(s) within a service definition component serves as a field name-field value pair for a search query. In one implementation, the search query is directed to search a service monitoring data store storing service monitoring data pertaining to the service monitoring system. The service monitoring data can include, and is not limited to, entity definition, service definitions, and key performance indicator (KPI) specifications.

In one example, an element name-element value pair in the entity filter criteria component 1723A-B in the service definition can be used to search the entity definitions in the service monitoring data store for the entity definitions that have matching values for the elements that are named in the entity filter criteria component 1723A-B.

Each entity filter criteria component 1723A-B corresponds to a rule for applying one or more filter criteria defined by the element name-element value pair to the entity definitions. A rule for applying filter criteria can include an execution type and an execution parameter. User input can be received specifying filter criteria, execution types, and execution parameters via a graphical user interface (GUI), as described in greater detail below. The execution type specifies whether the rule for applying the filter criteria to the entity definitions should be executed dynamically or statically. For example, the execution type can be static execution or dynamic execution. A rule having a static execution type can be executed to create associations between the service definition and the entity definitions on a single occurrence based on the content of the entity definitions in a service monitoring data store at the time the static rule is executed. A rule having a dynamic execution type can be initially executed to create current associations between the service definition and the entity definitions, and can then be re-executed to possibly modify those associations based on the then-current content of the entity definitions in a service monitoring data store at the time of re-execution. For example, if the execution type is static execution, the filter criteria can be applied to the entity definitions in the service monitoring data store only once. If the execution type is dynamic execution, the filter criteria can automatically be applied to the entity definitions in the service monitoring data store repeatedly.

The execution parameter specifies when the filter criteria should be applied to the entity definitions in the service monitoring data store. For example, for a static execution type, the execution parameter may specify that the filter criteria should be applied when the service definition is created or when a corresponding filter criteria component is added to (or modified in) the service definition. In another example, for a static execution type, the execution parameter may specify that the filter criteria should be applied when a corresponding KPI is first calculated for the service.

For a dynamic execution type, the execution parameter may specify that the filter criteria should be applied each time a change to the entity definitions in the service monitoring data store is detected. The change can include, for example, adding a new entity definition to the service monitoring data store, editing an existing entity definition, deleting an entity definition, etc. In another example, the execution parameter may specify that the filter criteria should be applied each time a corresponding KPI is calculated for the service.

In one implementation, for each entity definition that has been identified as satisfying any of the filter criteria in the entity filter criteria components 1723A-B for a service, an entity association indicator component 1725 is added to the service definition 1720.

Figure 17C:
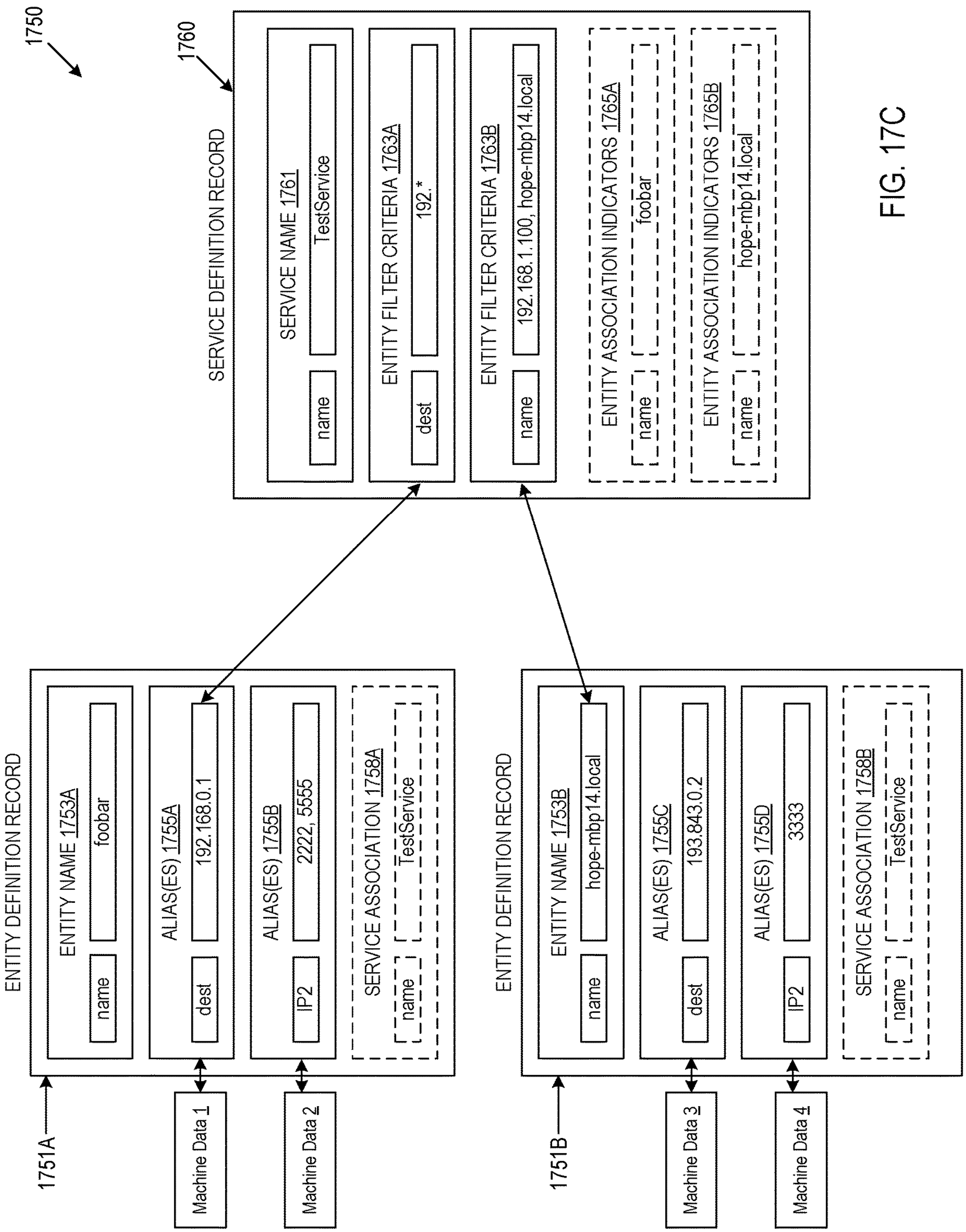
FIG. 17C is a block diagram of an example of using filter criteria to dynamically identify one or more entities and to associate the entities with a service, in accordance with one or more implementations of the present disclosure.

FIG. 17C is a block diagram 1750 of an example of using filter criteria to dynamically identify one or more entities and to associate the entities with a service, in accordance with one or more implementations of the present disclosure.

A service monitoring data store can store any number of entity definitions 1751A-B. As described above, an entity definition 1751A-B can include an entity name component 1753A-B, one or more alias components 1755A-D, one or more informational field components, one or more service association components 1759A-B, and one or more other components for other information. A service definition 1760 can include one or more entity filter criteria components 1763A-B that can be used to associate one or more entity definitions 1751A-B with the service definition.

A service definition can include a single service name component that contains all of the identifying information (e.g., name, title, key, and/or identifier) for the service. The value for the name component type in a service definition can be used as the service identifier for the service being represented by the service definition. For example, the service definition 1760 includes a single entity name 1761 component that has an element name of "name" and an element value of "TestService". The value "TestService" becomes the service identifier for the service that is being represented by service definition 1760.

There can be one or multiple components having the same service definition component type. For example, the service definition 1760 has two entity filter criteria component types (e.g., entity filter criteria components 1763A-B). In one implementation, some combination of a single and multiple components of the same type are used to store information pertaining to a service in a service definition.

Each entity filter criteria component 1763A-B can store a single filter criterion or multiple filter criteria for identifying one or more of the entity definitions (e.g., entity definitions 1751A-B). For example, the entity filter criteria component 1763A stores a single filter criterion that includes an element name "dest" and a single element value "192.*" A value can include one or more wildcard characters as described in greater detail below in conjunction with FIG. 17H. The entity filter criterion in component 1763A can be applied to the entity definitions 1753A-B to identify the entity definitions that satisfy the filter criterion "dest=192.*" Specifically, the element name-element value pair can be used for a search query. For example, a search query may search for fields named "dest" and containing a value that begins with the pattern "192.".

An entity filter criteria component that stores multiple filter criteria can include an element name and multiple values. In one implementation, the multiple values are treated disjunctively. For example, the entity filter criteria 1763B include an element name "name" and multiple values "192.168.1.100" and "hope.mbp14.local". The entity filter criteria in component 1763B can be applied to the entity definition records 1753A-B to identify the entity definitions that satisfy the filter criteria "name=192.168.1.100" or "name=hope.mbp14.local". Specifically, the element name and element values can be used for a search query that uses the values disjunctively. For example, a search query may search for fields in the service monitoring data store named "name" and having either a "192.168.1.100" or a "hope.mbp14.local" value.

An element name in the filter criteria in an entity filter criteria component 1763A-B can correspond to an element name in an entity name component (e.g., entity name component 1753A-B), an element name in an alias component (e.g., alias component 1755A-D), or an element name in an informational field component (not shown) in at least one entity definition 1753A-B in a service monitoring data store. The filter criteria can be applied to the entity definitions in the service monitoring data store based on the execution type and execution parameter in the entity filter criteria component 1763A-B.

In one implementation, an entity association indicator component 1765A-B is added to the service definition 1760 for each entity definition that satisfies any of the filter criteria in the entity filter criteria component 1763A-B for the service. The entity association indicator component 1765A-B can include an element name-element value pair to associate the particular entity definition with the service definition. For example, the entity definition record 1751A satisfies the rule "dest=192.*" and the entity association indicator component 1765A is added to the service definition record 1760 to associate the entity definition record 1751A with the TestService specified in the service definition record 1760.

In one implementation, for each entity definition that has been identified as satisfying any of the filter criteria in the entity filter criteria components 1763A-B for a service, a service association component 1758A-B is added to the entity definition 1751A-B. The service association component 1758A-B can include an element name-element value pair to associate the particular service definition 1760 with the entity definition 1751A. For example, the entity definition 1751A satisfies the filter criterion "dest=192.*" associated with the service definition 1760, and the service association component 1758A is added to the entity definition 1751A to associate the TestService with the entity definition 1753A.

In one implementation, the entity definitions 1751A-B that satisfy any of the filter criteria in the service definition 1760 are associated with the service definition automatically. For example, an entity association indicator component 1765A-B can be automatically added to the service definition 1760. In one example, an entity association indicator component 1765A-B can be added to the service definition 1760 when the respective entity definition has been identified.

As described above, the entity definitions 1751A-B can include alias components 1755A-D for associating machine data (e.g., machine data 1-4) with a particular entity being represented by a respective entity definition 1751A-B. For example, entity definition 1753A includes alias component 1755A-B to associate machine data 1 and machine data 2 with the entity named "foobar". When any of the entity definition components of an entity definition satisfy filter criteria in a service definition 1760, all of the machine data that is associated with the entity named "foobar" can be used for the service being represented by the service definition 1760. For example, the alias component 1755A in the entity definition 1751A satisfies the filter criteria in entity filter criteria 1763A. If a KPI is being determined for the service "TestService" that is represented by service definition 1760, the KPI can be determined using machine data 1 and machine data 2 that are associated with the entity represented by the entity definition 1751A, even though only machine data 1 (and not machine data 2) is associated with the entity represented by definition record 1751A via alias 1755A (the alias used to associate entity definition record 1751A with the service represented by definition record 1760 via filter criteria 1763A).

When filter criteria in the entity filter criteria components 1763A-B are applied to the entity definitions dynamically, changes that are made to the entity definitions 1753A-B in the service monitoring data store can be automatically captured by the entity filter criteria components 1763A-B and reflected, for example, in KPI determinations for the service, even after the filter criteria have been defined. The entity definitions that satisfy filter criteria for a service can be associated with the respective service definition even if a new entity is created significantly after a rule has already been defined.

For example, a new machine may be added to an IT environment and a new entity definition for the new machine may be added to the service monitoring data store. The new machine has an IP address containing "192." and may be associated with machine data X and machine data Y. The filter criteria in the entity filter criteria component 1763 can be applied to the service monitoring data store and the new machine can be identified as satisfying the filter criteria. The association of the new machine with the service definition 1760 for TestService is made without user interaction. An entity association indicator for the new machine can be added to the service definition 1760 and/or a service association can be added to the entity definition of the new machine. A KPI for the TestService can be calculated that also takes into account machine data X and machine data Y for the new machine.

As described above, in one implementation, a service definition 1760 stores no more than one component having a name component type. The service definition 1760 can store zero or more components having an entity filter criteria component type, and can store zero or more components having an informational field component type. In one implementation, user input is received via a GUI (e.g., service definition GUI) to add one or more other service definition components to a service definition record.

Various implementations may use a variety of data representation and/or organization for the component information in a service definition record based on such factors as performance, data density, site conventions, and available application infrastructure, for example. The structure (e.g., structure 1720 in FIG. 17B) of a service definition can include rows, entries, or tuples to depict components of an entity definition. A service definition component can be a normalized, tabular representation for the component, as can be used in an implementation, such as an implementation storing the entity definition within an RDBMS. Different implementations may use different representations for component information; for example, representations that are not normalized and/or not tabular. Different implementations may use various data storage and retrieval frameworks, a JSON-based database as one example, to facilitate storing entity definitions (entity definition records). Further, within an implementation, some information may be implied by, for example, the position within a defined data structure or schema where a value, such as "192.*" in FIG. 17C, is stored—rather than being stored explicitly. For example, in an implementation having a defined data structure for a service definition where the first data item is defined to be the value of the name element for the name component of the service, only the value need be explicitly stored as the service component and the element name (name) are known from the data structure definition.

Figure 17D:
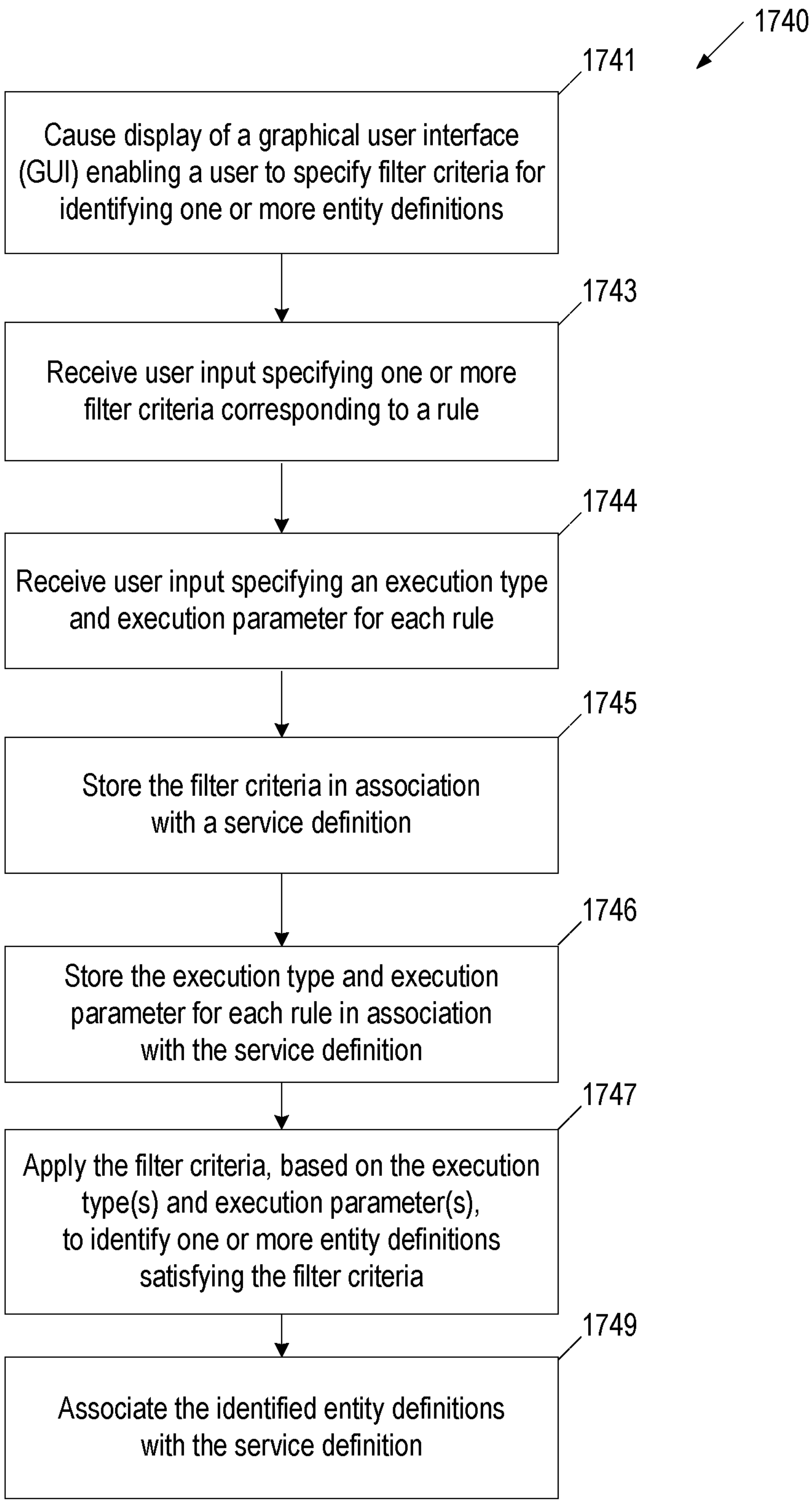
FIG. 17D is a flow diagram of an implementation of a method for using filter criteria to associate entity definition(s) with a service definition, in accordance with one or more implementations of the present disclosure.

FIG. 17D is a flow diagram of an implementation of a method 1740 for using filter criteria to associate entity definition(s) with a service definition, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, at least a portion of method is performed by a client computing machine. In another implementation, at least a portion of method is performed by a server computing machine.

At block 1741, the computing machine causes display of a graphical user interface (GUI) that enables a user to specify filter criteria for identifying one or more entity definitions. An example GUI that enables a user to specify filter criteria is described in greater detail below in conjunction with FIG. 17E.

At block 1743, the computing machine receives user input specifying one or more filter criteria corresponding to a rule. A rule with a single filter criterion can include an element name-element value pair where there is a single value. For example, the single filter criterion may be "name=192.168.1.100". A rule with multiple filter criteria can include an element name and multiple values. The multiple values can be treated disjunctively. For example, the multiple criteria may be "name=192.168.1.100 or hope.mbp14.local". In one example, an element name in the filter criteria corresponds to an element name of an alias component in at least one entity definition in a data store. In another example, an element name in the filter criteria corresponds to an element name of an informational field component in at least one entity definition in the data store.

At block 1744, the computing machine receives user input specifying an execution type and execution parameter for each rule. The execution type specifies how the filter criteria should be applied to the entity definitions. The execution type can be static execution or dynamic execution. The execution parameter specifies when the filter criteria should be applied to the entity definitions. User input can be received designating the execution type and execution parameter for a particular rule via a GUI, as described below in conjunction with FIG. 17H.

Referring to FIG. 17D, at block 1745, the computing machine stores the filter criteria in association with a service definition. The filter criteria can be stored in one or more entity filter criteria components. In one implementation, the entity filter criteria components (e.g., entity filter criteria components 1723B in FIG. 17B) are stored in association with a service definition. In another implementation, the entity filter criteria components (e.g., entity filter criteria components 1723A in FIG. 17B) are stored within a service definition.

At block 1746, the computing machine stores the execution type for each rule in association with the service definition. As described above, the execution type for each rule can be stored in a respective entity filter criteria component.

At block 1747, the computing machine applies the filter criteria to identify one or more entity definitions satisfying the filter criteria. The filter criteria can be applied to the entity definitions in the service monitoring data store based on the execution type and the execution parameter that has been specified for a rule to which the filter criteria pertains. For example, if the execution type is static execution, the computing machine can apply the filter criteria a single time. For a static execution type, the computing machine can apply the filter criteria a single time when user input, which accepts the filter criteria that are specified via the GUI, is received. In another example, the computing machine can apply the filter criteria a single time the first KPI is being calculated for the service.

If the execution type is dynamic execution, the computing machine can apply the filter criteria multiple times. For example, for a dynamic execution type, the computing machine can apply the filter criteria each time a change to the entity definitions in the service monitoring data store is detected. The computing machine can monitor the entity definitions in the service monitoring data store to detect any change that is made to the entity definitions. The change can include, for example, adding a new entity definition to the service monitoring data store, editing an existing entity definition, deleting an entity definition, etc. In another example, the computing machine can apply the filter criteria each time a KPI is calculated for the service.

At block 1749, the computing machine associates the identified entity definitions with the service definition. The computing machine stores an association indicator in a stored service definition or a stored entity definition.

A static filter criterion can be executed once (or on demand). Static execution of the filter criteria for a particular rule can produce one or more entity associations with the service definition. For example, a rule may have the static filter criterion "name=192.168.1.100". The filter criterion "name=192.168.1.100" may be applied to the entity definitions in the service monitoring data store once, and a search query is performed to identify the entity definition records that satisfy "name=192.168.1.100". The result may be a single entity definition, and the single entity definition is associated with the service definition. The association will not the static filter criterion "name=192.168.1.100" is applied another time (e.g., on demand).

Dynamic filter criterion can be run multiple times automatically, i.e., manual vs. automatic. Dynamic execution of the filter criteria for a particular rule can produce a dynamic entity association with the service definition. The filter criteria for the rule can be executed at multiple times, and the entity associations may be different from execution to execution. For example, a rule may have the dynamic filter criterion "name=192.*". When the filter criterion "name=192.*" is applied to the entity definitions in the service monitoring data store at time X, a search query is performed to identify the entity definitions that satisfy "name=192.*". The result may be one hundred entity definitions, and the one hundred entity definitions are associated with the service definition. One week later, a new data center may be added to the IT environment, and the filter criterion "name=192.*" may be again applied to the entity definitions in the service monitoring data store at time Y. A search query is performed to identify the entity definitions that satisfy "name=192.*". The result may be four hundred entity definitions, and the four hundred entity definitions are associated with the service definition. The filter criterion "name=192.168.1.100" can be applied multiple times and the entity definitions that satisfy the filter criterion may differ from time to time.

Figure 17E:
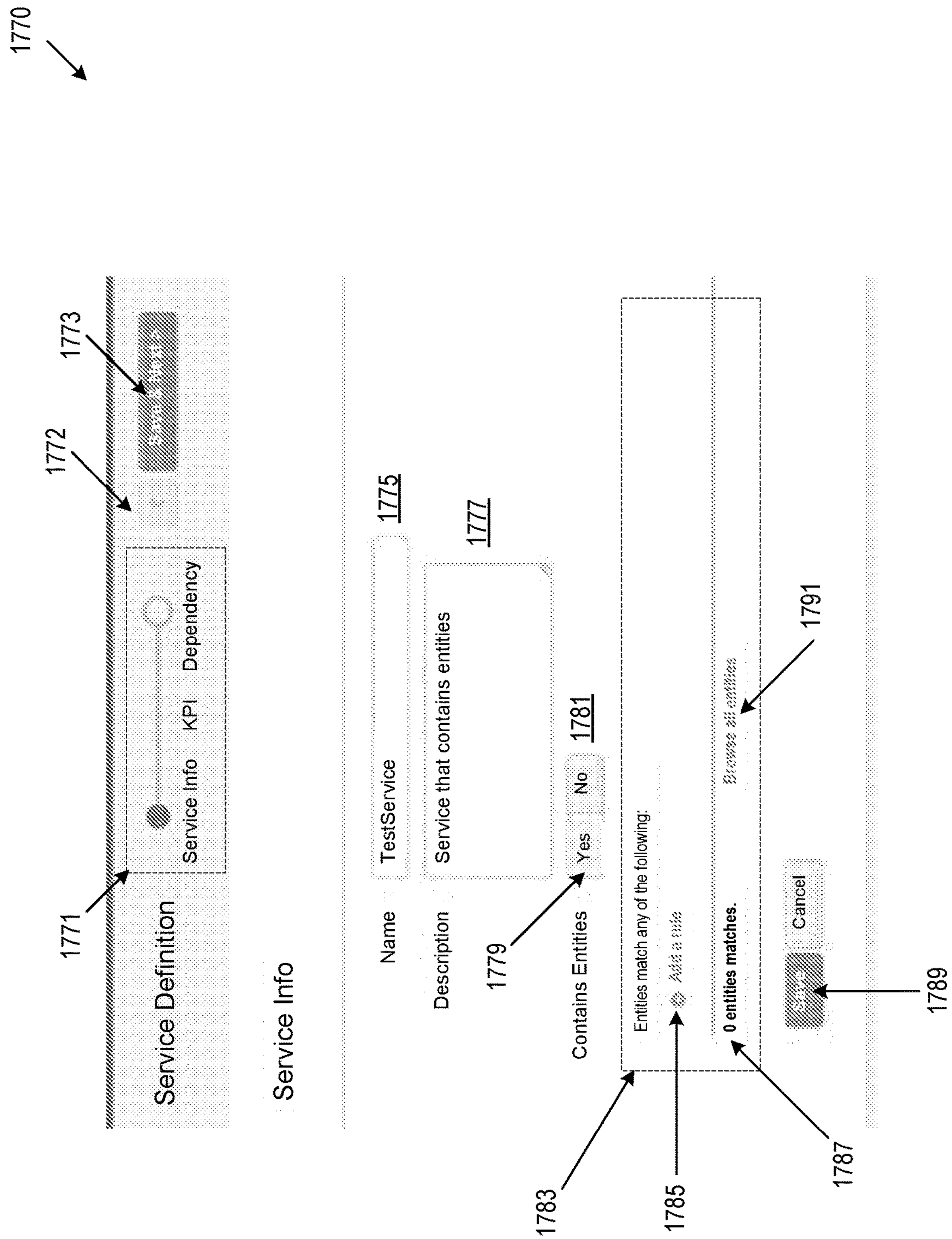
FIG. 17E illustrates an example of a GUI of a service monitoring system for using filter criteria to identify one or more entity definitions to associate with a service definition, in accordance with one or more implementations of the present disclosure.

FIG. 17E illustrates an example of a GUI 1770 of a service monitoring system for using filter criteria to identify one or more entity definitions to associate with a service definition, in accordance with one or more implementations of the present disclosure. In one implementation, GUI 1770 is displayed when button 1306 in FIG. 13 is activated.

GUI 1770 can include a service definition status bar 1771 that displays the various stages for creating a service definition using the GUIs of the service monitoring system. The stages can include, for example, and are not limited to, a service information stage, a key performance indicator (KPI) stage, and a service dependencies stage. The status bar 1771 can be updated to display an indicator (e.g., shaded circle) corresponding to a current stage.

GUI 1770 can include a save button 1789 and a save-and-next button 1773. For each stage, if the save button 1789 is activated, the settings that have been specified via the GUI 1770 for a particular stage (e.g., service information stage) can be stored in a data store, without having to progress to a next stage. For example, if user input for the service name, description, and entity filter criteria has been received, and the save button 1789 is selected, the specified service name, description, and entity filter criteria can be stored in a service definition record (e.g., service definition record 1760 in FIG. 17C) and stored in the service monitoring data store, without navigating to a subsequent GUI to specify any KPI or dependencies for the service. If the save and next button 1773 is activated, the settings that have been specified via the GUI 1770 for a particular stage can be stored in a data store, and a GUI for the next stage can be displayed. In one implementation, user interaction with the save button 1789 or the save-and-next button 1773 produces the same save operation that stores service definition information in the service monitoring data store. Unlike the save button 1789, save-and-next button 1773 has a further operation of navigating to a subsequent GUI. GUI 1770 includes a previous button 1772, which when selected, displays the previous GUI for creating the service definition.

GUI 1770 can facilitate user input specifying a name 1775 and optionally a description 1777 for the service definition for a service. For example, user input of the name "TestService" and the description "Service that contains entities" is received.

GUI 1770 can include one or more buttons (e.g., "Yes" button 1779, "No" button 1781) that can be selected to specify whether entities are associated with the service. A selection of the "No" button 1781 indicates that the service being defined will not be associated with any entities, and the resulting service definition has no associations with any entity definitions. For example, a service may not be associated with any entities if an end user intends to use the service and corresponding service definition for testing purposes and/or experimental purposes. In another example, a service may not be associated with any entities if the service is dependent on one or more other services, and the service is being monitored via the entities of the one or more other services upon which the service depends upon. For example, an end user may wish to use a service without entities as a way to track a business service based on the services which the business service depends upon.

If the "Yes" button 1779 is selected, an entity portion 1783 enabling a user to specify filter criteria for identifying one or more entity definitions to associate with the service definition is displayed. The filter criteria can correspond to a rule. The entity portion 1783 can include a button 1785, which when selected, displays a button and text box to receive user input specifying an element name and one or more corresponding element values for filter criteria corresponding to a rule, as described below in conjunction with FIG. 17F.

Referring to FIG. 17E, the entity portion 1783 can include preview information 1787 that displays information pertaining to any entity definitions in the service monitoring data store that satisfy the particular filter criteria for the rule. The preview information 1787 can be updated as the filter criteria are being specified, as described in greater detail below. GUI 1770 can include a link 1791, which when activated, can display a GUI that presents a list of the matching entity definitions, as described in greater detail below.

Figure 17F:
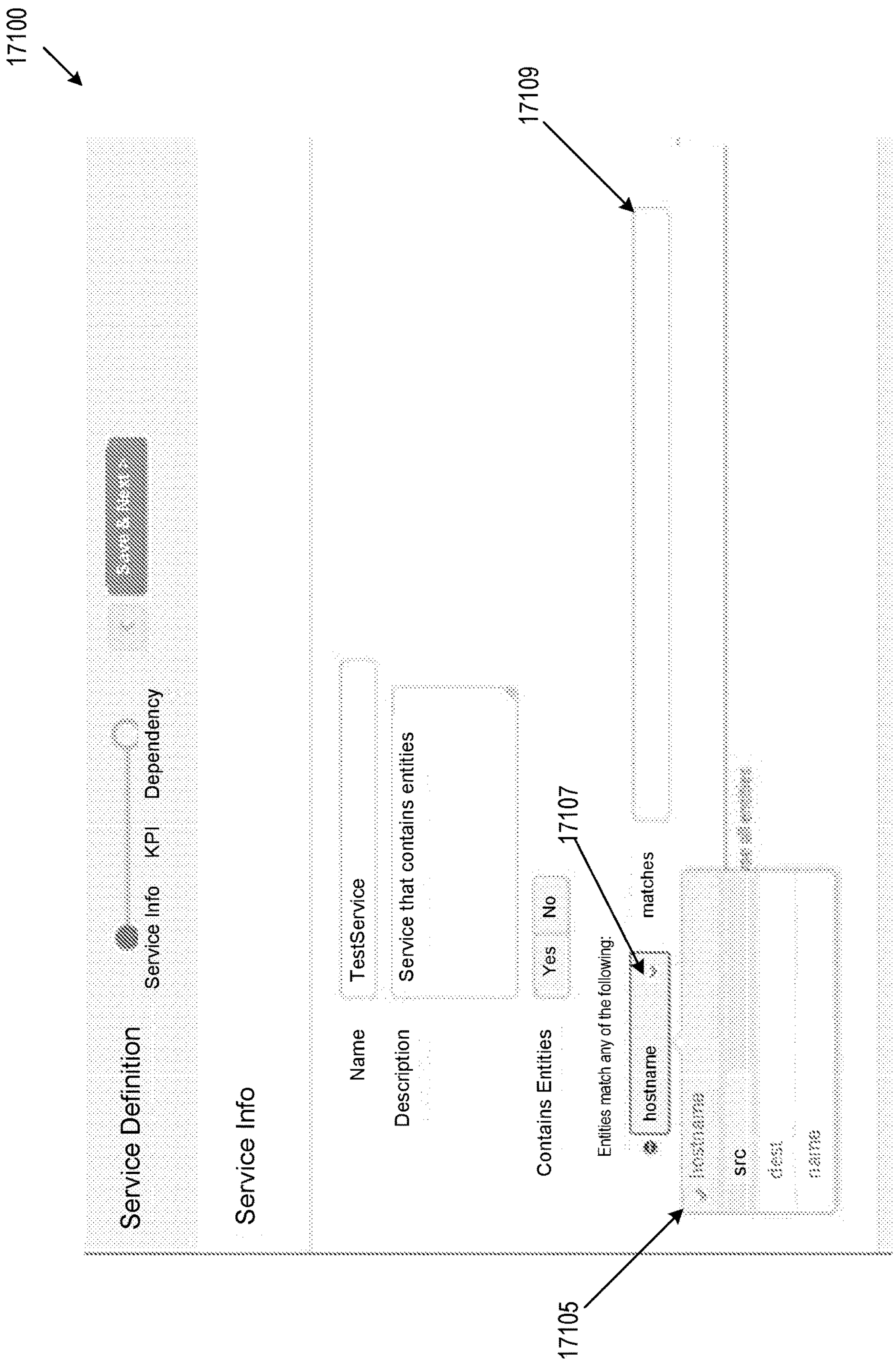
FIG. 17F illustrates an example of a GUI of a service monitoring system for specifying filter criteria for a rule, in accordance with one or more implementations of the present disclosure.

FIG. 17F illustrates an example of a GUI 17100 of a service monitoring system for specifying filter criteria for a rule, in accordance with one or more implementations of the present disclosure. GUI 17100 can display a button 17107 for selecting an element name for filter criteria of a rule, and a text box 17109 for specifying one or more values that correspond to the selected element name. If button 17107 is activated, a list 17105 of element names can be displayed, and a user can select an element name for the filter criteria from the list 17105.

In one implementation, the list 17105 is populated using the element names that are in the alias components that are in the entity definition records that are stored in the service monitoring data store. In one implementation, the list 17105 is populated using the element names from the informational field components in the entity definitions. In one implementation, the list 17105 is populated using field names that are specified by a late-binding schema that is applied to events. In one implementation, the list 17105 is populated using any combination of alias component element names, informational field component element names, and/or field names.

User input can be received that specifies one or more values for the specified element name. For example, a user can provide a string for specifying one or more values via text box 17109. In another example, a user can select text box 17109, and a list of values that correspond to the specified element name can be displayed as described below.

Figure 17G:
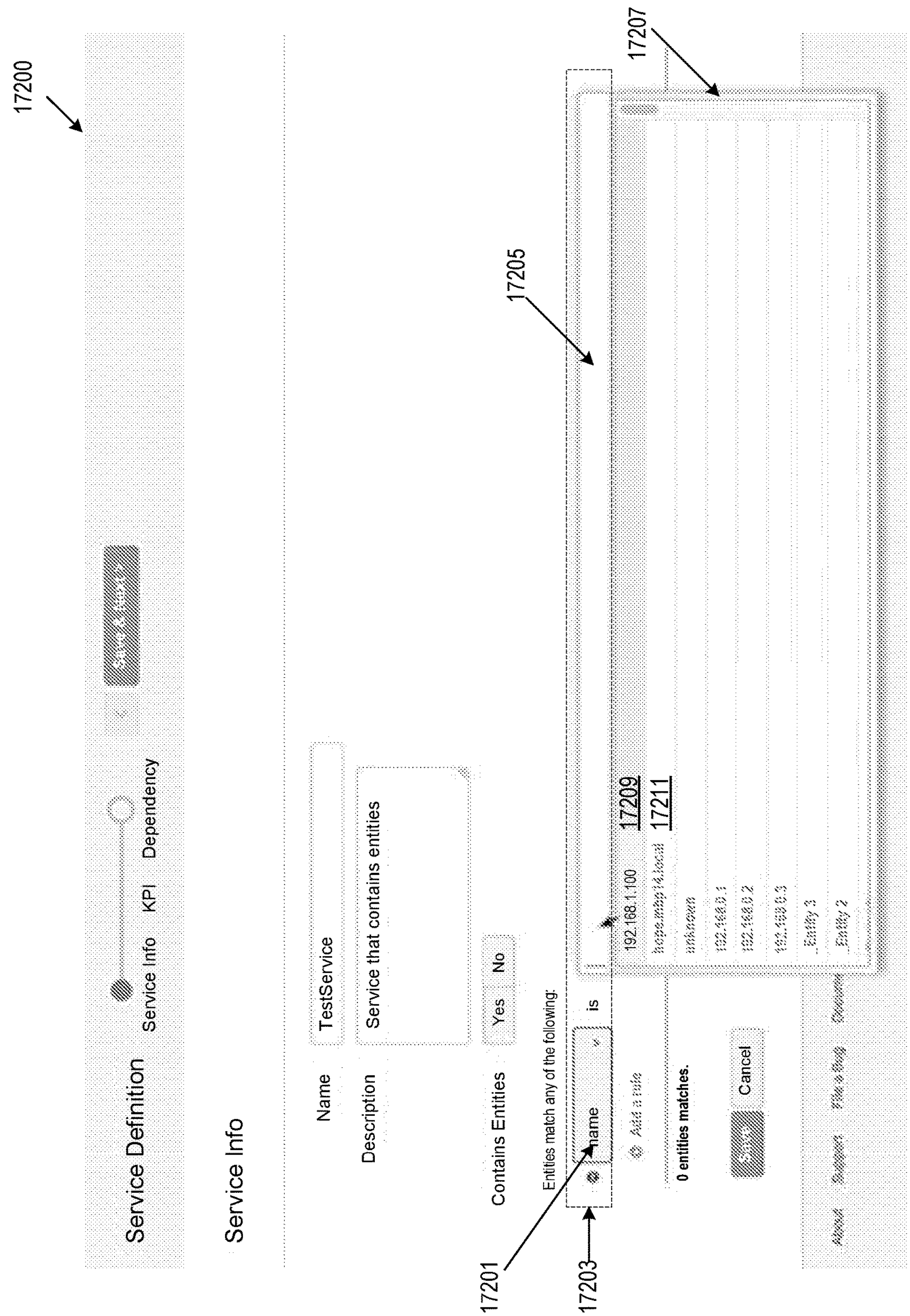
FIG. 17G illustrates an example of a GUI of a service monitoring system for specifying one or more values for a rule, in accordance with one or more implementations of the present disclosure.

FIG. 17G illustrates an example of a GUI 17200 of a service monitoring system for specifying one or more values for filter criteria of a rule, in accordance with one or more implementations of the present disclosure. In this example, filter criteria for rule 17203 is being specified via GUI 17200. GUI 17200 displays a selection of an element name "name" 17201 for the filter criteria of rule 17203. When text box 17205 is activated (e.g., when a user selects text box 17205 by, for example, clicking or tapping on text box 17205, or moving the cursor to text box 17205), a list 17207 of values that correspond to the element name "name" 17201 is displayed. For example, various entity definitions may include a name component having the element name "name", and the list 17207 can be populated with the values from the name components from those various entity definition records.

One or more values from the list 17207 can be specified for the filter criteria of a rule. For example, the filter criteria for rule 17203 can include the value "192.168.1.100" 17209 and the value "hope.mbp14.local" 17211. In one implementation, when multiple values are part of the filter criteria for a rule, the rule treats the values disjunctively. For example, when the rule 17203 is to be executed, the rule triggers a search query to be performed to search for entity definition records that have either an element name "name" and a corresponding "192.168.1.100" value, or have an element name "name" and a corresponding "hope.mbp14.local" value.

A service definition can include multiple sets of filter criteria corresponding to different rules. In one implementation, the different rules are treated disjunctively, as described below.

Figure 17H:
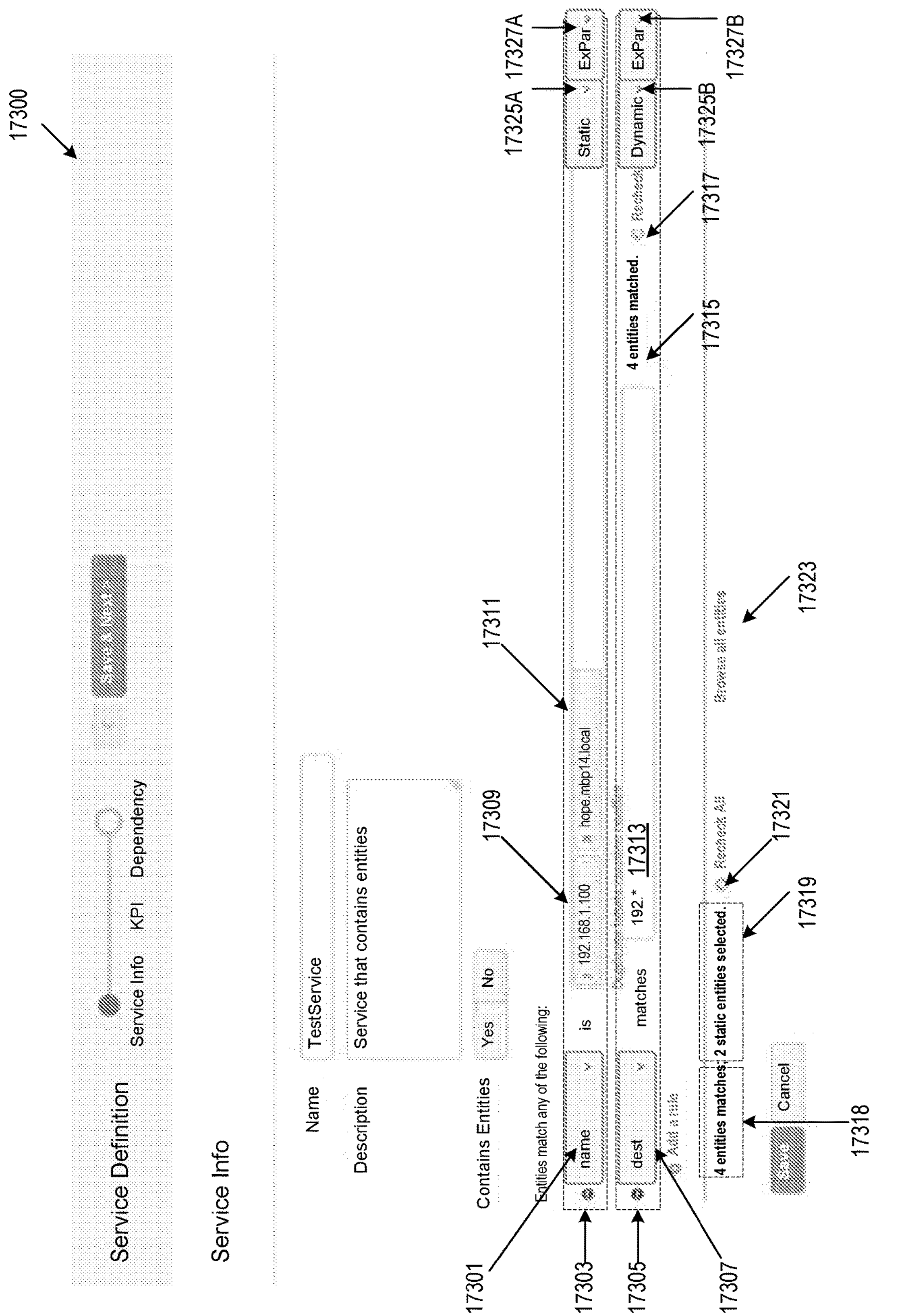
FIG. 17H illustrates an example of a GUI of a service monitoring system for specifying multiple rules for associating one or more entity definitions with a service definition, in accordance with one or more implementations of the present disclosure.

FIG. 17H illustrates an example of a GUI 17300 of a service monitoring system for specifying multiple sets of filter criteria for associating one or more entity definitions with a service definition, in accordance with one or more implementations of the present disclosure. As described above, a service definition can include multiple sets of filter criteria corresponding to different rules. For example, two sets of filter criteria for two rules 17303 and 17305 can be specified via GUI 17300.

Rule 17303 has multiple filter criteria that include an element name "name" 17301 and multiple element values (e.g., the value "192.168.100" 17309 and the value "hope.mbp14.local" 17391). In one implementation, the multiple filter criteria are processed disjunctively. For example, rule 17303 can be processed to search for entity definitions that satisfy "name=192.168.1.100" or "name=hope.mbp14.local". Rule 17305 has a single filter criterion that includes element name "dest" 17307 and a single element value "192.*" 17313 for a single filter criterion of "dest=192.*".

In one example, an element value for filter criteria of a rule can be expressed as an exact string (e.g., "192.168.1.100" and "hope.mbp14.local") and the rule can be executed to perform a search query for an exact string match. In another example, an element value for filter criteria of a rule can be expressed as a combination of characters and one or more wildcard characters. For example, the value "192.*" for rule 17305 contains an asterisk as a wildcard character. A wildcard character in a value can denote that when the rule is executed, a wildcard search query is to be performed to identify entity definitions using pattern matching. In another example, an element value for a filter criteria rule can be expressed as a regular expression (regex) as another possible option to identify entity definitions using pattern matching.

In one implementation, when multiple sets of filter criteria for different rules are specified for a service definition, the multiple rules are processed disjunctively. The entity definitions that satisfy any of the rules are the entity definitions that are to be associated with the service definition. For example, any entity definitions that satisfy "name=192.168.1.100 or hope.mbp14.local" or "dest=192.*" are the entity definitions that are to be associated with the service definition.

GUI 17300 can display, for each rule being specified, a button 17327A-B for selecting the execution parameter for the particular rule. GUI 17300 can display, for each rule being specified, a button 17325A-B for selecting the execution type (e.g., static execution type, dynamic execution type) for the particular rule. For example, rule 17303 has a static execution type, and rule 17305 has a dynamic execution type.

A user may wish to select a static execution type for a rule, for example, if the user anticipates that one or more entity definitions may not satisfy a rule that has a wildcard-based filter criterion. For example, a service may already have the rule with filter criterion "dest=192.*", but the user may wish to also associate a particular entity, which does not have "192" in its address, with the service. A static rule that searches for the particular entity by entity name, such as rule with filter criterion "name=hope.mbp14.local" can be added to the service definition.

In another example, a user may wish to select a static execution type for a rule, for example, if the user anticipates that only certain entities will ever be associated with the service. The user may not want any changes to be made inadvertently to the entities that are associated with the service by the dynamic execution of a rule.

GUI 17300 can display preview information for the entity definitions that satisfy the filter criteria for the rule(s). The preview information can include a number of the entity definitions that satisfy the filter criteria and/or the execution type of the rule that pertains to the particular entity definition. For example, preview information 17319 includes the type "static" and the number "2". In one implementation, when the execution type is not displayed, the preview information represents a dynamic execution type. For example, preview information 17315 and preview information 17318 pertain to rules that have a dynamic execution type.

The preview information can represent execution of a particular rule. For example, preview information 17315 is for rule 17305. A combination of the preview information can represent execution of all of the rules for the service. For example, the combination of preview information 17318 and preview information 17319 is a summary of the execution of rule 17303 and rule 17305.

GUI 17300 can include one or more buttons 17317, 17321, which when selected, can re-apply the corresponding rule(s) to update the corresponding preview information. For example, the filter criteria for rule 17305 may be edited to "dest=192.168.*" and button 17317 can be selected to apply the edited filter criteria for rule 17305 to the entity definitions in the service monitoring data store. The corresponding preview information 17315 and the preview information 17318 in the summary may or may not change depending on the search results.

In one implementation, the preview information includes a link, which when selected, can display a list of the entity definitions that are being represented by the preview information. For example, preview information 17315 for rule 17307 indicates that there are 4 entity definitions that satisfy the rule "dest=192.*". The preview information 17315 can include a link, which when activated can display a list of the 4 entity definition, as described in greater detail below in conjunction with FIG. 17I. Referring to FIG. 17H, GUI 17300 can include a link 17323, which when selected can display a list of all of the entity definitions that satisfy all of the rules (having both static and dynamic execution types such as rule 17303 and rule 17305) for the service definition.

Figure 17I:
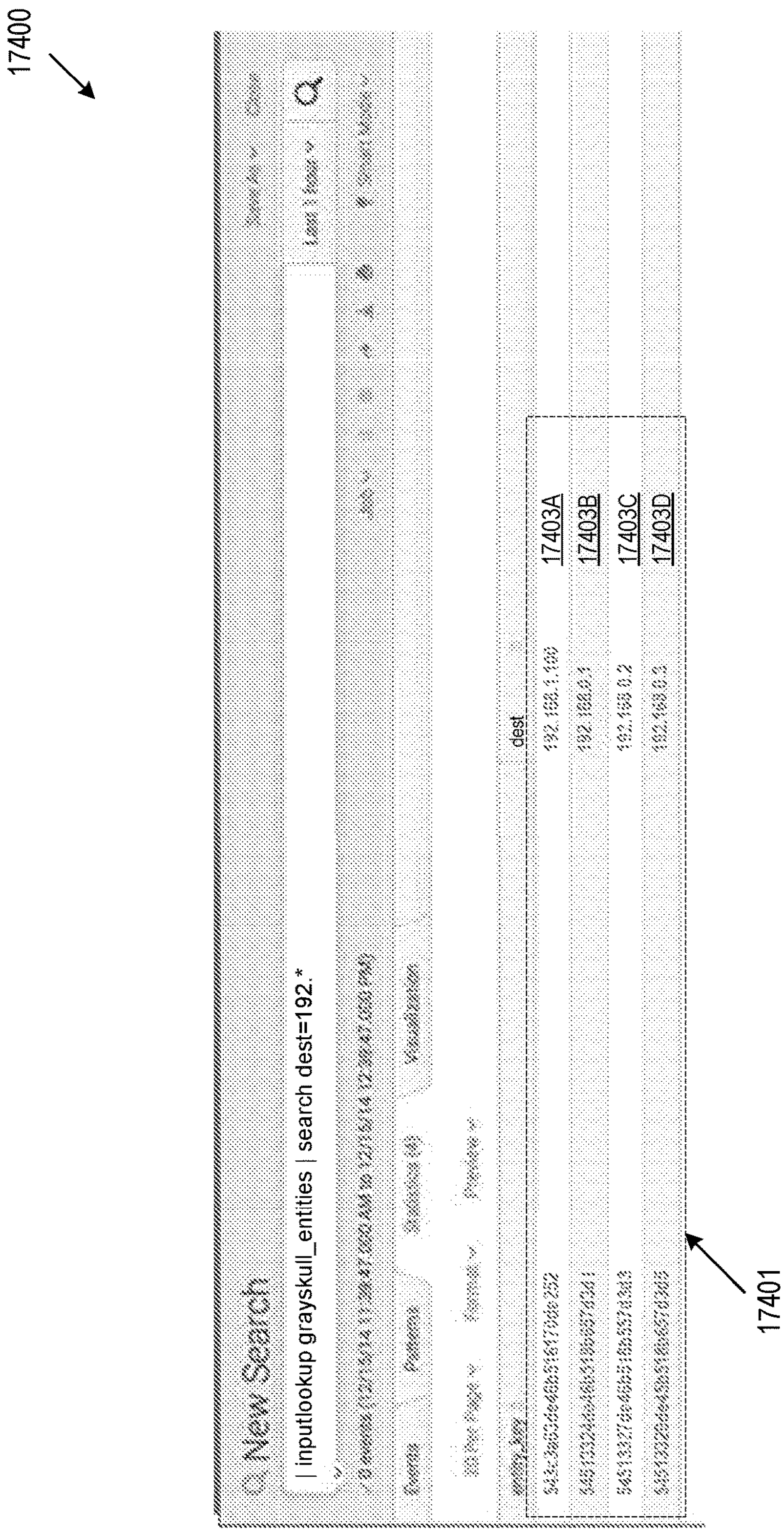
FIG. 17I illustrates an example of a GUI of a service monitoring system for displaying entity definitions that satisfy filter criteria, in accordance with one or more implementations of the present disclosure.

FIG. 17I illustrates an example of a GUI 17400 of a service monitoring system for displaying entity definitions that satisfy filter criteria, in accordance with one or more implementations of the present disclosure. GUI 17400 can display list 17401 of the entity definitions that satisfy a particular rule "dest=192.*" (e.g., rule 17305 in FIG. 17H). The list 17401 can include, for each entity definition, the value (e.g., value 192.168.1.100 17403A, value 192.168.0.1 17403B, value 192.168.0.2 17403B, and value 192.168.0.3 17403B) that satisfies the filter criteria for the rule.

FIG. 18 illustrates an example of a GUI 1800 of a service monitoring system for specifying dependencies for the service, in accordance with one or more implementations of the present disclosure. GUI 1800 can include an availability list 1804 of services that each has a corresponding service definition. The availability list 1804 can include one or more services. For example, the availability list 1804 may include dozens of services. GUI 1800 can include a filter box 1802 to receive input for filtering the availability list 1804 of services to display a portion of the services. GUI 1800 can facilitate user input for selecting a service from the availability list 1804 and dragging the selected service to a dependent services list 1812 to indicate that the service is dependent on the services in the dependent services list 1812. For example, the service definition may be for a Sandbox service. For example, the drop-down 1801 can be selected to display a title "Sandbox" in the service information for the service definition. The availability list 1804 may initially include four other services: (1) Revision Control service, (2) Networking service, (3) Web Hosting service, and (4) Database service. The Sandbox service may depend on the Revision Control service and the Networking service. A user may select the Revision Control service and Networking service from the availability list 1804 and drag the Revision Control service and Networking service to the dependent services list 1812 to indicate that the Sandbox service is dependent on the Revision Control service and Networking service. In one implementation, GUI 1800 further displays a list of other services which depend on the service described by the service definition that is being created and/or edited.

Thresholds for Key Performance Indicators

FIG. 19 is a flow diagram of an implementation of a method 1900 for creating one or more key performance indicators for a service, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, the method is performed by the client computing machine. In another implementation, the method is performed by a server computing machine coupled to the client computing machine over one or more networks.

At block 1902, the computing machine receives input (e.g., user input) of a name for a KPI to monitor a service or an aspect of the service. For example, a user may wish to monitor the service's response time for requests, and the name of the KPI may be "Request Response Time." In another example, a user may wish to monitor the load of CPU(s) for the service, and the name of the KPI may be "CPU Usage."

At block 1904, the computing machine creates a search query to produce a value indicative of how the service or the aspect of the service is performing. For example, the value can indicate how the aspect (e.g., CPU usage, memory usage, request response time) is performing at point in time or during a period of time. Some implementations for creating a search query are discussed in greater detail below in conjunction with FIG. 20. In one implementation, the computing machine receives input (e.g., user input), via a graphical interface, of search processing language defining the search query. Some implementations for creating a search query from input of search processing language are discussed in greater detail below in conjunction with FIGS. 22-23. In one implementation, the computing machine receives input (e.g., user input) for defining the search query using a data model. Some implementations for creating a search query using a data model are discussed in greater detail below in conjunction with FIGS. 24-26.

At block 1906, the computing machine sets one or more thresholds for the KPI. Each threshold defines an end of a range of values. Each range of values represents a state for the KPI. The KPI can be in one of the states (e.g., normal state, warning state, critical state) depending on which range the value falls into. Some implementations for setting one or more thresholds for the KPI are discussed in greater detail below in conjunction with FIGS. 28-31.

Figure 20:
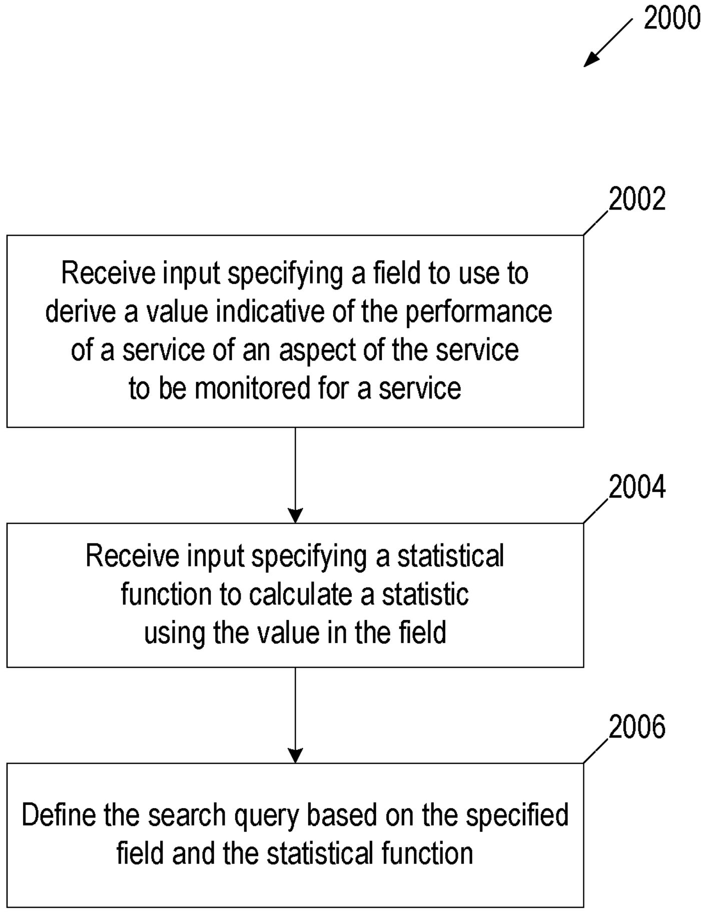
FIG. 20 is a flow diagram of an implementation of a method for creating a search query, in accordance with one or more implementations of the present disclosure.

FIG. 20 is a flow diagram of an implementation of a method 2000 for creating a search query, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, the method is performed by the client computing machine. In another implementation, the method is performed by a server computing machine coupled to the client computing machine over one or more networks.

At block 2002, the computing machine receives input (e.g., user input) specifying a field to use to derive a value indicative of the performance of a service or an aspect of the service to be monitored. As described above, machine data can be represented as events. Each of the events is raw data. A late-binding schema can be applied to each of the events to extract values for fields defined by the schema. The received input can include the name of the field from which to extract a value when executing the search query. For example, the received user input may be the field name "spent" that can be used to produce a value indicating the time spent to respond to a request.

At block 2004, the computing machine optionally receives input specifying a statistical function to calculate a statistic using the value in the field. In one implementation, a statistic is calculated using the value(s) from the field, and the calculated statistic is indicative of how the service or the aspect of the service is performing. As discussed above, the machine data used by a search query for a KPI to produce a value can be based on a time range. For example, the time range can be defined as "Last 15 minutes," which would represent an aggregation period for producing the value. In other works, if the query is executed periodically (e.g., every 5 minutes), the value resulting from each execution can be based on the last 15 minutes on a rolling basis, and the value resulting from each execution can be based on the statistical function. Examples of statistical functions include, and are not limited to, average, count, count of distinct values, maximum, mean, minimum, sum, etc. For example, the value may be from the field "spent" the time range may be "Last 15 minutes," and the input may specify a statistical function of average to define the search query that should produce the average of the values of field "spent" for the corresponding 15 minute time range as a statistic. In another example, the value may be a count of events satisfying the search criteria that include a constraint for the field (e.g., if the field is "response time," and the KPI is focused on measuring the number of slow responses (e.g., "response time" below x) issued by the service).

At block 2006, the computing machine defines the search query based on the specified field and the statistical function. The computing machine may also optionally receive input of an alias to use for a result of the search query. The alias can be used to have the result of the search query to be compared to one or more thresholds assigned to the KPI.

Figure 21:
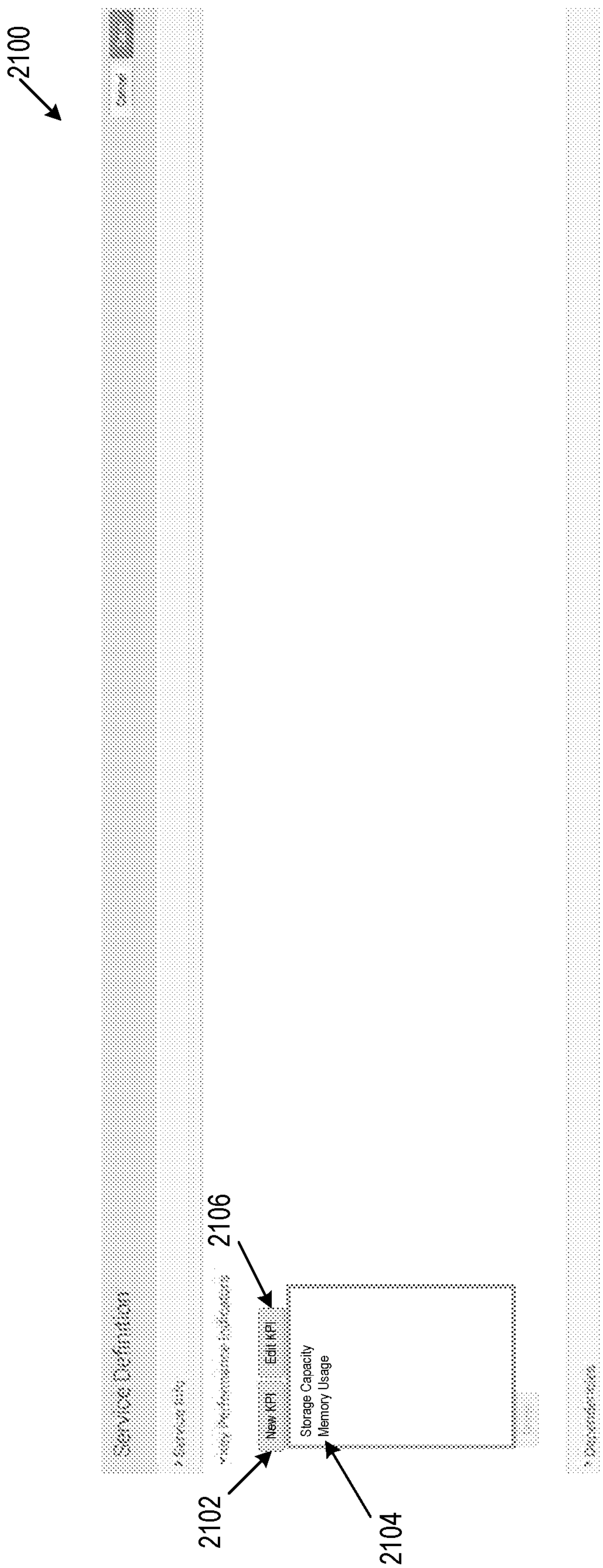
FIG. 21 illustrates an example of a GUI for creating a KPI for a service, in accordance with one or more implementations of the present disclosure.

FIG. 21 illustrates an example of a GUI 2100 of a service monitoring system for creating a KPI for a service, in accordance with one or more implementations of the present disclosure. GUI 2100 can display a list 2104 of KPIs that have already been created for the service and associated with the service via the service definition. For example, the service definition "Web Hosting" includes a KPI "Storage Capacity" and a KPI "Memory Usage". GUI 2100 can include a button 2106 for editing a KPI. A KPI in the list 2104 can be selected and the button 2106 can be activated to edit the selected KPI. GUI 2100 can include a button 2102 for creating a new KPI. If button 2102 is activated, GUI 2200 in FIG. 22 is displayed facilitating user input for creating a KPI.

Figure 22:
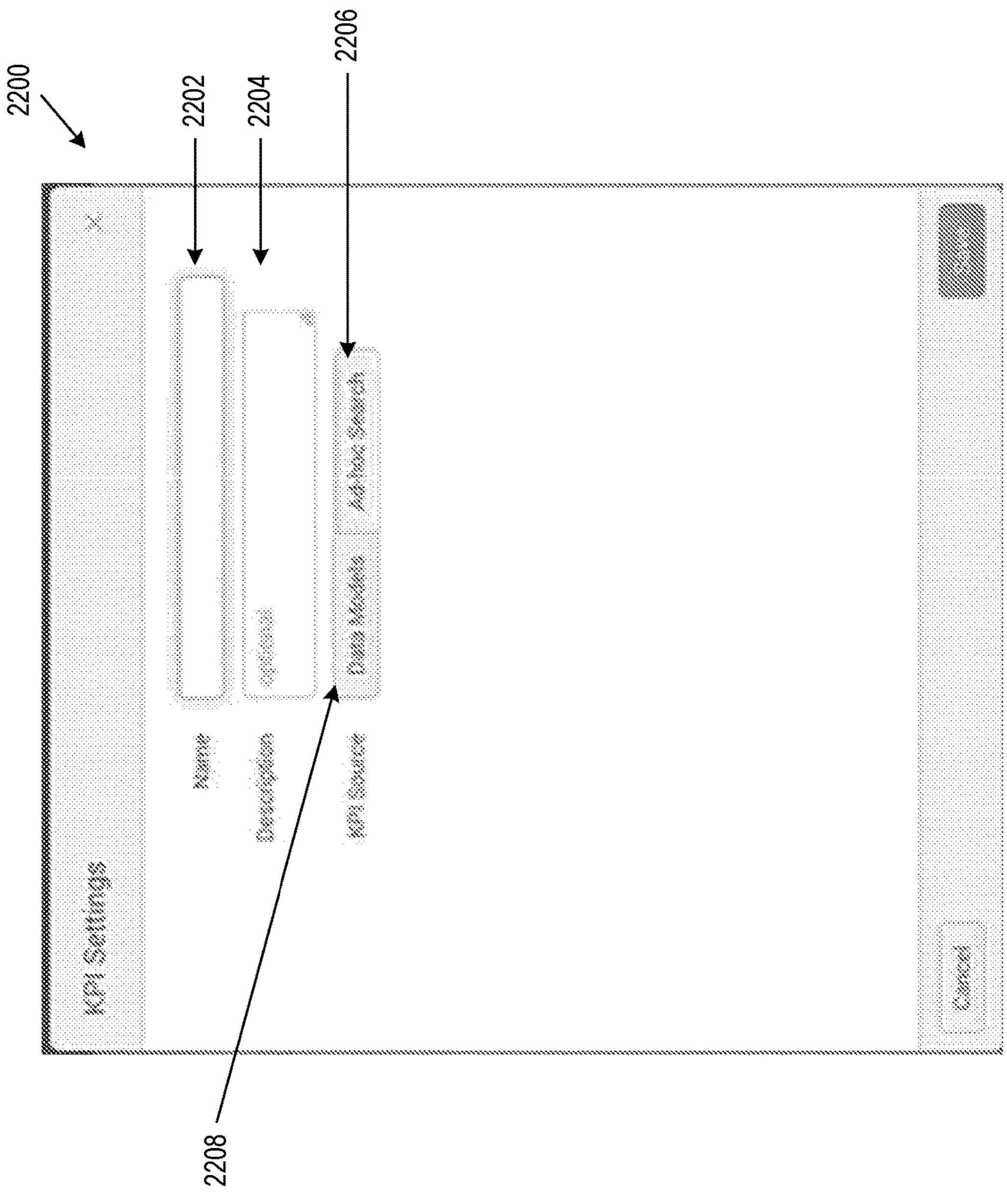
FIG. 22 illustrates an example of a GUI for creating a KPI for a service, in accordance with one or more implementations of the present disclosure.

FIG. 22 illustrates an example of a GUI 2200 of a service monitoring system for creating a KPI for a service, in accordance with one or more implementations of the present disclosure. GUI 2200 can facilitate user input specifying a name 2202 and optionally a description 2204 for a KPI for a service. The name 2202 can indicate an aspect of the service that is to be monitored using the KPI. As described above, the KPI is defined by a search query that produces a value derived from machine data pertaining to one or more entities identified in a service definition for the service. The produced value is indicative of how an aspect of the service is performing. In one example, the produced value is the value extracted from a field when the search query is executed. In another example, the produced value is a result from calculating a statistic based on the value in the field.

In one implementation, the search query is defined from input (e.g., user input), received via a graphical interface, of search processing language defining the search query. GUI 2200 can include a button 2206 for facilitating user input of search processing language defining the search query. If button 2206 is selected, a GUI for facilitating user input of search processing language defining the search query can be displayed, as discussed in greater detail below in conjunction with FIG. 23.

Referring to FIG. 22, in another implementation, the search query is defined using a data model. GUI 2200 can include a button 2208 for facilitating user input of a data model for defining the search query. If button 2208 is selected, a GUI for facilitating user input for defining the search query using a data model can be displayed, as discussed in greater detail below in conjunction with FIG. 24.

Figure 23:
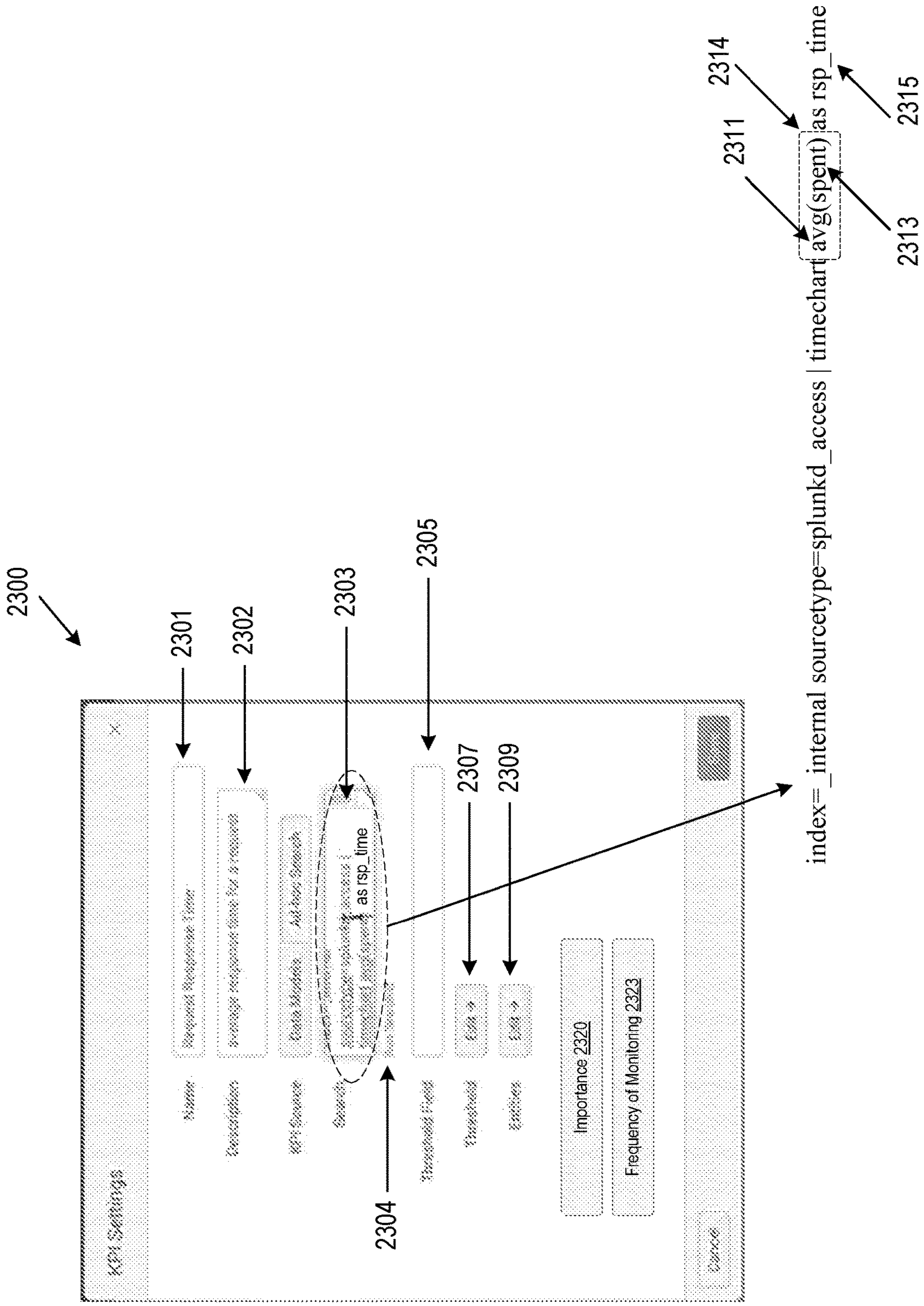
FIG. 23 illustrates an example of a GUI for receiving input of search processing language for defining a search query for a KPI for a service, in accordance with one or more implementations of the present disclosure.

FIG. 23 illustrates an example of a GUI 2300 of a service monitoring system for receiving input of search processing language for defining a search query for a KPI for a service, in accordance with one or more implementations of the present disclosure. GUI 2300 can facilitate user input specifying a KPI name 2301, which can optionally indicate an aspect of the service to monitor with the KPI, and optionally a description 2302 for a KPI for a service. For example, the aspect of the service to monitor can be response time for received requests, and the KPI name 2301 can be Request Response Time. GUI 2300 can facilitate user input specifying search processing language 2303 that defines the search query for the Request Response Time KPI. The input for the search processing language 2303 can specify a name of a field (e.g., spent 2313) to use to extract a value indicative of the performance of an aspect (e.g., response time) to be monitored for a service. The input of the field (e.g., spent 2313) designates which data to extract from an event when the search query is executed.

The input can optionally specify a statistical function (e.g., avg 2311) that should be used to calculate a statistic based on the value corresponding to a late-binding schema being applied to an event. The late-binding schema will extract a portion of event data corresponding to the field (e.g., spent 2313). For example, the value associated with the field "spent" can be extracted from an event by applying a late-binding schema to the event. The input may specify that the average of the values corresponding to the field "spent" should be produced by the search query. The input can optionally specify an alias (e.g., rsp_time 2315) to use (e.g., as a virtual field name) for a result of the search query (e.g., avg(spent) 2314). The alias 2315 can be used to have the result of the search query to be compared with one or more thresholds assigned to the KPI.

GUI 2300 can display a link 2304 to facilitate user input to request that the search criteria be tested by running the search query for the KPI. In one implementation, when input is received requesting to test the search criteria for the search query, a search GUI is displayed.

In some implementations, GUI 2300 can facilitate user input for creating one or more thresholds for the KPI. The KPI can be in one of multiple states (e.g., normal, warning, critical). Each state can be represented by a range of values. During a certain time, the KPI can be in one of the states depending on which range the value, which is produced at that time by the search query for the KPI, falls into. GUI 2300 can include a button 2307 for creating the threshold for the KPI. Each threshold for a KPI defines an end of a range of values, which represents one of the states. Some implementations for creating one or more thresholds for the KPI are discussed in greater detail below in conjunction with FIGS. 28-31.

GUI 2300 can include a button 2309 for editing which entity definitions to use for the KPI. Some implementations for editing which entity definitions to use for the KPI are discussed in greater detail below in conjunction with FIG. 27.

In some implementations, GUI 2300 can include a button 2320 to receive input assigning a weight to the KPI to indicate an importance of the KPI for the service relative to other KPIs defined for the service. The weight can be used for calculating an aggregate KPI score for the service to indicate an overall performance for the service, as discussed in greater detail below in conjunction with FIG. 32. GUI 2300 can include a button 2323 to receive input to define how often the KPI should be measured (e.g., how often the search query defining the KPI should be executed) for calculating an aggregate KPI score for the service to indicate an overall performance for the service, as discussed in greater detail below in conjunction with FIG. 32. The importance (e.g., weight) of the KPI and the frequency of monitoring (e.g., a schedule for executing the search query) of the KPI can be used to determine an aggregate KPI score for the service. The score can be a value of an aggregate of the KPIs of the service. Some implementations for using the importance and frequency of monitoring for each KPI to determine an aggregate KPI score for the service are discussed in greater detail below in conjunction with FIGS. 32-33.

GUI 2300 can display an input box 2305 for a field to which the threshold(s) can be applied. In particular, a threshold can be applied to the value produced by the search query defining the KPI. Applying a threshold to the value produced by the search query is described in greater detail below in conjunction with FIG. 29.

Figure 24:
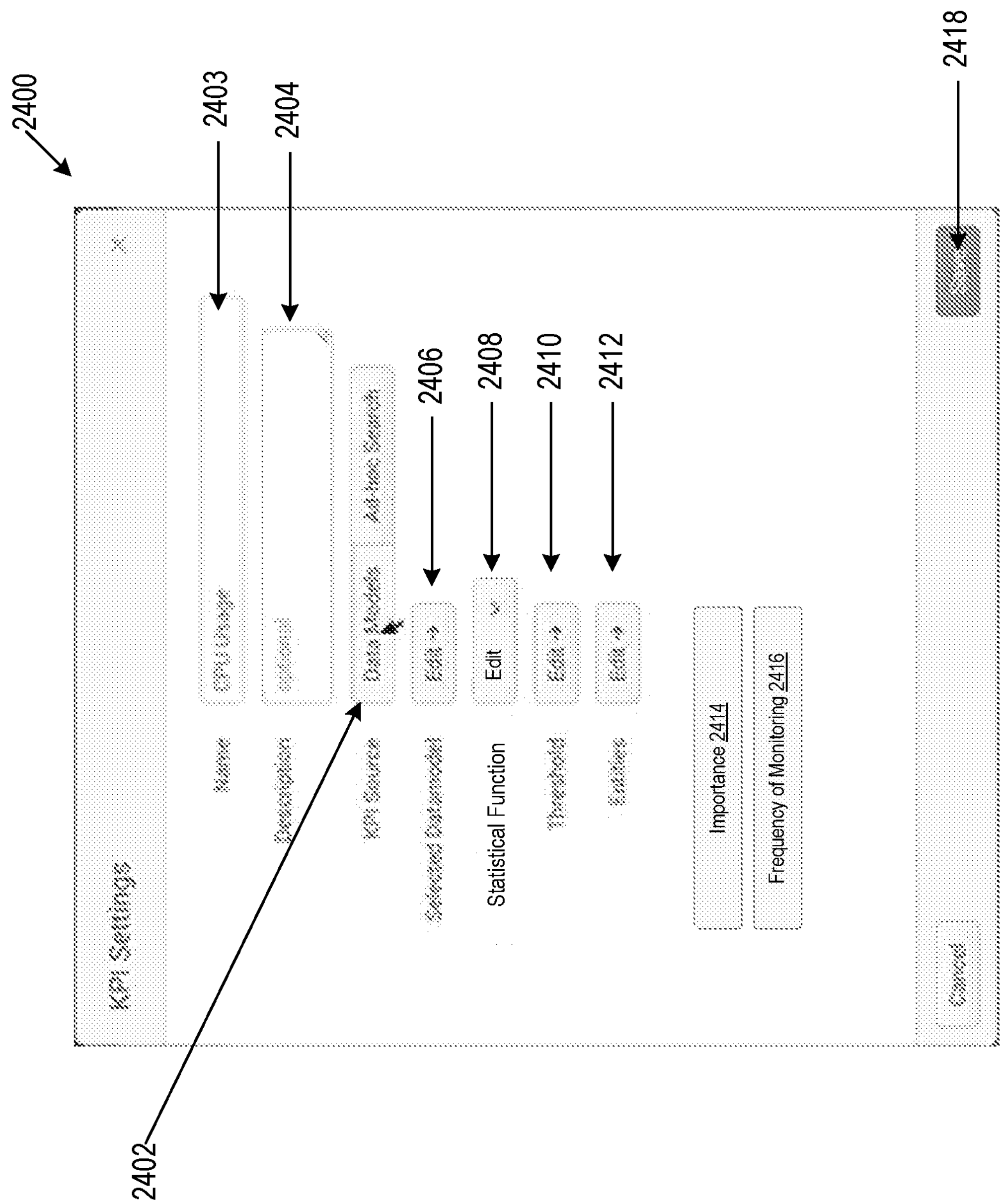
FIG. 24 illustrates an example of a GUI for defining a search query for a KPI using a data model, in accordance with one or more implementations of the present disclosure.

FIG. 24 illustrates an example of a GUI 2400 of a service monitoring system for defining a search query for a KPI using a data model, in accordance with one or more implementations of the present disclosure. GUI 2400 can facilitate user input specifying a name 2403 and optionally a description 2404 for a KPI for a service. For example, the aspect of the service to monitor can be CPU utilization, and the KPI name 2403 can be CPU Usage. If button 2402 is selected, GUI 2400 displays button 2406 and button 2408 for defining the search query for the KPI using a data model. A data model refers to one or more objects grouped in a hierarchical manner and can include a root object and, optionally, one or more child objects that can be linked to the root object. A root object can be defined by search criteria for a query to produce a certain set of events, and a set of fields that can be exposed to operate on those events. Each child object can inherit the search criteria of its parent object and can have additional search criteria to further filter out events represented by its parent object. Each child object may also include at least some of the fields of its parent object and optionally additional fields specific to the child object, as will be discussed in greater detail below in conjunction with FIGS. 74B-D.

Figure 25:
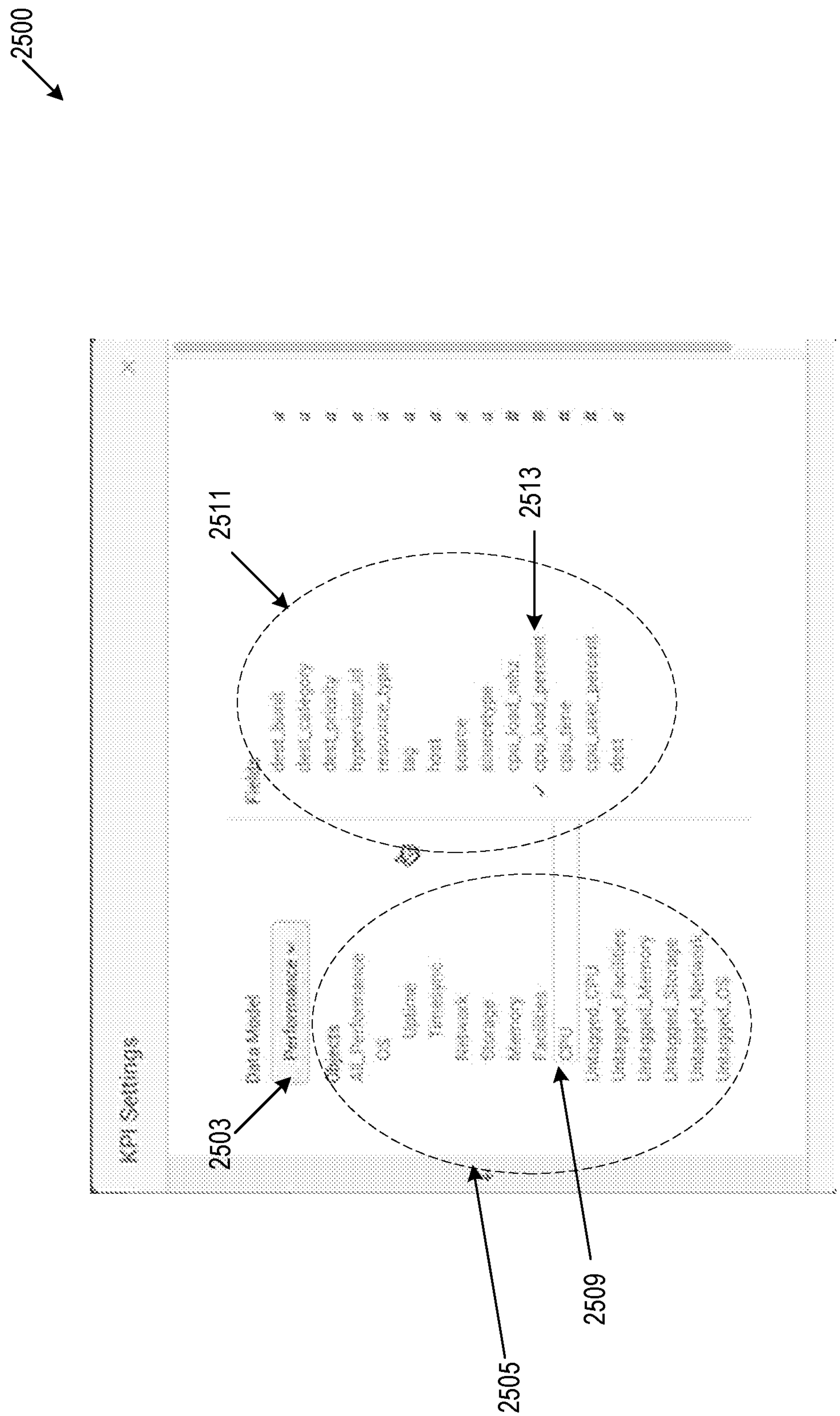
FIG. 25 illustrates an example of a GUI for facilitating user input for selecting a data model and an object of the data model to use for the search query, in accordance with one or more implementations of the present disclosure.

If button 2402 is selected, GUI 2500 in FIG. 25 is displayed for facilitating user input for selecting a data model to assist with defining the search query. FIG. 25 illustrates an example of a GUI 2500 of a service monitoring system for facilitating user input for selecting a data model and an object of the data model to use for defining the search query, in accordance with one or more implementations of the present disclosure. GUI 2500 can include a drop-down menu 2503, which when expanded, displays a list of available data models. When a data model is selected, GUI 2500 can display a list 2505 of objects pertaining to the selected data model. For example, the data model Performance is selected and the objects pertaining to the Performance data model are included in the list 2505. Objects of a data model are described in greater detail below in conjunction with FIGS. 74B-D. When an object in the list 2505 is selected, GUI 2500 can display a list 2511 of fields pertaining to the selected object. For example, the CPU object 2509 is selected and the fields pertaining to the CPU object 2509 are included in the list 2511. GUI 2500 can facilitate user input of a selection of a field in the list 2511. The selected field (e.g., cpu_load_percent 2513) is the field to use for the search query to derive a value indicative of the performance of an aspect (e.g., CPU usage) of the service. The derived value can be, for example, the field's value extracted from an event when the search query is executed, a statistic calculated based on one or more values of the field in one or more events located when the search query is executed, a count of events satisfying the search criteria that include a constraint for the field (e.g., if the field is "response time" and the KPI is focused on measuring the number of slow responses (e.g., "response time" below x) issued by the service).

Figure 26:
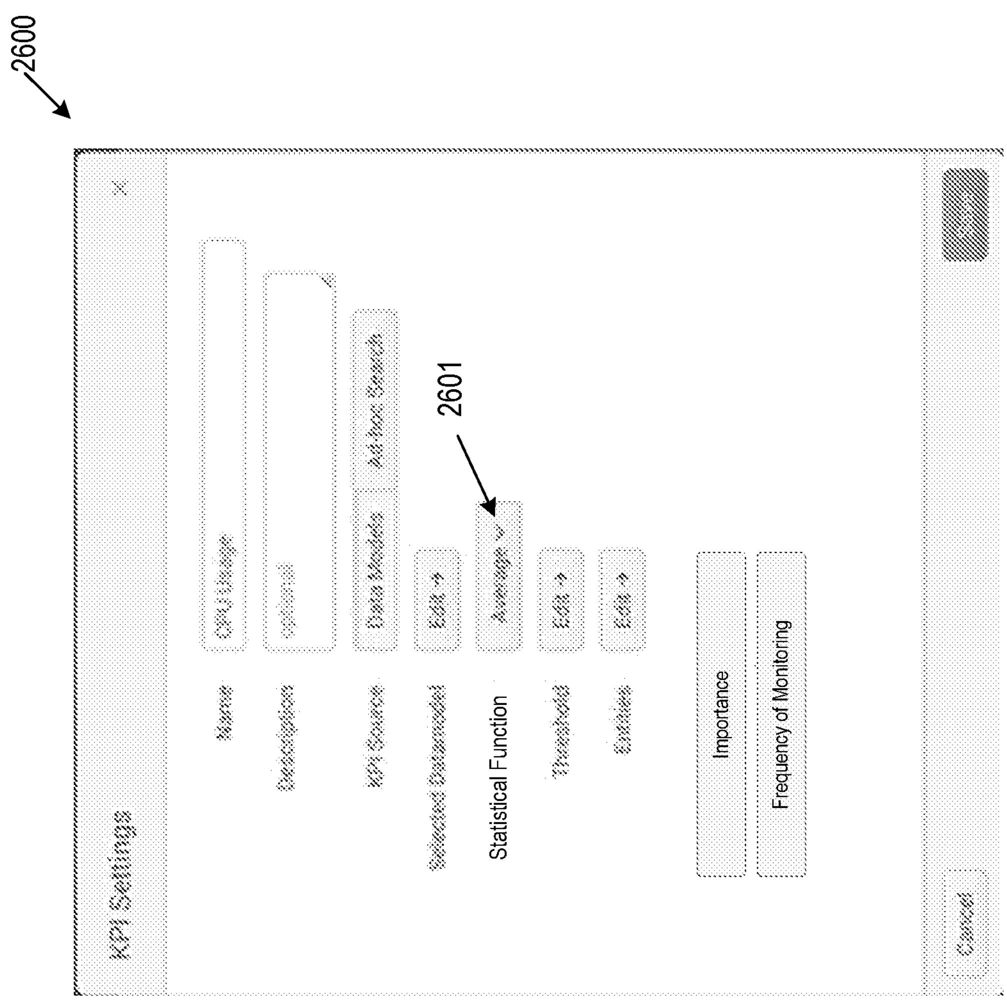
FIG. 26 illustrates an example of a GUI for displaying a selected statistic, in accordance with one or more implementations of the present disclosure.

Referring to FIG. 24, GUI 2400 can display a button 2408 for optionally selecting a statistical function to calculate a statistic using the value(s) from the field (e.g., cpu_load_percent 2513). If a statistic is calculated, the result from calculating the statistic becomes the produced value from the search query, which indicates how an aspect of the service is performing. When button 2408 is selected, GUI 2400 can display a drop-down list of statistics. The list of statistics can include, and are not limited to, average, count, count of distinct values, maximum, mean, minimum, sum, etc. For example, a user may select "average" and the value produced by the search query may be the average of the values of field cpu_load_percent 2513 for a specified time range (e.g., "Last 15 minutes"). FIG. 26 illustrates an example of a GUI 2600 of a service monitoring system for displaying a selected statistic 2601 (e.g., average), in accordance with one or more implementations of the present disclosure.

Referring to FIG. 24, GUI 2400 can facilitate user input for creating one or more thresholds for the KPI. GUI 2400 can include a button 2410 for creating the threshold(s) for the KPI. Some implementations for creating one or more thresholds for the KPI are discussed in greater detail below in conjunction with FIGS. 28-31.

GUI 2400 can include a button 2412 for editing which entity definitions to use for the KPI. Some implementations for editing which entity definitions to use for the KPI are discussed in greater detail below in conjunction with FIG. 27.

GUI 2400 can include a button 2418 for saving a definition of a KPI and an association of the defined KPI with a service. The KPI definition and association with a service can be stored in a data store.

The value for the KPI can be produced by executing the search query of the KPI. In one example, the search query defining the KPI can be executed upon receiving a request (e.g., user request). For example, a service-monitoring dashboard, which is described in greater detail below in conjunction with FIG. 35, can display a KPI widget providing a numerical or graphical representation of the value for the KPI. A user may request the service-monitoring dashboard to be displayed, and the computing machine can cause the search query for the KPI to execute in response to the request to produce the value for the KPI. The produced value can be displayed in the service-monitoring dashboard In another example, the search query defining the KPI can be executed based on a schedule. For example, the search query for a KPI can be executed at one or more particular times (e.g., 6:00 am, 12:00 pm, 6:00 pm, etc.) and/or based on a period of time (e.g., every 5 minutes). In one example, the values produced by a search query for a KPI by executing the search query on a schedule are stored in a data store, and are used to calculate an aggregate KPI score for a service, as described in greater detail below in conjunction with FIGS. 32-33. An aggregate KPI score for the service is indicative of an overall performance of the KPIs of the service.

Referring to FIG. 24, GUI 2400 can include a button 2416 to receive input specifying a frequency of monitoring (schedule) for determining the value produced by the search query of the KPI. The frequency of monitoring (e.g., schedule) of the KPI can be used to determine a resolution for an aggregate KPI score for the service. The aggregate KPI score for the service is indicative of an overall performance of the KPIs of the service. The accuracy of the aggregate KPI score for the service for a given point in time can be based on the frequency of monitoring of the KPI. For example, a higher frequency can provide higher resolution which can help produce a more accurate aggregate KPI score.

The machine data used by a search query defining a KPI to produce a value can be based on a time range. The time range can be a user-defined time range or a default time range. For example, in the service-monitoring dashboard example above, a user can select, via the service-monitoring dashboard, a time range to use (e.g., Last 15 minutes) to further specify, for example, based on time-stamps, which machine data should be used by a search query defining a KPI. In another example, the time range may be to use the machine data since the last time the value was produced by the search query. For example, if the KPI is assigned a frequency of monitoring of 5 minutes, then the search query can execute every 5 minutes, and for each execution use the machine data for the last 5 minutes relative to the execution time. In another implementation, the time range is a selected (e.g., user-selected) point in time and the definition of an individual KPI can specify the aggregation period for the respective KPI. By including the aggregation period for an individual KPI as part of the definition of the respective KPI, multiple KPIs can run on different aggregation periods, which can more accurately represent certain types of aggregations, such as, distinct counts and sums, improving the utility of defined thresholds. In this manner, the value of each KPI can be displayed at a given point in time. In one example, a user may also select "real time" as the point in time to produce the most up to date value for each KPI using its respective individually defined aggregation period.

Figure 27:
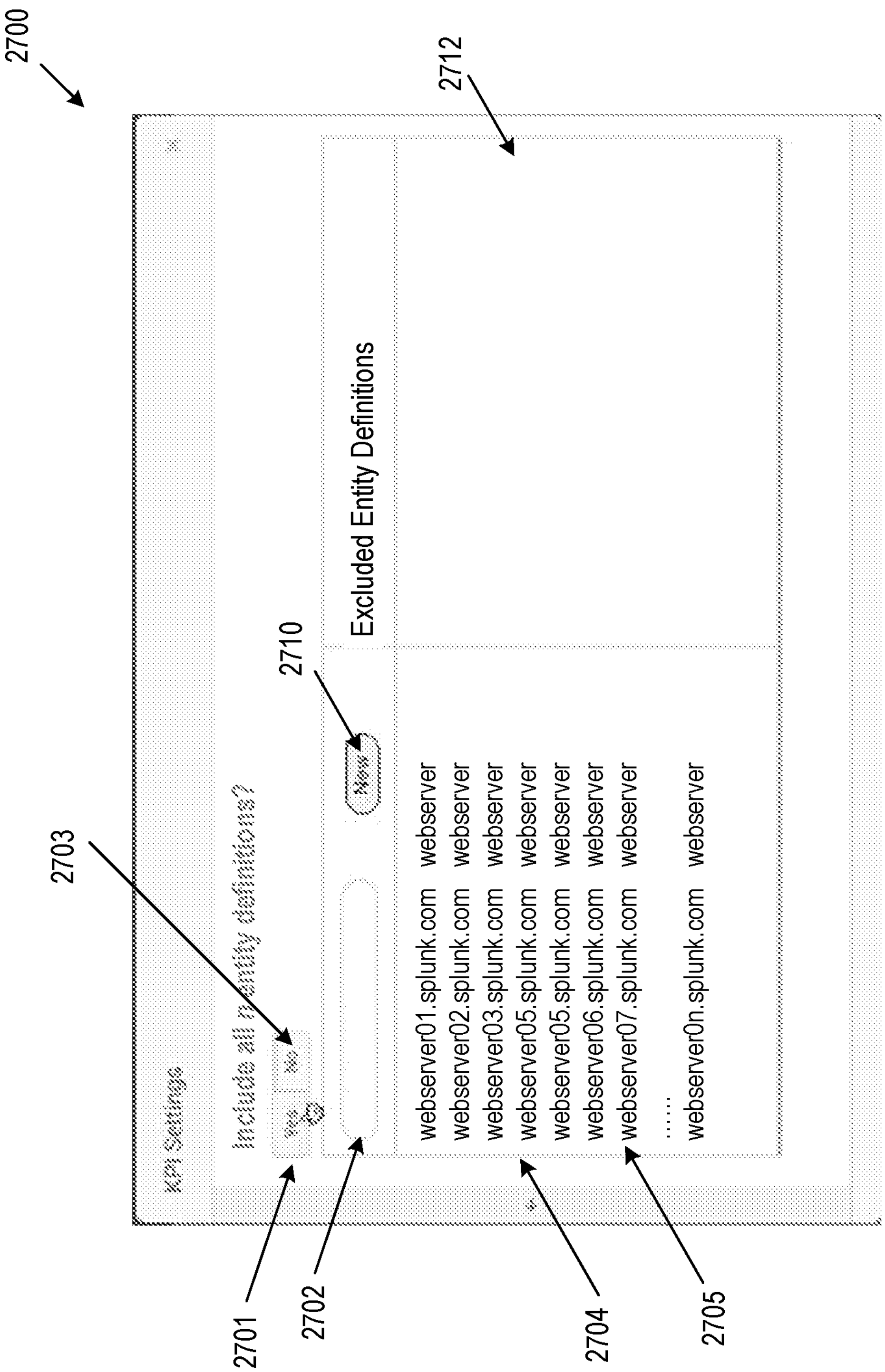
FIG. 27 illustrates an example of a GUI for editing which entity definitions to use for the KPI, in accordance with one or more implementations of the present disclosure.

GUI 2400 can include a button 2414 to receive input assigning a weight to the KPI to indicate an importance of the KPI for the service relative to other KPIs defined for the service. The importance (e.g., weight) of the KPI can be used to determine an aggregate KPI score for the service, which is indicative of an overall performance of the KPIs of the service. Some implementations for using the importance and frequency of monitoring for each KPI to determine an aggregate KPI score for the service are discussed in greater detail below in conjunction with FIGS. 32-33. FIG. 27 illustrates an example of a GUI 2700 of a service monitoring system for editing which entity definitions to use for a KPI, in accordance with one or more implementations of the present disclosure. GUI 2700 may be displayed in response to the user activation of button 2412 in GUI 2400 of FIG. 24. GUI 2700 can include a button 2710 for creating a new entity definition. If button 2710 is selected, GUI 1600 in FIG. 16 can be displayed and an entity definition can be created as described above in conjunction with FIG. 6 and FIG. 16.

Referring to FIG. 27, GUI 2700 can display buttons 2701, 2703 for receiving a selection of whether to include all of the entity definitions, which are associated with the service via the service definition, for the KPI. If the Yes button 2701 is selected, the search query for the KPI can produce a value derived from the machine data pertaining to all of the entities represented by the entity definitions that are included in the service definition for the service. If the No button 2703 is selected, a member list 2704 is displayed. The member list 2704 includes the entity definitions that are included in the service definition for the service. GUI 2700 can include a filter box 2702 to receive input for filtering the member list 2704 of entity definitions to display a subset of the entity definitions.

GUI 2700 can facilitate user input for selecting one or more entity definitions from the member list 2704 and dragging the selected entity definition(s) to an exclusion list 2712 to indicate that the entities identified in each selected entity definition should not be considered for the current KPI. This exclusion means that the search criteria of the search query defining the KPI is changed to no longer search for machine data pertaining to the entities identified in the entity definitions from the exclusion list 2712. For example, entity definition 2705 (e.g., webserver07.splunk.com) can be selected and dragged to the exclusion list 2712. When the search query for the KPI produces a value, the value will be derived from machine data, which does not include machine data pertaining to webserver07.splunk.com.

Figure 28:
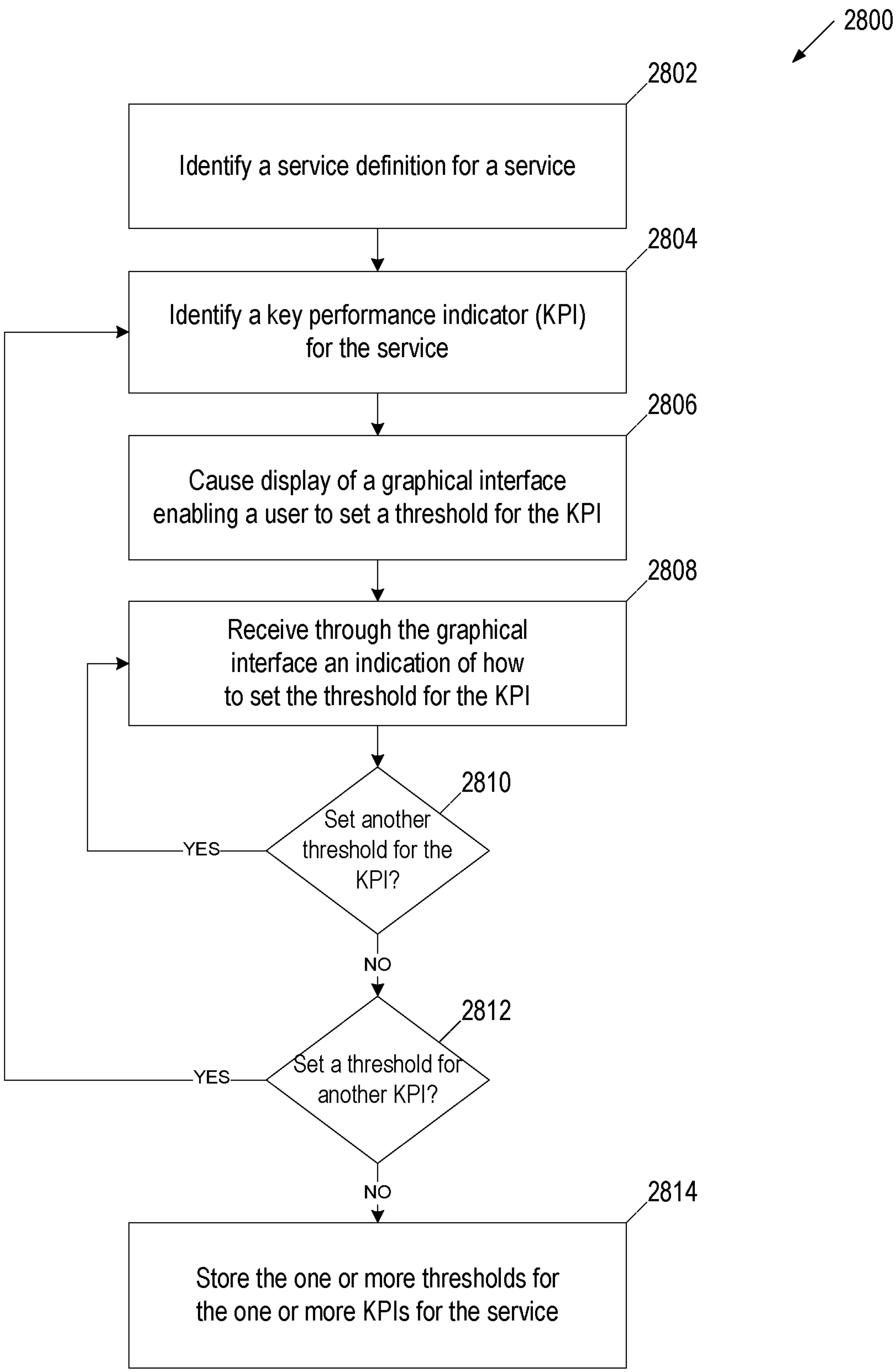
FIG. 28 is a flow diagram of an implementation of a method for defining one or more thresholds for a KPI, in accordance with one or more implementations of the present disclosure.

FIG. 28 is a flow diagram of an implementation of a method 2800 for defining one or more thresholds for a KPI, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, the method is performed by the client computing machine. In another implementation, the method is performed by a server computing machine coupled to the client computing machine over one or more networks.

At block 2802, the computing machine identifies a service definition for a service. In one implementation, the computing machine receives input (e.g., user input) selecting a service definition. The computing machine accesses the service definition for a service from memory.

At block 2804, the computing machine identifies a KPI for the service. In one implementation, the computing machine receives input (e.g., user input) selecting a KPI of the service. The computing machine accesses data representing the KPI from memory.

At block 2806, the computing machine causes display of one or more graphical interfaces enabling a user to set a threshold for the KPI. The KPI can be in one of multiple states. Example states can include, and are not limited to, unknown, trivial state, informational state, normal state, warning state, error state, and critical state. Each state can be represented by a range of values. At a certain time, the KPI can be in one of the states depending on which range the value, which is produced by the search query for the KPI, falls into. Each threshold defines an end of a range of values, which represents one of the states. Some examples of graphical interfaces for enabling a user to set a threshold for the KPI are discussed in greater detail below in conjunction with FIG. 29A to FIG. 31C.

At block 2808, the computing machine receives, through the graphical interfaces, an indication of how to set the threshold for the KPI. The computing machine can receive input (e.g., user input), via the graphical interfaces, specifying the field or alias that should be used for the threshold(s) for the KPI. The computing machine can also receive input (e.g., user input), via the graphical interfaces, of the parameters for each state. The parameters for each state can include, for example, and not limited to, a threshold that defines an end of a range of values for the state, a unique name, and one or more visual indicators to represent the state.

In one implementation, the computing machine receives input (e.g., user input), via the graphical interfaces, to set a threshold and to apply the threshold to the KPI as determined using the machine data from the aggregate of the entities associated with the KPI.

In another implementation, the computing machine receives input (e.g., user input), via the graphical interfaces, to set a threshold and to apply the threshold to a KPI as the KPI is determine using machine data on a per entity basis for the entities associated with the KPI. For example, the computing machine can receive a selection (e.g., user selection) to apply thresholds on a per entity basis, and the computing machine can apply the thresholds to the value of the KPI as the value is calculated per entity.

For example, the computing machine may receive input (e.g., user input), via the graphical interfaces, to set a threshold of being equal or greater than 80% for the KPI for Avg CPU Load, and the KPI is associated with three entities (e.g., Entity-1, Entity-2, and Entity-3). When the KPI is determined using data for Entity-1, the value for the KPI for Avg CPU Load may be at 50%. When the KPI is determined using data for Entity-2, the value for the KPI for Avg CPU Load may be at 50%. When the KPI is determined using data for Entity-3, the value for the KPI for Avg CPU Load may be at 80%. If the threshold is applied to the values of the aggregate of the entities (two at 50% and one at 80%), the aggregate value of the entities is 60%, and the KPI would not exceed the 80% threshold. If the threshold is applied using an entity basis for the thresholds (applied to the individual KPI values as calculated pertaining to each entity), the computing machine can determine that the KPI pertaining to one of the entities (e.g., Entity-3) satisfies the threshold by being equal to 80%.

At block 2810, the computing machine determines whether to set another threshold for the KPI. The computing machine can receive input, via the graphical interface, indicating there is another threshold to set for the KPI. If there is another threshold to set for the KPI, the computing machine returns to block 2808 to set the other threshold.

If there is not another threshold to set for the KPI (block 2810), the computing machine determines whether to set a threshold for another KPI for the service at block 2812. The computing machine can receive input, via the graphical interface, indicating there is a threshold to set for another KPI for the service. In one implementation, there are a maximum number of thresholds that can be set for a KPI. In one implementation, a same number of states are to be set for the KPIs of a service. In one implementation, a same number of states are to be set for the KPIs of all services. The service monitoring system can be coupled to a data store that stores configuration data that specifies whether there is a maximum number of thresholds for a KPI and the value for the maximum number, whether a same number of states is to be set for the KPIs of a service and the value for the number of states, and whether a same number of states is to be set for the KPIs of all of the service and the value for the number of states. If there is a threshold to set for another KPI, the computing machine returns to block 2804 to identity the other KPI.

At block 2814, the computing machine stores the one or more threshold settings for the one or more KPIs for the service. The computing machine associates the parameters for a state defined by a corresponding threshold in a data store that is coupled to the computing machine.

As will be discussed in more detail below, implementations of the present disclosure provide a service-monitoring dashboard that includes KPI widgets ("widgets") to visually represent KPIs of the service. A widget can be a Noel gauge, a spark line, a single value, or a trend indicator. A Noel gauge is indicator of measurement as described in greater detail below in conjunction with FIG. 40. A widget of a KPI can present one or more values indicating how a respective service or an aspect of a service is performing at one or more points in time. The widget can also illustrate (e.g., using visual indicators such as color, shading, shape, pattern, trend compared to a different time range, etc.) the KPI's current state defined by one or more thresholds of the KPI.

Figure 29B:
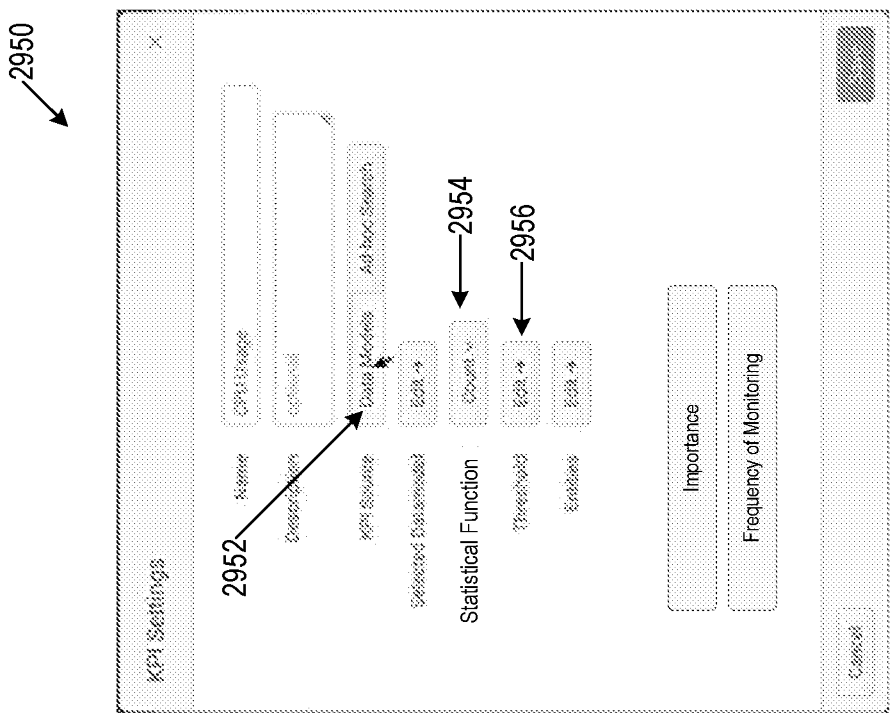
FIGS. 29A-B, illustrate examples of a graphical interface enabling a user to set a threshold for the KPI, in accordance with one or more implementations of the present disclosure.
Figure 29A:
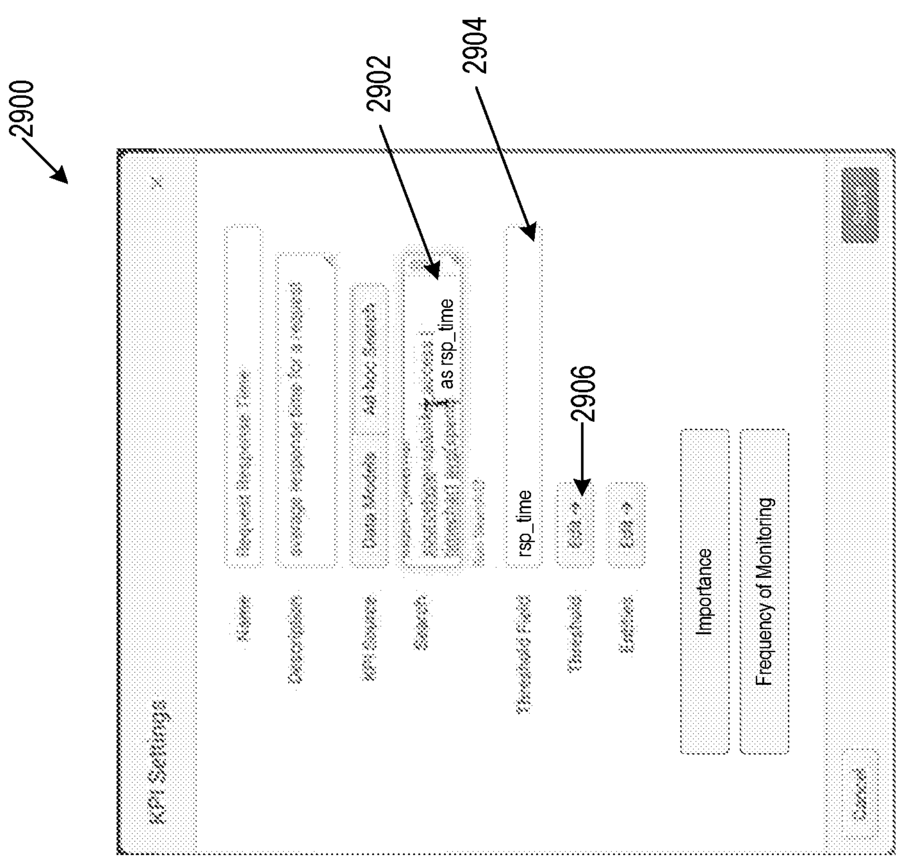

FIGS. 29A-B illustrate examples of a graphical interface enabling a user to set one or more thresholds for the KPI, in accordance with one or more implementations of the present disclosure.

FIG. 29A illustrates an example GUI 2900 for receiving input for search processing language 2902 for defining a search query, in accordance with one or more implementations of the present disclosure. The KPI can be in one of multiple states (e.g., normal, warning, critical). Each state can be represented by a range of values. At a certain time, the KPI can be in one of the states depending on which range the value, which is produced by the search query for the KPI, falls into. GUI 2900 can display an input box 2904 for a field to which the threshold(s) can be applied. In particular, a threshold can be applied to the value produced by the search query defining the KPI. The value can be, for example, the field's value extracted from an event when the search query is executed, a statistic calculated based on one or more values of the field in one or more events located when the search query is executed, a count of events satisfying the search criteria that include a constraint for the field, etc. GUI 2900 may include the name 2904 of the actual field used in the search query or the name of an alias that defines a desired statistic or count to be produced by the search query. For example, the threshold may be applied to an average response time produced by the search query, and the average response time can be defined by the alias "rsp_time" in the input box 2904.

FIG. 29B illustrates an example GUI 2950 for receiving input for selecting a data model for defining a search query, in accordance with one or more implementations of the present disclosure. GUI 2950 can be displayed if a KPI is defined using a data model.

Figure 30:
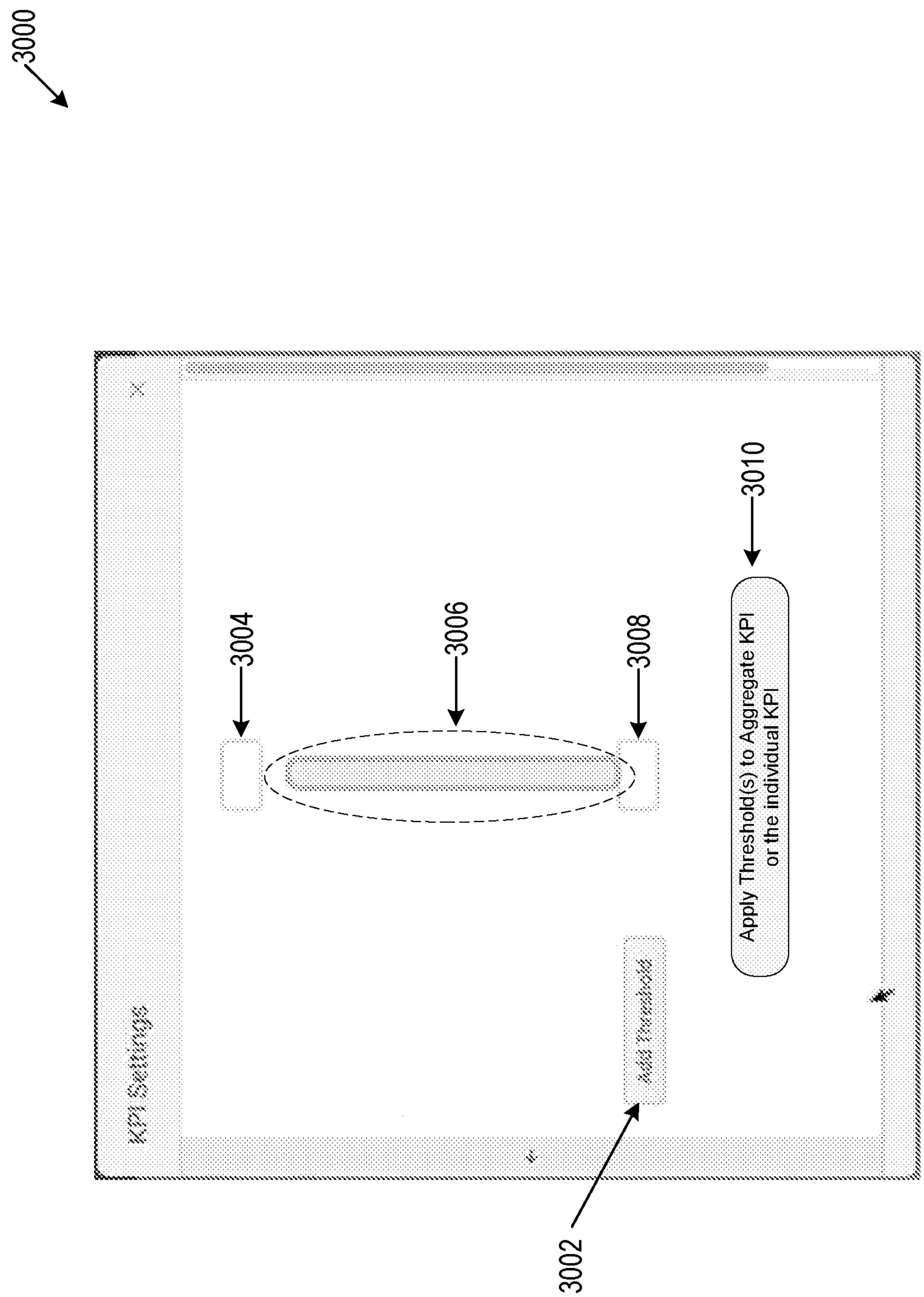
FIG. 30 illustrates an example GUI for enabling a user to set one or more thresholds for the KPI, in accordance with one or more implementations of the present disclosure.

GUI 2950 in FIG. 29B can include a statistical function 2954 to be used for producing a value when executing the search query of the KPI. As shown, the statistical function 2954 is a count, and the resulting statistic (the count value) should be compared with one or more thresholds of the KPI. The GUI 2950 also includes a button 2956 for creating the threshold(s) for the KPI. When either button 2906 is selected from GUI 2900 or button 2956 is selected from GUI 2950, GUI 3000 of FIG. 30 is displayed.

Figure 29C:
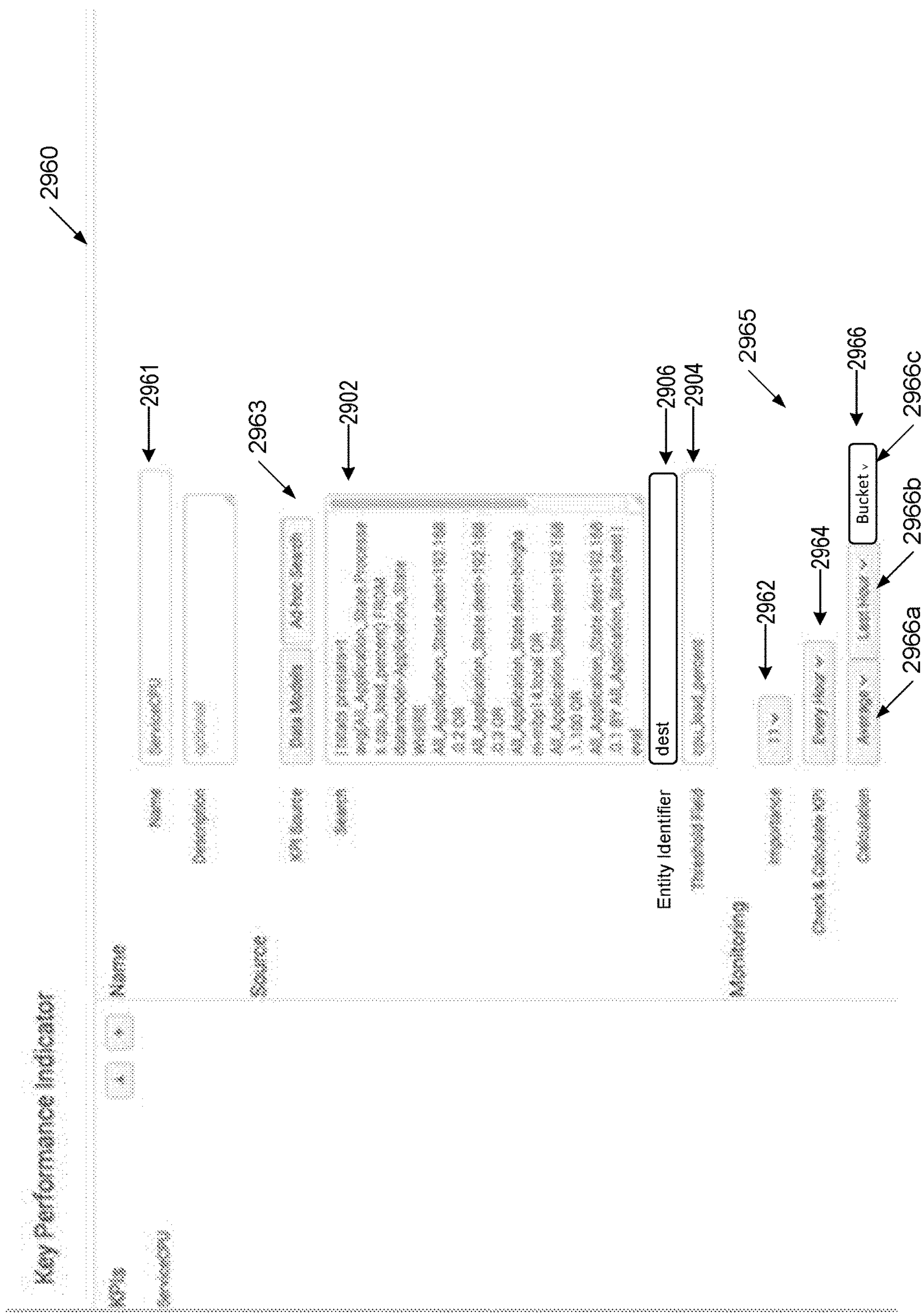
FIG. 29C illustrates an example GUI 2960 for configuring KPI monitoring in accordance with one or more implementations of the present disclosure.

FIG. 29C illustrates an example GUI 2960 for configuring KPI monitoring in accordance with one or more implementations of the present disclosure. GUI 2960 may present information specifying a service definition corresponding to a service provided by a plurality of entities, and a specification for determining a KPI for the service. The service definition refers to a data structure, organization, or representation that can include information that associates one or more entities with a service. The service definition can include information for identifying the service definition, such as, for example, a name or other identifier for the service or service definition as may be indicated using GUI element 2961. The specification for determining a KPI for the service refers to the KPI definitional information that can include source-related definitional information of a group of GUI elements 2963 and monitoring-related parameter information of a group of GUI elements 2965. The source-related definitional information of a group of GUI elements 2963 can include, as illustrated by FIG. 29C, a search defining the KPI as presented in a GUI element 2902, one or more entity identifiers for entities providing the service as presented in a GUI element 2906, one or more threshold field names for fields derived from the entities' machine data as presented in a GUI element 2904. (The named fields derived from the entities' machine data may be used to derive a value produced by the search of 2902.) The monitoring-related parameter information of a group of GUI elements 2963 can include, as illustrated in FIG. 29C, an importance indicator presented by GUI element 2962, a calculation frequency indicator presented by GUI element 2964, and a calculation period indicator presented by GUI element 2966. Once KPI definitional information (2963 and 2965) is adequately indicated using GUI 2960, a specification for determining a KPI can be stored as part of the service definition (e.g., in the same database or file, for example), or in association with the service definition (e.g., in a separate database or file, for example, where the service definition, the KPI specification, or both, include information for associating the other). The adequacy of KPI definitional information can be determined in response to a specific user interaction with the GUI, by an automatic analysis of one or more user interactions with the GUI, or by some combination, for example.

The search of 2902 is represented by search processing language for defining a search query that produces a value derived from machine data pertaining to the entities that provide the service and which are identified in the service definition. The value can indicate a current state of the KPI (e.g., normal, warning, critical). An entity identifier of 2906 specifies one or more fields (e.g., dest, ip_address) that can be used to identify one or more entities whose machine data should be used in the search of 2902. The threshold field GUI element 2904 enables specification of one or more fields from the entities' machine data that should be used to derive a value produced by the search of 2902. One or more thresholds can be applied to the value associated with the specified field(s) of 2904. In particular, the value can be produced by a search query using the search of 2902 and can be, for example, the value of threshold field 2904 associated with an event satisfying search criteria of the search query when the search query is executed, a statistic calculated based on values for the specified threshold field of 2904 associated with the one or more events satisfying the search criteria of the search query when the search query is executed, or a count of events satisfying the search criteria of the search query that include a constraint for the threshold field of 2904, etc. In the example illustrated in GUI 2960, the designated threshold field of 2904 is "cpu_load_percent," which may represent the percentage of the maximum processor load currently being utilized on a particular machine. In other examples, the threshold(s) may be applied a field specified in 2904 which may represent other metrics such as total memory usage, remaining storage capacity, server response time, or network traffic, for example.

In one implementation, the search query includes a machine data selection component and a determination component. The machine data selection component is used to arrive at a set of machine data from which to calculate a KPI. The determination component is used to derive a representative value for an aggregate of the set of machine data. In one implementation, the machine data selection component is applied once to the machine data to gather the totality of the machine data for the KPI, and returns the machine data sorted by entity, to allow for repeated application of the determination component to the machine data pertaining to each entity on an individual basis. In one implementation, portions of the machine data selection component and the determination component may be intermixed within search language of the search query (the search language depicted in 2902, as an example of search language of a search query).

KPI monitoring parameters 2965 refer to parameters that indicate how to monitor the state of the KPI defined by the search of 2902. In one embodiment, KPI monitoring parameters 2965 include the importance indicator of 2962, the calculation frequency indicator of 2964, and the calculation period indicator of element 2966.

GUI element 2964 may include a drop-down menu with various interval options for the calculation frequency indicator. The interval options indicate how often the KPI search should run to calculate the KPI value. These options may include, for example, every minute, every 15 minutes, every hour, every 5 hours, every day, every week, etc. Each time the chosen interval is reached, the KPI is recalculated and the KPI value is populated into a summary index, allowing the system to maintain a record indicating the state of the KPI over time.

GUI element 2966 may include individual GUI elements for multiple calculation parameters, such as drop-down menus for various statistic options 2966*a*, periods of time options 2966*b*, and bucketing options 2966*c*. The statistic options drop-down 2966*a* indicates a selected one (i.e., "Average") of the available methods in the drop-down (not shown) that can be applied to the value(s) associated with the threshold field of 2904. The expanded drop-down may display available methods such as average, maximum, minimum, median, etc. The periods of time options drop-down 2966*b* indicates a selected one (i.e., "Last Hour") of the available options (not shown). The selected period of time option is used to identify events, by executing the search query, associated with a specific time range (i.e., the period of time) and each available option represents the period over which the KPI value is calculated, such as the last minute, last 15 minutes, last hour, last 4 hours, last day, last week, etc. Each time the KPI is recalculated (e.g., at the interval specified using 2964), the values are determined according to the statistic option specified using 2966*a*, over the period of time specified using 2966*b*. The bucketing options of drop-down 2966*c* each indicate a period of time from which the calculated values should be grouped together for purposes of determining the state of the KPI. The bucketing options may include by minute, by 15 minutes, by hour, by four hours, by day, by week, etc. For example, when looking at data over the last hour and when a bucketing option of 15 minutes is selected, the calculated values may be grouped every 15 minutes, and if the calculated values (e.g., the maximum or average) for the 15 minute bucket cross a threshold into a particular state, the state of the KPI for the whole hour may be set to that particular state.

Importance indicator of 2962 may include a drop-down menu with various weighting options. As discussed in more detail with respect to FIGS. 32 and 33, the weighting options indicate the importance of the associated KPI value to the overall health of the service. These weighting options may include, for example, values from 1 to 10, where the higher values indicate higher importance of the KPI relative to the other KPIs for the service. When determining the overall health of the service, the weighting values of each KPI may be used as a multiplier to normalize the KPIs, so that the values of KPIs having different weights may be combined together. In one implementation, a weighting option of 11 may be available as an overriding weight. The overriding weight is a weight that overrides the weights of all other KPIs of the service. For example, if the state of the KPI, which has the overriding weight, is "warning" but all other KPIs of the service have a "normal" state, then the service may only be considered in a warning state, and the normal state(s) for the other KPIs can be disregarded.

FIG. 30 illustrates an example GUI 3000 for enabling a user to set one or more thresholds for the KPI, in accordance with one or more implementations of the present disclosure. Each threshold for a KPI defines an end of a range of values, which represents one of the states. GUI 3000 can display a button 3002 for adding a threshold to the KPI. If button 3002 is selected, a GUI for facilitating user input for the parameters for the state associated with the threshold can be displayed, as discussed in greater detail below in conjunction with FIGS. 31A-C.

Referring to FIG. 30, if button 3002 is selected three times, there will be three thresholds for the KPI. Each threshold defines an end of a range of values, which represents one of the states. GUI 3000 can display a UI element (e.g., column 3006) that includes sections representing the defined states for the KPI, as described in greater detail below in conjunction with FIGS. 31A-C. GUI 3000 can facilitate user input to specify a maximum value 3004 and a minimum value 3008 for defining a scale for a widget that can be used to represent the KPI on the service-monitoring dashboard. Some implementations of widgets for representing KPIs are discussed in greater detail below in conjunction with FIGS. 40-42 and FIGS. 44-46.

Referring to FIG. 30, GUI 3000 can optionally include a button 3010 for receiving input indicating whether to apply the threshold(s) to the aggregate of the KPIs of the service or to the particular KPI. Some implementations for applying the threshold(s) to the aggregate of the KPIs of the service or to a particular KPI are discussed in greater detail below in conjunction with FIGS. 32-34.

Figure 31A:
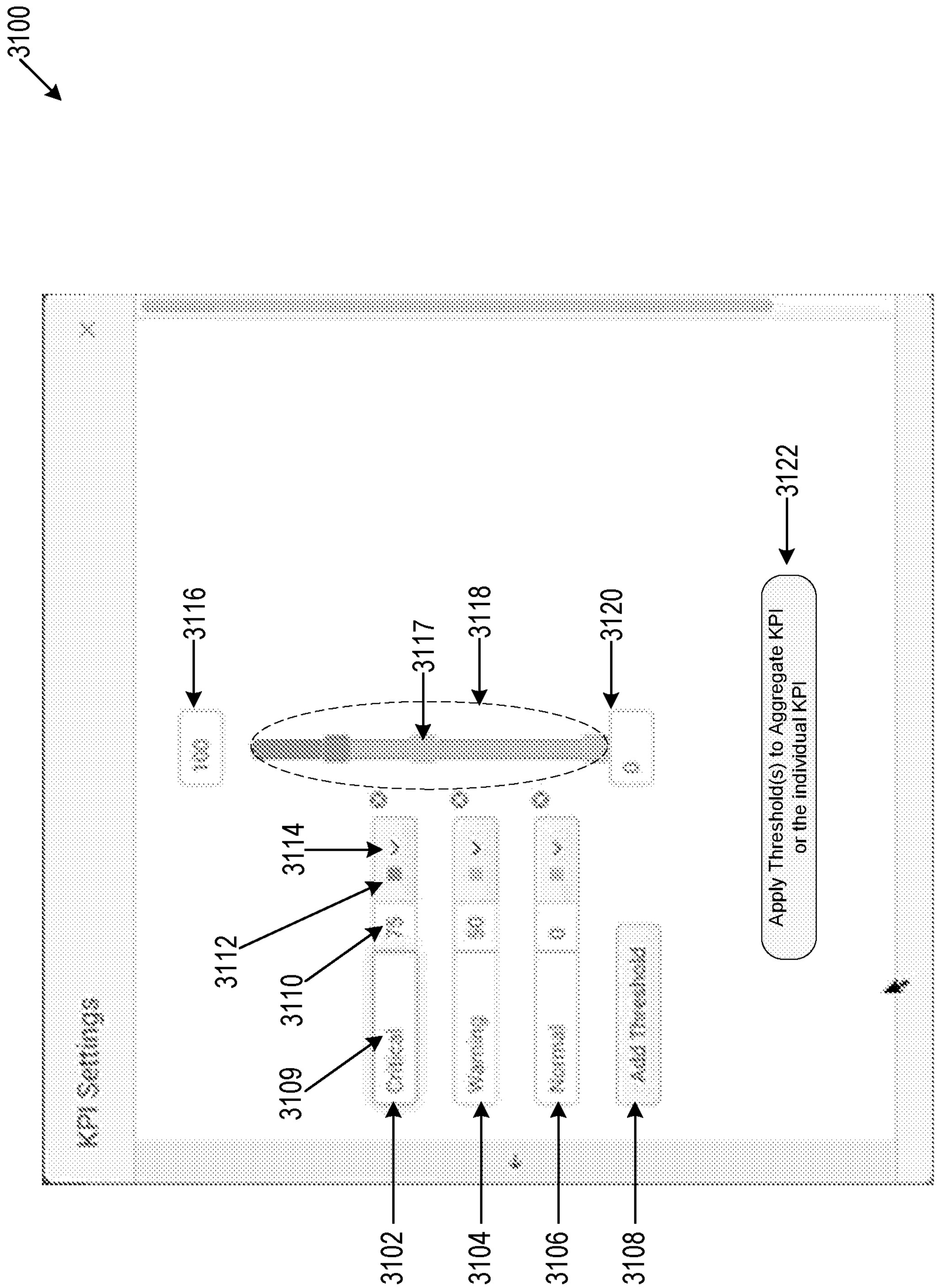
FIG. 31A-C illustrate example GUIs for defining thresholds for a KPI, in accordance with one or more implementations of the present disclosure.

FIG. 31A illustrates an example GUI 3100 for defining threshold settings for a KPI, in accordance with one or more implementations of the present disclosure. GUI 3100 is a modified view of GUI 3000, which is provided once the user has requested to add several thresholds for a KPI via button 3002 of GUI 3000. In particular, in response to the user request to add a threshold, GUI 3100 dynamically adds a GUI element in a designated area of GUI 3100. A GUI element can be in the form of an input box divided into several portions to receive various user input and visually illustrate the received input. The GUI element can represent a specific state of the KPI. When multiple states are defined for the KPI, several GUI elements can be presented in the GUI 3100. For example, the GUI elements can be presented as input boxes of the same size and with the same input fields, and those input boxes can be positioned horizontally, parallel to each other, and resemble individual records from the same table. Alternatively, other types of GUI elements can be provided to represent the states of the KPI.

Each state of the KPI can have a name, and can be represented by a range of values, and a visual indicator. The range of values is defined by one or more thresholds that can provide the minimum end and/or the maximum end of the range of values for the state. The characteristics of the state (e.g., the name, the range of values, and a visual indicator) can be edited via input fields of the respective GUI element.

In the example shown in FIG. 31A, GUI 3100 includes three GUI elements representing three different states of the KPI based on three added thresholds. These states include states 3102, 3104, and 3106.

For each state, GUI 3100 can include a GUI element that displays a name (e.g., a unique name for that KPI) 3109, a threshold 3110, and a visual indicator 3112 (e.g., an icon having a distinct color for each state). The unique name 3109, a threshold 3110, and a visual indicator 3112 can be displayed based on user input received via the input fields of the respective GUI element. For example, the name "Normal" can be specified for state 3106, the name "Warning" can be specified for state 3104, the name "Critical" can be specified for state 3102.

The visual indicator 3112 can be, for example, an icon having a distinct visual characteristic such as a color, a pattern, a shade, a shape, or any combination of color, pattern, shade and shape, as well as any other visual characteristics. For each state, the GUI element can display a drop-down menu 3114, which when selected, displays a list of available visual characteristics. A user selection of a specific visual characteristic (e.g., a distinct color) can be received for each state.

For each state, input of a threshold value representing the minimum end of the range of values for the corresponding state of the KPI can be received via the threshold portion 3110 of the GUI element. The maximum end of the range of values for the corresponding state can be either a preset value or can be defined by (or based on) the threshold associated with the succeeding state of the KPI, where the threshold associated with the succeeding state is higher than the threshold associated with the state before it.

For example, for Normal state 3106, the threshold value 0 may be received to represent the minimum end of the range of KPI values for that state. The maximum end of the range of KPI values for the Normal state 3106 can be defined based on the threshold associated with the succeeding state (e.g., Warning state 3104) of the KPI. For example, the threshold value 50 may be received for the Warning state 3104 of the KPI. Accordingly, the maximum end of the range of KPI values for the Normal state 3106 can be set to a number immediately preceding the threshold value of 50 (e.g., it can be set to 49 if the values used to indicate the KPI state are integers).

The maximum end of the range of KPI values for the Warning state 3104 is defined based on the threshold associated with the succeeding state (e.g., Critical state 3102) of the KPI. For example, the threshold value 75 may be received for the Critical state 3102 of the KPI, which may cause the maximum end of the range of values for the Warning state 3104 to be set to 74. The maximum end of the range of values for the highest state (e.g., Critical state 3102) can be a preset value or an indefinite value.

When input is received for a threshold value for a corresponding state of the KPI and/or a visual characteristic for an icon of the corresponding state of the KPI, GUI 3100 reflects this input by dynamically modifying a visual appearance of a vertical UI element (e.g., column 3118) that includes sections that represent the defined states for the KPI. Specifically, the sizes (e.g., heights) of the sections can be adjusted to visually illustrate ranges of KPI values for the states of the KPI, and the threshold values can be visually represented as marks on the column 3118. In addition, the appearance of each section is modified based on the visual characteristic (e.g., color, pattern) selected by the user for each state via a drop-down menu 3114. In some implementations, once the visual characteristic is selected for a specific state, it is also illustrated by modified appearance (e.g., modified color or pattern) of icon 3112 positioned next to a threshold value associated with that state.

For example, if the color green is selected for the Normal state 3106, a respective section of column 3118 can be displayed with the color green to represent the Normal state 3106. In another example, if the value 50 is received as input for the minimum end of a range of values for the Warning state 3104, a mark 3117 is placed on column 3118 to represent the value 50 in proportion to other marks and the overall height of the column 3118. As discussed above, the size (e.g., height) of each section of the UI element (e.g., column) 3118 is defined by the minimum end and the maximum end of the range of KPI values of the corresponding state.

In one implementation, GUI 3100 displays one or more pre-defined states for the KPI. Each predefined state is associated with at least one of a pre-defined unique name, a pre-defined value representing a minimum end of a range of values, or a predefined visual indicator. Each pre-defined state can be represented in GUI 3100 with corresponding GUI elements as described above.

GUI 3100 can facilitate user input to specify a maximum value 3116 and a minimum value 3120 for the combination of the KPI states to define a scale for a widget that represents the KPI. Some implementations of widgets for representing KPIs are discussed in greater detail below in conjunction with FIGS. 40-42 and FIGS. 44-46. GUI 3100 can display a button 3122 for receiving input indicating whether to apply the threshold(s) to the aggregate KPI of the service or to the particular KPI or both. The application of threshold(s) to the aggregate KPI of the service or to a particular KPI is discussed in more detail below in conjunction with FIG. 33.

Figure 31B:
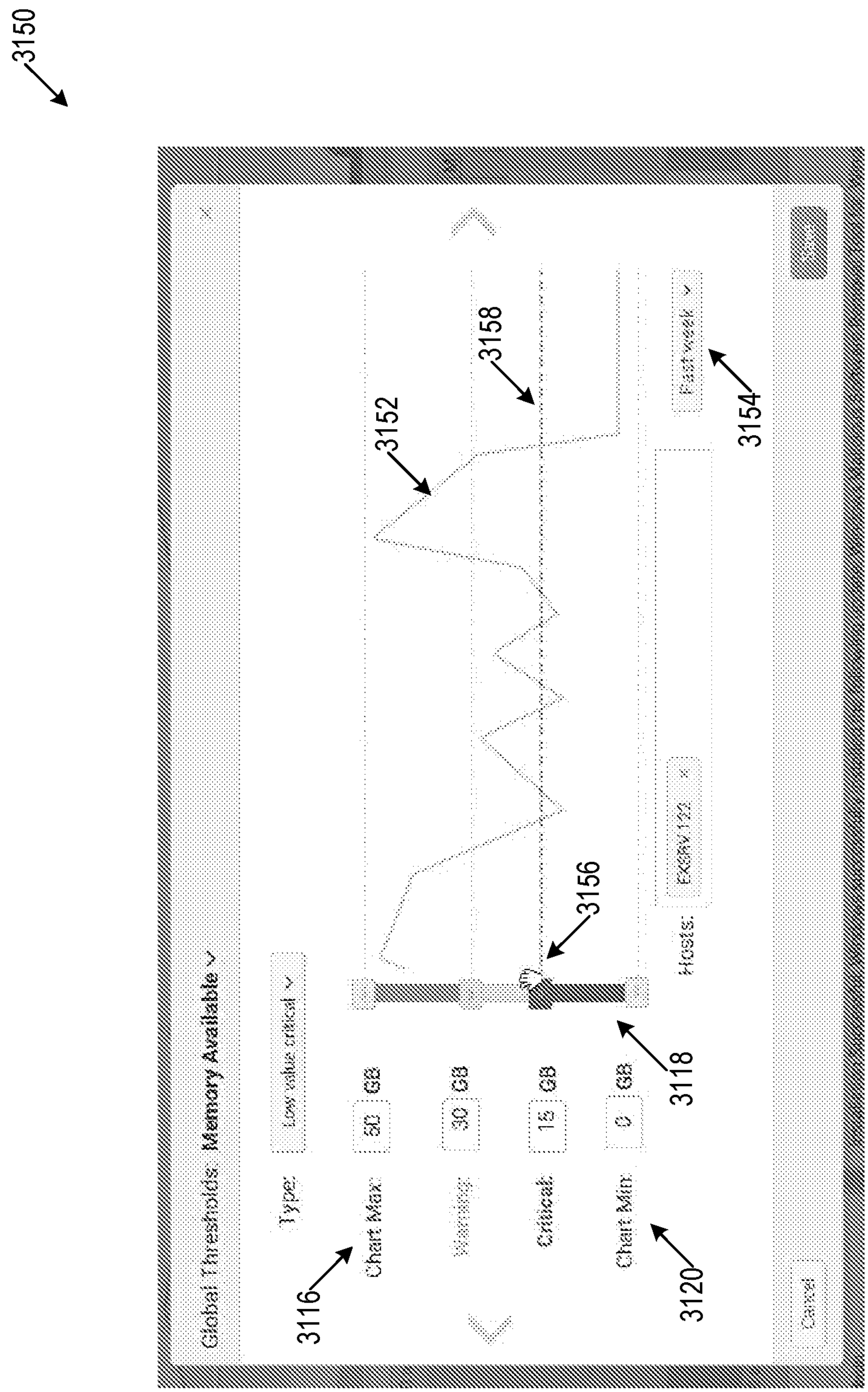
Figure 31C:
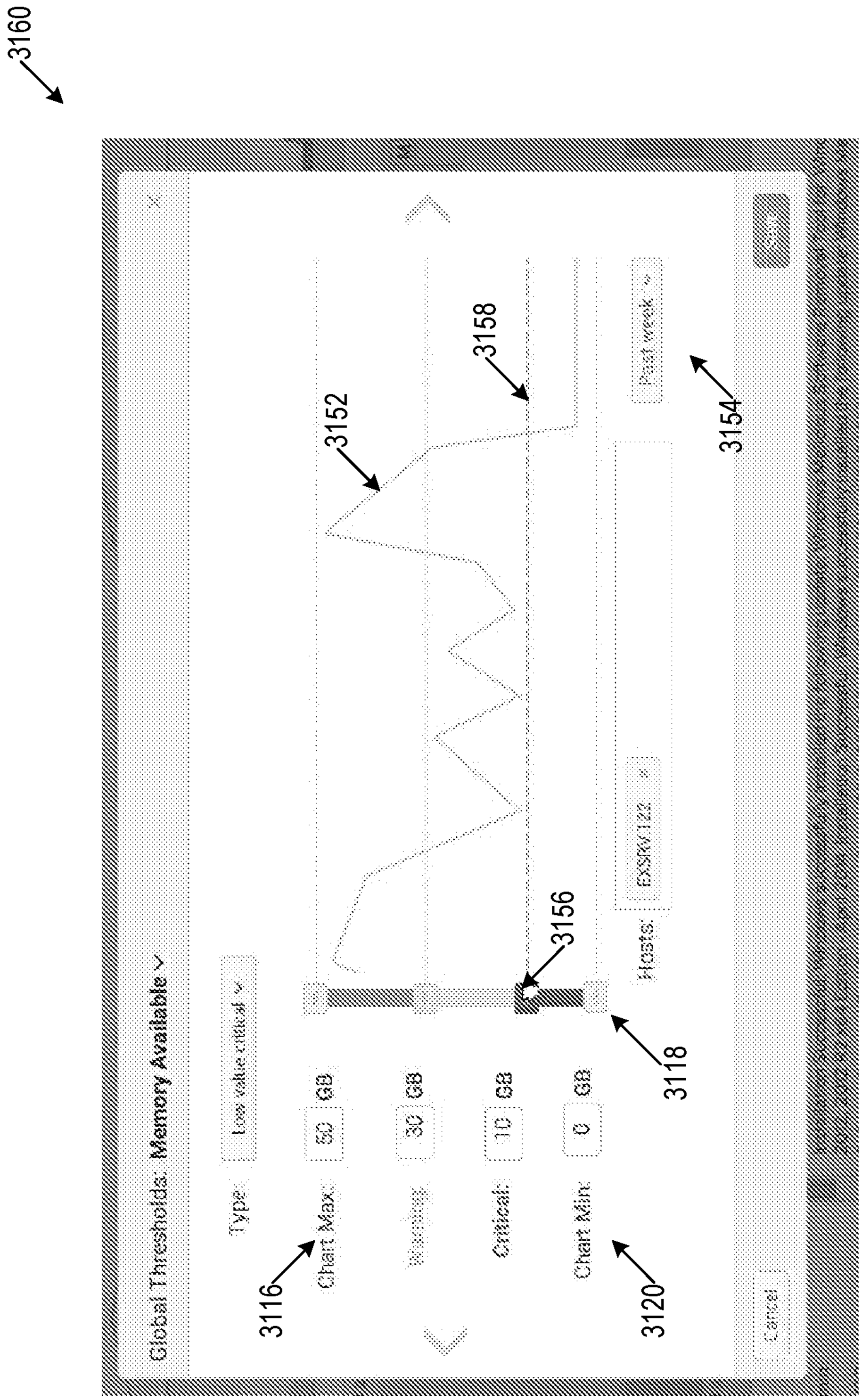

FIGS. 31B-31C illustrate GUIs for defining threshold settings for a KPI, in accordance with an alternative implementation of the present disclosure. In GUI 3150 of FIG. 31B, adjacent to column 3118, a line chart 3152 is displayed. The line chart 3152 represents the KPI values for the current KPI over a period of time selected from drop down menu 3154. The KPI values are plotted over the period of time on a first horizontal axis and against a range of values set by the maximum value 3116 and minimum value 3120 on a second vertical axis. In one implementation when a mark 3156 is added to column 3118 indicating the end of a range of values for the a particular state a horizontal line 3158 is displayed along the length of line chart 3152. The horizontal line 3158 makes it easy to visually correlate the KPI values represented by line chart 3152 with the end of the range of values. For example, in FIG. 31B, with the "Critical" state having a range below 15 GB, the horizontal line 3158 indicates that the KPI values drop below the end of the range four different times. This may provide information to a user that the end of the range of values indicated by mark 3156 can be adjusted.

In GUI 3160 of FIG. 31C, the user has adjusted the position of mark 3156, thereby decreasing the end of the range of values for the "Critical" state to 10 GB. Horizontal line 3158 is also lowered to reflect the change. In one implementation, the user may click and drag mark 3156 down to the desired value. In another implementation, the user may type in the desired value. The user can tell that the KPI values now drop below the end of the only once, thereby limiting the number of alerts associated with the defined threshold.

Figure 31D:
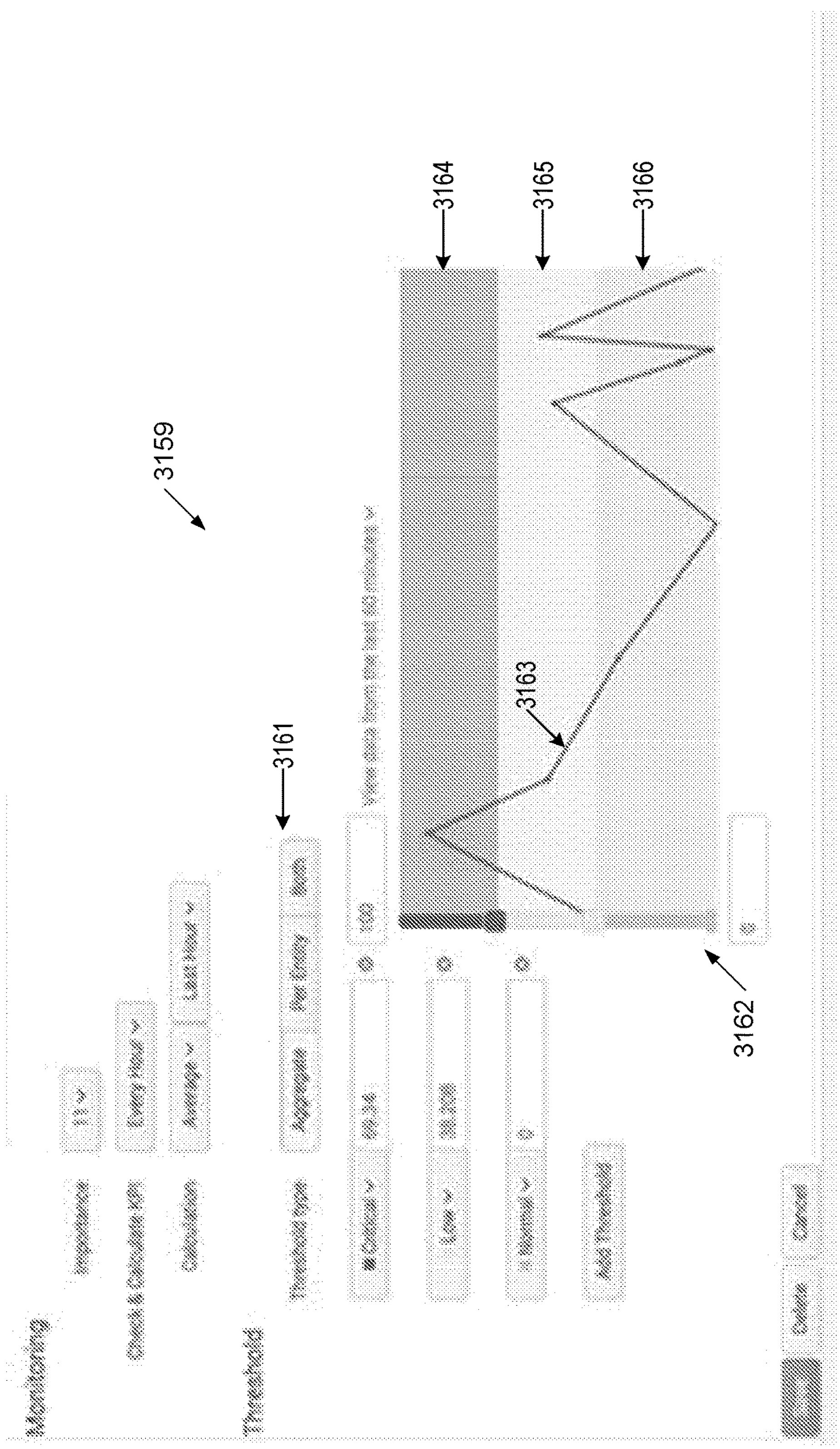
FIGS. 31D-31F illustrate example GUIs for defining threshold settings for a KPI, in accordance with alternative implementations of the present disclosure.
Figure 31E:
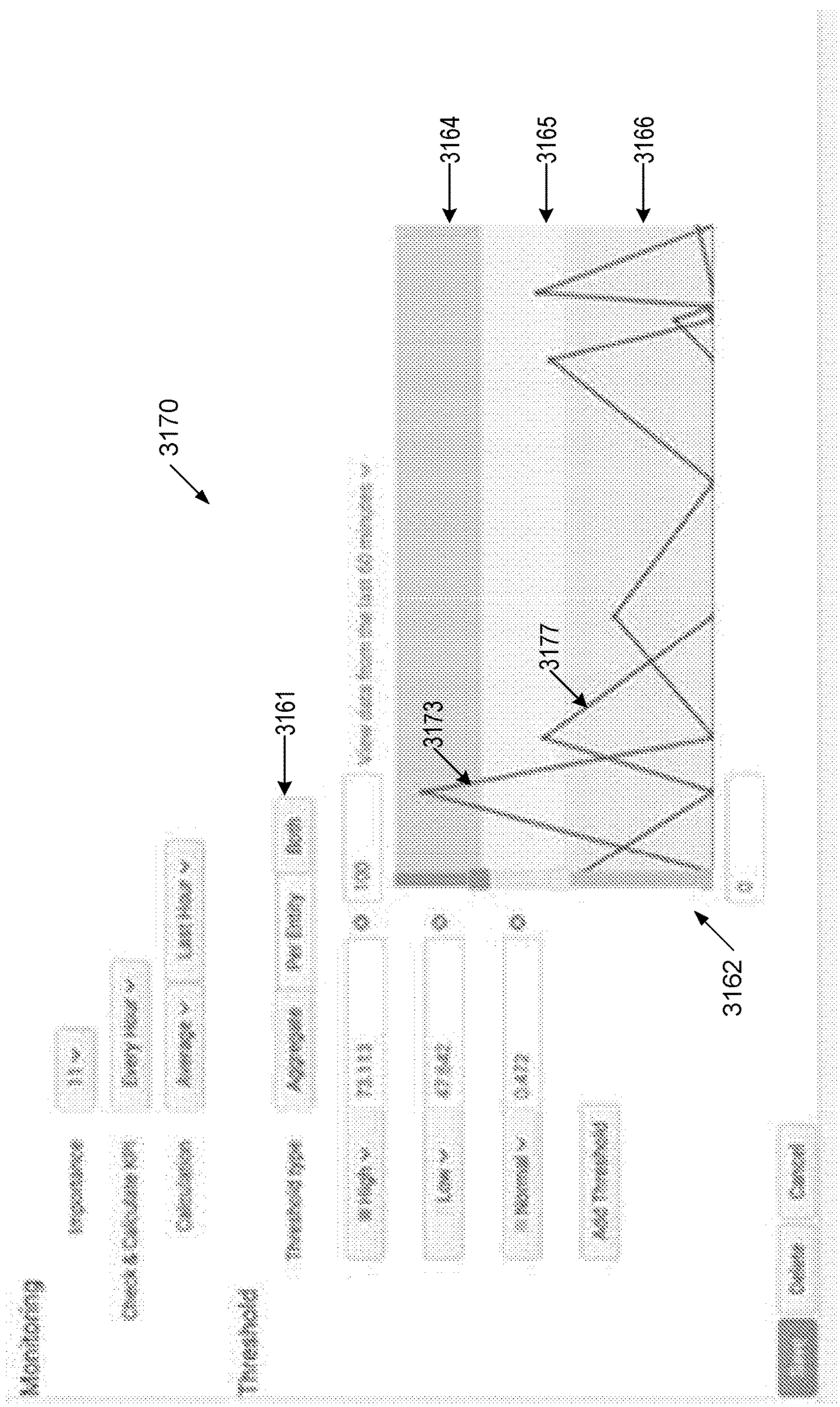
Figure 31F:
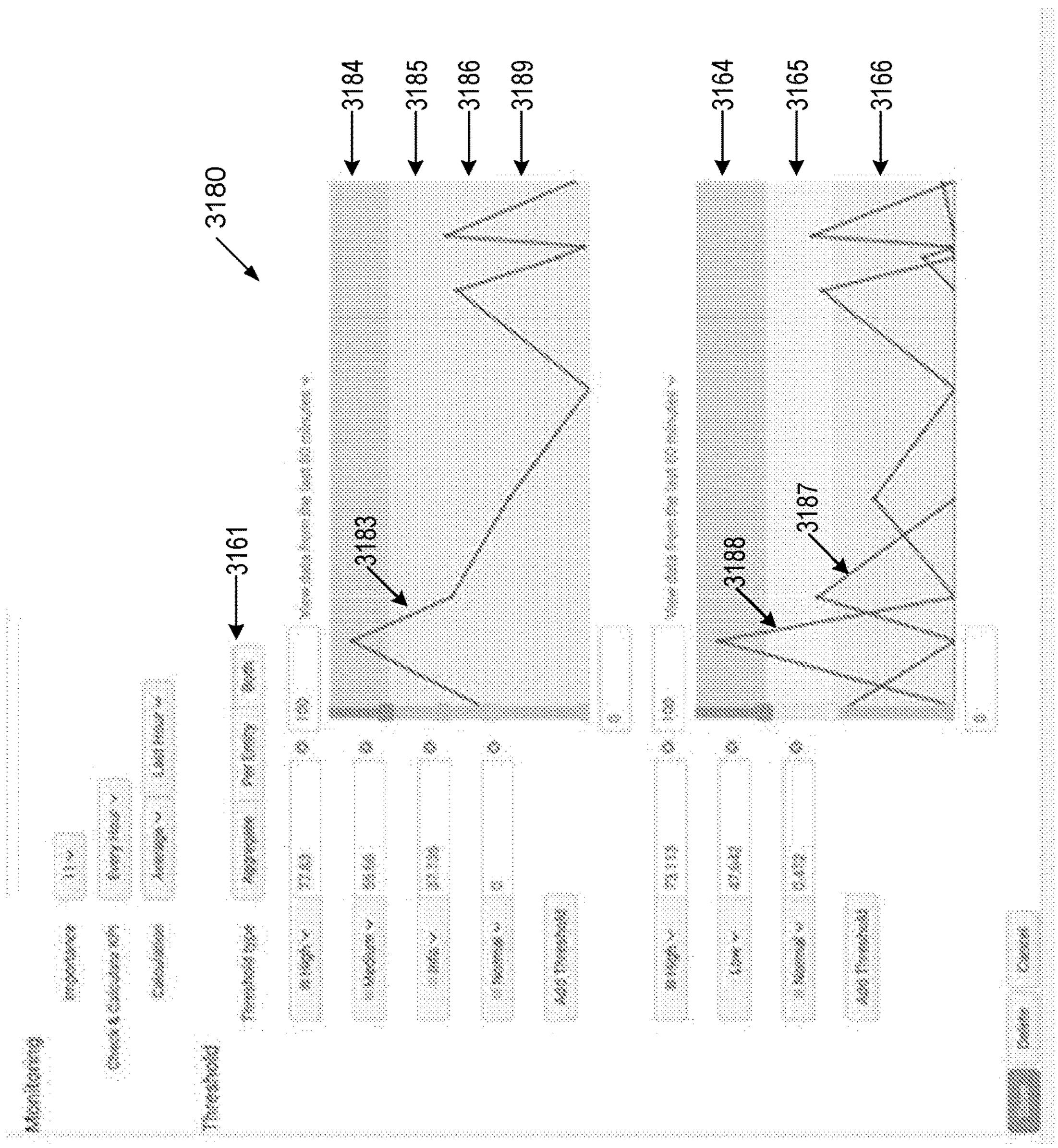

FIGS. 31D-31F illustrate example GUIs for defining threshold settings for a KPI, in accordance with alternative implementations of the present disclosure. In one implementation, for services that have multiple entities, the method for determining the KPI value from data across the multiple entities is applied on a per entity basis. For example, if machine data pertaining to a first entity searched to produce a value relevant to the KPI (e.g., CPU load) every minute while machine data pertaining to a second entity is searched to produce the value relevant to the KPI every hour, simply averaging all the values together would give a skewed result, as the sheer number of values produced from the machine data pertaining to the first entity would mask any values produced from the machine data pertaining to the second entity in the average. Accordingly, in one implementation, the average value (e.g., cpu_load_percent) per entity is calculated over the selected time period and that average value for each entity is aggregated together to determine the KPI for the service. A per-entity average value that is calculated over the selected time period can represent a contribution of a respective KPI entity to the KPI of the service. Since the values are calculated on a per entity basis, thresholds can not only be applied to the KPI of the service (calculated based on contributions of all KPI entities of the service) but also to a KPI contribution of an individual entity. Different threshold types can be defined depending on threshold usage.

In GUI 3159 of FIG. 31D, different threshold types 3161 are presented. Threshold types 3161 include an aggregate threshold type, a per-entity threshold type and a combined threshold type. An aggregate threshold type represents thresholds applied to a KPI, which represents contributions of all KPI entities in the service. With an aggregate threshold type, a current KPI state can be determined by applying the determination component of the search query to an aggregate of machine data pertaining to all individual KPI entities to produce a KPI value and applying at least one aggregate threshold to the KPI value.

A per-entity threshold type represents thresholds applied separately to KPI contributions of individual KPI entities of the service. With a per-entity threshold type, a current KPI state can be determined by applying the determination component to an aggregate of machine data pertaining to an individual KPI entity to determine a KPI contribution of the individual KPI entity, comparing at least one per-entity threshold with a KPI contribution separately for each individual KPI entity, and selecting the KPI state based on a threshold comparison with a KPI contribution of a single entity. In other words, a contribution of an individual KPI entity can define the current state of the KPI of the service. For example, if the KPI of the service is below a critical threshold corresponding to the start of a critical state but a contribution of one of the KPI entities is above the critical threshold, the state of the KPI can be determined as critical.

A combined threshold type represents discrete thresholds applied separately to the KPI values for the service and to the KPI contributions of individual entities in the service. With a combined threshold type, a current KPI state can be determined twice—first by comparing at least one aggregate threshold with the KPI of the service, and second by comparing at least one per-entity threshold with a KPI contribution separately for each individual KPI entity.

In the example of FIG. 31D, the aggregate threshold type has been selected using a respective GUI element (e.g., one of buttons 3161), and thresholds have been provided to define different states for the KPI of the service. In response to the selection of the aggregate threshold type, GUI 3159 presents an interface component including line chart 3163 that visualizes predefined KPI states and how a current state of the KPI changes over a period of time selected from the monitoring GUI 2960. In one implementation, the interface component includes a horizontal axis representing the selected period of time (e.g., last 60 minutes) and a vertical axis representing the range of possible KPI values. The various states of the KPI are represented by horizontal bands, such as 3164, 3165, 3166, displayed along the horizontal length of the interface component. In one implementation, when a mark is added to column 3162 indicating the start or end of a range of values for a particular state, a corresponding horizontal band is also displayed. The marks in column 3162 can be dragged up and down to vary the KPI thresholds, and correspondingly, the ranges of values that correspond to each different state. Line chart 3163 represents KPI values for the current KPI over a period of time selected from the monitoring GUI 2960 and determined by the determination component of the search query, as described above. The KPI values are plotted over the period of time on a horizontal axis and against a range of values set by the maximum value and minimum value on a vertical axis. The horizontal bands 3164-3166 make it easy to visually correlate the KPI values represented by line chart 3163 with the start and end of the range of values of a particular state. For example, in FIG. 31D, with the "Critical" state having a range above 69.34%, the horizontal band 3164 indicates that the KPI value exceeds the start of the range one time. Since line chart 3163 represents the KPI of the service, the values plotted by line chart 3163 may include the average of the average cpu_load_percent of all KPI entities in the service, calculated over the selected period of time. Accordingly, the state of the KPI may only change when the aggregate contribution of all KPI entities crosses the threshold from one band 3164 to another 3165.

In GUI 3170 of FIG. 31E, adjacent to column 3162, an interface component with two line charts 3173 and 3177 is displayed. In this implementation, the per entity threshold type has been selected using a respective GUI element (e.g., one of buttons 3161). Accordingly, the line charts 3173 and 3177 represent the KPI contributions of individual entities in the service over the period of time selected from the monitoring GUI 2960. The per-entity contributions are plotted over the period of time on a first horizontal axis and against a range of values set by the maximum value and minimum value on a second vertical axis. Since line charts 3173 and 3177 represent per entity KPI contributions, the values plotted by line chart 3173 may include the average cpu_load_percent of a first entity over the selected period of time, while the values plotted by line chart 3177 may include the average cpu_load_percent of a second entity over the same period of time. In one implementation, the determination component of the search query determines a contribution of an individual KPI entity from an aggregate of machine data corresponding to the individual KPI entity, applies at least one entity threshold to the contribution of the individual KPI entity, and selects a KPI state based at least in part on the determined contribution of the individual KPI entity in view of the applied threshold. Accordingly, the state of the KPI may change when any of the per entity contributions cross the threshold from one band 3166 to another 3165.

In GUI 3180 of FIG. 31F, the combined threshold type has been selected using a respective GUI element (e.g., one of buttons 3161). Accordingly GUI 3180 includes two separate interface components with one line chart 3183 on a first set of axes that represents the KPI of the service in the first interface component, and two additional line charts 3187 and 3188 on a second set of axes that represent the per entity KPI contributions in the second interface component. Both sets of axes represent the same period of time on the horizontal axes, however, the range of values on the vertical axes may differ. Similarly, separate thresholds may be applied to the service KPI represented by line chart 3183 and to the per entity KPI contributions represented by line charts 3187 and 3188. Since line chart 3183 represents the service KPI, the values plotted by line chart 3183 may include the average of the average cpu_load_percent of all entities in the service, calculated over the selected period of time. Accordingly, the state of the KPI may only change when the aggregate value crosses the thresholds that separate any of bands 3184, 3185, 3186 or 3189. Since line charts 3187 and 3188 represent per entity contributions for the KPI, the values plotted by line chart 3187 may include the average cpu_load_percent of a first entity over the selected period of time, while the values plotted by line chart 3188 may include the average cpu_load_percent of a second entity over the same period of time. Accordingly, the state of the KPI may change when any of the per entity values cross the thresholds that separate any of bands 3164, 3165 or 3166. In cases where the aggregate thresholds and per entity thresholds result in different states for the KPI, in one implementation, the more severe state may take precedence and be set as the state of the KPI. For example, if the aggregate threshold indicates a state of "Medium" but one of the per entity thresholds indicates a state of "High," the more severe "High" state may be used as the overall state of the KPI.

In one implementation, a visual indicator, also referred to herein as a "lane inspector," may be present in any of the GUIs 3150-3180. The lane inspector includes, for example, a line or other indicator that spans vertically across the bands at a given point in time along the horizontal time axis. The lane inspector may be user manipulable such that it may be moved along the time axis to different points. In one implementation, the lane inspector includes a display of the point in time at which it is currently located. In one implementation, the lane inspector further includes a display of a KPI value reflected in each of the line charts at the current point in time illustrated by the lane inspector. Additional details of the lane inspector are described below, but are equally applicable to this implementation.

Figure 31G:
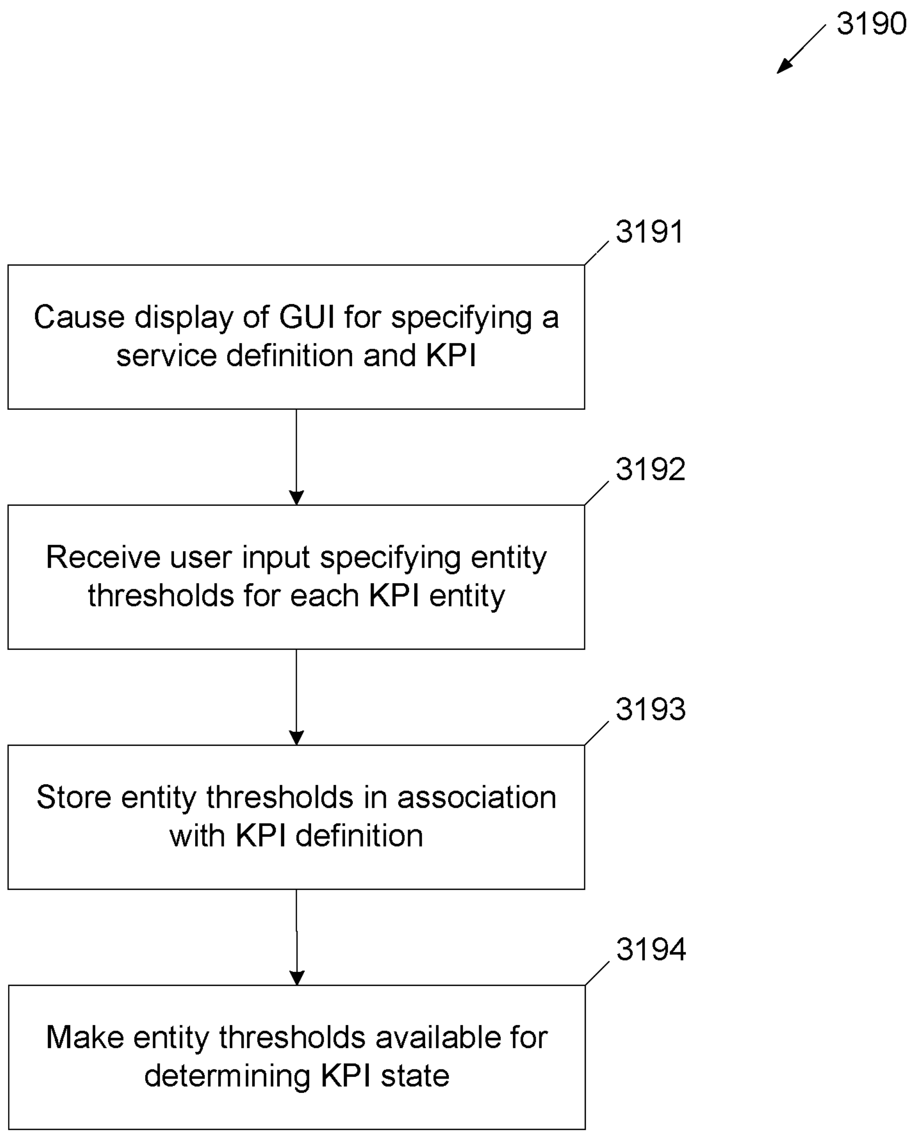
FIG. 31G is a flow diagram of an implementation of a method for defining one or more thresholds for a KPI on a per entity basis, in accordance with one or more implementations of the present disclosure.

FIG. 31G is a flow diagram of an implementation of a method for defining one or more thresholds for a KPI on a per entity basis, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, the method 3422 is performed by the client computing machine. In another implementation, the method 3422 is performed by a server computing machine coupled to the client computing machine over one or more networks.

At block 3191, the computing machine causes display of a GUI that presents information specifying a service definition for a service and a specification for determining a KPI for the service. In one implementation, the service definition identifies a service provided by a plurality of entities each having corresponding machine data. The specification for determining the KPI refers to the KPI definitional information (e.g., which entities, which records/fields from machine data, what time frame, etc.) that is being defined and is stored as part of the service definition or in association with the service definition. In one implementation, the KPI is defined by a search query that produces a value derived from the machine data pertaining to one or more KPI entities selected from among the plurality of entities. The KPI entities may include a set of entities of the service (i.e., service entities) whose relevant machine data is used in the calculation of the KPI. Thus, the KPI entities may include either whole set or a subset of the service entities. The value produced by the search query may be indicative of a performance assessment for the service at a point in time or during a period of time. In one implementation, the search query includes a machine data selection component that is used to arrive at a set of data from which to calculate a KPI and a determination component to derive a representative value for an aggregate of machine data. The determination component is applied to the identified set of data to produce a value on a per-entity basis (a KPI contribution of an individual entity). In one alternative, the machine data selection component is applied once to the machine data to gather the totality of the machine data for the KPI, and returns the machine data sorted by entity, to allow for repeated application of the determination component to the machine data pertaining to each entity on an individual basis.

At block 3192, the computing machine receives user input specifying one or more entity thresholds for each of the KPI entities. The entity thresholds each represent an end of a range of values corresponding to a particular KPI state from among a set of KPI states, as described above.

At block 3193, the computing machine stores the entity thresholds in association with the specification for determining the KPI for the service. In one implementation, the entity thresholds are added to the service definition.

At block 3194, the computing machine makes the stored entity thresholds available for determining a state of the KPI. In one implementation, determining the state of the KPI includes determining a contribution of an individual KPI entity by applying the determination component to an aggregate of machine data corresponding to the individual KPI entity, and then applying at least one entity threshold to a KPI contribution of the individual KPI entity. Further, the computing machine selects a KPI state based at least in part on the determined contribution of the individual KPI entity in view of the applied entity threshold. In one implementation, the entity thresholds are made available by exposing them through an API. In one implementation, the entity thresholds are made available by storing information for referencing them in an index of definitional components. In one implementation, the entity thresholds are made available as an integral part of storing them in a particular logical or physical location, such as logically storing them as part of a KPI definitional information collection associated with a particular service definition. In such an implementation, a single action or process, then, may accomplish both the storing of the entity thresholds, and the making available of the entity thresholds.

Aggregate Key Performance Indicators

Figure 32:
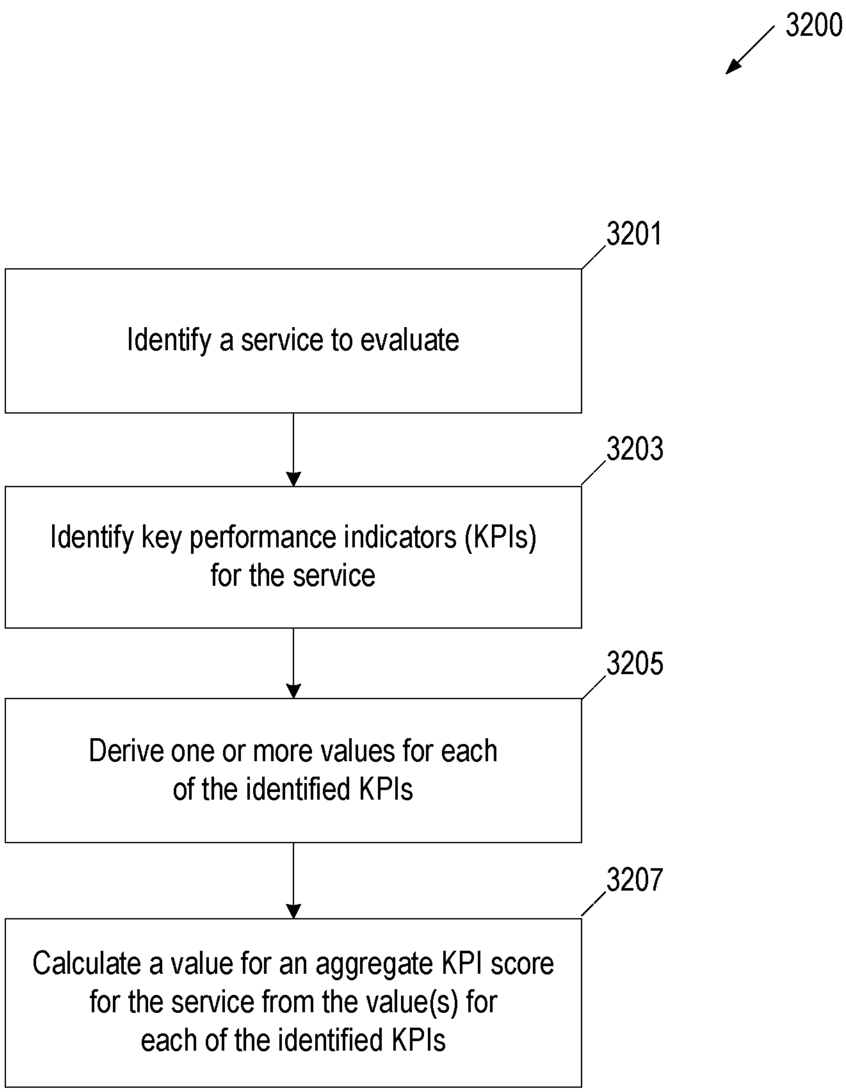
FIG. 32 is a flow diagram of an implementation of a method for calculating an aggregate KPI score for a service based on the KPIs for the service, in accordance with one or more implementations of the present disclosure.

FIG. 32 is a flow diagram of an implementation of a method 3200 for calculating an aggregate KPI score for a service based on the KPIs for the service, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, the method is performed by the client computing machine. In another implementation, the method is performed by a server computing machine coupled to the client computing machine over one or more networks.

At block 3201, the computing machine identifies a service to evaluate. The service is provided by one or more entities. The computing system can receive user input, via one or more graphical interfaces, selecting a service to evaluate. The service can be represented by a service definition that associates the service with the entities as discussed in more detail above.

At block 3203, the computing machine identifies key performance indicators (KPIs) for the service. The service definition representing the service can specify KPIs available for the service, and the computing machine can determine the KPIs for the service from the service definition of the service. Each KPI can pertain to a different aspect of the service. Each KPI can be defined by a search query that derives a value for that KPI from machine data pertaining to entities providing the service. As discussed above, the entities providing the service are identified in the service definition of the service. According to a search query, a KPI value can be derived from machine data of all or some entities providing the service.

In some implementations, not all of the KPIs for a service are used to calculate the aggregate KPI score for the service. For example, a KPI may solely be used for troubleshooting and/or experimental purposes and may not necessarily contribute to providing the service or impacting the performance of the service. The troubleshooting/experimental KPI can be excluded from the calculation of the aggregate KPI score for the service.

In one implementation, the computing machine uses a frequency of monitoring that is assigned to a KPI to determine whether to include a KPI in the calculation of the aggregate KPI score. The frequency of monitoring is a schedule for executing the search query that defines a respective KPI. As discussed above, the individual KPIs can represent saved searches. These saved searches can be scheduled for execution based on the frequency of monitoring of the respective KPIs. In one example, the frequency of monitoring specifies a time period (e.g., 1 second, 2 minutes, 10 minutes, 30 minutes, etc.) for executing the search query that defines a respective KPI, which then produces a value for the respective KPI with each execution of the search query. In another example, the frequency of monitoring specifies particular times (e.g., 6:00 am, 12:00 pm, 6:00 pm, etc.) for executing the search query. The values produced for the KPIs of the service, based on the frequency of monitoring for the KPIs, can be considered when calculating a score for an aggregate KPI of the service, as discussed in greater detail below in conjunction with FIG. 34A.

Alternatively, the frequency of monitoring can specify that the KPI is not to be measured (that the search query for a KPI is not to be executed). For example, a troubleshooting KPI may be assigned a frequency of monitoring of zero.

In one implementation, if a frequency of monitoring is unassigned for a KPI, the KPI is automatically excluded in the calculation for the aggregate KPI score. In one implementation, if a frequency of monitoring is unassigned for a KPI, the KPI is automatically included in the calculation for the aggregate KPI score.

The frequency of monitoring can be assigned to a KPI automatically (without any user input) based on default settings or based on specific characteristics of the KPI such as a service aspect associated with the KPI, a statistical function used to derive a KPI value (e.g., maximum versus average), etc. For example, different aspects of the service can be associated with different frequencies of monitoring, and KPIs can inherit frequencies of monitoring of corresponding aspects of the service.

Values for KPIs can be derived from machine data that is produced by different sources. The sources may produce the machine data at various frequencies (e.g., every minute, every 10 minutes, every 30 minutes, etc.) and/or the machine data may be collected at various frequencies (e.g., every minute, every 10 minutes, every 30 minutes, etc.). In another example, the frequency of monitoring can be assigned to a KPI automatically (without any user input) based on the accessibility of machine data associated with the KPI (associated through entities providing the service). For example, an entity may be associated with machine data that is generated at a medium frequency (e.g., every 10 minutes), and the KPI for which a value is being produced using this particular machine data can be automatically assigned a medium frequency for its frequency of monitoring.

Figure 33A:
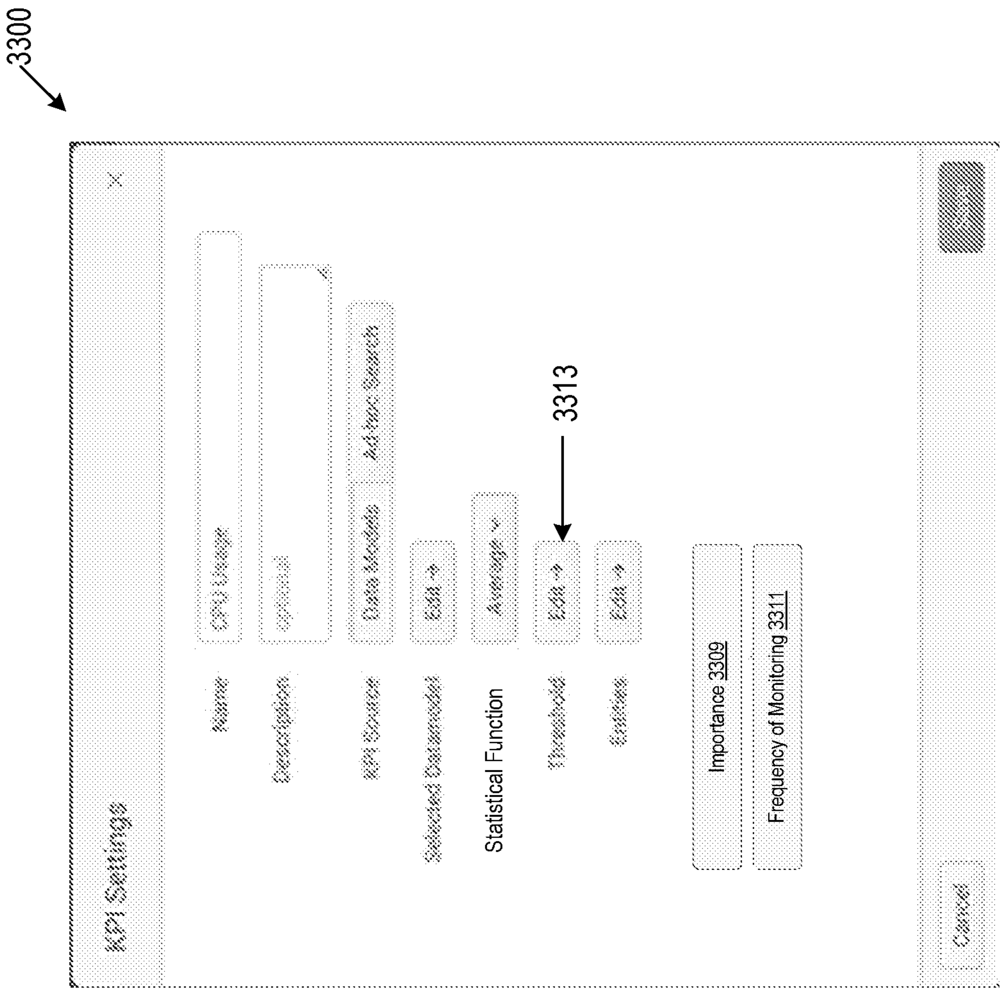
FIG. 33A illustrates an example GUI 3300 for assigning a frequency of monitoring to a KPI based on user input, in accordance with one or more implementations of the present disclosure.

Alternatively, frequency of monitoring can be assigned to KPIs based on user input. FIG. 33A illustrates an example GUI 3300 for creating and/or editing a KPI, including assigning a frequency of monitoring to a KPI, based on user input, in accordance with one or more implementations of the present disclosure. GUI 3300 for can include a button 3311 to receive a user request to assign a frequency of monitoring to the KPI being created or modified. Upon activating button 3311, a user can enter (e.g., via another GUI or a command line interface) a frequency (e.g., a user defined value) for the KPI, or select a frequency from a list presented to the user. In one example, the list may include various frequency types, where each frequency type is mapped to a pre-defined and/or user-defined time period. For example, the frequency types may include Real Time (e.g., 1 second), High Frequency (e.g., 2 minutes), Medium Frequency (e.g., 10 minutes), Low Frequency (e.g., 30 minutes), Do Not Measure (e.g., no frequency).

The assigned frequency of monitoring of KPIs can be included in the service definition specifying the KPIs, or in a separate data structure together with other settings of a KPI.

Referring to FIG. 32, at block 3205, the computing machine derives one or more values for each of the identified KPIs. The computing machine can cause the search query for each KPI to execute to produce a corresponding value. In one implementation, as discussed above, the search query for a particular KPI is executed based on a frequency of monitoring assigned to the particular KPI. When the frequency of monitoring for a KPI is set to a time period, for example, High Frequency (e.g., 2 minutes), a value for the KPI is derived each time the search query defining the KPI is executed every 2 minutes. The derived value(s) for each KPI can be stored in an index. In one implementation, when a KPI is assigned a frequency of monitoring of Do Not Measure or is assigned a zero frequency (no frequency), no value is produced (the search query for the KPI is not executed) for the respective KPI and no values for the respective KPI are stored in the data store.

At block 3207, the computing machine calculates a value for an aggregate KPI score for the service using the value(s) from each of the KPIs of the service. The value for the aggregate KPI score indicates an overall performance of the service. For example, a Web Hosting service may have 10 KPIs and one of the 10 KPIs may have a frequency of monitoring set to Do Not Monitor. The other nine KPIs may be assigned various frequencies of monitoring. The computing machine can access the values produced for the nine KPIs in the data store to calculate the value for the aggregate KPI score for the service, as discussed in greater detail below in conjunction with FIG. 34A. Based on the values obtained from the data store, if the values produced by the search queries for 8 of the 9 KPIs indicate that the corresponding KPI is in a normal state, then the value for an aggregate KPI score may indicate that the overall performance of the service is normal.

An aggregate KPI score can be calculated by adding the values of all KPIs of the same service together. Alternatively, an importance of each individual KPI relative to other KPIs of the service is considered when calculating the aggregate KPI score for the service. For example, a KPI can be considered more important than other KPIs of the service if it has a higher importance weight than the other KPIs of the service.

In some implementations, importance weights can be assigned to KPIs automatically (without any user input) based on characteristics of individual KPIs. For example, different aspects of the service can be associated with different weights, and KPIs can inherit weights of corresponding aspects of the service. In another example, a KPI deriving its value from machine data pertaining to a single entity can be automatically assigned a lower weight than a KPI deriving its value from machine data pertaining to multiple entities, etc.

Alternatively, importance weights can be assigned to KPIs based on user input. Referring again to FIG. 33A, GUI 3300 can include a button 3309 to receive a user request to assign a weight to the KPI being created or modified. Upon selecting button 3309, a user can enter (e.g., via another GUI or a command line interface) a weight (e.g., a user defined value) for the KPI, or select a weight from a list presented to the user. In one implementation, a greater value indicates that a greater importance is placed on a KPI. For example, the set of values may be 1-10, where the value 10 indicates high importance of the KPI relative to the other KPIs for the service. For example, a Web Hosting service may have three KPIs: (1) CPU Usage, (2) Memory Usage, and (3) Request Response Time. A user may provide input indicating that the Request Response Time KPI is the most important KPI and may assign a weight of 10 to the Request Response Time KPI. The user may provide input indicating that the CPU Usage KPI is the next most important KPI and may assign a weight of 5 to the CPU Usage KPI. The user may provide input indicating that the Memory Usage KPI is the least important KPI and may assign a weight of 1 to the Memory Usage KPI.

In one implementation, a KPI is assigned an overriding weight. The overriding weight is a weight that overrides the importance weights of the other KPIs of the service. Input (e.g., user input) can be received for assigning an overriding weight to a KPI. The overriding weight indicates that the status (state) of KPI should be used a minimum overall state of the service. For example, if the state of the KPI, which has the overriding weight, is warning, and one or more other KPIs of the service have a normal state, then the service may only be considered in either a warning or critical state, and the normal state(s) for the other KPIs can be disregarded.

In another example, a user can provide input that ranks the KPIs of a service from least important to most important, and the ranking of a KPI specifies the user selected weight for the respective KPI. For example, a user may assign a weight of 1 to the Memory Usage KPI, assign a weight of 2 to the CPU Usage KPI, and assign a weight of 3 to the Request Response Time KPI. The assigned weight of each KPI may be included in the service definition specifying the KPIs, or in a separate data structure together with other settings of a KPI.

Alternatively or in addition, a KPI can be considered more important than other KPIs of the service if it is measured more frequently than the other KPIs of the service. In other words, search queries of different KPIs of the service can be executed with different frequency (as specified by a respective frequency of monitoring) and queries of more important KPIs can be executed more frequently than queries of less important KPIs.

Figure 33B:
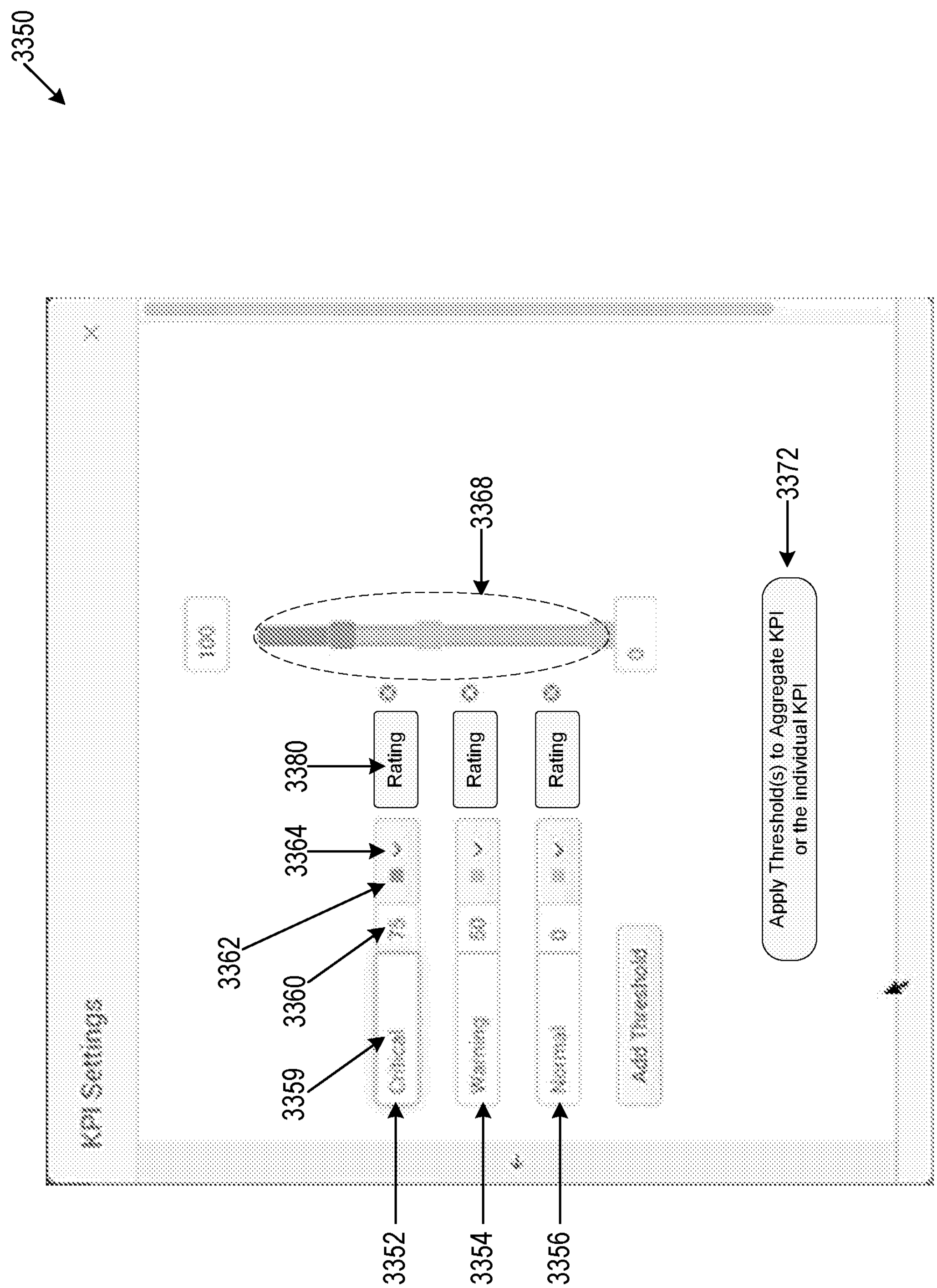
FIG. 33B illustrates an example GUI for defining threshold settings, including state ratings, for a KPI, in accordance with one or more implementations of the present disclosure.

As will be discussed in more detail below in conjunction with FIG. 34A, the calculation of a score for an aggregate KPI may be based on ratings assigned to different states of an individual KPI. Referring again to FIG. 33A, a user can select button 3313 for defining threshold settings, including state ratings, for a KPI to display GUI 3350 in FIG. 33B. FIG. 33B illustrates an example GUI 3350 for defining threshold settings, including state ratings, for a KPI, in accordance with one or more implementations of the present disclosure. Similarly to GUI 3100 of FIG. 31A, GUI 3350 includes horizontal GUI elements (e.g., in the form of input boxes) 3352, 3354 and 3356 that represent specific states of the KPI. For each state, a corresponding GUI element can display a name 3359, a threshold 3360, and a visual indicator 3362 (e.g., an icon having a distinct color for each state). The name 3359, a threshold 3360, and a visual indicator 3362 can be displayed based on user input received via the input fields of the respective GUI element. GUI 3350 can include a vertical GUI element (e.g., a column) 3368 that changes appearance (e.g., the size and color of its sectors) based on input received for a threshold value for a corresponding state of the KPI and/or a visual characteristic for an icon of the corresponding state of the KPI. In some implementations, once the visual characteristic is selected for a specific state via the menu 3364, it is also illustrated by the modified appearance (e.g., modified color or pattern) of icon 3362 positioned next to a threshold value associated with that state.

In addition, GUI 3350 provides for configuring a rating for each state of the KPI. The ratings indicate which KPIs should be given more or less consideration in view of their current states. When calculating an aggregate KPI, a score of each individual KPI reflects the rating of that KPI's current state, as will be discussed in more detail below in conjunction with FIG. 34A. Ratings for different KPI states can be assigned automatically (e.g., based on a range of KPI values for a state) or specified by a user. GUI 3350 can include a field 3380 that displays an automatically generated rating or a rating entered or selected by a user. Field 3380 may be located next to (or in the same row as) a horizontal GUI element representing a corresponding state. Alternatively, field 3380 can be part of the horizontal GUI element. In one example, a user may provide input assigning a rating of 1 to the Normal State, a rating of 2 to the Warning State, and a rating of 3 to the Critical State.

In one implementation, GUI 3350 displays a button 3372 for receiving input indicating whether to apply the threshold(s) to the aggregate KPI of the service or to the particular KPI or both. If a threshold is configured to be applied to a certain individual KPI, then a specified action (e.g., generate alert, add to report) will be triggered when a value of that KPI reaches (or exceeds) the individual KPI threshold. If a threshold is configured to be applied to the aggregate KPI of the service, then a specified action (e.g., create notable event, generate alert, add to incident report) will be triggered when a value (e.g., a score) of the aggregate KPI reaches (or exceeds) the aggregate KPI threshold. In some implementations, a threshold can be applied to both or either the individual or aggregate KPI, and different actions or the same action can be triggered depending on the KPI to which the threshold is applied. The actions to be triggered can be pre-defined or specified by the user via a user interface (e.g., a GUI or a command line interface) while the user is defining thresholds or after the thresholds have been defined. The action to be triggered in view of thresholds can be included in the service definition identifying the respective KPI(s) or can be stored in a data structure dedicated to store various KPI settings of a relevant KPI.

Figure 34A:
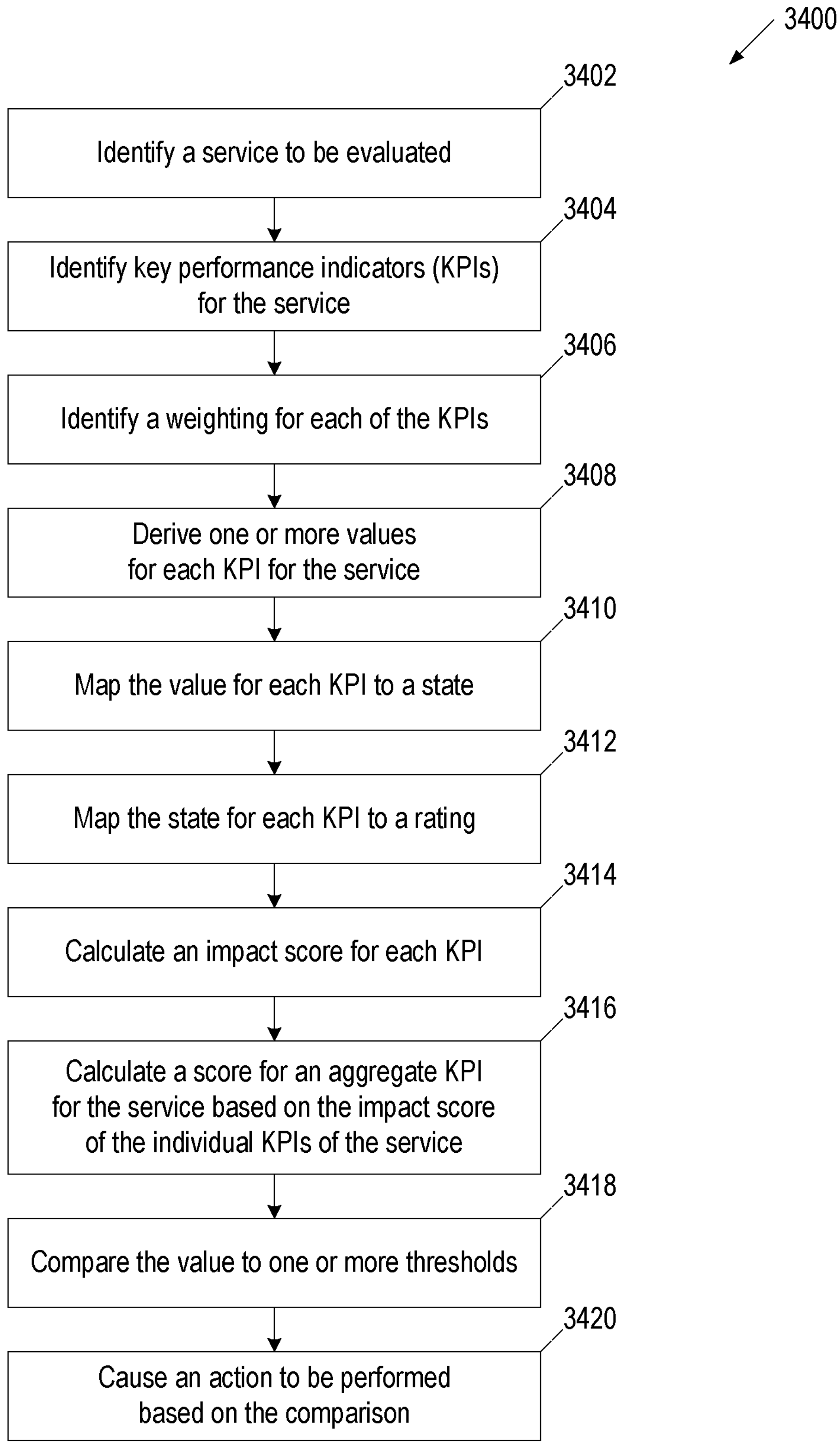
FIG. 34A is a flow diagram of an implementation of a method for calculating a value for an aggregate KPI for the service, in accordance with one or more implementations of the present disclosure.
Figure 34A:
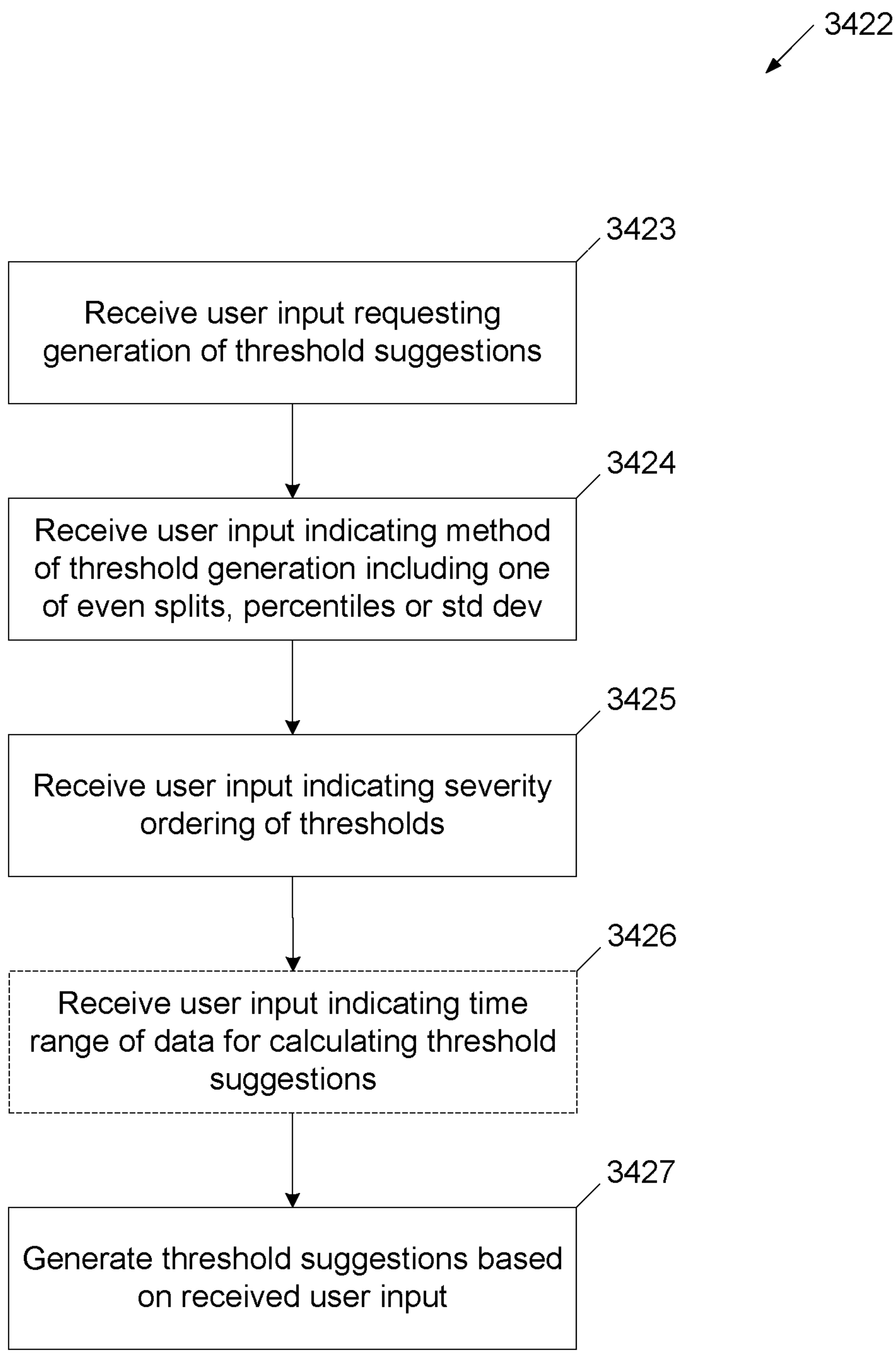
Figure 34A:
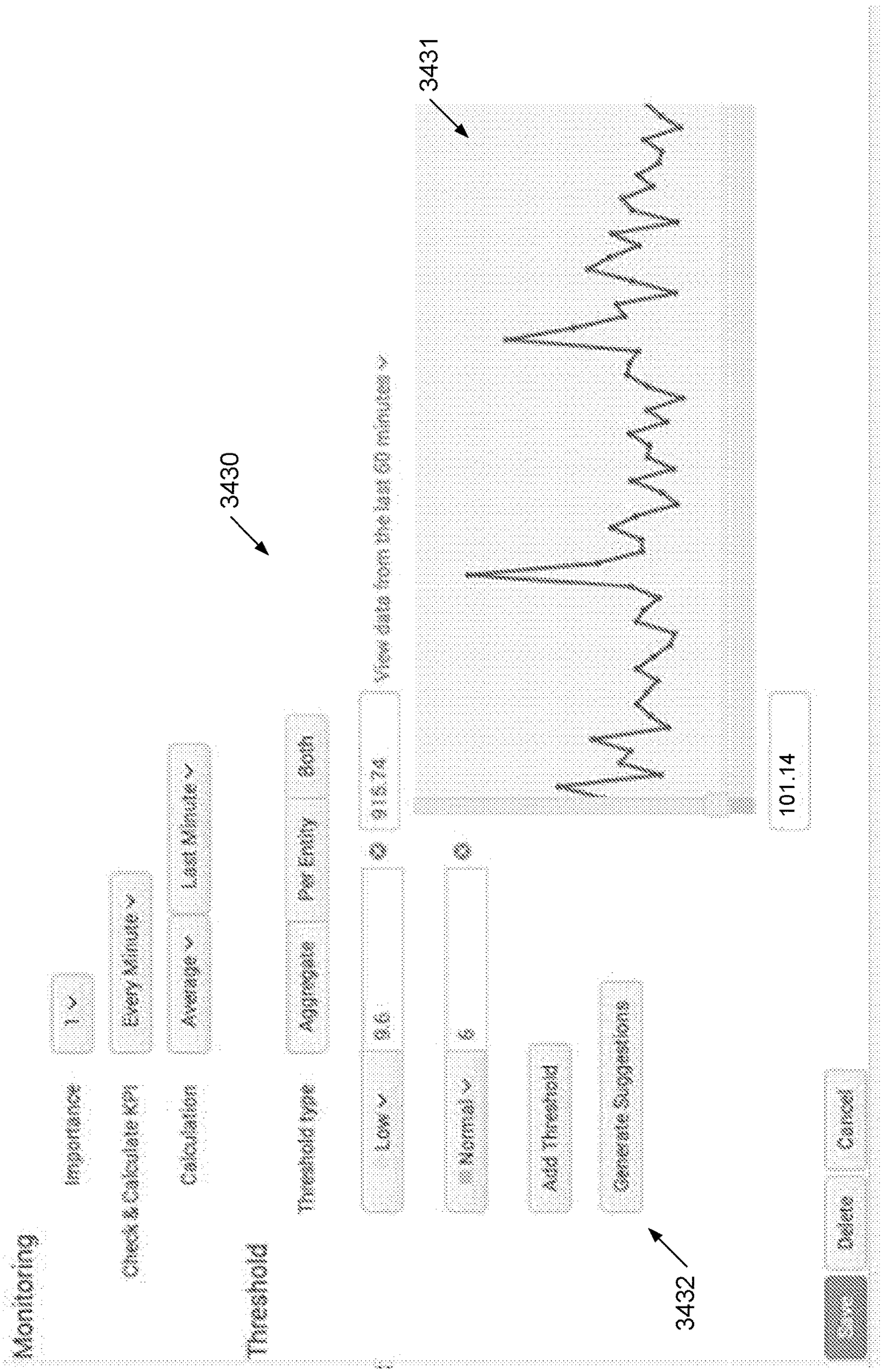
Figure 34A:
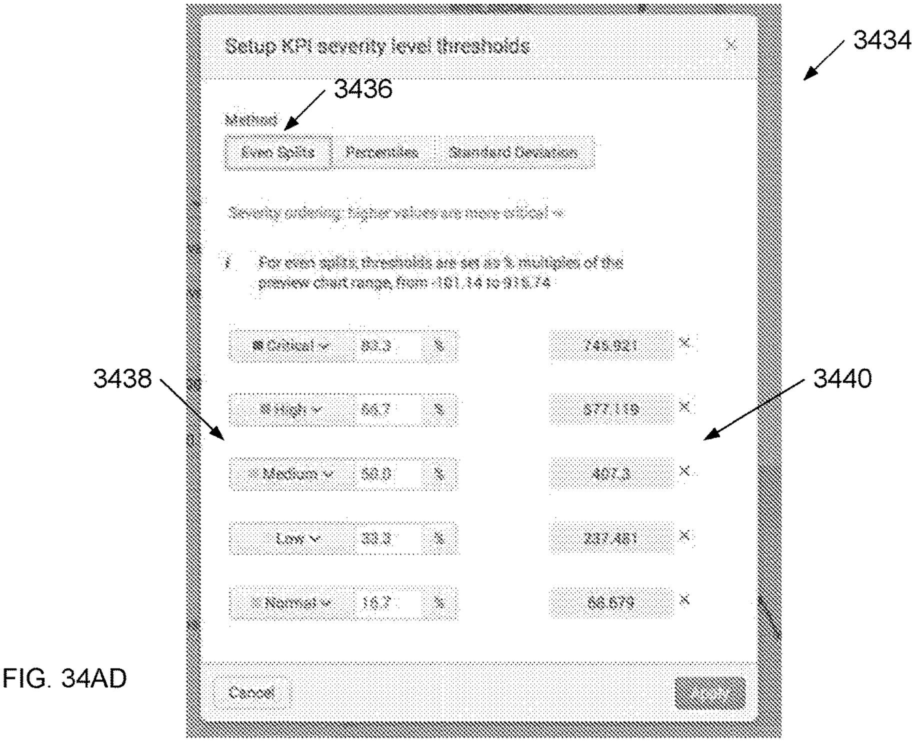
Figure 34A:
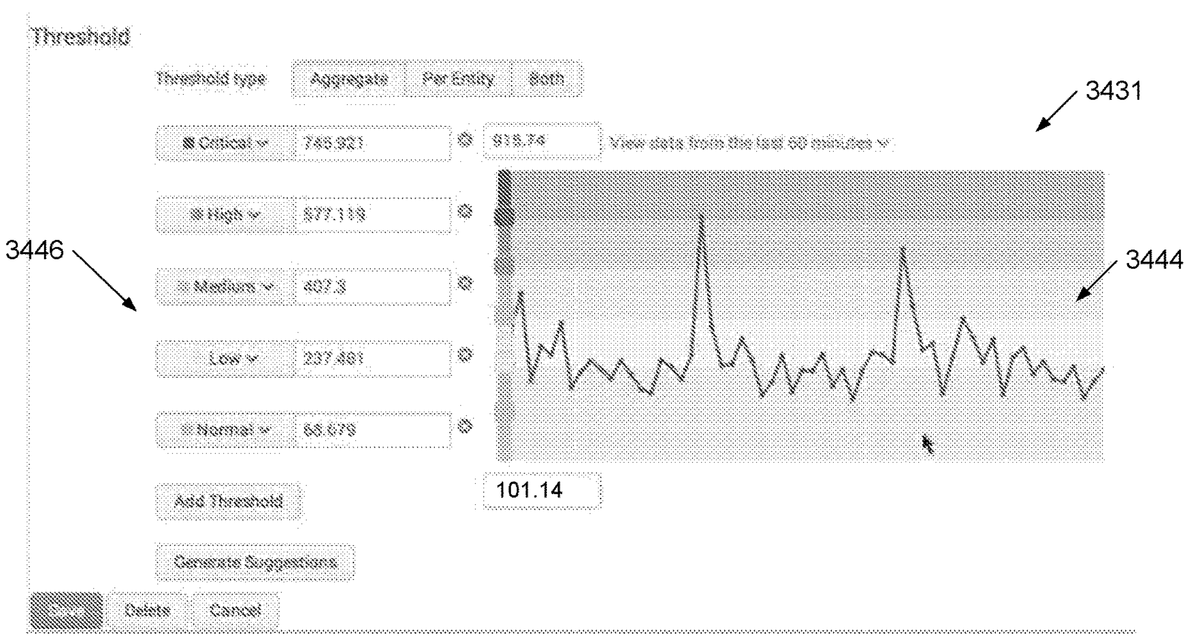
Figure 34A:
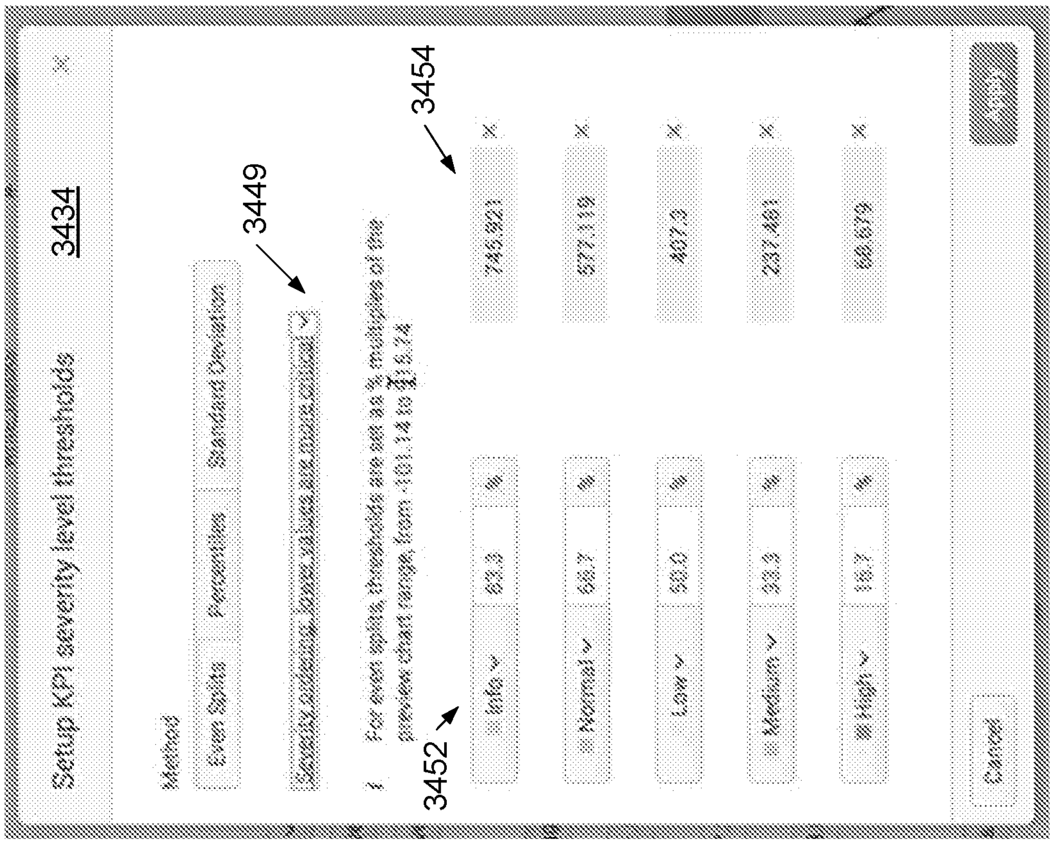
Figure 34A:
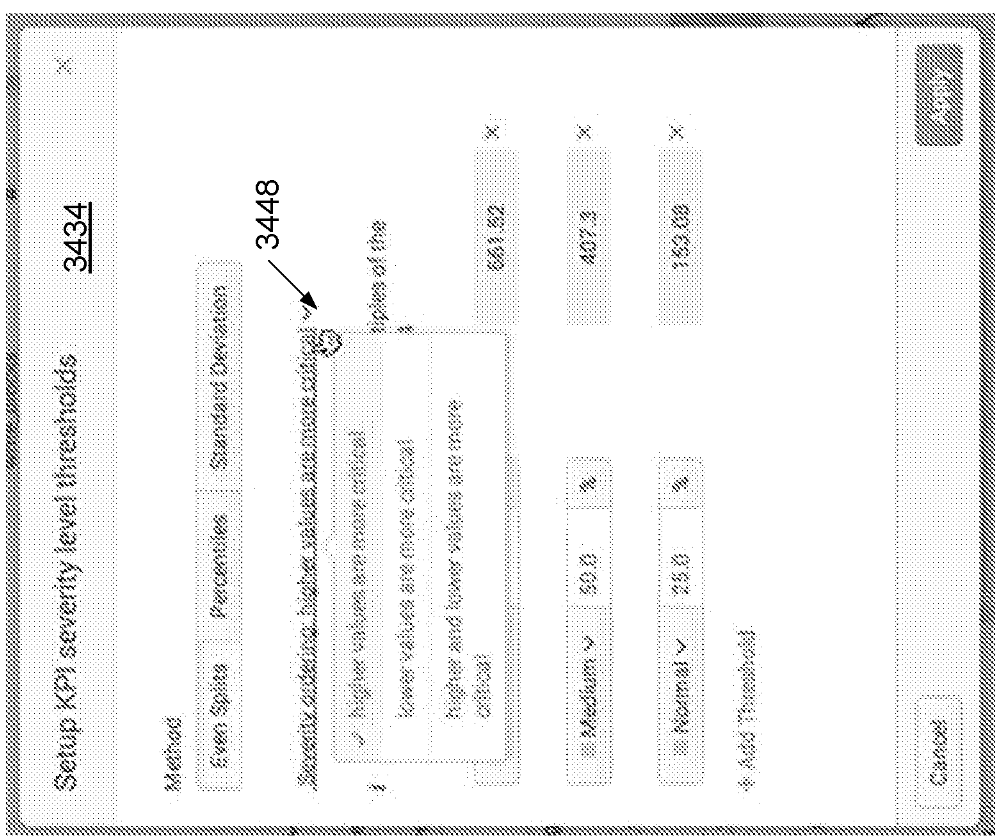
Figure 34A:
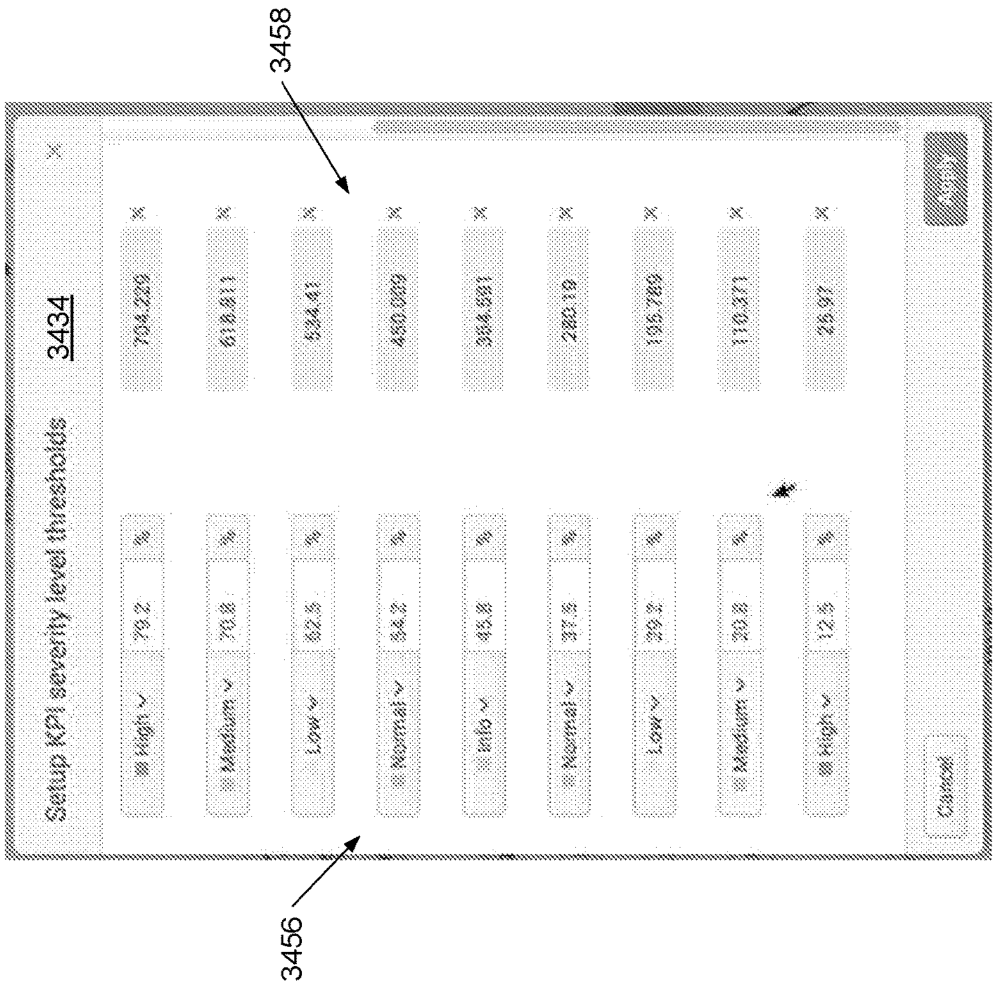
Figure 34A:
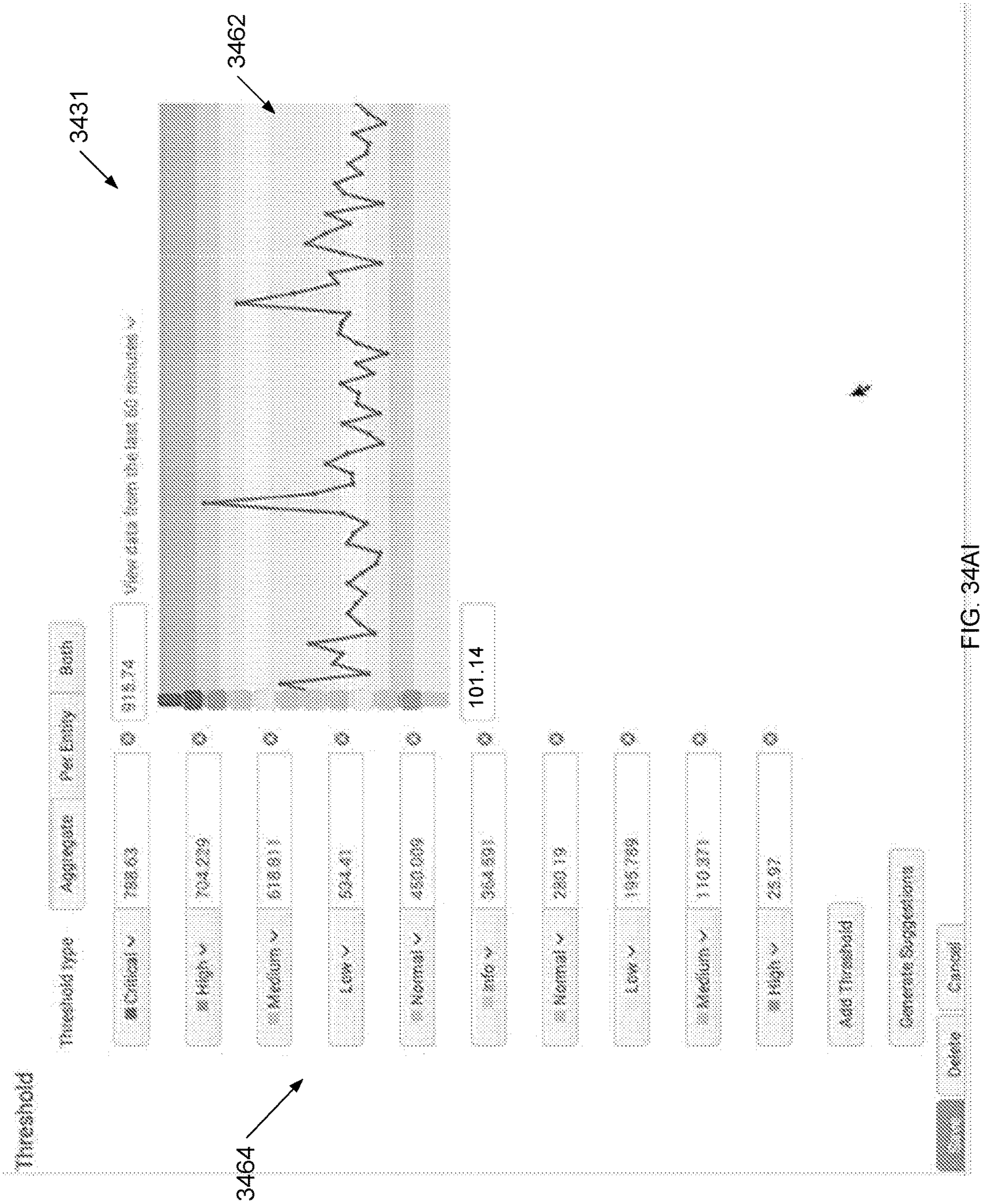
Figure 34A:
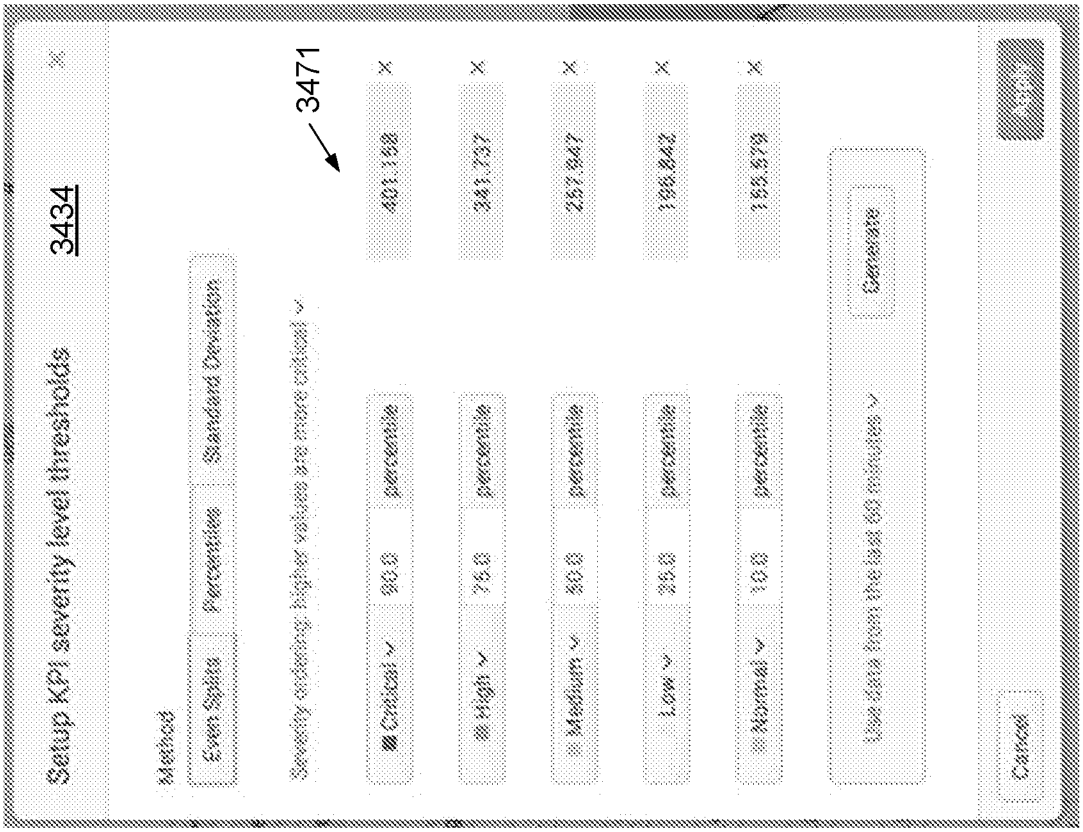
Figure 34A:
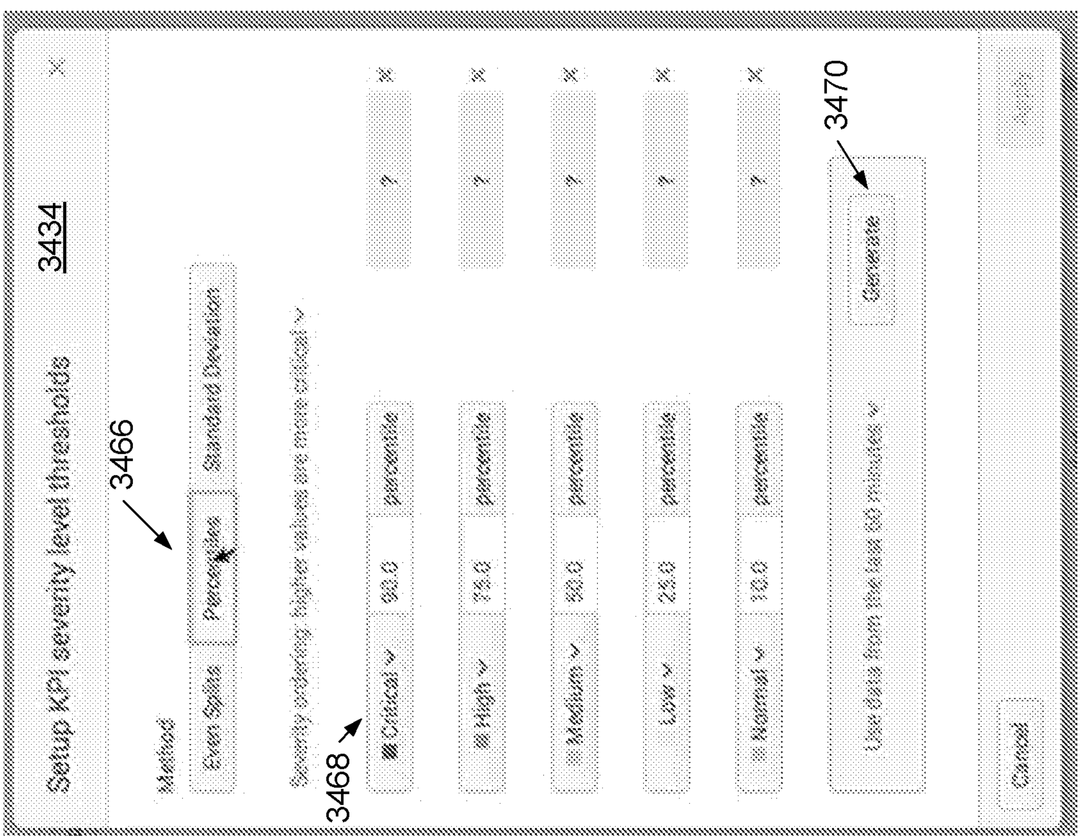
Figure 34A:
Figure 34A:
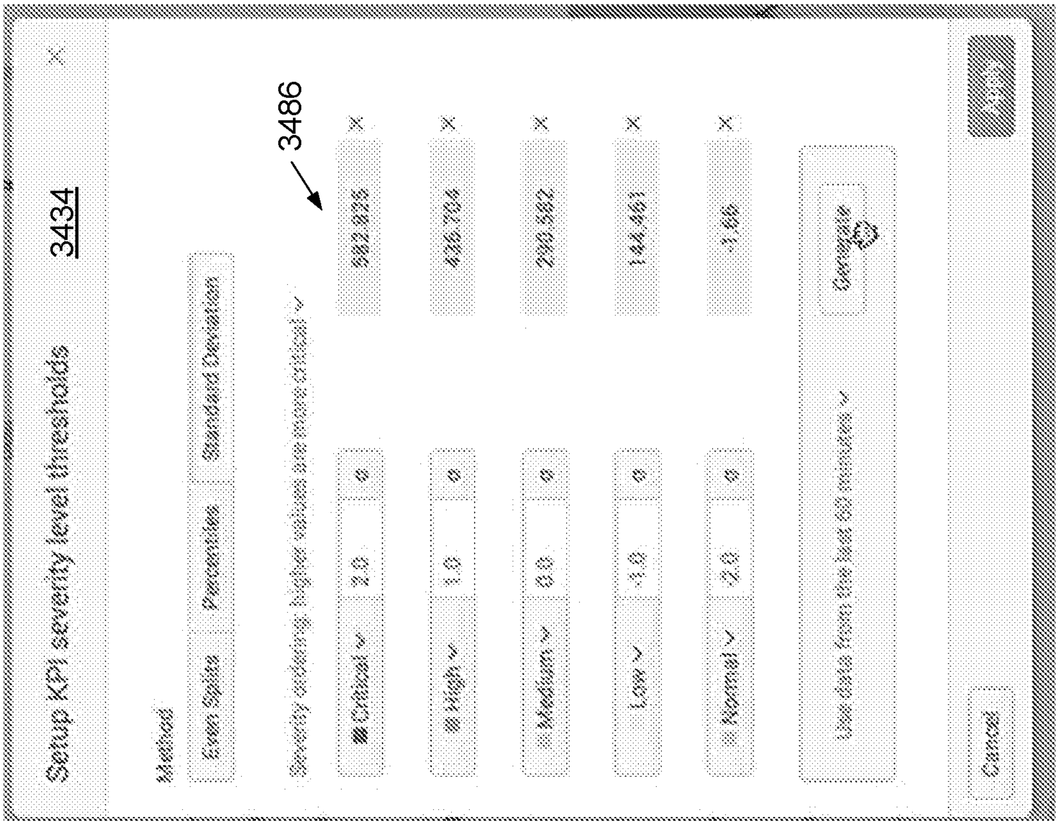
Figure 34A:
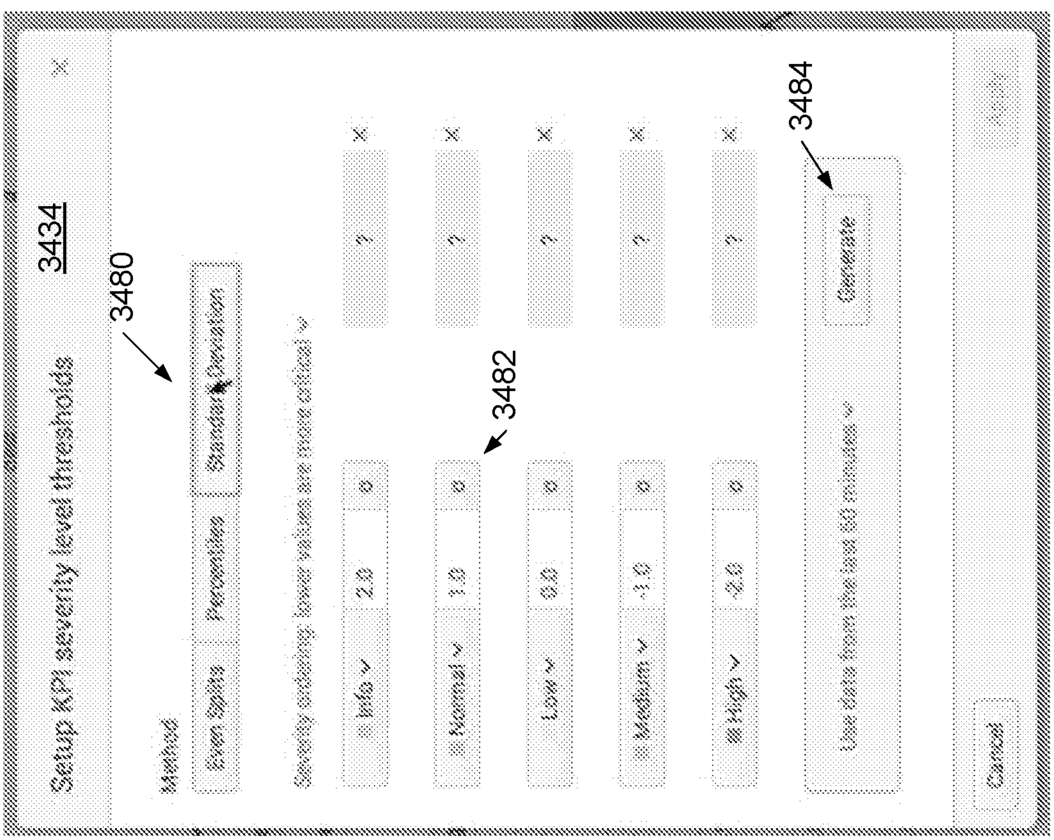
Figure 34A:
Figure 34A:
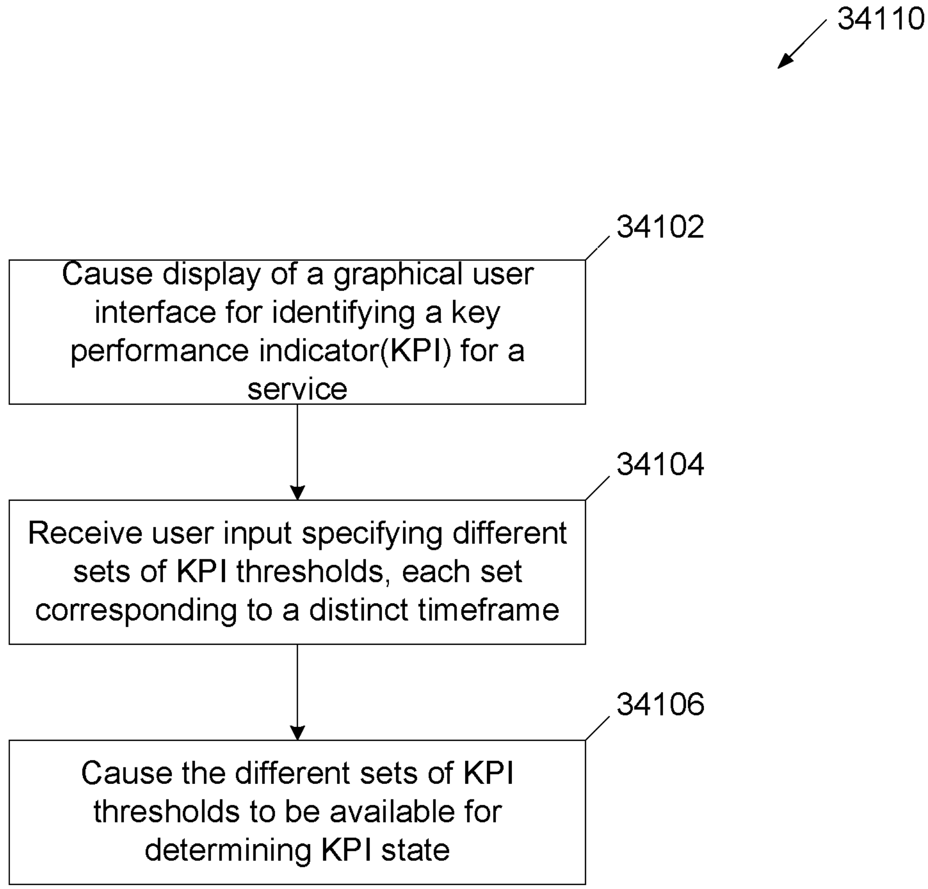
Figure 34A:
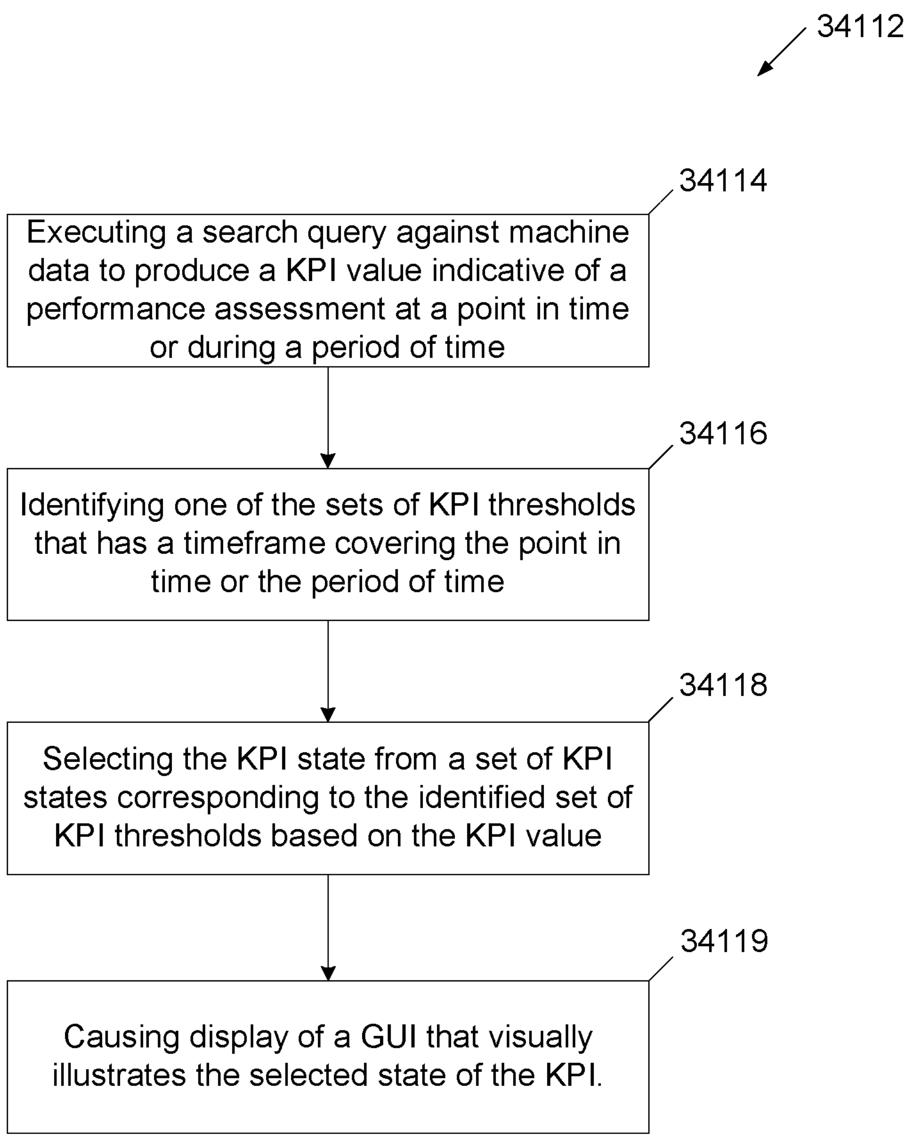
Figure 34A:
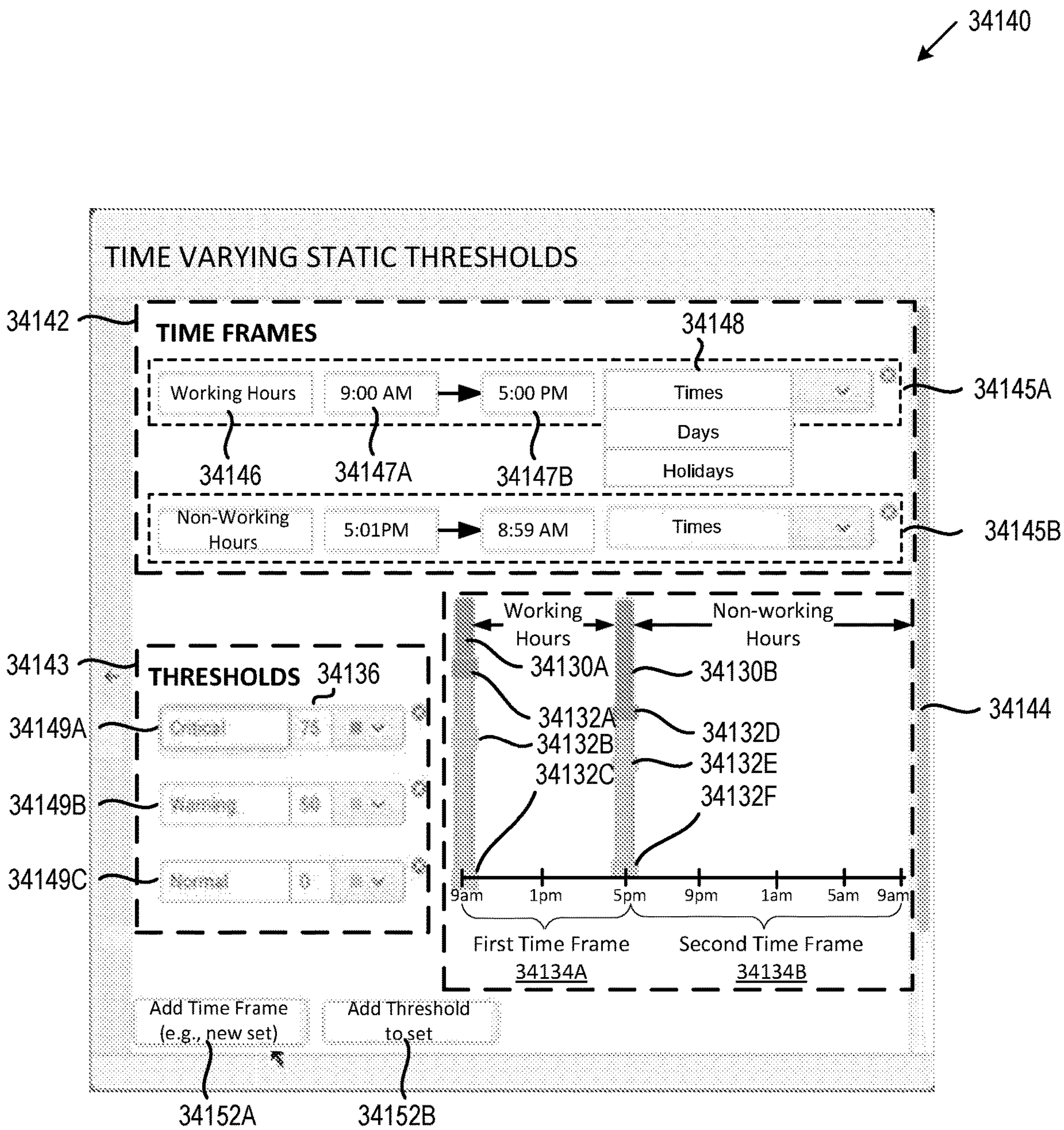
Figure 34A:
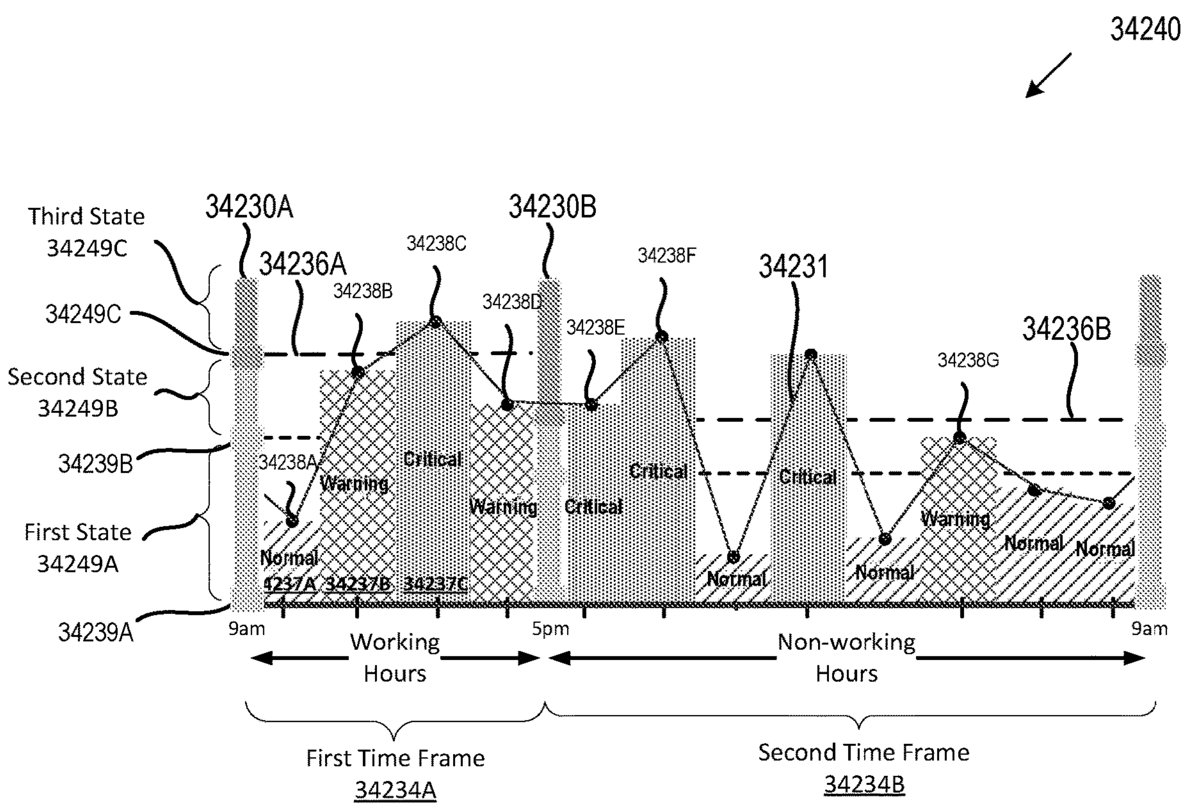

FIG. 34A is a flow diagram of an implementation of a method 3400 for calculating a score for an aggregate KPI for the service, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, the method is performed by the client computing machine. In another implementation, the method is performed by a server computing machine coupled to the client computing machine over one or more networks.

At block 3402, the computing machine identifies a service to be evaluated. The service is provided by one or more entities. The computing system can receive user input, via one or more graphical interfaces, selecting a service to evaluate.

At block 3404, the computing machine identifies key performance indicators (KPIs) for the service. The computing machine can determine the KPIs for the service from the service definition of the service. Each KPI indicates how a specific aspect of the service is performing at a point in time.

As discussed above, in some implementations, a KPI pertaining to a specific aspect of the service (also referred to herein as an aspect KPI) can be defined by a search query that derives a value for that KPI from machine data pertaining to entities providing the service. Alternatively, an aspect KPI may be a sub-service aggregate KPI. Such a KPI is sub-service in the sense that it characterizes something less than the service as a whole. Such a KPI is an aspect KPI in the almost definitional sense that something less than the service as a whole is an aspect of the service. Such a KPI is an aggregate KPI in the sense that the search which defines it produces its value using a selection of accumulated KPI values in the data store (or of contemporaneously produced KPI values, or a combination), rather than producing its value using a selection of event data directly. The selection of accumulated KPI values for such a sub-service aggregate KPI includes values for as few as two different KPI's defined for a service, which stands in varying degrees of contrast to a selection including values for all, or substantially all, of the active KPI's defined for service as is the case with a service-level KPI. (A KPI is an active KPI when its definitional search query is enabled to execute on a scheduled basis in the service monitoring system. See the related discussion in regards to FIG. 32. Unless otherwise indicated, discussion herein related to KPI's associated with a service, or the like, may presume the reference is to active KPI definitions, particularly where the context relates to available KPI values, such that the notion of "all" may reasonably be understood to represent something corresponding to technically less than "all" of the relevant, extant KPI definitions.) A method for determining (e.g., by calculating) a service-level aggregate KPI is discussed in relation to the flow diagram of FIG. 32. A person of ordinary skill in the art now will understand how the teachings surrounding FIG. 32 may be adapted to determine or produce an aggregate KPI that is a sub-service aggregate KPI. Similarly, a person of skill in the art now will understand how teachings herein regarding GUIs for creating, establishing, modifying, viewing, or otherwise processing KPI definitions (such as GUIs discussed in relation to FIGS. 22-27) may be adapted to accommodate a KPI having a defining search query that produces its value using a selection of accumulated KPI values in the data store (or of contemporaneously produced KPI values, or a combination), rather than producing its value using a selection of event data directly.

At block 3406, the computing machine optionally identifies a weighting (e.g., user selected weighting or automatically assigned weighting) for each of the KPIs of the service. As discussed above, the weighting of each KPI can be determined from the service definition of the service or a KPI definition storing various setting of the KPI.

At block 3408, the computing machine derives one or more values for each KPI for the service by executing a search query associated with the KPI. As discussed above, each KPI is defined by a search query that derives the value for a corresponding KPI from the machine data that is associated with the one or more entities that provide the service.

As discussed above, the machine data associated with the one or more entities that provide the same service is identified using a user-created service definition that identifies the one or more entities that provide the service. The user-created service definition also identifies, for each entity, identifying information for locating the machine data pertaining to that entity. In another example, the user-created service definition also identifies, for each entity, identifying information for a user-created entity definition that indicates how to locate the machine data pertaining to that entity. The machine data can include for example, and is not limited to, unstructured data, log data, and wire data. The machine data associated with an entity can be produced by that entity. In addition or alternatively, the machine data associated with an entity can include data about the entity, which can be collected through an API for software that monitors that entity.

The computing machine can cause the search query for each KPI to execute to produce a corresponding value for a respective KPI. The search query defining a KPI can derive the value for that KPI in part by applying a late-binding schema to machine data or, more specifically, to events containing raw portions of the machine data. The search query can derive the value for the KPI by using a late-binding schema to extract an initial value and then performing a calculation on (e.g., applying a statistical function to) the initial value.

The values of each of the KPIs can differ at different points in time. As discussed above, the search query for a KPI can be executed based on a frequency of monitoring assigned to the particular KPI. When the frequency of monitoring for a KPI is set to a time period, for example, Medium Frequency (e.g., 10 minutes), a value for the KPI is derived each time the search query defining the KPI is executed every 10 minutes. The derived value(s) for each KPI can be stored in a data store. When a KPI is assigned a zero frequency (no frequency), no value is produced (the search query for the KPI is not executed) for the respective KPI.

The derived value(s) of a KPI is indicative of how an aspect of the service is performing. In one example, the search query can derive the value for the KPI by applying a late-binding schema to machine data pertaining to events to extract values for a specific fields defined by the schema. In another example, the search query can derive the value for that KPI by applying a late-binding schema to machine data pertaining to events to extract an initial value for a specific field defined by the schema and then performing a calculation on (e.g., applying a statistical function to) the initial value to produce the calculation result as the KPI value. In yet another example, the search query can derive the value for the KPI by applying a late-binding schema to machine data pertaining to events to extract an initial value for specific fields defined by the late-binding schema to find events that have certain values corresponding to the specific fields, and counting the number of found events to produce the resulting number as the KPI value.

At block 3410, the computing machine optionally maps the value produced by a search query for each KPI to a state. As discussed above, each KPI can have one or more states defined by one or more thresholds. In particular, each threshold can define an end of a range of values. Each range of values represents a state for the KPI. At a certain point in time or a period of time, the KPI can be in one of the states (e.g., normal state, warning state, critical state) depending on which range the value, which is produced by the search query of the KPI, falls into. For example, the value produced by the Memory Usage KPI may be in the range representing a Warning State. The value produced by the CPU Usage KPI may be in the range representing a Warning State. The value produced by the Request Response Time KPI may be in the range representing a Critical State.

At block 3412, the computing machine optionally maps the state for each KPI to a rating assigned to that particular state for a respective KPI (e.g., automatically or based on user input). For example, for a particular KPI, a user may provide input assigning a rating of 1 to the Normal State, a rating of 2 to the Warning State, and a rating of 3 to the Critical State. In some implementations, the same ratings are assigned to the same states across the KPIs for a service. For example, the Memory Usage KPI, CPU Usage KPI, and Request Response Time KPI for a Web Hosting service may each have Normal State with a rating of 1, a Warning State with a rating of 2, and a Critical State with a rating of 3. The computing machine can map the current state for each KPI, as defined by the KPI value produced by the search query, to the appropriate rating. For example, the Memory Usage KPI in the Warning State can be mapped to 2. The CPU Usage KPI in the Warning State can be mapped to 2. The Request Response Time KPI in the Critical State can be mapped to 3. In some implementations, different ratings are assigned to the same states across the KPIs for a service. For example, the Memory Usage KPI may each have Critical State with a rating of 3, and the Request Response Time KPI may have Critical State with a rating of 5.

At block 3414, the computing machine calculates an impact score for each KPI. In some implementations, the impact score of each KPI can be based on the importance weight of a corresponding KPI (e.g., weight×KPI value). In other implementations, the impact score of each KPI can be based on the rating associated with a current state of a corresponding KPI (e.g., rating×KPI value). In yet other implementations, the impact score of each KPI can be based on both the importance weight of a corresponding KPI and the rating associated with a current state of the corresponding KPI. For example, the computing machine can apply the weight of the KPI to the rating for the state of the KPI. The impact of a particular KPI at a particular point in time on the aggregate KPI can be the product of the rating of the state of the KPI and the importance (weight) assigned to the KPI. In one implementation, the impact score of a KPI can be calculated as follows:

$$\text{Impact Score of KPI}=(\text{weight})\times(\text{rating of state})$$

For example, when the weight assigned to the Memory Usage KPI is 1 and the Memory Usage KPI is in a Warning State, the impact score of the Memory Usage KPI=1×2. When the weight assigned to the CPU Usage KPI is 2 and the CPU Usage KPI is in a Warning State, the impact score of the CPU Usage KPI=2×2. When the weight assigned to the Request Response Time KPI is 3 and the Request Response Time KPI is in a Critical State, the impact score of the Request Response Time KPI=3×3.

In another implementation, the impact score of a KPI can be calculated as follows:

$$\text{Impact Score of KPI}=(\text{weight})\times(\text{rating of state})\times(\text{value})$$

In yet some implementations, the impact score of a KPI can be calculated as follows:

$$\text{Impact Score of KPI}=(\text{weight})\times(\text{value})$$

At block 3416, the computing machine calculates an aggregate KPI score ("score") for the service based on the impact scores of individual KPIs of the service. The score for the aggregate KPI indicates an overall performance of the service. The score of the aggregate KPI can be calculated periodically (as configured by a user or based on a default time interval) and can change over time based on the performance of different aspects of the service at different points in time. For example, the aggregate KPI score may be calculated in real time (continuously calculated until interrupted). The aggregate KPI score may be calculated may be calculated periodically (e.g., every second).

In some implementations, the score for the aggregate KPI can be determined as the sum of the individual impact scores for the KPIs of the service. In one example, the aggregate KPI score for the Web Hosting service can be as follows:

$$\text{Aggregate KPI}_{Web\ Hosting}=(\text{weight}\times\text{rating of state})_{Memory\ Usage\ KPI}+(\text{weight}\times\text{rating of state})_{CPU\ Usage\ KPI}+(\text{weight}\times\text{rating of state})_{Request\ Response\ Time\ KPI}=(1\times2)+(2\times2)+(3\times3)=15.$$

In another example, the aggregate KPI score for the Web Hosting service can be as follows:

$$\text{Aggregate KPI}_{Web\ Hosting}=(\text{weight}\times\text{rating of state}\times\text{value})_{Memory\ Usage\ KPI}+(\text{weight}\times\text{rating of state}\times\text{value})_{CPU\ Usage\ KPI}+(\text{weight}\times\text{rating of state}\times\text{value})_{Request\ Response\ Time\ KPI}=(1\times2\times60)+(2\times2\times55)+(3\times3\times80)=1060.$$

In yet some other implementations, the impact score of an aggregate KPI can be calculated as a weighted average as follows:

$$\text{Aggregate KPI}_{Web\ Hosting}=[(\text{weight}\times\text{rating of state})_{Memory\ Usage\ KPI}+(\text{weight}\times\text{rating of state})_{CPU\ Usage\ KPI}+(\text{weight}\times\text{rating of state})_{Request\ Response\ Time\ KPI})]/(\text{weight}_{Memory\ Usage\ KPI}+\text{weight}_{CPU\ Usage\ CPI}+\text{weight}_{Request\ Response\ Time\ KPI})$$

A KPI can have multiple values produced for the particular KPI for different points in time, for example, as specified by a frequency of monitoring for the particular KPI. The multiple values for a KPI can be that in a data store. In one implementation, the latest value that is produced for the KPI is used for calculating the aggregate KPI score for the service, and the individual impact scores used in the calculation of the aggregate KPI score can be the most recent impact scores of the individual KPIs based on the most recent values for the particular KPI stored in a data store. Alternatively, a statistical function (e.g., average, maximum, minimum, etc.) is performed on the set of the values that is produced for the KPI is used for calculating the aggregate KPI score for the service. The set of values can include the values over a time period between the last calculation of the aggregate KPI score and the present calculation of the aggregate KPI score. The individual impact scores used in the calculation of the aggregate KPI score can be average impact scores, maximum impact score, minimum impact scores, etc. over a time period between the last calculation of the aggregate KPI score and the present calculation of the aggregate KPI score.

The individual impact scores for the KPIs can be calculated over a time range (since the last time the KPI was calculated for the aggregate KPI score). For example, for a Web Hosting service, the Request Response Time KPI may have a high frequency (e.g., every 2 minutes), the CPU Usage KPI may have a medium frequency (e.g., every 10 minutes), and the Memory Usage KPI may have a low frequency (e.g., every 30 minutes). That is, the value for the Memory Usage KPI can be produced every 30 minutes using machine data received by the system over the last 30 minutes, the value for the CPU Usage KPI can be produced every 10 minutes using machine data received by the system over the last 10 minutes, and the value for the Request Response Time KPI can be produced every 2 minutes using machine data received by the system over the last 2 minutes. Depending on the point in time for when the aggregate KPI score is being calculated, the value (e.g., and thus state) of the Memory Usage KPI may not have been refreshed (the value is stale) because the Memory Usage KPI has a low frequency (e.g., every 30 minutes). Whereas, the value (e.g., and thus state) of the Request Response Time KPI used to calculate the aggregate KPI score is more likely to be refreshed (reflect a more current state) because the Request Response Time KPI has a high frequency (e.g., every 2 minutes). Accordingly, some KPIs may have more impact on how the score of the aggregate KPI changes overtime than other KPIs, depending on the frequency of monitoring of each KPI.

In one implementation, the computing machine causes the display of the calculated aggregate KPI score in one or more graphical interfaces and the aggregate KPI score is updated in the one or more graphical interfaces each time the aggregate KPI score is calculated. In one implementation, the configuration for displaying the calculated aggregate KPI in one or more graphical interfaces is received as input (e.g., user input), stored in a data store coupled to the computing machine, and accessed by the computing machine.

At block 3418, the computing machine compares the score for the aggregate KPI to one or more thresholds. As discussed above with respect to FIG. 33B, one or more thresholds can be defined and can be configured to apply to a specific individual KPI and/or an aggregate KPI including the specific individual KPI. The thresholds can be stored in a data store that is coupled to the computing machine. If the thresholds are configured to be applied to the aggregate KPI, the computing machine compares the score of the aggregate KPI to the thresholds. If the computing machine determines that the aggregate KPI score exceeds or reaches any of the thresholds, the computing machine determines what action should be triggered in response to this comparison.

Referring to FIG. 34A, at block 3420, the computing machine causes an action be performed based on the comparison of the aggregate KPI score with the one or more thresholds. For example, the computing machine can generate an alert if the aggregate KPI score exceeds or reaches a particular threshold (e.g., the highest threshold). In another example, the computing machine can generate a notable event if the aggregate KPI score exceeds or reaches a particular threshold (e.g., the second highest threshold). In one implementation, the KPIs of multiple services is aggregated and used to create a notable event. In one implementation, the configuration for which of one or more actions to be performed is received as input (e.g., user input), stored in a data store coupled to the computing machine, and accessed by the computing machine.

FIG. 34AB is a flow diagram of an implementation of a method 3422 for automatically defining one or more thresholds for a KPI, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, the method 3422 is performed by the client computing machine. In another implementation, the method 3422 is performed by a server computing machine coupled to the client computing machine over one or more networks.

In one implementation, rather than having the user manually configure thresholds by adjusting the sliders or inputting numeric values, as described above, the system may be configured to generate suggested thresholds, whether for aggregate, per entity or both. In one implementation, the suggested thresholds may be recommendations that can be applied to the data or that can serve as a starting point for further adjustment by the system user. The suggestions may be referred to as "automatic" thresholds or "auto-thresholds" in various implementations.

At block 3423, the computing machine receives user input requesting generation of threshold suggestions. In one implementation, a user may select a generate suggestions button that, when selected, initiates an auto-threshold determination process. Rather than having the user manually configure thresholds by adjusting the sliders or inputting numeric values, as described above, the system may be configured to generate suggested thresholds, whether for aggregate, per entity or both.

At block 3424, the computing machine receives user input indicating a method of threshold generation. For example, upon selection of the generate suggestions button, a threshold configuration GUI may be displayed. The threshold configuration GUI may have a number of selectable tabs that allow the user to select the method of auto-threshold determination. In one implementation, the methods include even splits, percentiles and standard deviation. The even splits method takes the range of values displayed in a graph and divides that range into a number of threshold ranges that each correspond to a KPI state for the selected service. In one implementation the threshold ranges are all evenly sized. In another implementation, the threshold ranges may vary in size. In one implementation, the threshold ranges may be referred to as "Fixed Intervals," such that the size of the range does not change, but that one range may be of a different size than another range. The percentiles method takes the calculated KPI values and shows the distribution of those values divided into some number of percentile groups that each correspond to a KPI state for the selected service. The standard deviation method takes the calculated KPI values and shows the distribution of those values divided into some number of groups, based on standard deviation from the mean value, that each correspond to a KPI state for the selected service.

At block 3425, the computing machine receives user input indicating the severity ordering of the thresholds. The severity ordering refers to whether higher or lower values correspond to a more severe KPI state. In one implementation, a drop down menu may be provided that allows the user to select a severity ordering from among three options including: higher values are more critical, lower values are more critical, and higher and lower values are more critical. When the higher values are more critical option is selected, the state names are ordered such that they proceed in descending order from higher threshold values to lower threshold values. (The descending order of state names refers to a progression from most severe to least severe. The ascending order of state names refers to the a progression from least severe to most severe.) When the lower values are more critical option is selected, the state names are ordered such that they proceed in ascending order from lower threshold values to higher threshold values. When the higher and lower values are more critical option is selected, the state names are ordered such that they proceed in descending order from higher threshold values to some lower threshold values and then back up again on the severity scale as the threshold values continue to decrease. In such a case, the state names may appear as though they are reflected in order about a center point, with state names associated with greater severity ordered farther from the center.

At block 3426, depending on the selected method of threshold generation, the computing machine optionally receives user input indicating the time range of data for calculating threshold suggestions. The computing machine may analyze data from the selected time range in order to generate the threshold suggestions, rather than analyzing all available data, at least some of which may be stale or not relevant. The actual values that correspond to the boundaries of the threshold groups may not be determined until a period of time over which the values are to be calculated is selected from a pull down menu. Examples of the period of time may include, the last 60 minutes, the last day, the last week, etc. In one implementation, a period of time over which the values are to be calculated is selected when the method of auto-thresholding includes percentiles or standard deviation. In one implementation, no period of time is required when the even splits method is suggested.

At block 3427, the computing machine generates threshold suggestions based on the received user input. Upon selection of the period of time, the actual values that correspond to the boundaries of the threshold groups are calculated and displayed in the GUI. The user may be able to adjust, edit, add or delete thresholds from this GUI, as described above.

FIG. 34AC-AO illustrate example GUIs for configuring automatic thresholds for a KPI, in accordance with one or more implementations of the present disclosure. In GUI 3430 of FIG. 34AC, a generate suggestions button 3432 may be provided that, when selected, initiates the auto-threshold determination process. Once generated, indications of the thresholds may be displayed with reference to graph 3431. Graph 3431 includes a line chart the represents values, such as KPI values, over a period of time. The values are plotted over the period of time on a first horizontal axis and against a range of values set by the maximum value and minimum value on a second vertical axis. Upon selection of button 3432, a threshold configuration GUI 3434 may be displayed, as shown in FIG. 34AD.

In GUI 3434 of FIG. 34AD, a number of tabs may be provided that allow the user to select the method of auto-threshold determination. In one implementation, the even splits tab 3436 may be selected. The even splits method takes the range of values from the second vertical axis displayed in the graph 3431 and divides that range into a number of even threshold ranges that each correspond to a state of the selected service. In one embodiment, there may be a default number of threshold ranges (e.g., 5) each corresponding to a different state (i.e., critical, high, medium, low, normal). In one implementation, the threshold ranges 3438 are displayed in GUI 3434 along with the state corresponding to each range and what percentage of the total range of values from graph 3431 are represented by each threshold range. The actual values 3440 that correspond to the boundaries of the threshold ranges 3438 may also be displayed in GUI 3434. According to the example illustrated in FIGS. 34AC-AD, the range of values for the access latency on disks of a storage appliance from graph 3431 include 101.14 to 915.74 milliseconds. GUI 3434 shows that the critical state includes values above 83.3%, which corresponds to values above 745.921 milliseconds. Similarly, the high state includes values between 66.7% and 83.3%, which corresponds to values between 577.119 milliseconds and 745.921 milliseconds, and so on. GUI 3434 provides the ability for the user to rename the states, adjust the associated percentages that correspond to each state, and to add or remove displayed states as well. When the even splits tab 3436 is selected, upon the addition or removal of a state, GUI 3434 may display recalculated values 3440 so that the range of values corresponding to each state remains equal in size.

Once configuration of thresholds in the even splits tab 3436 is completed, horizontal bands 3444 corresponding to each state may be displayed on chart 3431, as illustrated in FIG. 34AE. As shown, the range of values represented by each band 3444 is equal since the thresholds were set using the even splits method. In one implementation, the names of the states and corresponding values 3446 representing the end of the threshold ranges are also displayed adjacent to chart 3431. The user may similarly be able to adjust, edit, add or delete thresholds from this GUI, as described above.

In GUI 3434 of FIG. 34AF, a drop down menu 3448 may be provided that allows the user to select a severity ordering.

In one implementation, there are three options for severity ordering including: higher values are more critical, lower values are more critical, and higher and lower values are more critical. When the higher values are more critical option is selected, the state names 3438 are ordered such that they proceed in descending order from higher threshold values to lower threshold values (e.g., high is above 661.52, medium is between 661.52 and 407.3, normal is between 407.3 and 153.08, and so on). The severity ordering may be selected depending on the underlying KPI values. For example, a user may desire to set thresholds that warn them when certain values are getting too high (e.g., processor load) but when other values are getting too low (e.g., memory space remaining). In GUI 3434 of FIG. 34AG, the user has selected the option for lower values are more critical 3449. When the lower values are more critical option 3449 is selected, the state names 3452 are ordered such that they proceed in descending order from lower threshold values to higher threshold values 2454 (e.g., high is below 68.679, medium is between 68.679 and 237.481, low is between 237.481 and 407.3, and so on). The corresponding order of states would also be reflected in chart 3431.

In GUI 3434 of FIG. 34AH, the user has selected the option for higher and lower values are more critical. When the higher and lower values are more critical option is selected, the state names 3456 are ordered such that they proceed in descending order from higher threshold values to lower threshold values 3458 and then back up again on the severity scale as the threshold values continue to decrease (e.g., high is above 704.229 or between 110.371 and 25.97, medium is between 704.229 and 618.811 or between 195.789 and 110.371, low is between 618.811 and 534.41 or between 280.19 and 195.789, and so on). The higher and lower values are more critical option could be applicable to any KPI where the user wants to be warned if the value differs from an expected value by a certain amount in either direction (e.g., temperature). The corresponding order of states would also be reflected in chart 3431 as shown in FIG. 34AI. Once configuration of thresholds is completed, horizontal bands 3462 corresponding to each state may be displayed on chart 3431. As shown, the range of values represented by each band 3462 is equal since the thresholds were set using the even splits method. In one implementation, the names of the states and corresponding values 3464 representing the end of the threshold ranges are also displayed adjacent to chart 3431. The user may similarly be able to adjust, edit, add or delete thresholds from this GUI, as described above.

In GUI 3434 of FIG. 34AJ, the method of auto-threshold determination is selected using the percentiles tab 3466. The percentiles method takes the calculated KPI values and shows the distribution of those values divided into some number of percentile groups that each correspond to a state of the selected service. In one embodiment, there may be a default number of threshold groups (e.g., 5) each corresponding to a different state (i.e., critical, high, medium, low, normal). In one implementation, the threshold groups 3468 are displayed in GUI 3434 along with the state and percentile corresponding to each. The actual values that correspond to the boundaries of the threshold groups 3468 are not displayed until a period of time over which the values are to be calculated is selected from pull down menu 3470. Examples of the period of time may include the last 60 minutes, the last day, the last week, etc.

Upon selection of the period of time, the actual values 3471 that correspond to the boundaries of the threshold groups 3468 are displayed in GUI 3434, as shown in FIG. 34AK. According to the example illustrated in FIG. 34AK, the critical state includes values above the $90^{th}$ percentile (indicating that 90% of the calculated values are below this state), which corresponds to an actual value of 401.158 milliseconds. Similarly, the high state includes values between the $90^{th}$ and $75^{th}$ percentiles, which correspond to values between 401.158 milliseconds and 341.737 milliseconds, and so on. GUI 3434 provides the ability for the user to rename the states, adjust the associated percentages that correspond to each state, and to add or remove displayed states as well. Once configuration of thresholds in the percentiles tab 3466 is completed, horizontal bands 3476 corresponding to each state may be displayed on chart 3431, as illustrated in FIG. 34AL. As shown, the range of values represented by each band 3476 varies according to the distribution of the data since the thresholds were set using the percentiles method. In one implementation, the names of the states and corresponding values 3478 representing the end of the threshold ranges are also displayed adjacent to chart 3431. The user may similarly be able to adjust, edit, add or delete thresholds from this GUI, as described above.

In GUI 3434 of FIG. 34AM, the method of auto-threshold determination is selected using the standard deviation tab 3480. The standard deviation method takes the calculated KPI values and shows the distribution of those values divided into some number of groups, based on standard deviation from the mean value, that each correspond to a state of the selected service. In one embodiment, there may be a default number of threshold groups (e.g., 5) each corresponding to a different state (i.e., critical, high, medium, low, normal). In one implementation, the threshold groups 3482 are displayed in GUI 3434 along with the state and number of standard deviations corresponding to each. The actual values that correspond to the boundaries of the threshold groups 3482 are not displayed until a period of time over which the values are to be calculated is selected from pull down menu 3484.

Upon selection of the period of time, the actual values 3486 that correspond to the boundaries of the threshold groups 3482 are displayed in GUI 3434, as shown in FIG. 34AN. According to the example illustrated in FIG. 34AN, the critical state includes values above the 2 standard deviations from the mean, which corresponds to an actual value of 582.825 milliseconds. Similarly, the high state includes values between 1 and 2 standard deviations from the mean, which corresponds to values between 582.825 milliseconds and 436.704 milliseconds, and so on. GUI 3434 provides the ability for the user to rename the states, adjust the associated percentages that correspond to each state, and to add or remove displayed states as well. Once configuration of thresholds in the standard deviation tab 3480 is completed, horizontal bands 3490 corresponding to each state may be displayed on chart 3431, as illustrated in FIG. 34AO. As shown, the range of values represented by each band 3490 varies according to the distribution of the data since the thresholds were set using the standard deviation method. In one implementation, the names of the states and corresponding values 3492 representing the end of the threshold ranges are also displayed adjacent to chart 3431. The user may similarly be able to adjust, edit, add or delete thresholds from this GUI, as described above.

Time Varying Static Thresholds

Time varying static thresholds may be an enhancement to the thresholds discussed above and may enable a user to customize a specific threshold or set of thresholds to vary over time. Thresholds may enable a user (e.g., IT managers) to indicate values that when exceeded may initiate an alert or some other action. One or more thresholds may apply to the same metric or metrics. For example, a CPU utilization metric may have a first threshold to indicate that a utilization less than 20% is good, a second threshold at 50% to indicate that a range from 20% to 50% is normal, and a third threshold at 100% to indicate that a range of 50% to 100% is critical. In some implementations, the thresholds may be set to specific values and the same values may apply at all times, for example, the same threshold may apply to both working hours and non-working hours.

In other implementations, threshold values may differ for different time frames. For example, computing resources may vary over time and what may be considered critical during one time frame may not be considered critical during another time frame. To address such a situation, time varying static thresholds can be provided to enable a user to generate different sets of KPI thresholds that apply to different time frames. In one example, a user may define a threshold scheme that includes multiple sets of thresholds that vary depending on time to account for expected variations in the metric. For instance, sets of thresholds may be defined to address variations in the utilization (e.g., variations in load or performance) of an email service to distinguish between an expected decrease in performance and a problematic decrease in performance. An expected decrease in performance may occur between 8 am and 10 am Monday-Friday because the email clients may synchronize when the client machines are first activated in the morning. A problematic decrease in performance may seem similar to the expected performance but may occur at different times and as a result of, for example, the server behaving erratically and may be a prelude to email service malfunction (e.g., email server crash). With a time varying static thresholds, a user may configure the thresholds based on time frames so that alarms would be avoided when the behavior is expected and alarms would be activated for abnormal behavior.

The time frames may be based on any unit of time, such as for example, time of the day, days of the week, certain months, holiday seasons or other duration of time. The time frames may apply in a cyclical manner, such that each of the multiple sets of KPI thresholds may apply sequentially over and over, for example, a first set of KPI thresholds may apply during weekdays and a second set of KPI thresholds may apply during weekends and the sets may be repeated for each consecutive week. The cyclical application of KPI thresholds may enable a user to have more granular control of KPI states and enhance the user's ability to discover abnormal behavior when behavior cycles. A user may use time varying static thresholds to better ensure alarms are triggered when appropriate and to avoid false positives such as triggering alarms when unnecessary.

As will be discussed in more detail below in conjunction with FIGS. 34AP through 34AS, a user may configure time varying static thresholds by defining multiple sets of KPI thresholds that correspond to different time frames. Each set of KPI thresholds may be defined by a user and may include one or more KPI thresholds. The KPI thresholds may be compared with KPI values to determine a state of a KPI at a point in time or during a period of time. Multiple GUIs may be used in conjunction with time varying static thresholds, for example, one GUI may allow the user to define the sets of KPI thresholds and another GUI may display the resulting states of a KPI that are determined based on the sets of KPI thresholds.

FIG. 34AP is a flow diagram of an implementation of a method 34110 for defining one or more sets of KPI thresholds that span multiple time frames, in accordance with one or more implementations of the present disclosure. The method may be performed by processing logic that may comprise hardware (circuitry, dedicated logic, etc.), software (such as the one run on a general purpose computer system or a dedicated machine), or a combination of both. In one implementation, the method 34110 is performed by a client computing machine. In another implementation, the method 34110 is performed by a server computing machine coupled to the client computing machine over one or more networks.

For simplicity of explanation, the methods of this disclosure are depicted and described as a series of acts (e.g., blocks). However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 34110 may begin at block 34102 when the computing machine may cause display of a GUI to identify a KPI for a service. For example, the GUI may display the name of the KPI (e.g., KPI name 2961 in FIG. 29C), or some other information that identifies the KPI. As discussed above, the KPI may be defined by a search query that produces a KPI value derived from machine data pertaining to one or more entities providing the service. The KPI value may be indicative of a performance assessment for the service at a point in time or during a period of time. The GUI may also display one or more threshold fields (e.g., threshold field 2904 in FIG. 29C) for fields from the entities' machine data that are used to derive a value produced by the KPI search query. One or more thresholds can be applied to the value associated with the threshold field. In particular, the value can be produced by the KPI search query and can be, for example, the value of the threshold field in an event satisfying search criteria of the search query when the search query is executed, a statistic calculated based on one or more values of the threshold field in one or more events satisfying the search criteria of the search query when the search query is executed, a count of events satisfying the search criteria of the search query that include a constraint for the threshold field, etc. For example, the threshold field can be "cpu_load_percent," which may represent the percentage of the maximum processor load currently being utilized on a particular machine. In other examples, the threshold may be applied to some other fields, such as total memory usage, remaining storage capacity, server response time, network traffic, etc.

At block 34104, the computing machine may receive, via the GUI a user input specifying different sets of KPI thresholds to apply to a KPI value to determine the state of the KPI. The GUI for receiving user input specifying different sets of KPI thresholds may be the same as the GUI that identifies the KPI, or it may be a separate GUI, which may be presented when a user selects, in the GUI identifying the KPI, a button (or any similar UI element) for adding thresholds to the KPI.

Each set of KPI thresholds specified by the user may correspond to a distinct time frame. In one example, there may be three different sets of KPI thresholds. The first set may correspond to a time frame including one or more weekdays or all weekdays. The second set may correspond to a time frame including days of a weekend or a span of time from Friday evening to Monday morning. The third set may include one or more holidays. In another example, one time frame may include working hours (e.g., 9 am-5 pm) and another time frame may include non-working hours (5:01 pm-8:59 am). In yet another example, there may be six different sets of KPI thresholds. The first set may correspond to a time frame including working hours (e.g., 9 am-5 pm) for Monday through Thursday. The second set may correspond to a time frame including non-working hours (5:01 pm-8:59 am) for Monday through Thursday. The third set may correspond to a time frame including working hours for Fridays. The fourth set may correspond to a time frame including non-working hours for Fridays. The fifth set may include weekends, and the sixth set may include holidays.

Each set of KPI thresholds may include multiple thresholds that define multiple states (e.g., critical, non-critical). Each KPI threshold may represent an end of a range of values corresponding to a particular KPI state. Each range may have one or more ends, for example, one end may be based on the minimum value of the range and another end may be based on the maximum value of the range. The range of values corresponding to a particular state may have a specific KPI threshold at each end or may have a KPI at only one end and be open-ended on the other end. For example, a critical state may be defined by a single KPI threshold that identifies one end of the range (i.e., the minimum value) and the other end may not be specified and can extend to cover any value greater than or less than the KPI threshold. In one example, a KPI threshold may define an end that functions as a boundary between KPI states such that a set of three KPI thresholds may define three states. The boundary may define a mutual end between two separate but adjacent ranges that correspond to two different states. In another example, each KPI state may be defined by two KPI thresholds where a first KPI threshold defining the minimum value of the range and the second KPI threshold defining the maximum value of the range. In this case, the KPI ranges may not need to be adjacent and instead may include gaps between states, for example there may be a critically low state and a critically high state with no state therebetween or there may be a default state therebetween (e.g., non-critical).

The GUI for receiving user input may include marks corresponding to one or more KPI thresholds of the sets of KPI thresholds. Each mark may be a graphical representation of a specific KPI threshold from each of the sets of KPI thresholds. The marks may be the same or similar to the marks discussed in regards to FIG. 31A, 34AR or 34AS (e.g., 3717, 3156, 34132A-F) and may be displayed on columns that correspond to each time frame. The GUI may enable a user to manually change existing KPI thresholds by adjusting the marks. The marks and columns will be discussed in more detail in regards to FIG. 34AR.

In some implementations, the user may specify thresholds for the first time frame (e.g., working hours), and then the computing machine may automatically predict, based on prior history, how KPI values during the second time frame (e.g., non-working hours) would differ from KPI values during the first time frame, and suggest thresholds for the second time frame based on the predicted difference. In one example, if average KPI values during the first time frame are 80 percent higher than average KPI values during the second time frame, the computing machine may suggest KPI thresholds for the second time frame that are 80 percent lower than the KPI thresholds specified for the first time frame. The user may then either accept suggested KPI thresholds or modify them as needed. In another example, a suggestion of a KPI threshold for the second time frame may be based on the KPI values within the second time frame without relying on the values within other time frames. In this example, the computing machine may suggest a KPI threshold at a particular percentile of the values in the second time frame (e.g., $75^{th}$ percentile). In either example, the suggestion may be based on a statistical method such as, percentile, average, median, standard deviation or other statistical technique.

At block 34106, the computing machine may cause the different sets of KPI thresholds to be available for determining a KPI state (e.g., at a later time). This may involve storing the sets of KPI thresholds in a data structure or data store that may be accessible by the machine determining the states of the KPIs. In one example, a client device may be used to set the KPI threshold values and another machine (e.g., server machine) may evaluate the KPI values to determine the state of the KPI. In other examples, any device may be used to define the sets of KPI thresholds. In some implementations, the different sets of KPI thresholds are stored as part of the service definition (e.g., in the same database or file), or in association with the service definition (e.g., in a separate database or file). Using the example illustrated in FIG. 17B, different sets of KPI thresholds can be stored in a service definition structure 1720 as part of a KPI component 1727.

FIG. 34AQ is a flow diagram of an implementation of a method 34112 for determining the states of a KPI based on different sets of KPI thresholds defined for multiple time frames. As discussed above in regards to FIG. 34AP, performance of a service can be assessed using a KPI's values that may change over time. As the KPI values change, they may exceed a specific threshold or fall below a specific threshold, which may cause the state of the KPI to change over time, for example, a KPI may be in a high state for a few hours and then enter a critical state for an hour before entering a low state.

Method 34112 may be performed by processing logic that may comprise hardware (circuitry, dedicated logic, etc.), software (such as is run on a general purpose computer system or a dedicated machine), or a combination of both. In one implementation, the method 34112 is performed by a client computing machine. In another implementation, the method 34112 is performed by a server computing machine coupled to the client computing machine over one or more networks.

At block 34114, the computing machine may execute a search query against machine data to produce a KPI value indicative of a performance assessment for a service at a point in time or during a period of time. The machine data may be derived from one or more of web access logs, email logs, DNS logs or authentication logs that can be produced by one or more entities providing the service. In one example, executing the search query may involve applying a late-binding schema to a plurality of events having machine data produced by the entities. The late-binding schema may be associated with one or more extraction rules defining one or more fields in the plurality of events.

Next, the computing machine determines the state of the KPI based on the produced KPI value. In order to determine the state of the KPI, the computing machine needs to determine which set of the KPI thresholds should be applied to the produced KPI value. Such a determination involves comparing the point in time or the period of time used for the calculation of the KPI value with different time frames of multiple sets of KPI thresholds. In particular, at block 34116, the computing machine may identify one of the sets of KPI thresholds that correspond to a time frame that covers the point in time or the period of time associated with the KPI value. In one example, the KPI thresholds may have a time frame that corresponds to days of the week (e.g., weekdays, weekends) and the comparison may involve identifying the day of the week associated with the KPI value and comparing the day of the week with the time frames of the sets of KPI values to determine a set whose time frame covers the identified day of the week. In another example, the KPI thresholds may have a time frame that correspond to a specific date (e.g., holiday) and the comparison may involve identifying the date associated with the KPI value and comparing the date with the time frames of the sets of KPI thresholds to determine a set whose time frame matches the identified date. In yet another example, the KPI thresholds may have a time frame that corresponds to times of the day (e.g., 9 am, 5 pm, midnight, afternoon, night) and the comparison may involve identifying the time of the day associated with the KPI value and comparing the time of the day with the time frames of the sets of KPI thresholds to determine a set whose time frame covers the identified time.

In some situations, there may be multiple overlapping sets of KPI thresholds, for example, there may be different sets of thresholds for weekdays, weekends and holidays and the sets may have overlapping time frames. This may occur when there is a weekday set of thresholds and a holiday set of thresholds and a holiday occurs on a weekday. As a result, the time associated with a single KPI value may correspond to two separate sets of KPI thresholds. When this occurs, the computing machine may include a set of rules or an algorithm for selecting a set of KPI thresholds to apply. In one example, the computing machine may defer to the set of KPI thresholds that has the smallest time frame (e.g., most specific time frame). This may involve calculating the total duration of time associated with each of the overlapping sets of thresholds. For example, if one set included each weekday and the other set included each holiday, the computing machine may calculate the total duration covered by the weekday set of thresholds (e.g., 52 weeks×5 days a week equals approximately 260 days) and the holiday set of thresholds (e.g., 10 federal holidays) and determine the holiday set is the set that has the smaller total duration. The computing machine may then select the set of thresholds associated with the smaller duration of time and use the KPI thresholds in the selected set to determine the states corresponding to the KPI values. In other examples, the computing machine may select a set of KPI thresholds based on creation time or modification time of the sets, in which case the newest or oldest set of thresholds may be selected.

At block 34118, the computing machine may select a KPI state for the KPI value from the KPI states that correspond to the set of KPI thresholds identified at block 34116. As discussed above, the KPI thresholds of a set may define multiple ranges and each of the ranges may correspond to a KPI state. Once the appropriate set of thresholds has been identified, the computing machine may compare a specific KPI value with the thresholds of the set to determine which range the value corresponds to (e.g., falls within). For example, a set of KPI thresholds may pertain to web server response delay during a weekday time frame. The set of KPI thresholds may include three threshold values that correspond respectively to an end of a range (e.g., minimum or maximum value) of each of the three KPI states (e.g., low, medium, high). The computing machine may select the KPI state by performing a comparison between ranges of the KPI thresholds and the KPI value produced at block 345114 to determine where the value lies within the multiple ranges. Once a range is identified, the computing device may select the state associated with the range and assign that state to the KPI during the time associated with the KPI value.

At block 34119, the computing machine causes display of a GUI that visually illustrates the selected state of the KPI. The GUI may be, for example, a service-monitoring dashboard GUI or a deep dive KPI visualization GUI that are discussed in more detail below.

FIG. 34AR illustrates an exemplary GUI 34140 for defining sets of KPI thresholds with different time frames, in accordance with one or more implementations of the present disclosure. GUI 34140 may display multiple sets of KPI thresholds, a first set may correspond to a first time frame (e.g., working hours) and a second set may correspond to a second time frame (e.g., non-working hours). Each set may include multiple KPI thresholds that define the ranges of KPI values that correspond to respective states (e.g., critical, warning, normal). GUI 34140 may include a time frame region 34142, a threshold display region 34143, and a visualization region 34144 and multiple buttons 34152A and 34152B. Each of the regions may include multiple GUI elements that may be interrelated in such a manner that a user may select a KPI set in either the time frame region 34143 or visualization region 34144 and the thresholds region 34143 is then updated to display the thresholds that correspond to the selected set. The GUI elements may include input fields divided into several regions to receive various user input and visually illustrate the received input. When multiple sets of KPI thresholds are defined, each set may correspond to a specific row (e.g., 34145A) within time frame region 34142 and may be visually illustrated by a specific column (e.g., 34130A) within visualization region 34144.

Time frame display region 34142 may display multiple rows 34145A and 34145B that correspond to time frames for different sets of KPI thresholds. Each row may include a time frame description field 34146, end time fields 34147A and 34147B and time unit selection 34148. Time frame description field 34146 may provide a field for a user to enter a textual description (e.g., working hours) that may describe the time frame during which the set of KPI thresholds applies. End time fields 34147A and 34147B may indicate the respective start time (e.g., 9 am) and end time (e.g., 5 pm) of the time frame. Time unit selection 34148 may provide a drop down box, which when selected, allows a user to select a unit of time. As shown, a user may select a unit from three options (e.g., times, days, holidays), however in other examples there may be any number of options including any time unit or combination of time units.

Threshold display region 34143 may display the thresholds and corresponding states for the selected time frame (e.g., working hours). As shown, the time frame for working hours may include three states 34149A-C and each state of the KPI may have a name (e.g., critical, warning and normal), and can be represented by a range of values, and a visual indicator. The range of values may be defined by one or more thresholds (e.g., 75, 50, 0) that can provide the minimum value and/or the maximum value of the range of values for the state. The visual indicator uniquely identifies a corresponding state using a visual effect (e.g., distinct color). The characteristics of the state (e.g., the name, the range of values, and a visual indicator) can be edited via input fields of the respective GUI element.

Visualization region 34144 may include one or more columns 34130A and 34130B and one or more markers 34132A-F. Each of columns 34130A and 34130B may correspond respectively to the set displayed in threshold display region 34143 and a row (e.g., 34145A) within time frame region 34142. Selecting a different column (e.g., column 34130B) may update the threshold display region 34143 to show a different set of thresholds and update time frame region 34142 to highlight a different row (e.g., 34145B). As illustrated, column 34130A represents the time frame corresponding to working hours and includes three markers 34132A-C that correspond respectively to states 34149A-C. The space between each marker represents the range of KPI values that correspond to the state. The space between columns 34130A and 34130B illustrates the duration of the time frame for the set of KPI thresholds, namely an eight-hour block that spans from 9 am to 5 pm. The space between column 34130B and the end of the visualization region illustrates the duration of the time frame for another set of KPI thresholds and may be a block (approximately 16 hours) that spans from 5:01 pm to 8:59 am. Although not displayed in the figure, column 34130A may also be displayed at the far right portion of visualization region 34144. This is because the time frames are cyclical and the current duration of time displayed is a full cycle (e.g., 24 hours). Therefore, the end of the cycle is 9 am, which is when the time frame of the first set of KPI thresholds (e.g., working hours) begins.

Addition buttons 34152A and 34152B may be used to initiate a user request to add additional time frames or additional thresholds. In response to a user selecting additional button 34152A, a new row (e.g., 34145B) may be created within time frame region 34142 and a new column (e.g., 34130B) may be created in visualization region 34144. In addition, threshold display region 34143 may be cleared to allow a user to add thresholds using addition button 34152B.

Addition button 34152B may enable a user to add multiple thresholds to the set of KPI thresholds. For example, in response to a user selecting addition button 34152A, a new threshold (e.g., 34149A) may be added to threshold display region 34143. In addition, a new mark may be created on column 34130B in visualization region 34144. The user may then have multiple ways to set the threshold value. One option may involve the user typing a value into the threshold value field 34136. Another option would be for the user to adjust the corresponding marker to slide it up or down on the column. Dragging the marker up the column would increase the threshold value and dragging the marker down the column may decrease the threshold value.

When the user has finished defining the sets of KPI thresholds, the user may exit the GUI. This may add the sets of KPI thresholds to a data store to be accessed when determining the states of KPI values, as discussed in regards to FIG. 34AS.

FIG. 34AS is an exemplary GUI 34240 for displaying the states a KPI over time in view of sets of KPI thresholds. As discussed above, a user may define a set of KPI thresholds for a first time frame (e.g., work hours) and a second set of KPI thresholds for a second time frame (e.g., non-working hours). The system may then use the sets of KPI thresholds to determine which KPI values correspond to which states. GUI 34240 may graphically illustrate the state of each KPI value using a visual indicator (e.g., bar chart overlay).

GUI 34240 may include a graph 34231, states 34249A-C, state indicators 34238A-C, and multiple KPI points 34238A-F that span a time duration. The time duration may be adjusted by the user and may include a portion of a time cycle or one or more time cycles. A cycle may be based on a day, week, month, year or other repeatable duration of time. As shown in GUI 34231, the cycle may be based on a 24-hour period and within the 24 hour period there may be multiple time frames corresponding to the sets of KPI thresholds.

Graph 34231 may be a line chart or line graph or other graphical visualization that displays multiple data points (e.g., KPI values) over time. Graph 34231 may include columns 34230A and 34230B that may each correspond to a set of KPI thresholds and may include markers 34239A-C as discussed in regards to FIG. 34AR.

States 34249A-C may correspond to ranges of KPI values that are separated by KPI thresholds represented in the figure as markers 34239A-C. Each threshold may correspond to a threshold indicator line (e.g., horizontal dotted line 34236A) that indicates the end of a state or a boundary between states. Threshold indicator lines 34236A and 34236B help illustrate time varying static thresholds because threshold indicator lines 34236A and 34236B each correspond to the same state, namely third state 34249C (e.g., critical) and during different time frames the same state may correspond to different threshold values and therefore different ranges. For example, during first time frame 34234A the threshold for the thirds state 34249C corresponds to threshold indicator 34236A (e.g., at 75) and at second time frame 34234B the threshold for the third state 34249C corresponds to threshold indicator 34236B (e.g., at 40).

KPI points 34238A-F may represent KPI values at a point in time or during a period of time. Each of the KPI points 34238A-F may be determined by a search query and may correspond to a KPI state. As discussed above with respect to FIG. 34AQ, method 34240 may be used to determine the KPI value and to determine which state the KPI value corresponds to. Once the state is determined, it may be displayed on graph 34231 using state indicators 34237A-C (e.g., bars of bar chart).

State indicators 34237A-C may visually represent the state of the KPI over time. Each state indicator 34237A-C may correspond to one or more KPI points and may be determined in view of the sets of KPI thresholds and respective time frames. As shown, state indicator 34237A indicates that KPI point 34238A is within a first state (e.g., normal), state indicator 34237B indicates that KPI point 34238B is within a second state (e.g., warning) and state indicator 34237C indicates that KPI point 34238C is within a third state (e.g., critical). The state indicators may include colors, patterns or other visual effects capable of distinguishing the state indicators. The location of the state indicator with respect to the KPI point may vary. In one example the state indicator may overlap the KPI point with the KPI point being in the middle of the upper end of the state indicator, in other examples the KPI point may be the left most point, right most point or other variation.

As discussed herein, the disclosure describes various mechanisms for defining and using time varying static thresholds to determine states of a KPI over different durations of time. The disclosure describes graphical user interfaces that enable a user to define multiple sets of KPI thresholds for different time frames as well as graphical user interfaces for displaying the states of multiple KPI values in view of the multiple sets of KPI thresholds.

Correlation Search and KPI Distribution Thresholding

As discussed above, the aggregate KPI score can be used to generate notable events and/or alarms, according to one or more implementations of the present disclosure. In another implementation, a correlation search is created and used to generate notable event(s) and/or alarm(s). A correlation search can be created to determine the status of a set of KPIs for a service over a defined window of time. Thresholds can be set on the distribution of the state of each individual KPI and if the distribution thresholds are exceeded then an alert/alarm can be generated.

The correlation search can be based on a discrete mathematical calculation. For example, the correlation search can include, for each KPI included in the correlation search, the following:

(sum_crit>threshold_crit)&&((sum_crit+sum_warn)>(threshold_crit+threshold_warn))&&((sum_crit+sum_warn+sum_normal)>(threshold_crit+threshold_warn+threshold_normal))

Input (e.g., user input) can be received that defines one or more thresholds for the counts of each state in a defined (e.g., user-defined) time window for each KPI. The thresholds define a distribution for the respective KPI. The distribution shift between states for the respective KPI can be determined. When the distribution for a respective KPI shifts toward a particular state (e.g., critical state), the KPI can be categorized accordingly. The distribution shift for each KPI can be determined, and each KPI can be categorized accordingly. When the KPIs for a service are categorized, the categorized KPIs can be compared to criteria for triggering a notable event. If the criteria are satisfied, a notable event can be triggered.

For example, a Web Hosting service may have three KPIs: (1) CPU Usage, (2) Memory Usage, and (3) Request Response Time. The counts for each state a defined (e.g., user-defined) time window for the CPU Usage KPI can be determined, and the distribution thresholds can be applied to the counts. The distribution for the CPU Usage KPI may shift towards a critical state, and the CPU Usage KPI is flagged as critical accordingly. The counts for each state in a defined time window for the Memory Usage KPI can be determined, and the distribution thresholds for the Memory Usage KPI may also shift towards a critical state, and the Memory Usage KPI is flagged as critical accordingly.

The counts of each state in a defined time window for the Request Response Time KPI can be determined, and the distribution thresholds for the Request Response Time KPI can be applied to the counts. The distribution for the Request Response Time KPI may also shift towards a critical state, and the Request Response Time KPI is flagged as critical accordingly. The categories for the KPIs can be compared to the one or more criteria for triggering a notable event, and a notable event is triggered as a result of each of the CPU Usage KPI, Memory Usage KPI, and Request Response Time KPI being flagged as critical.

Input (e.g., user input) can be received specifying one or more criteria for triggering a notable event. For example, the criteria may be that when all of the KPIs in the correlation search for a service are flagged (categorized) a critical state, a notable event is triggered. In another example, the criteria may be that when a particular KPIs is flagged a particular state for a particular number of times, a notable event is triggered. Each KPI can be assigned a set of criteria.

For example, a Web Hosting service may have three KPIs: (1) CPU Usage, (2) Memory Usage, and (3) Request Response Time. The counts of each state in a defined (e.g., user-defined) time window for the CPU Usage KPI can be determined, and the distribution thresholds can be applied to the counts. The distribution for the CPU Usage KPI may shift towards a critical state, and the CPU Usage KPI is flagged as critical accordingly. The counts of each state in a defined time window for the Memory Usage KPI can be determined, and the distribution thresholds for the Memory Usage KPI can be applied to the counts. The distribution for the Memory Usage KPI may also shift towards a critical state, and the Memory Usage KPI is flagged as critical accordingly. The counts of each state in a defined time window for the Request Response Time KPI can be determined, and the distribution thresholds for the Request Response Time KPI can be applied to the counts. The distribution for the Request Response Time KPI may also shift towards a critical state, and the Request Response Time KPI is flagged as critical accordingly. The categories for the KPIs can be compared to the one or more criteria for triggering a notable event, and a notable event is triggered as a result of each of the CPU Usage KPI, Memory Usage KPI, and Request Response Time KPI being flagged as critical.

Alarm Console-KPI Correlation

Figure 34B:
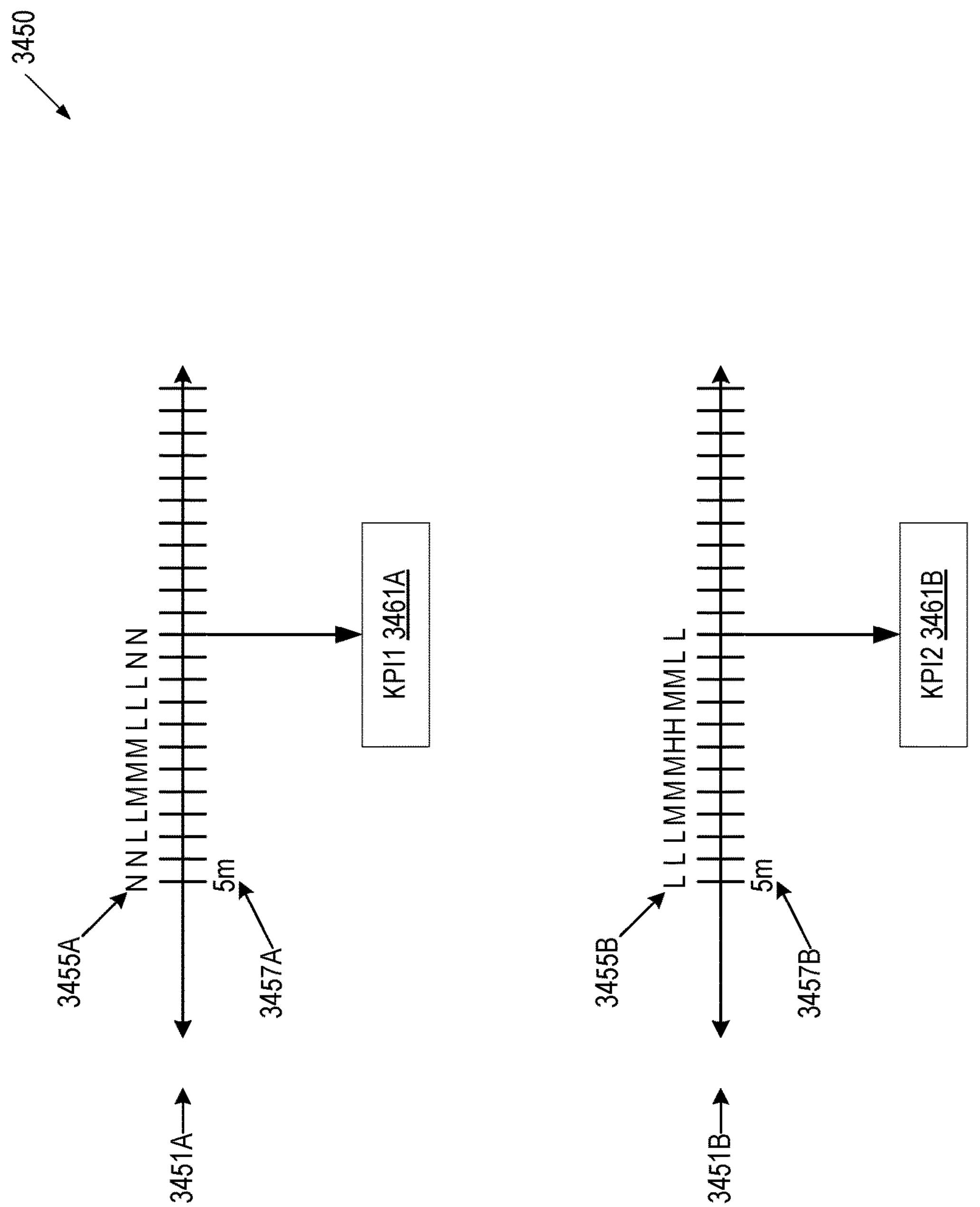
FIG. 34B illustrates a block diagram of an example of monitoring one or more services using key performance indicator(s), in accordance with one or more implementations of the present disclosure.

FIG. 34B illustrates a block diagram 3450 of an example of monitoring one or more services using key performance indicator(s), in accordance with one or more implementations of the present disclosure. As described above, a key performance indicator (KPI) for a service can be determined based on a monitoring period. For example, a service may have two KPIs (e.g., KPI1 3461A and KPI2 3461B). Each KPI 3461A-B can be set with a monitoring period 3457A-B of "every 5 minutes", and a value for each KPI 3461A-B can be calculated every 5 minutes, as illustrated in timelines 3451A-B. One implementation of setting a monitoring period via a GUI is described above in conjunction FIG. 29C.

Referring to FIG. 34B, each time a KPI value is calculated for each KPI 3461A-B, the value can be mapped to a state 3455A-B (e.g., Critical (C), High (H), Medium (M), Low (L), Normal (N), and Informational (I)) based on, for example, the KPI thresholds that are set for a particular KPI. The thresholds that map a KPI value to a KPI state may differ between KPIs. For example, a value of "75" may be calculated for KPI1 3461A, and the value "75" may map to a "High" state for KPI1 3461A. In another example, the same value of "75" may be calculated for KPI2 3461BA, but the value "75" may map to a "Critical" state for KPI2 3461B. One implementation for configuring thresholds for a KPI is described above in conjunction with FIG. 31D.

Referring to FIG. 34B, each time a value and corresponding state is determined for each KPI, the KPI value and corresponding KPI state are stored as part of KPI data for the particular KPI in a service monitoring data store. The service monitoring data store can store KPI data for any number of KPIs for any number of services.

A KPI correlation search definition can be specified for searching the KPI data in the service monitoring data store to identify particular KPI data, and evaluating the particular KPI data for a trigger determination to determine whether to cause a defined action. A KPI correlation search definition can contain (i) information for a search, (ii) information for a triggering determination, and (iii) a defined action that may be performed based on the triggering determination.

Figure 34C:
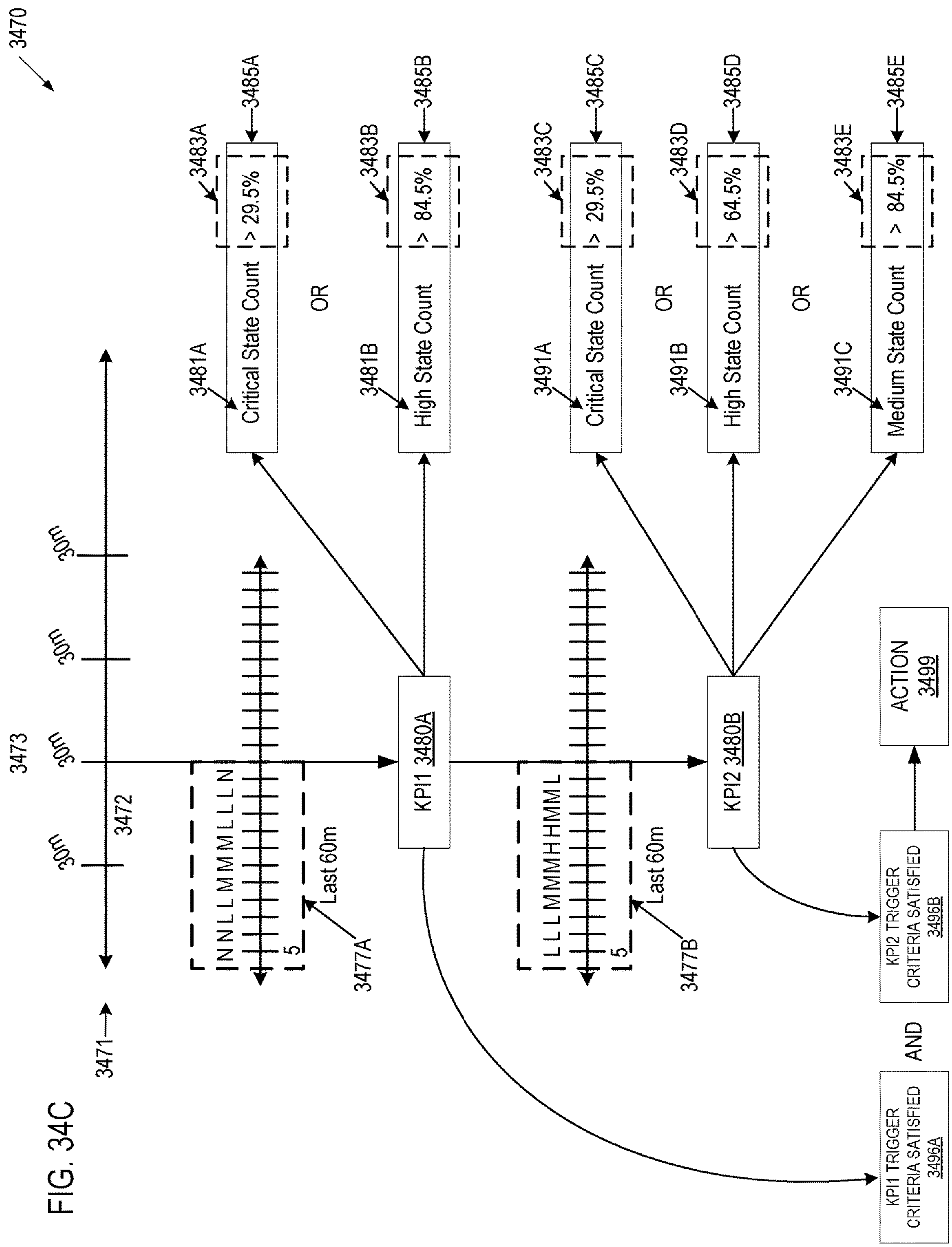
FIG. 34C illustrates an example of monitoring one or more services using a KPI correlation search, in accordance with one or more implementations of the present disclosure.

FIG. 34C illustrates an example of monitoring one or more services using a KPI correlation search, in accordance with one or more implementations of the present disclosure. As described above, the KPI correlation search definition can contain (i) information for a search, (ii) information for a triggering determination, and (iii) a defined action that may be performed based on the triggering determination.

The information for the search identifies the KPI names and corresponding KPI information, such as values or states, to search for in the service monitoring data store. The search information can pertain to multiple KPIs. For example, in response to user input, the search information may pertain to KPI1 3480A and KPI2 3480B. A KPI that is used for the search can be an aspect KPI that indicates how a particular aspect of a service is performing or an aggregate KPI that indicates how the service as a whole is performing. The KPIs that are used for the search can be from different services.

The search information can include one or more KPI name-State value pairs (KPI-State pair) for each KPI that is selected for the KPI correlation search. Each KPI-State pair identifies which KPI and which state to search for. For example, the KPI1-Critical pair specifies to search for KPI values of KPI1 3480A that are mapped to a Critical State 3481A. The KPI1-High pair specifies to search for KPI values of KPI1 3480A that are mapped to a High State 3481B.

The information for the search can include a duration 3477A-B specifying the time period to arrive at data that should be used for the search. For example, the duration 3477A-B may be the "Last 60 minutes," which indicates that the search should use the last 60 minutes of data. The duration 3477A-B can be applied to each KPI-State pair.

The information for the search can include a frequency 3472 specifying when to execute the KPI correlation search. For example, the frequency 3472 may be every 30 minutes. For example, when the KPI correlation search is executed at time 3473 in timeline 3471, a search may be performed to identify KPI values of KPI1 3480A that are mapped to a Critical State 3481A within the last 60 minutes 3477A, and to identify KPI values of KPI1 3480A that are mapped to a High State 3481B within the last 60 minutes 3477A.

For KPI2 3480B, the search may be performed at time 3473 based on three KPI-State pairs. For example, the search may be performed to identify KPI values of KPI2 3480B that are mapped to a Critical State 3491A within the last 60 minutes 3477B, KPI values of KPI2 3480B that are mapped to a High State 3491B within the last 60 minutes 3477B, and KPI values of KPI2 3480B that are mapped to a Medium State 3491C within the last 60 minutes 3477B.

The information for a trigger determination can include one or more trigger criteria 3485A-E for evaluating the results (e.g., KPIs having particular states) of executing the search specified by the search information to determine whether to cause a defined action 3499. There can be a trigger criterion 3485A-E for each KPI-State pair that is specified in the search information.

The trigger criterion 3485A-E for each KPI-State pair can include a contribution threshold 3483A-E that represents a statistic related to occurrences of a particular KPI state. In one implementation, a contribution threshold 3483A-E includes an operator (e.g., greater than, greater than or equal to, equal to, less than, and less than or equal to), a threshold value, and a statistical function (e.g., percentage, count). For example, the contribution threshold 3483A for the trigger criterion 3485A may be "greater than 29.5%," which is directed to the number of occurrences of the critical KPI state for KPI1 3480A that exceeds 29.5% of the total number of all KPI states determined for KPI1 3480A over the last 60 minutes. For example, the state for KPI 3480A is determined 61 times over the last 60 minutes, and the KPI correlation search evaluates whether KPI 3480A has been in a critical state more than 29.5% of the 61 determinations. The total number of states in the duration is determined by the quotient of duration and frequency. The total number can be calculated based upon KPI monitoring frequency defined in a KPI definition and search time defined in the KPI correlation search. For example, total=(selected time/frequency time).

In one implementation, when there are multiple trigger criteria pertaining to a particular KPI, the KPI correlation search processes the multiple trigger criteria pertaining to the particular KPI disjunctively (i.e., their results are logically OR'ed). For example, the KPI correlation search can include trigger criterion 3485A and trigger criterion 3485B pertaining to KPI1 3480A. If either trigger criterion 3485A or trigger criterion 3485B is satisfied, the KPI correlation search positively indicates the satisfaction of trigger criteria for KPI1 3480A. In another example, the KPI correlation search can include trigger criterion 3485C, trigger criterion 3485D, and trigger criterion 3485E pertaining to KPI2 3480B. If any one or more of trigger criterion 3485C, trigger criterion 3485D, and trigger criterion 3485E is satisfied, the KPI correlation search positively indicates the satisfaction of trigger criteria for KPI2 3496B.

In one implementation, when multiple KPIs (e.g., KPI1 and KPI2) are specified in the search information, the KPI correlation search treats the multiple KPIs conjunctively in determining whether the correlation search trigger condition has been met. That is to say, the KPI correlation search must positively indicate the satisfaction of trigger criteria for every KPI in the search or the defined action will not be performed. For example, only after the KPI correlation search positively indicates the satisfaction of trigger criteria for both KPI1 3480A and KPI2 3480B will the determination be made that the correlation search trigger condition has been met and defined action 3499 can be performed. Said another way, satisfaction of the trigger criteria for a correlation search is determined by first logically OR'ing together evaluations of the trigger criteria within each KPI, and then logically AND'ing together those OR'ed results from all the KPI's.

Figure 34D:
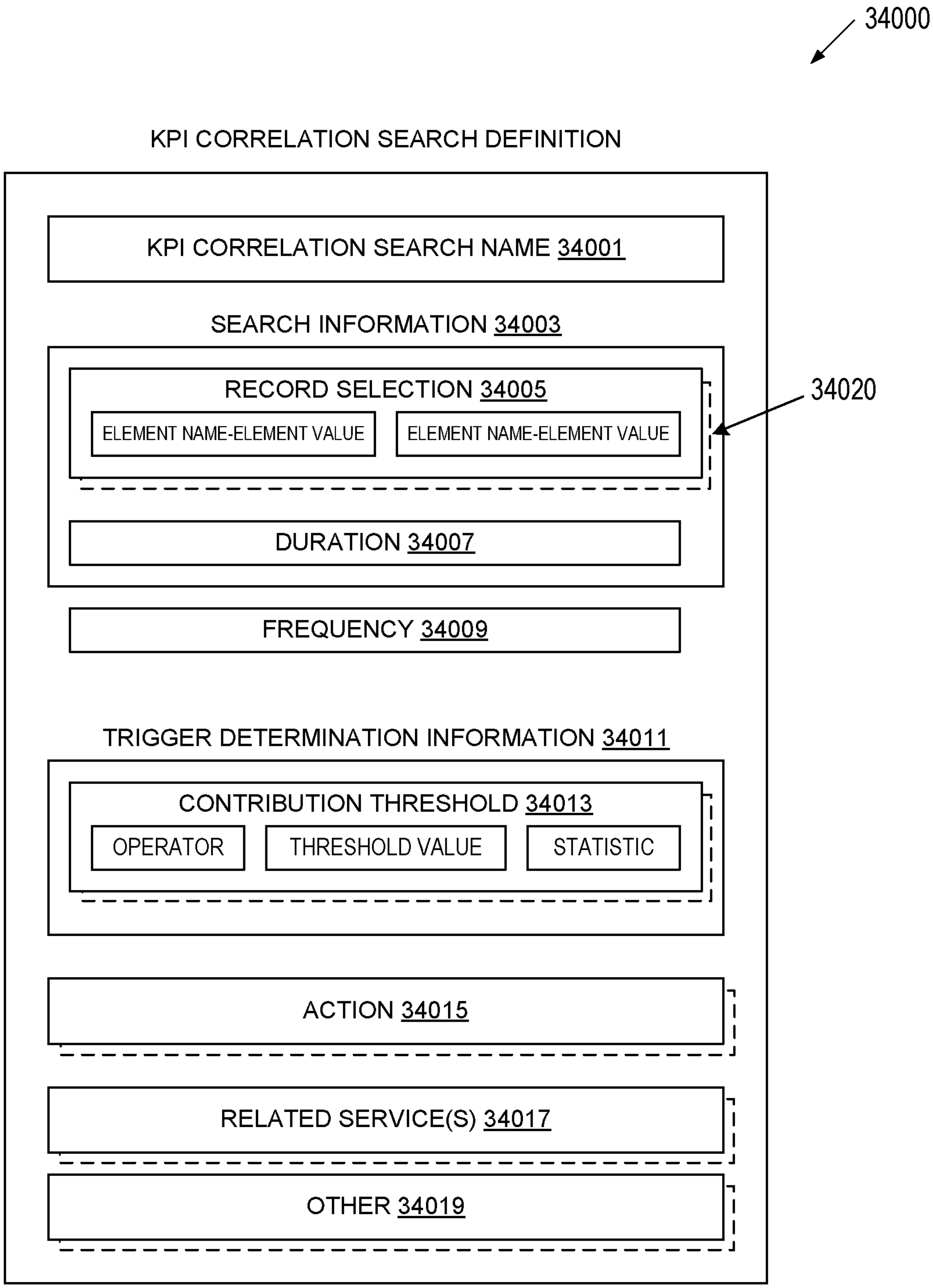
FIG. 34D illustrates an example of the structure for storing a KPI correlation search definition, in accordance with one or more implementations of the present disclosure.

FIG. 34D illustrates an example of the structure 34000 for storing a KPI correlation search definition, in accordance with one or more implementations of the present disclosure. A KPI correlation search definition can be stored in a service monitoring data store as a record that contains information about one or more characteristics of a KPI correlation search. Various characteristics of a KPI correlation search include, for example, a name of the KPI correlation search, information for a search, information for a triggering determination, a defined action that may be performed based on the triggering determination, one or more services that are related to the KPI correlation search, and other information pertaining to the KPI correlation search.

The KPI correlation search definition structure 34000 includes one or more components. A component may pertain to search information 34003 or trigger determination information 34011 for the KPI correlation search definition. Each KPI correlation search definition component relates to a characteristic of the KPI correlation search. For example, there is a KPI correlation search name component 34001, one or more record selection components 34005 for the information for the search, a duration component 34007, a frequency component 34009 for the frequency of executing the KPI correlation search, one or more contribution threshold components 34013 for the information for the triggering determination, one or more action components 34015, one or more related services components 34017, and one or more components for other information 34019. The characteristic of the KPI correlation search being represented by a particular component is the particular KPI correlation search definition component's type.

One or more of the KPI correlation search definition components can store information for an element. The information can include an element name and one or more element values for the element. In one implementation, an element name-element value(s) pair within a KPI correlation search definition component can serve as a field name-field value pair for a search query. In one implementation, the search query is directed to search a service monitoring data store storing service monitoring data pertaining to the service monitoring system. The service monitoring data can include, and is not limited to, KPI data (e.g., KPI values, KPI states, timestamps, etc.) and KPI specifications.

In one example, an element name-element value pair in the search information 34003 in the KPI correlation search definition can be used to search the KPI data in the service monitoring data store for the KPI data that has matching values for the elements that are named in the search information 34003.

The search information 34003 can include one or more record selection components 34005 to identify the KPI names and/or corresponding KPI states to search for in the service monitoring data store (e.g., KPI-state pairs). For example, the record selection component 34005 can include a "KPI1-Critical" pair that specifies a search for values for KPI1 corresponding to a Critical state. In one implementation, there are multiple KPI-state pairs in a record selection component 34005 to represent various states that are selected for a particular KPI for the KPI correlation search definition. For example, two states for KPI1 may be selected for the KPI correlation search definition. The record selection component 34005 can include another KPI-state pair "KPI1-High" pair that specifies a search for values for KPI1 corresponding to a High state. In one implementation, a single KPI name can correspond to multiple state values. For example, the record selection component 34005 can include a KPI-state pair "KPI1-Critical,High". In one implementation, the multiple values are treated disjunctively. For example, a search query may search for values for KPI1 corresponding to a Critical state or a High state. In one implementation, the KPI is continuously monitored and the states of the KPI are stored in the service monitoring data store. The KPI correlation search searches the service monitoring data store for the particular states specified in the search information in the KPI correlation search.

There can be one or multiple components having the same KPI correlation search definition component type. For example, there can be multiple record selection components 34005 to represent multiple KPIs. For example, there can be a record selection component 34005 to store KPI-state value pairs for KPI1, and another record selection component 34020 to store KPI-state value pairs for KPI2. In one implementation, some combination of a single and multiple components of the same type are used to store information pertaining to a KPI correlation search in a KPI correlation search definition.

In one implementation, the search information 34003 includes a duration component 34007 to specify the time period to arrive at data that should be searched for the KPI-state pairs. For example, the duration may be the "Last 60 minutes", and the KPI states that are to be extracted by execution of the KPI correlation search can be from the last 60 minutes. In another implementation, the duration component 34007 is not part of the search information 34003.

The trigger determination information 34011 can include one or more trigger criteria for evaluating the results of executing the search specified by the search information to determine whether to cause a defined action. The trigger criteria can include a contribution threshold component 34013 for each KPI-state pair in the record selection components 34005. Each contribution threshold component 34013 can include an operator (e.g., greater than, greater than or equal to, equal to, less than, and less than or equal to), a threshold value, and a statistical function (e.g., percentage, count). For example, the contribution threshold 34013 may be "greater than 29.5%".

The action component 34015 can specify an action to be performed when the trigger criteria are considered to be satisfied. An action can include, and is not limited to, generating a notable event, sending a notification, and displaying information in an incident review interface, as described in greater detail below in conjunction with FIGS. 34O-34Z. The related services component 34017 can include information identifying services to which the KPI(s) specified in the search information 34003 pertain. The frequency component 34009 can include information specifying when to execute the KPI correlation search. For example, the KPI correlation search may be executed every 30 minutes.

A KPI correlation search definition can include a single KPI correlation search name component 34001 that contains the identifying information (e.g., name, title, key, and/or identifier) for the KPI correlation search. The value in the name component 34001 can be used as the KPI correlation search identifier for the KPI correlation search being represented by the KPI correlation search definition. For example, the name component 34001 may include an element name of "name" and an element value of "KPI-Correlation-1846a1cf-8eef-4". The value "KPI-Correlation-1846a1cf-8eef-4" becomes the KPI correlation search identifier for the KPI correlation search that is being represented by KPI correlation search definition.

Various implementations may use a variety of data representation and/or organization for the component information in a KPI correlation search definition based on such factors as performance, data density, site conventions, and available application infrastructure, for example. The structure (e.g., structure 34000 in FIG. 34D) of a KPI correlation search definition can include rows, entries, or tuples to depict components of a KPI correlation search definition. A KPI correlation search definition component can be a normalized, tabular representation for the component, as can be used in an implementation, such as an implementation storing the KPI correlation search definition within an RDBMS. Different implementations may use different representations for component information; for example, representations that are not normalized and/or not tabular. Different implementations may use various data storage and retrieval frameworks, a JSON-based database as one example, to facilitate storing KPI correlations search definitions (KPI correlation search definition records). Further, within an implementation, some information may be implied by, for example, the position within a defined data structure or schema where a value, such as "Critical", is stored—rather than being stored explicitly. For example, in an implementation having a defined data structure for a KPI correlation search definition where the first data item is defined to be the value of the name element for the name component of the KPI correlation search, only the value need be explicitly stored as the KPI correlation search component and the element name (name) are known from the data structure definition.

Figure 34E:
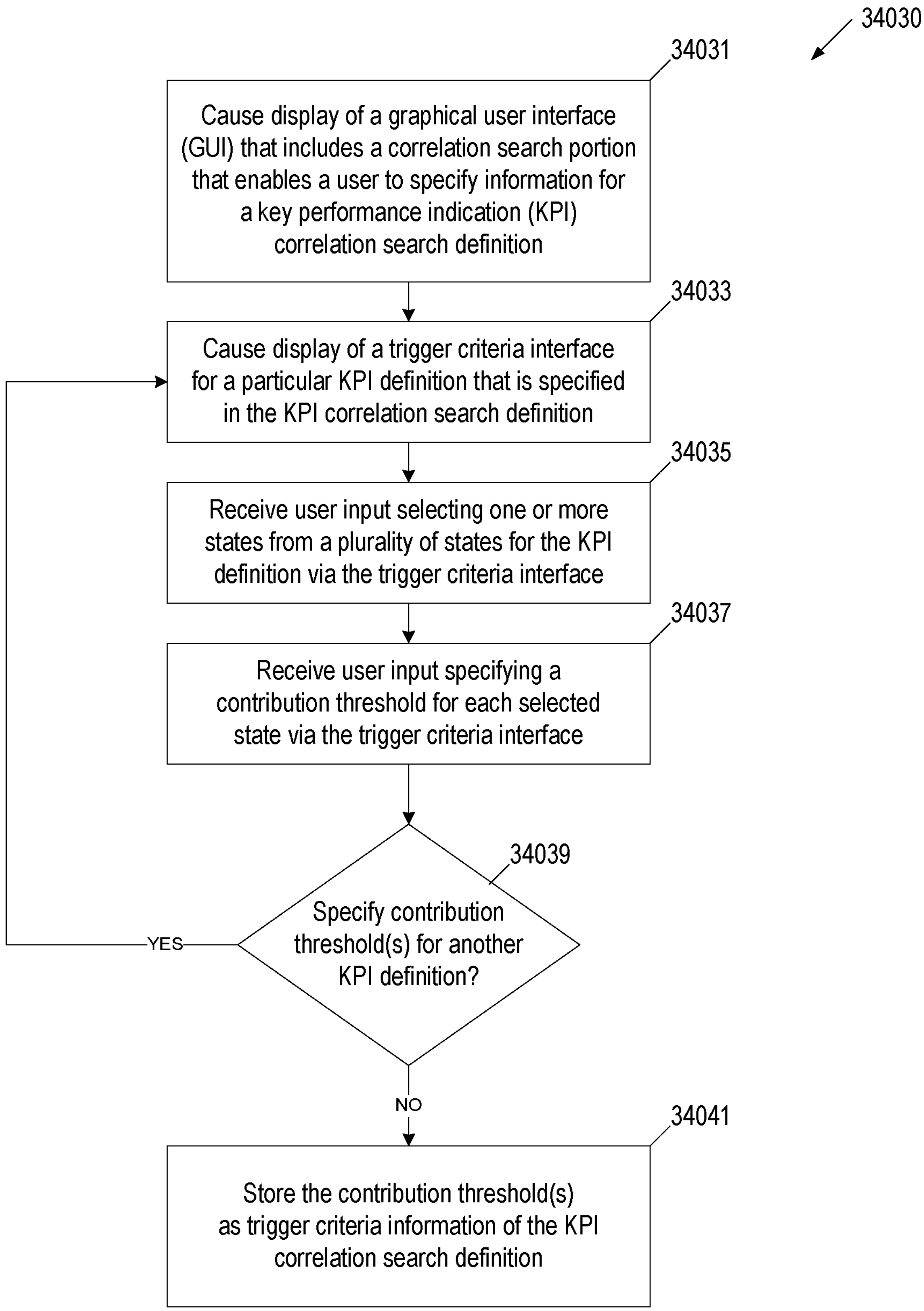
FIG. 34E is a flow diagram of an implementation of a method for monitoring service performance using a KPI correlation search, in accordance with one or more implementations of the present disclosure.

FIG. 34E is a flow diagram of an implementation of a method 34030 for monitoring service performance using a KPI correlation search, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, at least a portion of method is performed by a client computing machine. In another implementation, at least a portion of method is performed by a server computing machine.

At block 34031, the computing machine causes display of a graphical user interface (GUI) that includes a correlation search portion that enables a user to specify information for a KPI correlation search definition. An example GUI that enables a user to specify information for a KPI correlation search definition is described in greater detail below in conjunction with FIG. 34G.

Referring to FIG. 34E, the KPI correlation search definition can include (i) information for a search, (ii) information for a triggering determination, and (iii) a defined action that may be performed based on the triggering determination. The information for the search identifies KPI values in a data store. Each KPI value is indicative of a KPI state. Each of the KPI values in the data store is derived from machine data pertaining to one or more entities identified in a service definition for a service using a search query specified by a KPI definition associated with the service.

The information for the trigger determination includes trigger criteria. The trigger determination evaluates the identified KPI values using the trigger criteria to determine whether to cause a defined action.

At block 34033, the computing machine causes display of a trigger criteria interface for a particular KPI definition that is specified in the KPI correlation search definition. An example trigger criteria interface is described in greater detail below in conjunction with FIG. 34J.

Referring to FIG. 34E, at block 34035, the computing machine receives user input, via the trigger criteria interface for the particular KPI definition (KPI), selecting one or more states. The KPI can be associated with one or more states. Example states can include, and are not limited to, Critical, High, Medium, Low, Normal, and Informational. The states can be configurable. The trigger criteria interface is populated based on the states that are defined for the particular KPI, for example, via GUI 3100 in FIG. 31A.

Referring to FIG. 34E, at block 34037, the computing machine receives user input specifying a contribution threshold for each selected state via the trigger criteria interface. In one implementation, a contribution threshold includes an operator (e.g., greater than, greater than or equal to, equal to, less than, and less than or equal to), a threshold value, and a statistical function (e.g., percentage, count). For example, the contribution threshold for a particular state may be "greater than 29.5%".

At block 34039, the computing machine determines whether one or more contribution thresholds are to be specified for another KPI that is included in the KPI correlation search definition. The KPI correlation search definition may specify multiple KPIs (e.g., KPI1 3480A and KPI2 3480B in FIG. 34C).

If one or more contribution thresholds are to be specified for another KPI, the computing machine returns to block 34033 to cause the display of a trigger criteria interface that corresponds to the other KPI, and user input can be received selecting one or more states at block 34035. User input can be received specifying a contribution threshold for each selected state at block 34037.

If no other contribution thresholds are to be specified for another KPI (block 34039), the computing machine stores the contribution threshold(s) as trigger criteria information of the KPI correlation search definition at block 34041. In one implementation, the contribution threshold(s) are stored in contribution threshold components (e.g., contribution threshold components 34013 in FIG. 34D) in a KPI correlation search definition.

Figure 34F:
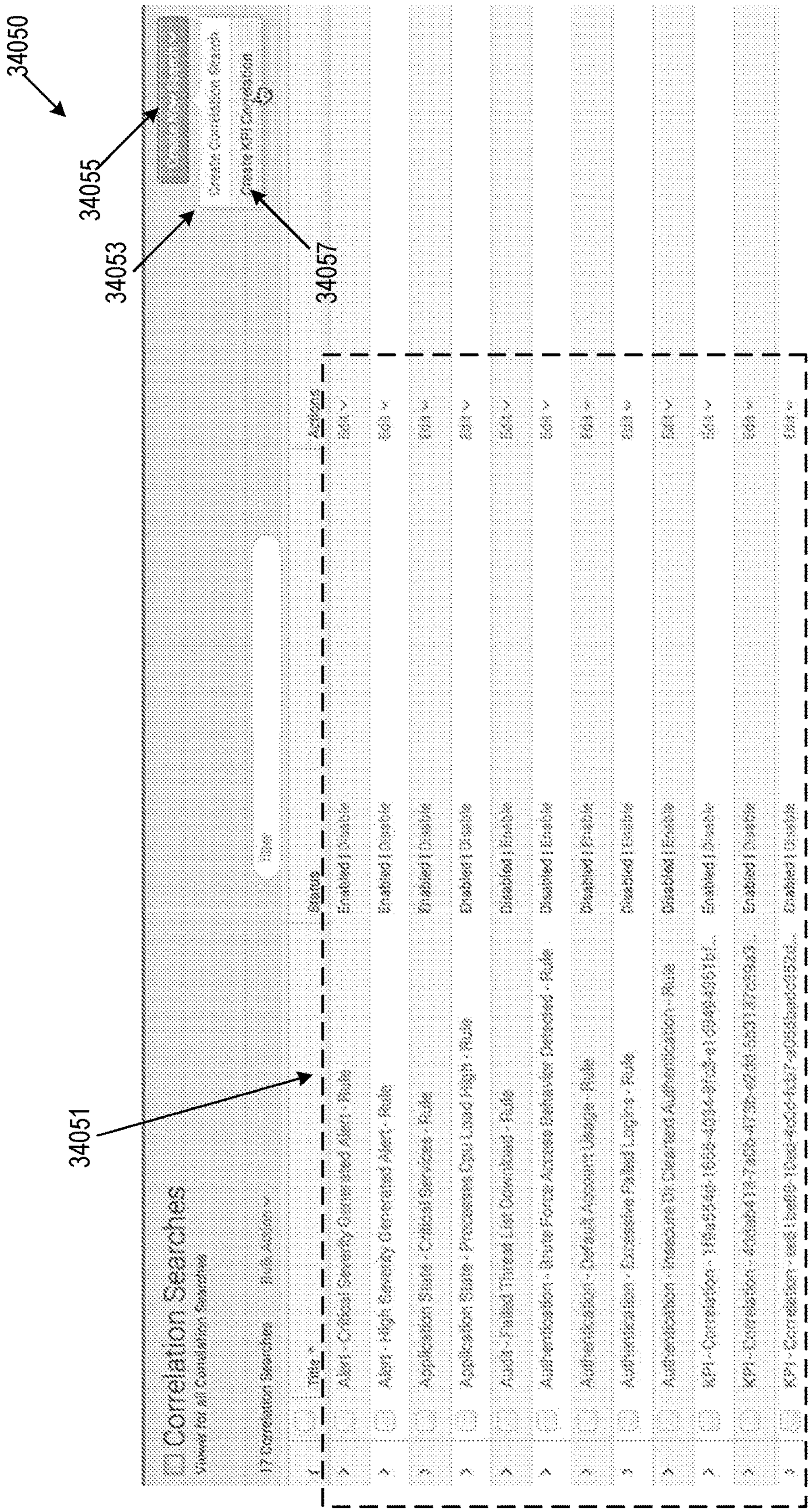
FIG. 34F illustrates an example of a GUI of a service monitoring system for initiating creation of a KPI correlation search, in accordance with one or more implementations of the present disclosure.

FIG. 34F illustrates an example of a GUI 34050 of a service monitoring system for initiating creation of a KPI correlation search, in accordance with one or more implementations of the present disclosure. In one implementation, GUI 34050 is displayed when an item in a list (e.g., list 706 in FIG. 7) to create correlation searches is activated.

GUI 34050 can include a list 34051 of correlation searches that have been defined. GUI 34050 can include a button 34055 for creating a new correlation search. When the button 34055 is activated, a list 34053 of the types of correlation search (e.g. "correlation search", "KPI correlation search") that can be created is displayed. A "KPI correlation search" includes searching for specific data produced for one or more KPI's and evaluating that data against a trigger condition so as to cause a predefined action when satisfied. In one embodiment, the "KPI correlation search" in this context of GUI element 34057 includes a search for KPI state values or indicators for one or more KPI's and evaluating that data against a trigger condition specified using state-related trigger criteria for each KPI so as to cause a predefined action, such as posting a notable event, when satisfied. A "correlation search" in the context of GUI element 34053 includes searching for specified data and evaluating that data against a trigger condition so as to cause a predefined action when satisfied, as described in greater detail in conjunction with FIGS. 34O-34Z. When an item 34057 in the list 34053 for creating a KPI correlation search is activated, a GUI for defining a KPI correlation search is displayed, as described below.

Figure 34G:
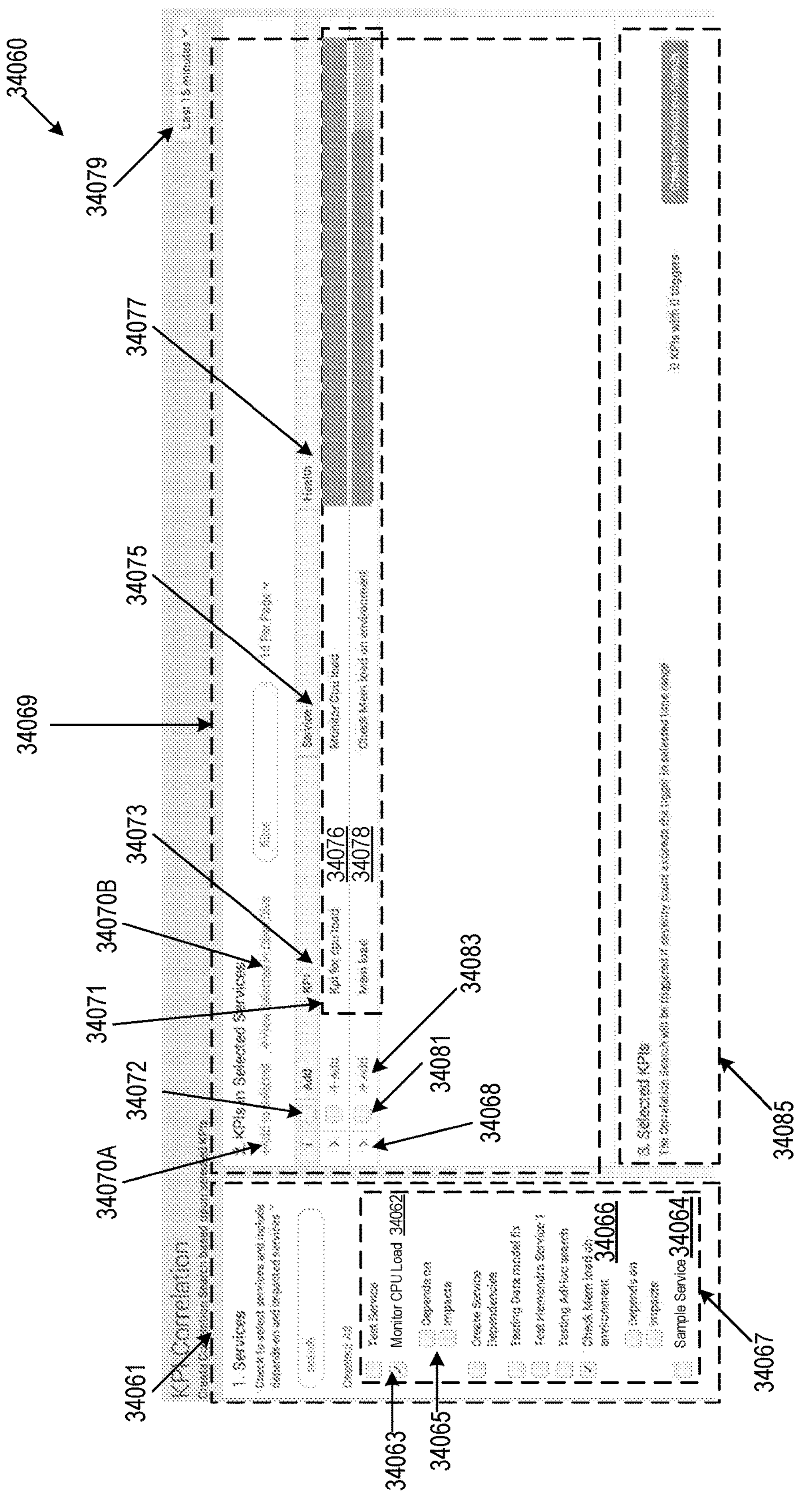
FIG. 34G illustrates an example of a GUI of a service monitoring system for defining a KPI correlation search, in accordance with one or more implementations of the present disclosure.

FIG. 34G illustrates an example of a GUI 34060 of a service monitoring system for defining a KPI correlation search, in accordance with one or more implementations of the present disclosure. GUI 34060 includes a services portion 34061, a KPI portion 34069, and a correlation search portion 34085. The services portion 34061 includes a list 34067 of services that have been defined, for example, using GUIs of the service monitoring system. In one implementation, the list 34067 is populated using the service definition records that are stored in a service monitoring data store. Each service in the list 34067 can correspond to an existing service definition record. The element value in the name component of the service definition record can be displayed in the list 34067.

In one implementation, the services in the list 34067 are ranked. In one implementation, the ranking of the services in the list 34067 is based on the KPI values of the services in the service monitoring data store. As described above, for each KPI of a service, the KPI values can be calculated for a service based on a monitoring period that is set for the KPI. The calculated KPI values can be stored as part of KPI data in the service monitoring data store. The ranking of the services can be based on, for example, the number of KPI values that are stored for a service, the timestamps for the KPI values, etc. For example, the monitoring period for a KPI may be "every 5 minutes" and the values are calculated for the KPI every 5 minutes. In another example, the monitoring period for a KPI may be set to zero and the KPI values may not be calculated. For example, if Sample Service 34064 has 10 KPIs, but the monitoring period for each of the KPIs has been set to zero, then the values for the 10 KPIs will not have been calculated and stored in the service monitoring data store. Sample Service 34064 will then be ranked below than other services with KPI monitoring periods greater than zero, in the list 34067.

One or more services in the list 34067 can be selected via a selection box (e.g., check box 34063) that is displayed for each service in the list 34067. When a service (e.g., Monitor CPU Load 34062) is selected from the list 34067 via a corresponding check box 34063, dependency boxes 34065 can be displayed for the corresponding selected service. The dependency boxes 34065 allow a user to optionally further specify whether to select the service(s) that depend on the selected service (e.g., Monitor CPU Load 34062) and/or to select the services which the selected service (e.g., Monitor CPU Load 34062) depends upon. As described above, a particular service can depend on one or more other services and/or one or more other services can depend on the particular service.

When one or more services are selected from the list 34067, the KPIs that correspond to the selected services can be displayed in the KPI portion 34069 in the GUI 34060. For example, the KPI "KPI for CPU Load" 34076 corresponds to the selected service "Monitor CPU Load" 34062, and the KPI "Memo Load" 34078 corresponds to the selected service "Check Mem Load on Environment" 34066. When a service is selected from the list 34067 and its "Depends on" or "Impacts" check box is selected, the KPI's that correspond to the services having the indicated dependency relationship with the selected service can be displayed in the KPI portion 34069 in the GUI 34060, as well. The KPI portion 34069 can be populated using data (e.g., KPI definitions, KPI values, KPI thresholds, etc.) that is stored in the service monitoring data store.

The KPI portion 34069 can include KPI data 34071 for the KPIs of the selected services. In one implementation, the KPI data 34071 is presented in a tabular format in the KPI portion 34069. The KPI data 34071 can include a header row and followed by one or more data rows. Each data row can correspond to a particular KPI. The KPI data 34071 can include one or more columns for each row. The header row can include column identifiers to represent the KPI data 34071 that is being presented in the KPI portion 34069. For example, the KPI data 34071 can include, for each row, a column that has the KPI name 34073, a column for the service name 34075 of the service that pertains to the particular KPI, and a column for a KPI health indicator 34077.

The KPI health indicator 34077 for each KPI can represent the performance of the corresponding KPI for a duration specified via button 34079. For example, the duration of the "Last 15 Minutes" has been selected as indicated by button 34079, and the KPI health indicator 34077 for each KPI can represent the performance of the corresponding KPI for the last 15 minutes relative to the point in time when the KPI data 34071 was displayed in the GUI 34060.

In one implementation, GUI 34060 includes a filtering text box to provide an index based case sensitive search functionality to filter out services. For example, if the service name is "Cpu load monitor service," a user can search using different options, such as "C". "c", "cpu", "Cpu", "load", and "cpu load monitor service". In one implementation, GUI 34060 includes a filtering text box to provide an index based case insensitive search for KPI name, service name and severity name. The text box can support key=value index based case insensitive search. For example for a selected service "Cpu load monitor service" there may be a KPI with named "Cpu percent load," which is monitored every minute and has state data with low=2, critical=9, high=4. A user can perform a search using for example, a name (KPI or Service)–key value pair. For example 1=2 or low=2, can return all KPIs where low=2. In another example, where high=4, the search can return all KPIs where high value is 4.

Figure 34H:
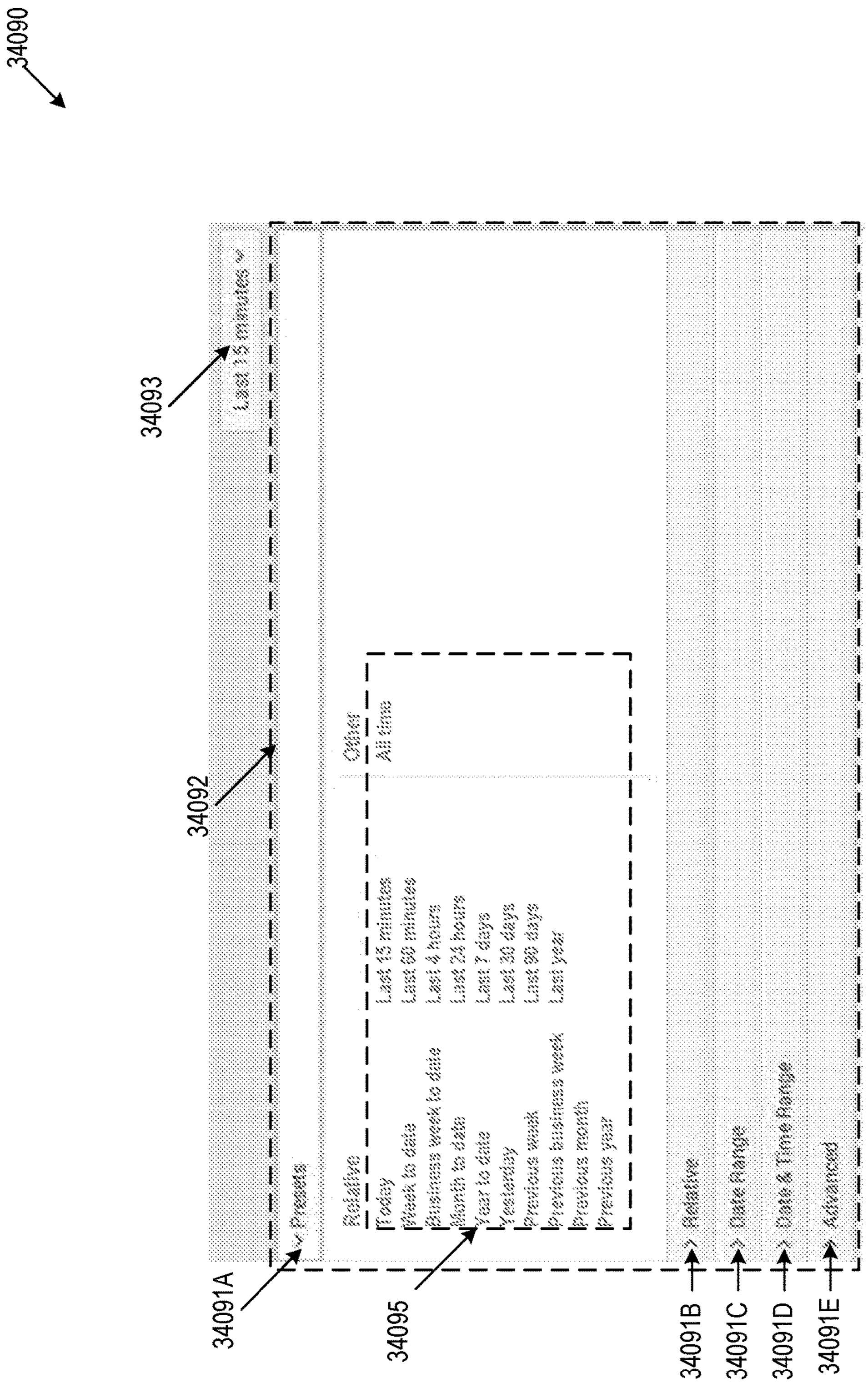
FIG. 34H illustrates an example GUI for facilitating user input specifying a duration to use for a KPI correlation search, in accordance with one or more implementations of the present disclosure.

When button 34079 is activated, for example, to select a different duration, a GUI enabling a user to specify a duration for determining the performance of the KPI is displayed. FIG. 34H illustrates an example GUI 34090 for facilitating user input specifying a duration to use for a KPI correlation search, in accordance with one or more implementations of the present disclosure. When button 34093 is activated, list 34092 can be displayed. The list 34092 can include buttons 34091A-E for selecting a duration for specifying the time period to arrive at data that should be searched for the KPI-state pairs. When button 34091A is selected, a list 30495 of preset durations is displayed. The list 34095 can include durations (e.g., Last 15 minutes) that are relative to the execution of the KPI correlation search and other types of preset durations (e.g., "All time"). For example, the duration that is selected may be the "Last 15 minutes," which points to the last 15 minutes of data, from the time the KPI correlation search is executed, that should be searched for the KPI-state pairs.

When button 34091B is selected, an interface for defining a relative duration is displayed. The interface can include a text box for specifying a string indicating the relative duration to use. For example, user input can be received via the text box specifying the "Last 3 days" as the duration. When button 34091C is selected, an interface for defining a date range for the duration is displayed. For example, user input can be received specifying the date range between 12/18/2014 and 12/19/2014 as the duration. When button 34091D is selected, an interface for defining a date and time range for the duration is displayed. For example, user input can be received specifying the earliest date/time of 12/18/2014 12:24:00 and the latest date time of 12/158/2014 13:24:56 as the duration. When button 34091E is selected, an interface for an advanced definition for the duration is displayed. For example, user input can be received specifying the duration using search processing language. The selected duration can be stored in a duration component (e.g., duration component 34007 in FIG. 34D) in a KPI correlation search definition.

Referring to FIG. 34G, the KPI portion 34069 can display an expansion button 34068 for each KPI in the KPI data 34071. When an expansion button 34068 is activated, the KPI portion 34069 displays detailed performance data for the corresponding KPI for the selected duration (e.g., Last 15 minutes).

Figure 34I:
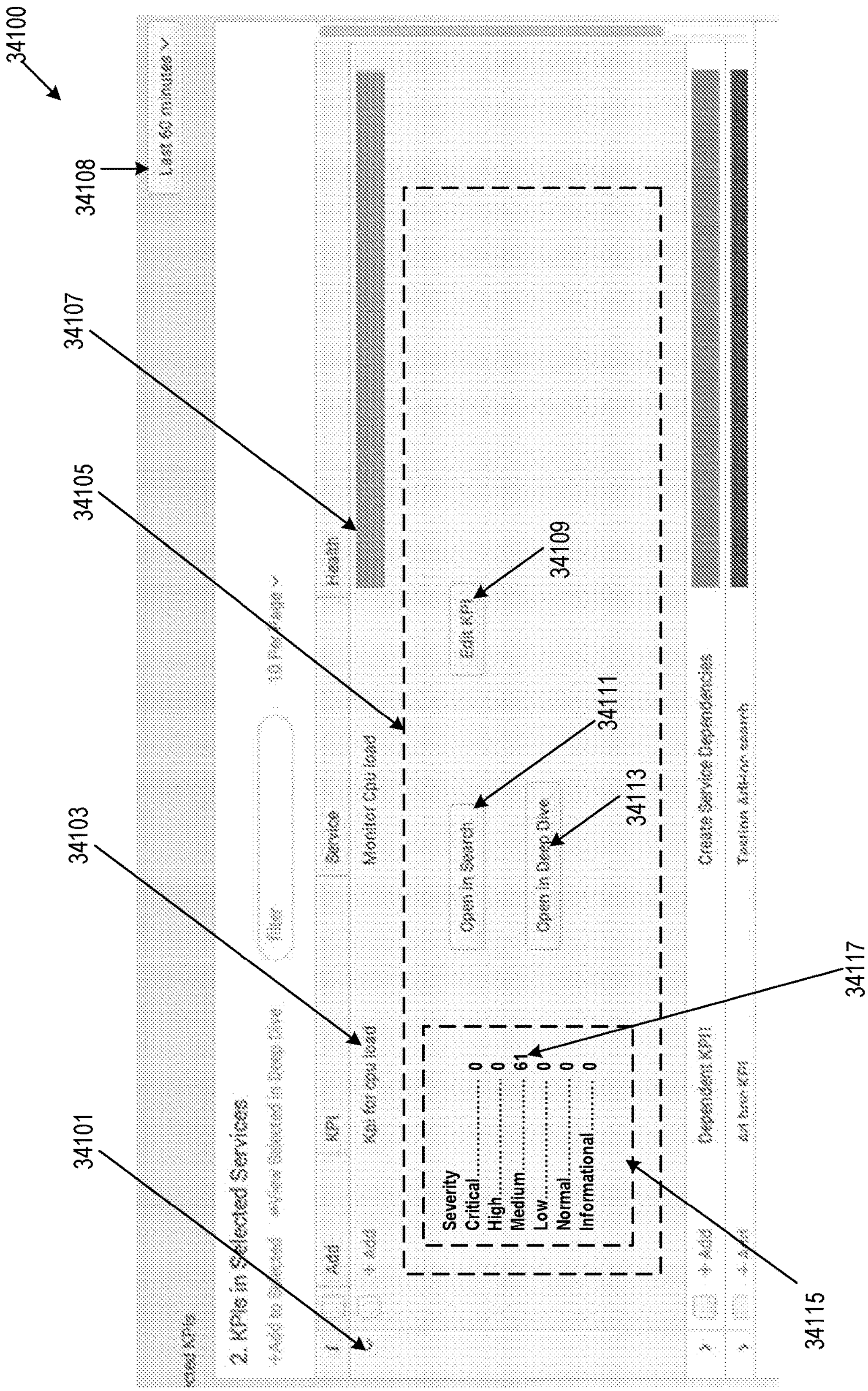
FIG. 34I illustrates an example of a GUI of a service monitoring system for presenting detailed performance data for a KPI for a time range, in accordance with one or more implementations of the present disclosure.

FIG. 34I illustrates an example of a GUI 34100 of a service monitoring system for presenting detailed performance data for a KPI for a time range, in accordance with one or more implementations of the present disclosure. GUI 34100 can correspond to KPI portion 34069 in FIG. 34G. Referring to FIG. 34I, GUI 34100 can include an expansion button (e.g., expansion button 34101) for each KPI in the GUI 34100. When an expansion button 34101 is activated, the GUI 34100 displays a detailed performance interface 34105 in association with the KPI health indicator 34107 for the particular KPI (e.g., "KPI for CPU Load" 34103) for the duration 34108 (e.g., "Last 60 Minutes"). The detailed performance interface 34105 displays detailed information about KPI performance corresponding to the indicator 34107.

The detailed performance interface 34105 can include a list 34115 of states that have been defined for the particular KPI. In one implementation, the states in the list 34115 are defined for the particular KPI via GUIs in FIGS. 31A-C described above. Referring to FIG. 34I, in one implementation, the states are displayed in a color that corresponds to a color that was defined for the particular state when the KPI thresholds for the particular KPI were defined.

The detailed performance interface 34105 can include a statistic 34117 for each state in the list 34115, which corresponds to the occurrences of a specific KPI state over duration 34108. For example, the KPI "KPI for CPU Load" 34103 may have a monitoring period of every one minute, and the value for the KPI "KPI for CPU Load" 34103 is calculated every minute. The statistic 34117 (e.g., "61") indicates how the KPI "KPI for CPU Load" 34103 performs during time period 34108 of "Last 60 Minutes," which shows that the KPI has been in a Medium state 61 times over the time period 34108 of "Last 60 Minutes." The total for the counts in the list 34115 corresponds to the number of calculations performed according to the monitoring period (e.g., every minute) of the KPI during time period 34108 (e.g., for the last 60 minutes) specified for the KPI correlation search.

The detailed performance interface 34105 can include an open KPI search button 34111, which when selected displays a search GUI presenting the search query defining the KPI. The detailed performance interface 34105 can include an edit KPI button 34109, which when selected can display a GUI for editing the definition of the particular KPI. The detailed performance interface 34105 can include a deep dive button 34113, which when selected can display a GUI for presenting a deep dive visualization for the particular KPI.

Referring to FIG. 34G, one or more KPIs in the KPI portion 34069 can be selected for the KPI correlation search definition. Each KPI in the KPI portion 34069 can have a selection box 34081 and/or a selection link 34083 for selecting individual KPIs. The KPI portion 34069 can include a bulk selection box 34072 for selecting all of the KPIs in the KPI portion 34069. A bulk action link (e.g., add to selection link 34070A, view in deep dive link 34070B) can be activated to apply an action (e.g., select for KPI correlation search definition, view in deep dive) to the selected KPIs.

The one or more KPIs that have been selected from the KPI portion 34069 can be used to populate the correlation search portion 34085, as described in greater detail below. In one implementation, when one or more KPIs have been selected from the KPI portion 34069, a trigger criteria interface for a particular KPI is displayed. In one implementation, the trigger criteria interface for the first selected KPI in the KPI portion 34069 is displayed. For example, if the KPI "KPI for CPU Load" 34076 and the KPI "Mem Load" 34078 have been selected, the trigger criteria interface for the KPI "KPI for CPU Load" 34076 is displayed, as described below in conjunction with FIG. 34J.

Figure 34J:
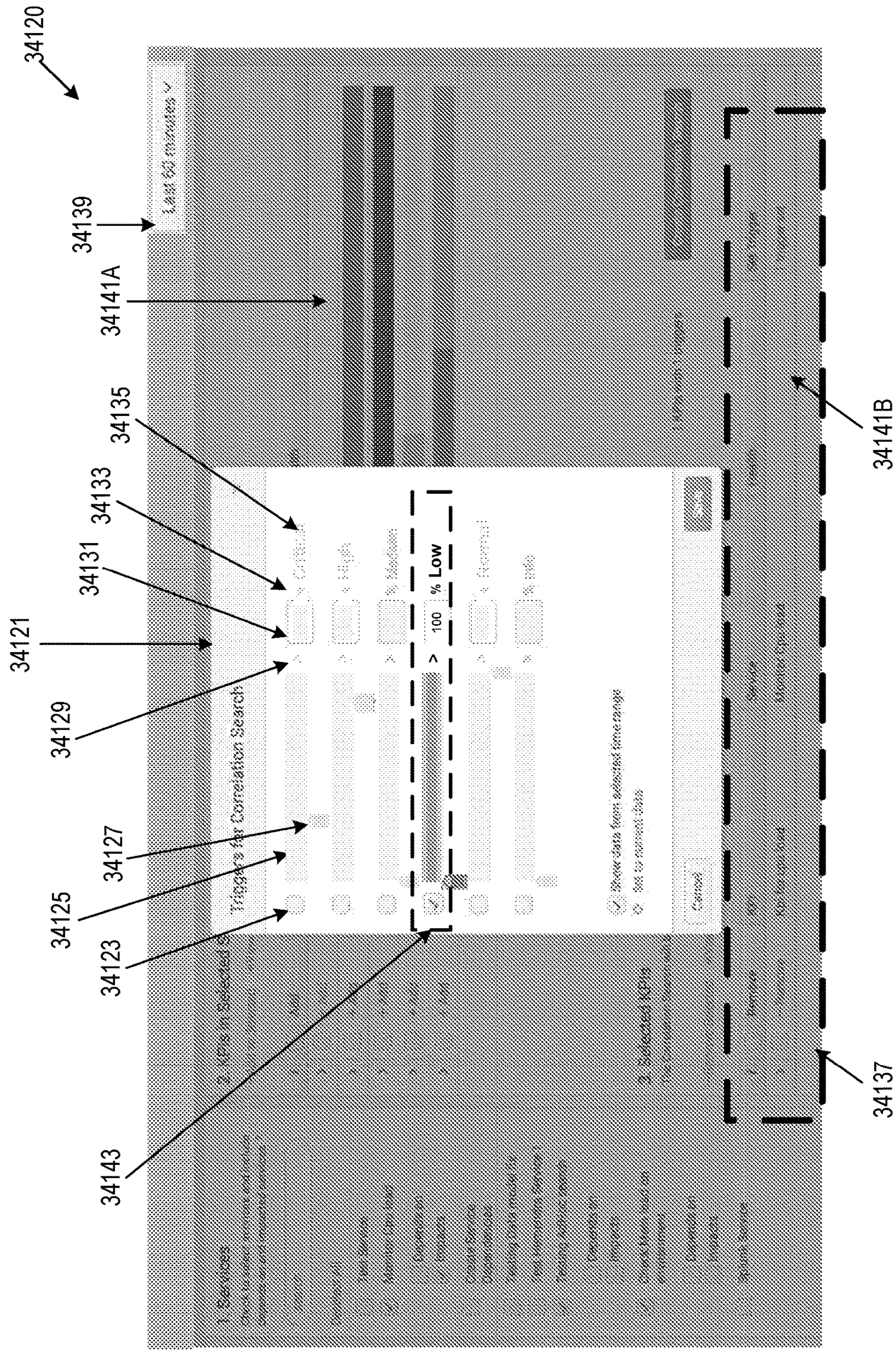
FIG. 34J illustrates an example of a GUI of a service monitoring system for specifying trigger criteria for a KPI for a KPI correlation search definition, in accordance with one or more implementations of the present disclosure.

FIG. 34J illustrates an example of a GUI 34120 of a service monitoring system for specifying trigger criteria for a KPI for a KPI correlation search definition, in accordance with one or more implementations of the present disclosure. In response to a KPI being selected from the KPI portion (e.g., KPI portion 34069 in FIG. 34G), the correlation search portion 34137 is updated to display the selected KPI(s). In one implementation, also in response to a KPI being selected from the KPI portion, a trigger criteria interface 34121 for a particular selected KPI is displayed. In one implementation, trigger criteria interface 34121 is displayed in the foreground and the correlation search portion 34137 is displayed in the background.

The trigger criteria interface 34121 enables a user to specify triggering conditions for the particular KPI to trigger a defined action (e.g., generate a notable event, send notification, display information in an incident review interface, etc.). The trigger criteria interface 34121 can display, for each state defined for the particular KPI, a selection box 34123, a slider bar 34125 with a slider element 34127, an operator indicator 34129, a value text box 34131, a statistical function indicator 34133, and a state identifier 34135.

In one implementation, when the trigger criteria interface 34121 is first displayed, for example, in response to a user selection of the particular KPI, the trigger criteria interface 34121 automatically displays the information reflecting the current performance of the states for the particular KPI based on the selected duration 34139 (e.g., Last 60 minutes). For example, the performance of the KPI as illustrated by indicators 34141A and 34141B can be presented in the trigger criteria interface 34121. For example, the trigger criteria interface 34121 may initially only display the information in portion 34143 indicating that the KPI was in the Low state 100% for the last 60 minutes. A user may use the currently displayed data as a contribution threshold for the particular state.

User input selecting one or more states can be received, for example, via the selection box 34123, slider element 34127, and value text box 34131 for a particular state. A contribution threshold can be specified for each selected state via user interaction with the trigger criteria interface 34121, as described in greater detail below.

Figure 34K:
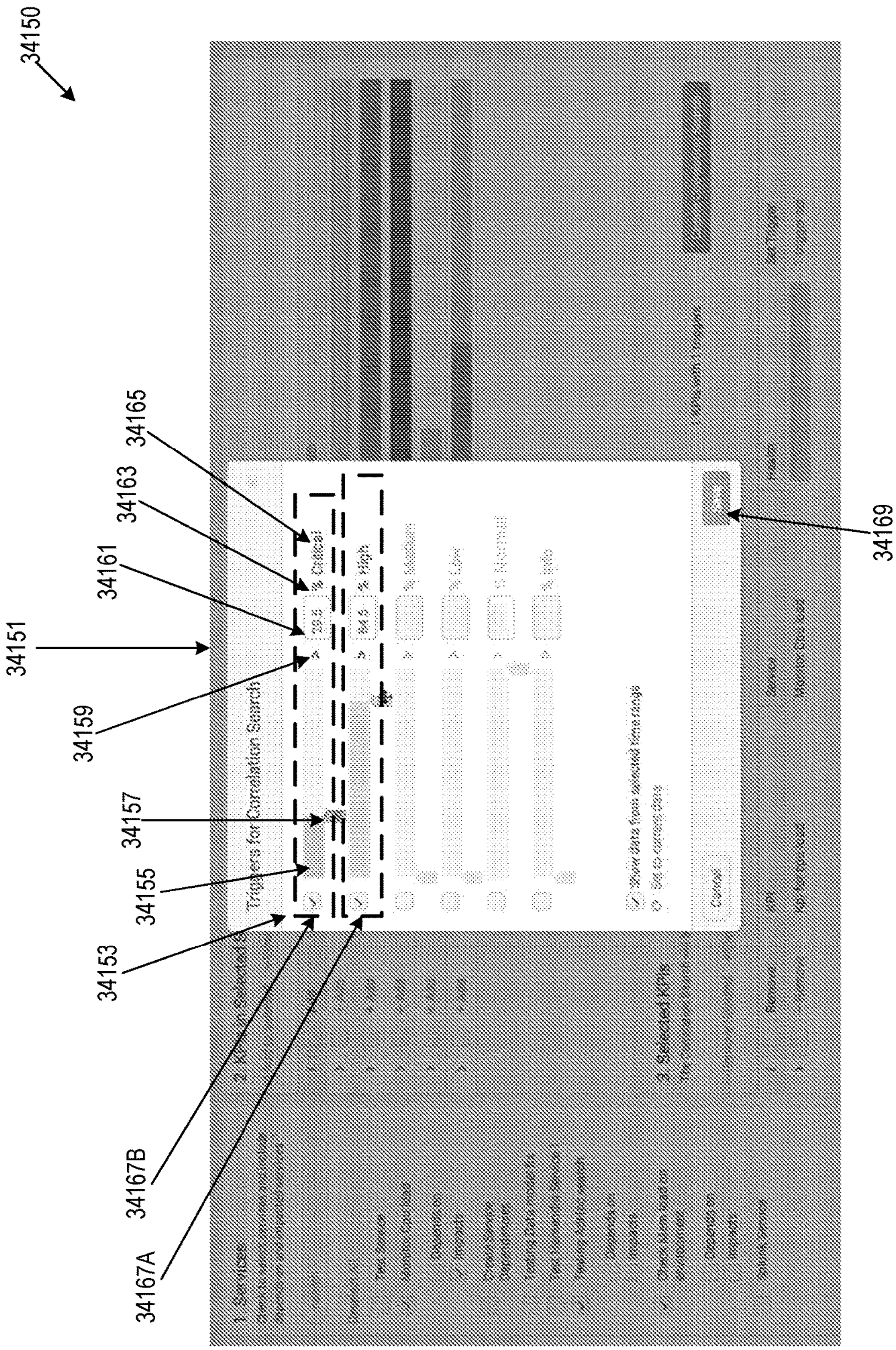
FIG. 34K illustrates an example of a GUI of a service monitoring system for specifying trigger criteria for a KPI for a KPI correlation search definition, in accordance with one or more implementations of the present disclosure.

FIG. 34K illustrates an example of a GUI 34150 of a service monitoring system for specifying trigger criteria for a KPI for a KPI correlation search definition, in accordance with one or more implementations of the present disclosure. The trigger criteria interface 34151 displays user selection of two trigger criteria 34167A-B, for the particular KPI, that correspond to the High state and the Critical state respectively.

For each selected state, user input of a contribution threshold can be received. The user input can include an operator (e.g., greater than, greater than or equal to, equal to, less than, and less than or equal to), a threshold value, and a statistical function (e.g., percentage, count). The user input for the operator can be received via an operator indicator 34159, which when selected can display a list of operators to select from. For example, a greater than (e.g., ">") operator has been selected.

The user input of the statistical function to be used can be received via a statistical function indicator 34163, which when selected can display a list of statistical functions (e.g. percent, count, etc.) to select from. For example, the percentage function has been selected.

The user input for the threshold value can be received, for example, via a value entered in the text box 34161 and/or via a slider element 34157. In one implementation, when a user slides the slider element 34157 across a corresponding slider bar 34155 to select a value, the corresponding value can be displayed in the corresponding text box 34161. In one implementation, when a user provides a value in the text box 34161, the slider element 34157 is moved (e.g., automatically without any user interaction) to a position in the slider bar 34155 that corresponds to the value. (Text box 34161 and slider control element 34157 are, accordingly, operatively coupled.) For example, the value "29.5" has been selected. In one embodiment, slider bar 34155 appears in relationship with an actuals data graph bar. The actuals data graph bar depicts a value determined from actual data for the associated KPI in the associated state over the current working time interval (e.g. the "Last 60 minutes" of 34139 of FIG. 34J). The actuals data graph bar can be narrower or wider than the slider bar, appear in front of or behind the slider bar, be centered on axis with the slider bar, be visually distinct from the slider bar (e.g. a darker, lighter, variant, or different color, or have a different pattern, texture, or fill than the slider bar), and have the same scaling as the slider bar.

In one implementation, when a trigger criterion has been specified for a particular state, one or more visual indicators are presented in the trigger criteria interface 34151 for the particular state. For example, the contribution threshold for the Critical state may be "greater than 29.5%", and the contribution threshold for the High state may be "greater than 84.5%", and visual indicators are displayed for the two trigger criteria 34167A-B that have been specified.

For example, for the Critical state, the trigger criteria interface 34151 can present the selection box 34153 as being enabled, the slider bar 34155 as having a distinct visual characteristic to visually represent a corresponding value using a scale of the slider bar 34155, the slider element 34157 as being shaded or colored, an operator indicator 34159 as being highlighted, a value being displayed in a text box 34161, a statistical function indicator 34163 being highlighted, and/or a state identifier 34165 being highlighted. The distinct visual characteristic for the slider bar 34155 can be a color, a pattern, a shade, a shape, or any combination of color, pattern, shade and shape, as well as any other visual characteristics.

In one implementation, when multiple trigger criteria are specified for a particular KPI, the trigger criteria are processed disjunctively. For example, the trigger criteria of the KPI can be considered satisfied if either the KPI is in the Critical state more than 29.5% within the duration (e.g., Last 60 minutes) or the KPI is in the High state more than 84.5% within the duration.

GUI 34150 can include a save button 34169, which when activated, can display another trigger criteria interface 34151 that corresponds to another KPI, if another KPI has been selected for the KPI correlation search. If no other KPIs have been selected for the KPI correlation search, a GUI for creating the KPI correlation search based on the KPI correlation search definition is displayed.

Figure 34L:
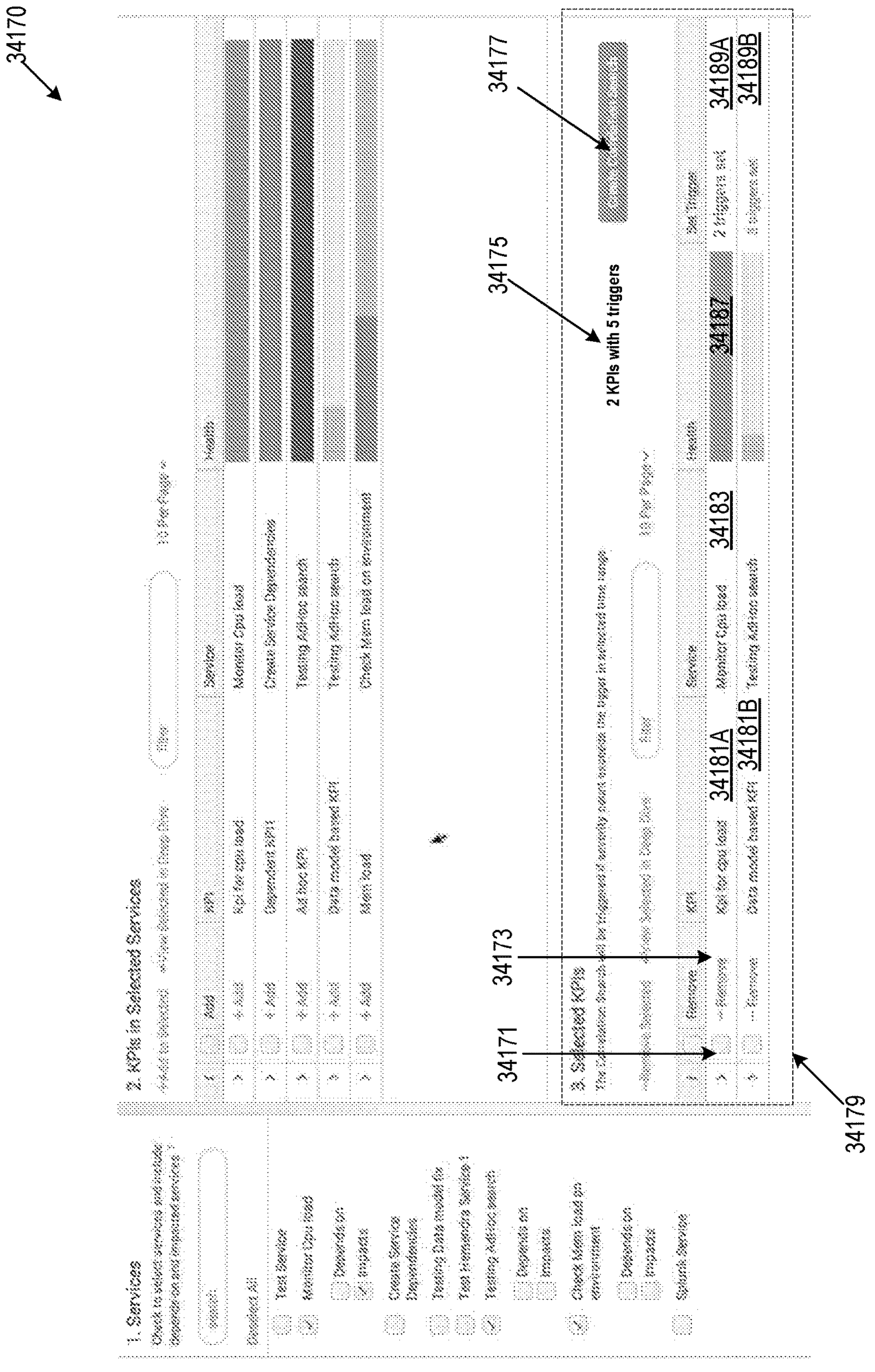
FIG. 34L illustrates an example of a GUI of a service monitoring system for creating a KPI correlation search based on a KPI correlation search definition, in accordance with one or more implementations of the present disclosure.

FIG. 34L illustrates an example of a GUI 34170 of a service monitoring system for creating a KPI correlation search based on a KPI correlation search definition, in accordance with one or more implementations of the present disclosure. GUI 34170 can be displayed in response to a user activating a save button (e.g., save button 34169 in FIG. 34K) in a trigger criteria interface. The correlation search portion 34179 in the GUI 34170 can display information for the KPIs (e.g., KPI 34181A, KPI 34181B) that are part of the KPI correlation search definition.

The information for each KPI can include the name of the KPI, the service 34183 which the KPI pertains to, KPI performance indicator 34187, and a trigger criteria indicator 34189A for the particular KPI. The correlation search portion 34179 can include a selection button 34171 and/or a link 34173 for each KPI for receiving user input specifying that the selected KPI should be removed from the KPI correlation search definition.

The trigger criteria indicators 34189A-B for a particular KPI can display the number of trigger criteria that has been specified for the KPI. For example, KPI 34181A may have two trigger criteria (e.g., Critical state more than 29.5% within the duration, High state more than 84.5% within the duration).

In one implementation, the trigger criteria indicators 34189A-B are links, which when selected, can display a corresponding trigger criteria interface (e.g., trigger criteria interface 34121 in FIG. 34J) for the particular KPI to enable a user to edit the trigger criteria.

The correlation search portion 34179 can include summary information 34175 that includes the information for a trigger determination for the KPI correlation search to determine whether to cause a defined action (e.g., generate notable event, sending a notification, display information in an incident review interface). The summary information 34175 can include the number of KPIs that are specified in the KPI correlation search definition and the total number of trigger criteria for the KPI correlation search.

As described above, in one implementation, when there are multiple trigger criteria that pertain to a particular KPI, the trigger criteria are processed disjunctively. For example, if one of the two triggers that have been specified for KPI 34181A are satisfied, then the trigger criteria for KPI 34181A are considered satisfied. If any one of the three triggers that have been specified for KPI 34181B are satisfied, then the trigger criteria for KPI 34181B are considered satisfied.

In one implementation, when there are multiple KPIs that are specified in the KPI correlation search definition, the multiple KPIs are treated conjunctively. Each KPI must have at least one trigger criteria satisfied in order for all of the triggering criteria that are specified in the KPI correlation search definition to be considered satisfied. For example, when any of the two trigger criteria for KPI1 34181A is satisfied, and any of the three trigger criteria for KPI2 34181B is satisfied, then the trigger condition determined using five trigger criteria is considered satisfied for the KPI correlation search, and a defined action can be performed. If none of the two trigger criteria for KPI1 is satisfied 34181A or none of the three trigger criteria for KPI2 34181B is satisfied, then the trigger condition for the KPI correlation search is considered as not being satisfied.

The correlation search portion 34179 can include a create button 34177, which when activated displays a GUI for creating the KPI correlation search as a saved search based on the KPI correlation search definition that has been specified using, for example, GUI 34170.

Figure 34M:
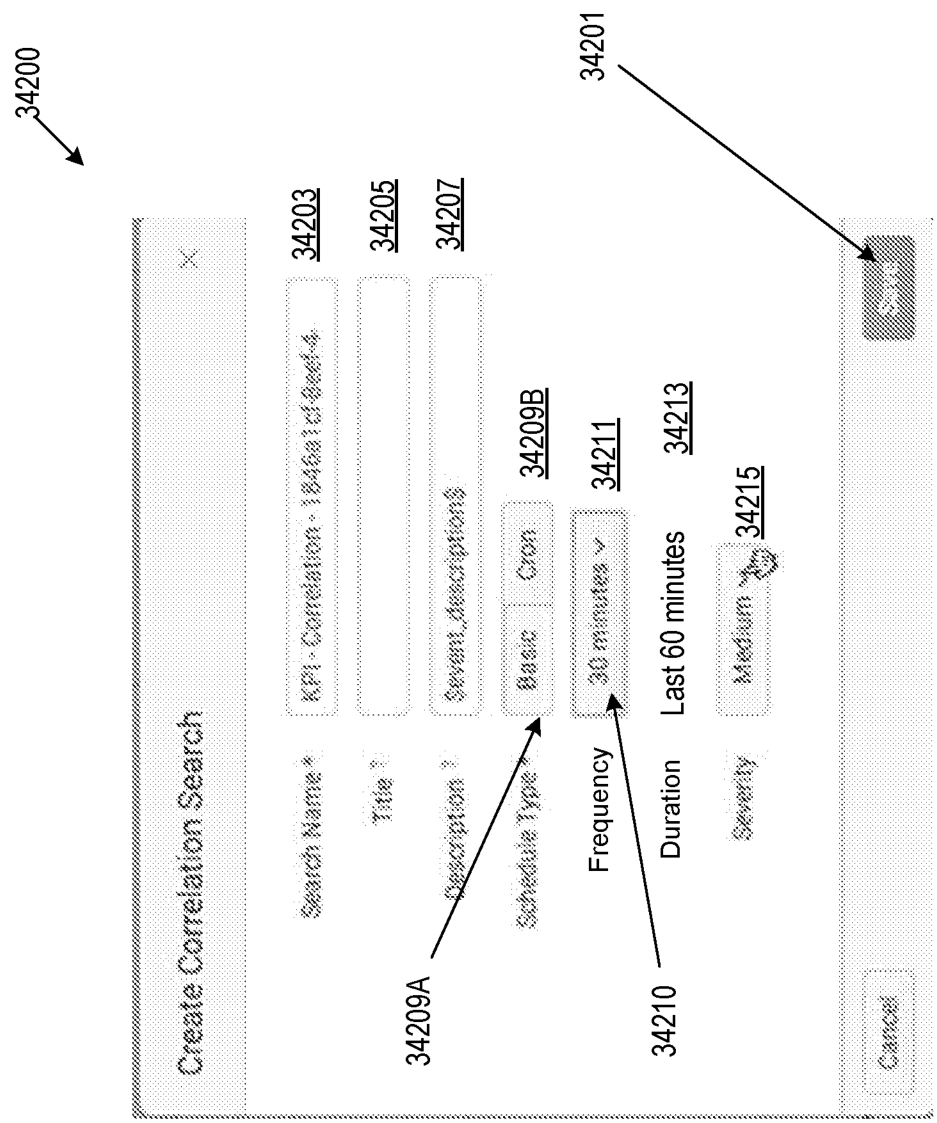
FIG. 34M illustrates an example of a GUI of a service monitoring system for creating the KPI correlation search as a saved search based on the KPI correlation search definition that has been specified, in accordance with one or more implementations of the present disclosure.

FIG. 34M illustrates an example of a GUI 34200 of a service monitoring system for creating the KPI correlation search as a saved search based on the KPI correlation search definition that has been specified, in accordance with one or more implementations of the present disclosure. The defined KPI correlation search can be saved as a saved search that can be executed automatically based on, for example, a user-selected frequency (e.g., every 30 minutes) 34211. When a saved search is created for the defined KPI correlation search, a search query of the KPI correlation search will be executed periodically, and the search result set that is produced by the search query of the KPI correlation search can be saved. An action can be performed based on an evaluation of the search result set using the trigger criteria for the KPI correlation search.

A user (e.g., business analyst) can provide a name 34203 for the KPI correlation search, optionally a title 34205 for the KPI correlation search, and optionally a description 34207 for the KPI correlation search. In one implementation, when a title 34205 is specified, the title 34205 is used when an action is performed. For example, if no title 34205 is specified, the name 34203 can be displayed in an incident review interface if an action of displaying information in the incident review interface has been triggered. In another example, if a title 34205 is specified, the title 34205 can be displayed in an incident review interface if an action of displaying information in the incident review interface has been triggered. In another example, if a title 34205 is specified, the title 34205 can be included in the information of a notable event that is posted as the result of the trigger condition being satisfied for the KPI correlation search.

User input can be received via a selection of a schedule type via a type button 34209A-B for executing the KPI correlation search. The type can be a Cron schedule type or a basic schedule type. For example, if the basic schedule type is selected, user input may be received, via a button 34210, specifying that the KPI correlation search should be performed every 30 minutes. When button 34210 is activated a list of various frequencies is displayed which a user can select from. GUI 34200 can automatically be populated with the duration 34213 (e.g., Last 60 minutes) that is selected for example, via button 34079 in FIG. 34G.

Referring to FIG. 34M, user input can be received for assigning a severity level to an action that is performed from the KPI correlation search via a list 34215 of severity types. For example, if the action is to display information in an incident review interface, and the selected severity is "Medium", when the action is performed, the severity "Medium" will be displayed with the information for the KPI correlation search in the incident review interface. Similarly, if the action is to post a notable event, and the severity selected is "Medium," information for the notable event will include an indication of the "Medium" severity, when the action is performed.

In one implementation, default values for schedule type and severity are displayed. The default values can be configurable. User input can be received via button 34201 for storing the definition of the KPI correlation search. The KPI correlation search definition can include the parameters that have been specified via GUI 34200 and can be stored in a structure, such as structure 3400 in FIG. 34D.

Graphical User Interface for Adjusting Weights of Key Performance Indicators

Implementations of the present disclosure provide an aggregate KPI that spans multiple services and a graphical user interface that enables a user to create and configure the aggregate KPI. The aggregate KPI may characterize the performance of one or more services and may be displayed to the user as a numeric value (e.g., score). The graphical user interface may enable a user to select KPIs of one or more services and to set or adjust the weights (e.g., importance) of the KPIs. The weight of each KPI may define the influence that the KPI has on a calculation of an aggregate KPI value.

The graphical user interface may include multiple display components for configuring the aggregate KPI. Some of the display components may illustrate existing services and their corresponding KPIs and may enable the user to select some or all of the KPIs. Another display component may display the selected KPIs and provide graphical control elements (e.g., sliders) to enable the user to adjust the weight(s) of one or more of the KPIs. The user may adjust the weight to a variety of values including, for example, values that cause the KPI to be excluded from an aggregate KPI calculation, values that cause the KPIs to be prioritized over some or all of the other KPIs, and so on. The graphical user interface may also display an aggregate KPI value (e.g., health score) and may dynamically update the aggregate KPI value as the user adjusts the weights. This may provide near real-time feedback on how adjustments to the weights affect the aggregate KPI value. This may be advantageous because it may enable the user to adjust the weights of the KPIs to more accurately reflect the influence the constituent KPIs should have on characterizing the overall performance of the service(s).

Figure 34N:
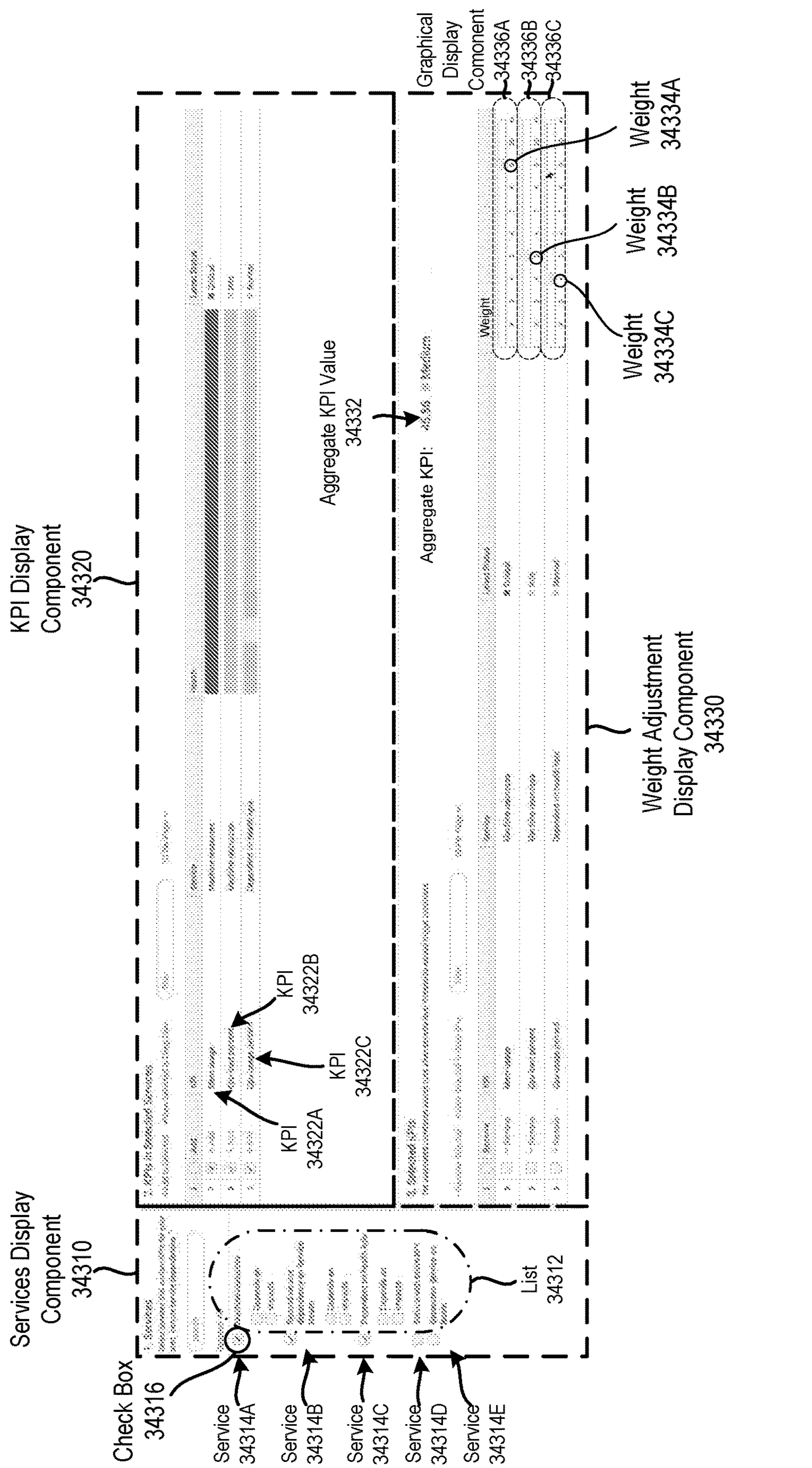
FIG. 34NA illustrates an example of a graphical user interface for selecting KPIs from one or more services and for adjusting the weights of the KPIs, in accordance with one or more implementations of the present disclosure FIG. 34NB illustrates an exemplary weight adjustment display component, in accordance with one or more implementations of the present disclosure.
Figure 34N:
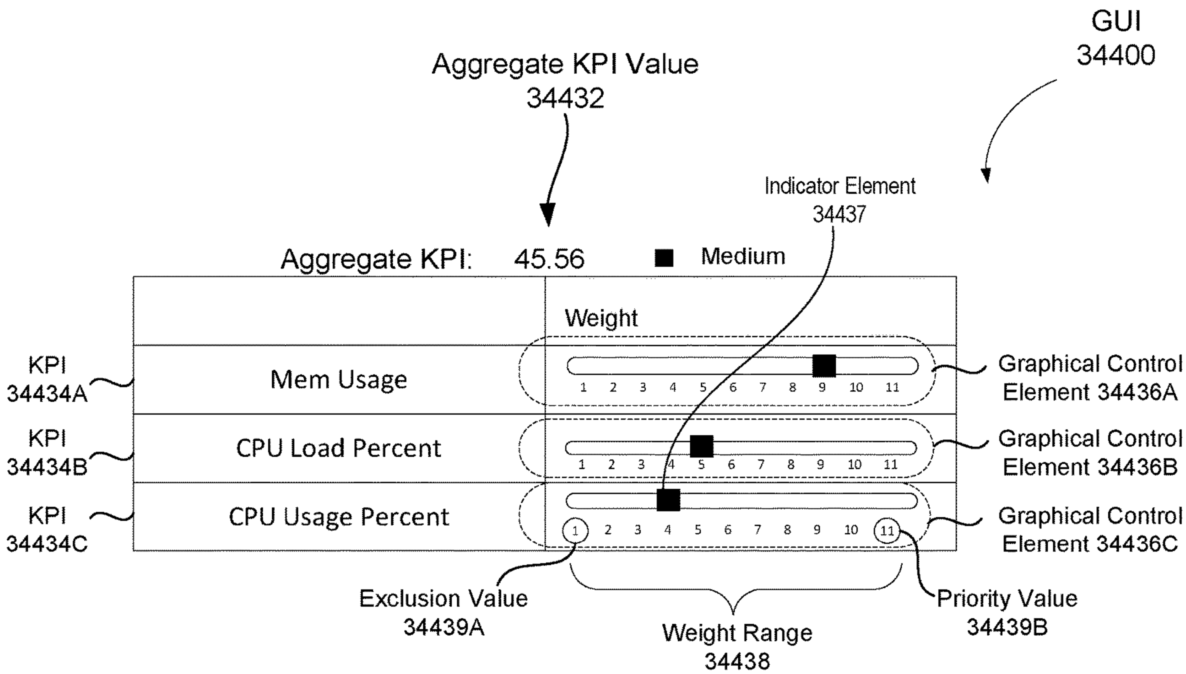
Figure 34N:
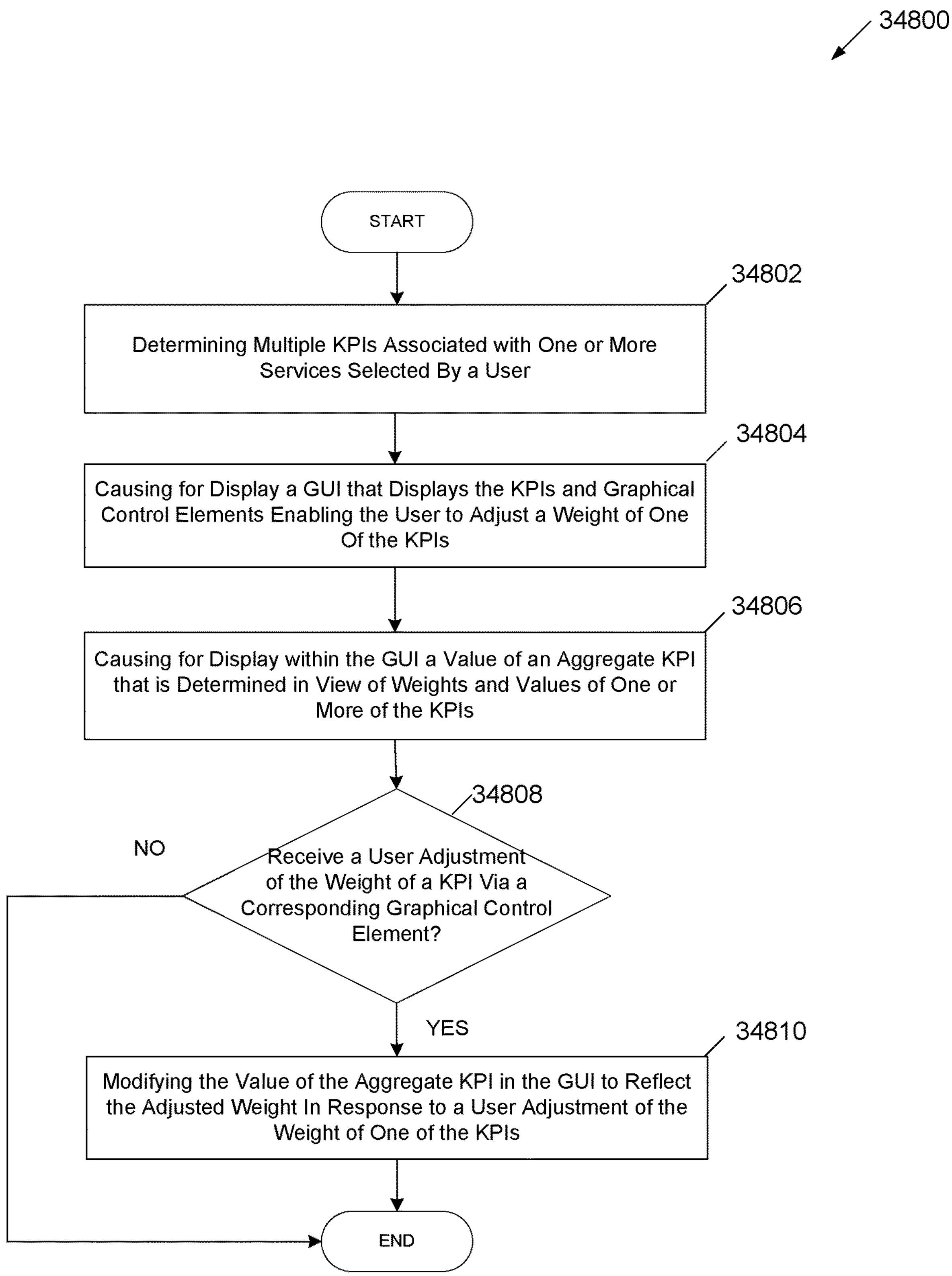
Figure 34N:
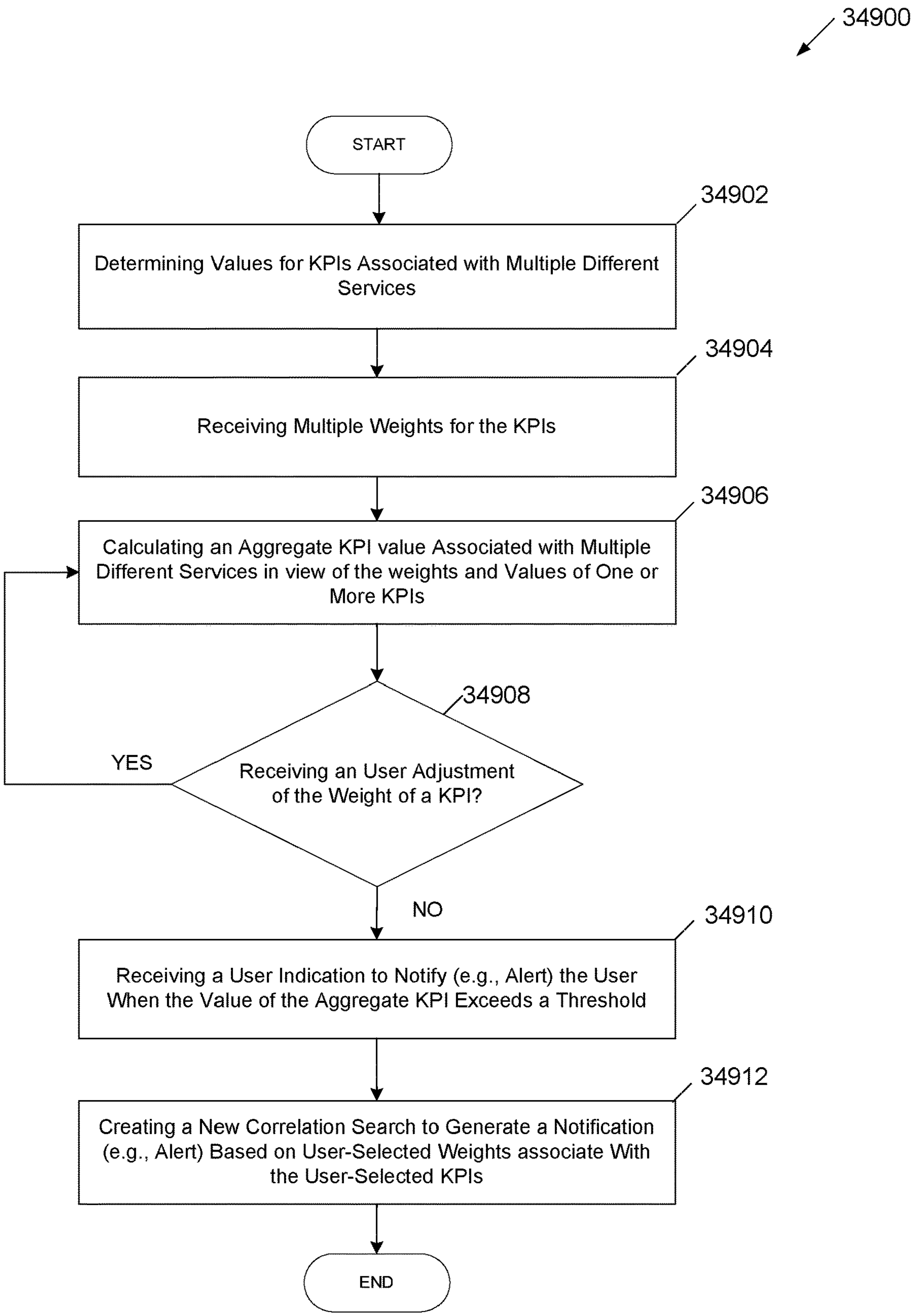

FIG. 34NA illustrates an example of a graphical user interface (GUI) 34300 for selecting KPIs and adjusting the weights of KPIs, in accordance with some implementations. GUI 34300 may include a services display component 34310, a KPI display component 34320 and a weight adjustment display component 34330. Services display component 34310 may display services that exist in a user's IT environment and may enable the user to select one or more services of interest. Services display component 34310 may include a list 34312 with services 34314A-E. In one example, the list 34312 may be populated using the service definition records that are stored in a service monitoring data store. One or more services in the list 34312 may be selected via a selection box (e.g., check box 34316) that is displayed for each service in the list 34312. When a service (e.g., Machine Resources) is selected from list 34312 via a corresponding check box 34316, dependency boxes may be displayed for the corresponding selected service. The dependency boxes allow a user to optionally further specify whether to select the service(s) that depend on the selected service (e.g., impacted services) and/or to select the services which the selected service depends upon (e.g., impacting services). As described above, a particular service may depend on one or more other services and/or one or more other services may depend on the particular service. These services may be obtained from a service definition of the particular service or determined in view of one or more service definitions, such as a service definition of the particular service and the service that depends on the particular service. That is to say, options exist for where and how to record, reflect, or represent in storage the defined dependencies between and among services represented by service definitions. When one or more services are selected from list 34312, the KPIs that correspond to the selected services can be displayed in the KPI display component 34320.

KPI display component 34320 may display multiple KPIs and may enable the user to select some or all of the KPIs associated with the services selected in services display component 34310. KPI display component 34320 may include KPIs 34322A-C and display KPI data for each KPI. In one example, KPI data may be presented in a table that may include a header row and one or more data rows. Each data row may correspond to a particular KPI. The table may include one or more columns for each row. The header row can include column identifiers to represent the KPI data in the respective columns. For example, the table may include, for each row, a column for the KPI name, a column for the service name of the service that pertains to the particular KPI, and a column for a KPI health indicator. As discussed above, a KPI health indicator can represent the performance of the particular KPI over a certain duration. The KPI data may be referenced by the user when determining which KPIs to select for inclusion within an aggregate KPI.

Weight adjustment display component 34330 may display the KPIs selected by the user and may provide a mechanism for the user to adjust the weights of the KPIs and display a resulting aggregate KPI value. Weight adjustment display component 34330 may include aggregate KPI value 34332, weights 34334A-C and graphical control elements 34336A-C. Aggregate KPI value 34332 may be a numeric value (e.g., score), non-numeric value, alphanumeric value, symbol, or the like, that may characterize the performance of one or more services. In one example, the aggregate KPI value 34332 may be used to detect a pattern of activity or diagnose abnormal activity (e.g., decrease in performance or system failure). Aggregate KPI value 34332 may be determined in view of weights 34334A-C, which may indicate the importance or influence a particular KPI has on a calculation of the aggregate KPI. Weights 34334A-C may be considered when calculating the aggregate KPI value for the services and a KPI with a higher weight may be considered more important or have a larger influence on the aggregate KPI value than other KPIs. The weights of the KPIs may be adjusted by the user by manipulating graphical control elements 34336A-C. Each of graphical control elements 34336A-C may correspond to a specific KPI and may be used to adjust a weight of a specific KPI.

Changes to any of the display components discussed above (e.g., 34310, 34320 and 34330) can cause respective changes to the other display components. In one example, GUI 34300 may receive a first user selection that identifies a subset of services from a list of services within an IT environment. In response to the first selection, GUI 34300 may display a list of KPIs associated with the one or more selected services within KPI display component 34320. GUI 34300 may then receive a second user selection of a subset of the KPIs in the KPI display component 34320. In response to the second selection, GUI 34300 may display one or more user-selected KPIs and graphical control elements in the weight adjustment display component 34330. The functionality of weight adjustment component 34330 is discussed in more detail below, in regards to FIG. 34NB.

FIG. 34NB illustrates an example of a weight adjustment display component (e.g., GUI 34300) that enables a user to adjust the weights of KPIs and illustrates the effect of the adjustment on the aggregate KPI value, in accordance with some implementations. GUI 34300 may include graphical control elements 34436A-C that each correspond to one of KPIs 34434A-C and may display the weight of each KPI relative to the other KPIs. Graphical control elements 34436A-C may be any graphical control element capable of displaying and modifying a weight value. As shown, graphical control elements 34436A-C may be similar to a slider or track bar control element and may enable a user to set a value by moving an indicator element 34437 along an axis, such as a horizontal axis or vertical axis. In other examples, the graphical control elements 34436A-C may include display fields and arrows, which may enable a user to increment or scroll through different values. In yet another example, each of the graphical control elements 34436A-C may include a field that accepts keyboard input and the user may provide a weight by typing a corresponding value (e.g., a numeric value) into the field. When a weight is adjusted, it may be included in the service definition specifying the KPIs, or in a separate data structure together with other settings of a KPI.

The weights displayed by the graphical control elements 34436A-C may be assigned automatically (e.g., without any user input) or may be based on user input or a combination of both. For example, weights may be automatically assigned when graphical control elements 34436A-C are initiated (e.g., default values, historic values) and the user may subsequently adjust the weights. A weight may be automatically assigned based on characteristics of the KPI. In one example, a KPI deriving its value from machine data of a single entity may be automatically assigned a lower weight than a KPI deriving its value from machine data pertaining to multiple entities. Alternatively or in addition, a KPI may be automatically assigned a higher or lower weight based on the frequency in which the search query defining the KPI is executed. For example, a higher weight may be assigned to a KPI that is run more frequently or vice versa.

The weights may also be assigned (e.g., adjusted) based on user input of one or more values within a weight range 34438. As shown in FIG. 34NB, graphical control element 34436C may include an indicator element 34437 to receive a user request to assign or adjust a weight of a KPI. Upon selecting indicator element 34437, a user may position (e.g., drag) the indicator element 34437 to a specific weight within weight range 34438. In one example, the weight range may include values from one to ten and a higher value may indicate a higher importance of the KPI relative to the other KPIs selected to represent the service(s).

Weight range 34438 may include an exclusion value 34439A and a priority value 34439B within its range. In one example, the range may extend from 0-2011 and the exclusion value 34439A may be a minimum value (e.g., 0) and the priority value 34439B may be a maximum value (e.g., 11). Though generally shown and discussed as such for ease of illustration, an embodiment is not limited to a weight range of continuous values, numeric, alphabetic, or otherwise. Exclusion value 34439A may be a value that causes the corresponding KPI to be excluded from a calculation of the value of the aggregate KPI. The priority value 34439B may be a value that causes the corresponding KPI to override one or more of the other KPIs selected to represent the services. A weight having priority value 34439 may indicate the status (e.g., state) of the corresponding KPI should be used to represent the overall status of the aggregate KPI. In one example, there may be only one particular KPI that has a weight at the priority value at which point the values of only the particular KPI and no other KPIs may be used to calculate the value of the aggregate KPI. In another example, there may be multiple particular KPIs that have a weight at the priority value at which point only one of the particular KPIs may be selected and used for the calculation of the aggregate KPI. The selection may be based on a variety of factors such as the states, values, frequency, or how recent the KPI value has been determined. For example, the multiple particular KPIs may be analyzed and the KPI with the highest state (e.g., critical, important) may be the particular KPI selected to calculate the value of the aggregate KPI. In this latter example, the priority value may not cause a KPI to be used for the aggregate KPI calculation because there may be another KPI set with the priority value but it may still cause the KPI to override other KPIs that are not set to the priority value. Accordingly, a priority weight value may indicate priority in the sense of overriding dominance, preeminence, exclusivity, preferential treatment, or eligibility for the same.

Aggregate KPI value 34432 may be a numeric value (e.g., score) that may be calculated based on the user-selected weights to better characterize performance of one or more services. In some implementations, an aggregate KPI value 34432 may also be based on impact scores of relevant KPIs. As discussed in more detail above, an impact score of a KPI can be based on a user-selected weight of the KPI and/or the rating associated with a current state of the KPI. In particular, calculating an aggregate KPI value 34432 may involve one or more of: determining KPI values for the KPIs; determining impact scores using the KPI values; weighting the impact scores; and combining the impact scores. Each of these steps will be discussed in more detail below.

Determining the KPI values for the KPIs may involve deriving the values by executing search queries or retrieving previously stored values from a data store. Each KPI value may indicate how an aspect of a service is performing at a point in time or during a period of time and may be derived by executing a search query associated with the KPI. As discussed above, each KPI may be defined by a search query that derives the value from machine data associated with the one or more entities that provide the service. The machine data may be identified using a user-created service definition that identifies the one or more entities that provide the service. The user-created service definition may also identify information for locating the machine data pertaining to each entity. In another example, the user-created service definition may also identify, for each entity, information for a user-created entity definition that indicates how to identify or locate the machine data pertaining to that entity. The machine data associated with an entity may be produced by that entity and may include for example, and is not limited to, unstructured data, log data and wire data. In addition or alternatively, the machine data associated with an entity may include data about the entity, which can be collected through an API for software that monitors that entity.

Determining the KPI values may also or alternatively involve retrieving previously stored values from a data store. In one example, the most recent values for each respective KPI may be retrieved from one or more data stores. The values of each of the KPIs may be from different points in time. This may be, for example, because each KPI may be based on a frequency of monitoring assigned to the particular KPI and when the frequency of monitoring for a KPI is set to a time period (e.g., 10 minutes, 2 hours, 1 day) a value for the KPI is derived each time the search query defining the KPI is executed. Different KPIs may have different frequencies so the most recent value of one KPI may be from a different time than the most recent value of a second KPI.

Once the KPI values have been determined, an impact score may be determined using a variety of factors including but not limited to, the weight of the KPI, one or more values of the KPI, a state of the KPI, a rating associated with the state, or a combination thereof. In one example, the impact score of each KPI may be based on the weight and the corresponding KPI value (e.g., Impact Score of KPI=(weight)×(KPI value)). In another example, the impact score of each KPI may be based on both the weight of a corresponding KPI and the rating associated with a current state of the corresponding KPI. (e.g., Impact Score of KPI=(weight)×(rating)×(KPI value)). In other examples, the impact score of each KPI may be based on the rating associated with a current state of a corresponding KPI and not on the weight (e.g., Impact Score of KPI=(rating)×(KPI value)) and the weight may or may not be used in another step.

The aggregate KPI value may be calculated by combining the one or more impact scores. The combination may involve multiplication, division, summation, or other arithmetic operation or combination of operations such as those that involve deriving a mean, median or mode, or performing one or more statistical operations. In one example, the combining may involve performing an average of multiple individually weighted impact scores.

FIGS. 34NC and 34ND depict flow diagrams of exemplary methods 34800 and 34900 for adjusting the weights of KPIs associate with an aggregate KPI that spans one or more IT services, in accordance with some implementations. Method 34800 describes a machine method of effecting a graphical user interface (e.g., weight adjustment component 34330), which enables a user to adjust weights for multiple KPIs of an aggregate KPI with feedback, in an automated service monitoring system. Method 34900 describes a machine method that embraces the graphical user interface and enables a user to select multiple KPIs that span multiple different services and adjust the weights of the selected KPIs. Methods 34800 and 34900 may be performed by processing devices that may comprise hardware (e.g., circuitry, dedicated logic), software (such as is run on a general purpose computer system or a dedicated machine), or a combination of both. Methods 34800 and 34900 and each of their individual functions, routines, subroutines, or operations may be performed by one or more processors of a computer device executing the method.

For simplicity of explanation, the methods of this disclosure are depicted and described as a series of acts (e.g., blocks, steps). Acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 34800 and 34900 may be performed to produce a machine GUI as shown in FIGS. 34NA and 34NB Referring to FIG. 34NC, method 34800 may be performed by processing devices of a server device or a client device and may begin at block 34802. At block 34802, the processing device may determine multiple KPIs associated with one or more services selected by a user. Each of the plurality of KPIs may be defined by a search query and may indicate an aspect of how a service provided by one or more entities is performing at a point in time or during a period of time. The search query may derive a value for the respective KPI from machine data produced by one or more entities that provide the one or more services. Each entity of the one or more entities may correspond to an entity definition having an identification of machine data from or about the entity and one or more of the services may be represented by a service definition that references the entity definition.

At block 34804, the processing device may cause for display a GUI that displays a plurality of key performance indicators (KPIs) and graphical control elements (e.g., slider-type control elements) for the KPIs. The KPIs displayed may be only a subset of the KPIs associated with the one or more services selected by a user. For example, the user may be able to review all of the KPIs associated with one or more services and may determine that only a subset of the KPIs reflects the performance of the services. A user may make the determination by using information illustrated by the GUI, such as the KPI values and states (e.g., critical, warning, info).

The graphical control elements displayed within the GUI may enable the user to adjust the weights of one or more of the KPIs. Each graphical control element may accept weights from a range of values. In one example, a user may use the graphical control element to adjust the weight of the respective KPI to an exclusion value that causes the respective KPI to be excluded from a calculation of the value of the aggregate KPI. The exclusion value may be any value within a range of potential weighting values, such as a minimum value (e.g., 0, 1, −1). In another example, the graphical control element may enable the user to adjust the weight of a respective KPI to a priority value that causes the respective KPI to override other KPIs when calculating the value of the aggregate KPI. The value of the aggregate KPI may be calculated based on only one of the KPIs that has the priority value, which may be a maximum value associated with a range of weighting values.

At block 34806, the processing device may cause for display within the graphical user interface a value of an aggregate KPI that is determined in view of the weights and values of one or more of the KPIs. In one example, the values of the KPIs may be determined by retrieving a most recent value for each of a plurality of KPIs from a data store and the most recent value for a first KPI and the most recent value for a second KPI may be derived from different time periods. In another example, the values of the KPIs may be derived by executing search queries defining each of the one or more KPIs. The search query may derive the value for the KPI by applying a late-binding schema to events containing raw portions of the machine data and using the late-binding schema to extract an initial value from machine data.

In addition to displaying a value of the aggregate KPI, the GUI may also display a state corresponding to the aggregate KPI or states corresponding to the KPIs. The state of a constituent KPI or aggregate KPI may correspond to a range of values defined by one or more thresholds. The states are discussed in more detail in regards to FIGS. 30-32 and may include an informational state, a normal state, a warning state, an error state, or a critical state. At any instant in time, a constituent KPI or aggregate KPI may be in one of the states depending on the range in which its value falls in. The GUI may display the state using at least one visual indication such as a textual label (e.g., "critical," "medium"), a symbol (e.g., exclamation point, a shape) and/or a color (e.g., green, yellow, red). The GUI may display the state of the aggregate KPI, the state of the constituent KPIs or a combination of both. In one example, the GUI may display a state corresponding to the value of the aggregate KPI that includes the label "critical" when the value of the respective KPI exceeds a threshold value.

At block 34808, the processing device may determine whether it has received a user adjustment of the weight of a KPI via a corresponding graphical control element. The graphical control elements may be configured to initiate an event when the graphical control element is adjusted by a user. The event may identify the adjustment as a new value (e.g., 7.1) or a difference (e.g., change) in values (e.g., +2.5 or −1.7).

At block 34810, the processing device may modify, in response to the user adjustment, the value of the aggregate KPI in the GUI to reflect the adjusted weight. In one example, the aggregate KPI may be recalculated using the newly adjusted weight applied against the same KPI values used for a previous calculation. In another example, the aggregate KPI may be recalculated using the newly adjusted weights along with updated KPI values. As discussed in more detail above in regards to FIG. 34NB, the aggregate KPI may be calculated using multiple different formulas and may incorporate different factors. For example, the aggregate KPI value may be based on a weighted average of values from KPIs of multiple different services. Responsive to completing the operations described herein with references to block 34810, the method may terminate.

Referring to FIG. 34ND, method 34900 may be similar to or subsume method 34800 and may include the generation of a correlation search for the aggregate KPI based on the user-selected weights. Method 34900 may begin at block 34902, wherein the processing device may determine values for a plurality of key performance indicators (KPIs) associated with multiple different services. Each KPI may indicate a different aspect of how one of the plurality of services is performing at a point in time or during a period of time and may be defined by a search query that derives a value for the respective KPI from the machine data associated with the one or more entities that provide the plurality of services. The machine data associated with an entity may be produced by that entity. In one example, the machine data may include unstructured log data. The unstructured data may include continuous or string data, and positions, formats, and/or delimitations of semantic data items may vary among instances of corresponding data segments (e.g., entries, records, posts, or the like). In another example, the machine data associated with an entity includes data collected through an API (application programming interface) for software that monitors that entity.

At block 34904, the processing device may receive a plurality of weights for the plurality of KPIs. As discussed above, the weights may be received via graphical user interface 34400. In other examples, the weights may be received from a command line interface or from updates to one or more of a service definition, entity definition, KPI definition, or any configuration data (e.g., configuration record or configuration file) or a combination thereof.

At block 34906, the processing device may calculate a value of an aggregate KPI for the plurality of services in view of the weights and values of one or more of the KPIs. The aggregate KPI value may be a numeric value (e.g., score) that may be calculated based on the user-selected weights to better characterize activity (e.g., performance) of the plurality of services. As discussed above in regards to FIG. 34NB, calculating an aggregate KPI value may involve one or more of: (1) determining KPI values for the KPIs; (2) determining impact scores using the KPI values; (3) weighting the impact scores; (4) and combining the impact scores. In one example, calculating the value of the aggregate KPI may include performing a weighted average of values for each of the plurality of KPIs selected by the user to be associated with the aggregate KPI.

At block 34908, the processing device may receive a user adjustment of the weight of a KPI, which may result in a modification of the value of the aggregate KPI. This block is similar to block 34810 discussed above.

At block 34910, the processing device may receive a user indication to notify (e.g., alert) the user when the value of the aggregate KPI exceeds a threshold, such as a threshold associated with a critical state. In one example, the user indication may be the result of a user selecting a button to create a correlation search. The alert may be advantageous because it may be configured to identify a pattern of interest to a user and may notify the user when the pattern occurs. In response to receiving the user indication, the method may proceed to 34912.

At block 34912, the processing device may create a new correlation search to generate a notification based on a plurality of user-selected KPIs and respective user-selected weights. Creating the correlation search may include storing the correlation search in a definition data store of the service monitoring system. The correlation search may execute periodically to calculate the aggregate KPI based on the user-selected KPIs and user-selected KPI weights. The correlation search may include triggering criteria to be applied to the aggregate KPI and an action to be performed when the triggering criteria is satisfied. The processing device may utilize the triggering criteria to evaluate a value of the aggregate KPI. This may include comparing an aggregate KPI value to a threshold and causing generation of a notification (e.g., alert) based on the comparison. In one example, it may generate an entry in an incident-review dashboard based on the comparison. Responsive to completing the operations described herein above with references to block 34912, the method may terminate.

As discussed herein, the disclosure describes an aggregate key performance indicator (KPI) that spans multiple services and a GUI to configure an aggregate KPI to better characterize the performance of the services. The GUI may enable a user to select KPIs and to adjust weights (e.g., importance) associated with the KPIs. The weight of a KPI may affect the influence a value of the KPI has on the calculation of an aggregate KPI value (e.g., score). The GUI may provide near real-time feedback concerning the effect the weights have on the aggregate KPI value by displaying the aggregate KPI value (e.g., score) and updating the aggregate KPI value as the user adjusts the weights.

Incident Review Interface

Implementations of the present disclosure are described for providing a GUI that presents notable events pertaining to one or more KPIs of one or more services. Such a notable event can be generated by a correlation search associated with a particular service. A correlation search associated with a service can include a search query, a triggering determination or triggering condition, and one or more actions to be performed based on the triggering determination (a determination as to whether the triggering condition is satisfied). In particular, a search query may include search criteria pertaining to one or more KIPs of the service, and may produce data using the search criteria. For example, a search query may produce KPI data for each occurrence of a KPI reaching a certain threshold over a specified period of time. A triggering condition can be applied to the data produced by the search query to determine whether the produced data satisfies the triggering condition. Using the above example, the triggering condition can be applied to the produced KPI data to determine whether the number of occurrences of a KPI reaching a certain threshold over a specified period of time exceeds a value in the triggering condition. If the produced data satisfies the triggering condition, a particular action can be performed. Specifically, if the data produced by the search query satisfies the triggering condition, a notable event can be generated.

A notable event generated by a correlation search associated with a service can represent anomalous incidents or patterns in the state(s) of one or more KPIs of the service. In one implementation, an aggregate KPI for a service can be used by a correlation search to generate notable events. Alternatively or in addition, one or more aspect KPIs of the service can be used by the correlation search to generate notable events.

As discussed above, a graphical user interface is presented that allows a user to review notable events or other incidents created by the system. This interface may be referred to herein as the "Incident Review" interface. The Incident Review interface may allow the user to view notable events that have been created. In order to focus the user's review, the interface may have controls that allow the user to filter the notable events by such criteria as severity, status, owner, name, service, period of time, etc. The notable events that meet the filtering criteria may be displayed in a results section of the interface. A user may select any one or more of the notable events in the result section to edit or delete the notable event, view additional details of the notable event or take subsequent action on the notable event (e.g., view the machine data corresponding to the notable event in a deep dive interface). Additional details of the Incident Review interface are provided below.

Figure 34O:
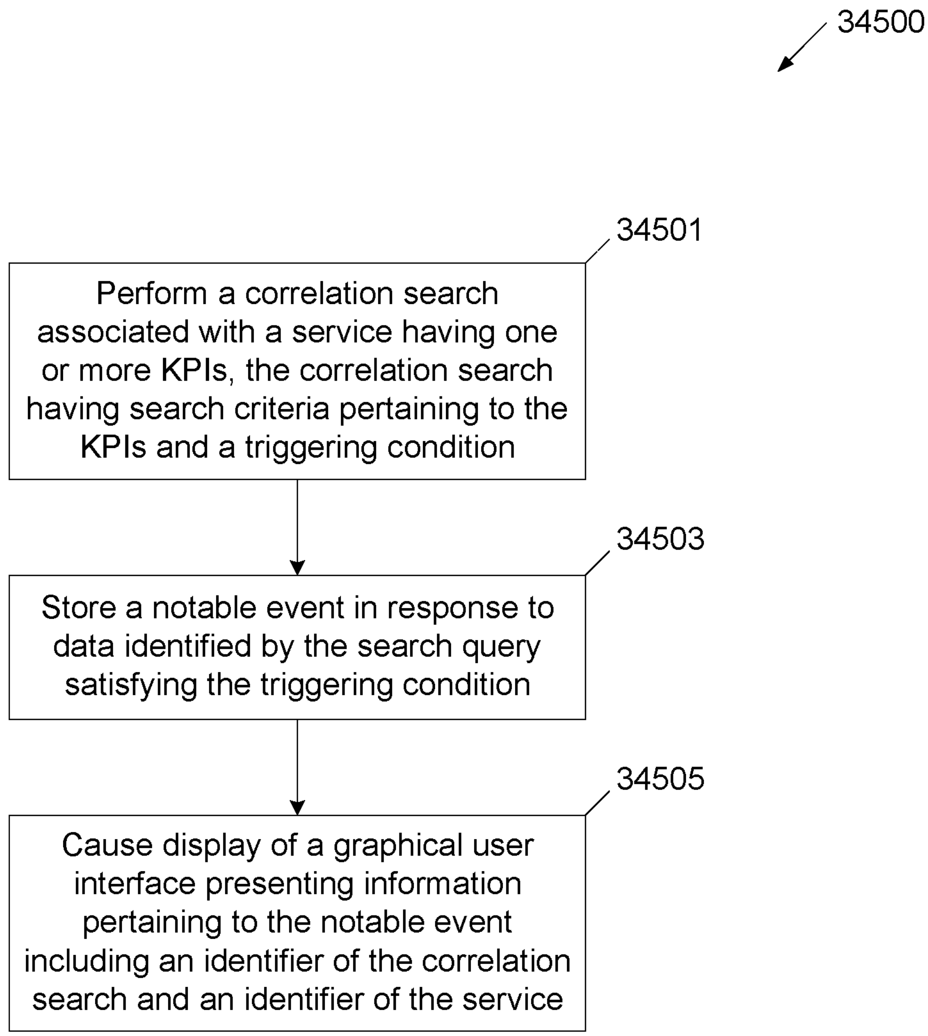
FIG. 34O is a flow diagram of an implementation of a method of causing display of a GUI presenting information pertaining to notable events produced as a result of correlation searches, in accordance with one or more implementations of the present disclosure.

FIG. 34O is a flow diagram of an implementation of a method of causing display of a GUI presenting information pertaining to notable events produced as a result of correlation searches, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, the method 34500 is performed by a client computing machine. In another implementation, the method 34500 is performed by a server computing machine coupled to the client computing machine over one or more networks.

At block 34501, the computing machine performs a correlation search associated with a service provided by one or more entities that each have corresponding machine data. The service may include one or more key performance indicators (KPIs) that each indicate a state of a particular aspect of the service or a state of the service as a whole at a point in time or during a period of time. Each KPI can be derived from the machine data pertaining to the corresponding entities. Depending on the implementation, the KPIs can include an aggregate KPI and/or one or more aspect KPIs. A value of an aggregate KPI indicates how the service as a whole is performing at a point in time or during a period of time. A value of each aspect KPI indicates how the service in part (i.e., with respect to a certain aspect of the service) is performing at a point in time or during a period of time. As discussed above, the correlation search associated with the service may include search criteria pertaining to the one or more KPIs (i.e., an aggregate KPI and/or one or more aspect KPIs), and a triggering condition to be applied to data produced by a search query using the search criteria.

At block 34503, the computing machine stores a notable event in response to the data produced by the search query satisfying the triggering condition. A notable event may represent a system occurrence that is likely to indicate a security threat or operational problem. Notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the system can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. As discussed above, the creation of a notable event may be the resulting action taken in response to the KPI correlation search producing data that satisfies the defined triggering condition. In addition, a notable event may also be created as a result of a correlation search (also referred to as a trigger-based search), that does not rely on a KPI, or the state of the KPI or of the corresponding service, but rather operates on any values produced in the system being monitored, and has a triggering condition and one or more actions that correspond to the triggering condition.

At block 34505, the computing machine causes display of a graphical user interface presenting information pertaining to a stored notable event. The presented information may include an identifier of the correlation search that triggered the storing of the notable event and an identifier of the service associated with the correlation search. In other implementations, the graphical user interface may present additional information pertaining to the stored notable event, and may receive user input to modify or take action with respect to the notable event, as will be described further below.

Figure 34P:
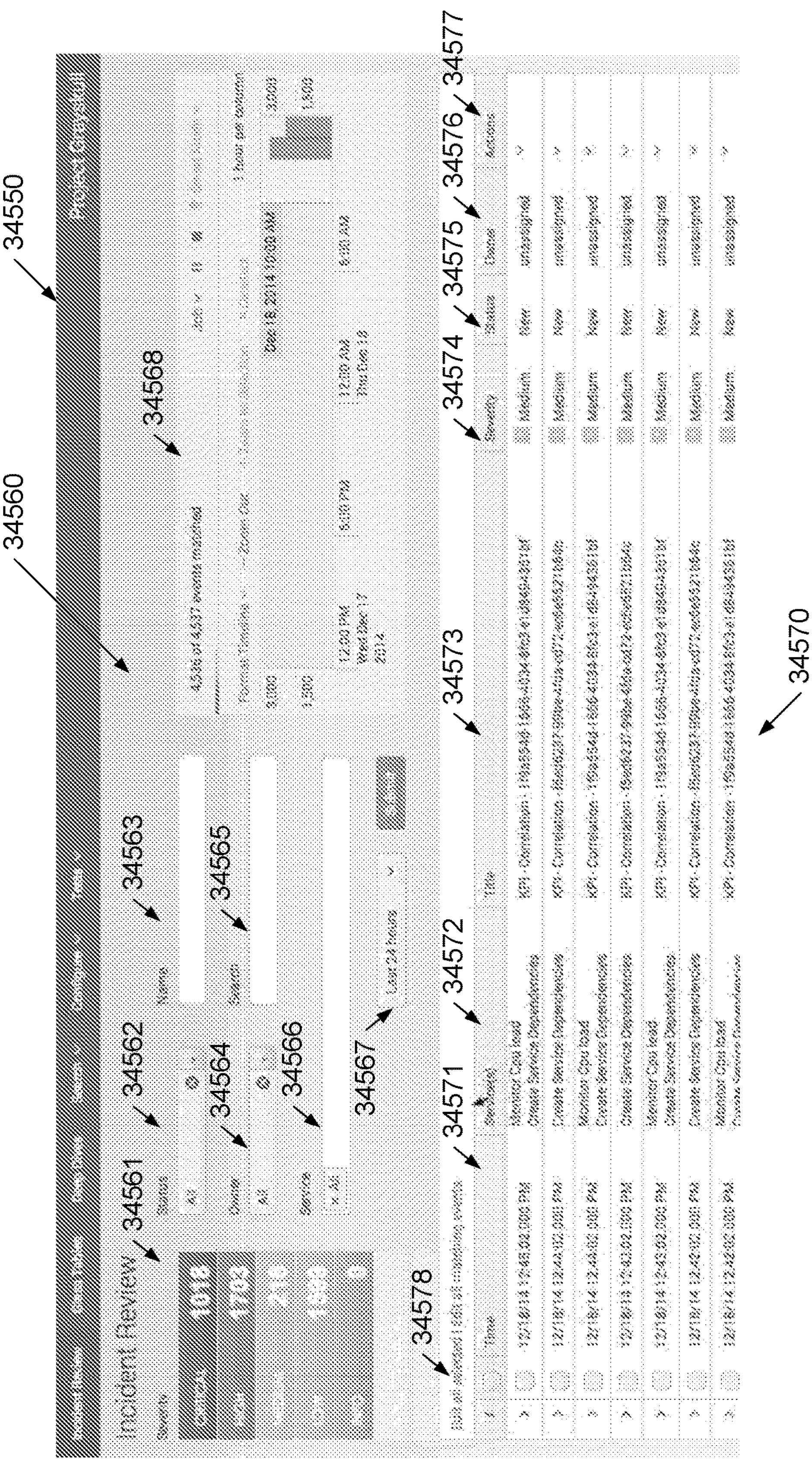
FIG. 34PA illustrates an example of a GUI presenting information pertaining to notable events produced as a result of correlation searches, in accordance with one or more implementations of the present disclosure.
Figure 34P:

FIG. 34PA illustrates an example of a GUI 34550 presenting information pertaining to notable events produced as a result of correlation searches, in accordance with one or more implementations of the present disclosure. In one implementation GUI 34550 includes a filtering controls section 34560 and a results display section 34570. Results section 34570 displays one or more notable events and certain information pertaining to those notable events. Filtering controls section 34560 includes numerous controls that allow the user to filter the notable events displayed in results section 34570 using certain filtering criteria. Certain elements of filtering controls section 34560 also provide high-level summary information for the notable events, which the user can view at a glance. In one implementation, filtering controls section 34560 includes severity chart 34561, status field 34562, name field 34563, owner field 34564, search field 34565, service field 34566, time period selection menu 34567, and timeline 34568.

Severity chart 34561 may visually differentiate (e.g., using different colors) between different severity levels and include numbers of notable events that have been categorized into different severity levels. The severity levels may include, for example, "critical," "high," "medium," "low," "info," etc. In one implementation, the number corresponding to each of the severity levels in severity chart 34561 indicates the number of notable events that have been categorized into that severity level out of all notable events that meet the remaining filtering criteria in filtering controls section 34560. During creation of a KPI correlation search, a corresponding severity level may be defined such that if the data produced by the search query satisfies the triggering condition, the resulting notable event will be categorized into the defined severity level. In addition, different triggering conditions may be associated with different severity levels. In one implementation, each severity level in severity chart 34561 may be selectable to filter the notable events displayed in results section 34570. When one or more severity levels in severity chart 34561 are selected, the notable events displayed in results section 34570 may be limited to notable events having the selected severity level(s).

Status field 34562 may receive user input to filter the notable events displayed in results section 34570 by status. In one implementation, status field 34562 may include a drop down menu from which the user can select one or more status values. One example of drop down menu 34569 is shown in FIG. 34PB.

Referring to FIG. 34PB, the available options for filtering the status of a notable event in drop down menu 34569 may include, for example, "all," "unassigned," "new," "in progress," "pending," resolved," "closed," or other options. During creation of a KPI correlation search, a default initial status may be defined such that if the data produced by the search query satisfies the triggering condition, the resulting notable event will be assigned an initial status (e.g., "new"). In addition, different initial status values may be associated with different notable events. In one implementation, a notable event may be edited in GUI 34550 in order to update or modify the current status. For example, if an analyst is assigned to investigate a particular notable event to determine its cause or whether additional action is needed, the status of a notable event can be updated from its initial status (e.g., "new") to a different status (e.g., "pending" or "resolved") to reflect the current situation.

Referring again to FIG. 34PA, name field 34563 may receive user input to filter the notable events displayed in results section 34570 by name and/or title. During creation of a KPI correlation search, a name and/or title of the KPI correlation search may be defined such that if the data produced by the search query satisfies the triggering condition, the resulting notable event will be associated with that name. When the notable event is stored, one piece of associated information is the name of the correlation search from which the notable event is generated. Multiple notable events that are generated as a result of the same correlation search may then be given the same name, although they may have different timestamps to allow for differentiation. Accordingly, the notable events can be filtered by name in response to user input from name field 34563.

Owner field 34564 may receive user input to filter the notable events displayed in results section 34570 by owner. In one implementation, owner field 34564 may include a drop down menu from which the user can select one or more possible owners. During creation of a KPI correlation search, the owner of the KPI correlation search may be defined such that if the data produced by the search query satisfies the triggering condition, the resulting notable event will be associated with that owner. The owner may include for example, the name of an individual who created the correlation search, the name of an individual responsible for maintaining the service, an organization or team of people, etc. When the notable event is stored, one piece of associated information is the owner of correlation search from which the notable event is generated. Multiple notable events that are generated as a result of the same correlation search (or different correlation searches) may then have the same owner. Accordingly, the notable events can be filtered by name in response to user input from owner field 34564.

Search field 34565 may receive user input to filter the notable events displayed in results section 34570 by keyword. When one or more search terms is input to search field 34565, those search terms may be compared against the data in each field of each stored notable event to determine if any keywords in the notable event(s) match the search terms. As a result, the notable events displayed in results section 34570 can be filtered by keyword in response to user input from search field 34565.

Service field 34566 may receive user input to filter the notable events displayed in results section 34570 by service. During creation of a KPI correlation search, the related services of the KPI correlation search may be defined such that if the data produced by the search query satisfies the triggering condition, the resulting notable event will be associated with those services. Since the KPI correlation search, whether an aggregate KPI or aspect KPI, indicates a state of a service at a point in time or during a period of time and derives values from corresponding machine data for the one or more entities that make up the service, the service associated with the notable event generated from the KPI correlation search is known. When the notable event is stored, one piece of associated information is the associated service(s) of the correlation search from which the notable event is generated. In one implementation, other services having a dependency relationship with the KPI may also be stored as part of the notable event record. (A dependency relationship may include an inbound or outbound dependency relationship, i.e., an "is depended on by" or a "depends upon" relationship.) Accordingly, the notable events can be filtered by service in response to user input from service field 34566.

Time period selection menu 34567 receive user input to filter the notable events displayed in results section 34570 by time period during which the events were created. In one implementation, time period selection menu 34567 may include a drop down menu from which the user can select one or more time periods. The time periods may include, for example, the last minute, last five minutes, last hour, last five hours, last 24 hours, last week, etc. When a notable event is stored, one piece of associated information is a time stamp indicating a time at which the correlation search from which the notable event is generated was run. In one implementation, each time period from menu 34567 may be selectable to filter the notable events displayed in results section 34570. When one or more time periods are selected, the notable events displayed in results section 34570 may be limited to notable events that were generated during the selected time period(s).

Timeline 34568 may include a visual representation of the number of notable events that were created during various subsets of the time period selected via time period selection menu 34567. In one implementation, timeline 34568 includes the selected period of time displayed along the horizontal axis and broken into representative subsets (e.g., 1 minute intervals, 1 hour intervals, etc.). The vertical axis may include an indication of the number of notable events that were generated at a given point in time. Thus, the visual representation may include, for example a bar or column chart that indicates the number of notable events generated during each subset of the period of time. In other implementations, the visual representation may include a line chart, a heat map, or some other time of visualization. In one implementation, a user may select a period of time represented on timeline 34568 in order to filter the notable events displayed in results section 34570. When a period of time is selected from timeline 34568 (e.g., by clicking and dragging or otherwise highlighting a portion of the timeline 34568, the notable events displayed in results section 34570 may be limited to notable events that were generated during the selected period of time.

In one implementation, results section 34570 of GUI 34550 displays one or more notable events that meet the filtering criteria entered in filtering controls section 34560, and displays certain information pertaining to those notable events. In one implementation, a corresponding entry for each notable event that satisfies the filtering criteria may be displayed in results section 34570. In one implementation, various columns are displayed for each entry in results section 34570, each including a different piece of information pertaining to the notable event. These columns may include, for example, time 34571, service(s) 34572, title 34573, severity 34574, status 34575, owner 34576, and actions 34577. In other implementations, additional and/or different columns may be displayed in results section 34570. Each column may correspond to one of the filtering controls in section 34560. For example, time column 34571 may display a time stamp indicating the time at which the correlation search from which the notable event is generated was run, services column 34572 may display the service(s) with which the correlation search from which the notable event is generated are associated, and title column 34573 may display the name of the correlation search from which the notable event is generated. Similarly, severity column 34574 may display the severity level of the notable event as defined during creation of the corresponding correlation search, status column 34575 may display a status of the notable event, and owner column 34576 may display the owner of correlation search from which the notable event is generated. In one implementation, actions column 34577 may include a drop down menu from which the user can select one or more actions to take with respect to the notable event. The action options may vary according to the type of notable event, such as whether the notable event was generated as a result of a general correlation search or a KPI correlation search. The actions that can be taken are discussed in more detail below with respect to FIGS. 34R-34S. In one implementation, results section 34570 further includes editing controls 34578 which can be used to edit one or more of the displayed notable events. The editing controls are discussed in more detail below with respect to FIG. 34Q.

Figure 34Q:
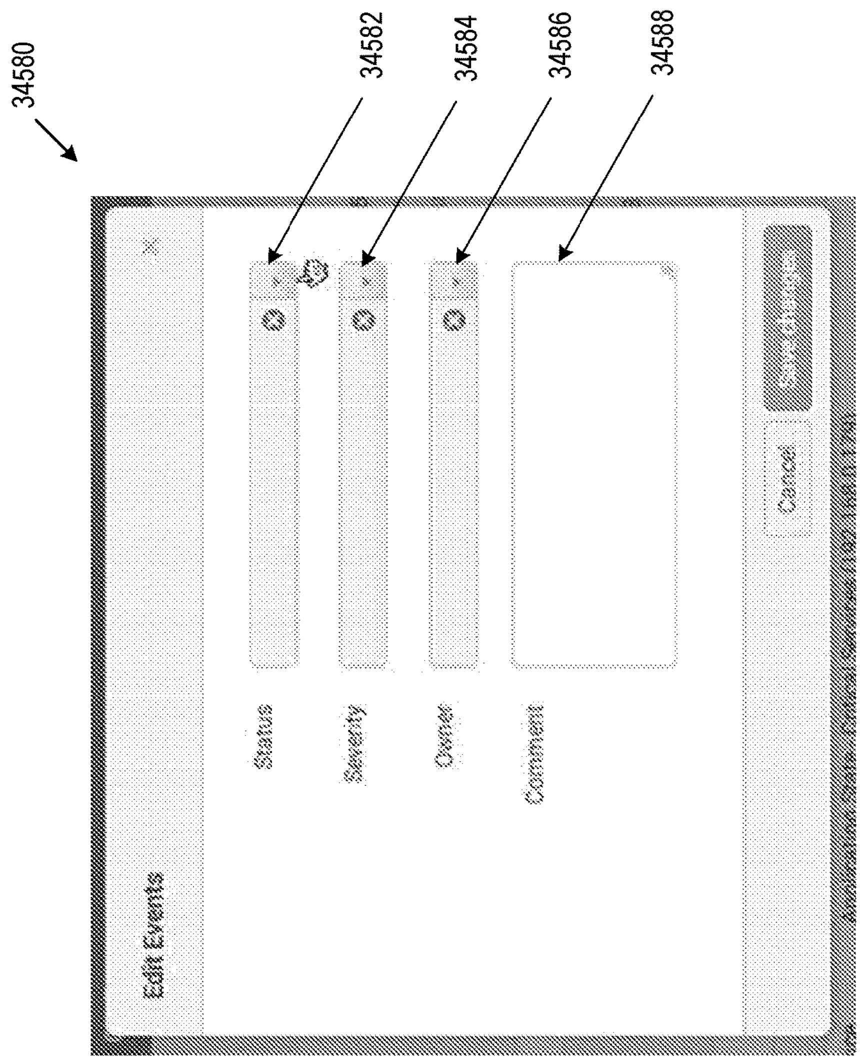
FIG. 34Q illustrates an example of a GUI editing information pertaining to a notable event produced as a result of a correlation search, in accordance with one or more implementations of the present disclosure.

FIG. 34Q illustrates an example of a GUI 34580 editing information pertaining to a notable event created as a result of a correlation search, in accordance with one or more implementations of the present disclosure. In response to selecting editing controls 34578 and one or more notable event records in GUI 34550 of FIG. 34PA, GUI 34580 of FIG. 34Q may be displayed. For example, GUI 34580 can include multiple fields 34582-34588 for editing a notable event record. In one implementation, status field 34582 may receive user input to change or set the status of the notable event. Status field 34582 may include a drop down menu from which the user can select one or more status values, such as for example, "unassigned," "new," "in progress," "pending," resolved," "closed," or other options. Severity field 34584 may receive user input to change or set the severity level of the notable event. Severity field 34584 may include a drop down menu from which the user can select one or more severity levels, such as for example, "critical," "high," "medium," "low," "info," etc. Owner field 34586 may receive user input to change or set the owner of the notable event. Owner field 34586 may include a drop down menu from which the user can select one or more possible owners. Comment field 34588 may be a text input field where the user can add a note, memo, message, annotation, comment or other piece of information to be associated with the notable event record. In one implementation, upon changing or setting one of the values in GUI 34580, the corresponding notable event record may be updated in the notable events index and the change may be reflected in results section 34570 of GUI 34550 of FIG. 34PA.

Figure 34R:
FIG. 34R illustrates an example of a GUI presenting options for actions that may be taken for a corresponding notable event produced as a result of a KPI correlation search, in accordance with one or more implementations of the present disclosure.

FIG. 34R illustrates an example of a GUI presenting options for actions that may be taken for a corresponding notable event created as a result of a KPI correlation search, in accordance with one or more implementations of the present disclosure. When actions column 34577 for a particular notable event entry in results section 34570 of GUI 34550 is selected, a number of action options are displayed. In one implementation, when the selected notable event was generated as a result of a KPI correlation search, the action options include "Open contributing kpis in deep dive" 34591 and "Open correlation search in deep dive" 34592. Selection of either option 34591 or 34592 may generate a deep dive visual interface, which includes detailed information for the notable event. A deep dive visual interface displays time-based graphical visualizations corresponding to the notable event to allow a user to visually correlate the values over a defined period of time. Option 34591 may generate a separate graphical visualization for each aspect KPI or aggregate KPI that contributed to the KPI correlation search, where each graphical visualization is displayed on the same timeline. These KPIs are selected during creation of the KPI correlation search, as described above. Option 34592 may generate a single graphical visualization for the values (e.g., the state of the KPI) returned by the KPI correlation search. Deep dive visual interfaces are described in greater detail below in conjunction with FIG. 50A.

Figure 34S:
FIG. 34S illustrates an example of a GUI presenting options for actions that may be taken for a corresponding notable event produced as a result of a correlation search, in accordance with one or more implementations of the present disclosure.

FIG. 34S illustrates an example of a GUI presenting options for actions that may be taken for a corresponding notable event produced as a result of a correlation search, in accordance with one or more implementations of the present disclosure. When actions column 34577 for a particular notable event entry in results section 34570 of GUI 34550 is selected, a number of action options are displayed. In one implementation, when the selected notable event was generated as a result of a correlation search, the action options include "Open drilldown search in deep dive" 34593, "Open correlation search in deep dive" 34594. "Open service kpis in deep dive" 34595, and "Go to last deep dive investigation" 34596. Selection of any of options 34593-34596 may generate a deep dive visual interface, which includes detailed information for the notable event. Option 34593 may generate a graphical visualization for the values returned by a drilldown search associated with the correlation search. In one implementation, during creation of the correlation search, a separate drilldown search may be defined such that if the data produced by the search query of the original correlation search satisfies the triggering condition, the separate drilldown search may be run. The drilldown search may return additional values from among the data originally produced by the search query of the correlation search. Option 34594 may generate a single graphical visualization for the values produced by the search query of the correlation search. Option 34595 may generate a separate graphical visualization for each KPI, whether an aspect KPI or an aggregate KPI, that is associated with the service corresponding to the selected notable event, where each graphical visualization is displayed on the same timeline. Option 34596 may open the last deep dive visual interface that was generated for the selected notable event, which may have been generated according to any of options 34593-34595, as described above.

Figure 34T:
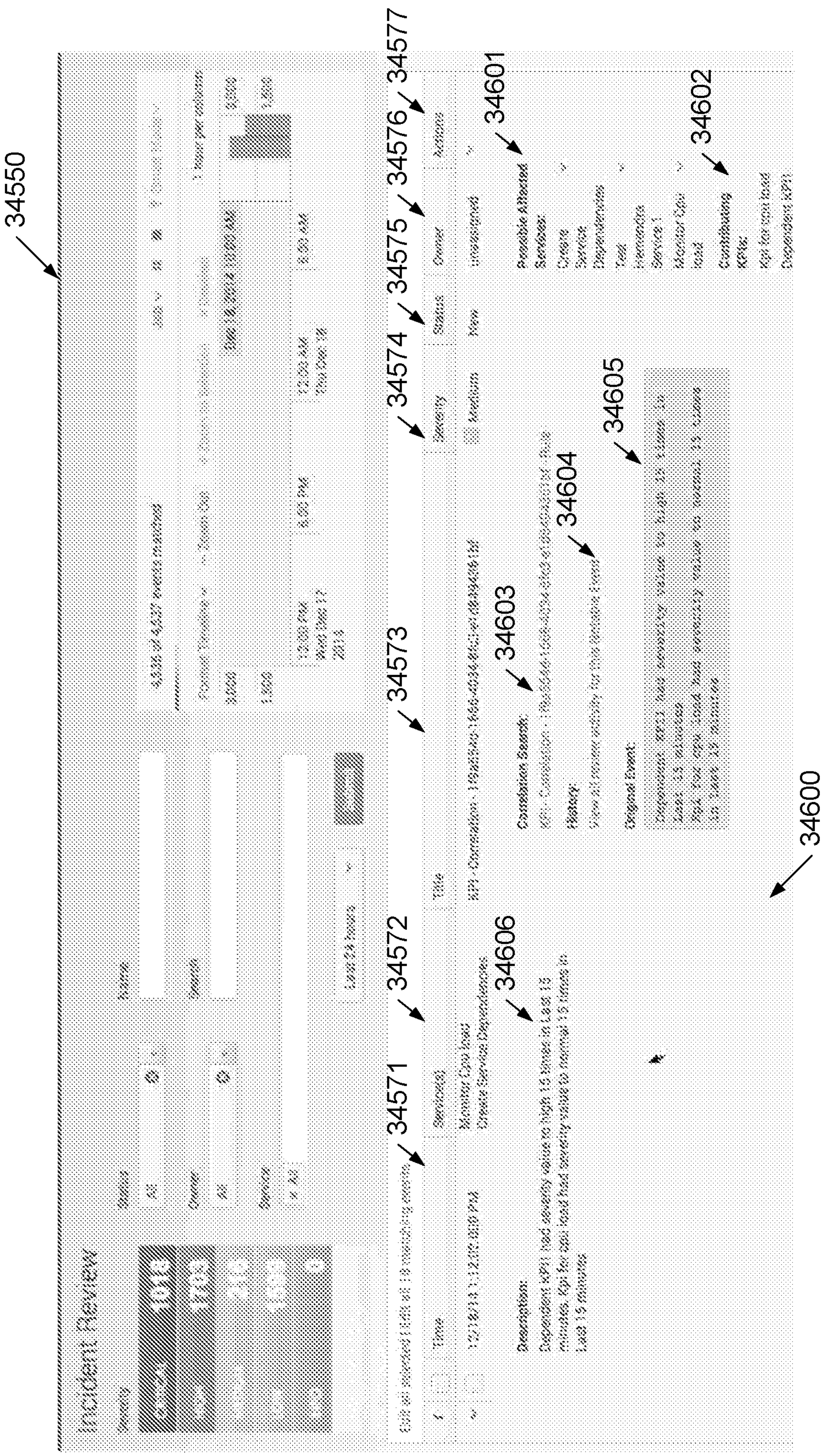
FIG. 34T illustrates an example of a GUI presenting detailed information pertaining to a notable event produced as a result of a correlation search, in accordance with one or more implementations of the present disclosure.

FIG. 34T illustrates an example of a GUI presenting detailed information pertaining to a notable event created as a result of a correlation search, in accordance with one or more implementations of the present disclosure. When a particular notable event entry in results section 34570 of GUI 34550 (of FIG. 34PA) is selected, detailed information section 34600 of FIG. 34T may be displayed. In one implementation, detailed information section 34600 includes the same information in columns 34571-34577, as discussed above, as well as additional information. That additional information may include, for example, possible affected services 34601, contributing KPIs 34602, a link to the correlation search that generated the notable event 34603, a history of activity for the notable event 34604, the original notable event 34605, a description of the notable event 34606, and/or other information.

The services identified in the list of possible affected services 34601 may be obtained from the service definitions of the services indicated in column 34572. The service definition may include service dependencies. The dependencies indicate one or more other services with which the service has a dependency relationship. For example, a set of entities (e.g., host machines) may define a testing environment that provides a sandbox service for isolating and testing untested programming code changes. In another example, a specific set of entities (e.g., host machines) may define a revision control system that provides a revision control service to a development organization. In yet another example, a set of entities (e.g., switches, firewall systems, and routers) may define a network that provides a networking service. The sandbox service can depend on the revision control service and the networking service. The revision control service can depend on the networking service, and so on. The KPIs identified in the list of contributing KPIs 34602 may include any KPIs, whether aspect KPIs or aggregate KPIs, that were specified in the KPI correlation search that generated the notable event. The link to the correlation search 34603 may display the KPI correlation search generation interface that was used to create the KPI correlation search that generated the notable event. History 34604 may show all review activity related to the notable event, including when the notable event was generated, when information pertaining to the notable event was edited (e.g., status, severity, owner), what actions were taken with respect to the notable event (e.g., generation of a deep dive), etc. The original notable event 34605 and the description of the notable event 34606 may display an explanation of how and why the notable event was generated. For example, the explanation may include a written description of what KPIs were monitored in the KPI correlation search, the period of time that was considered and what the triggering condition was that caused generation of the notable event. In other implementations, detailed information section 34600 may include different and/or additional information pertaining to the notable event.

Service Now Integration

Figure 34U:
FIG. 34U illustrates an example of a GUI for configuring a ServiceNow™ incident ticket produced as a result of a correlation search, in accordance with one or more implementations of the present disclosure.

FIG. 34U illustrates an example of a GUI for configuring a ServiceNow™ incident ticket produced as a result of a correlation search, in accordance with one or more implementations of the present disclosure. In one implementation, GUI 34700 accepts user input to configure the creation a ticket in an incident ticketing system as the action resulting from the data produced by a correlation search query satisfying the associated triggering condition. In one implementation, the system may create a ticket in the ServiceNow™ incident ticketing system. In other implementations, other incident ticketing or service management systems may be used. The generated ticket serves as a record of the incident or event that triggered the correlation search and can be used to track analysis and service of the incident or event.

In one implementation, GUI 34700 may include a number of user input fields that receive user input to configure creation of the ticket. Ticket type field 34701 receives input to specify the whether the ticket type is an incident or an event. When the ticket type is set as "incident," fields 34702-34706 are displayed. Category field 34702 receives input to specify whether the ticket should be categorized as a request, inquiry, software related, hardware related, network related, or database related. Contact type field 34703 receives input to specify whether the ticket was created as a result of an email, a phone call, self-service request, walk-in, form or forms. Urgency field 34704 receives input to specify whether an urgency for the ticket should be set as low, medium or high. State field 34705 receives user input to specify whether an initial state of the ticket should be set as new, active, awaiting problem, awaiting user information, awaiting evidence, resolved or closed. Description field 34706 receives textual input specifying any other information related to the ticket that is not included above.

Figure 34V:
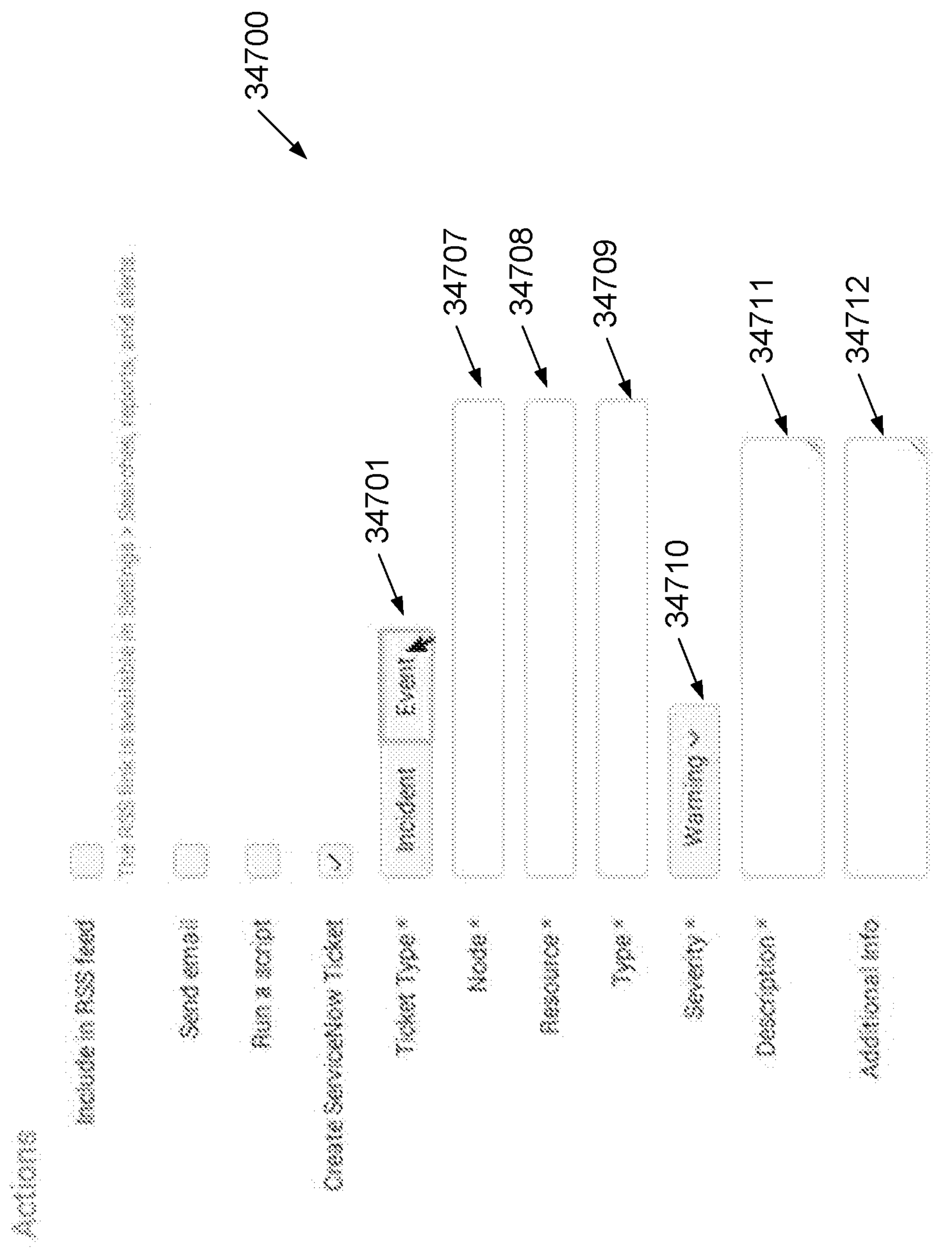
FIG. 34V illustrates an example of a GUI for configuring a ServiceNow™ event ticket produced as a result of a correlation search, in accordance with one or more implementations of the present disclosure.

FIG. 34V illustrates an example of a GUI for configuring a ServiceNow™ event ticket produced as a result of a correlation search, in accordance with one or more implementations of the present disclosure. When the ticket type is set as "event," fields 34707-34712 are displayed in GUI 34700. Node field 34707 receives input to identify the host, node or other machine on which the event occurred (e.g., hostname). Resource field 34708 receives input to identify a subcomponent of the node where the event occurred (e.g., CPU, Operating system). Type field 34709 receives input to specify the type of the event that occurred (e.g., hardware, software). Severity field 34710 receives user input to specify a severity of the event (e.g., critical, high, medium, normal, low). Description field 34711 and additional information field 34712 receive textual input specifying any other information related to the ticket that is not included above.

Once the creation of a ticket is configured as the action associated with a correlation search, a new ticket will be created each time the correlation search is triggered. As described above, the correlation search may be run periodically in the system and when the data generated in response to the correlation search query satisfies the associated triggering condition, an action may be performed, such as the creation of a ticket in the incident ticketing system, according to the configuration parameters described above.

Figure 34W:
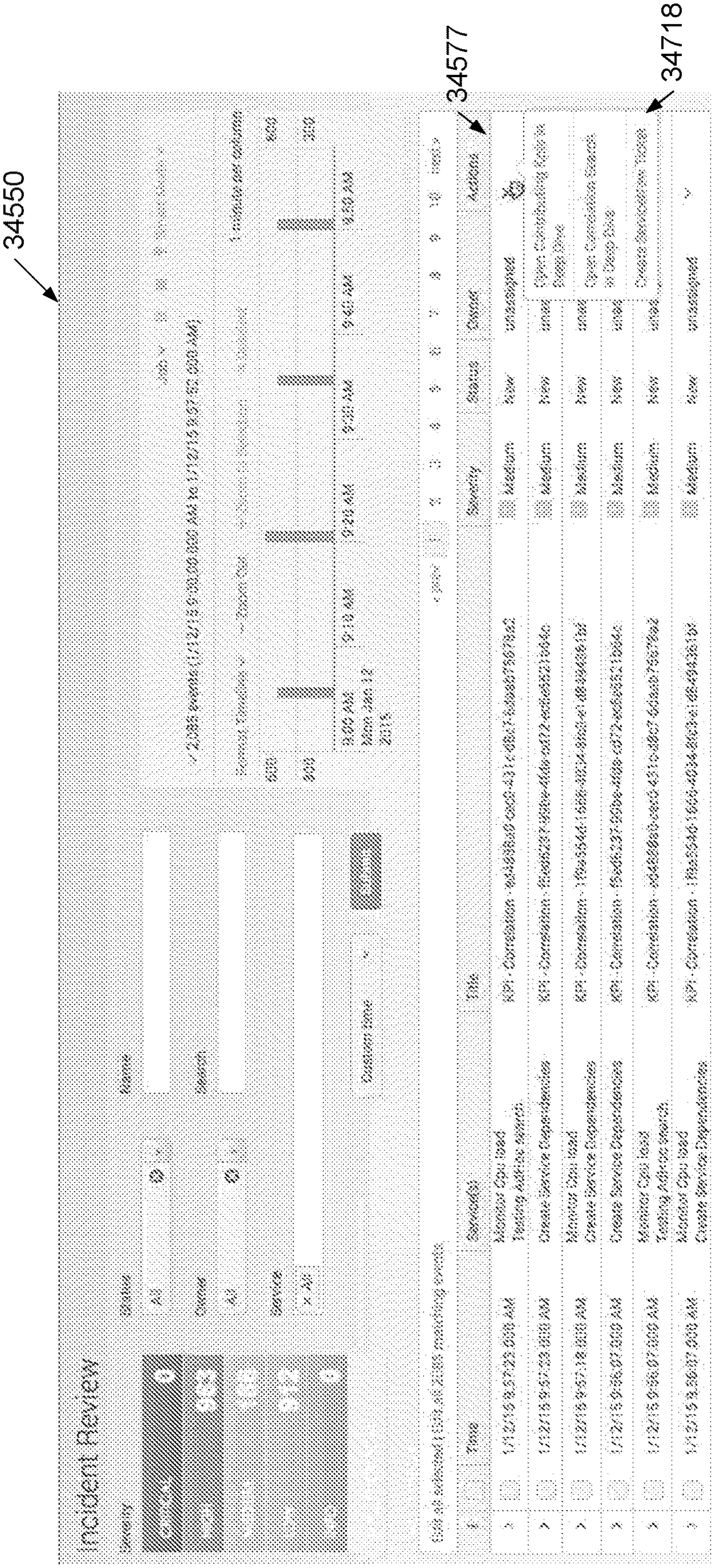
FIG. 34W illustrates an example of a GUI presenting options for actions that may be taken for a corresponding notable event produced as a result of a correlation search, in accordance with one or more implementations of the present disclosure.
Figure 34X:
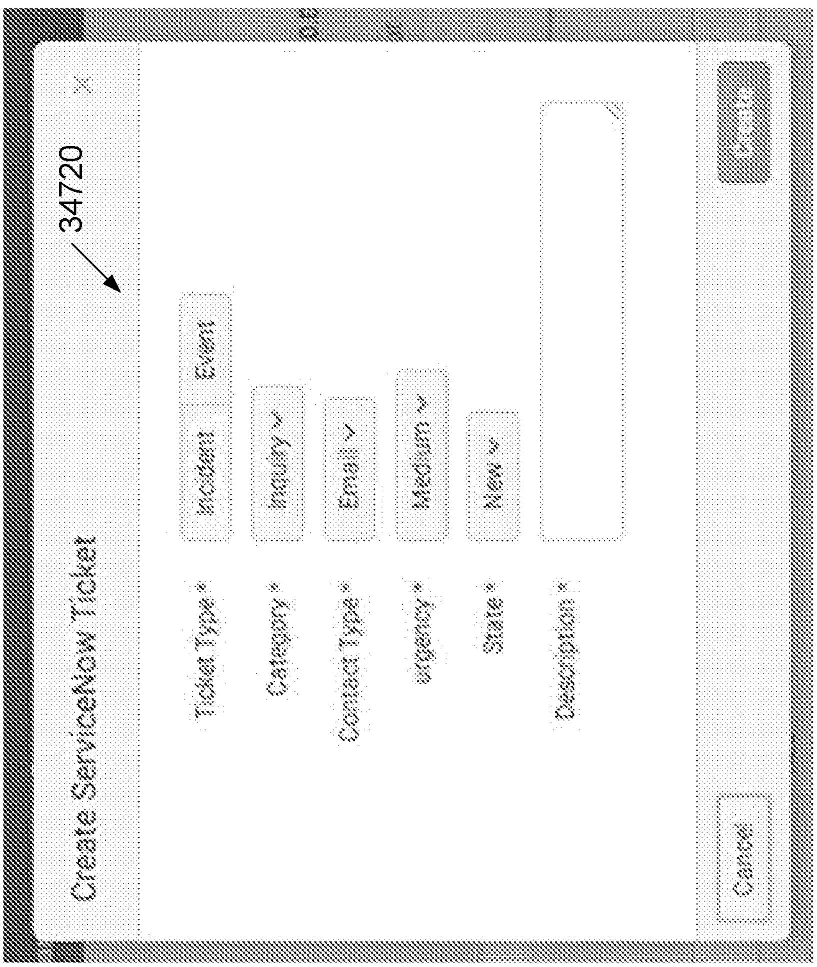
FIG. 34X illustrates an example of a GUI for configuring an incident ticket for a notable event, in accordance with one or more implementations of the present disclosure.
Figure 34Y:
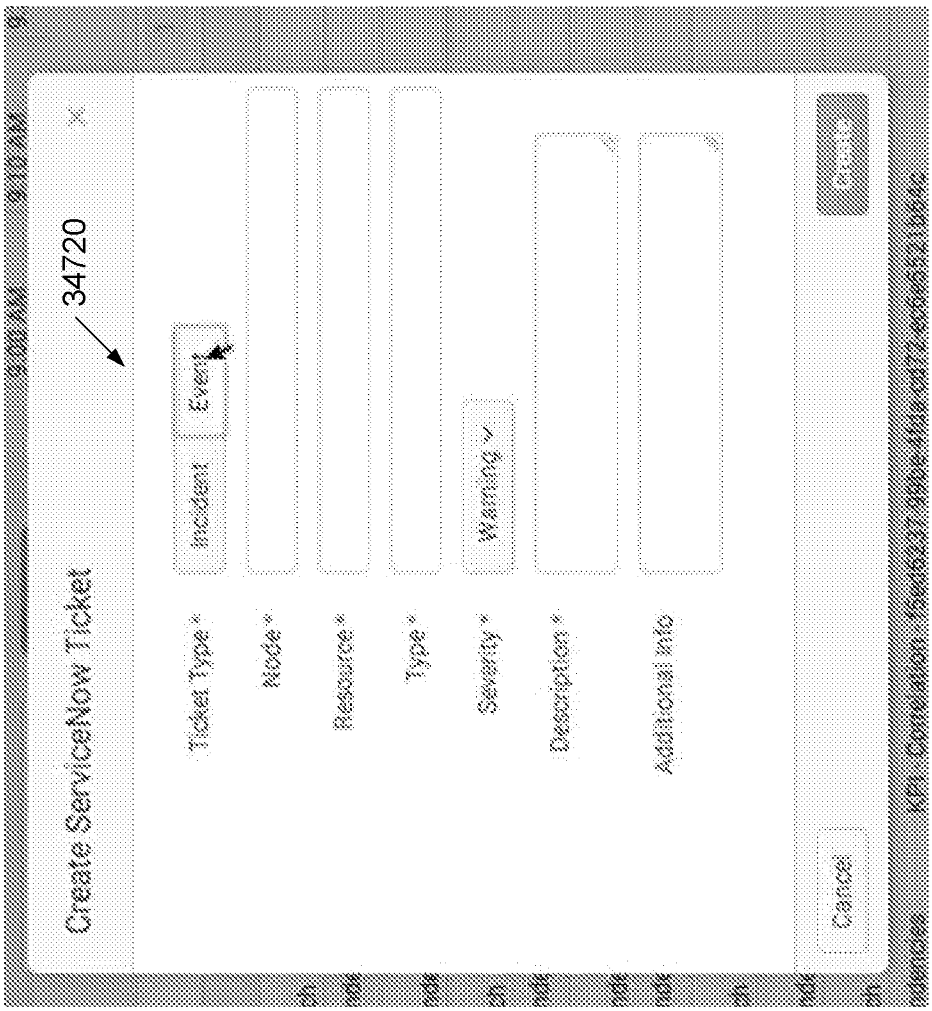
FIG. 34Y illustrates an example of a GUI for configuring an event ticket for a notable event, in accordance with one or more implementations of the present disclosure.

FIG. 34W illustrates an example of a GUI presenting options for actions that may be taken for a corresponding notable event produced as a result of a correlation search, in accordance with one or more implementations of the present disclosure. If the creation of a ticket was not configured to be the action resulting from a correlation search, a ticket can be created from any notable event that was previously created through the Incident Review interface. In another implementation, a ticket can be created from any notable event in the Incident Review interface, even if the creation of another ticket was configured as part of the correlation search. As described above, when actions column 34577 for a particular notable event entry in results section 34570 of GUI 34550 is selected, a number of action options are displayed. In one implementation, the action options additionally include "create ServiceNow ticket" 34718. Selection of option 34718 may create a single ticket for the selected notable event(s). In one implementation, selection of option 34718 causes display of modal window 34720 which contains the configuration options for creating an incident ticket, as shown in FIG. 34X, or for creating an event ticket, as shown in FIG. 34Y. In one implementation, the configuration options are the same as the options illustrated in FIG. 34U and FIG. 34V, respectively.

Figure 34Z:
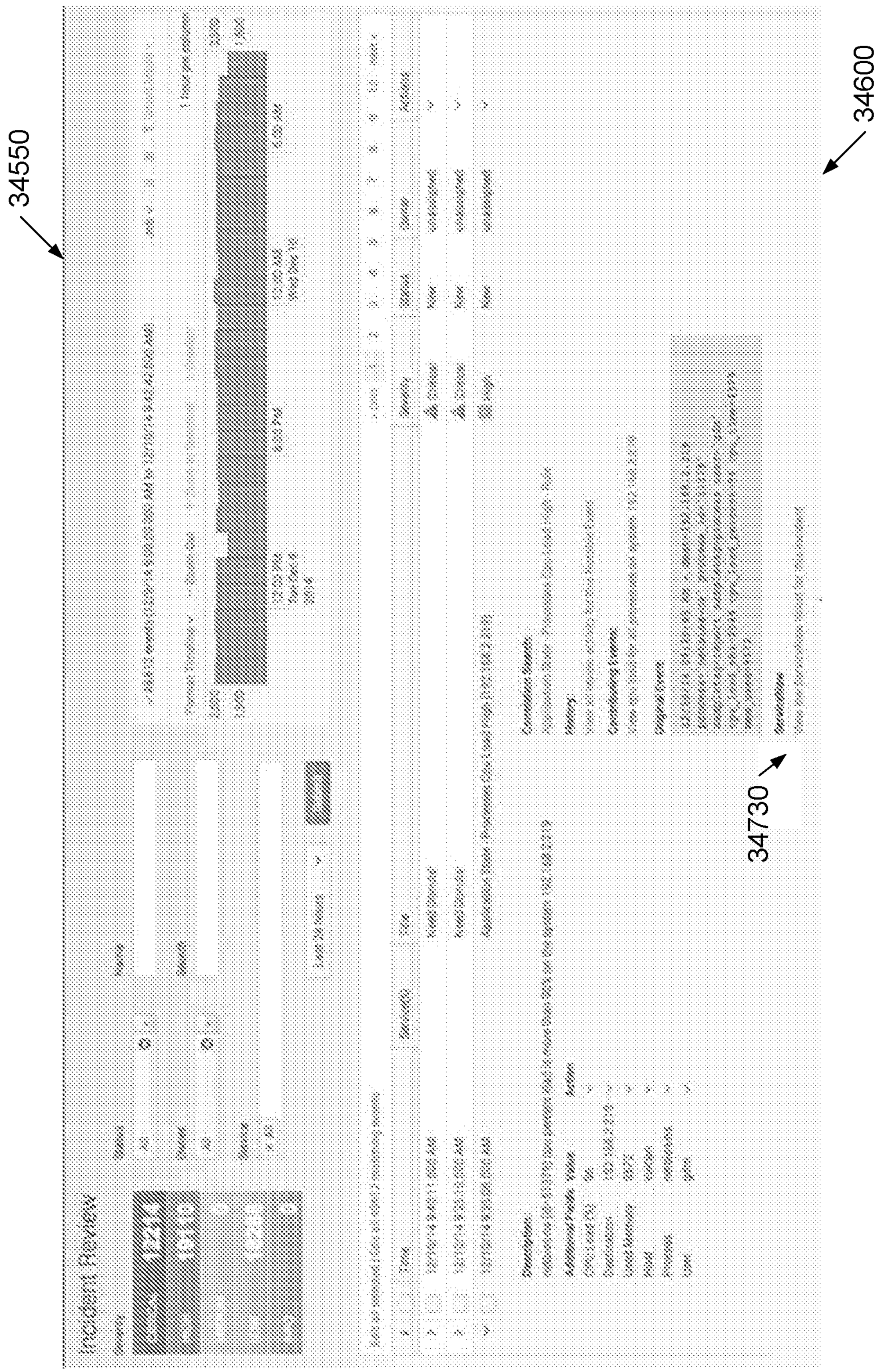
FIG. 34Z illustrates an example of a GUI presenting detailed information pertaining to a notable event produced as a result of a correlation search, in accordance with one or more implementations of the present disclosure.

FIG. 34Z illustrates an example of a GUI presenting detailed information pertaining to a notable event produced as a result of a correlation search, in accordance with one or more implementations of the present disclosure. As discussed above, when a particular notable event entry in results section 34570 of GUI 34550 is selected, detailed information section 34600 may be displayed. In one implementation, detailed information section 34600 additionally includes a ServiceNow option 34730. The presence of option 34730 indicates that a ticket has been created for the selected notable event, whether as an action resulting from the correlation search or manually through the Incident Review interface. In one implementation, selection of the ServiceNow option 34730 may cause display of an external ServiceNow incident ticketing system interface for further review, editing, etc. of the associated ticket. In another implementation, selection of the ServiceNow option 34730 may trigger a search in a new window showing the user all of the tickets created in ServiceNow™ corresponding to this notable event in a tabular format. One such column in the table would be the URL of the ticket in the ServiceNow™ ticketing system. Clicking this URL may open the ServiceNow™ ticketing system interface for further review, editing, etc. of the associated ticket. Other columns in the table may include a unique ID of the ticket in ServiceNow™, a ticket number of this ticket etc. "Event" and "Incident" are specific to the ServiceNow™ implementation. In other implementations, when other ticketing systems are used for integration, the terms pertaining to these systems may be used.

Example Service-Monitoring Dashboard

Figure 35:
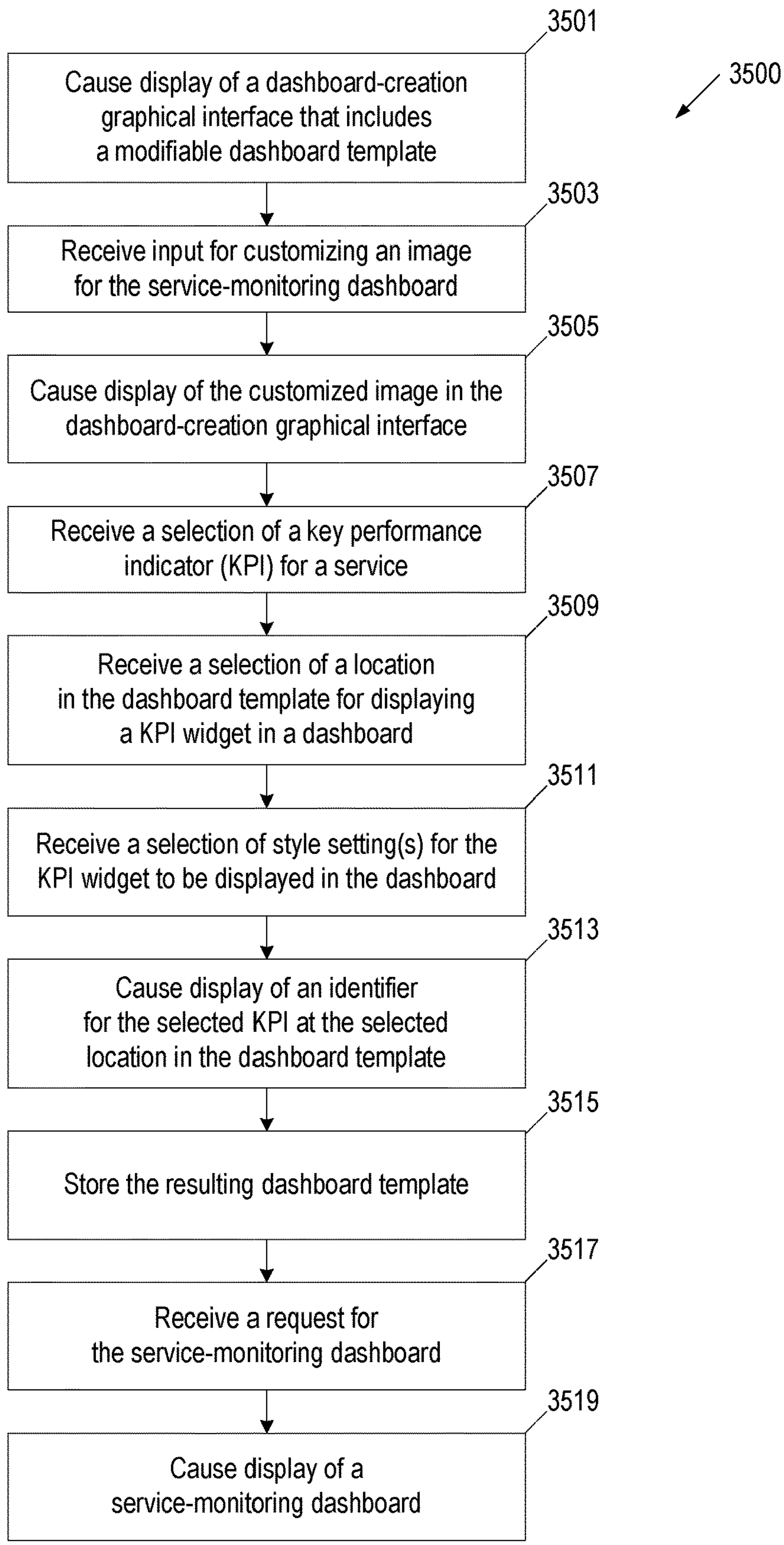
FIG. 35 is a flow diagram of an implementation of a method for creating a service-monitoring dashboard, in accordance with one or more implementations of the present disclosure.

FIG. 35 is a flow diagram of an implementation of a method 3500 for creating a service-monitoring dashboard, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, the method is performed by the client computing machine. In another implementation, the method is performed by a server computing machine coupled to the client computing machine over one or more networks.

Figure 36A:
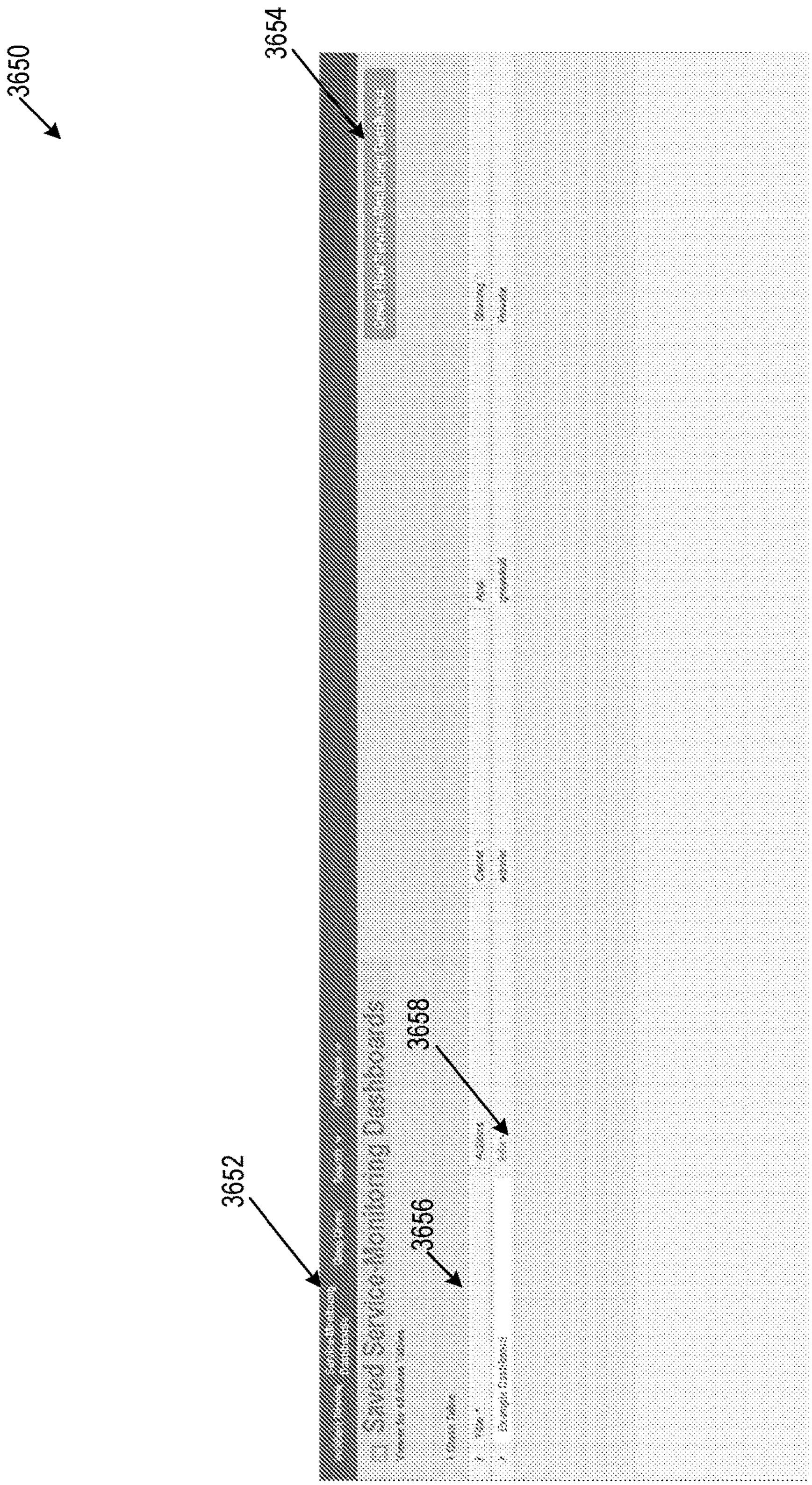
FIG. 36A illustrates an example GUI for creating and/or editing a service-monitoring dashboard, in accordance with one or more implementations of the present disclosure.

At block 3501, the computing machine causes display of a dashboard-creation graphical interface that includes a modifiable dashboard template, and a KPI-selection interface. A modifiable dashboard template is part of a graphical interface to receive input for editing/creating a custom service-monitoring dashboard. A modifiable dashboard template is described in greater detail below in conjunction with FIG. 36B. The display of the dashboard-creation graphical interface can be caused, for example, by a user selecting to create a service-monitoring dashboard from a GUI. FIG. 36A illustrates an example GUI 3650 for creating and/or editing a service-monitoring dashboard, in accordance with one or more implementations of the present disclosure. In one implementation, GUI 3650 includes a menu item, such as Service-Monitoring Dashboards 3652, which when selected can present a list 3656 of existing service-monitoring dashboards that have already been created. The list 3656 can represent service-monitoring dashboards that have data that is stored in a data store for displaying the service-monitoring dashboards. Each service-monitoring dashboard in the list 3656 can include a button 3658 for requesting a drop-down menu listing editing options to edit the corresponding service-monitoring dashboard. Editing can include editing the service-monitoring dashboard and/or deleting the service-monitoring dashboard. When an editing option is selected from the drop-down menu, one or more additional GUIs can be displayed for editing the service-monitoring dashboard.

The dashboard creation graphical interface can be a wizard or any other type of tool for creating a service-monitoring dashboard that presents a visual overview of how one or more services and/or one or more aspects of the services are performing. The services can be part of an IT environment and can include, for example, a web hosting service, an email service, a database service, a revision control service, a sandbox service, a networking service, etc. A service can be provided by one or more entities such as host machines, virtual machines, switches, firewalls, routers, sensors, etc. Each entity can be associated with machine data that can have different formats and/or use different aliases for the entity. As discussed above, each service can be associated with one or more KPIs indicating how aspects of the service are performing. The KPI-selection interface of the dashboard creation GUI allows a user to select KPIs for monitoring the performance of one or more services, and the modifiable dashboard template of the dashboard creation GUI allows the user to specify how these KPIs should be presented on a service-monitoring dashboard that will be created based on the dashboard template. The dashboard template can also define the overall look of the service-monitoring dashboard. The dashboard template for the particular service-monitoring dashboard can be saved, and subsequently, the service-monitoring dashboard can be generated for display based on the customized dashboard template and KPI values derived from machine data, as will be discussed in more details below.

Figure 36B:
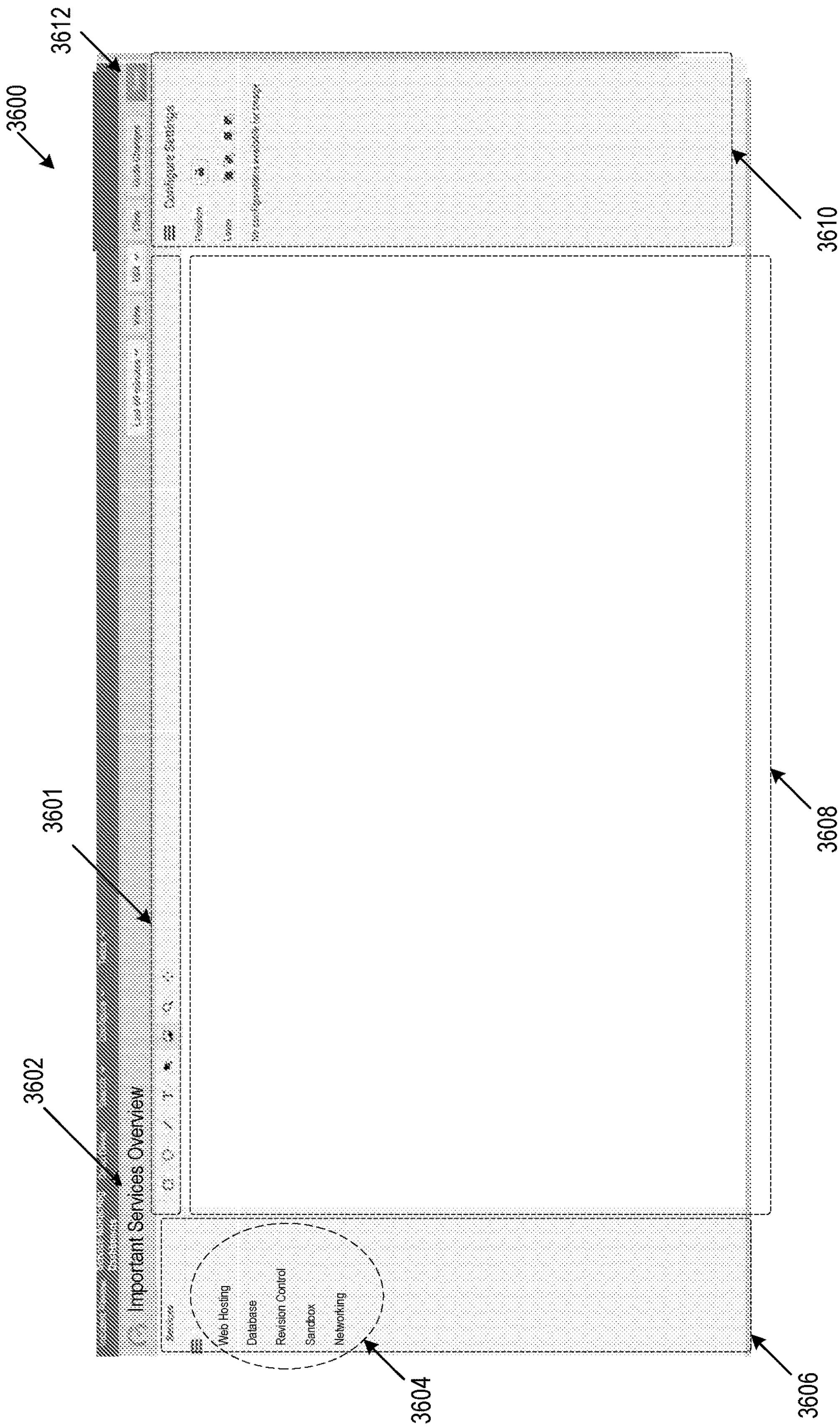
FIG. 36B illustrates an example GUI for a dashboard-creation graphical interface for creating a service-monitoring dashboard, in accordance with one or more implementations of the present disclosure.

GUI 3650 can include a button 3654 that a user can activate to proceed to the creation of a service-monitoring dashboard, which can lead to GUI 3600 of FIG. 36B. FIG. 36B illustrates an example dashboard-creation GUI 3600 for creating a service-monitoring dashboard, in accordance with one or more implementations of the present disclosure. GUI 3600 includes a modifiable dashboard template 3608 and a KPI-selection interface 3606 for selecting a key performance indicator (KPI) of a service. GUI 3600 can facilitate input (e.g., user input) of a name 3602 of the particular service-monitoring dashboard that is being created and/or edited. GUI 3600 can include a button 3612 for storing the dashboard template 3608 for creating the service-monitoring dashboard. GUI 3600 can display a set of identifiers 3604, each corresponding to a service. The set of identifies 3604 is described in greater detail below. GUI 3600 can also include a configuration interface 3610 for configuring style settings pertaining to the service-monitoring dashboard. The configuration interface 3610 is described in greater detail below. GUI 3600 can also include a customization toolbar 3601 for customizing the service-monitoring dashboard as described in greater detail below in conjunction with FIG. 35. The configuration interface 3610 can also include entity identifiers and facilitate input (e.g., user input) for selecting entity identifier of entities to be included in the service-monitoring dashboard.

Figure 37:
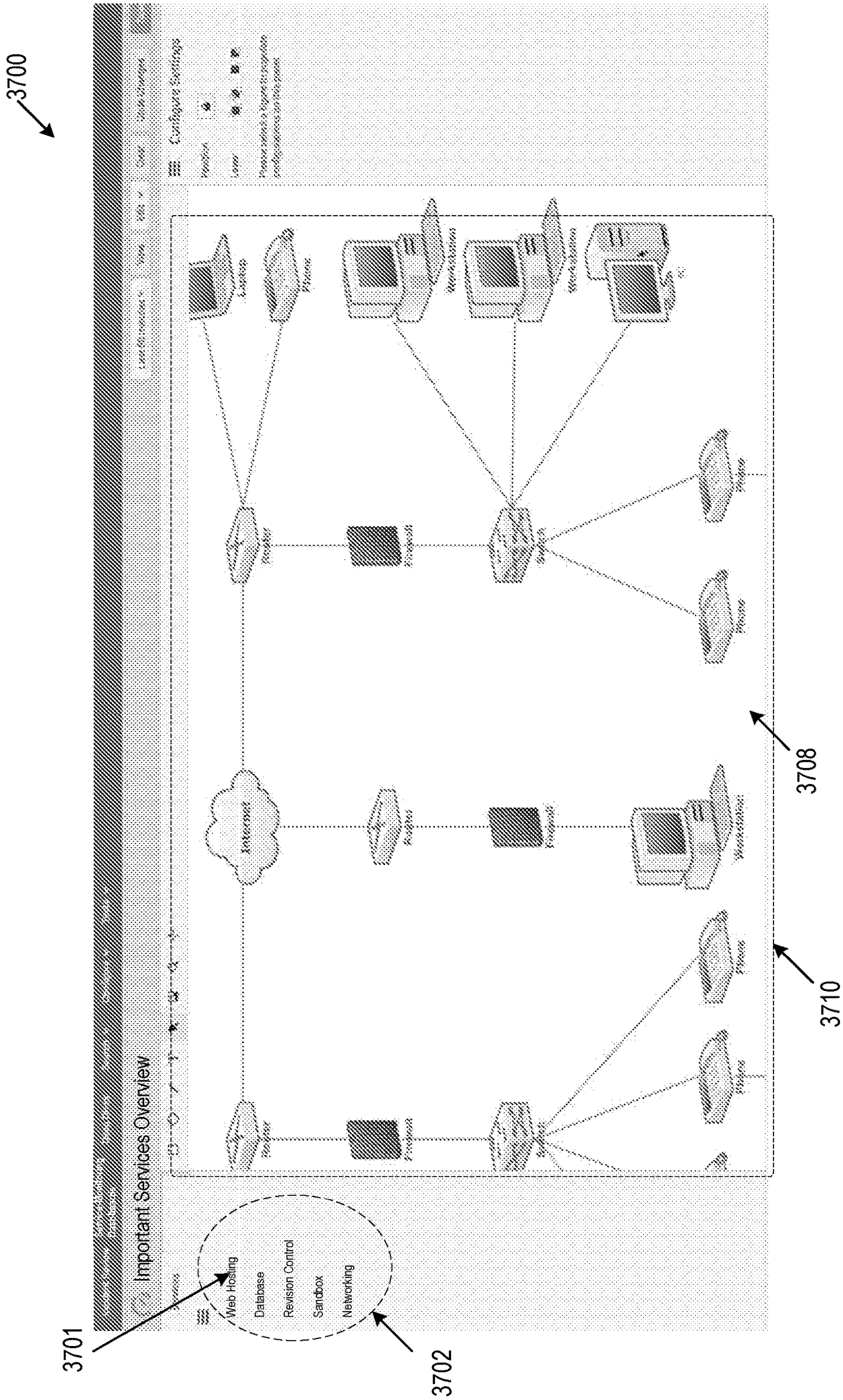
FIG. 37 illustrates an example GUI for a dashboard-creation graphical interface including a user selected background image, in accordance with one or more implementations of the present disclosure.
Figure 38A:
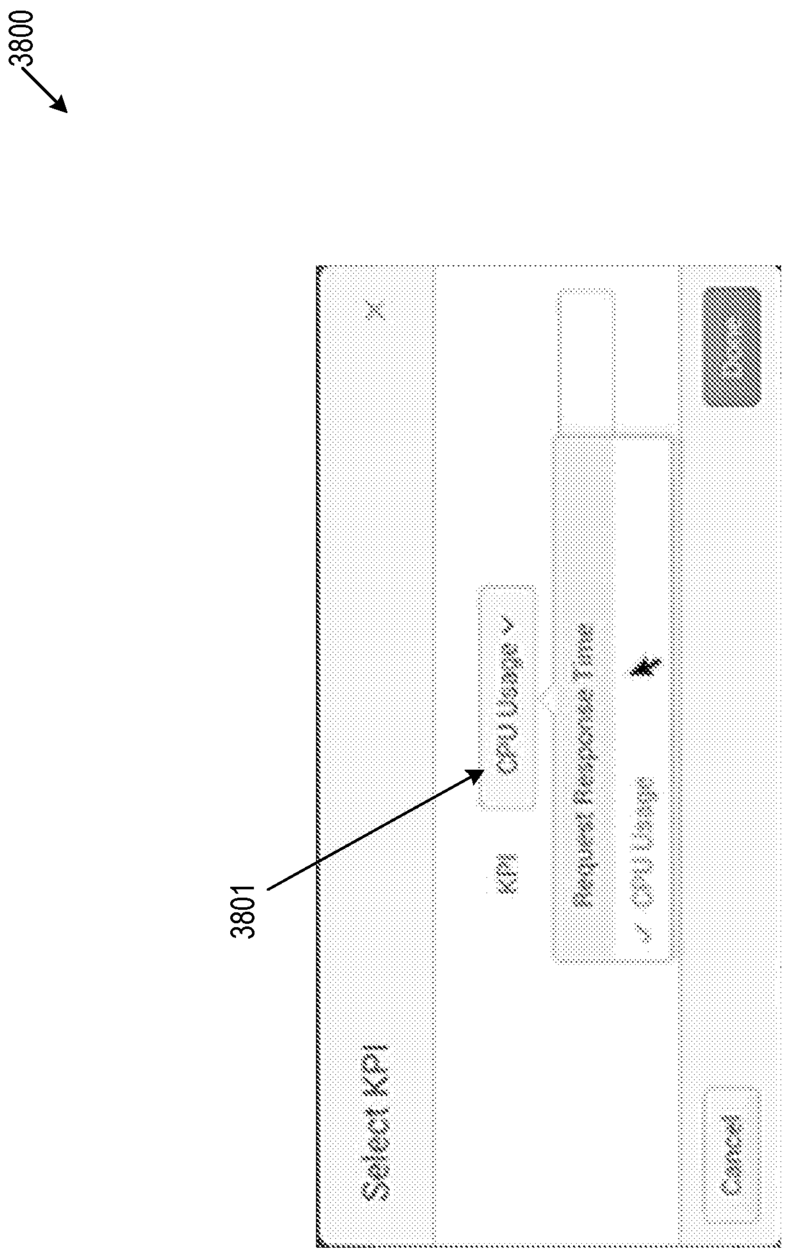
FIG. 38A illustrates an example GUI for displaying of a set of KPIs associated with a selected service, in accordance with one or more implementations of the present disclosure.
Figure 38B:
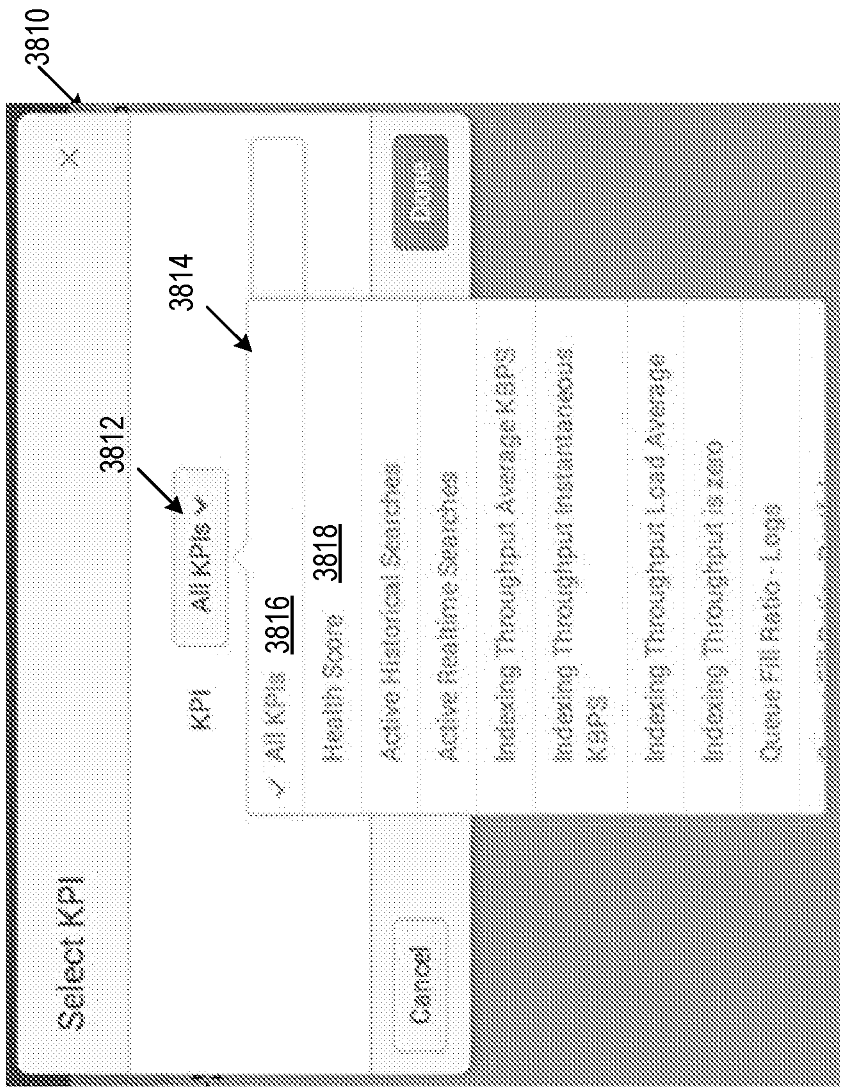
FIG. 38B illustrates an example GUI for displaying a set of KPIs associated with a selected service for which a user can select for a service-monitoring dashboard, in accordance with one or more implementations of the present disclosure.

FIG. 38B illustrates an example GUI 3810 for displaying a set of KPIs associated with a selected service for which a user can select for a service-monitoring dashboard, in accordance with one or more implementations of the present disclosure. When button 3812 is activated a list 3814 of a set of KPIs that are associated with the service can be displayed. The list 3814 can include an item 3816 for selecting all of the KPIs that are associated with the service into a modifiable dashboard template (e.g., modifiable dashboard template 3710 in FIG. 37). The list 3814 can include a health score 3818 for the service. In one implementation, the health score is an aggregate KPI that is calculated for the service. An aggregate KPI can be calculated for a service as described above in conjunction with FIG. 34.

Returning to FIG. 35, at block 3503, the computing machine optionally receives, via the dashboard-creation graphical interface, input for customizing an image for the service-monitoring dashboard and causes the customized image to be displayed in the dashboard-creation graphical interface at block 3505. In one example, the computing machine optionally receives, via the dashboard-creation graphical interface, a selection of a background image for the service-monitoring dashboard and causes the selected background image to be displayed in the dashboard-creation graphical interface. The computing machine can display the selected background image in the modifiable dashboard template. FIG. 37 illustrates an example GUI 3700 for a dashboard-creation graphical interface including a user selected background image, in accordance with one or more implementations of the present disclosure. GUI 3700 displays the user selected image 3708 in the modifiable dashboard template 3710.

Referring again to FIG. 35, in another example, at block 3503, the computing machine optionally receives input (e.g., user input) via a customization toolbar (e.g., customization toolbar 3601 in FIG. 36B) for customizing an image for the service-monitoring dashboard. The customization toolbar can be a graphical interface containing drawing tools to customize a service-monitoring dashboard to define, for example, flow charts, text and connections between different elements on the service-monitoring dashboard. For example, the computing machine can receive input of a user drawing a flow chart or a representation of an environment (e.g., IT environment). In another example, the computing machine can receive input of a user drawing a representation of an entity and/or service. In another example, the computing machine can receive input of a user selection of an image to represent of an entity and/or service.

At block 3507, the computing machine receives, through the KPI-selection interface, a selection of a particular KPI for a service. As discussed above, each KPI indicates how an aspect of the service is performing at one or more points in time. A KPI is defined by a search query that derives one or more values for the KPI from the machine data associated with the one or more entities that provide the service whose performance is reflected by the KPI.

In one example, prior to receiving the selection of the particular KPI, the computing machine causes display of a context panel graphical interface in the dashboard-creation graphical interface that contains service identifiers for the services (e.g., all of the services) within an environment (e.g., IT environment). The computing machine can receive input, for example, of a user selecting one or more of the service identifiers, and dragging and placing one or more of the service identifiers on the dashboard template. In another example, the computing machine causes display of a search box to receive input for filtering the service identifiers for the services.

In another example, prior to receiving the selection of the particular KPI, the computing machine causes display of a drop-down menu of selectable services in the KPI selection interface, and receives a selection of one of the services from the drop-down menu. In some implementations, selectable services can be displayed as identifiers corresponding to individual services, where each identifier can be, for example, the name of a particular service or the name of a service definition representing the particular service. As discussed in more detail above, a service definition can associate the service with one or more entities (and thereby with heterogeneous machine data pertaining to the entities) providing the service, and can specify one or more KPIs created for the service to monitor the performance of different aspects of the service.

In response to the user selection of a particular service, the computing machine can cause display of a list of KPIs associated with the selected service in the KPI selection interface, and can receive the user selection of the particular KPI from this list.

Referring again to FIG. 37, a user may select Web Hosting service 3701 in FIG. 37 from the set of KPI identifiers 3702, and in response to the selection of the Web Hosting service 3701, the computing machine can cause display of a set of KPIs available for the Web Hosting service 3701. FIG. 38A illustrates an example GUI 3800 for displaying a set of KPIs associated with a selected service, in accordance with one or more implementations of the present disclosure. GUI 3800 can be a pop-up window that includes a drop-down menu 3801, which when selected, displays a set of KPIs (e.g., Request Response Time and CPU Usage) associated with the service (e.g., Web Hosting service) corresponding to the selected service identifier. The user can then select a particular KPI from the menu. In another implementation, GUI 3800 also displays an aggregate KPI associated with the selected service, which can be selected to be represented by a KPI widget in the dashboard template for display in the service-monitoring dashboard.

Returning to FIG. 35, at block 3509, the computing machine receives a selection of a location for placing the selected KPI in the dashboard template for displaying a KPI widget in a dashboard. Each KPI widget can provide a numerical or graphical representation of one or more values for a corresponding KPI or service health score (aggregate KPI for a service) indicating how a service or an aspect of a service is performing at one or more points in time. For example, a user can select the desired location for a KPI widget by clicking (or otherwise indicating) a desired area in the dashboard template. Alternatively, a user can select the desired location by dragging the selected KPI (e.g., its identifier in the form of a KPI name), and dropping the selected KPI at the desired location in the dashboard template. For example, when the user selects the KPI, a default KPI widget is automatically displayed at a default location in the dashboard template. The user can then select the location by dragging and dropping the default KPI widget at the desired location. As will be discussed in greater detail below in conjunction with FIGS. 40-42 and FIGS. 44-46, a KPI widget is a KPI identifier that provides a numerical and/or visual representation of one or more values for the selected KPI. A KPI widget can be, for example, a Noel gauge, a spark line, a single value, a trend indicator, etc.

At block 3511, the computing machine receives a selection of one or more style settings for a KPI identifier (a KPI widget) to be displayed in the service-monitoring dashboard. For example, after the user selects the KPI, the user can provide input for creating and/or editing a title for the KPI. In one implementation, the computing machine causes the title that is already assigned to the selected KPI, for example via GUI 2200 in FIG. 22, to be displayed at the selected location in the dashboard template. In another example, after the user selects the KPI, the user is presented with available style settings, and the user can then select one or more of the style settings for the KPI widget to be displayed in the dashboard. In another example, in which a default KPI widget is displayed in response to the user selection of the KPI, the user can choose one or more of the available style setting(s) to replace or modify the default KPI widget. Style settings define how the KPI widget should be presented and can specify, for example, the shape of the widget, the size of the widget, the name of the widget, the metric unit of a KPI value, and/or other visual characteristics of the widget. Some implementations for receiving a selection of style setting(s) for a KPI widget to be displayed in the dashboard are discussed in greater detail below in conjunction with FIG. 39A. At block 3513, the computing machine causes display of a KPI identifier, such as a KPI widget, for the selected KPI at the selected location in the dashboard template. The KPI widget that is displayed in the dashboard template can be displayed using the selected style settings. The computing machine can receive further input (e.g., user input) for resizing a KPI widget via an input device (e.g., mouse, touch screen, etc.) For example, the computing device may receive user input via mouse device resizing (e.g., stretching, shrinking) the KPI widget.

Figure 39A:
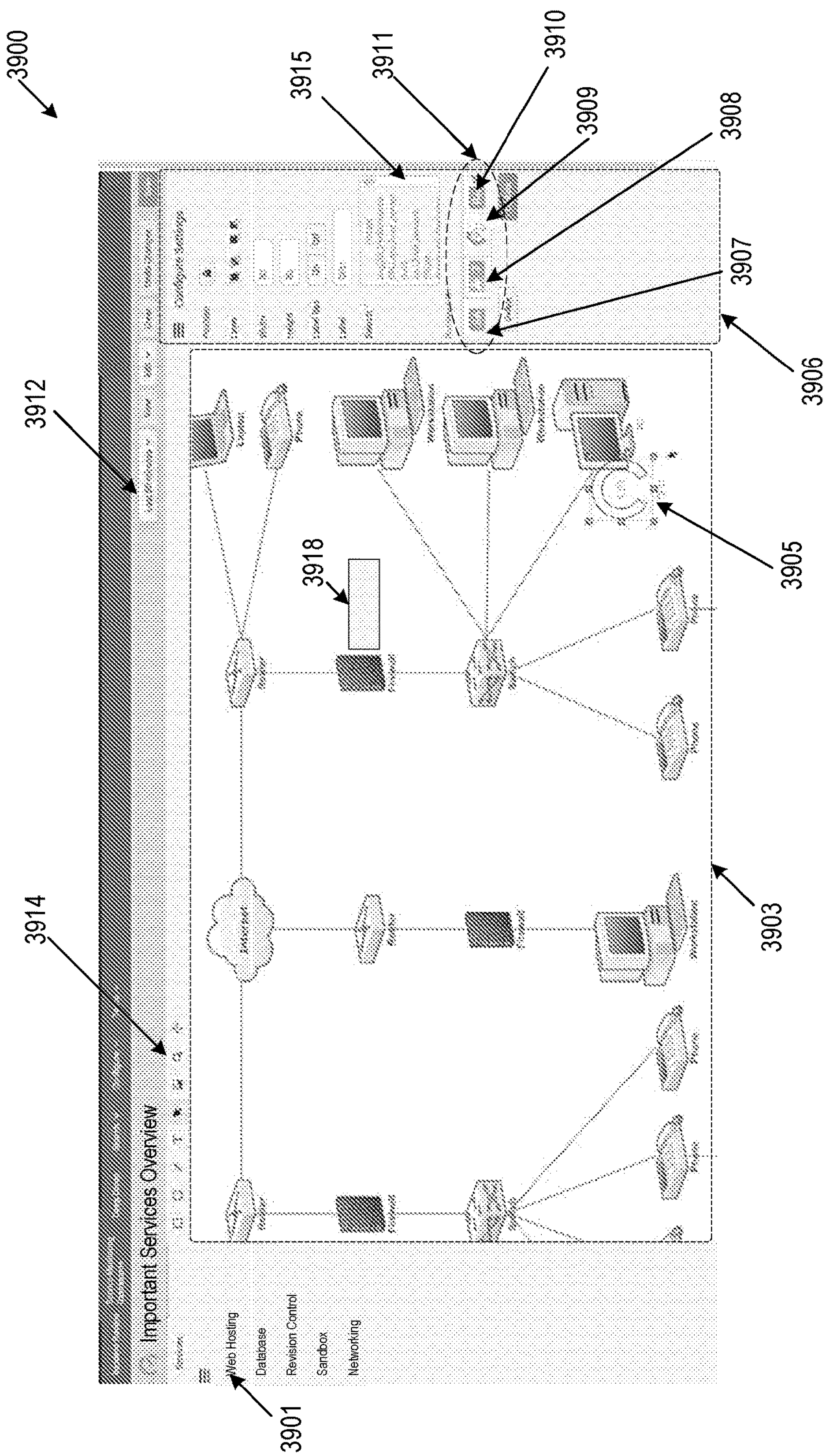
FIG. 39A illustrates an example GUI facilitating user input for selecting a location in the dashboard template and style settings for a KPI widget, and displaying the KPI widget in the dashboard template, in accordance with one or more implementations of the present disclosure.
Figure 39B:
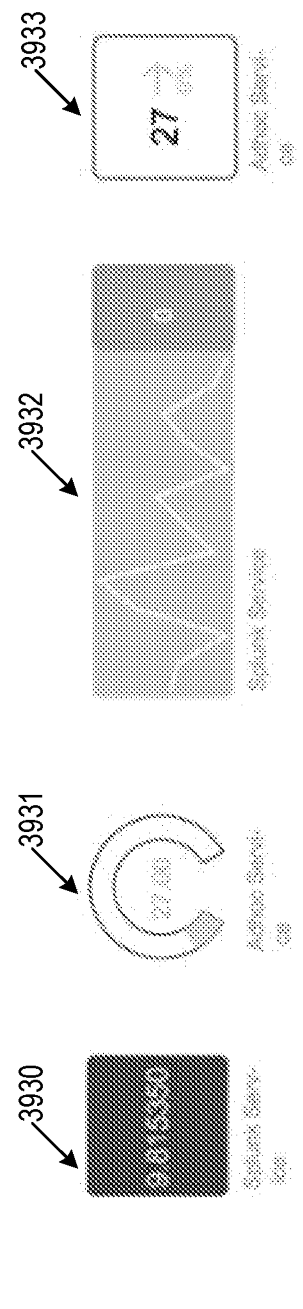
FIG. 39B illustrates example KPI widgets, in accordance with one or more implementations of the present disclosure.

FIG. 39A illustrates an example GUI 3900 facilitating user input for selecting a location in the dashboard template and style settings for a KPI widget, editing the service-monitoring dashboard by editing the dashboard template for the service-monitoring dashboard, and displaying the KPI widget in the dashboard template, in accordance with one or more implementations of the present disclosure. GUI 3900 includes a configuration interface 3906 to display a set of selectable thumbnail images (or icons or buttons) 3911 representing different types or styles of KPI widgets. The KPI widget styles can include, for example, and not limited to, a single value widget, a spark line widget, a Noel gauge widget, and a trend indicator widget. FIG. 39B illustrates example KPI widgets, in accordance with one or more implementations of the present disclosure. Widget 3931 is an example of one implementation of a Noel gauge widget. Widget 3932 is an example of one implementation of a spark line widget. Widget 3933 is an example of one implementation of a trend indicator widget.

Referring to FIG. 39A, configuration interface 3905 can display a single value widget thumbnail image 3907, a spark line widget thumbnail image 3908, a Noel gauge widget thumbnail image 3909, and a trend indicator widget thumbnail image 3910. For example, a user may have selected the Web Hosting service 3901, dragged the Web Hosting service 3901, and dropped the Web Hosting service 3901 on location 3905. The user may also have selected the CPU Usage KPI for the Web Hosting service 3901 and the Noel gauge widget thumbnail image 3909 to display the KPI widget for the CPU Usage KPI at the location 3905. In response, the computing machine can cause display of the Noel Gauge widget for the selected KPI (e.g., CPU Usage KPI) at the selected location (e.g., location 3905) in the dashboard template 3903. Some implementations of widgets for representing KPIs are discussed in greater detail below in conjunction with FIGS. 40-42 and FIGS. 44-46. In response to a user selection of a style setting for the KPI widget, one or more GUIs can be presented for customizing the selected KPI widget for the KPI. Input can be received via the GUIs to select a label for a KPI widget and the metric unit to be used for the KPI value with the KPI widget.

In one implementation, GUI 3900 includes an icon 3914 in the customization toolbar, which can be selected by a user, for defining one or more search queries. The search queries may produce results pertaining to one or more entities. For example, icon 3914 may be selected and an identifier 3918 for a search widget can be displayed in the dashboard template 3903. The identifier 3918 for the search widget can be the search widget itself, as illustrated in FIG. 39A. The search widget can be a shape (e.g., box) and can display results (e.g., value produced by a corresponding search query) in the shape in the service-monitoring dashboard when the search query is executed for displaying the service-monitoring dashboard to a user.

The identifier 3918 can be displayed in a default location in the dashboard template 3903 and a user can optionally select a new location for the identifier 3918. The location of the identifier 3918 in the dashboard template specifies the location of the search widget in the service-monitoring dashboard when the service-monitoring dashboard is displayed to a user. GUI 3900 can display a search definition box (e.g., box 3915) that corresponds to the search query. A user can provide input for the criteria for the search query via the search definition box (e.g., box 3915). For example, the search query may produce a stats count for a particular entity. The input pertaining to the search query is stored as part of the dashboard template. The search query can be executed when the service-monitoring dashboard is displayed to a user and the search widget can display the results from executing the search query.

Referring to FIG. 35, in one implementation, the computing machine receives input (e.g., user input), via the dashboard-creation graphical interface, of a time range to use for the KPI widget, editing the service-monitoring dashboard, and clearing data in the dashboard template.

At block 3515, the computing machine stores the resulting dashboard template in a data store. The dashboard template can be saved in response to a user request. For example, a request to save the dashboard template may be received upon selection of a save button (e.g., save button 3612 in GUI 3600 of FIG. 36). In one implementation, an image source byte for the resulting dashboard template is stored in a data store. In one implementation, an image source location for the resulting dashboard template is stored in a data store. The resulting dashboard template can be stored in a structure where each item (e.g., widget, line, text, image, shape, connector, etc.) has properties specified by the service-monitoring dashboard creation GUI.

Referring to FIG. 35, at block 3517, the computing machine can receive a user request for a service-monitoring dashboard, and can then generate and cause display of the service-monitoring dashboard based on the dashboard template at block 3519. Some implementations for causing display of a service-monitoring dashboard based on the dashboard template are discussed in greater detail below in conjunction with FIG. 47.

Figure 40:
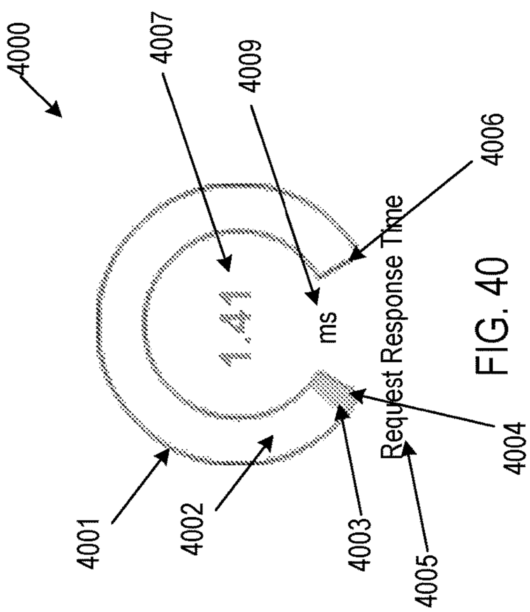
FIG. 40 illustrates an example Noel gauge widget, in accordance with one or more implementations of the present disclosure.

FIG. 40 illustrates an example Noel gauge widget 4000, in accordance with one or more implementations of the present disclosure. Noel gauge widget 4000 can have a shape 4001 with an empty space 4002 and with one end 4004 corresponding to a minimum KPI value and the other end 4006 corresponding to a maximum KPI value. The minimum value and maximum value can be user-defined values, for example, received via fields 3116,3120 in GUI 3100 in FIG. 31A, as discussed above. Referring to FIG. 40, the value produced by the search query defining the KPI can be represented by filling in the empty space 4002 of the shape 4001. This filler can be displayed using a color 4003 to represent the current state (e.g., normal, warning, critical) of the KPI according to the value produced by the search query. The color can be based on input received when one or more thresholds were created for the KPI. The Noel gauge widget 4000 can also display the actual value 4007 produced by the search query defining the KPI. The value 4007 can be of a nominal color or can be of a color representative of the state to which the value produced by the search query corresponds. A user can provide input, via the dashboard-creation graphical interface, indicating whether to apply a nominal color or color representative of the state.

The Noel gauge widget 4000 can display a label 4005 (e.g., Request Response Time) to describe the KPI and the metric unit 4009 (e.g., ms (milliseconds)) used for the KPI value. If the KPI value 4007 exceeds the maximum value represented by the second end 4006 of the shape 4001 of the Noel gauge widget 4000, the shape 4001 is displayed as being fully filled and can include an additional visual indicator representing that the KPI value 4007 exceeded the maximum value represented by the second end 4006 of the shape 4001 of the Noel gauge widget 4000.

The value 4007 can be produced by executing the search query of the KPI. The execution can be real-time (continuous execution until interrupted) or relative (based on a specific request or scheduled time). In addition, the machine data used by the search query to produce each value can be based on a time range. The time range can be user-defined time range. For example, before displaying a service-monitoring dashboard generated based on the dashboard template, a user can provide input specifying the time range. The input can be received, for example, via a drop-down menu 3912 in GUI 3900 in FIG. 39A. The initial time range, received via GUI 3900, can be stored with the dashboard template in a data store and subsequently used for producing the values for the KPI to be displayed in the service-monitoring dashboard.

Figure 43A:

When drop-down menu 3912 is selected by a user, GUI 4300 in FIG. 43A can be displayed. FIG. 43A illustrates an example GUI 4300 for facilitating user input specifying a time range to use when executing a search query defining a KPI, in accordance with one or more implementations of the present disclosure. For real-time execution, for example, used to update the service-monitoring dashboard in real-time, the time range for machine data can be a specified time window (e.g., 30-second window, 1-minute window, 1-hour window, etc.) from the execution time (e.g., each time the query is executed, the events with timestamps within the specified time window from the query execution time will be used). For relative execution, the time range can be historical (e.g., yesterday, previous week, etc.) or based on a specified time window from the requested time or scheduled time (e.g., last 15 minutes, last 4 hours, etc.). For example, the historical time range “Yesterday” 4304 can be selected for relative execution. In another example, the window time range “Last 15 minutes” 4305 can be selected for relative execution.

Figure 43B:
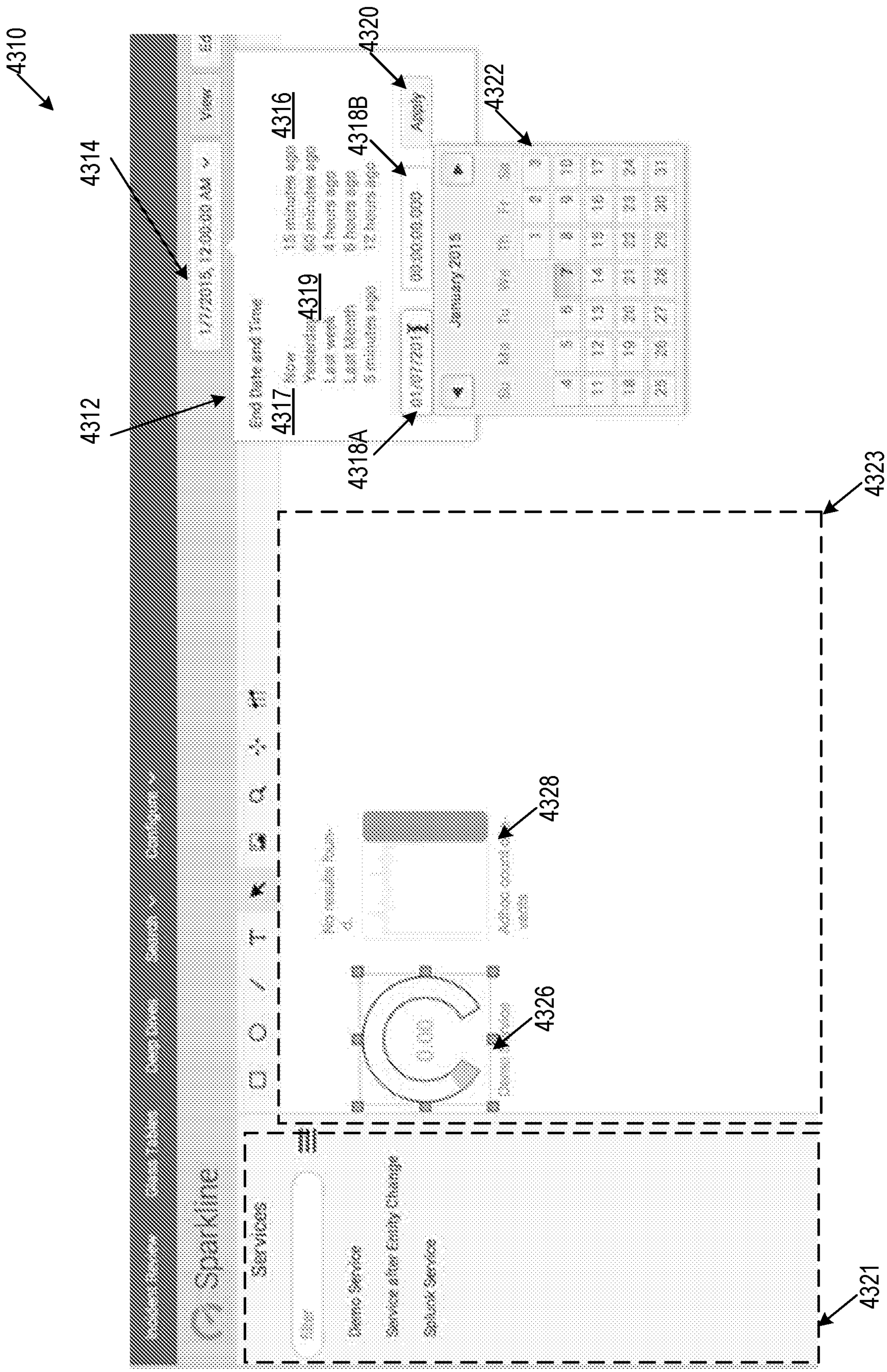

FIG. 43B illustrates an example GUI 4310 for facilitating user input specifying an end date and time for a time range to use when executing a search query defining a KPI, in accordance with one or more implementations of the present disclosure. When button 4314 is selected, an interface 4312 can be displayed. When a search query that defines a KPI is executed, the search query can search a user-specified range of data. For example, the search query may use “4 hours ago” to view the KPI state(s) at that end time. The start time can be determined based on whether the KPI is a service-related KPI or adhoc KPI, as described below.

In one implementation, for a service-related KPI (e.g., a KPI that is associated with a service) interface 4312 can specify the end parameter for a search query defining the service-related KPI, and the service-related KPI definition can specify the start parameter for the search query. For example, for a particular service-related KPI, the range of data “four hours of data” can be specified by a user via a service-related KPI definition GUI (e.g., “Monitoring” portion of GUI in FIG. 34AC described above). The four hours of data that are used for the search query can be relative to an end date and time that is specified via interface 4312.

In one implementation, for an adhoc KPI (i.e., a KPI that is not associated with a service), interface 4312 can specify the end parameter for a search query defining the adhoc KPI, and the particular type (e.g., spark line, single value) of widget used for the adhoc KPI can specify the start parameter for the search query. In one implementation, the use of a single value widget for an adhoc KPI specifies a time range of “30 minutes”. In one implementation, the use of a spark line widget for an adhoc KPI specifies a time range of “30 minutes”. In one implementation, the use of a single value delta widget (also referred to as a trend indicator widget) for an adhoc KPI specifies a time range of "60 minutes". The time range associated with a particular widget type can be configurable.

The interface 4312 can present a list of preset end parameters (e.g., end date and/or end time), which a user can select from. The list can include end parameters (e.g., 15 minutes ago, etc.) that are relative to the execution of the KPI search queries. For example, if the "15 minutes ago" 4316 is selected, the search queries can run using data for a time range (e.g., last 4 hours) up until "15 minutes ago" 4316.

The interface 4312 can include a button 4320, which when selected can run the search queries for the KPIs (e.g., service-related KPIs, adhoc KPIs) in the modifiable dashboard template 4323 and update the KPIs (e.g., KPI 4326 and KPI 4328) in the modifiable dashboard template 4323 in response to executing the correspond search queries.

The interface 4312 can include one or more boxes 4318A-B enabling a user to specify a particular end date and time. In one implementation, when one of the boxes 4318A-B is selected, an interface 4322 enabling a user to specify the particular date or time is displayed. In one implementation, user input specifying the particular data and time is received via boxes 4138A-B. For example, Jan. 7, 2015 at midnight is specified. If the button 4320 is selected, the search queries for KPI 4326 and KPI 4328 can be executed using four hours of data up until midnight on Jan. 7, 2015.

When "Now" 4312 is selected, the search query for each KPI (e.g., service KPI, adhoc KPI) that is being represented in a service-monitoring dashboard is executed using a pre-defined time range, and the current information for the corresponding KPI is displayed in the service-monitoring dashboard. In one implementation, the pre-defined time range for the "Now" 4312 option is "2 minutes". The search queries can be executed every 2 minutes using four hours of data up until 2 minutes ago. The pre-defined time range can be configurable.

When a historical preset end parameter (e.g., "Yesterday" 4319) is selected, the end parameter is relative to when the search queries for the KPI are executed for the service monitoring dashboard. For example, if the search queries for the KPI are executed for the service monitoring dashboard at 1 pm today, then the search queries use a corresponding range of data (e.g., four hours of data) up until 1 pm yesterday.

Referring to FIG. 40, the KPI may be for Request Response Time for a Web Hosting service. The time range "Last 15 minutes" may be selected for the service-monitoring dashboard presented to a user, and the value 4007 (e.g., 1.41) produced by the search query defining the Request Response Time KPI can be the average response time using the last 15 minutes of machine data associated with the entities providing the Web Hosting service from the time of the request. FIG. 42 illustrates an example GUI 4200 illustrating a search query and a search result for a Noel gauge widget, a single value widget, and a trend indicator widget, in accordance with one or more implementations of the present disclosure. A single value widget is discussed in greater detail below in conjunction with FIG. 41. A trend indicator widget is discussed in greater detail below in conjunction with FIG. 46A. Referring to FIG. 42, the KPI may be for Request Response Time. The KPI may be defined by a search query 4501 that outputs a search result having a single value 4203 (e.g., 1.41) for a Noel gauge widget, a single value widget, and/or a trend indicator widget. The search query 4201 can include a statistical function 4205 (e.g., average) to produce the single value (e.g., value 4203) to represent response time using machine data from the Last 15 minutes 4207.

Figure 41:
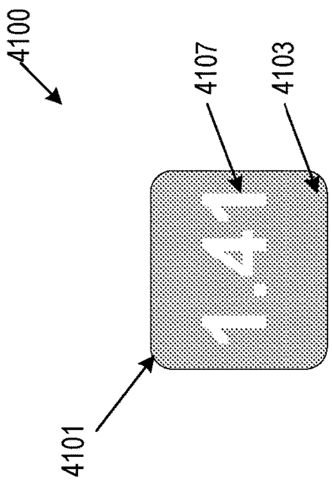
Figure 42:
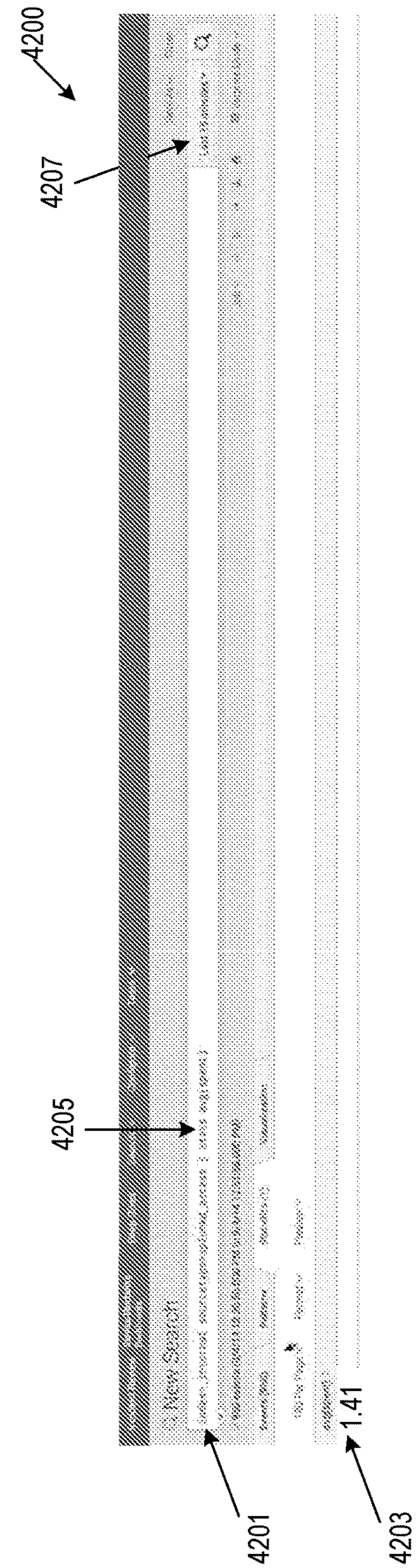

FIG. 41 illustrates an example single value widget 4100, in accordance with one or more implementations of the present disclosure. Single value widget 4100 can include the value 4107, produced by the search query defining the KPI, in a shape 4101 (e.g., box). The shape can be colored using a color 4103 representative of the state (e.g., normal, warning, critical) to which the value produced by the search query corresponds. The value 4107 can be also colored using a nominal color or a color representative of the state to which the value produced by the search query corresponds. The single value widget 4100 can display a label to describe the KPI and the metric unit used for the KPI. A user can provide input, via the dashboard-creation graphical interface, indicating whether to apply a nominal color or color representative of the state.

The machine data used by the search query to produce the value 4107 is based on a time range (e.g., user selected time range). For example, the KPI may be fore Request Response Time for a Web Hosting service. The time range "Last 15 minutes" may be selected for the service-monitoring dashboard presented to a user. The value 4107 (e.g., 1.41) produced by the search query defining the Request Response Time KPI can be the average response time using the last 15 minutes of machine data associated with the entities providing the Web Hosting service from the time of the request.

Figure 44:
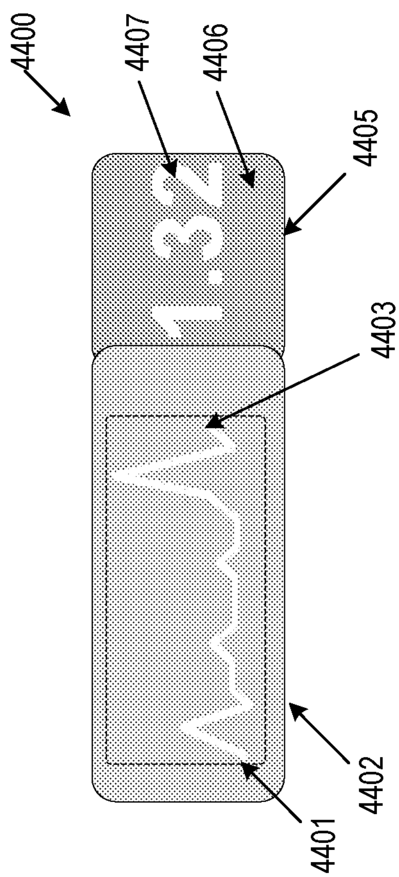

FIG. 44 illustrates spark line widget 4400, in accordance with one or more implementations of the present disclosure. Spark line widget 4400 can include two shapes (e.g., box 4405 and rectangular box 4402). One shape (e.g., box 4405) of the spark line widget 4400 can include a value 4407, which is described in greater detail below. The shape (e.g., box 4405) can be colored using a color 4406 representative of the state (e.g., normal, warning, critical) to which the value 4407 corresponds. The value 4407 can be also be colored using a nominal color or a color representative of the state to which the value 4407 corresponds. A user can provide input, via the dashboard-creation graphical interface, indicating whether to apply a nominal color or color representative of the state.

Another shape (e.g., rectangular box 4402) in the spark line widget 4400 can include a graph 4401 (e.g., line graph), which is described in greater detail below, that includes multiple data points. The shape (e.g., rectangular box 4402) containing the graph 4401 can be colored using a color representative of the state (e.g., normal, warning, critical) of which a corresponding data point (e.g., latest data point) falls into. The graph 4401 can be colored using a color representative of the state (e.g., normal, warning, critical) of which a corresponding data point falls into. For example, the graph 4401 may be a line graph that transitions between green, yellow, red, depending on the value of a data point in the line graph. In one implementation, input (e.g., user input) can be received, via the service-monitoring dashboard, of a selection device hovering over a particular point in the line graph, and information (e.g., data value, time, and color) corresponding to the particular point in the line graph can be displayed in the service-monitoring dashboard, for example, in the spark line widget 4400. The spark line widget 4400 can display a label to describe the KPI and the metric unit used for the KPI.

Figure 45A:
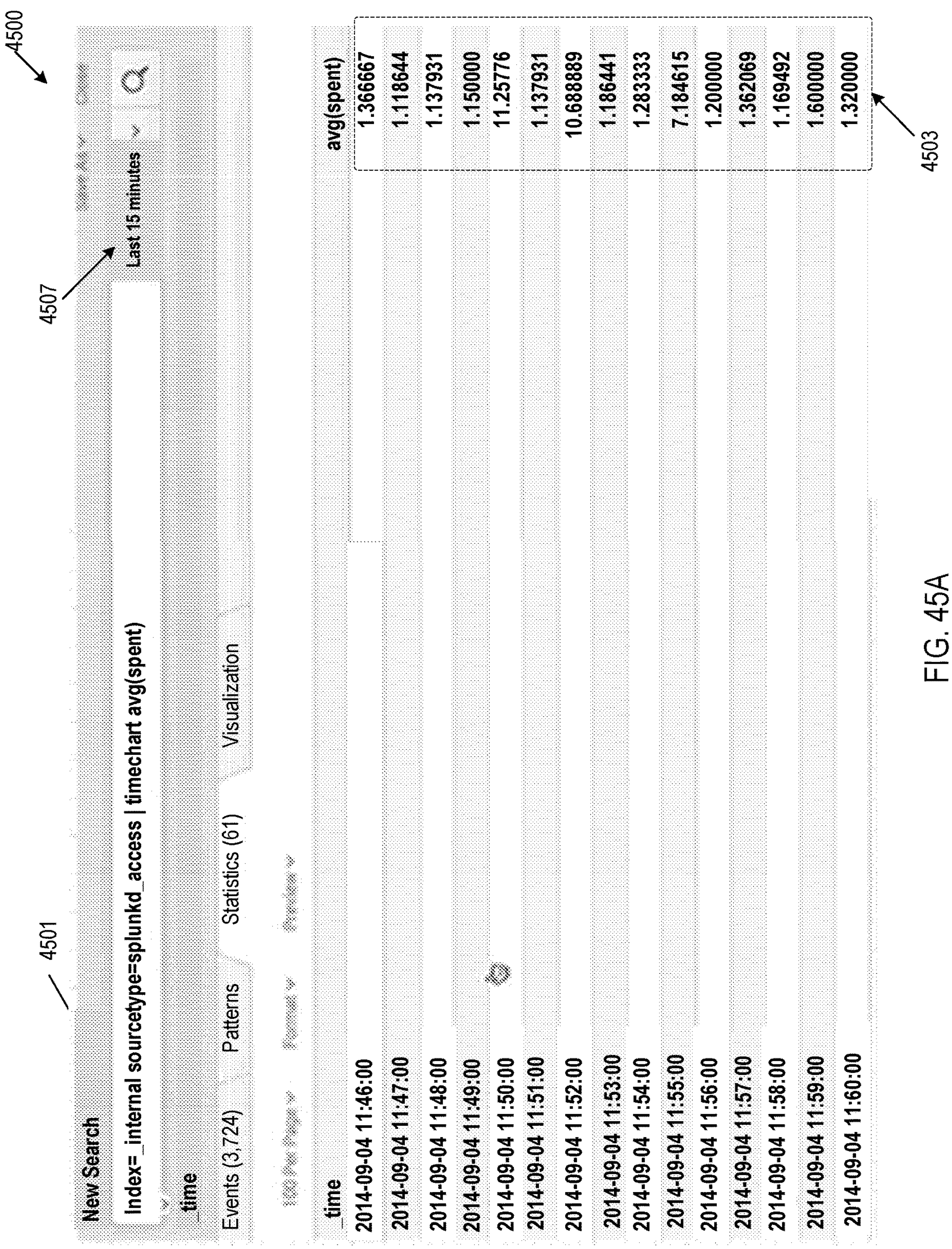

The spark line widget 4400 is showing data in a time series graph with the graph 4401, as compared to a single value widget (e.g., single value widget 4100) and a Noel gauge widget (e.g., Noel gauge widget 4000) that display a single data point, for example as illustrated in FIG. 42. The data points in the graph 4401 can represent what the values, produced by the search query defining the KPI, have been over a time range (e.g., time range selected in GUI 4300). FIG. 45A illustrates an example GUI 4500 illustrating a search query and search results for a spark line widget, in accordance with one or more implementations of the present disclosure. The KPI may be for Request Response Time. The KPI may be defined by a search query 4501 that produces multiple values, for example, to be used for a spark line widget. A user may have selected a time range of "Last 15 minutes" 4507 (e.g., time range selected in GUI 4300). The machine data used by the search query 4501 to produce the search results can be based on the last 15 minutes. For example, the search results can include a value for each minute in the last 15 minutes. The values 4503 in the search results can be used as data points to plot a graph (e.g., graph 4401 in FIG. 44) in the spark line widget. Referring to FIG. 44, the graph 4401 is from data over a period of time (e.g., Last 15 minutes). The graph 4401 is made of data points (e.g., 15 values 4503 in search results in FIG. 45A). Each data point is an aggregate from the data for a shorter period of time (e.g., unit of time). For example, if the time range "Last 15 minutes" is selected, each data point in the graph 4401 represents a unit of time in the last 15 minutes. For example, the unit of time may be one minute, and the graph contains 15 data points, one for each minute for the last 15 minutes. Each data point can be the average response time (e.g., avg(spent) in search query 4501 in FIG. 45A) for the corresponding minute. In another example, if the time range "Last 4 hours" is selected, and the unit of time used for the graph 4401 is 15 minutes, then the graph 4401 would be made from 16 data points.

In one implementation, the value 4407 in the other shape (e.g., box 4405) in the spark line widget 4400 represents the latest value in the time range. For example, the value 4407 (e.g., 1.32) can represent the last data point 4403 in the graph 4401. If the time range "Last 15 minutes" is selected, the value 4407 (e.g., 1.32) can represent the average response time of the data in that last minute of the 15 minute time range.

In another implementation, the value 4407 is the first data point in the graph 4401. In another implementation, the value 4407 represents an aggregate of the data in the graph 4401. For example, a statistical function can be performed on using the data points for the time range (e.g., Last 15 minutes) for the value 4407. For example, the value 4407 may be the average of all of the points in the graph 4401, the maximum value from all of the points in the graph 4401, the mean of all of the points in the graph 4401. Input (e.g., user input) can be received, for example, via the dashboard-creation graphical interface, specifying type (e.g. latest, first, average, maximum, mean) of value to be represented by value 4407.

Figure 45B:
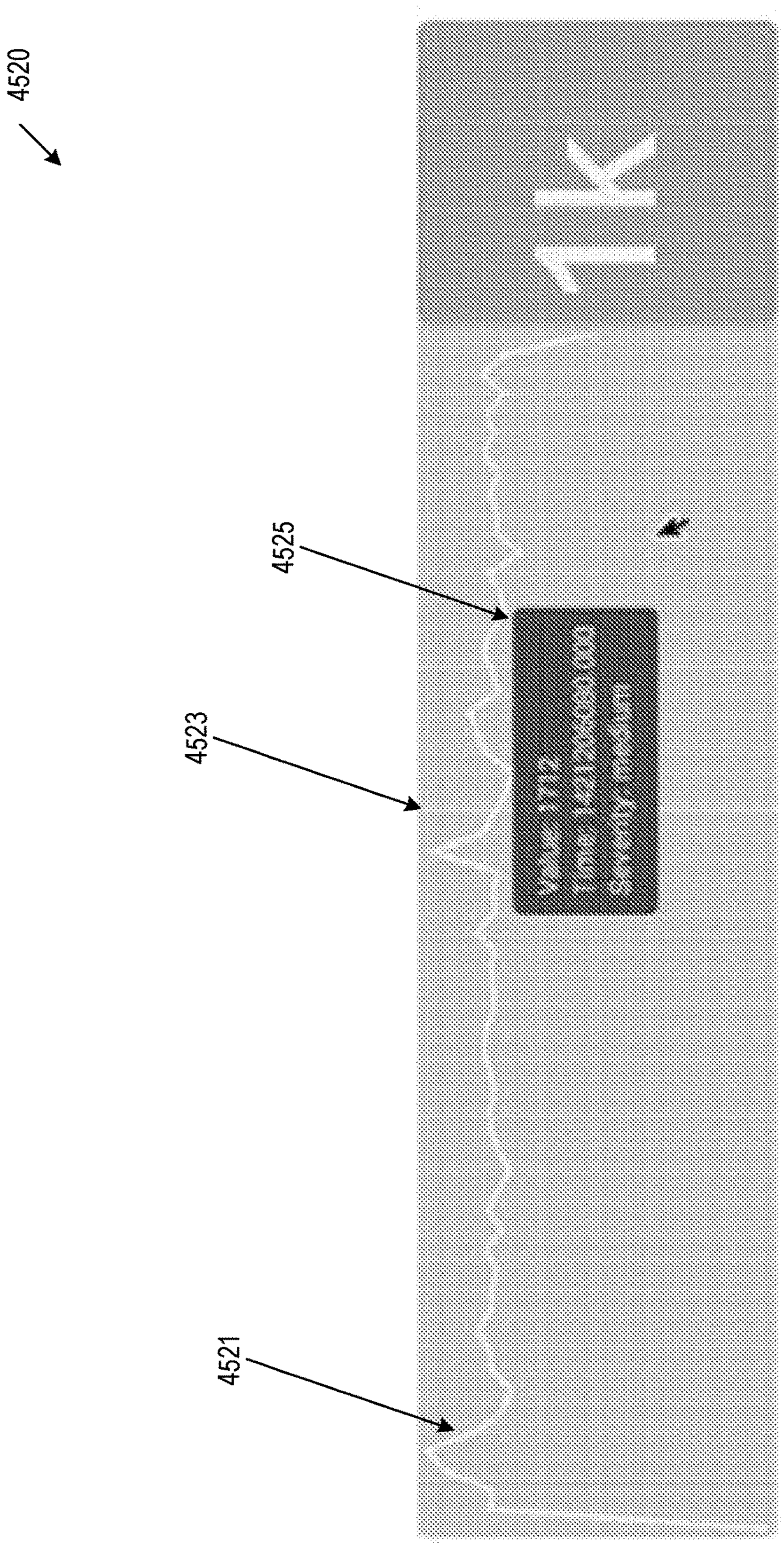

FIG. 45B illustrates spark line widget 4520, in accordance with one or more implementations of the present disclosure. Spark line widget 4520 can include a graph 4521 (e.g., line graph). The data points in the graph 4521 can represent what the values, produced by the search query defining the KPI, have been over a time range. The graph 4521 is from data over a period of time (e.g., Last 30 minutes). The graph 4521 is made of data points.

When a user hovers, for example, a point over a point in time in the graph 4521, data that corresponds to the point in time can be displayed in a box 4525. The data can include, for example, and is not limited to, a value, time, and a state corresponding to the KPI at that point in time. In one implementation, a line indicator 4523 is displayed that corresponds to the point in time.

FIG. 46A illustrates a trend indicator widget 4600, in accordance with one or more implementations of the present disclosure. Trend indicator widget 4600 can include a shape 4601 (e.g., rectangular box) that includes a value 4607, produced by the search query defining the KPI, in another shape 4601 (e.g., box) and an arrow 4605. The shape 4601 containing the value 4607 can be colored using a color 4603 representative of the state (e.g., normal, warning, critical) of which the value 4607 produced by the search query falls into. The value 4607 can be of a nominal color or can be of a color representative of the state for which the value produced by the search query falls into. A user can provide input, via the dashboard-creation graphical interface, indicating whether to apply a nominal color or color representative of the state. The trend indicator widget 4600 can display a label to describe the KPI and the metric unit used for the KPI.

The arrow 4605 can indicate a trend pertaining to the KPI by pointing in a direction. For example, the arrow 4605 can point in a general up direction to indicate a positive or increasing trend, the arrow 4605 can point in a general down direction to indicate a negative or decreasing trend, or the arrow 4605 can point in a general horizontal direction to indicate no change in the KPI. The direction of the arrow 4605 in the trend indicator widget 4600 may change when a KPI is being updated, for example, in a service-monitoring dashboard, depending on the current trend at the time the KPI is being updated.

In one implementation, a color is assigned to each trend (e.g., increasing trend, decreasing trend). The arrow 4605 can be of a nominal color or can be of a color representative of the determined trend. A user can provide input, via the dashboard-creation graphical interface, indicating whether to apply a nominal color or color representative of the trend. The shape 4607 can be of a nominal color or can be of a color representative of the determined trend. A user can provide input, via the dashboard-creation graphical interface, indicating whether to apply a nominal color or color representative of the trend.

In one implementation, the trend represented by the arrow 4605 is of whether the value 4607 has been increasing or decreasing in a selected time range relative to the last time the KPI was calculated. For example, if the time range "Last 15 minutes" is selected, the average of the data points of the last 15 minutes is calculated, and the arrow 4605 can indicate whether the average of the data points of the last 15 minutes is greater that than the average calculated from the time range (e.g., 15 minutes) prior. In one implementation, the trend indicator widget 4600 includes a percentage indicator indicating a percentage of the value 4607 increasing or decreasing in a selected time range relative to the last time the KPI was calculated.

In another implementation, the arrow 4605 indicates whether the last value for the last data point in the last 15 minutes is greater than the value immediately before the last data point.

The machine data used by the search query to produce the value 4607 is based on a time range (e.g., user selected time range). For example, the KPI may be fore Request Response Time for a Web Hosting service. The time range "Last 15 minutes" may be selected for the service-monitoring dashboard presented to a user. The value 4607 (e.g., 1.41) produced by the search query defining the Request Response Time KPI can be the average response time using the last 15 minutes of machine data associated with the entities providing the Web Hosting service from the time of the request.

As discussed above, once the dashboard template is defined, it can be saved, and then used to generate a service-monitoring dashboard for display. The dashboard template can identify the KPIs selected for the service-monitoring dashboard, KPI widgets to be displayed for the KPIs in the service-monitoring dashboard, locations in the service-monitoring dashboard for displaying the KPI widgets, visual characteristics of the KPI widgets, and other information (e.g., the background image for the service-monitoring dashboard, an initial time range for the service-monitoring dashboard).

FIG. 46B illustrates an example GUI 4610 for creating and/or editing a service-monitoring dashboard, in accordance with one or more implementations of the present disclosure. GUI 4610 can present a list 4612 of existing service-monitoring dashboards that have already been created. The list 4612 can represent service-monitoring dashboards that have data that is stored in a data store for displaying the service-monitoring dashboards. In one implementation, the list 4612 includes one or more default service-monitoring dashboards that can be edited.

Each service-monitoring dashboard in the list 4612 can include a title 4611. In one implementation, the title 4611 is a link, which when selected, can display the particular service-monitoring dashboard in a GUI in view mode, as described in greater detail below.

Each service-monitoring dashboard in the list 4612 can include a button 4613, which when selected, can present a list of actions, which can be taken on a particular service-monitoring dashboard, from which a user can select from The actions can include, and are not limited to, editing a service-monitoring dashboard, editing a title and/or description for a service-monitoring dashboard, editing permissions for a service-monitoring dashboard, cloning a service-monitoring dashboard, and deleting a service-monitoring dashboard. When an action is selected, one or more additional GUIs can be displayed for facilitating user input pertaining to the action, as described in greater detail below. For example, button 4613 can be selected, and an editing action can be selected to display a GUI (e.g., GUI 4620 in FIG. 46C described below) for editing the "Web Arch" service-monitoring dashboard.

GUI 4610 can display application information 4615 for each service-monitoring dashboard in the list 4612. The application information 4615 can indicate an application that is used for creating and/or editing the particular service-monitoring dashboard. GUI 4610 can display owner information 4614 for each service-monitoring dashboard in the list 4612. The owner information 4614 can indicate a role that is assigned to the owner of the particular service-monitoring dashboard.

GUI 4610 can display permission information 4616 for each service-monitoring dashboard in the list 4612. The permission information can indicate a permission level (e.g., application level, private level). An application level permission level allows any user that is authorized to access to the service-monitoring dashboard creation and/or editing GUIs permission to access and edit the particular service-monitoring dashboard. A private level permission level allows a single user (e.g., owner, creator) permission to access and edit the particular service-monitoring dashboard. In one implementation, a permission level include permissions by role. In one implementation, one or more specific users can be specified for one or more particular levels.

GUI 4610 can include a button 4617, which when selected can display GUI 4618 in FIG. 46BA for specifying information for a new service-monitoring dashboard.

FIG. 46BA illustrates an example GUI 4618 for specifying information for a new service-monitoring dashboard, in accordance with one or more implementations of the present disclosure. GUI 4618 can include a text box 4619A enabling a user to specify a title for the service-monitoring dashboard, a text box 4619B enabling a user to specify a description for the service-monitoring dashboard, and buttons 4916C enabling a user to specify permissions for the service-monitoring dashboard.

FIG. 46C illustrates an example GUI 4620 for editing a service-monitoring dashboard, in accordance with one or more implementations of the present disclosure. GUI 4620 is displaying the service-monitoring dashboard in an edit mode that enables a user to edit the service-monitoring dashboard via a KPI-selection interface 4632, a modifiable dashboard template 4360, a configuration interface 4631, and a customization toolbar 4633.

The current configuration for the "Web Arch" service-monitoring dashboard that is stored in a data store can be used to populate the modifiable dashboard template 4630. One or more widgets that have been selected for one or more KPIs can be displayed in the modifiable dashboard template 4630.

A KPI that is being represented by a widget in the modifiable dashboard template 4630 can be a service-related KPI or an adhoc KPI. A service-related KPI is a KPI that is related to one or more services and/or one or more entities. A service-related KPI can be defined using service monitoring GUIs, as described in above in conjunction with FIGS. 21-33A. An ad-hoc KPI is a key performance indicator that is not related to any service or entity. For example, service-related KPI named "Web performance" is represented by Noel gauge widget 4634. The Web performance can be a KPI that is related to "Splunk Service" 4635.

The configuration interface 4631 can display data that pertains to a KPI (e.g., service-related KPI, adhoc KPI) that is selected in the modifiable dashboard template 4630. For example, an adhoc KPI can be defined via GUI 4620. For example, an adhoc search button 4621 can be activated and a location (e.g., location 4629) can be selected in the modifiable dashboard template 4630. A widget 4628 for the adhoc KPI can be displayed at the selected location 4629. In one implementation, a default widget (e.g., single value widget) is displayed for the adhoc KPI.

The configuration interface 4631 can display data that pertains to the adhoc KPI. For example, configuration interface 4631 can display source information for the adhoc KPI. The source information can indicate whether the adhoc KPI is derived from an adhoc search or data model. An adhoc KPI can be defined by a search query. The search query can be derived from a data model or an adhoc search query. An adhoc search query is a user-defined search query.

In one implementation, when the adhoc search button 4621 is activated for creating an adhoc KPI, the adhoc KPI is derived from an adhoc search query by default, and the adhoc type button 4624 is displayed as enabled. The adhoc type button 4624 can also be user-selected to indicate that the adhoc KPI is to be derived from an adhoc search query.

When the adhoc type button 4624 is enabled, a text box 4626 can be displayed for the search language defining the adhoc search query. In one implementation, the text box 4626 is populated with the search language for a default adhoc search query. In one implementation, the default adhoc search query is a count of events, and the search language "index=_internal 1 timechart count is displayed in the text box 4626. A user can edit the search language via the text box 4626 to change the adhoc search query.

When the data model type button 4625 is selected, the configuration interface 4631 can display an interface for using a data model to define the adhoc KPI is displayed. FIG. 46D illustrates an example interface 4640 for using a data model to define an adhoc KPI, in accordance with one or more implementations of the present disclosure. If button 4641 is selected, a GUI is displayed that enables a user to specify a data model, an object of the data model, and a field of the object for defining the adhoc KPI. If button 4643 is selected, a GUI is displayed that enables a user to select a statistical function (e.g., count, distinct count) to calculate a statistic using the value(s) from the field.

Referring to FIG. 46C, one or more types of KPI widgets can support the configuration of thresholds for the adhoc KPI. For example, a Noel gauge widget, a spark line widget, and a trend indicator widget (also referred to as a "single value delta widget" throughout this document) can support setting one or more thresholds for the adhoc KPI. For example, if the Noel gauge button 4627 is activated, the configuration interface 4631 can display an interface for setting one or more thresholds for the adhoc KPI.

FIG. 46E illustrates an example interface 4645 for setting one or more thresholds for the adhoc KPI, in accordance with one or more implementations of the present disclosure. The configuration interface 4645 can include a button 4647, which when selected, displays a GUI (e.g., GUI 3100 in FIG. 31A, GUI 3150 in FIG. 31B) for setting one or more thresholds for the adhoc KPI. If the update button 4648 is activate, the widget for the adhoc KPI can be updated, as described below.

Referring to FIG. 46C, if the update button (e.g., update button 4648 in FIG. 46E) is activated, the widget 4628 can be updated to display a Noel gauge widget. If the adhoc KPI is being defined using a data model, the configuration interface 4631 can display the user selected settings for the adhoc KPI that have been specified, for example, using GUI 4640 in FIG. 46D.

Referring to FIG. 46C, if a service-related KPI widget is selected in the modifiable dashboard template 4630, the configuration interface 4631 can display information pertaining to the service-related KPI. For example, the Noel gauge widget 4634 can be selected, and the configuration interface 4631 can display information pertaining to the "Web performance" KPI that is related to the Splunk Service 4635.

FIG. 46F illustrates an example interface 4650 for a service-related KPI, in accordance with one or more implementations of the present disclosure. The text box 4651 can display the search language for the search query used to define the service-related KPI. The text box 4651 can be disabled to indicate that the service-related KPI cannot be edited from the glass table.

Referring to FIG. 46C, if the run search link 4636 is activated, a search GUI that displays information (e.g., search language, search result set) for a KPI (e.g., service KPI, adhoc KPI) that is selected in the modifiable dashboard template 4630.

FIG. 46GA depicts an exemplary graphical user interface 4649A that can configure/override the selection behavior (e.g., click-in behavior) of a widget in the modifiable dashboard template 4630. For example, upon selecting one of the referenced widgets, the various menu items/elements of graphical user interface 4649 can be selected in order to define the type of visualization that is to be presented in response to the selection of a particular widget (e.g., glass tables, deep dives, dashboards, etc.). Additionally, FIG. 46GA depicts a graphical user interface 4649B that can configure/override the default behavior of a widget in the modifiable dashboard template 4630 such that a custom URL is to be selected/presented in response to selection of a particular widget.

FIG. 46GB illustrates exemplary GUI 4653 which may be another example of a modifiable dashboard template. As shown, GUI 4653 may include a portion 4654 that provides the features of GUI 4649A and 4649B and enables a user to reconfigure or otherwise override the default drill down behavior of a widget, such as a widget that depicts various aspects of a KPI and/or an aggregate KPI (e.g., health score) GUI 4653 includes various GUI elements such as KPI/health score widgets 4652A-CA-C which may pertain to one or more services. It should be understood that while by default, upon selecting (e.g., 'clicking on') a particular widget the GUI may navigate a deep dive GUI associated with the particular service (e.g., a visual interface that provides an in-depth look at KPI data that reflects how a service or entity is performing over a certain period of time, as described herein), as described herein a user can also be enabled to override or reconfigure such navigation (e.g., in favor of navigation to another interface, report, etc.). For example, the referenced GUI can be reconfigured to depict one or more other items, including but not limited to: another deep dive GUI, a dashboard (e.g., a GUI that incorporates one or more widgets, each of which, for example, provides a representation of one or more aspects, values, etc. associated with a KPI, as described herein) and/or any other URL (which can refer to one or more of the referenced GUI elements and/or others).

The described functionality can be advantageous for various users in various scenarios. For example, certain users may utilize a "glass table" (e.g., GUI 4653 as depicted in FIG. 46GB) in order to build/depict views of various KPIs at different levels of abstractions (e.g., for their organization). For example, a user may wish to monitor three services, each of which includes four KPIs (totaling 12 KPIs and three health scores). In the first glass table the user may wish to depict health scores that reflect a high level overview (which depicts an overall, general sense of health). In a scenario in which a health score on such a page may change (e.g., to yellow, orange, or red), upon selecting such a health score the next level down (by default) may simply present another glass table (which may, for example, depict a process layout for that particular service with the KPI widgets for that particular service clicked on), which is not necessarily of particular interest to the user at that time. Accordingly, as described herein, users can reconfigure/override such defaults, thereby enabling the creation of multi-layered glass tables and also enabling users to drill down to deep dives, dashboards and custom URLs upon selecting various GUI elements.

FIG. 46HA illustrates an example GUI 4655 for editing layers for items, in accordance with one or more implementations of the present disclosure. The modifiable dashboard template 4658 can include multiple layers. The layers are defined by the items (e.g., widget, line, text, image, shape, connector, etc.) in the modifiable dashboard template 4658. In one implementation, the ordering of the layers (e.g., front to back, and back to front) is based on the order for when the items are added to the modifiable dashboard template 4658. In one implementation, the most recent item that is added to the modifiable dashboard template 4658 corresponds to the most forward layer.

One or more items can be overlaid with each other. The layers that correspond to the overlaid items can form a stack of layers in the modifiable dashboard template 4658. For example, items 4656A-H form a stack of layers.

A current layer for an item can be relative to the other layers in the stack. The configuration interface 4659 can include layering buttons 4657A-D for changing the layer for an item that is selected in the modifiable dashboard template 4658. A layering button can change the layer order one layer at a time for an item. For example, there can be a "Bring Forward" button 4657C to bring a selected item one layer forward, and there can be a "Send Backward" button 4657D to send a selected item one layer backward. A layering button can change the layer order more than one layer at a time. For example, there can be a "Bring to Front" button 4657A to bring a selected item to the most forward layer, and there can be a "Send to Back" button 4657B to send a selected item to the most backward layer. For example, item 4656F can be selected and the "Send to Back" button 4657B can be activated. In response to activating the "Send to Back" button 4657B, the items 4656F can be displayed in the most backward layer in the stack. FIG. 46HB illustrates an example GUI 4660 for editing layers for items, in accordance with one or more implementations of the present disclosure. Item 4661 is displayed in the most backward layer in a stack defined by selected items.

FIG. 46I illustrates an example GUI 4665 for moving a group of items, in accordance with one or more implementations of the present disclosure. A group of items 4667 can be defined, for example, by multi-selecting multiple elements in modifiable dashboard template 4669. In one implementation, a shift-click command is used for selecting multiple elements that are to be treated as a group. The group of items 4667 can initially be in location 4666. The items can be moved as a group to location 4668.

GUI 4665 can include a panning button 4675, to enable panning mode for the modifiable dashboard template 4669. When panning mode is enabled, the items in the modifiable dashboard template 4669 can be moved within the modifiable dashboard template 4669 using a panning function. In one implementation, the modifiable dashboard template 4669 is processed as having an infinite size.

GUI 4665 can include an image button 4673, which when selected, can display a GUI for selecting one or more images to import into the modifiable dashboard template 4669. For example, image 4674 has been imported into the modifiable dashboard template 4669. When an image 4674 is selected in the modifiable dashboard template 4669, the image 4674 can be resized based on user interaction with the image. For example, a user can select an image, click a corner of the image and drag the image to resize the image.

The configuration interface 4670 can include a lock position button 4671 for locking one or more selected items in a position in the modifiable dashboard template 4669. In one implementation, when an auto-layout button 4672 is activated, an item that has a locked position is not affected by the auto-layout function.

When the auto-layout button 4672 is activated, the modifiable dashboard template 4669 automatically displays the unlocked widgets (e.g., service-related KPI widgets, adhoc KPI widgets) in a serial order in the modifiable dashboard template 4669. In one implementation, the order is based when the widgets were added to the modifiable dashboard template 4669. In one implementation, the order is based on the layers that correspond to the widgets. In one implementation, when a layer is changes for a widget, the order uses the current layer. In one implementation, the order is based on the last KPI state that is associated with the particular widget. In one implementation, the order is based on any combination of the above.

In one implementation, the modifiable dashboard template 4669 automatically displays one or more items (e.g., widget, line, text, image, shape, connector, etc.) in a serial order in the modifiable dashboard template 4669. In one implementation, the order is based when the items were added to the modifiable dashboard template 4669. In one implementation, the order is based on the layers that correspond to the items. In one implementation, when a layer is changes for an item, the order uses the current layer. In one implementation, the order is based on the type (e.g., widget, line, text, image, shape, connector, etc.) of item. In one implementation, the order is based on any combination of the above.

FIG. 46J illustrates an example GUI 46000 for connecting items, in accordance with one or more implementations of the present disclosure. GUI 46000 can include a connector button 46001. When the connector button 46001 has been activated, a user can select a first item 46005 and a second item 46007 to be connected. The modifiable dashboard template can display a connector 46003 in response to the user selection of the first item 46005 and second item 46007. In one implementation, the connector 46003 is an arrow connector by default.

The direction of the arrow can correspond to the selection of the first item 46005 and the second item 46007. The type of connector (e.g., single arrow, double arrow, and no arrow) and the direction of the connector can be edited based on user input received via the modifiable dashboard template 46009. In one implementation, when one of the connected items (e.g., first item 46005, second item 46007) is moved in the modifiable dashboard template 46009, the connector 46003 moves accordingly.

When a connector 46003 is selected, the configuration interface 46011 can display text boxes and/or lists for editing the connector. For example, the color, stroke width, stoke type (e.g., solid line, dashed line, etc.), and label of a connector 46003 can be edited via user input received via the text boxes and/or lists. For example, the configuration interface 46011 can display a list of colors which a user can select from and apply to the connector.

GUI 46000 can include buttons for adding shape(s) to the modifiable dashboard template 46009. For example, when button 46013 is activated, a rectangular type of shape can be added to the modifiable dashboard template 46009. When button 46015 is activated, an elliptical type of shape can be added to the modifiable dashboard template 46009. When a shape (e.g., square 46007) is selected, the configuration interface 46011 can display text boxes and/or lists for editing the shape. For example, the fill color, fill pattern, border color, border width, and border type (e.g., solid line, dashed line, double line, etc.) of a shape can be edited via user input received via the text boxes and/or lists.

GUI 46000 can include a button 46017 for adding line(s) to the modifiable dashboard template 46009. For example, when button 46017 is activated, a line 46019 can be added to the modifiable dashboard template 46009. When a line 46019 is selected, the configuration interface 46011 can display text boxes and/or lists for editing the line. For example, the fill color, fill pattern, border color, border width, and line type (e.g., solid line, dashed line, double line, etc.) of a line can be edited via user input received via the text boxes and/or lists.

FIG. 46K illustrates a block diagram 46030 of an example for editing a line using the modifiable dashboard template, in accordance with one or more implementations of the present disclosure. A line 46031A can be displayed in the modifiable dashboard template (e.g., modifiable dashboard template 46009 in FIG. 46J). The line 46031A can include one or more control points 46033, which each can be selected and moved to create one or more vertices in the line 46031A. For example, control point 46033 in line 46031A can be dragged to location 46306 to create a vertex, as shown in line 46031B. In another example, control point 46035 in line 46031B can be dragged to location 46307 to create another vertex, as shown in line 46031C. In one implementation, a connector that is displayed in the modifiable dashboard template can include one or more control points, which each can be selected and moved to create one or more vertices in the connector.

FIG. 47A is a flow diagram of an implementation of a method 4750 for creating and causing for display a service-monitoring dashboard, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, the method is performed by the client computing machine. In another implementation, the method is performed by a server computing machine coupled to the client computing machine over one or more networks.

At block 4751, the computing machine identifies one or more key performance indicators (KPIs) for one or more services to be monitored via a service-monitoring dashboard. A service can be provided by one or more entities. Each entity can be associated with machine data. The machine data can include unstructured data, log data, and/or wire data. The machine data associated with an entity can include data collected from an API for software that monitors that entity.

A KPI can be defined by a search query that derives one or more values from machine data associated with the one or more entities that provide the service. Each KPI can be defined by a search query that is either entered by a user or generated through a graphical interface. In one implementation, the computing machine accesses a dashboard template that is stored in a data store that includes information identifying the KPIs to be displayed in the service-monitoring dashboard. In one implementation, the dashboard template specifies a service definition that associates the service with the entities providing the service, specifies the KPIs of the service, and also specifies the search queries for the KPIs. As discussed above, the search query defining a KPI can derive one or more values for the KPI using a late-binding schema that it applies to machine data. In some implementations, the service definition identified by the dashboard template can also include information on pre-defined states for a KPI and various visual indicators that should be used to illustrate states of the KPI in the dashboard.

The computing machine can optionally receive input (e.g., user input) identifying one or more ad hoc searches to be monitored via the service-monitoring dashboard without selecting services or KPIs.

At block 4753, the computing machine identifies a time range. The time range can be a default time range or a time range specified in the dashboard template. The machine data can be represented as events. The time range can be used to indicate which events to use for the search queries for the identified KPIs.

At block 4755, for each KPI, the computing machine identifies a KPI widget style to represent the respective KPI. In one implementation, the computing machine accesses the dashboard template that includes information identifying the KPI widget style to use for each KPI. As discussed above, examples of KPI widget styles can include a Noel gauge widget style, a single value widget style, a spark line widget style, and a trend indicator widget style. The computing machine can also obtain, from the dashboard template, additional visual characteristics for each KPI widget, such as, the name of the widget, the metric unit of the KPI value, settings for using nominal colors or colors to represent states and/or trends, the type of value to be represented in KPI widget (e.g., the type of value to be represented by value 4407 in a spark line widget), etc.

The KPIs widget styles can display data differently for representing a respective KPI. The computing machine can produce a set of values and/or a value, depending on the KPI widget style for a respective KPI. If the KPI widget style represents the respective KPI using values for multiple points in time in the time range, method 4750 proceeds to block 4757. Alternatively, if the KPI widget style represents the respective KPI using a single value during the time range, method 4750 proceeds to block 4759.

At block 4759, if the KPI widget style represents the respective KPI using a single value, the computing machine causes a value to be produced from a set of machine data or events whose timestamps are within the time range. The value may be a statistic calculated based on one or more values extracted from a specific field in the set of machine data or events when the search query is executed. The statistic may be an average of the extracted values, a mean of the extracted values, a maximum of the extracted values, a last value of the extracted values, etc. A single value widget style, a Noel gauge widget style, and trend indicator widget style can represent a KPI using a single value.

The search query that defines a respective KPI may produce a single value which a KPI widget style can use. The computing machine can cause the search query to be executed to produce the value. The computing machine can send the search query to an event processing system. As discussed above, machine data can be represented as events. The machine data used to derive the one or more KPI values can be identifiable on a per entity basis by referencing entity definitions that are aggregated into a service definition corresponding to the service whose performance is reflected by the KPI.

The event processing system can access events with time stamps falling within the time period specified by the time range, identify which of those events should be used (e.g., from the one or more entity definitions in the service definition for the service whose performance is reflected by the KPI), produce the result (e.g., single value) using the identified events, and send the result to the computing machine. The computing machine can receive the result and store the result in a data store.

At block 4757, if the KPI widget style represents the respective KPI using a set of values, the computing machine causes a set of values for multiple points in time in the time range to be produced. A spark line widget style can represent a KPI using a set of values. Each value in the set of values can represent an aggregate of data in a unit of time in the time range. For example, if the time range is "Last 15 minutes", and the unit of time is one minute, then each value in the set of values is an aggregate of the data in one minute in the last 15 minutes.

If the search query that defines a respective KPI produces a single value instead of a set of multiple values as required by the KPI widget style (e.g., for the graph of the spark line widget), the computing machine can modify the search query to produce the set of values (e.g., for the graph of the spark line widget). The computing machine can cause the search query or modified search query to be executed to produce the set of values. The computing machine can send the search query or modified search query to an event processing system. The event processing system can access events with time stamps falling within the time period specified by the time range, identify which of those events should be used, produce the results (e.g., set of values) using the identified events, and send the results to the computing machine. The computing machine can store the results in a data store.

At block 4761, for each KPI, the computing machine generates the KPI widget using the KPI widget style and the value or set of values produced for the respective KPI. For example, if a KPI is being represented by a spark line widget style, the computing machine generates the spark line widget using a set of values produced for the KPI to populate the graph in the spark line widget. The computing machine also generates the value (e.g., value 4407 in spark line widget 4400 in FIG. 44) for the spark line widget based on the dashboard template. The dashboard template can store the selection of the type of value that is to be represented in a spark line widget. For example, the value may represent the first data point in the graph, the last data point the graph, an average of all of the points in the graph, the maximum value from all of the points in the graph, or the mean of all of the points in the graph.

In addition, in some implementations, the computing machine can obtain KPI state information (e.g., from the service definition) specifying KPI states, a range of values for each state, and a visual characteristic (e.g., color) associated with each state. The computing machine can then determine the current state of each KPI using the value or set of values produced for the respective KPI, and the state information of the respective KPI. Based on the current state of the KPI, a specific visual characteristic (e.g., color) can be used for displaying the KPI widget of the KPI, as discussed in more detail above.

At block 4763, the computing machine generates a service-monitoring dashboard with the KPI widgets for the KPIs using the dashboard template and the KPI values produced by the respective search queries. In one implementation, the computing machine accesses a dashboard template that is stored in a data store that includes information identifying the KPIs to be displayed in the service-monitoring dashboard. As discussed above, the dashboard template defines locations for placing the KPI widgets, and can also specify a background image over which the KPI widgets can be placed.

At block 4765, the computing machine causes display of the service-monitoring dashboard with the KPI widgets for the KPIs. Each KPI widget provides a numerical and/or graphical representation of one or more values for a corresponding KPI. Each KPI widget indicates how an aspect of the service is performing at one or more points in time. For example, each KPI widget can display a current KPI value, and indicate the current state of the KPI using a visual characteristic associated with the current state. In one implementation, the service-monitoring dashboard is displayed in a viewing/investigation mode based on a user selection to view the service-monitoring dashboard is displayed in the viewing/investigation mode.

At block 4767, the computing machine optionally receives a request for detailed information for one or more KPIs in the service-monitoring dashboard. The request can be received, for example, from a selection (e.g., user selection) of one or more KPI widgets in the service-monitoring dashboard.

At block 4759, the computing machine causes display of the detailed information for the one or more KPIs. In one implementation, the computing machine causes the display of a deep dive visual interface, which includes detailed information for the one or more KPIs. A deep dive visual interface is described in greater detail below in conjunction with FIG. 50A.

The service-monitoring dashboard may allow a user to change a time range. In response, the computing machine can send the search query and the new time range to an event processing system. The event processing system can access events with time stamps falling within the time period specified by the new time range, identify which of those events should be used, produce the result (e.g., one or more values) using the identified events, and send the result to the computing machine. The computing machine can then cause the service-monitoring dashboard to be updated with new values and modified visual representations of the KPI widgets.

FIG. 47B illustrates an example service-monitoring dashboard GUI 4700 that is displayed based on the dashboard template, in accordance with one or more implementations of the present disclosure. GUI 4700 includes a user selected background image 4702 and one or more KPI widgets for one or more services that are displayed over the background image 4702. GUI 4700 can include other elements, such as, and not limited to text, boxes, connections, and widgets for ad hoc searches. Each KPI widget provides a numerical or graphical representation of one or more values for a corresponding key performance indicator (KPI) indicating how an aspect of a respective service is performing at one or more points in time. For example, GUI 4700 includes a spark line widget 4718 which may be for an aspect of Service-B, and a Noel gauge widget 4708 which may be for another aspect of Service-B. In some implementations, the appearance of the widgets 4718 and 4708 (as well as other widgets in the GUI 4700) can reflect the current state of the respective KPI (e.g., based on color or other visual characteristic).

Each service is provided by one or more entities. Each entity is associated with machine data. The machine data can include for example, and is not limited to, unstructured data, log data, and wire data. The machine data that is associated with an entity can include data collected from an API for software that monitors that entity. The machine data used to derive the one or more values represented by a KPI is identifiable on a per entity basis by referencing entity definitions that are aggregated into a service definition corresponding to the service whose performance is reflected by the KPI.

Each KPI is defined by a search query that derives the one or more values represented by the corresponding KPI widget from the machine data associated with the one or more entities that provide the service whose performance is reflected by the KPI. The search query for a KPI can derive the one or more values for the KPI it defines using a late-binding schema that it applies to machine data.

In one implementation, the GUI 4700 includes one or more search result widgets (e.g., widget 4712) displaying a value produced by a respective search query, as specified by the dashboard template. For example, widget 4712 may represent the results of a search query producing a stats count for a particular entity.

In one implementation, GUI 4700 facilitates user input for displaying detailed information for one or more KPIs. A user can select one or more KPI widgets to request detailed information for the KPIs represented by the selected KPI widgets. The detailed information for each selected KPI can include values for points in time during the period of time. The detailed information can be displayed via one or more deep dive visual interfaces. A deep dive visual interface is described in greater detail below in conjunction with FIG. 50A.

Referring to FIG. 47B, GUI 4700 facilitates user input for changing a time range. The machine data used by a search query to produce a value for a KPI is based on a time range. As described above in conjunction with FIG. 43A, the time range can be a user-defined time range. For example, if the time range "Last 15 minutes" is selected, the last 15 minutes would be an aggregation period for producing the value. GUI 4700 can be updated with one or more KPI widgets that each represent one or more values for a corresponding KPI indicating how a service provided is performing at one or more points in time based on the change to the time range.

FIG. 47C illustrates an example service-monitoring dashboard GUI 4750 that is displayed in view mode based on the dashboard template, in accordance with one or more implementations of the present disclosure. In one implementation, when a service-monitoring dashboard is in view mode, the service-monitoring dashboard cannot be edited. GUI 4750 can include a button 4755, which when selected, can display a dashboard creation GUI (e.g., GUI 4620 in FIG. 46C) for editing a service-monitoring dashboard.

GUI 4750 can display the items 4751 (e.g., service-related KPI widgets, adhoc KPI widgets, images, connectors, text, shapes, line etc.) as specified using the KPI-selection interface, modifiable dashboard template, configuration interface, and customization tool bar.

In one implementation, one or more widgets (e.g., service-related KPI widgets, adhoc KPI widgets) that are presented in view mode can be selected by a user to display one or more GUIs presenting more detailed information, for example, in a deep dive visualization, as described in greater detail below.

For example, a service-related KPI widget for a particular KPI can be displayed in view mode. When the service-related KPI widget is selected, a deep dive visualization can be displayed that presents data pertaining to the service-related KPI. The service-related KPI is related to a particular service and one or more other services based on dependency. The data that is presented in the deep dive visualization can include data for all of the KPIs that are related to the particular service and/or all of the KPIs from one or more dependent services.

When an adhoc KPI widget is displayed in view mode, and is selected, a deep dive visualization can be displayed that presents data pertaining to the adhoc search for the adhoc KPI.

GUI 4750 can include a button 4753 for displaying an interface (e.g., interface 4312 in FIG. 43B) for specifying an end date and time for a time range to use when executing a search query defining a KPI displayed in GUI 4750.

FIG. 48 describes an example home page GUI 4800 for service-level monitoring, in accordance with one or more implementations of the present disclosure. GUI 4800 can include one or more tiles each representing a service-monitoring dashboard. The GUI 4800 can also include one or more tiles representing a service-related alarm, or the value of a particular KPI. In one implementation, a tile is a thumbnail image of a service-monitoring dashboard. When a service-monitoring dashboard is created, a tile representing the service-monitoring dashboard can be displayed in the GUI 4800. GUI 4800 can facilitate user input for selecting to view a service-monitoring dashboard. For example, a user may select a dashboard tile 4805, and GUI 4700 in FIG. 47 can be displayed in response to the selection. GUI 4800 can include tiles representing the most recently accessed dashboards, and user selected favorites of dashboards.

FIG. 49A describes an example home page GUI 4900 for service-level monitoring, in accordance with one or more implementations of the present disclosure. GUI 4900 can include one or more tiles representing a deep dive. In one implementation, a tile is a thumbnail image of a deep dive. When a deep dive is created, a tile representing the deep dive can be displayed in the GUI 4900. GUI 4900 can facilitate user input for selecting to view a deep dive. For example, a user may select a deep dive tile 4907, and the visual interface 5300 in FIG. 55 can be displayed in response to the selection. GUI 4900 can include tiles representing the most recently accessed deep dives, and user selected favorites of deep dives.

Home Page Interface

FIG. 49B is a flow diagram of an implementation of a method for creating a home page GUI for service-level and KPI-level monitoring, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, the method 4910 is performed by a client computing machine. In another implementation, the method 4910 is performed by a server computing machine coupled to the client computing machine over one or more networks.

At block 4911, the computing machine receives a request to display a service-monitoring page (also referred to herein as a "service-monitoring home page" or simply as a "home page"). In one implementation, the service monitoring page includes visual representations of the health of a system that can be easily viewed by a user (e.g., a system administrator) with a quick glance. The system may include one or more services. The performance of each service can be monitored using an aggregate KPI characterizing the respective service as a whole. In addition, various aspects (e.g., CPU usage, memory usage, response time, etc.) of a particular service can be monitored using respective aspect KPIs typifying performance of individual aspects of the service. For example, a service may have 10 separate aspect KPIs, each monitoring a various aspect of the service.

As discussed above, each KPI is associated with a service provided by one or more entities, and each KPI is defined by a search query that produces a value derived from machine data pertaining to the one or more entities. A value of each aggregate KPI indicates how the service in whole is performing at a point in time or during a period of time. A value of each aspect KPI indicates how the service in part (with respect to a certain aspect of the service) is performing at a point in time or during a period of time.

At block 4912, the computing machine can determine data associated with one or more aggregate KPI definitions and one or more aspect KPI definitions, useful for creating the home page GUI. In an implementation, determining the data can include referencing service definitions in a data store, and/or referencing KPI definitions is a data store, and/or referencing stored KPI values, and/or executing search queries to produce KPI values. In an implementation, determining the data can include determining KPI-related information for each of a set of aggregate KPI definitions and for each of a set of aspect KPI definitions. The KPI-related information for each aggregate or aspect KPI definition may include a KPI state. At block 4912, the computing machine may determine an order for both the set of aggregate KPI definitions and the set of aspect KPI definitions. (Information related to the KPI definition may vicariously represent the KPI definition in the ordering process such that if the information related to the KPI definition is ordered with respect to the information related to other KPI definitions, the KPI definition is considered equivalently ordered by implication.) Many criteria are possible on which to base the ordering of a set of KPI definitions including, for example, the most recently produced KPI value or the most recently indicated KPI state.

At block 4913, the computing machine causes display of the requested service-monitoring page having a services summary region and a services aspects region. The service summary region contains an ordered plurality of interactive summary tiles. In one implementation, each summary tile corresponds to a respective service and provides a character or graphical representation of at least one value for an aggregate KPI characterizing the respective service as a whole. The services aspects region contains an ordered plurality of interactive aspect tiles. In one implementation, each aspect tile corresponds to a respective aspect KPI and provides a character or graphical representation of one or more values for the respective aspect KPI. Each aspect KPI may have an associated service and may typify performance for an aspect of the associated service.

The requested service-monitoring page may also include a notable events region presenting an indication of one or more correlation searches that generate the highest number of notable events in a given period of time. In one implementation, the notable events region includes the indication of each correlation search, a value representing the number of notable events generated in response to execution of each correlation search, and a graphical representation of the number of notable events generated over the given period of time.

In one implementation, the computing machine is a client device that causes display of the requested service-monitoring page by receiving a service monitoring web page or a service monitoring UI document from a server and rendering the service monitoring web page using a web browser on the client device or rendering the service monitoring UI document using a mobile application (app) on the client device. Alternatively, the computing machine is a server computer that causes display of the requested service-monitoring page by creating a service monitoring web page or a service monitoring UI document, and providing it to a client device for display via a web browser or a mobile application (app) on the client device.

In one implementation, creating a service monitoring web page or a service monitoring UI document includes determining the current and past values of the aggregate and aspect KPIs, determining the states of the aggregate and aspect KPIs, and identifying the most critical aggregate and aspect KPIs. In one implementation, various aspects (e.g., CPU usage, memory usage, response time, etc.) of a particular service can be monitored using a search query defined for an aspect KPI which is executed against raw machine data from entities that make up the service. The values from the raw machine data that are returned as a result of the defined search query represent the values of the aspect KPI. An aggregate KPI can be configured and calculated for a service to represent an overall summary of a service. (The overall summary of a service, in an embodiment, may convey the health of the service, i.e., its sufficiency for meeting, or satisfaction of, operational objectives.) In one example, a service may have multiple separate aspect KPIs. The separate aspect KPIs for a service can be combined (e.g., averaged, weighted averaged, etc.) to create an aggregate KPI whose value is representative of the overall performance of the service. In one implementation, various thresholds can be defined for either aggregate KPIs or aspect KPIs. The defined thresholds correspond to ranges of values that represent the various states of the service. The values of the aggregate KPIs and/or aspect KPIs can be compared to the corresponding thresholds to determine the state of the aggregate or aspect KPI. The various states have an ordered severity that can be used to determine which KPIs should be displayed in service-monitoring page. In one implementation, the states include "critical," "high," "medium," "normal," and "low," in order from most severe to least severe. In one implementation, some number of aggregate and aspect KPIs that have the highest severity level according to their determined state may be displayed in the corresponding region of the service-monitoring page. Additional details of thresholding, state determination and severity are described above with respect to FIGS. 31A-G.

At block 4914, the computing machine performs monitoring related to the homepage. Such monitoring may include receiving notification of an operating system event such as a timer pop, or receiving notification of a GUI event such as a user input. Blocks 4915 through 4917 each signify a determination as to whether a particular monitored event has occurred and the processing that should result if it has. In one embodiment, each of blocks 4915-4917 may be associated with the execution of an event handler. At block 4915, a determination is made whether notification has been received indicating that dynamic update or refresh of the homepage should occur. The notification may ensue from a user clicking a refresh button of the GUI, or from the expiration of a refresh interval timer established for the homepage, for example. If so, processing returns to block 4912 in one embodiment. At block 4916, a determination is made whether notification has been received indicating that a display mode for the homepage should be changed. The notification may ensue from a user clicking a display mode button of the GUI, such as one selecting a network operations center display mode over a standard display mode, for example. If so, processing returns to block 4913 where the homepage is caused to be displayed in accordance, presumably, with the user input. At block 4917, a determination is made whether notification has been received indicating some other user interaction or input. If so, processing proceeds to block 4918 where an appropriate response to the user input is executed.

FIG. 49C illustrates an example of a service-monitoring page 4920, in accordance with one or more implementations of the present disclosure. In one implementation, service-monitoring page 4920 includes services summary region 4921 and services aspects region 4924. Each of services summary region 4921 and services aspects region 4924 present dynamic visual representations including character and/or graphical indications of the states of various components in the system, including respective services in the system, as shown in services summary region 4921, and individual aspect KPIs associated with one or more of the services, as shown in services aspects region 4924. The information provided on service-monitoring page 4920 may be dynamically updated over time, so as to provide the user with the most recent available information. In one implementation, the visual representations on service-monitoring page 4920 are updated each time the underlying aggregate KPIs and aspect KPIs are recalculated according to the defined schedule in the corresponding KPI definition. In another implementation, the visual representations can be automatically updated in response to a specific user request, when the aggregate KPIs and aspect KPIs can be recalculated outside of their normal schedules specifically for the purpose of updating service-monitoring page 4920. In yet another implementation, the visual representations can be static such that they do not change once initially displayed. The aggregate KPIs and aspect KPIs can be determined in response to the initial user request to view the service-monitoring page 4920, and then displayed and refreshed at predefined time intervals or in real time once new values are calculated based on KPI monitoring parameters discussed above. Alternatively, the aggregate KPIs and aspect KPIs can be displayed, but not updated until a subsequent request to view the service-monitoring page 4920 is received.

In one implementation, the visual representations in services summary region 4921 contain an ordered plurality of interactive summary tiles 4922. Each of interactive summary tiles 4922 corresponds to a respective service in the system (e.g., Activesync, Outlook, Outlook RPC) and provides a character or graphical representation of at least one value for an aggregate KPI characterizing the respective service as a whole. In one implementation, each of interactive summary tiles 4922 includes an indication of the corresponding service (i.e., the name or other identifier of the service), a numerical value indicating the aggregate KPI, and a sparkline indicating how the value of the aggregate KPI has changed over time. In one implementation, each of interactive summary tiles 4922 has a background color indicative of the state of the service. The state of the service may be determined by comparing the aggregate KPI of the service to one or more defined thresholds, as described above. In addition, each of interactive summary tiles 4922 may include a numerical value representing the state of the aggregate KPI characterizing the service and/or a textual indication of the state of the aggregate KPI (e.g., the name of the current state). In one implementation, only a certain number of interactive summary tiles 4922 may be displayed in services summary region 4921 at one time. For example, some number (e.g., 15, 20, etc.) of the most critical services, as measured by the severity of the states of their aggregate KPIs, may be displayed. In another implementation, tiles for user selected services may be displayed (i.e., the most important services to the user). In one implementation, which services are displayed, as well as the number of services displayed may be configured by the user through menu element 4927.

The interactive summary tiles 4922 of service monitoring page 4920 are depicted as rectangular tiles arranged in an orthogonal array within a region, without appreciable interstices. Another implementation may include tiles that are not rectangular, or arranged in a pattern that is not an orthogonal array, or that has interstitial spaces (grout) between tiles, or some combination. Another implementation may include tiles having no background color such that a tile has no clearly visible delineated shape or boundary. Another implementation may include tiles of more than one size. These and other implementations are possible.

In one implementation, services summary region 4921 further includes a health bar gage 4923. The health bar gage 4923 may indicate distribution of aggregate KPIs of all services across each of the various states, rather than just the most critical services. The length of a portion of the health bar gage 4923, which is colored according to a specific KPI state, depends on the number of services with aggregate KPIs in that state. In addition, the health bar gage 4923 may have numeric indications of the number of services with KPIs in each state, as well as the total number of services in the system being monitored.

In one implementation, the visual representations in services aspects region 4924 contain an ordered plurality of interactive aspect tiles 4925. Each of interactive aspect tiles 4925 corresponds to a respective aspect KPI and provides a character or graphical representation of one or more values for the respective aspect KPI. Each aspect KPI may have an associated service and may typify performance for an aspect of the associated service. In one implementation, each of interactive aspect tiles 4925 includes an indication of the corresponding aspect KPI (i.e., the name or other identifier of the aspect KPI), an indication of the service with which the aspect KPI is associated, a numerical value indicating the current value of the aspect KPI, and a sparkline indicating how the value of the aspect KPI has changed over time. In one implementation, each of interactive aspect tiles 4925 has a background color indicative of the state of the aspect KPI. The state of the aspect KPI may be determined by comparing the aspect KPI to one or more defined thresholds, as described above. In addition, each of interactive aspect tiles 4925 may include a numerical value representing the state of the aspect KPI and/or a textual indication of the state of the aspect KPI (e.g., the name of the current state). In one implementation, only a certain number of interactive aspect tiles 4925 may be displayed in services aspects region 4924 at one time. For example, some number (e.g., 15, 20, etc.) of the most critical aspect KPIs, as measured by the severity of the states of the KPIs, may be displayed. In another implementation, tiles for user selected aspect KPIs may be displayed (i.e., the most important KPIs to the user). In one implementation, which aspect KPIs are displayed, as well as the number of aspect KPIs displayed may be configured by the user through menu element 4928.

In one implementation, services aspects region 4924 further includes an aspects bar gage 4926. The aspects bar gage 4926 may indicate the distribution of all aspect KPIs across each of the various states, rather than just the most critical KPIs. The length of a portion of the aspects bar gage 4926 that is colored according to a specific state depends on the number of aspect KPIs in that state. In addition, the aspects bar gage 4926 may have numeric indications of the number of aspect KPIs in each state, as well as the total number of aspect KPIs in the system being monitored.

The tiles of a region (e.g., 4922 of 4921, 4925 of 4924) each occupy an ordered position within the region. In one embodiment, the order of region tiles proceeds from left-to-right then top-to-bottom, with the first tile located in the leftmost, topmost position. In one embodiment, the order of region tiles proceeds from top-to-bottom then left-to-right. In one embodiment, the order of region tiles proceeds from right-to-left then top-to-bottom. In one embodiment, different regions may have different ordering arrangements. Other ordering is possible. A direct use of the ordered positions of tiles within a region is for making the association between a particular KPI definition and the particular tile for displaying information related to it. For example, a set of aspect KPI definitions with a determined order such as discussed in relation to block 4912 of FIG. 49B can be mapped in order to the successively ordered tiles (4925) of an aspects region (4924).

In one embodiment service-monitoring page 4920 includes a display mode selection GUI element 4929 enabling a user to indicate a selection of a display mode. In one embodiment, display mode selection element 4929 enables the user to select between a network operations center (NOC) display mode and a home display mode. In one embodiment, tiles displaying KPI-related information while in NOC mode are larger (occupy more relative display area) than corresponding tiles displayed while in home mode. In an embodiment, display area is acquired to accommodate the larger tiles by a combination of one or more of reducing the total tile count, reducing or eliminating interstitial space between tiles or between displayed elements of the GUI, generally, reducing or eliminating GUI elements (such as any auxiliary regions area), or other methods. The transformation of the GUI display from home to NOC mode changes the size of tiles relative to one or more other GUI elements and, so, is not a simple zoom function applied to the service-monitoring page 4920. In one embodiment, an indicator within a tile displaying KPI-related information while in NOC mode is larger (occupies more relative display area) than the corresponding indicator displayed while in home mode. For example, a character-type indicator within a tile may display using a larger or bolder font while in NOC mode than while in home mode. In one embodiment, display area is acquired to accommodate the larger indicator by a combination of reducing or eliminating other indicators appearing within the tile. Embodiments with more than two display mode selection options, such as associated with GUI element 4929, are possible.

FIG. 49D illustrates an example of a service-monitoring page 4920 including a notable events region 4930, in accordance with one or more implementations of the present disclosure. Depending on the implementation, notable events region 4930 may be displayed adjacent to, beneath, above or between services summary region 4921 and services aspects region 4924. In another implementation, notable events region 4930 may be displayed on a different page or in a different interface than services summary region 4921 and services aspects region 4924. In one implementation, notable events region 4930 contains an indication (such as a list) of one or more correlation searches (also referred to herein as "rules") that generate the highest number of notable events in a given period of time. A notable event may be triggered by a correlation search associated with a service. As discussed above, a correlation search may include search criteria pertaining to one or more KPIs (e.g., an aggregate KPI or one or more aspect KPIs) of the service, and a triggering condition to be applied to data produced by a search query using the search criteria. A notable event is generated when the data produced by the search query satisfies the triggering condition. A correlation search may be pre-defined and provided by the system or may be newly created by an analyst or other user of the system. In one implementation, the correlation searches can be run continuously or at regular intervals (e.g., every hour) to generate notable events. Generated notable events can be stored in a dedicated "notable events index," which can be subsequently accessed to create various visualizations, including notable events region 4930 of service-monitoring page 4920.

In one implementation, the notable events region 4930 includes the indication (e.g., the name) of each correlation search 4931, a value representing the number of notable events generated in response to execution of each correlation search 4932, and a graphical representation (e.g., a sparkline) of the number of notable events generated over the given period of time 4933. In one implementation, the correlation searches shown in notable events region 4930 may be sorted according to the data in each of columns 4931, 4932, and 4933.

In one implementation, only a certain number of correlation searches may be displayed in notable events region 4930 at one time. For example, some number (e.g., 5, 10, etc.) of the correlation searches that generate the most notable events in a given period of time may be displayed. In another implementation, all correlation searches that generated a minimum number of notable events in a given period of time may be displayed. In one implementation, which correlation searches are displayed, as well as the number of correlation searches displayed may be configured by the user.

In an embodiment, notable events region 4930 may be replaced by, or supplemented with, one or more other information regions. For example, one embodiment of an other-information region may display most-recently-used items, such as most-recently-viewed service-monitoring dashboards, or most-recently-used deep dive displays. Each most-recently-used item may contain the item name or some other identifier for the item. Any notable event regions and other information regions in a GUI display may be collectively referred to as auxiliary regions. In one embodiment, items displayed in auxiliary regions support user interaction. User interaction may, for example, provide an indication to the computing machine of a user's desire to navigate to a GUI component related to the item with which the user interacted. For example, a user may click on a notable event name in the notable event region to navigate to a GUI displaying detailed information about the event. For example, a user may click on the name of a most-recently-viewed service-monitoring dashboard in an other-information region to navigate to the dashboard GUI. In one embodiment, auxiliary regions are displayed together in an auxiliary regions area. An auxiliary regions area may be located in a GUI display as described above for the notable events region 4930.

FIGS. 49E-F illustrate an example of a service-monitoring page 4920, in accordance with one or more implementations of the present disclosure. As shown in FIG. 49E, a particular tile 4940 of the plurality of interactive aspect tiles 4925 in services aspects region 4924 has been activated. The user may activate tile 4940, for example, by hovering a cursor over the tile 4940 or tapping the tile 4940 on a touchscreen. Once the tile 4940 is activated, a selectable graphical element 4941, such as a check box, radio button, etc., may be displayed for the chosen tile 4940. Further user interaction with the selectable graphical element 4941, such as a mouse click or additional tap, may activate the selectable graphical element 4941 and cause the corresponding tile 4940 to be selected for further viewing. Upon selection of tile 4940, a similar selectable graphical element may be displayed for each of interactive aspects tiles 4925 in services aspects region 4924, as shown in FIG. 49F. In one implementation, additional white space may be displayed between each of interactive aspect tiles 4925. If the user desires, they may select one or more additional tiles by similarly interacting with the corresponding selectable graphical element of any of the other interactive aspect tiles 4925. In one implementation, the selected tiles may have the selectable graphical element highlighted, or otherwise emphasized, to indicate that the corresponding tile has been selected. In addition, the appearance (e.g., color, shading, etc.) of the selected titles may change to further emphasize that they have been selected.

In response to one or more of interactive aspect tiles 4925 being selected, menu elements 4942 and 4943 may be displayed in service-monitoring page 4920. Menu element 4942 may be used to cancel the selection of any interactive aspects tiles 4925 in services aspects region 4924. Activation of menu element 4942 may cause the selected tiles to be unselected and revert to the non-selected state as shown in FIG. 49C. Menu element 4943 may be used to view the selected aspect KPIs in a deep dive visual interface, which includes detailed information for the one or more selected aspect KPIs. The deep dive visual interface displays time-based graphical visualizations corresponding to the selected aspect KPIs to allow a user to visually correlate the aspect KPIs over a defined period of time. A deep dive visual interface is described in greater detail below in conjunction with FIG. 50A.

Example Deep Dive

Implementations of the present disclosure provide a GUI that provides in-depth information about multiple KPIs of the same service or different services. This GUI referred to herein as a deep dive displays time-based graphical visualizations corresponding to the multiple KPIs to allow a user to visually correlate the KPIs over a defined period of time.

FIG. 50A is a flow diagram of an implementation of a method for creating a visual interface displaying graphical visualizations of KPI values along time-based graph lanes, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, the method 5000 is performed by a client computing machine. In another implementation, the method 5000 is performed by a server computing machine coupled to the client computing machine over one or more networks.

At block 5001, the computing machine receives a selection of KPIs that each indicates a different aspect of how a service (e.g., a web hosting service, an email service, a database service) provided by one or more entities (e.g., host machines, virtual machines, switches, firewalls, routers, sensors, etc.) is performing. As discussed above, each of these entities produces machine data or has its operation reflected in machine data not produced by that entity (e.g., machine data collected from an API for software that monitors that entity while running on another entity). Each KPI is defined by a different search query that derives one or more values from the machine data pertaining to the entities providing the service. Each of the derived values is associated with a point in time and represents the aspect of how the service is performing at the associated point in time. In one implementation, the KPIs are selected by a user using GUIs described below in connection with FIGS. 51, 52 and 57-63.

At block 5003, the computing machine derives the value(s) for each of the selected KPIs from the machine data pertaining to the entities providing the service. In one implementation, the computing machine executes a search query of a respective KPI to derive the value(s) for that KPI from the machine data.

At block 5005, the computing machine causes display of a graphical visualization of the derived KPI values along a time-based graph lane for each of the selected KPIs. In one implementation, the graph lanes for the selected KPIs are parallel to each other and the graphical visualizations in the graph lanes are all calibrated to the same time scale. In one implementation, the graphical visualizations are displayed in the visual interfaces described below in connection with FIGS. 53-56 and 64A-70.

FIG. 50B is a flow diagram of an implementation of a method for generating a graphical visualization of KPI values along a time-based graph lane, in accordance with one or more implementations of the present disclosure.

At block 5011, the computing machine receives a request to create a graph for a KPI. Depending on the implementation, the request can be made by a user from service-monitoring dashboard GUI 4700 or from a GUI 5100 for creating a visual interface, as described below with respect to FIG. 51. At block 5013, the computing machine displays the available services that are being monitored, and at block 5015, receives a selection of one of the available services. At block 5017, the computing machine displays the KPIs associated with the selected service, and at block 5019, receives a selection of one of the associated KPIs. In one implementation, the KPIs are selected by a user using GUIs described below in connection with FIGS. 51, 52 and 57-63. At block 5021, the computing machine uses a service definition of the selected service to identify a search query corresponding to the selected KPI. At block 5023, the computing machine determines if there are more KPI graphs to create. If the user desires to create additional graphs, the method returns to block 5013 and repeats the operations of blocks 5013-5021 for each additional graph.

If there are no more KPI graphs to create, at block 5025, the computing machine identifies a time range. The time range can be defined based on a user input, which can include, e.g., identification of a relative time or absolute time, perhaps entered through user interface controls. The time range can include a portion (or all) of a time period, where the time period corresponds to one used to indicate which values of the KPI to retrieve from a data store. In one implementation, the time range is selected by a user using GUIs described below in connection with FIGS. 54 and 63. At block 5027, the computing device creates a time axis reflecting the identified time range. The time axis may run parallel to at least one graph lane in the create visual interface and may include an indication of the amount of time represented by a time scale for the visual interface (e.g., "Viewport: 1 h 1 m" indicating that the graphical visualizations in the graph lanes display KPI values for a time range of one hour and one minute).

At block 5029, the computing device executes the search query corresponding to each KPI and stores the resulting KPI dataset values for the selected time range. At block 5031, the computing device determines the maximum and minimum values of the KPI for the selected time range and at block 5033 creates a graph lane in the visual interface for each KPI using the maximum and minimum values as the height of the lane. In one implementation, a vertical scale for each lane may be automatically selected using the maximum and minimum KPI values during the current time range, such that the maximum value appears at or near the top of the lane and the minimum value appears at or near the bottom of the lane. The intermediate values between the maximum and minimum may be scaled accordingly.

At block 5035, the computing device creates a graphical visualization for each lane using the KPI values during the selected time period and selected visual characteristics. In one implementation, the KPI values are plotted over the time range in a time-based graph lane. The graphical visualization may be generated according to an identified graph type and graph color, as well as any other identified visual characteristics. At block 5037, the computing device calibrates the graphical visualizations to a same time scale, such that the graphical visualization in each lane of the visual interface represents KPI data over the same period of time.

Blocks 5025-5037 can be repeated for a new time range. Such repetition can occur, e.g., after detecting an input corresponding to an identification of a new time range. The generation of a new graphical visualization can include modification of an existing graphical visualization.

FIG. 51 illustrates an example GUI 5100 for creating a visual interface displaying graphical visualizations of KPI values along time-based graph lanes, in accordance with one or more implementations of the present disclosure. The GUI 5100 can receive user input for a number of input fields 5102, 5104 and selection of selection buttons 5106. For example, input field 5102 can receive a title for the visual interface being created. Input field 5104 may receive a description of the visual interface. The input to input fields 5102 and 5104 may be optional in one implementation, such that it is not absolutely required for creation of the visual interface. Input to fields 5102 and 5104 may be helpful, however, in identifying the visual interface once it is created. In one implementation, if a title is not received in input fields 5102 and 5104, the computing machine may assign a default title to the created visual interface. Selection buttons 5106 may receive input pertaining to an access permission for the visual interface being created. In one implementation, the user may select an access permission of either "Private," indicating that the visual interface being created will not be accessible to any other users of the system instead being reserved for private use by the user, or "Shared," indicating that once created, the visual interface will be accessible to other users of the system. Upon, the optional entering of title and description into fields 5102 and 5104 and the selection of an access permission using buttons 5106, the selection of button 5108 may initiate creation of the visual interface. In one implementation, in addition to "Private" or "Shared" there may be additional or intermediate levels of access permissions. For example, certain individuals or groups of individuals may be granted access or denied access to a given visual interface. There may be a role based access control system where individuals assigned to a certain role are granted access or denied access.

FIG. 52 illustrates an example GUI 5200 for adding a graphical visualization of KPI values along a time-based graph lane to a visual interface, in accordance with one or more implementations of the present disclosure. In one implementation, in response to the creation of a visual interface using GUI 5100, the system presents GUI 5200 in order to add graphical visualizations to the visual interface. The graphical visualizations correspond to KPIs and are displayed along a time-based graph lane in the visual interface.

In one example, GUI 5200 can receive user input for a number of input fields 5202, 5204, 5212, selections from drop down menus 5206, 5208, and/or selection of selection buttons 5210 or link 5214. For example, input field 5202 can receive a title for the graphical visualization being added. Input field 5204 may receive a subtitle or description of the graphical visualization. The input to input fields 5202 and 5204 may be optional in one implementation, such that it is not absolutely required for addition of the graphical visualization. Input to fields 5202 and 5204 may be helpful, however, in identifying the graphical visualization once it is added to the visual interface. In one implementation, if a title is not received in input fields 5202 or 5204, the computing machine may assign a default title to the graphical visualization being added.

Drop down menu 5206 can be used to receive a selection of a graph style, and drop down menu 5208 can be used to receive a selection of a graph color for the graphical visualization being added. Additional details with respect to selection of the graph style and the graph color for the graphical visualization are described below in connection with FIGS. 57 and 58.

Selection buttons 5210 may receive input pertaining to a search source for the graphical visualization being added. In one implementation, the user may select search source of "Ad Hoc," "Data Model" or "KPI." Additional details with respect to selection of the search source for the graphical visualization are described below in connection with FIGS. 57, 59 and 60. Input field 5212 may receive a user-input search query or display a search query associated with the selected search source 5210. Selection of link 5214 may indicate that the user wants to execute the search query in input field 5212. When a search query is executed, the search query can produce one or more values that satisfy the search criteria for the search query. Upon the entering of data and the selection menu items, the selection of button 5216 may initiate the addition of the graphical visualization to the visual interface.

FIG. 53 illustrates an example of a visual interface 5300 with time-based graph lanes for displaying graphical visualizations, in accordance with one or more implementations of the present disclosure. In one example, the visual interface 5300 includes three time-based graph lanes 5302, 5304, 5306. These graph lanes may correspond to the graphical visualizations of KPI values added to the visual interface using GUI 5200 as described above. Each of the graph lanes 5302, 5304, 5306 can display a graphical visualization for corresponding KPI values over a time range. Initially the lanes 5302, 5304, 5306 may not include the graphical visualizations until a time range is selected using drop down menu 5308. Additional details with respect to selection of the time range from drop down menu 5308 are described below in connection with FIG. 63. In another implementation, a default time range may be automatically selected and the graphical visualizations may be displayed in lanes 5302, 5304, 5306.

FIG. 54 illustrates an example of a visual interface 5300 displaying graphical visualizations of KPI values along time-based graph lanes, in accordance with one or more implementations of the present disclosure. In one implementation, each of the time-based graph lanes 5302, 5304, 5306 include a visual representation of corresponding KPI values. The visual representations in each lane may be of different graph styles and/or colors or have the same graph styles and/or colors. For example, lane 5302 includes a bar chart, lane 5304 includes a line graph and lane 5306 includes a bar chart. The graph type and graph color of the visual representation in each lane may be selected using GUI 5200, as described above. Depending on the implementation, the KPIs represented by the graphical visualizations may correspond to different services or may correspond to the same service. In one implementation, multiple of the KPIs may correspond to the same service, while one or more other KPIs may correspond to a different service.

The graphical visualizations in each lane 5302, 5304, 5306 can all be calibrated to the same time scale. That is, each graphical visualization corresponds to a different KPI reflecting how a service is performing over a given time range. The time range can be reflected by a time axis 5410 for the graphical visualizations that runs parallel to at least one graph lane. The time axis 5410 may include an indication of the amount of time represented by the time scale (e.g., "Viewport: 1 h 1 m" indicating that the graphical visualizations in graph lanes 5302, 5304, 5306 display KPI values for a time range of one hour and one minute), and an indication of the actual time of day represented by the time scale (e.g., "12:30, 12:45, 01 PM, 01:15"). In one implementation, a bar running parallel to the time lanes including the indication of the amount of time represented by the time scale (e.g., "Viewport: 1 h 1 m") is highlighted for an entire length of time axis 5410 to indicate that the current portion of the time range being viewed includes the entire time range. In other implementations, when only a subset of the time range is being viewed, the bar may be highlighted for a proportional subset of the length of time axis 5410 and only in a location along time axis 5410 corresponding to the subset. In one implementation, at least a portion of the time axis 5410 is displayed both above and below the graph lanes 5302, 5304, 5306. In one implementation, an indicator associated with drop down menu 5308 also indicates the selected time range (e.g., "Last 60 minutes") for the graphical visualizations.

In one implementation, when one of graph lanes 5302, 5304, 5306 is selected (e.g., by hovering the cursor over the lane), a grab handle 5412 is displayed in association with the selected lane 5302. When user interaction with grab handle 5412 is detected (e.g., by click and hold of a mouse button), the graph lanes may be re-ordered in visual interface 5300. For example, a user may use grab handle 5412 to move lane 5302 to a different location in visual interface 5300 with respect to the other lanes 5304, 5306, such as between lanes 5304 and 5306 or below lanes 5304 and 5306. When another lane is selected, a corresponding grab handle may be displayed for the selected lane and used to detect an interaction of a user indicative of an instruction to re-order the graph lanes. In one implementation, a grab handle 5412 is only displayed when the corresponding lane 5302 is selected, and hidden from view when the lane is not selected.

While the horizontal axis of each lane is scaled according to the selected time range, and may be the same for each of the lanes 5302, 5304, 5306, a scale for the vertical axis of each lane may be determined individually. In one implementation, a scale for the vertical axis of each lane may be automatically selected such that the graphical visualization spans most or all of a width/height of the lane. In one implementation, the scale may be determined using the maximum and minimum values reflected by the graphical visualization for the corresponding KPI during the current time range, such that the maximum value appears at or near the top of the lane and the minimum value appears at or near the bottom of the lane. The intermediate values between the maximum and minimum may be scaled accordingly. In one implementation, a search query associated with the KPI is executed for a selected period of time. The results of the query return a dataset of KPI values, as shown in FIG. 45A. The maximum and minimum values from this dataset can be determined and used to scale the graphical visualization so that most or all of the lane is utilized to display the graphical visualization.

FIG. 55A illustrates an example of a visual interface 5300 with a user manipulable visual indicator 5514 spanning across the time-based graph lanes, in accordance with one or more implementations of the present disclosure. Visual indicator 5514, also referred to herein as a "lane inspector," may include, for example, a line or other indicator that spans vertically across the graph lanes 5302, 5304, 5306 at a given point in time along time axis 5410. The visual indicator 5514 may be user manipulable such that it may be moved along time axis 5410 to different points. For example, visual indicator 5514 may slide back and forth along the lengths of graph lanes 5302, 5304, 5306 and time axis 5410 in response to user input received with a mouse, touchpad, touchscreen, etc.

In one implementation, visual indicator 5514 includes a display of the point in time at which it is currently located. In the illustrated example, the time associated with visual indicator 5514 is "12:44:43 PM." In one implementation, visual indicator 5514 further includes a display of a value reflected in each of the graphical visualizations for the different KPIs at the current point in time illustrated by visual indicator 5514. In the illustrated example, the value of the graphical visualization in lane 5302 is "3.65," the value of the graphical visualization in lane 5304 is "60," and the value of the graphical visualization in lane 5306 is "0." In one implementation, units for the values of the KPIs are not displayed. In another implementation, units for the values of the KPIs are displayed. In one implementation, when visual indicator 5514, is located a time between two known data points (i.e., between the vertices of the graphical visualization), a value of the KPI at that point in time may be interpolated using linear interpolation techniques. In one implementation, when one of lanes 5302, 5304, 5306 is selected (e.g., by hovering the cursor over the lane) a maximum and a minimum values reflected by the graphical visualization for a corresponding KPI during the current time range are displayed adjacent to visual indicator 5514. For example, in lane 5304, a maximum value of "200" is displayed and a minimum value of "0" is displayed adjacent to visual indicator 5514. This indicates that the highest value of the KPI corresponding to the graphical visualization in lane 5304 during the time period represented by time axis 5410 is "200" and the lowest value during the same time period is "0." In other implementations, the maximum and minimum values may be displayed for all lanes, regardless of whether they are selected, or may not be displayed for any lanes.

In one implementation, visual interface 5300 may include an indication when the values for a KPI reach one of the predefined KPI thresholds. As discussed above, during the creation of a KPI, the user may define one or more states for the KPI. The states may have corresponding visual characteristics such as colors (e.g., red, yellow, green). In one implementation, the graph color of the graphical visualization may correspond to the color defined for the various states. For example, if the graphical visualization is a line graph, the line may have different colors for values representing different states of the KPI. In another implementation, the current value of a selected lane displayed by visual indicator 5514 may change color to correspond to the colors defined for the various states of the KPI. In another implementation, the values of all lanes displayed by visual indicator 5514 may change color based on the state, regardless of which lane is currently selected. In another implementation, there may be a line or bar running parallel to at least one of lanes 5302, 5304, 5306 that is colored according to the colors defined for the various KPI states when the value of the corresponding KPI reaches or passes a defined threshold causing the KPI to change states. In yet another implementation, there may be horizontal lines running along the length of at least one lane to indicate where the thresholds defining different KPI states are located on the vertical axis of the lane. In other implementations, the thresholds may be indicated in visual interface 5300 in some other manner.

FIG. 55B is a flow diagram of an implementation of a method for inspecting graphical visualizations of KPI values along a time-based graph lane, in accordance with one or more implementations of the present disclosure. At block 5501, the computing machine determines a point in time corresponding to the current position of lane inspector 5514. The lane inspector 5514 may be user manipulable such that it may be moved along time axis 5410 to different points in time. For each KPI dataset represented by a graphical visualization in the visual interface, at block 5503, the computing machine determines a KPI value corresponding to the determined point in time. In addition, at block 5505, the computing machine determines a state of the KPI at the determined point in time, based on the determined value and the defined KPI thresholds. The determine state may include, for example, a critical state, a warning state, a normal state, etc. At block 5507, the computing device determines the visual characteristics of the determined state, such as a color (e.g., red, yellow, green) associated with the determined state.

At block 5509, the computing machine displays the determined value adjacent to lane inspector 5514 for each of the graphical visualizations in the visual interface. In the example illustrated in FIG. 55A, the value of the graphical visualization in lane 5302 is "3.65," the value of the graphical visualization in lane 5304 is "60," and the value of the graphical visualization in lane 5306 is "0." If the lane inspector 5514 is moved to a new position representing a different time, the operations at blocks 5501-5509 may be repeated.

At block 5511, the computing machine receives a selection of one of the lanes or graphical visualizations within a lane in the visual interface. In one implementation, one of graph lanes 5302, 5304, 5306 is selected by hovering the cursor over the lane. At block 5513, the computing machine determines the maximum and minimum values of the KPI dataset associated with the selected lane. In one implementation, a search query associated with the KPI is executed for a selected period of time. The results of the query return a dataset of KPI values, as shown in FIG. 45A. The maximum and minimum values from this dataset can be determined. At block 5515, the computing machine displays the maximum and minimum values adjacent to lane inspector 5515. For example, in lane 5304, a maximum value of "200" is displayed and a minimum value of "0" is displayed adjacent to lane inspector 5514.

FIG. 55C illustrates an example of a visual interface with a user manipulable visual indicator spanning across multi-series time-based graph lanes, in accordance with one or more implementations of the present disclosure. In one implementation, time-based graph lane 5520 is a multi-series graph lane including visual representations of multiple series of corresponding KPI values. The multiple series may be the result of a search query corresponding to the KPI that is designed to return multiple values at any given point in time. For example, the search could return the processor load on multiple different host machines at a point in time, where load on each individual host is represented by a different one of the multiple series. Each graphical visualization in multi-series lane 5520 can be calibrated to the same time scale.

In one implementation, visual indicator 5525 includes a display of the point in time at which it is currently located. In the illustrated example, the time associated with visual indicator 5514 is "01:26:47 PM." In one implementation, visual indicator 5525 further includes a display of a value reflected in each of the graphical visualizations, including multi-series lane 5520, at the current point in time illustrated by visual indicator 5525. In one implementation, in multi-series lane 5520, the visual indicator 5525 displays the maximum, minimum, and average values among each of the multiple series at the given point in time. In the illustrated example, the graphical visualizations in lane 5525 have a maximum value of "4260.11" and a minimum value of "58.95." In one implementation, an indication of the series to which the maximum and minimum values correspond may also be displayed (e.g., the hosts named "vulcan" and "tristanhydra4," respectively). Further, the visual indicator 5525 may display the average value of the multiple series at the given point in time (e.g., "889.41").

FIG. 56 illustrates an example of a visual interface 5300 displaying graphical visualizations of KPI values along time-based graph lanes with options for editing the graphical visualizations, in accordance with one or more implementations of the present disclosure. In one implementation, when one of graph lanes 5302, 5304, 5306 is selected (e.g., by hovering the cursor over the lane), a GUI element such as a gear icon 5616 is displayed in association with the selected lane 5306. When user interaction with gear icon 5616 is detected, a drop down menu 5618 may be displayed. Drop down menu 5618 may include one or more user selectable options including, for example, "Edit Lane," "Delete Lane," "Open in Search," or other options. Selection of one of these options may cause display of a graphical interface to allow the user to edit the graphical visualization in the associated lane 5306, delete the lane 5306 from the visual interface 5300, or display the underlying data (e.g., events, machine data) from which the KPI values of the associated graphical visualization are derived. Additional details with respect to editing the graphical visualization are described below in connection with FIG. 57. When another lane is selected, a corresponding gear icon, or other indicator, may be displayed for the selected lane. In one implementation, a gear icon 5616 is only displayed when the corresponding lane 5306 is selected, and hidden from view when the lane is not selected.

FIG. 57 illustrates an example of a GUI 5700 for editing a graphical visualization of KPI values along a time-based graph lane in a visual interface, in accordance with one or more implementations of the present disclosure. In one implementation, in response to the selection of the "Edit Lane" option in drop down menu 5618, the system presents GUI 5700 in order to edit the corresponding graphical visualization.

In one implementation, GUI 5700 can receive user input for a number of input fields 5702, 5704, 5712, selections from drop down menus 5706, 5708, or selection of selection buttons 5710 or link 5714. In one implementation, input field 5702 can be used to edit the title for the graphical visualization. Input field 5204 may be used to edit the subtitle or description of the graphical visualization. In one implementation drop down menu 5706 can be used to edit the graph style, and drop down menu 5708 can be used to edit the graph color for the graphical visualization. For example, upon selection of drop down menu 5708, a number of available colors may be displayed for selection by the user. Upon selection of a color, the corresponding graphical visualization may be displayed in the selected color. In one implementation, no two graphical visualizations in the same visual interface may have the same color. Accordingly, the available colors displayed for selection may not include any colors already used for other graphical visualizations. In one implementation, the color of a graphical visualization may be determined automatically according to the colors associated with defined thresholds for the corresponding KPI. In such an implementation, the user may not be allowed to edit the graph color in drop down menu 5708.

Selection buttons 5710 may be used to edit a search source for the graphical visualization. In the illustrated implementation, an "Ad Hoc" search source has been selected. In response, an input field 5712 may display a user-input search query. The search query may include search criteria (e.g., keywords, field/value pairs) that produce a dataset or a search result of events or other data that satisfy the search criteria. In one implementation, a user may edit the search query by making changes, additions, or deletions, to the search query displayed in input field 5712. The Ad Hoc search query may be executed to generate a dataset of values that can be plotted over the time range as a graphical visualization (e.g., as shown in visual interface 5300). Selection of link 5714 may indicate that the user wants to execute the search query in input field 5712. Upon the editing of data and/or the selection menu items, the selection of button 5716 may indicate that the editing of the graphical visualization is complete.

FIG. 58 illustrates an example of a GUI 5700 for editing a graph style of a graphical visualization of KPI values along a time-based graph lane in a visual interface, in accordance with one or more implementations of the present disclosure. In one implementation, drop down menu 5706 can be used to edit the graph style of the graphical visualization. For example, upon selection of drop down menu 5706, a list 5806 of available graph types may be displayed for selection by the user. In one implementation, the available graph types include a line graph, an area graph, or a column graph. In other implementations, additional graph types may include a bar cart, a plot graph, a bubble chart, a heat map, or other graph types. Upon selection of a graph type, the corresponding graphical visualization may be displayed in the selected graph type. In one implementation, each graphical visualization on the visual interface has the same graph type. Accordingly, when the graph type of one graphical visualization is changed, the graph type of each remaining graphical visualization in the visual interface is automatically changed to the same graph type. In another implementation, each graphical visualization in the visual interface may have a different graph type. In one implementation, the graph type of a graphical visualization may be determined automatically based on the corresponding KPI or service. In such an implementation, the user may not be allowed to edit the graph type in drop down menu 5706.

FIG. 59 illustrates an example of a GUI 5700 for selecting the KPI corresponding to a graphical visualization along a time-based graph lane in a visual interface, in accordance with one or more implementations of the present disclosure. In one implementation, selection buttons 5710 may be used to edit a search source for the graphical visualization. In the illustrated implementation, the "KPI" search source has been selected. In response, drop down menus 5912, 5914 and input field 5916 may be displayed. Drop down menu 5912 may be used to select a service, the performance of which will be represented by the graphical visualization. Upon selection, drop down menu 5912 may display a list of available services. Drop down menu 5914 may be used to select the KPI that indicates an aspect of how the selected service is performing. Upon selection, drop down menu 5914 may display a list of available KPIs. Input field 5916 may display a search query corresponding to the selected KPI. The search query may derive one or more values from machine data pertaining to one or more entities providing a service. In one implementation, a user may edit the search query by making changes, additions, or deletions, to the search displayed in input field 5916. Selection of link 5918 may indicate that the user wants to execute the search query in input field 5916.

FIG. 60 illustrates an example of a GUI 5700 for selecting a data model corresponding to a graphical visualization along a time-based graph lane in a visual interface, in accordance with one or more implementations of the present disclosure. In one implementation, selection buttons 5710 may be used to edit a search source for the graphical visualization. In the illustrated implementation, the "Data Model" search source has been selected. In response, drop down menus 6012, 6014 and input fields 6016, 6018 may be displayed. Drop down menu 6012 may be used to select a data model on which the graphical visualization will be based. Upon selection, drop down menu 6012 may display a list of available data models. Additional details with respect to selection of a data model are described below in connection with FIG. 61. Drop down menu 6014 may be used to select a statistical function for the data model. Upon selection, drop down menu 6014 may display a list of available functions. Additional details with respect to selection of a data model function are described below in connection with FIG. 62A. Input field 6016 may display a "Where clause" that can be used to further refine the search associated with the selected data model and displayed in input field 6018. The where clause may include, for example the WHERE command followed by a key/value pair (e.g., WHERE host=Vulcan). In one implementation, "host" is a field name and "Vulcan" is a value stored in the field "host." The WHERE command may further filter the results of the search query associated with the selected data model to only return data that is associated with the host name "Vulcan." As a result, the search can filter results based on a particular entity or entities that provide a service. In one implementation, a user may also edit the search query by making changes, additions, or deletions, to the search displayed in input field 6018. The data model search query may be executed to generate a dataset of values that can be plotted over the time range as a graphical visualization (e.g., as shown in visual interface 5300). Selection of link 6020 may indicate that the user wants to execute the search query in input field 6018.

FIG. 61 illustrates an example of a GUI 6100 for selecting a data model corresponding to a graphical visualization along a time-based graph lane in a visual interface, in accordance with one or more implementations of the present disclosure. In one implementation, upon selection of drop down menu 6012, GUI 6100 is displayed. GUI 6100 allows for the selection and configuration of a data model to be used as the search source for the graphical visualization. In GUI 6100, a user may select an existing data model from drop down menu 6102. Additionally, a user may select one of objects 6104 of the data model. In one implementation, an object is a search that defines one or more events. The data model may be a grouping of objects that are related. Furthermore, a user may select one of the fields 6106 to derive one or more values for the graph. Additional details regarding data models are provided below.

FIG. 62A illustrates an example of a GUI 5700 for editing a statistical function for a data model corresponding to a graphical visualization along a time-based graph lane in a visual interface, in accordance with one or more implementations of the present disclosure. In one implementation, drop down menu 6014 may be used to select statistical function for the data model. For example, upon selection of drop down menu 6014, a list 6214 of available statistical functions may be displayed for selection by the user. In one implementation, the available statistical functions include average, count, distinct count, maximum, minimum, sum, standard deviation, median or other operations. The selected statistical function may be used to produce one or more values for display as the graphical visualization. In one implementation, the available statistical functions may be dependent on the data type of the selected field from fields 6106 in GUI 6100. For example, when the selected field has a numerical data type, any of the above listed statistical functions may be available. When the selected field has a string data type, however, the only available operations may be count and distinct count, as the arithmetic operations cannot be performed on a string data type. In one implementation, the statistical function may be determined automatically based on the corresponding data model. In such an implementation, the user may not be allowed to edit the statistical function in drop down menu 5214.

FIG. 62B illustrates an example of a GUI 6220 for editing a graphical visualization of KPI values along a time-based graph lane in a visual interface, in accordance with one or more implementations of the present disclosure. In one implementation, in response to the selection of the "Edit Lane" option in drop down menu 5618, the system presents GUI 6220 in order to edit the graph rendering options for the corresponding graphical visualization. In one implementation, the graph rendering options include the vertical axis scale 6222 and the vertical axis boundary 6224 for the corresponding lane. Options for the vertical axis scale 6222 include linear and logarithmic. Depending on the selection, the vertical axis of the corresponding lane will be displayed with either a linear or a logarithmic scale. Options for the vertical axis boundary 6224 include data extent, zero extent, and static. When data extent is selected, the range of values shown on the vertical axis of the corresponding lane will be set to include the full range of KPI values during the selected time period (i.e., the vertical axis will range from the maximum to the minimum KPI value). When zero extent is selected, the range of values shown on the vertical axis of the corresponding lane will be set to range from the maximum KPI value to zero (or to a negative value, if such a value exists in the data). When static is selected, the user can enter a custom range of values which will be shown on the vertical axis of the corresponding lane.

FIG. 63 illustrates an example of a GUI 6300 for selecting a time range that graphical visualizations along a time-based graph lane in a visual interface should cover, in accordance with one or more implementations of the present disclosure. In one implementation, drop down menu 5308 may be used to select a time range for the graphical visualizations in the visual interface 5300 of FIG. 53. For example, upon selection of drop down menu 5308, a GUI 6300 for selection of the time range may be displayed. In one implementation, the time range selection options may include a real-time period 6302, a relative time period 6304 or some other time period 6306. For real-time execution, the time range for machine data can be a real-time period 6302 (e.g., 30-second window, 1-minute window, 1-hour window, etc.) from the execution time (e.g., each time the query is executed, the events with timestamps within the specified time window from the query execution time will be used). In real-time execution, a search query associated with the KPI may be continually executed (or periodically executed at a relatively short period (e.g., 1 second)) to continually show a graphical visualization reflecting KPI values from the last one hour (or other real-time period) of time. Thus, if the 1 hour window initially covers from 12 pm to 1 pm, at 1:30, the 1 hour window may cover from 12:30 pm to 1:30 pm. In other words, the time period may be considered a rolling time period, as it constantly changes as time moves forward. For relative execution, the relative time period 6304 can be historical (e.g., yesterday, previous week, etc.) or based on a specified time window from the request time or scheduled time (e.g., last 15 minutes, last 4 hours, etc.). For example, the historical time range "Yesterday" can be selected for relative execution. In another example, the window time range "Last 15 minutes" can be selected for relative execution. In relative execution, the search query associated with the KPI may only be executed upon a request for updated values from the user. Thus, if the 1 hour window covers from 12 pm to 1 pm, that time period will not change until the user requests an update, at which point the most recent 1 hour of values will be displayed. In one implementation, the other time period may include, for example, all of the time where KPI values are available for the corresponding service. Additional time range options may allow the user to specify a particular date or time range over which the KPI values are to be displayed as graphical visualizations.

FIG. 64A illustrates an example of a visual interface 5300 for selecting a subset of a time range that graphical visualizations along a time-based graph lane in a visual interface cover, in accordance with one or more implementations of the present disclosure. In one implementation, visual indicator 5514 may be used to select a subset 6402 of the time range represented by time axis 5410, and the corresponding portions of the graphical visualizations in lanes 5302, 5304, 5306. In one implementation, a user may use a mouse or other pointing device to position visual indicator 5514 at a starting position along time axis 5410, then click and drag to select the desired subset 6402. In one embodiment, the selected subset 6402 is shown as shaded in the visual interface 5300. In another implementation, all areas except the selected subset 6402 are shown as shaded. The selection of subset 6402 may be an indication that the user wishes to more closely inspect the KPI values of the graphical visualizations during the time period represented by the subset 6402. As a result, in response to the selection, the subset 6402 may be emphasized, enlarged, or zoomed in upon to allow closer inspection.

FIG. 64B is a flow diagram of an implementation of a method for enhancing a view of a subset a subset of a time range for a time-based graph lane, in accordance with one or more implementations of the present disclosure. At block 6401, the computing device determines a new time range based on the positions of lane inspector 5514. In one implementation, lane inspector 5514 may be used to select a subset 6402 of the time range represented by time axis 5410, and the corresponding portions of the graphical visualizations in lanes 5302, 5304, 5306. At block 6403, the computing device identifies a subset of values of each KPI that correspond to the new time range. In one embodiment, each value in the KPI dataset may have a corresponding time value or timestamp. Thus, the computing device can filter the dataset to identify values with a timestamp included in the selected subset of the time range.

At block 6405, the computing device determines the maximum and minimum values in the selected subset of values for each KPI, and at block 6407 adjusts the time axis of the lanes in the graphical visualization to reflect the new time range. In one implementation, the subset 6402 is expanded to fill the entire length or nearly the entire length of graph lanes 5302, 5304, 5306. The horizontal axis of each lane may be scaled according to the selected subset 6402. At block 6409, the computing device adjusts the height of the lanes based on the new maximum and minimum values. In one implementation, the vertical axis of each lane is scaled according to the maximum and minimum values reflected by the graphical visualization for a corresponding KPI during the selected subset 6402. At block 6411, the computing device modifies the graphs based on the subsets of values and calibrates the graphs to the same time scale based on the new time range. Additional details are described with respect to FIG. 65.

FIG. 65 illustrates an example of a visual interface displaying graphical visualizations of KPI values along time-based graph lanes for a selected subset of a time range, in accordance with one or more implementations of the present disclosure. In response to the selection of subset 6402 using visual indicator 5514, the system may recalculate the time range that the graphical visualizations in graph lanes 5302, 5304, 5306 should cover. In one implementation, the subset 6402 is expanded to fill the entire length or nearly the entire length of graph lanes 5302, 5304, 5306. The horizontal axis of each lane is scaled according to the selected subset 6402 and the vertical axis of each lane is scaled according to the maximum and minimum values reflected by the graphical visualization for a corresponding KPI during the selected subset 6402. In one implementation, the maximum value appears at or near the top of the lane and the minimum value appears at or near the bottom of the lane. The intermediate values between the maximum and minimum may be scaled accordingly.

In one implementation, time access 5410 is updated according to the selected subset 6402. The time axis 5410 may include an indication of the amount of time represented by the time scale (e.g., "Viewport: 5 m" indicating that the graphical visualizations in graph lanes 5302, 5304, 5306 display KPI values for a time range of five minutes), and an indication of the actual time of day represented by the original time scale (e.g., "12:30, 12:45, 01 PM, 01:15"). In one implementation, a bar running parallel to the time lanes including the indication of the amount of time represented by the time scale (e.g., "Viewport: 1 h 1 m") is highlighted for a proportional subset of the length of time axis 5410 and only in a location along time axis 5410 corresponding to the subset. In the illustrated embodiment, the highlighted portion of the horizontal bar indicates that the selected subset 6402 occurs sometime between "01 PM" and "01:15." In one implementation, at least a portion of the time axis 5410 is displayed above the graph lanes 5302, 5304, 5306 as well. This portion of the time axis indicates the actual time of day represented by the selected subset 6402 (e.g., "01:05, 01:06, 01:07, 01:08, 01:09"). In one implementation, a user may return to the un-zoomed view of the original time period by clicking the non-highlighted portion of the horizontal bar in the time axis 5410.

FIG. 66 illustrates an example of a visual interface 5300 displaying twin graphical visualizations of KPI values along time-based graph lanes for different periods of time, in accordance with one or more implementations of the present disclosure. In one implementation, each of graph lanes 5302, 5304, 5306 has a corresponding twin lane 6602, 6604, 6606. The twin lanes 6602, 6604, 6606 may display a second graphical visualization in parallel with the first graphical visualization in graph lanes 5302, 5304, 5306. The KPI values reflected in the second graphical visualization may correspond to the same KPI (or other search source) for a different period of time than the values reflected in the first graphical visualization. In one implementation, a user may add the twin lanes 6602, 6604, 6606 by selecting drop down menu 6608. In one implementation, drop down menu 6608 can be used to select the period of time for the values reflected in the second graphical visualizations. For example, upon selection of drop down menu 6608, a list 6610 of available time periods may be displayed for selection by the user. In one implementation, the available time periods may include periods of time in the past when KPI data is available for one or more of the graphical visualizations. In one implementation, a twin lane may be created for each of the lanes in the visual interface, and a search query of each KPI can be executed using the specified time range to produce one or more time values for the second graphical visualization of a corresponding KPI. Because the new time range is associated with a different point(s) in time, the machine data or events used by the search query for the second graphical visualization will be different than the machine data that was used by the search query for the original graphical visualization, and therefore the values produced for the second graphical visualization are likely to be different from the values that were produced for the original graphical visualization. In another implementation, a twin lane may be created only for one or more selected lanes in the visual interface, and only search queries of those KPIs can be executed. In one implementation, if past KPI data is not available for the selected time range, no second graphical visualization may be displayed in the twin lane 6606.

FIG. 67 illustrates an example of a visual interface with a user manipulable visual indicator 5514 spanning across twin graphical visualizations of KPI values along time-based graph lanes for different periods of time, in accordance with one or more implementations of the present disclosure. Visual indicator 5514, also referred to herein as a "lane inspector," may include, for example, a line or other indicator that spans across the graph lanes 5302, 6602, 5304, 6604, 5306, 6606 at a given point in time along time axis 5410. The visual indicator 5514 may be user manipulable such that it may be moved along time axis 5410 to different points. For example, visual indicator 5514 may slide back and forth along the lengths of graph lanes and time axis 5410 in response to user input received with a mouse, touchpad, touchscreen, etc.

In one implementation, visual indicator 5514 includes a display of the point in time at which it is currently located both in original lanes 5302, 5304, 5306 and twin lanes 6602, 6604, 6606. In the illustrated example, the times associated with visual indicator 5514 are "Thu Sep 4 01:35:34 PM" for the original lanes and "Wed Sep 3 01:35:34 PM" for the twin lanes. Thus, the twin lanes show values of the same KPI from the same time range on the previous day. In one implementation, visual indicator 5514 further includes a display of a value reflected in each of the graphical visualizations for the different KPIs at the point in time corresponding to the position of visual indicator 5514. In the illustrated example, the value of the graphical visualization in lane 5302 is "0," the value of the graphical visualization in lane 6302 is "1.52," the value of the graphical visualization in lane 5304 is "36," the value of the graphical visualization in lane 6304 is "31," the value of the graphical visualization in lane 5306 is "0," and lane 6306 has no data available. In one implementation, the graphical visualizations in twin lanes 6302, 6304, 6306 have the same graph type and a similar graph color as the graphical visualizations in the corresponding graph lanes 5302, 5304, 5306. In another implementation, the second graphical visualizations are configurable such that the user can adjust the graph type and the graph color. In one implementation, rather than being displayed in twin parallel lanes, the second graphical visualizations may be overlaid on top of the original graphical visualizations.

FIG. 68A illustrates an example of a visual interface 5300 displaying a graph lane 6806 with inventory information for a service or entities reflected by KPI values, in accordance with one or more implementations of the present disclosure. In one implementation, an additional lane 6806 is displayed in parallel to at least one of graph lanes 6802 and 6804. Graph lanes 6802 and 6804 may be similar to graph lanes 5302, 5304, 5306 described above, such that they may display graphical visualizations of corresponding KPI values. Additional lane 6806, however, may be a different type of lane, which does not display graphical visualizations. In one implementation, additional lane 6806 may display inventory information for the service or for the one or more entities providing the service reflected by the KPI corresponding to the graphical visualization in the adjacent lane 6804. The additional lane 6806 may include textual information, or other non-graphical information. The inventory information may include information about the service or the entities providing the service, such as an identifier of the entities (e.g., a host name, server name), a location of the entities (e.g., rack number, data center name), etc. In one implementation, the inventory information displayed in lane 6806 may be populated from information provided during the entity definition process. In one embodiment, the inventory information displayed in additional lane 6806 may change according to the position of visual indicator 5514 along time axis 5410. When the inventory information is time stamped, or otherwise is associated with a time value, the inventory information may be different at different points in time. Accordingly, in one implementation, the inventory information available at the time associated with the position of visual indicator 5514 may be displayed in additional lane 6806. In one implementation, additional lane 6806 may be continually associated with an adjacent lane 6804, such that if the lanes in visual interface 5300 are reordered, additional lane 6806 remains adjacent to lane 6804 despite the reordering.

FIG. 68B illustrates an example of a visual interface displaying an event graph lane with event information in an additional lane, in accordance with one or more implementations of the present disclosure. In one implementation, time-based graph lane 6810, is an event lane having a visual representation of the number of events occurring over a given period of time. The visual representation may include a heat map, whereby the entire period of the lane is segmented into smaller equally sized buckets, each representing a subset of the period of time and having a colored rectangle. The color of the rectangle may correspond to the number of events pertaining to a particular entity or service that occurred during the period of time represented by the bucket. In one implementation, darker colors/shades represent a higher number of events, while lighter colors/shades represent a lower number of events. Additional lane 6812 may be a different type of lane, which does not display graphical visualizations. In one implementation, additional lane 6812 may display additional information corresponding to the events represented in the adjacent event lane 6810. The additional lane 6812 may include textual information, or other non-graphical information. In one implementation, when one of the buckets in event lane 6810 is selected, additional lane 6812 may include a listing of each event that is associated with the selected bucket. Information about each event that is displayed in the list may include, for example, an identifier of the event, a timestamp of the event, an identifier of corresponding entities (e.g., a host name, server name), a location of the entities (e.g., rack number, data center name), etc. In one implementation, additional lane 6812 may be continually associated with an adjacent lane 6810, such that if the lanes in visual interface 6800 are reordered, additional lane 6812 remains adjacent to lane 6810 despite the reordering.

FIG. 69 illustrates an example of a visual interface 5300 displaying a graph lane with notable events occurring during a timer period covered by graphical visualization of KPI values, in accordance with one or more implementations of the present disclosure. In one implementation, an additional lane 6908 is displayed in parallel to at least one of graph lanes 6902, 6904, 6906. Graph lanes 6902, 6904, 6906 may be similar to graph lanes 5302, 5304, 5306 described above, such that they may display graphical visualizations of corresponding KPI values. Additional lane 6908, however, may be a different type of lane designed to display indications of the occurrences of notable events. "Notable events" are system occurrences that may be likely to indicate a security threat or operational problem. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information.

In one implementation, the notable events occurring during the period of time represented by time axis 5410 are displayed as flags 6910 or bubbles in a bubble chart in additional lane 6908. The flags 6910 may be located at a position along time axis 5410 corresponding to when the notable event occurred. In one implementation, the flags 6910 may be color coded to vindicate the severity or importance of the notable event. In one implementation, when one of the flags 6910 is selected (e.g., by clicking on the flag or hovering the cursor over the flag), a description of the notable event may be displayed. As illustrated in FIG. 69, the description 6912 may be displayed in a horizontal bar along the bottom of lane 6908. In another implementation, as illustrated in FIG. 70, the description 7012 may be displayed adjacent to the selected flag 6910. In one implementation, user-manipulable visual indicator 5514 may be used to select a particular flag 6910. For example, when visual indicator 5514 is slid along the length of lane 6908, a description 7012 of a corresponding notable event at the same time may be displayed.

In some implementations, search queries for KPIs and correlation searches can derive values using a late-binding schema that the search queries apply to machine data. Late-binding schema is described in greater detail below. The systems and methods described herein above may be employed by various data processing systems, e.g., data aggregation and analysis systems. In various illustrative examples, the data processing system may be represented by the SPLUNK® ENTERPRISE system produced by Splunk Inc. of San Francisco, Calif., to store and process performance data.

Defining a New Correlation Search Based on Graph Lanes

Implementations of the present disclosure may include a mechanism to generate correlation searches based on information displayed in one or more graph lanes. The graph lanes may be selected by a user and may be customized to cover a desired time period. The graph lanes may allow a user to detect, diagnose or solve a problem (e.g., system malfunction, performance degradation) or identify a performance pattern of interest (e.g., increased usage of one or more services by end users). The graph lanes may allow the user to visually inspect a diverse set of information and may enhance the user's ability to identify patterns amongst the graph lanes. Once a user has identified the graph lanes that relate to a problem or a pattern of interest, the user may submit a request to create a new correlation search. The system may then analyze the information represented by the graph lanes to create a definition for a new correlation search. The new correlation search provided by the created definition may then be run to detect a re-occurrence of the problem or the pattern of interest, and to cause an action (e.g., an alert or a notification of the user) to be performed.

FIG. 71 provides an exemplary GUI 7150 that displays a set of graph lanes 7152A-G and a GUI element 7154 for creating new correlations searches. When a user selects GUI element 7154 (e.g., a button), a user's request to create a new correlation search may be generated. Responsive to the user request, the system may iterate through the set of graph lanes 7152A-G to acquire information pertaining to the graph lanes. The graph lanes may be associated with key performance indicators (KPIs) and the system may analyze fluctuations in each KPI to automatically (without any user interaction) generate KPI criteria for individual KPIs. The KPI criteria may then be aggregated to automatically (without any user interaction) create an aggregate triggering condition for the correlation search. As will be discussed in more detail below, the aggregate triggering condition may be used during the execution of the correlation search to identify when the problem or the pattern of interest reoccurs.

FIGS. 72A-C illustrate multiple flow diagrams of exemplary methods 7210, 7220, and 7230. Method 7210 is an example of a method for assisting a user in initiating the creation of a new correlations search. Method 7220 is an example of a method for creating a correlation search definition based on displayed graph lanes. Method 7230 is an example of a method for running the correlation search to identify a re-occurrence of a performance pattern of interest (e.g., a problem in the performance of one or more services). Each of the methods may be performed by processing logic that may comprise hardware (circuitry, dedicated logic, etc.), software (such as is run on a general-purpose computer system or a dedicated machine), or a combination of both. In one implementation, one or more of the methods may be performed by a client computing machine. In another implementation, one or more of the methods may be performed by a server computing machine coupled to the client computing machine over one or more networks.

For simplicity of explanation, the methods of this disclosure are depicted and described as a series of acts (e.g., blocks). However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 72, method 7210 may begin at block 7211 when the computing machine causes display of a set of graph lanes corresponding to a plurality of KPIs that each indicate how a service is performing over a period of time. Each KPI may comprise multiple KPI values derived from machine data pertaining to one or more entities providing the service. Each KPI value may indicate how the service is performing at a point in time or over a duration of time. The graph lanes may provide graphical visualizations to illustrate the KPI values and changes in the KPI values over time. As discussed above, the KPI values may correspond to different KPI states that are defined based on KPI thresholds. In some implementations, each graph lane may visually illustrate respective states of the KPI over the period of time using a visual indicator (e.g., color, shading, etc.).

The set of graph lanes may include multiple different graphical visualizations including a line graph, an area graph, a bar chart, a heat map or other visualization. The graphical visualizations may be displayed in parallel such that each graph lane may be stacked above one another. The set of graph lanes may also be calibrated to the same time scale and span the same period of time. The time scale may be presented as a timeline along a horizontal axis of the bottom of the lowest graph lane.

The user may adjust which graph lanes should be displayed and the time period being displayed in order to discover or diagnose a problem. Adjusting which graph lanes should be displayed may involve adding or removing graph lanes from the set of graph lanes. Users may add graph lanes by accessing a library of existing graph lanes or creating their own graph lanes. The library of graph lanes may include graph lanes that are packaged with the application as well as graph lanes that may have been configured by an IT administrator within an organization. Users may also create their own graph lanes by using, for example, a graphical user interface or sequence of GUIs (e.g., wizard) that enables a user to select a service, a KPI and a type of graph lane. The computing machine may also remove graph lanes in response to user input. In one example, the user may select one or more graph lanes in the set of graph lanes and enable an "edit" mode that may present the user with an option to delete the selected graph lanes. The computing machine may then update the set of graph lanes to remove the one or more graph lanes. In one example, a user may add and remove graph lanes and the resulting set of graph lanes may cover multiple services and include at least one or more graph lanes corresponding to a first service and at least one or more graph lanes corresponding to a second service. Displaying multiple graph lanes together may allow the user to identify patterns amongst the graph lanes. For example, the user may see that there is a spike in values in one aspect of a service just prior to another service entering a critical state. This may provide insight when performing problem determination techniques, such as root cause analysis. It should be noted that performance problem determination is only one example of how the correlation search discussed herein can be utilized, and that various other patterns of service performance can be detected via the correlation search without loss of generality.

A user may also want to adjust the time frame while performing the problem determination. The user may begin by reviewing the graph lane over a large period of time to identify when the problem began and may subsequently focus on (e.g., zoom-in to) a portion of the graph lane that includes the beginning of the problem (e.g., system malfunction, performance degradation). Based on user input, the computing machine may adjust the duration of time associated with a graph lane. In one example, the computing machine may receive user input to modify a zoom level of the set of graph lanes and in response, the computing machine may update the duration of time being displayed to correspond with the zoom level. For example, if the graph lane is displaying a 24-hour duration of time, the user may zoom-in to display a 12-hour duration of time. In another example, the user may provide input that identifies a portion of one or more graph lanes. For example, the user may select a portion of the graph lanes that corresponds to a four-hour duration from 4 pm through 8 pm, and the computing machine may update the GUI such that the selected portion of the graph lines occupies the entire GUI area designated for the display of graph lanes. In another example, the GUI may include a graphical element (e.g., button, drop down list, etc.) that presents the user with multiple predefined time durations (e.g., 15 min, 60 min, day, week) and the user input may identify one of the predefined time durations.

At block 7212, the computing machine may receive a user request to create a definition of a correlation search based on the set of graph lanes that have been adjusted by the user. The set of graph lanes may visually illustrate a cause or a symptom of a problem and the correlation search may be defined to detect an occurrence of the problem during another period of time. In one example, the correlation search may detect a re-occurrence of the same problem or a similar problem in the future. In another example, the correlation search may detect an occurrence of the same problem or a similar problem in the past. In yet another example, the correlation search may detect when a similar problem has occurred with a separate set of computing resources.

At block 7213, the computing machine may create the definition of the correlation search in response to the user request. Creating the definition of the correlation search may involve processing (e.g., iterating through) the set of graph lanes to automatically determine KPI criteria for the KPIs associated with the set of graph lanes and combining the KPI criteria into an aggregate triggering condition for the correlation search definition. An exemplary method of creating an aggregate triggering condition for a correlation search definition is discussed in more detail below in conjunction with FIG. 72B.

In addition to the aggregate triggering condition, the correlation search includes a search component for producing results to which the aggregate triggering condition should apply. The search component can be applied to KPI data (KPI values and/or KPI states) of the KPIs to extract the KPI data of the KPIs for a given time period. In some implementations, KPI data (e.g., KPI values and/or KPI states) of each KPI is determined using a KPI search query and stored in a data store in association with a unique identifier of the KPI and relevant points in time or durations of time. In such implementations, the search component can specify information for locating the stored KPI data (e.g., using a unique identifier of each KPI and the location information of the data store), and the given time period (or time window). In other implementations, the search component does not refer to the stored KPI data and instead specifies the actual KPI search query that will produce KPI values of the KPIs for a given time window.

The correlation search definition can also include additional information such as the correlation search name, scheduling information and action information. The scheduling information may specify how often the correlation search should be executed. The action information may define an action to be performed when the aggregate triggering condition is satisfied.

In some implementations, the computing machine may automatically generate the search component and the additional information without requiring any subsequent user interaction. For example, the computing machine may gather the search component information from the graph lanes without requiring a user to provide any input. The computing machine can also use a predefined correlation search name, predefined scheduling information and predefined action information.

In other implementations, the user request may initiate another GUI (e.g., dialog box) that allows the user to provide the search component and/or the additional information for the correlation search, such as the correlation search name, the scheduling information and the action information. The exemplary GUI is discussed in more detail below in regards to FIG. 74.

FIG. 72B is a flow diagram of an implementation of method 7220 for creating a definition of a correlation search based on one or more graph lanes, in accordance with one or more implementations of the present disclosure. As discussed above in regards to FIG. 34C, a correlation search definition may be stored in a service monitoring data store as a record that contains information about one or more characteristics of a correlation search related to KPIs. Various characteristics of a correlation search may include, for example, a name of the correlation search, information for a search component, information for a triggering determination (aggregate triggering condition), a defined action that may be performed based on the triggering determination, one or more services that are related to the correlation search, and other information pertaining to the correlation search such as the frequency of executing the correlation search, and duration information.

The duration information may specify the time period that should be used for the search component to extract relevant KPI data (KPI values and/or KPI states). For example, the duration may be the "Last 60 minutes", and the search component should extract KPI data produced using the time-stamped events from the last 60 minutes. The search component can either specify information for locating stored KPI data of the KPIs or a search query for producing KPI values of the KPIs.

The trigger determination information may include KPI criteria combined into an aggregate trigger condition for evaluating the KPI data obtained by the search component to determine whether to cause a defined action. Each KPI criterion may include one or more contribution threshold components for respective one or more KPI states. Each contribution threshold component may include an operator (e.g., greater than, greater than or equal to, equal to, less than, and less than or equal to), a threshold value, and a statistical function (e.g., percentage, count). For example, the contribution threshold may be "greater than 29.5%".

The action component may specify an action to be performed when the aggregate triggering condition is considered to be satisfied. An action can include, and is not limited to, generating a notable event, sending a notification, and displaying information in an incident review interface, as described in greater detail above in conjunction with FIGS. 34O-34Z.

Method 7220 may begin at block 7221 when the computing machine may select a graph lane from the set of graph lanes to gather information for one or more KPIs associated with the selected graph lane. The gathered information may include graph lane data (e.g., displayed data) and KPI configuration information. The graph lane data may be data that is being displayed within the graph lane, such as KPI values and/or KPI states, error messages, counts, value changes, or other displayed data. The KPI configuration information may identify the service and KPI associated with the graph lane. The KPI configuration information may be used to produce the graph lane data. The KPI configuration information may specify how to obtain KPI values and/or states of the one or more KPIs (e.g., by specifying a KPI search query data or information on how to locate and access stored KPI values and/or states).

At block 7222, the computing machine may determine a KPI criterion for the one or more KPIs associated with the graph lane based on fluctuations in the associated one or more KPIs during a specified period of time (e.g., a first period of time). The KPI criterion may be determined based on the KPI configuration information, the graph lane information or a combination of both. To determine the KPI criterion, the computing machine may analyze fluctuations of the associated one or more KPIs to identify patterns. The patterns may be based on fluctuations in the state of the associated one or more KPIs or fluctuations in the values of the associated one or more KPIs. As discussed above in regards to FIGS. 29-34, a KPI state (e.g., normal, warning, critical) may be defined by one or more thresholds that define a range of KPI values and values within the range may be associated with the corresponding state.

In one example, a graph lane may illustrate a plurality of KPI states corresponding to the multiple KPI values of a KPI, and the fluctuations in the KPI may be determined based on a proportion of time the KPI is in any of the plurality of KPI states. The plurality of KPI states may be presented visually in the graph lane. For example, when the KPI values are within a first, second and third range (e.g., normal, warning, critical), the graph may be green, yellow and red respectively. The proportion of time the KPI is in each state may be determined by identifying the first period of time. In one example, the first period of time may be a period of time that is common for the set of graph lines and corresponds to the duration of time represented by the set of graph lanes. In another example, the first period of time may be a user-selected duration of time, which may be a subset of the duration of time represented by the set of graph lanes. The computing machine may then calculate the duration of time the KPI is in any of the multiple states. This may involve calculating the duration of time the KPI was in each of the states and comparing the duration of time to the first period of time to identify a proportion. For example, if the first time period is 10 hours and the KPI was in a low state for a total of 7 hours, a warning state for 1 hour and a critical state for 2 hours, the proportion of times would be 70% normal (7 hr/10 hr), 10% warning (1 hr/10 hr) and 20% critical (2 hr/10 hr). The proportion may be defined with respect to percentages, ratios, total values or other numeric or non-numeric representations.

In another example, fluctuations in the KPI may be based on fluctuations of KPI values, and determining the KPI criterion may be based on a statistical distribution of the KPI values during the first period of time. The statistical distribution of KPI values may identify patterns in the KPI values or in changes to the KPI values over time. The statistical distribution may take into account averages, medians, and deviations in the values. The statistical distribution may also identify trends in the KPI values. For example, the statistical distribution may identify the rate of change of the KPI values over time, which may include both positive rates, in which case the KPI values are increasing in value as well as negative rates where the KPI values are decreasing in value. The statistical distribution may also account for variations in the rates of change (e.g., acceleration of KPI values). This may be useful because some problems may be identified by a steady increase in KPI values, which may represent a change in a linear manner (e.g., constant acceleration), while other problems may be identified by a rapid increase in KPI values, which may represent a change that accelerates. The differences in trends may be used to identify and distinguish fluctuations of the KPIs.

At block 7223, the computing machine may determine if there are other graph lanes in the set of graph lanes. If there are additional graph lanes, the computing machine may branch back to block 7221 to identify the KPI criterion for another graph lane. If there are no more graph lanes, the computing machine may proceed to block 7224 to combine information for the graph lanes into a new correlation search.

At block 7224, the computing machine may generate an aggregate triggering condition using KPI criteria determined for the plurality of KPIs associated with the graph lanes. Once the computing machine has determined the fluctuations of the one or more KPIs associated with the graph lane, the computing machine may convert these fluctuations into logical statements to be used as a KPI criterion. There may be multiple logical statements and the logical statements may be organized into a series or sequence of logical statements that resolve to true or false. A simplified example of a KPI criterion may include logical statements that evaluate to "True" when the latency of a network is between 250 and 350 milliseconds. The KPI criterion derived from each graph lane may be used to generate an aggregate triggering condition. The aggregate triggering condition may contain KPI criteria corresponding to the set of graph lanes. In addition to analyzing the fluctuations in the KPI, the computing machine may also gather KPI configuration information associated with each graph lane.

At block 7225, the computing machine may create a search component for producing KPI values and/or KPI states of the KPIs for a time window defined by the duration of the first period of time. In some implementations, the search component includes search-processing language representing a query to produce KPI values and/or KPI states of the KPIs for a time window defined by the duration of the first period of time.

At block 7226, the computing machine may add the aggregate triggering condition and the search component to the definition of the correlation search. The search component may identify the plurality of KPIs and specify how to obtain KPI data (e.g., KPI values and/or states) of each of the plurality of KPIs for a given time period (e.g., by including a query to search the data store having the KPI data or by including a KPI search query to produce KPI values of each KPI over the given time window). In some examples, the aggregate triggering condition may be associated with a tolerance range editable by a user. The tolerance range may affect how precisely the aggregate triggering conditions are evaluated, for example, a tolerance range of 10% may consider values within 10% of one or more thresholds in the KPI criterion to satisfy the KPI criterion. The tolerance range may allow a new correlation search to account for variations between occurrences of a situation (e.g., problem) to optimize the ability of the correlation search to correctly identify the same or similar situation at another point in time. The tolerance range may be based on relative values, absolute values or percentage values. For example, the tolerance level may be plus or minus N percent, wherein N is 0, 1, 5, 10, or other percentage value.

A user may modify the tolerance level to enhance the ability for the correlation search to identify other similar situations without producing excessive false positives. In one example, the tolerance range may be set to 0 and the correlation search may identify only one instance of the same situation. When the user customizes the tolerance range to a value of 1%, 5% and 10%, the correlation search may respectively identify 2 occurrences, 5 occurrences and 15 occurrences of similar situations within the past year. The user may know from experience that there have been five similar occurrences. Therefore, the use of the 1% tolerance range may not be optimal because it detects only two of the five occurrences. The use of a 10% tolerance range may also not be optimal because it detected 15 occurrences, which means at least 10 are false positives. Therefore, a user may choose the 5% tolerance level because it most closely reflects the actual number of situations that occurred. In one example, the user may be provided with a graphical user interface for displaying the number of similar situations that a correlation search identifies for each user selected tolerance range.

FIG. 72C is a flow diagram of an implementation of a method 7230 for performing a correlation search based on the correlation search definition to identify the same or similar situations (e.g. problems), in accordance with one or more implementations of the present disclosure. Method 7230 may begin at block 7231 when the computing machine may access a correlation search definition. In one example, the correlation search definition may be created by a client machine and may be stored on a remote machine (e.g., database server). Therefore, the computing machine may access the remote machine to access the correlation search definition and proceed to block 7232.

At block 7232, the computing machine may run a search component to obtain KPI values and/or KPI states of the KPIs for a time window defined by the duration of the first period of time. In one example, the search component may access stored KPI data, which may be raw KPI values (e.g., KPI points) or KPI states derived from the KPI values. Alternatively, the search component may obtain the KPI values by executing a KPI search query, which may be a combined search query to produce KPI values of all KPIs associated with the set of graph lanes, or by executing multiple search queries that each can produce KPI values of a distinct KPI associated with a respective graph lane from the set of graph lanes. In either example, the KPI values may be derived from time-stamped events that may each include at least a portion of raw machine data. The set of KPI values may also be derived from machine data at least in part using a late-binding schema.

At block 7233, the computing machine may evaluate the aggregate triggering condition in view of fluctuations in the KPI that occur during a second period of time. The duration of the second period of time is the same as the duration of the first period of time but the second period of time may be before the first period of time or after the first period of time. Evaluating earlier periods of time may allow the correlation search to identify previous problems, which may allow the user to increase their understanding of the problem and assist with identifying symptoms or causes of the problem. Evaluating later periods of time may allow the user to detect a subsequent problem prior to being informed by customers, which may allow the user to take remedial action to address the problem or keep the problem from getting worse.

Evaluating the aggregate triggering condition involves determining whether each of the plurality of KPIs satisfies a respective KPI criterion from the aggregate triggering condition during the second period of time. This determination may involve processing the KPI data obtained for each KPI at block 7232 to determine if the KPI data obtained for each KPI satisfies a KPI criterion of the respective KPI (from the aggregate triggering condition). In one example, the computing machine may iterate through each of the KPIs associated with the correlation search definition. In another example, the computing machine may evaluate the KPIs in parallel or distribute them to other machines to be evaluated in parallel.

If at block 7234, the computing machine determines that the aggregate triggering condition is not satisfied, method 7230 may end. If at block 7234, the computing machine determines that the aggregate triggering condition is satisfied, the method may proceed to block 7235.

At block 7235, the computing machine may perform an action and the action may be responsive to identifying another occurrence of the problem. The action may notify an entity (e.g., system or user) that the problem has occurred. The notification may be in the form of a notable event, which may be viewable in an event viewer (e.g., dashboard) and may be associated with a severity level. The action may also involve sending a message (e.g., email, text, RSS) or creating an incident ticket to alert a user (e.g. system administrator or IT manager). The message or incident ticket may include description information about the problem or contact information for the user that detected or addressed the problem in the past as well as potential root causes. The action may also involve taking remedial action without additional user interaction, such as for example, running a script or executing a command that resolves the problem (e.g., restarting a service, rebooting a machine).

FIGS. 73A-75B include exemplary GUIs for implementing the methods and systems discussed above and are described below using an example use case. The example use case involves a set of graph lanes corresponding to three interrelated services (e.g., a website service, an application service and a database service). Each graph lane may be associated with one or more KPIs and may graphically display KPI values and/or states of the associated one or more KPIs to enable a user to monitor the various aspects of the services. The user may utilize the graph lanes to identify a root cause of a problem, and then the user may select a button to create a correlation search to alert the user if the problem re-occurs.

Figure 73A:
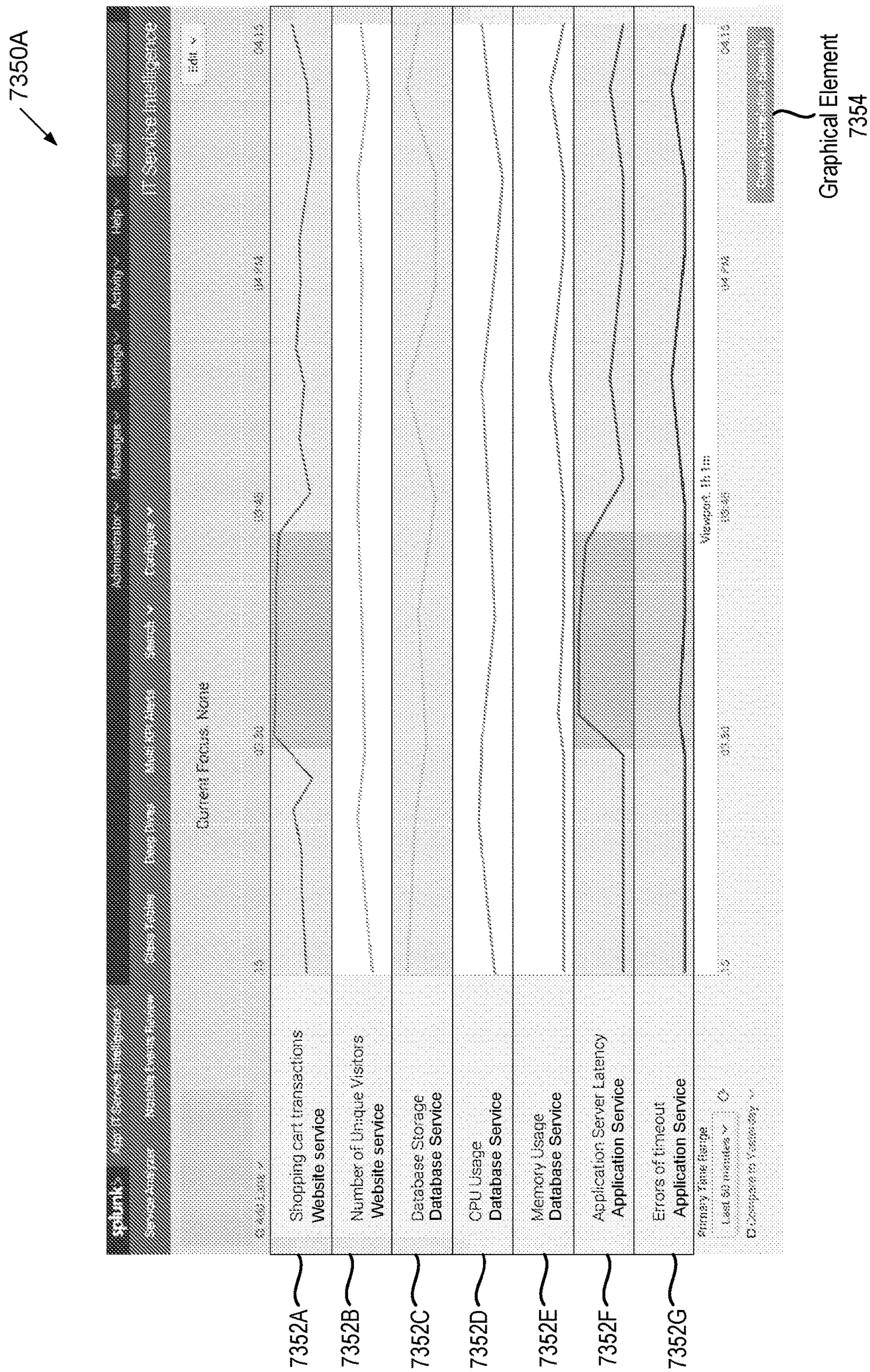

FIGS. 73A-F depict exemplary GUIs 7350A-E that illustrate how a user may modify the set of graph lanes to diagnose a problem. As shown by FIG. 73A, a user may provide input via GUI 7350A to display a set of graph lanes 7352A-G that correspond to multiple services including a website service, a database service and an application service. The website service may represent an e-commerce website, which may be a customer-facing website tracked by multiple KPIs associated with multiple graph lanes. The multiple graph lanes may include graph lane 7352A corresponding to shopping cart transactions and graph lane 7352B corresponding to a number of unique visitors. The database service may support the website service and the application service and may be tracked using multiple KPIs associated with multiple graph lanes. The graph lanes may include, for example, graph lane 7352C corresponding to database storage space, and graph lane 7352D corresponding to memory usage. The application service may provide business logic to support the transactions of the eCommerce website and may be accessible to the website via an application programming interface (API). The application service may be tracked by multiple KPIs associated with multiple graph lanes. The graph lanes may include graph lane 7352F corresponding to application server latency in milliseconds and graph lane 7352G corresponding to time out errors.

Figure 73B:
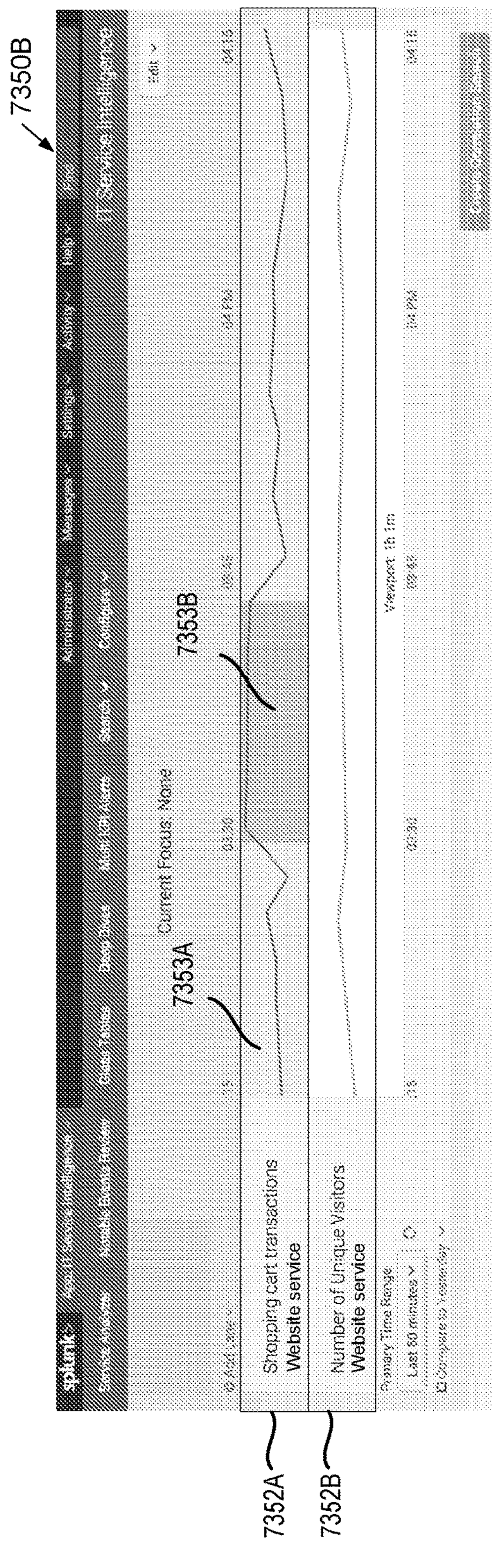

Referring to FIG. 73B, a user may access GUI 7350B in response to receiving a message from a support member of an organization indicating that customers are unable to complete transactions and are complaining via phone. When GUI 7350B is initially invoked, it may only include a few graph lanes (e.g., 7352A-B) that graphically represent the multiple KPIs associated with the website service. The user may visually inspect the graph lanes to confirm that there is a large number of shopping cart transactions. The user may activate a threshold indication feature, which may display the KPI states that correspond to the KPIs over time. This may provide a visual indicator 7353A to illustrate that the KPI values are within a normal state and visual indicator 7353B to illustrate that the KPI values are within a critical state. Activating this feature may indicate that the KPI transitioned from normal state to a warning state in the recent past (e.g., within the past hour).

The user may hypothesize that the problem may have occurred because customers are re-attempting transactions and may test the hypothesis by analyzing graph lane 7352B that displays the number of unique visitors. Both graph lanes 7352A and 7352B may be calibrated to the same time scale and may allow the user to compare the graph lanes side by side to see whether the number of unique users increased during the time that the number of shopping cart transactions increased. As shown, the increase in the number of shopping cart transactions may not have been caused by an increase in the number of visitors because the number of unique visitors remains constant (e.g., substantially horizontal). This may indicate that the same customers are repeatedly performing shopping cart transactions.

Figure 73C:
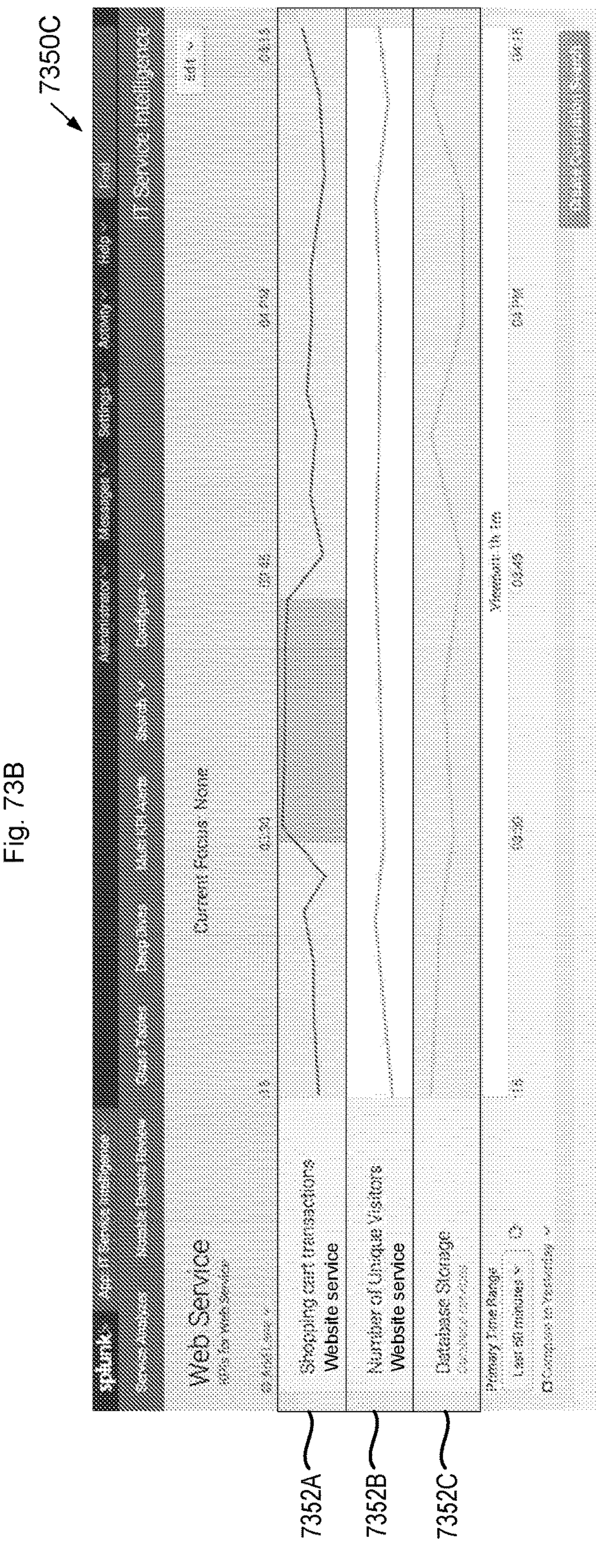

Referring to FIG. 73C, the user may add graph lane 7352C corresponding to the database service to investigate whether the problem could be related to the database service. The user may inspect graph lane 7352C to review database storage utilization and may see it is within a normal state.

Figure 73D:
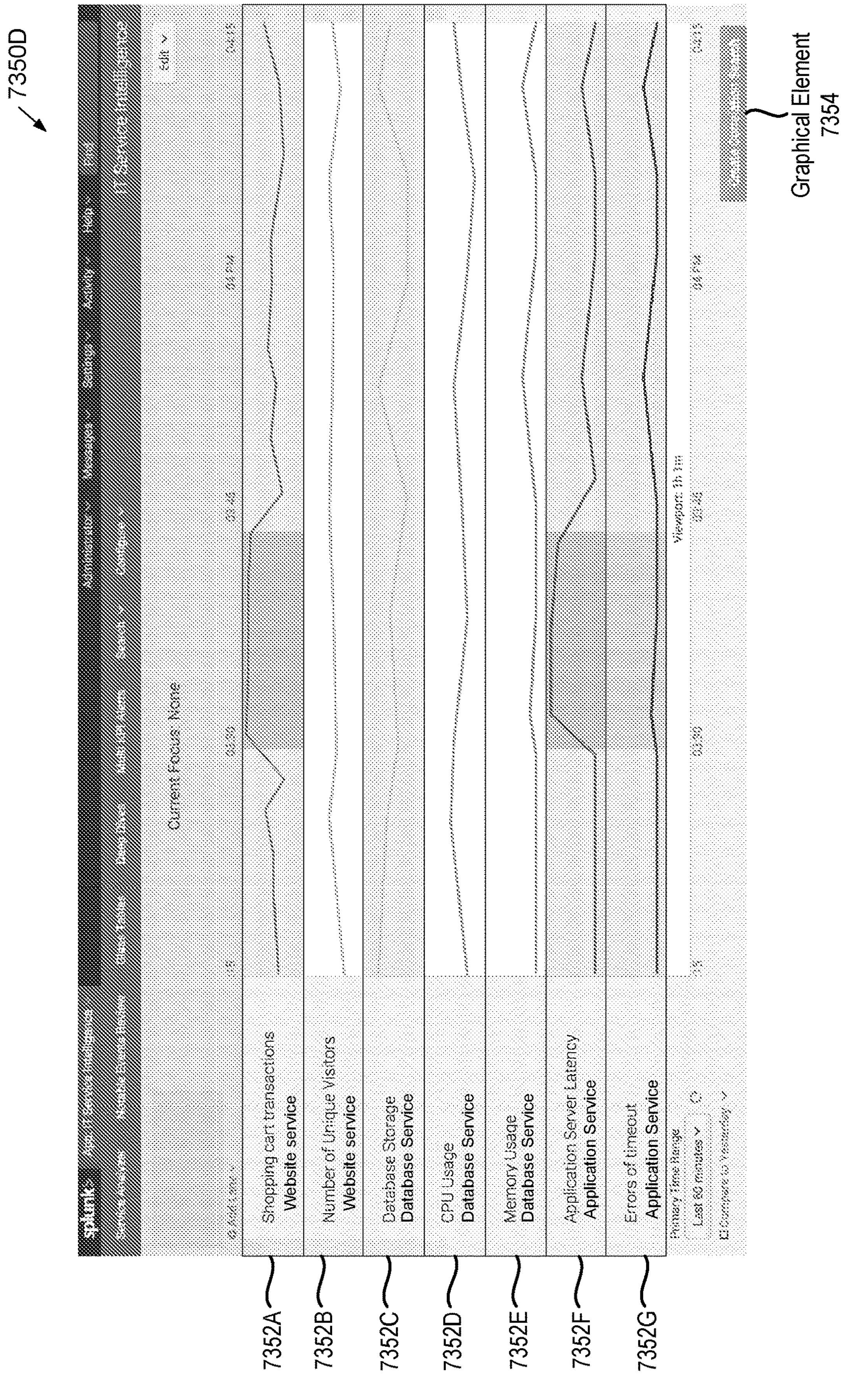

Referring to FIG. 73D, the user may then add graph lane 7352D-G and see that the KPI displaying the application server latency (e.g., graph lane 7352F) has entered the critical state. The user may also add a graph lane that can display some of the error messages (not shown). This graph lane may be unique compared to the other graph lanes because it may display textual information corresponding to one or more error messages. The user may customize the graph lane to filter the errors by type and to discover they relate to the network time-out messages.

Figure 73E:
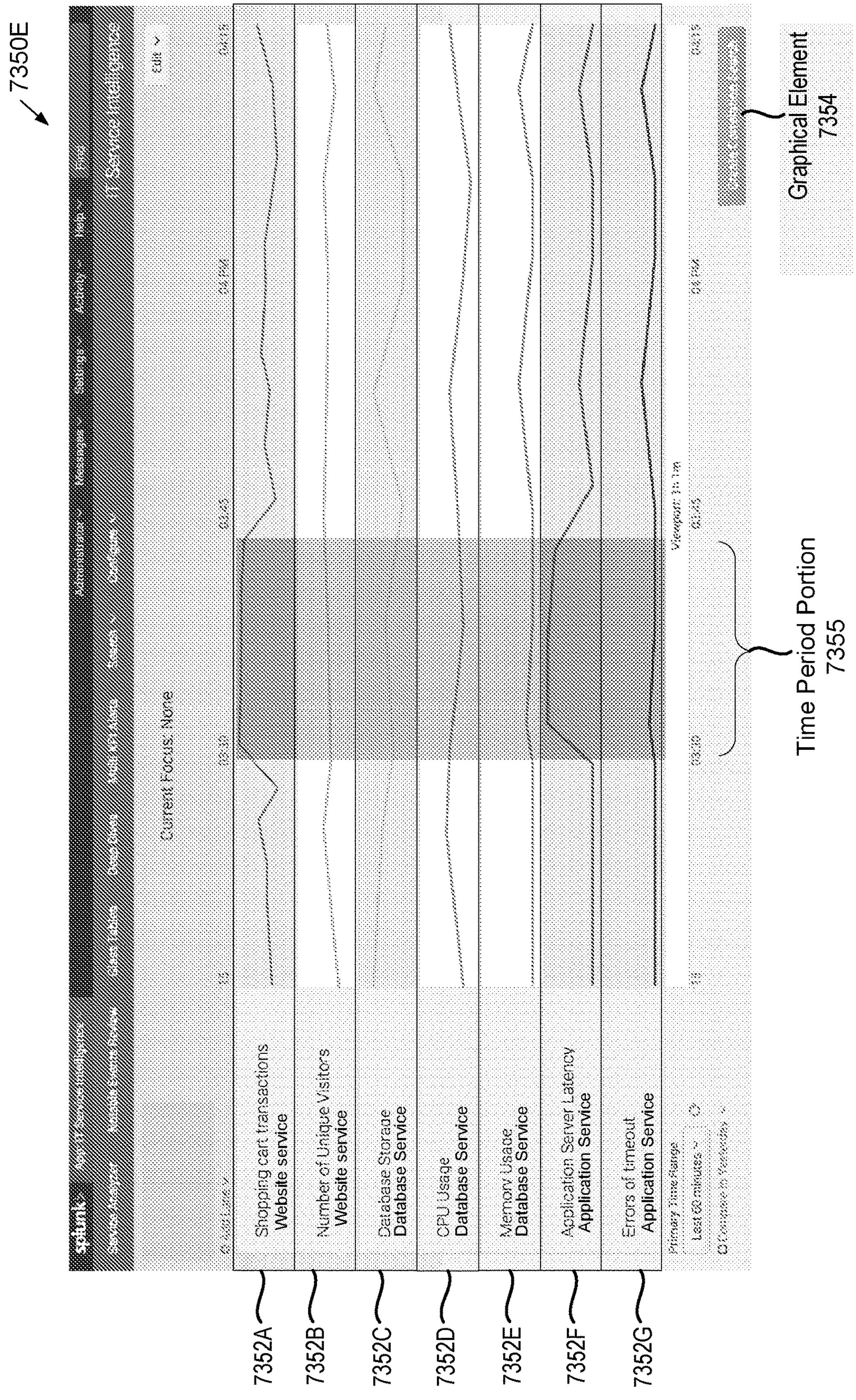

Together the graph lanes may enable the user to determine that the network used by the application service to communicate credit card transactions with the credit card companies has malfunctioned due to a component failure in the network. The user may review the graph lanes displayed to identify which graph lanes relate to the problem and which ones do not and remove the graph lanes that are unrelated. As shown in FIG. 73E, the user may select a time period portion 7355 that includes a portion of the time the problem was occurring. Selecting time period portion 7355 may cause GUI 7350E to zoom-in to the selected portion.

Figure 73F:
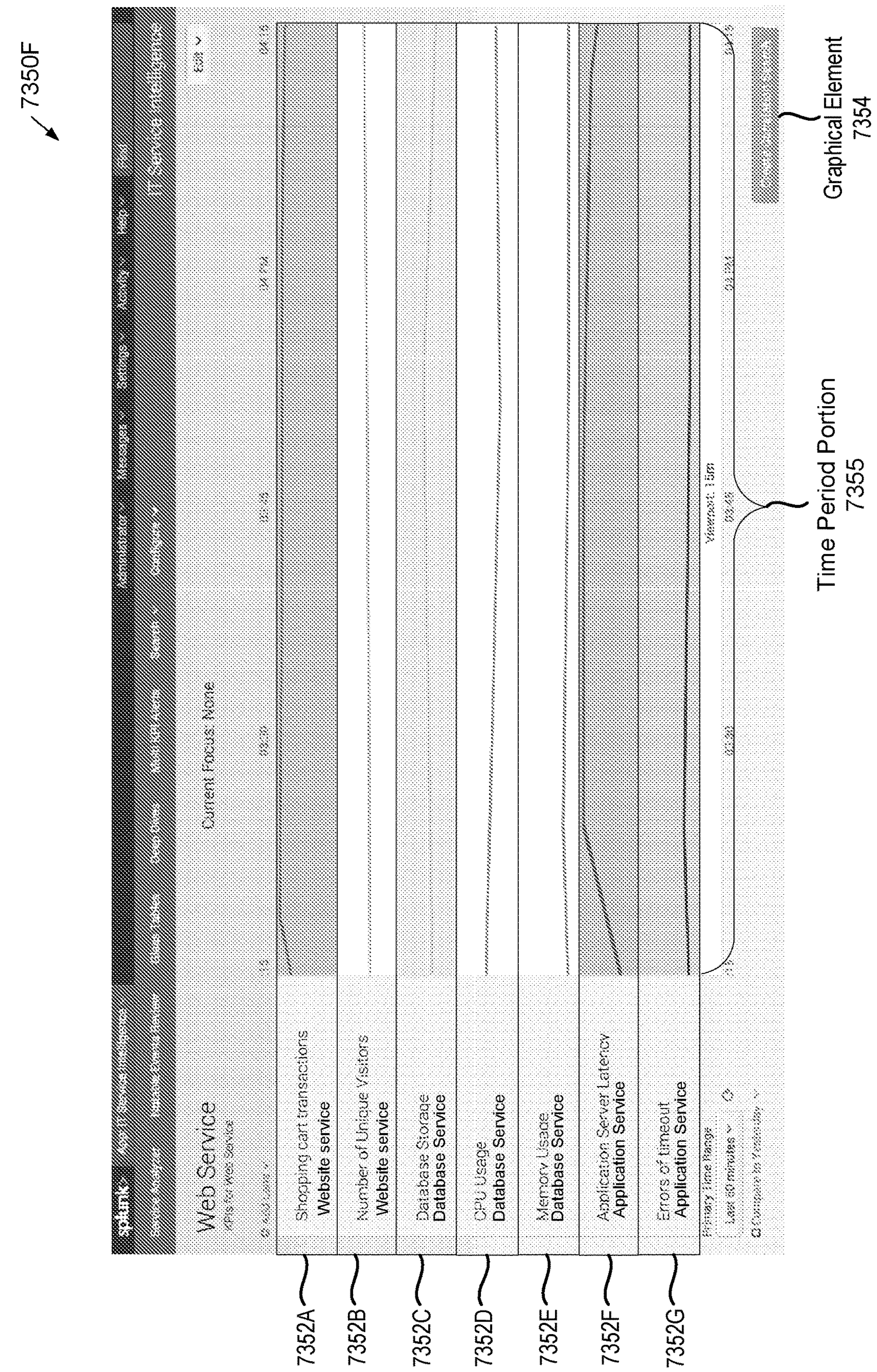

Referring to FIG. 73F, the display may now include the appropriate graph lanes and may be focused (e.g., zoomed-in) on the appropriate time period and the user may wish to configure the system to monitor for similar problems and to perform an action (e.g. alert) if the problem occurs again. This may be accomplished by selecting graphical element 7354, which will initiate the creation of a correlation search definition. The correlation search definition may be based on the selected period of time and currently displayed graph lanes (e.g., graph lanes 7352A-G). The correlation search definition may automatically be configured to generate an alert when the KPI data (e.g., KPI states or KPI values) has a pattern of fluctuations that is similar to that currently displayed.

The method of creating the correlation search definition may be the same or similar to methods 7320 of FIG. 72B. In this example, the method may identify the time period being displayed by the set of the graph lanes and iterate over each of the displayed graph lanes. As the method iterates over the graph lanes, it may identify fluctuations in the KPI by calculating the proportion of the time period that KPI was in a particular state or the statistical distribution of the KPI values during the time period. The method may convert proportions into a series of logical statements resolving to true when the proportion is satisfied. The logical statements may be stored as KPI criteria in an aggregate triggering condition within a correlation search definition.

Referring now to FIG. 74, the system may display GUI 7400 to enable a user to provide identification and configuration information to be associated with the correlation search definition. GUI 7400 may be initiated in response to the user request to create a new correlation search and may be displayed before, after or during the creation of the correlation search definition. GUI 7400 may include a search name field 7401, a description field 7403, a schedule type field 7405, a frequency field 7407, a time period field 7411 and a severity field 7413.

Search name field 7401 and description field 7403 may enable the user to enter a name and a description that may explain how and what the correlation search is used to identify. In the example use case, the user may set the name of the correlation search to “Web Service Down” and add description information describing the problem and potential root causes as well as contact information for the network administrator that may be able to address the problem.

Schedule type field 7405 and frequency field 7407 enable a user to specify when the correlation search should be run to check for the problem. Schedule type field 7405 may allow the user to select between a “Basic” schedule in which the user may provide a repeated cycle, for example, every 30 minutes or select a “Cron” schedule in which case the user may select a specific time within a day, week, year or other duration to run the correlation search.

Time period field 7411 may enable a user to set the time period to a specific duration of time. The time period field 7411 may default to the duration of time viewable in the graph lane and may allow the user to modify the value to a smaller or larger period of time.

Severity field 7413 may enable a user to set the default severity of the alert. This may correspond to the severity of the problem, which the correlation search is configured to detect. The selected severity may be associated with a notable event created as a result of the correlation search.

FIGS. 75A and 75B may display additional GUIs 7510 and 7520 that may be presented to the user during or after the creation of the correlation search definition and may be used to customize portions of the correlations search definition. GUI 7510 and 7520 may be included as part of a correlation search wizard. For example, GUI 7510 may be the first GUI of a correlations search wizard and GUI 7510 may be the last GUI of the correlations search wizard. The correlation search wizard may be pre-populated with statement 7522 (e.g., in search processing language) specifying the KPI criteria 7522, the search component and other information derived from the set of graph lanes and may allow the user to modify the information to be included in the correlation search definition.

As discussed herein, the disclosure describes various mechanisms for creating a correlation search definition based on one or more graph lanes. The disclosure describes graphical user interfaces that enable a user to select specific graph lanes and a specific duration of time on which the correlation search should be based. The disclosure also includes methods for running the correlation search to identify similar problems that occur at other points in time.

Topology Navigator for IT Services

Implementations of the present disclosure may include a graphical user interface (GUI) for a topology navigator that enables a user to view multiple services associated with an environment such as multiple IT services associated with an IT environment. The topology navigator GUI (also referred to as a "topology navigator") may include multiple display components for displaying information about the services. A first display component may be a topology graph component that displays the multiple IT services as service nodes within an interconnected graph. The connections within the graph may represent dependencies between the services and each service node may include one or more visual attributes representing one or more characteristics of the service such as performance characteristics of the service. An in-focus service node refers to a node that is highlighted via one or more visual attributes to indicate that it is a central point of focus within the topology graph component. A second display component may be a details display component that provides information for a service represented by the in-focus service node, which may be selected by the user. The information may include one or more key performance indicators (KPIs) associated with the service represented by the in-focus service node, or one or more historic selections or actions by the user in regard to the in-focus service, or some other information related to the in-focus service.

The topology navigator may enable a user to visually inspect characteristics such as the performance of multiple services to identify one or more dependent services with interesting characteristics (e.g., low performance). A user may navigate through the service nodes by selecting one or more service nodes. When a node is selected, it may become the in-focus node at which point both the topology graph component and the details display component may be updated to correspond to the new in-focus node. The topology graph component may be updated to display the selected node as the in-focus service node, such as by placing it at a certain location, and re-arrange, rebuild, or reformat the graph to display dependencies of the service represented by the new in-focus service node. The details display component may be updated to display the information associated with the service represented by the new in-focus service node. The user may repeatedly select different service nodes to navigate through the dependent services to view their performance and/or other characteristics and information. In one example, the topology navigator may be used in collaboration with the deep dive GUI, discussed in regards to FIGS. 50A-70. The deep dive GUI may include multiple time-based graph lanes visually illustrating how one or more services are performing during a period of time and the topology navigator may enable a user to add more time-based graph lanes to illustrate performance of additional services during the same period of time.

An advantage of the topology navigator as described in a context of service performance is that it may enable the user to investigate the performance of multiple services by navigating through its dependent services to detect or diagnose abnormal activity (e.g., performance degradation, system malfunction) or to identify a performance pattern of interest (e.g., increased usage of one or more services by end users). In one example, the abnormal activity may be a decrease in performance of a service caused by malfunctioning resources, overburdened resources, or non-optimized resource configurations. As the user navigates through the service nodes, the topology navigator may visually illustrate the aggregate performance of the one or more dependent services to enable the user to identify which dependent services have abnormal activity and may be adversely impacting a service of interest to the user.

FIG. 75C illustrates an example of a graphical user interface for a topology navigator 75300 that displays multiple service nodes and information related to the service nodes, in accordance with one or more implementations of the present disclosure. Topology navigator 75300 may include a topology graph component 75310, a details component 75320 and a service control element 75330.

Topology graph component 75310 may include a graphical visualization (e.g., graph) that illustrates the dependencies between the services. Topology graph component 75310 may include service nodes 75312A-F and connections 75314A-E. Service nodes 75312A-F may graphically represent multiple services configured to operate in the IT environment. Service nodes 75312A-F may be any shape, such as a circle, triangle, square or other shape capable of representing a particular service or set of services, and the shape of any node may be considered one of its visual attributes. Each service may be provided by one or more entities and may be defined by a service definition that may associate entity definitions for the entities that provide the service. Service definitions are discussed above in regards to FIGS. 11-17B. As shown in FIG. 75C, the services may include one or more web servers that function to provide IT services such as web hosting services (e.g., "HR Portal", "Customer Portal"), database management services (e.g., "DB Site 1" and "DB Site 2"), or any other IT services (e.g., "Email").

Connections 75314A-E represent the dependencies between the services of the IT environment. In one embodiment, a dependency is a relationship in which one service relies on or interacts with another service during its operation and may be bidirectional or unidirectional. A bidirectional dependency relationship is one where two services rely on one another such that an aspect of a first service relies on an aspect of the second service and an aspect of the second service relies on an aspect of the first service. With a bidirectional dependency, a performance problem with the operation of one service may adversely affect the other service. A unidirectional dependency relationship is one in which a first service relies on a second service but the second service may not rely on the first service. With a unidirectional dependency, a performance problem with the operation of second service may adversely affect the first service but a performance problem with the first service may not adversely affect the first service. In one embodiment, only unidirectional dependencies exist between services. In one embodiment, a dependency between services is related to other than performance, such as a sequencing or queuing dependency.

Details display component 75320 may display information related to a service represented by an in-focus service node within topology graph component 75310 and may be configured to update the information when different service nodes are in focus. As shown in FIG. 75C, service node 75312D is in-focus and as a result, details component 75320 displays information related to the corresponding service (e.g., service "Application Servers"). The information specifies multiple KPIs (KPIs 75322A-C) related to the service represented by the in-focus service node and provides details about these KPIs in the form of KPI widgets 75324A-C. Each KPI may indicate how a service is performing at a point in time or over a period of time and may comprise multiple KPI values derived from machine data pertaining to one or more entities providing the service. KPI widgets 75324A-C are graphical visualizations that may illustrate the KPI values and changes in the KPI values over time and will be discussed in more detail in regards to FIG. 75E.

Service control element 75330 may display the service that is represented by the current focal point (e.g., in-focus service node) within the topology navigator and may allow the user to select other service nodes to be the focal point. Service control element 75330 may be a graphical control element that transitions the in-focus service node identification from a current in-focus service node to another service node. In one example, service control element 75330 may visually identify an initial in-focus service node, which may be related to the service identified by a user when invoking the graphical user interface and may enable the user to transition the focus back from a subsequent in-focus service node to the initial in-focus service node without navigating through intermediate service nodes.

FIG. 75D illustrates an exemplary topology graph component 75410 that includes visual attributes that illustrate the aggregate KPI values (e.g., heath scores) of the service nodes, in accordance with one or more implementations of the present disclosure. This may be advantageous because it may enable the user to visually inspect multiple service nodes before, during or after navigation to identify services that are performing in a manner of interest to the user (e.g., low performance). Topology graph component 75410 may provide a graphical view of the dependencies and may enable the user to navigate between dependent nodes similar to topology graph component 75310 but may also include service nodes 75412A-F with visual attributes 75416A-C positioned in a service node arrangement 75417.

Service node arrangement 75417 may be an arrangement of service nodes where the positions or relative positions of service nodes 75412 A-F indicate the direction of dependency relationships of their respective services. As discussed above, the connections between service nodes indicate an existence of a dependency relationship but the connections may not indicate the direction of the dependency. In service node arrangement 75417, each of the connections (e.g., 75414A) indicates a unidirectional dependency and the position of a particular service node relative to the in-focus service node may indicate the direction of the dependency relationship. A particular service node may be positioned in one direction (e.g., above, below, left, right, angled) relative to the in-focus service node to indicate that a service represented by the particular service node depends on (e.g., is impacted by) a service represented by the in-focus service node and may be positioned in a different direction (e.g., opposite direction) to indicate the service represented by the particular service node is depended on by (e.g., impacts) the service represented by the in-focus service node. In one example, a first service node may be positioned above the in-focus service node to indicate that the service represented by the in-focus service node is dependent upon a service represented by the first service node, and a second service node may be positioned below the in-focus service node to indicate that a service represented by the second service node is dependent upon the service represented by the in-focus service node. In other examples, a third service node may be positioned below the in-focus service node to indicate that the service represented by the in-focus service node is dependent upon a service represented by the third service node and a fourth service node may be positioned above the in-focus service node to indicate that a service represented by the fourth service node is dependent upon the service represented by the in-focus service node. Positioning that defines the dependency direction may be predetermined or configurable.

As shown in FIG. 75D, service node arrangement 75417 may base the dependencies on direction and also organize the service nodes into multiple levels, such as first level 75418A, second level 75418B and third level 75418C which may be substantially parallel with one another. In-focus service node 75412D may be located in second level 75418B (e.g., middle level), first level 75418A may be in one direction (e.g., below) relative to the in-focus service node 75412D and the third level 75418C may be in the opposite direction (e.g., above) relative to the in-focus service node 75412D. In one example, the service nodes within the first and third levels may be positioned adjacent to one another along straight lines (e.g., rows) and the straight lines of each level may be parallel to one another so that the distance between a level (e.g., row of service nodes) and the level of the in-focus service node is a constant distance. In other examples, the distance between the service nodes and the in-focus service node may vary depending on the amount of the dependency between a service represented by a particular service node and the service represented by the in-focus service node. The dependency amount may be assessed based on the quantity of interaction between the service represented by the in-focus service node and a service represented by the particular service node relative to its interaction with other services, or other similar relationship metrics.

Visual attributes 75416A-C may affect the appearance of a service node to illustrate information related to the underlying service. Visual attributes 75416A-C may be based on color, shape, size, pattern, shade, overlay or other attribute capable of distinguishing nodes. Visual attribute 75416A may relate to a fill of a service node and may indicate a value of an aggregate KPI for the corresponding service. As discussed above in regards to FIG. 32-34A, the aggregate KPI may characterize the performance of a service by aggregating the values of multiple KPIs associated with the service, and the multiple KPIs may include all or substantially all of the active KPIs for the service. The aggregate KPI may indicate the performance of the service at a point in time or over a period of time. Each service may be associated with an aggregate KPI and the value of the aggregate KPI or its derivative may be illustrated by the fill of the corresponding service node. As shown in FIG. 75D, the service nodes may be different colors (e.g., red, yellow, green) which is represented in the figures as variations in the fill pattern. For example, service node 75412D has a visual attribute 75416A which may be associated with an aggregate KPI value within a middle range (e.g., represented by yellow fill), which may indicate the performance of the corresponding service is in a warning state. By comparison, service nodes 75412E and 75412F may include a visual attribute indicating that aggregate KPI values of their corresponding services are within a low range (e.g., represented by green fill) or high range (e.g., represented by red fill) respectively. This may enable a user in one embodiment to visually identify which of the dependent services has lower performance (e.g., red service node 75412F) and therefore enhances the user's ability to identify which dependent service is adversely affecting the service represented by the in-focus service node 75312D.

Visual attribute 75416B may be any visual attribute that identifies a service node as an initial in-focus service node. The initial in-focus service node may be the service node that is in-focus when the graphical user interface is initially invoked and may have been identified by the user prior to invoking topology navigator 75300. Visual attribute 75412B may be any visual attribute, such as an overlay, that modifies the service node to enable the user to identify the service node as an initial in-focus service node.

Visual attribute 75416C may be any visual attribute indicating that a service node is an in-focus service node (e.g., service node 75412D). Visual attribute 75416C may include associating a halo, highlighting, bolding or any other visual indicator that would signify that the service node is in-focus, for example, that it has been selected by a user.

FIG. 75E illustrates an exemplary details display component 75520 for topology navigator 75300, in accordance with one or more implementations of the present disclosure. Details display component 75520 may be similar to details display component 75320 of FIG. 75C and may display information related to a service represented by an in-focus service node. Details display component may include a title 75521, KPI names 75522A-Z, KPI widgets 75524A-Z and selection element 75525A-Z.

Title 75521 may identify the service and type of information being displayed. As shown, the service may be the "Application Servers" service and the type of information may be related to "KPI" information. Other types of information may be included within details display component 75520, such as any information related to the service represented by the in-focus service node (e.g., information from the service definition, entity definition, KPI definition or other source of related information).

KPI names 75522A-Z may identify one or more KPIs associated with the service represented by the in-focus service node. Each KPI may indicate a different aspect of how a respective service provided by one or more entities is performing at a point in time or during a period of time. In one example, all the KPIs associated with a service may be displayed within details display component 75520. In other examples, only a subset of the KPIs associated with a service may be displayed, such as only those KPIs previously selected by the current user or within a certain state or having a certain range of values. KPIs 75522A-C may be listed within details display component 75520 and may be associated with KPI widgets.

KPI widgets 75524A-Z may illustrate information about KPI 75522A-Z to enable a user to identify one or more relevant KPIs from the multiple KPIs listed in details display component 75520. In one example, KPI widgets 75524A-Z may be spark line widgets as shown. Spark line widgets are discussed in regards to FIG. 44 and may include portion 75526A and portion 75526B. Portion 75526A may include a graph (e.g., line graph, bar chart) that includes multiple data points and may be colored using a color representative of the state (e.g., normal, warning, critical) of which a corresponding data point falls into. Portion 75526B may include a numeric value that is associated with the KPI, where the numeric value may be a specific data point or a statistical value (e.g., average, median) derived from the one or more data points.

KPI widgets 75524A-Z may also include or be adjacent to one of selection elements 75525A-Z. The existence of a selection element may indicate to the user that the KPI may be selected to be added to another display component. In one example, selection element may include a plus sign and in other examples it may include another control element (e.g., radio button, check mark).

Details display component 75520 may also include a tabbed interface 75528 that may provide a user access to multiple tabs having different types or arrangements of information. Tab 75529 may include the KPI information discussed above and other tabs may include other information or similar information in different formats. For example, the KPIs may be displayed (e.g., listed) in a table format with rows and columns that may enable a user to sort or rearrange the information.

FIG. 75F illustrates an exemplary graphical user interface 75600 having a topology navigator 75300 and deep dive component 75640 including multiple time-based graph lanes, in accordance with one or more implementations of the present disclosure. Topology navigator 75300 may enable a user to navigate dependent services and to identify KPIs to be added as time-based graph lanes to the existing time-based graph lanes in deep dive component 75640. Topology navigator 75300 may include a first display component 75610 (e.g., topology graph component) and a second display component 75620 (e.g., details display component)

Deep dive component 75640 may be similar to a deep dive graphical user interface discussed in regards to FIGS. 50A-70 and may include multiple time-based graph lanes 75642A-D. Time-based graph lanes 75642A-D may provide a graphical visualization of KPI values over a time range. Each time-based graph lane 75642A-D may have different graph styles or colors or the same graph styles and colors. For example, some graph lanes may include line graphs whereas others may include bar charts. Time-based graph lanes 75642A-D may correspond to different services or may correspond to the same services and may be calibrated to the same time range and time scale. The time range and scale may be reflected by a time axis that runs parallel to at least one graph lane. The time axis may include an indication of the amount of time represented by the time scale and an indication of the actual time of day represented by the time scale. In one implementation, a bar running parallel to the graph lanes includes an indication of the amount of time represented by the time scale (e.g., 1 hour). Time-based graph lanes 75642A-D may be the same or similar to time-based graph lanes discussed elsewhere in this disclosure.

First and second display components 75610 and 75620 may be collectively referred to as topology navigator 75300 and may interact with deep dive component 75640 to enable a user to affect the content and/or appearance of deep dive component 75640, such as by adding KPIs or other information to deep dive component 75640. For example, a user may navigate through multiple dependent services and select one of the dependent services using first display component 75610. The user may also select a KPI (e.g., KPI 75322A) from a list of KPIs within second display component 75620. In response to selecting a KPI, deep dive component 75640 may be updated to include a time-based graph lane corresponding to the KPI selected by the user.

Topology navigator 75300 may include a control element 75642 that expands (e.g., invokes, maximize, restores) or hides (e.g., minimize, close) topology navigator 75300. As shown, the topology navigator 75300 may be in an expanded mode and control element 75642 may appear as an arrow. After the topology navigator 75300 is expanded, the arrow may point toward the right (e.g., greater-than symbol) and enable the user to select the control element 75642 to close topology navigator 75300. When topology navigator 75300 is minimized or hidden, the arrow may point toward the left (e.g., less-than symbol) and enable the user to expand topology navigator 75300.

Topology navigator 75300 may be positioned near to or adjacent to deep dive component 75640. As shown in FIG. 75F, topology navigator 75300 is located to the right of deep dive component 75640 and therefore in the right portion of graphical user interface 75600. In other examples, it may be above, below, to the left or any other position relative to deep dive component 75640. In an alternative GUI layout, first and second display components 75610 and 75620 may be on opposite sides of deep dive component 75640.

FIGS. 75G and 75H depict flow diagrams of exemplary methods 75700 and 75800 for creating and updating a topology navigator, in accordance with one or more implementations of the present disclosure. Method 75700 is a method of displaying the topology navigator and updating its display components in response to user input, in accordance with some aspects of the present disclosure. Method 75800 is directed to utilizing the topology navigator for adding time-based graph lanes to a deep dive component, in accordance with some aspects of the present disclosure. Methods 75700 and 75800 may be performed by processing devices that may comprise hardware (e.g., circuitry, dedicated logic), software (such as is run on a general purpose computer system or a dedicated machine), or a combination of both. Methods 75700 and 75800 and each of their individual functions, routines, subroutines, or operations may be performed by one or more processors of a computer device executing the method.

For simplicity of explanation, the methods of this disclosure are depicted and described as a series of acts (e.g., blocks, steps). Acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 75700 and 75800 may be performed to produce a GUI as shown in FIGS. 76C-F.

Referring to FIG. 75G, method 75700 may be performed by processing devices of a server device or a client device and may begin at block 75710. At block 75710, the processing device may cause for display a graphical user interface with a first display component depicting multiple service nodes and their dependencies and a second display component depicting information related to a service represented by an in-focus service node. Each service node within the first display component may represent one or more services. A service may be provided by one or more entities and each entity may correspond to an entity definition (e.g., FIG. 10B and FIGS. 5-10A) having an identification of machine data from or about the entity. Each service may correspond to a service definition (e.g., FIG. 17B and FIGS. 11-15) associating the entity definitions for the entities that provide the service and having a key performance indicator (KPI) defined by a search query (e.g., FIG. 34D) that derives a value indicating performance of the service from machine data identified in the associated entity definitions.

The first display component (e.g., topology graph component 75310) may graphically depict the plurality of service nodes as a connected graph of nodes. The graph may be fully connected so that each service node is connected to at least one other service node or it may be partially connected where there may be one or more service nodes that are not connected to another node. In one example, the connected graph may be limited to service nodes having a distance of one from the in-focus service node. In another example, the connected graph may be limited to service nodes having a distance of two or less from the in-focus service node. Accordingly, in such an example, the connected graph may display only a localized portion of a larger, logical graph that includes the many services and interdependencies defined for an environment. Various embodiments could display varying portions or the whole of such a logical graph.

The position of each service node relative to the in-focus service node or another attribute may indicate a direction of a dependency between a service represented by the in-focus service node and a service represented by the respective service node. In one example, a first service node may be positioned above the in-focus service node to indicate that the service represented by the in-focus service node is dependent upon the service represented by the first service node and a second service node may be positioned below the in-focus service node to indicate the service represented by the second service node is dependent upon the service represented by the in-focus service node. In another example, service nodes may be displayed in multiple levels of interconnected service nodes. A first level may include service nodes representing services that depend upon the service represented by the in-focus service node and a second level may include only the in-focus service node. A third level may include service nodes representing services that the service represented by the in-focus service node depends upon.

The service nodes within the first display component may include one or more visual attributes. In one example, a visual attribute may indicate a value of an aggregate key performance indicator (KPI) characterizing activity (e.g., performance, health) of the respective service at a point in time or during a period of time. The value of the aggregate KPI may be calculated in view of multiple KPI values, each of the multiple KPI values may be derived by executing a search query associated with a respective KPI. The visual attribute may be associated with each and every service node displayed in the first display component or may only be associated with a subset of the service nodes, such as only the dependent nodes and the in-focus service node. In another example, a visual attribute may identify one of the service nodes as an initial in-focus service node. The initial in-focus service node may be a service node that is in-focus when the graphical user interface is first invoked. This may be a default service node (e.g., root node) or may be identified by a user prior to invoking the first display component. In yet another example, a visual attribute may distinguish the in-focus service node from other service nodes, wherein the visual attribute comprises a halo around the in-focus service node.

The second display component (e.g., display component 75320) may include information related to the service represented by the in-focus service node. The information may include multiple key performance indicators (KPIs) associated with a service represented by the in-focus service node. In one example, the information within the second display component may include multiple spark line widgets and each spark line widget may include a graph (e.g., line graph, bar chart) of the respective KPI. The spark line widget may be an image (e.g., thumbnail image) that is static or may be an image that is updated continuously or periodically with different or additional information. In other examples, the information within the second display component may include historical information related to the one or more KPIs, such as information that indicates the KPI has been previously selected for inclusion within a display component.

At block 75712, the processing device may receive a user selection of a service node. The user may select a service node using a variety of different methods. A first method may involve the user selecting one of the nodes from the graph. This selection may involve clicking a mouse or tabbing through the nodes until the appropriate node is selected. A second method may involve the user selecting a graphical control element (e.g., service control element 75330 of FIG. 75C) at which point the graphical control element may provide a list of services and enable a user to select one of the services to transition focus to the corresponding service node. Once a selection has been made, the method may proceed to block 75714.

At block 75714, the processing device may transition the in-focus service node identification within the first display component from a first service node to a second service node in response to the user selection. The in-focus service node identification may refer to visually identifying a service node as a central point of focus using the visual attributes of the service node and/or the position of the service node within the first display component. Transitioning the in-focus service node identification may involve the first display component updating the visual attributes and/or the location of the one or more service nodes. For example, the first display component may update the first service node to remove the focus visual attribute and may update the second service node to add the focus visual attribute. In another example, transitioning the in-focus service node identification may involve repositioning the service nodes and adding or removing service nodes. The first display component may reposition the second service node to a middle region of the first display component and reposition the first node to be above or below depending on its dependency relationship. The first display component may remove service nodes that are not within a distance of one and therefore do not have a direct dependency relationship with the second service node. The first display component may add service nodes that are within a distance of one and therefore have a direct dependency relationship with the second service node. In one example, method 75700 may identify which service nodes to add and remove by analyzing one or more service definitions associated with the service represented by the in-focus service node to determine dependencies between this service and other services. For example, the service definition may include links to services that have a dependency relationship with the service represented by the in-focus service node.

At block 75716, in response to the user selection of a new in-focus service node, the processing device may update the second display component with information related to a service represented by the new in-focus service node (e.g., other service node). Updating the second display component may involve replacing the KPIs associated with a previous in-focus service node with the KPIs associated with the new in-focus service node.

At block 75718, the processing device may check to see if it has received a user selection of another service node. If the processing device has received another user selection, the method may branch back to block 75714 and transition to the newly selected service node. Responsive to completing the operations described herein above with references to block 75718, the method may terminate.

Referring to FIG. 75H, method 75800 presents another flow diagram of an exemplary method for using the topology navigator to, for example, investigate abnormal activity of a service and identify a KPI of a dependent service to be added to a list of time-based graph lanes, in accordance with one or more implementations of the present disclosure. Method 75800 may be similar to method 75700 but may include within the graphical user interface a third display component (e.g., a deep dive component 75640) that displays multiple KPIs as time-based graphical visualizations. Method 75800 may be performed by processing devices of a server device or a client device and may begin at block 75810.

At block 75810, the processing device may receive user input identifying a service and requesting a graphical user interface. The user input may be derived from a different graphical user interface or information received from a command line interface (CLI) or configuration file. In one example, the user input to identify the service and to request a GUI may be the same action. For example, a user may select (e.g., click or double click) a control element that represents a service on another graphical user interface (e.g., Glass Table) and the location of the selected action may identify a service and the type of selected (e.g., double click) action may be the request. In another example, the user input identifying the service may be separate from the user input requesting the graphical user interface. For example, the user may identify a service with a first action (e.g., click) and may request the graphical user interface with a second action. The first and second actions may be within different GUIs or portions of GUIs.

At block 75811, the processing device may cause for display a GUI with multiple time-based graph lanes (e.g., Deep Dive GUI) in response to the user input. The GUI may be similar to the graphical user interface discussed in regards to FIG. 75F and may include multiple time-based graph lanes that provide graphical visualizations of multiple KPI values over a time range. The GUI may include a bar along a portion of the GUI, for example, along the right portion of the GUI. The bar may represent the topology navigator in a minimized or hidden mode.

At block 75812, the processing device may receive a user request to display the topology navigator. The user request may be initiated when a user selects a control element (e.g., arrow with appearance of a less-than symbol) and may result in the topology navigator expanding. The user may also select the control element again to close or minimize the topology navigator. The control element may be advantageous because expanding and minimizing the topology navigator may alter the size of the respective display elements and may provide for better use of the available display area.

At block 75813, the processing device may display the first and second display components of the topology navigator, which includes multiple dependent service nodes with visual attributes characterizing the performance of the respective services. This block may be similar to block 75710 of method 75700 and may include displaying the service node identified by the user as well service nodes whose services depend from or are impacted by the service represented by the identified service node. Each service node may include visual attributes that modify the fill of the service node to indicate the value of the respective aggregate KPI value. This may be advantageous because it may allow a user to visually inspect the performance of the service represented by the in-focus service node and its dependent services. It may also enable the user to identify one or more dependent services that may be causing a decrease in performance of the selected service.

At block 75814, the processing device may check if it received a first user selection identifying a dependent service node from the first display component. If the user has not identified another service node, the method may proceed to block 75817 where the processing server may receive a selection of a KPI. If the user has selected another service node, the method may proceed to block 75815 and block 75816.

At blocks 75815 and 75816, the processing device may update the first display component and second display component respectively. Block 75815 and 75816 may be the same or similar to blocks 75714 and 75716 of method 75700 and may be performed in parallel or sequentially. At block 75815, the processing device may update the first display component to transition the in-focus service node identification to the new selected node. At block 75816, the processing device may update the second display component to display multiple KPIs corresponding to the service represented by the current in-focus service node.

At block 75817, the processing device may receive a second user selection identifying a KPI from the second display component to be added to the multiple time-based graph lanes. As discussed in regards to FIG. 75E, the second display component (e.g., details display component 75320) may display multiple KPIs associated with the service of the in-focus service node. Each of the KPIs may be represented by a widget that illustrates the performance of the KPI. The second display component may be advantageous because it may allow a user to visually inspect the performance of the service of the in-focus service node by viewing the constituent KPIs associated with the service and enables the user to identify one of the KPIs to be added as a time-based graph lane for further analysis.

At block 75818, the processing device may prompt the user for configuration information for an additional graph lane. The prompt may be in the form of a lane customization GUI (e.g., dialog window) and may be the same or similar to GUI 5200 of FIG. 52. The lane customization GUI may indicate to the users that they are adding a new lane and may include multiple fields associated with a graph lane such as graph type, graph color, source and search query. The fields may be pre-populated with default values derived from the user-selected KPIs of the second display component and may allow the user to view or change the values. The user may then select to save or create the graph lane at which point the method may proceed to block 75819.

At block 75819, the processing device may add a graph lane for the identified KPI to the multiple time-based graph lanes of the third display component (e.g., Deep Dive display component). The graph lane may provide performance data for the KPI and may help the user to detect or diagnose abnormal activity (e.g., performance degradation, system malfunction) or to identify a performance pattern of interest (e.g., increased usage of one or more services by end users).

The newly added graph lane and the user selected KPI widget may have similarities and differences. Both the graph lane and the KPI widget may represent the same KPI and may include the same or similar data values, but the two may display the data values in different manners. In one example, the graph lanes may continuously or periodically update the visualization to illustrate changes in real time and the KPI widget may be a static image (e.g., thumbnail). In another example, the KPI widget may be configured similar to the corresponding graph lane and present and update the same information in the same manner.

As discussed herein, the disclosure describes a graphical user interface for a topology navigator that may enable a user to view multiple IT services associated with a user's IT environment. The topology navigator may include multiple display components for displaying information about the services. A first display component (e.g., topology graph component) may display multiple services as a graph of interconnected nodes and a second display component (e.g., details display component) may display information about one or more of the services. The topology navigator may enable a user to visually inspect the performance of multiple services and navigate through the multiple services to identify one or more dependent services having performance of interest (e.g., degraded performance) that may adversely affect a service of interest to the user. In particular, the user may navigate through service nodes representing the multiple services and select a service node representing a service of interest to the user, at which point the selected service node may become the in-focus service node. In response to the user selection, both display components may be updated to correspond to the new in-focus node. The second display component may then display KPIs associated with a service represented by the new in-focus node, and one or more of these KPIs can be selected and added to another GUI or to other display components within the same GUI.

KPIs Defined Using a Common Information Model

In certain implementations, in order to create queries, a knowledge of the fields that are included in the events with respect to which such queries are associated and/or a knowledge of the query processing language used for such queries can be advantageous. While certain users may possess domain understanding of underlying data and knowledge of the query processing language, other users (e.g., those who may be responsible for setting up/defining KPI's, for example) may not have such expertise. Accordingly, in certain implementations a common information model (CIM) can be utilized/applied. The referenced CIM can be, for example, a data model that is utilized or applied across multiple data sources. Such a CIM can simplify the creation of KPIs, reports, and other visualizations, thereby assisting end users in utilizing the described technologies.

A KPI associated with a service can be defined by a search query that produces a value derived from machine data, such as may be identified in entity definitions specified in a service definition of the service. Each value can, for example, be indicative of how a particular aspect of a service is performing at a point in time or during a period of time.

Additionally, in certain implementations, the referenced KPI can be configured at a more abstract level as well, such as with respect to the overall performance of the service. For example, an aggregate KPI can be configured and calculated for a service to represent the overall health of a service. For example, a service may have 10 KPIs, each monitoring a various aspect of the service. The service may have 7 KPIs in a Normal state, 2 KPIs in a Warning state, and 1 KPI in a Critical state. The aggregate KPI can be a value representative of the overall performance of the service based on the values for the individual KPIs.

As also described herein, implementations of the present disclosure can provide a service-monitoring dashboard that displays one or more KPI widgets. Each KPI widget can provide a numerical or graphical representation of one or more values for a corresponding KPI or service health score (aggregate KPI for a service) indicating how a service or an aspect of a service is performing at one or more points in time. Users can be provided with the ability to design and draw the service-monitoring dashboard and to customize each of the KPI widgets. A dashboard-creation graphical interface can be provided to define a service-monitoring dashboard based on user input allowing different users to each create a customized service-monitoring dashboard. Users can select an image for the service-monitoring dashboard (e.g., image for the background of a service-monitoring dashboard, image for an entity and/or service for service-monitoring dashboard), draw a flow chart or a representation of an environment (e.g., IT environment), specify which KPIs to include in the service-monitoring dashboard, configure a KPI widget for each specified KPI, and add one or more ad hoc KPI searches to the service-monitoring dashboard. Implementations of the present disclosure provide users with service monitoring information that can be continuously and/or periodically updated. Each service-monitoring dashboard can provide a service-level perspective of how one or more services are performing to help users make operating decisions and/or further evaluate the performance of one or more services.

A KPI pertaining to a service (e.g., for monitoring CPU usage for a service provided by one or more entities) can be defined by a search query directed to search machine data. A service definition of the service associates entity definitions of the entities that provide the service with the KPI, and the entity definition includes information that records the association between the entity and its associated machine data.

In certain implementations, input specifying the search processing language for the search query defining the KPI can be provided/received. The input can include a search string defining the search query and/or selection of a data model to define the search query. Data models are described in greater detail herein, such as in conjunction with FIGS. 79B-D and E. The search query can produce, for a corresponding KPI, a value derived from machine data that is identified in the entity definitions that are specified in the service definition. It should also be understood that, as described in detail herein, the referenced search query can include one or more field identifiers to, for example, filter the result of the search query based on specific values included in respective one or more fields in events being searched. For example, the where clause of the search query may include the WHERE command followed by a key/value pair (e.g., WHERE host=Vulcan). In one implementation, "host" is a field identifier and "Vulcan" is a value stored in the field identified as "host."

In certain implementations, a service monitoring system can define a search query for a KPI using a data model (e.g., via a GUI such as is depicted in FIG. 24). Such a GUI can enable the defining of the search query for the KPI using a data model. A data model refers to one or more objects grouped in a hierarchical manner and can include a root object and, optionally, one or more child objects that can be linked to the root object. A root object can be defined by search criteria for a query to produce a certain set of events, and a set of fields that can be exposed to operate on those events. Each child object can inherit the search criteria of its parent object and can have additional search criteria to further filter out events represented by its parent object. Each child object may also include at least some of the fields of its parent object and optionally additional fields specific to the child object, as described herein in conjunction with FIGS. 79B-D and E.

Referring to FIG. 75I, data model 700 may include a top level data model that may be referred to as a root data model 710. In some embodiments, the root data model 710 may represent a type of event. Each of the data sub-models 720, 730, 740, 750, 760, and 770 may be referred to as child of the data model 710. In some embodiments, the root data model 710 may represent a broader category of events and the data sub-models 720-770 may represent different subsets of the events that are represented by the root data model 710.

In some embodiments, a data sub-model may inherit a subset of the fields of the parent data model and/or may have additional fields, and the events to which the sub-model applies may be determined by adding additional filtering criteria (e.g., relating to field criteria) to the set of events (or search query) defining the parent data model such that the events associated with the sub-model are a subset of the events associated with the parent data model when both the parent and child data models are applied to the same source data. The root data model 710 may be associated with a first criterion for a first field (its search). The data sub-models 720 and 730 may also be associated with the first criterion for the first field. However, in some embodiments, the data sub-model 720 may also be associated with a second criterion for the first field or a second field, and the data sub-model 730 may be associated with a third criterion for the first field or a third field. Accordingly, if the root data model 710 is selected to perform a search, more events may be returned than if one of the data sub-models 720 or 730 is selected to perform a search on the same data.

The data model 700 may be applied to search any data and may define criteria of a search query. For example, if the parent data model 710 is selected to perform a search, then the events that satisfy the search criteria defined by the data model 710 may be returned. However, if the data sub-model 720 is selected to perform a search on the same data, then the events of the data that satisfy the search criteria defined by the data sub-model 720 may be returned. A search that is performed based on the search criteria of the data sub-model may result in fewer returned events than if a parent data model 710 is selected to perform a search on the same data.

Accordingly, a data model may be used to define different hierarchical levels to perform searches on data. The data model may be saved and applied to various different events. In some embodiments, a field module and an associated GUI may be used to generate a data model based on a search of data. For example, in response to an initial search query, a data model may be generated based on the initial search query. In some embodiments, the criteria of the initial search query may be associated with the root data model that is generated in response to the initial search query. Furthermore, when one or more automatically discovered fields are displayed in the GUI, the data model includes those fields as its attributes. A sub-model may be generated by receiving additional filtering criteria for fields through the GUI, and then a narrower search incorporating the initial search query's criteria and the criteria entered through the GUI defines the events associated with the sub-model, and automatically discovered fields determined to be of importance in the set of events generated by the filtered results using the criteria entered through the GUI are the sub-model's fields (attributes).

The data model that is generated based on the initial search query and modified based on values for the fields displayed in the GUI may be saved and used to perform searches of other data. For example, the data model may be generated after an initial search query of source data and may further be modified based on discovered fields of the events of the source data that are returned in response to the initial search query. The data model may be saved and subsequently applied to perform a search of events of different source data.

As discussed above, each of the referenced KPIs can measure an aspect of service performance at a point in time or over a period of time. Each KPI is defined by a search query that derives a KPI value from machine data such as the machine data of events associated with the entities that provide the service. In certain implementations, information in the entity definitions may be used at KPI definition time or execution time to identify the appropriate events. The KPI values derived over time may be stored to build a valuable repository of current and historical performance information for the service, which may itself be queried. Aggregate KPIs may be defined to provide a measure of service performance calculated from a set of service aspect KPI values, possibly across defined timeframes, and possibly across multiple services. A particular service may have an aggregate KPI derived from all of the aspect KPI's for the service for use as an overall health score for the service.

Additionally, in certain implementations, various visualizations can be built on the described service-centric organization of event data and the KPI values generated and collected. Visualizations can be particularly useful for monitoring or investigating service performance. For example, a service monitoring interface can be provided that is suitable as the home page for ongoing IT service monitoring. The interface is appropriate for desktop use or for a wall-mounted display in a network operations center (NOC), for example. The interface may prominently display a services health section with tiles for the aggregate KPI's indicating overall health for defined services, and a general KPI section with tiles for KPI's related to individual service aspects, for example. The tiles of each section may be colored and ordered according to factors such as the KPI state value, and may display KPI information in a variety of ways. The KPI tiles can be interactive so as to provide navigation to visualizations of more detailed KPI information.

Implementations of the present disclosure can enable the filtering down from various system data models to those data models that are populated and are also determined to be relevant, e.g., to a particular application such as a service performance monitoring application (and/or that are user created). For example, a data model specific to Enterprise Security would not be included for selection in a drop-down menu (e.g., in a GUI presented for IT service performance monitoring).

FIGS. 75J and 75K depict flow diagrams of exemplary method 79400 for performing a search query in response to detecting a scheduled time for a KPI, in accordance with one or more implementations of the present disclosure. Method 79400 may be performed by processing devices that may comprise hardware (e.g., circuitry, dedicated logic), software (such as is run on a general purpose computer system or a dedicated machine), or a combination of both. Method 79400 and each of its functions, routines, subroutines, or operations may be performed by one or more processors of a computer device executing the method.

For simplicity of explanation, the methods of this disclosure are depicted and described as a series of acts (e.g., blocks, steps). Acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 79400 may be performed to produce a GUI.

Referring to FIG. 75J, method 79400 may be performed by processing devices of a server device or a client device and may begin at block 79410. At block 79410, the processing device may detect a scheduled time for a key performance indicator (KPI). Such a KPI can reflect, for example, how a service provided by one or more entities is performing, such as is described herein. Additionally, in certain implementations, stored entity definition information can record the association between each of the referenced entities with its associated machine data. Moreover, in certain implementations, stored service definition information can associate the entities that provide the referenced service. Moreover, the referenced KPI can be defined by a search query. Such a search query can, for example, derive a value from the referenced associated machine data. The search query can be defined using a data model (e.g., a data model selected by a user from a list of available data models), and can include one or more field identifiers specified in the data model. For example, the WHERE command of the search query may filter the results of the search query associated with the selected data model to only return data that is associated with the host name "Vulcan" (e.g., the field identifier is "host" and the value of the field "host" is "Vulcan"). When defining the KPI, a user may also specify frequency or any other timing parameter(s) for executing the KPI search query (e.g., every 2 minutes, at a scheduled time during the day, etc.).

At block 79412, the processing device can perform a search query (e.g., the search query that defines the referenced KPI). In certain implementations, such a search query can be performed in response to detecting the referenced scheduled time (e.g., detected at block 79410). In certain implementations, the referenced search query can include a field identifier, such as a field identifier specified in a data model. Additionally, in certain implementations, the referenced search query can be defined in response to an input received via a graphical user interface (GUI). Moreover, in certain implementations such a data model can be a common information model (CIM).

Referring to FIG. 75K, various further aspects of block 79412 are described. At block 79412-A, the processing device can associate values in the associated machine data, such as those having disparate field names. In certain implementations, such values can be associated in accordance with disparate schemas (which may include a late-binding schema) with a field identifier, such as a field identifier specified in the referenced data model. For example, the field identifier specified in the referenced data model can be mapped to values in the machine data using the late-binding schema discussed herein.

At block 79412-B, the processing device can process the referenced associated values. In certain implementations, such associated values can be processed as semantically equivalent data instances. Such semantically equivalent data instances can reflect, for example, relationships, similarities, etc., between aspects of machine language and fields in the referenced data model (e.g., machine language corresponding to 'network address' and a field corresponding to 'IP address'). Moreover, in certain implementations each of the referenced associated values can be processed as a value in a statistical calculation.

An example may aid in understanding. In this example, events identified with an Entity A are associated with a schema, such as a late binding schema, capable of extracting a value for a field named "delay_ms" from each event. Events identified with an Entity B are associated with a different schema, such as a late binding schema, capable extracting a value for a field named "tot_delay" from each event. The hypothetical events of Entity A and Entity B come from different respective sources and have different respective contents from one another, leading to the use of the different schemas. In this example, a particular event associated with Entity A has machine data containing "58" that can be extracted by its respective schema as the value for a field named "delay_ms"; and a particular event associated with Entity B has machine data containing "120" that can be extracted by its respective schema as the value for a field named "tot_delay". The values "58" and "120" both represent individual measurements of the number of milliseconds it took in total to get a response to a ping request. The values have the same semantic but are difficult to use in common because they are associated with disparate field names from disparate schemas. In another example, the value "58" can represent a measurement in milliseconds and the value "120" can represent a measurement in seconds. In such a scenario a conversion (e.g., a unit conversion, such as from seconds to milliseconds) can be performed to ensure that the respective values conform to a common unit of measurement associated with the common field name.

The delay_ms field associated with Entity A events and the tot_delay field associated with Entity B events can be linked together by associating each with a common field name, such as "delay_total", of a common information data model. The linking may be accomplished, for example, by making a record in storage of the association of each with the common field name. During search query processing, the computing machine can make reference to the stored association to use the common field name as an alternate field name, or alias, for the field values extracted from the events associated with both Entity A and Entity B, and the common information data model can serve as a logical overlay to the field naming of disparate schemas.

Continuing with the example, a KPI is defined by a search query that includes the strings "search . . . where delay_total>0" to select events for processing that have a delay_total field with a value greater than zero, and "|stats avg(delay_total)" to perform a calculation of the average of the delay_total field values for the selected events The "delay_total" field name in the search query string is the field name from the common information data model. Other selection criteria in the KPI search query select events associated with Entity A and Entity B. When the KPI search query is executed, such as when the computing machine detects that a prescribed period has elapsed, the hypothetical events of Entity A and Entity B will be processed in view of their association with the common information data model so that their respective values of 58 and 120 will be processed as semantic equivalents. Both will be used to satisfy the "delay_total>0" selection criteria for their respective events, and both will be used to calculate the average of the delay_total values.

In one embodiment, the stored association between a schema and a data model may be by reference to the corresponding field name of each. In one embodiment, the stored association between a schema and a data model may be by the data model field name referencing extraction information associated with the corresponding field name of the schema. In one embodiment, field values may be extracted from event data using the schema and then associated with the common field name on a field name basis. In one embodiment, field values may be extracted from event data using information from the schema and previously associated with the common field name. Other embodiments are possible. Moreover, field values may not be merely mapped to the common field name, but transformations are possible as part of the process. For example, a scaling factor may be applied to the data value to make it conform to a common unit of measurement associated with the common field name.

Accordingly, data models can be conveniently used to define search queries for KPIs and such search queries can be performed at scheduled time against events using associations between values in the events and field specifiers in data models in accordance with respective schemas. As such, the creation of KPIs is significantly simplified and no longer requires user knowledge of the specific fields that are included in the events being searched, and user extensive knowledge of the query processing language used for KPI search queries.

1.1 Overview

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different implementations of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 76 presents a block diagram of an exemplary event-processing system 7100, similar to the SPLUNK® ENTERPRISE system. System 7100 includes one or more forwarders 7101 that collect data obtained from a variety of different data sources 7105, and one or more indexers 7102 that store, process, and/or perform operations on this data, wherein each indexer operates on data contained in a specific data store 7103. These forwarders and indexers can comprise separate computer systems in a data center, or may alternatively comprise separate processes executing on various computer systems in a data center.

During operation, the forwarders 7101 identify which indexers 7102 will receive the collected data and then forward the data to the identified indexers. Forwarders 7101 can also perform operations to strip out extraneous data and detect timestamps in the data. The forwarders next determine which indexers 7102 will receive each data item and then forward the data items to the determined indexers 7102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 7100 and the processes described below with respect to FIGS. 71-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

FIG. 77 presents a flowchart illustrating how an indexer processes, indexes, and stores data received from forwarders in accordance with the disclosed embodiments. At block 7201, the indexer receives the data from the forwarder. Next, at block 7202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 7203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 7204, for example by storing the timestamp as metadata for each event.

Then, the system can apply transformations to data to be included in events at block 7205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 7206. Then, at block 7207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 7208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 7102 is responsible for storing and searching a subset of the events contained in a corresponding data store 7103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

1.4 Query Processing

FIG. 78 presents a flowchart illustrating how a search head and indexers perform a search query in accordance with the disclosed embodiments. At the start of this process, a search head receives a search query from a client at block 7301. Next, at block 7302, the search head analyzes the search query to determine what portions can be delegated to indexers and what portions need to be executed locally by the search head. At block 7303, the search head distributes the determined portions of the query to the indexers. Note that commands that operate on single events can be trivially delegated to the indexers, while commands that involve events from multiple indexers are harder to delegate.

Then, at block 7304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 7304 may involve using the late-binding scheme to extract values for specified fields from events at the time the query is processed. Next, the indexers can either send the relevant events back to the search head, or use the events to calculate a partial result, and send the partial result back to the search head.

Finally, at block 7305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 7100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

FIG. 79A presents a block diagram illustrating how fields can be extracted during query processing in accordance with the disclosed embodiments. At the start of this process, a search query 7402 is received at a query processor 7404. Query processor 7404 includes various mechanisms for processing a query, wherein these mechanisms can reside in a search head 7104 and/or an indexer 7102. Note that the exemplary search query 7402 illustrated in FIG. 79A is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "I" operates on the results produced by the first command, and so on for additional commands. Search query 7402 can also be expressed in other query languages, such as the Structured Query Language ("SQL") or any suitable query language.

Upon receiving search query 7402, query processor 7404 sees that search query 7402 includes two fields "IP" and "target." Query processor 7404 also determines that the values for the "IP" and "target" fields have not already been extracted from events in data store 7414, and consequently determines that query processor 7404 needs to use extraction rules to extract values for the fields. Hence, query processor 7404 performs a lookup for the extraction rules in a rule base 7406, wherein rule base 7406 maps field names to corresponding extraction rules and obtains extraction rules 7408-7409, wherein extraction rule 7408 specifies how to extract a value for the "IP" field from an event, and extraction rule 7409 specifies how to extract a value for the "target" field from an event. As is illustrated in FIG. 79A, extraction rules 7408-7409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 7404 sends extraction rules 7408-7409 to a field extractor 7412, which applies extraction rules 7408-7409 to events 7416-7418 in a data store 7414. Note that data store 7414 can include one or more data stores, and extraction rules 7408-7409 can be applied to large numbers of events in data store 7414, and are not meant to be limited to the three events 7416-7418 illustrated in FIG. 79A. Moreover, the query processor 7404 can instruct field extractor 7412 to apply the extraction rules to all the events in a data store 7414, or to a subset of the events that have been filtered based on some criteria.

Next, field extractor 7412 applies extraction rule 7408 for the first command "Search IP="10*" to events in data store 7414 including events 7416-7418. Extraction rule 7408 is used to extract values for the IP address field from events in data store 7414 by looking for a pattern of one or more digits, followed by a period, followed again by one or more digits, followed by another period, followed again by one or more digits, followed by another period, and followed again by one or more digits. Next, field extractor 7412 returns field values 7420 to query processor 7404, which uses the criterion IP="10*" to look for IP addresses that start with "10". Note that events 7416 and 7417 match this criterion, but event 7418 does not, so the result set for the first command is events 7416-7417.

Query processor 7404 then sends events 7416-717 to the next command "stats count target." To process this command, query processor 7404 causes field extractor 7412 to apply extraction rule 7409 to events 7416-7417. Extraction rule 7409 is used to extract values for the target field for events 7416-7417 by skipping the first four commas in events 7416-7417, and then extracting all of the following characters until a comma or period is reached. Next, field extractor 7412 returns field values 7421 to query processor 7404, which executes the command "stats count target" to count the number of unique values contained in the target fields, which in this example produces the value "2" that is returned as a final result 7422 for the query.

Note that query results can be returned to a client, a search head, or any other system component for further processing. In general, query results may include: a set of one or more events; a set of one or more values obtained from the events;

a subset of the values; statistics calculated based on the values; a report containing the values; or a visualization, such as a graph or chart, generated from the values.

1.5.1 Data Models

Creating queries requires knowledge of the fields that are included in the events being searched, as well as knowledge of the query processing language used for the queries. While a data analyst may possess domain understanding of underlying data and knowledge of the query processing language, an end user responsible for creating reports at a company (e.g., a marketing specialist) may not have such expertise. In order to assist end users, implementations of the event-processing system described herein provide data models that simplify the creation of reports and other visualizations.

A data model encapsulates semantic knowledge about certain events. A data model can be composed of one or more objects grouped in a hierarchical manner. In general, the objects included in a data model may be related to each other in some way. In particular, a data model can include a root object and, optionally, one or more child objects that can be linked (either directly or indirectly) to the root object. A root object can be defined by search criteria for a query to produce a certain set of events, and a set of fields that can be exposed to operate on those events. A root object can be a parent of one or more child objects, and any of those child objects can optionally be a parent of one or more additional child objects. Each child object can inherit the search criteria of its parent object and have additional search criteria to further filter out events represented by its parent object. Each child object may also include at least some of the fields of its parent object and optionally additional fields specific to the child object.

FIG. 79B illustrates an example data model structure 7428, in accordance with some implementations. As shown, example data model "Buttercup Games" 7430 includes root object "Purchase Requests" 7432, and child objects "Successful Purchases" 7434 and "Unsuccessful Purchases" 7436.

FIG. 79C illustrates an example definition 7440 of root object 7432 of data model 7430, in accordance with some implementations. As shown, definition 7440 of root object 7432 includes search criteria 7442 and a set of fields 7444. Search criteria 7442 require that a search query produce web access requests that qualify as purchase events. Fields 7444 include inherited fields 7446 which are default fields that specify metadata about the events of the root object 7432. In addition, fields 7444 include extracted fields 7448, whose values can be automatically extracted from the events during search using extraction rules of the late binding schema, and calculated fields 7450, whose values can be automatically determined based on values of other fields extracted from the events. For example, the value of the productName field can be determined based on the value in the productID field (e.g., by searching a lookup table for a product name matching the value of the productID field). In another example, the value of the price field can be calculated based on values of other fields (e.g., by multiplying the price per unit by the number of units).

FIG. 79D illustrates example definitions 7458 and 7460 of child objects 7434 and 7436 respectively, in accordance with some implementations. Definition 7458 of child object 7434 includes search criteria 7462 and a set of fields 7464. Search criteria 7462 inherits search criteria 7442 of the parent object 7432 and includes an additional criterion of "status=200," which indicates that the search query should produce web access requests that qualify as successful purchase events. Fields 7464 consist of the fields inherited from the parent object 7432.

Definition 7460 of child object 7436 includes search criteria 7470 and a set of fields 7474. Search criteria 7470 inherits search criteria 7442 of the parent object 7432 and includes an additional criterion of "status!=200," which indicates that the search query should produce web access requests that qualify as unsuccessful purchase events. Fields 7474 consist of the fields inherited from the parent object 7432. As shown, child objects 7434 and 7436 include all the fields inherited from the parent object 7432. In other implementations, child objects may only include some of the fields of the parent object and/or may include additional fields that are not exposed by the parent object.

When creating a report, a user can select an object of a data model to focus on the events represented by the selected object. The user can then view the fields of the data object and request the event-processing system to structure the report based on those fields. For example, the user can request the event-processing system to add some fields to the report, to add calculations based on some fields to the report, to group data in the report based on some fields, etc. The user can also input additional constraints (e.g., specific values and/or mathematical expressions) for some of the fields to further filter out events on which the report should be focused.

1.6 Exemplary Search Screen

FIG. 81A illustrates an exemplary search screen 7600 in accordance with the disclosed embodiments. Search screen 7600 includes a search bar 7602 that accepts user input in the form of a search string. It also includes a time range picker 7612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 7600 also initially displays a "data summary" dialog as is illustrated in FIG. 81B that enables the user to select different sources for the event data, for example by selecting specific hosts and log files.

After the search is executed, the search screen 7600 can display the results through search results tabs 7604, wherein search results tabs 7604 includes: an "events tab" that displays various information about events returned by the search; a "statistics tab" that displays statistics about the search results; and a "visualization tab" that displays various visualizations of the search results. The events tab illustrated in FIG. 81A displays a timeline graph 7605 that graphically illustrates the number of events that occurred in one-hour intervals over the selected time range. It also displays an events list 7608 that enables a user to view the raw data in each of the returned events. It additionally displays a fields sidebar 7606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting implementations of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 80 illustrates how a search query 7501 received from a client at search head 7104 can split into two phases, including: (1) a "map phase" comprising subtasks 7502 (e.g., data retrieval or simple filtering) that may be performed in parallel and are "mapped" to indexers 7102 for execution, and (2) a "reduce phase" comprising a merging operation 7503 to be executed by the search head when the results are ultimately collected from the indexers.

During operation, upon receiving search query 7501, search head 7104 modifies search query 7501 by substituting "stats" with "prestats" to produce search query 7502, and then distributes search query 7502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 78, or may alternatively distribute a modified version (e.g., a more restricted version) of the search query to the search peers. In this example, the indexers are responsible for producing the results and sending them to the search head. After the indexers return the results to the search head, the search head performs the merging operations 7503 on the results. Note that by executing the computation in this way, the system effectively distributes the computational operations while minimizing data transfers.

1.7.2 Keyword Index

As described above with reference to the flow charts in FIGS. 77 and 78, event-processing system 7100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 7100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

1.8 Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 82A illustrates an exemplary key indicators view 7700 that comprises a dashboard, which can display a value 7701, for various security-related metrics, such as malware infections 7702. It can also display a change in a metric value 7703, which indicates that the number of malware infections increased by 63 during the preceding interval. Key indicators view 7700 additionally displays a histogram panel 7704 that displays a histogram of notable events organized by urgency values, and a histogram of notable events organized by time intervals. This key indicators view is described in further detail in pending U.S. patent application Ser. No. 13/956,338 filed Jul. 31, 2013.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 82B illustrates an exemplary incident review dashboard 7710 that includes a set of incident attribute fields 7711 that, for example, enables a user to specify a time range field 7712 for the displayed events. It also includes a timeline 7713 that graphically illustrates the number of incidents that occurred in one-hour time intervals over the selected time range. It additionally displays an events list 7714 that enables a user to view a list of all of the notable events that match the criteria in the incident attributes fields 7711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCl/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 82C, wherein nodes 7733 and 7734 are selectively expanded. Note that nodes 7731-7739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 82D displays a listing of recent "tasks and events" and a listing of recent "log entries" for a selected time range above a performance-metric graph for "average CPU core utilization" for the selected time range. Note that a user is able to operate pull-down menus 7742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

FIG. 83 illustrates a diagrammatic representation of a machine in the exemplary form of a computer system 7800 within which a set of instructions, for causing the machine to perform any one or more of the methodologies discussed herein, may be executed. The system 7800 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 7800 may represent system 210 of FIG. 2.

The exemplary computer system 7800 includes a processing device (processor) 7802, a main memory 7804 (e.g., read-only memory (ROM), flash memory, dynamic random access memory (DRAM) such as synchronous DRAM (SDRAM)), a static memory 7806 (e.g., flash memory, static random access memory (SRAM)), and a data storage device 7818, which communicate with each other via a bus 7830.

Processing device 7802 represents one or more general-purpose processing devices such as a microprocessor, central processing unit, or the like. More particularly, the processing device 7802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 7802 may also be one or more special-purpose processing devices such as an application specific integrated circuit (ASIC), a field programmable gate array (FPGA), a digital signal processor (DSP), network processor, or the like. The processing device 7802 is configured to execute the notification manager 210 for performing the operations and steps discussed herein.

The computer system 7800 may further include a network interface device 7808. The computer system 7800 also may include a video display unit 7810 (e.g., a liquid crystal display (LCD) or a cathode ray tube (CRT)), an alphanumeric input device 7812 (e.g., a keyboard), a cursor control device 7814 (e.g., a mouse), and a signal generation device 7816 (e.g., a speaker).

The data storage device 7818 may include a computer-readable medium 7828 on which is stored one or more sets of instructions 7822 (e.g., instructions for search term generation) embodying any one or more of the methodologies or functions described herein. The instructions 7822 may also reside, completely or at least partially, within the main memory 7804 and/or within processing logic 7826 of the processing device 7802 during execution thereof by the computer system 7800, the main memory 7804 and the processing device 7802 also constituting computer-readable media. The instructions may further be transmitted or received over a network 7820 via the network interface device 7808.

While the computer-readable storage medium 7828 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Implementations that are described may include graphical user interfaces (GUIs). Frequently, an element that appears in a GUI display is associated or bound to particular data in the underlying computer system. The GUI element may be used to indicate the particular data by displaying the data in some fashion, and may possibly enable the user to interact to indicate the data in a desired, changed form or value. In such cases, where a GUI element is associated or bound to particular data, it is a common shorthand to refer to the data indications of the GUI element as the GUI element, itself, and vice versa. The reader is reminded of such shorthand and that the context renders the intended meaning clear to one of skill in the art where a distinction between a GUI element and the data to which it is bound is meaningful.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

causing for display a graphical user interface that displays key performance indicators (KPIs) and graphical control elements for the KPIs, the KPIs being associated with one or more services, the graphical control elements enabling adjustment of a weight of one of the KPIs;

causing for display, in the graphical user interface, a value of an aggregate KPI that is determined in view of weights and values of one or more of the KPIs associated with the services;

in response to receiving an indication of an adjustment of the weight of one of the KPIs, modifying the value of the aggregate KPI in the graphical user interface to reflect the adjusted weight, wherein each of the KPIs is defined by a search query of machine data and indicates an aspect of how a service provided by one or more entities is performing at a point in time or during a period of time thereby transforming machine data to the KPI indicating the aspect of how the service is performing;

wherein each entity of the one or more entities corresponds to an entity definition having an identification of machine data from or about the entity;

wherein a service of the one or more of services is represented by a service definition that references the entity definition; and wherein the method is performed by one or more processing devices.

2. The method of claim 1, wherein the search query derives a value for a respective KPI from machine data produced by the one or more entities that provide the one or more services.

3. The method of claim 1, wherein the value of the aggregate KPI is calculated using a weighted average of values from KPIs of multiple services.

4. The method of claim 1, wherein the value of the one or more KPIs is determined by retrieving a most recent value for each of a plurality of KPIs from a data store, wherein the most recent value for a first KPI and the most recent value for a second KPI are derived from different time periods.

5. The method of claim 1, wherein the value of the one or more KPIs is derived by executing the search query defining each of the one or more KPIs.

6. The method of claim 1, wherein the graphical control element to enable adjustment of a weight of a respective KPI to an exclusion value that causes the respective KPI to be excluded from a calculation of the value of the aggregate KPI.

7. The method of claim 1, wherein the graphical control element to enable adjustment of a weight of a respective KPI to an exclusion value that causes the respective KPI to be excluded from a calculation of the value of the aggregate KPI, wherein the exclusion value is a minimum value associated with a range of weighting values.

8. The method of claim 1, wherein the graphical control element to enable adjustment of a weight of a respective KPI to a priority value that causes the respective KPI to override other KPIs when calculating the value of the aggregate KPI, wherein the value of the aggregate KPI is calculated based on only one of the KPIs having the weighting value.

9. The method of claim 1, wherein the graphical control element to enable adjustment of a weight of a respective KPI to a priority value that causes the respective KPI to override other KPIs when calculating the value of the aggregate KPI, wherein the value of the aggregate KPI is calculated based on only one of the KPIs having the weighting value, wherein the priority value is a maximum value associated with a range of weighting values.

10. The method of claim 1, further comprising:

comparing the value for the aggregate KPI to a threshold; and causing generation of an alert based on the comparing.

11. The method of claim 1, further comprising: receiving another indication to generate an alert when the value of the aggregate KPI exceeds a threshold associated with a critical state;

generating a correlation search based on the plurality of KPIs and weights associated with the plurality of KPIs; and scheduling the correlation search to periodically execute.

12. The method of claim 1, further comprising:

receiving a first selection of services in a first display component of the graphical user interface, the first display component enabling selection of a subset of services from a list of services within an IT environment;

in response to the first selection, causing for display in a second display component of the graphical user interface a list of the KPIs associated with the one or more services, wherein the second display component enables selection of a subset of KPIs from the list of KPIs;

receiving a second selection of the subset of KPIs from the list of KPIs in the second display component of the graphical user interface; and in response to the second selection, causing for display in a third display component of the graphical user interface the one or more KPIs and the graphical control elements for the KPIs, wherein the third display component enables adjustment of weights for the subset of KPIs.

13. The method of claim 1, wherein the graphical control element comprises a slider.

14. The method of claim 1, wherein the graphical user interface provides a visual indication of a state corresponding to the value of the aggregate KPI.

15. The method of claim 1, wherein the graphical user interface provides a visual indication of a state corresponding to the value of the aggregate KPI, wherein the state is critical when the value of the aggregate KPI exceeds a threshold value.

16. The method of claim 1, wherein the graphical user interface provides a visual indication of a state corresponding to each of the KPIs, wherein the state of a respective KPI is critical when the value of the respective KPI exceeds a threshold value.

17. The method of claim 1, wherein the search query derives the value for the KPI using a late-binding schema to extract an initial value from machine data and then performs a calculation with the initial value.

18. The method of claim 1, wherein the search query derives the value for the KPI by applying a late-binding schema to events containing raw portions of the machine data.

19. A system comprising:

a memory; and a processing device coupled with the memory to:

cause for display a graphical user interface that displays key performance indicators (KPIs) and graphical control elements for the KPIs, the KPIs being associated with one or more services, the graphical control elements enabling adjustment of a weight of one of the KPIs;

cause for display, in the graphical user interface, a value of an aggregate KPI that is determined in view of weights and values of one or more of the KPIs associated with the services;

in response to receiving an indication of an adjustment of the weight of one of the KPIs, modifying the value of the aggregate KPI in the graphical user interface to reflect the adjusted weight, wherein each of the KPIs is defined by a search query of machine data and indicates an aspect of how a service provided by one or more entities is performing at a point in time or during a period of time thereby transforming machine data to the KPI indicating the aspect of how the service is performing;

wherein each entity of the one or more entities corresponds to an entity definition having an identification of machine data from or about the entity; and wherein a service of the one or more services is represented by a service definition that references the entity definition.

20. The system of claim 19, wherein the search query derives a value for a respective KPI from machine data produced by the one or more entities that provide the one or more services.

21. The system of claim 19, wherein the value of the aggregate KPI is calculated using a weighted average of values from KPIs of multiple services.

22. The system of claim 19, wherein the value of the one or more KPIs is determined by retrieving a most recent value for each of a plurality of KPIs from a data store, wherein the most recent value for a first KPI and the most recent value for a second KPI are derived from different time periods.

23. The system of claim 19, wherein the value of the one or more KPIs is derived by executing the search query defining each of the one or more KPIs.

24. The system of claim 19, wherein the graphical control element to enable adjustment of a weight of a respective KPI to an exclusion value that causes the respective KPI to be excluded from a calculation of the value of the aggregate KPI.

25. The system of claim 19, wherein the graphical control element to enable adjustment of a weight of a respective KPI to an exclusion value that causes the respective KPI to be excluded from a calculation of the value of the aggregate KPI, wherein the exclusion value is a minimum value associated with a range of weighting values.

26. A non-transitory computer readable storage medium encoding instructions thereon that, in response to execution by a processing device, cause the processing device to perform operations comprising:

causing for display a graphical user interface that displays key performance indicators (KPIs) and graphical control elements for the KPIs, the KPIs being associated with one or more services, the graphical control elements enabling adjustment of a weight of one of the KPIs;

causing for display, in the graphical user interface, a value of an aggregate KPI that is determined in view of weights and values of one or more of the KPIs associated with the services;

in response to receiving an indication of an adjustment of the weight of one of the KPIs, modifying the value of the aggregate KPI in the graphical user interface to reflect the adjusted weight, wherein each of the KPIs is defined by a search query of machine data and indicates an aspect of how a service provided by one or more entities is performing at a point in time or during a period of time thereby transforming machine data to the KPI indicating the aspect of how the service is performing;

wherein each entity of the one or more entities corresponds to an entity definition having an identification of machine data from or about the entity;

wherein a service of the one or more services is represented by a service definition that references the entity definition; and wherein the method is performed by one or more processing devices.

27. The non-transitory computer readable storage medium of claim 26, wherein the search query derives a value for a respective KPI from machine data produced by the one or more entities that provide the one or more services, and wherein the value of the one or more KPIs is derived by executing the search query defining each of the one or more KPIs.

28. The non-transitory computer readable storage medium of claim 26, wherein the value of the aggregate KPI is calculated using a weighted average of values from KPIs of multiple services.

29. The non-transitory computer readable storage medium of claim 26, wherein the value of the one or more KPIs is determined by retrieving a most recent value for each of a plurality of KPIs from a data store, wherein the most recent value for a first KPI and the most recent value for a second KPI are derived from different time periods.

30. The non-transitory computer readable storage medium of claim 26, wherein the graphical control element to enable adjustment of a weight of a respective KPI to an exclusion value that causes the respective KPI to be excluded from a calculation of the value of the aggregate KPI.

* * * * *